US005111308A

United States Patent [19]

Bachar

[11] Patent Number: 5,111,308

[45] Date of Patent: May 5, 1992

[54] METHOD OF INCORPORATING A SCANNED IMAGE INTO A PAGE LAYOUT

[75] Inventor: Abraham Bachar, Petach Tikva, Israel

[73] Assignee: Scitex Corporation Ltd., Herzlia B, Israel

[21] Appl. No.: 603,330

[22] Filed: Oct. 25, 1990

Related U.S. Application Data

[60] Continuation of Ser. No. 431,071, Nov. 3, 1989, which is a division of Ser. No. 44,428, Apr. 30, 1987.

[30] Foreign Application Priority Data

May 2, 1986 [IL] Israel ........................................ 78675

[51] Int. Cl.[5] ................................................ H04N 1/40

[52] U.S. Cl. .................................... 358/448; 358/450; 358/451; 358/453; 382/45; 382/46; 340/721

[58] Field of Search ............... 358/450, 453, 488, 448, 358/451; 382/46, 47, 45; 340/721

[56] References Cited

U.S. PATENT DOCUMENTS

| | | | |
|---|---|---|---|
| 2,881,247 | 4/1959 | Levine et al. | 358/489 |
| 2,911,463 | 11/1959 | Kretzmer | 358/486 |
| 3,646,255 | 2/1972 | Markow | 358/486 |
| 4,178,064 | 12/1979 | Mrdjen | 350/6.6 |
| 4,214,157 | 7/1980 | Check et al. | 250/236 |
| 4,256,969 | 3/1981 | Lianza | 250/566 |
| 4,293,202 | 10/1981 | Ohnishi | 354/5 |
| 4,305,094 | 12/1981 | Yamada | 358/80 |
| 4,346,295 | 8/1982 | Tanaka et al. | 250/327.2 |
| 4,394,089 | 7/1983 | McIntosh et al. | 355/88 |
| 4,408,826 | 10/1983 | Ike et al. | 350/6.8 |
| 4,464,681 | 8/1984 | Jacobs et al. | 358/406 |
| 4,473,848 | 9/1984 | Juergensen | 358/471 |
| 4,518,988 | 5/1985 | Saitoh et al. | 358/75 |
| 4,525,823 | 6/1985 | Sugiyama et al. | 369/44 |
| 4,532,429 | 7/1985 | Horikawa | 250/559 |
| 4,568,984 | 2/1986 | Juergensen et al. | 358/494 |
| 4,591,904 | 5/1986 | Urabe et al. | 358/450 |
| 4,602,154 | 7/1986 | Taniguchi | 250/227 |
| 4,609,818 | 9/1986 | Lennemann | 250/234 |
| 4,617,470 | 10/1986 | Horikawa | 250/561 |
| 4,661,699 | 4/1987 | Welmers et al. | 250/235 |
| 4,672,461 | 6/1987 | Yoshida | 358/453 |
| 4,751,376 | 6/1988 | Sugiura et al. | 250/201 |
| 4,931,637 | 6/1990 | Succari et al. | 250/235 |

FOREIGN PATENT DOCUMENTS

| | | |
|---|---|---|
| 0006570 | 1/1980 | European Pat. Off. . |
| 0021096 | 1/1981 | European Pat. Off. . |
| 0043721 | 1/1982 | European Pat. Off. . |
| 0049048 | 4/1982 | European Pat. Off. . |
| 0065242 | 11/1982 | European Pat. Off. . |
| 0091798 | 10/1983 | European Pat. Off. . |
| 0112403 | 7/1984 | European Pat. Off. . |

(List continued on next page.)

OTHER PUBLICATIONS

S. Bousky et al, Laser Recording Performance . . . , Proc. of the SPIE, vol. 53.

D. P. Jablonowski et al, Beam Deflection . . . , SPIE vol. 84, Laser Scanning Components and Techniques, 1976, pp. 69–76.

M. R. Smith et al, Ultrahigh Resolution Graphic Data Terminal, SPIE vol. 200 Laser Recording and Information Handling, 1979, pp. 171–178.

Bestenreiner et al, Visibility and Correction of . . . , Journal of App. Photo. Eng., vol. 2, No. 2, Spring 1976, 86–92.

*Primary Examiner*—Edward L. Coles, Sr.

*Attorney, Agent, or Firm*—Shapiro and Shapiro

[57] ABSTRACT

A color separation scanner comprising a movable support arranged for mounting thereon of a two-dimensional input picture to be scanned and color separation sensing apparatus arranged for sensing the two-dimensional input picture for providing electrical signals representing color separations of the two-dimensional picture, the color separation sensing apparatus including a scanning head having a plurality of generally parallel CCD arrays, associated with dichroic filter means and operative for simultaneous scanning of the two-dimensional input picture.

8 Claims, 34 Drawing Sheets

FOREIGN PATENT DOCUMENTS

| | | | |
|---|---|---|---|
| 0142833 | 5/1985 | European Pat. Off. . | |
| 0144188 | 6/1985 | European Pat. Off. . | |
| 0164734 | 12/1985 | European Pat. Off. . | |
| 0209119 | 1/1987 | European Pat. Off. . | |
| 1922615 | 1/1970 | Fed. Rep. of Germany . | |
| 2949102 | 6/1980 | Fed. Rep. of Germany . | |
| 3129503 | 4/1982 | Fed. Rep. of Germany . | |
| 3435538 | 4/1986 | Fed. Rep. of Germany . | |
| 56-44263 | 4/1981 | Japan | 358/488 |
| 58-100568 | 6/1983 | Japan | 358/488 |
| 58-197957 | 11/1983 | Japan | 358/453 |
| 60-194868 | 10/1985 | Japan | 358/488 |
| 2085580 | 4/1982 | United Kingdom . | |
| 0054170 | 6/1982 | United Kingdom . | |
| 2114853 | 8/1983 | United Kingdom . | |
| 2139846 | 11/1984 | United Kingdom . | |

| FIG. 8A | FIG. 8A -1 , FIG. 8A -2 |
|---|---|

FIG.19
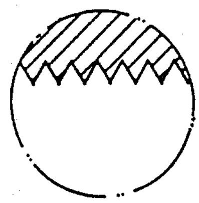
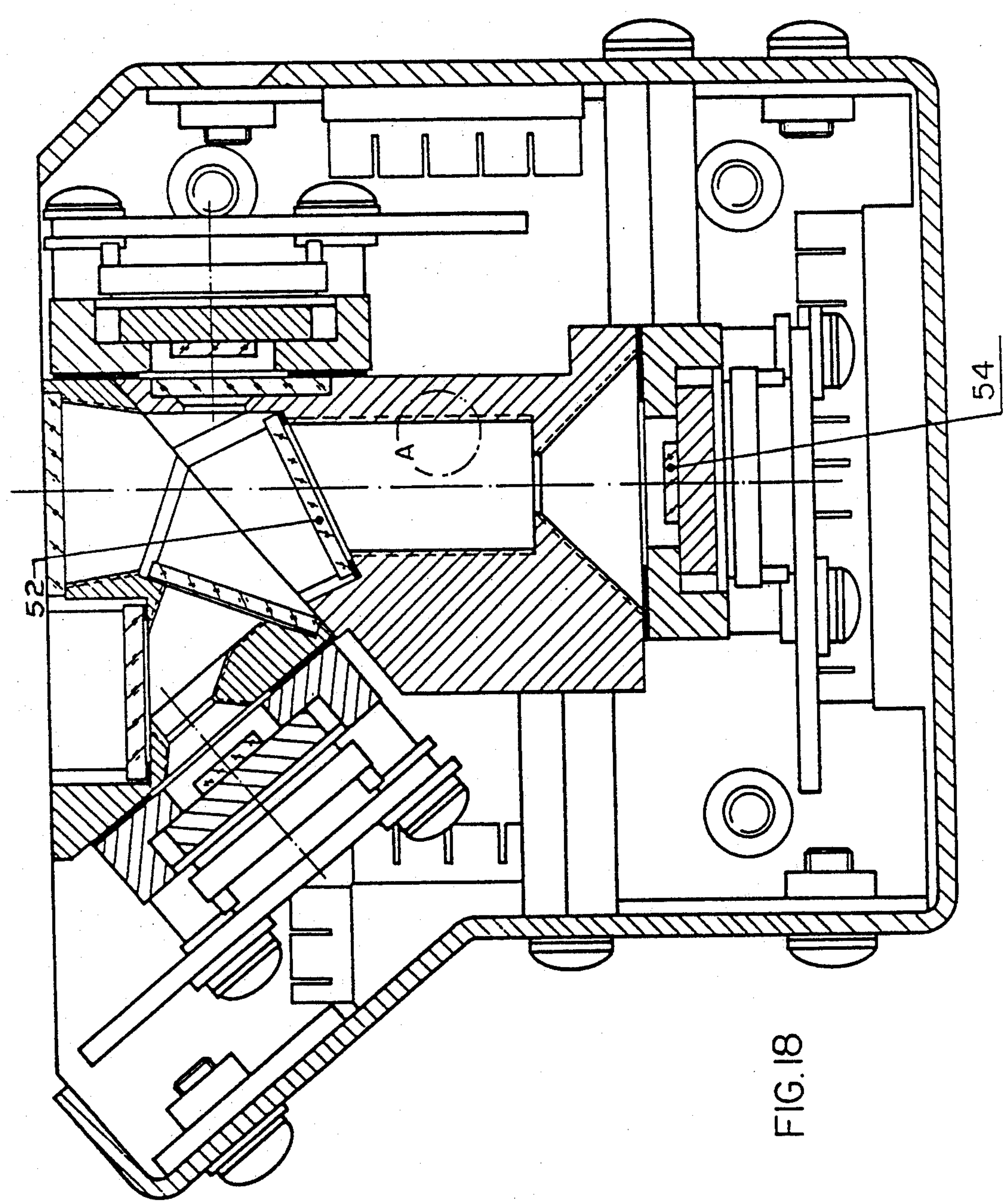
FIG.18

FIG. 20A
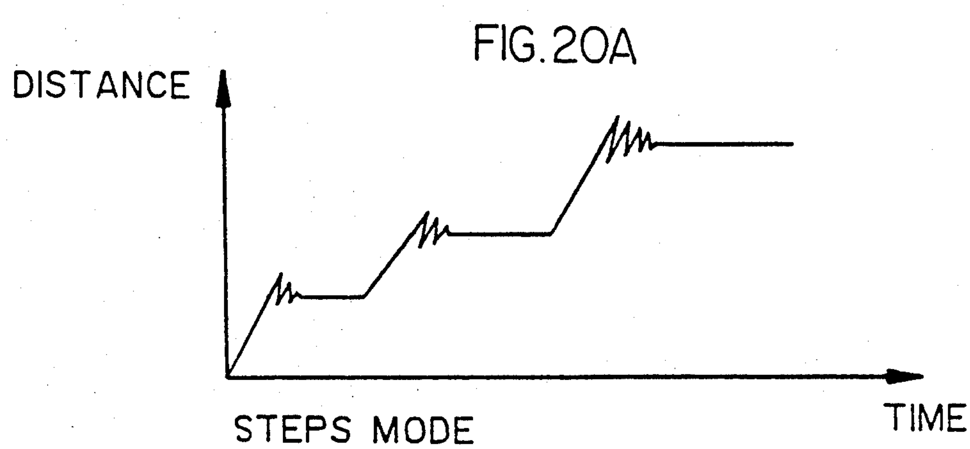
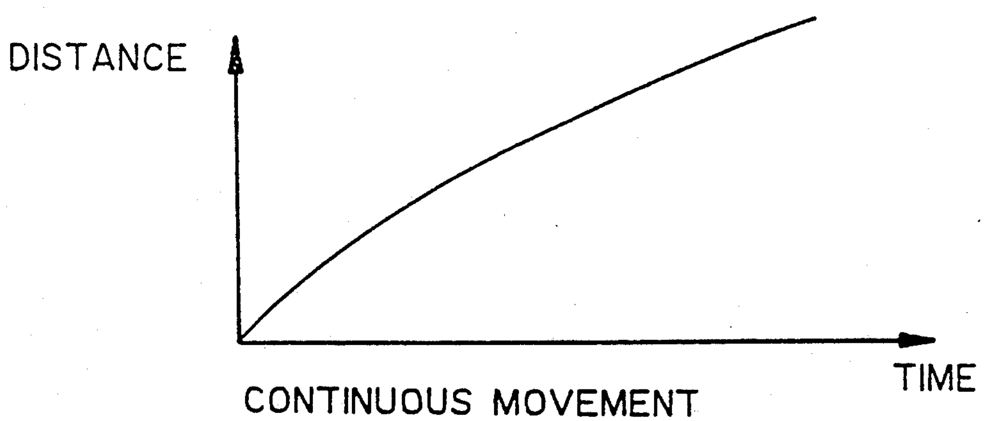
FIG. 20B

METHOD OF INCORPORATING A SCANNED IMAGE INTO A PAGE LAYOUT

This is a continuation of application Ser. No. 431,071 filed Nov. 3, 1989, which is a division of application Ser. No. 044,428 filed Apr. 30, 1987.

FIELD OF THE INVENTION

The present invention relates to color separation scanners generally.

BACKGROUND OF THE INVENTION

Color separation scanners are well known and are operative to scan two dimensional color pictures, such as prints or transparencies, and to produce electrical signals which represent color separations thereof for subsequent use in process color printing.

Conventional scanners, such as those manufactured and sold by Hell of Germany and Dainippon Screen Seizo of Japan, typically employ a rotating drum onto which the two dimensional color picture is mounted. The drum rotates past a scanning head, which may comprise a CCD array, as taught in U.S. Pat. No. 4,256,969. According to that patent, a separate scan is carried out for each separation.

Various techniques are presently known for color separation in array detector based systems. One technique employs three primary Red, Green, and Blue filters installed over the scanning head of a single CCD linear or area array. A color picture can be constructed by repeatedly scanning the picture, each time with a different filter.

A second technique employs three colored fluorescent lamps. The picture is repeatedly scanned, each time under the illumination of a different lamp.

A third technique employs three sensors and dichroic mirrors or filters for separating the three elements of color, each of which is detected by a separate sensor. In its current state of the art, this third technique has not achieved pictures of a high enough quality to fulfill the requirements of pre-press processing.

Another technique employs a single CCD chip including three linear arrays, each having deposited thereon a different color filter. Lines are read in three colors and combined using electronic hardware. A delay of several lines in interposed between the lines read in the different colors.

Summarizing the state of the prior art, it can be said generally that the prior art scanners are relatively slow in operation and do not provide a capability for picture modification and adjustment at the scanning stage. All such image modification, rotation, cropping adjustment and enhancement must be carried out once the scanned picture is stored in a computer memory, rendering such steps time-consuming and relatively expensive.

SUMMARY OF THE INVENTION

The present invention seeks to provide an improved color separation scanner which is characterized by relatively high speed operation and the capability for input picture modification at the scanning stage. The term "input picture", as used herein for the purposes of this patent application and explanation of the current invention, includes not only halftone elements but also line portions.

There is thus provided in accordance with a preferred embodiment of the present invention, a color separation scanner comprising a movable support arranged for mounting thereon of a two-dimensional picture to be scanned and color separation sensing apparatus arranged for sensing the two-dimensional picture for providing electrical signals representing color separations of the two-dimensional picture, the color separation sensing apparatus including a scanning head including a plurality of CCD arrays, each associated with a corresponding dichroic filter, operative for simultaneous scanning of the two-dimensional picture.

There is also provided in accordance with a preferred embodiment of the present invention, a color separation scanner comprising a movable support arranged for mounting thereon of a two-dimensional picture to be scanned and having first and second ranges of operative orientations, television sensing apparatus arranged for sensing the two-dimensional picture when the movable support is in a first range of operative orientations for providing a visible display of the two-dimensional picture to an operator and color separation sensing apparatus arranged for sensing the two-dimensional picture when the movable support is in a second range of operative orientations for providing electrical signals representing color separations of the two-dimensional picture.

Additionally in accordance with this embodiment of the present invention, there is provided focusing apparatus arranged such that the color separation sensing apparatus and the television sensing apparatus are mounted on a common member, whereby focusing of the television sensed picture automatically provides focusing of the color separation sensed picture. A focusing or calibration pattern may be provided on the movable support or alternatively on a picture supporting cassette which is removably seated on the movable support.

Additionally in accordance with an embodiment of the present invention, there is provided a color separation scanner comprising a movable support arranged for mounting thereon of a two-dimensional picture to be scanned and color separation sensing apparatus arranged for sensing the two-dimensional picture and comprising a scanning head including a plurality of CCD arrays, each associated with a corresponding dichroic filter, operative for simultaneous scanning of the two-dimensional picture.

Further in accordance with an embodiment of the present invention, there is provided a color separation scanner comprising a movable support arranged for mounting thereon of a two-dimensional picture to be scanned and color separation sensing apparatus comprising selectably operable ligh sources arranged in light directing relationship with opposite surfaces of the movable support, so as to be adapted for either reflective or transmissive scanning.

In accordance with this embodiment of the invention, the light sources include a curved light guide for transmissive scanning. Additionally or alternatively fiber optics light guides may be employed.

Further in accordance with an embodiment of the present invention, there is provided a color separation scanner comprising a movable support arranged for mounting thereon of a two-dimensional picture to be scanned and color separation sensing apparatus, and wherein the movable support is arranged for selectable mounting thereon of opaque and transparent two-dimensional pictures.

In accordance with a particular embodiment, the movable support comprises a cassette holder, and there are provided a plurality of cassettes including cassettes which are configured to be suitable for mounting transparencies and cassettes which are configured to be suitable for mounting opaque two-dimensional pictures. A focusing or calibration pattern may be formed on the cassette holder.

In accordance with a preferred embodiment of the present invention, the cassettes are formed with optical indications so as to provide an automatically sensible indication of focus for sensing by the focusing means.

Further in accordance with an embodiment of the present invention, there is provided a color separation scanner comprising adaptive sharpening apparatus for providing enhancement of the high frequency content of operator selectable regions of a two-dimensional picture. The adaptive sharpening apparatus may provide color separation according to the unsharp values which are calculated on the basis of the available separation data for each color separation. Alternatively all of the separations may be sharpened to correspond with the unsharp values of one particular separation which has been selected.

Additionally in accordance with an embodiment of the present invention, there is provided a color separation scanner comprising means for correcting for spatial inaccuracies in the scanning head and including an empirically calibrated look-up table.

Further in accordance with a preferred embodiment of the invention, the dichroic filters comprise color absorbing glass having on an incident surface thereof multilayer dichroic coatings and on an exiting surface thereof an anti-reflective coating.

Additionally in accordance with an embodiment of the present invention, the scanner also comprises interpolation means operative to provide registration between the plurality of CCD array outputs in different colors and also to provide electronic magnification adjustment.

Further in accordance with an embodiment of the present invention, the cassettes include means for providing a machine readable indication of input picture size.

Additionally in accordance with an embodiment of the present invention, the scanner includes means for providing electronic cropping on pre-scanned input pictures.

Additionally in accordance with an embodiment of the present invention, there is provided means for automatically setting magnification during pre-scanning of an input picture.

Further in accordance with a preferred embodiment of the invention, the CCD arrays may be positioned in the optical head such that each CCD is positioned at the best focal plane for the color separation that it senses. Due to longitudinal color aberrations of the lenses, magnifications of the CCDs are not equal when they are each in the best focus. This is corrected by suitable electronic processing.

Additionally in accordance with a preferred embodiment of the present invention, a light table is provided for enabling examination of a scanned transparency between scanning cycles. The light table arrangement preferably includes a lamp, a set of filters, a diffuser and a screen.

Further in accordance with a preferred embodiment of the present invention, there is provided a method of color separation scanning of an input picture comprising the steps of:

pre-scanning the input picture for providing an output indication of magnification, focus, lens aperture setting and brightness;

scanning the input picture in accordance with magnification, focus, lens aperture setting and brightness determined in the pre-scanning step to provide a full-resolution output indication of color separations of the input picture.

Further in accordance with an embodiment of the present invention, the method also comprises the step of modifying the output indication of color separations of the input picture in accordance with operator indicated instructions.

The operator indicated instructions may comprise instructions for cropping, rotation, adaptive sharpening and lateral shifting.

Additionally in accordance with a preferred embodiment of the invention there is provided a method for fitting a picture into a layout of a page during scanning, whereby the picture may be moved, rotated, enlarged or reduced while it is being scanned so that it will fit precisely in a desired location in the scanned layout. The method preferably comprises the steps of:

scanning a picture and displaying it to an operator on a TV screen;

displaying the page layout on the screen so that it is viewed with markings such as thin lines at the top of the picture;

using a tablet and a mouse, or similar apparatus, marking two points on the displayed picture and two corresponding points on the layout where the two picture points are to fit; and performing computer computations of the geometrical parameters so as to rescan the picture according to those parameters.

The layout can be fed into the scanner computer either before or during the above procedure, either by scanning a layout drawing or by receiving it from another work station.

As an alternative to displaying the entire layout on the screen, it is possible to supply to the computer coordinates of the two points by using a tablet for the layout drawing and pointing with a mouse or similar apparatus.

The scanning steps of the above-described methods may employ either continuous or step-wise movement of the picture. In a step-wise mode of operation, the carriage carrying the picture moves a certain distance after a line is exposed, and then stops until the vibration produced by the movement is terminated, exposes a new line and then moves again. In a continuous mode of operation, exposures are made while the carriage is moving continuously.

In accordance with a preferred embodiment of the present invention, noise in the picture produced by the scanner is reduced by scanning the original with a resolution higher by a certain integer factor k than the required final resolution and averaging k consecutive lines to form one output line.

Additionally in accordance with a preferred embodiment of the present invention, a stop-spiral scanning technique is provided for dealing with situations when the computer system cannot handle the high data rate of the scanner, when the scanner is operating in a continuous scanning mode. The stop-spiral scanning technique comprises the following steps:

stop movement;
move backwards;
wait for the computer to be ready to receive data;
begin forward acceleration;
resume scanning when the stop location is reached.

BRIEF DESCRIPTION OF THE DRAWINGS

The present invention will be understood and appreciated more fully from the following detailed description taken in conjunction with the drawings in which:

FIG. 18 is a detailed sectional illustration of an alternative optical head design, similar to that of FIG. 2 but having a grooved light path;

FIG. 19 is a detailed sectional illustration of a portion of the grooved light path of the optical head of FIG. 29;

FIGS. 20A and 20B are graphs indicating two alternative types of movement of the picture during scanning;

DETAILED DESCRIPTION OF A PREFERRED EMBODIMENT

Figure 1A:
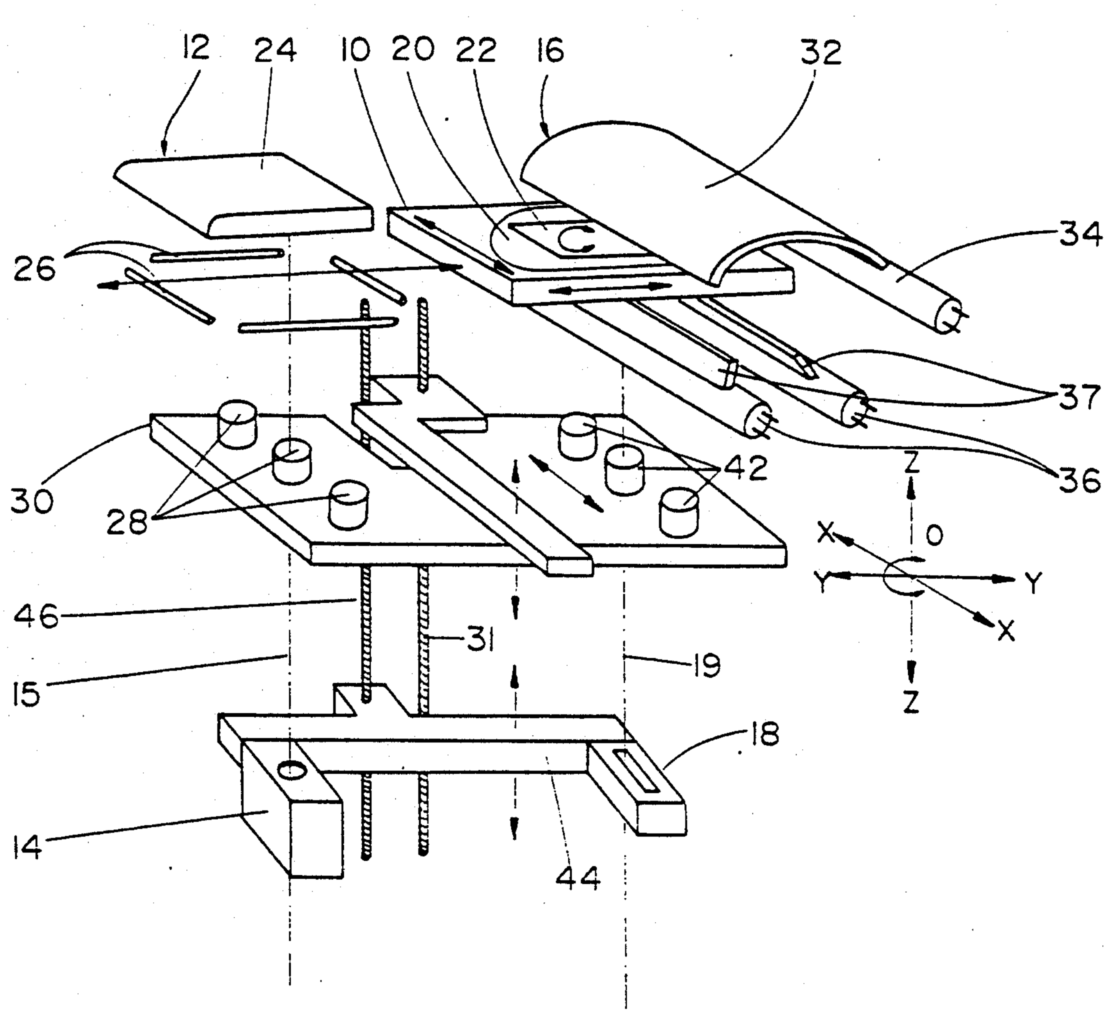
FIGS. 1A and 1B are respectively a pictorial schematic illustration and a side view illustration of the optical and opto-mechanical features of the color separation scanner according to a preferred embodiment of the present invention.
Figure 1B:
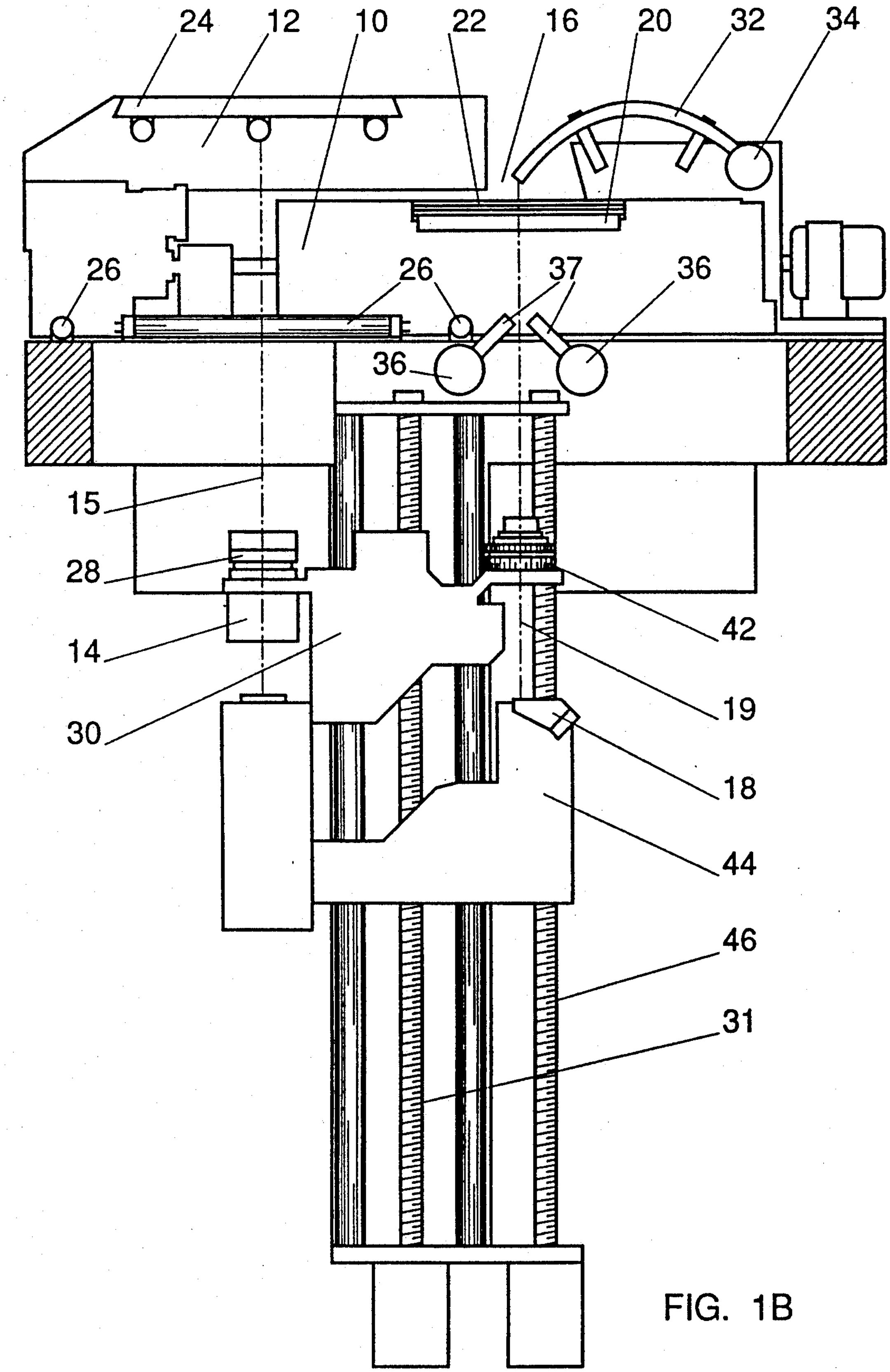

Reference is now made to FIGS. 1A and 1B, which illustrate a color separation scanner constructed and operative in accordance with a preferred embodiment of the present invention. The scanner comprises a base, not shown for the sake of clarity, onto which are mounted the elements illustrated in FIGS. 1A and 1B.

An X-Y movable carriage 10, of conventional construction, is provided for support and desired positioning of a two-dimensional input picture to be scanned. The range of movement of carriage 10 is arranged to enable the carriage and the input picture mounted thereon to be selectably located in a prescanning mainframe 12, having associated therewith a television camera 14 arranged along an optical axis 15, or in a color separation scanning mainframe 16, having associated therewith a CCD array scanning head 18 arranged along an optical axis 19.

According to an alternative embodiment of the invention, the prescanning mainframe 12 may be eliminated.

Carriage 10 is provided with a rotatable cassette holder 20, which is preferably arranged for 360 degree rotation in the plane of the two-dimensional input picture and is driven in such rotation typically by an electric motor (not shown). Removably mounted on cassette holder 20 is a selected cassette 22, typically of the type shown in FIGS. 3A and 3B.

The prescanning mainframe 12 comprises a light box or other source of diffuse illumination 24 for illuminating transparencies, and a peripheral array of fluorescent lamps 26 for illuminating opaque two-dimensional input pictures, hereinafter termed "reflectives". Prescanning is performed by causing the carriage 10 to align the center of the picture to be scanned along optical axis 15 at the desired rotation angle.

The picture is viewed by the television camera 14 along optical axis 15 via a selected one of three lenses 28, having a desired magnification. Selection of the appropriate lens is achieved by suitable positioning of a lens carriage 30 in a plane generally parallel to the plane of the picture by conventional X-Y positioning apparatus, not shown. Lens carriage 30 may also be moved parallel to optical axis 15 by means of suitable positioning means, such as elongated, vertically disposed positioning screw 31, for proper focusing.

The color separation mainframe 16 comprises a curved light guide 32 disposed above carriage 10 and which guides light from a slit aperture fluorescent lamp 34 to an illuminated strip intersecting optical axis 19, for scanning of transparencies. A pair of fluorescent lamps 36 and associated light guides 37 are located below carriage 10 and provide illumination of reflectives. Carriage 10 is operative, in addition to preforming selectable positioning of the input picture at the two mainframes, for stepwise scanning motion at the color separation mainframe 16.

Figure 23:
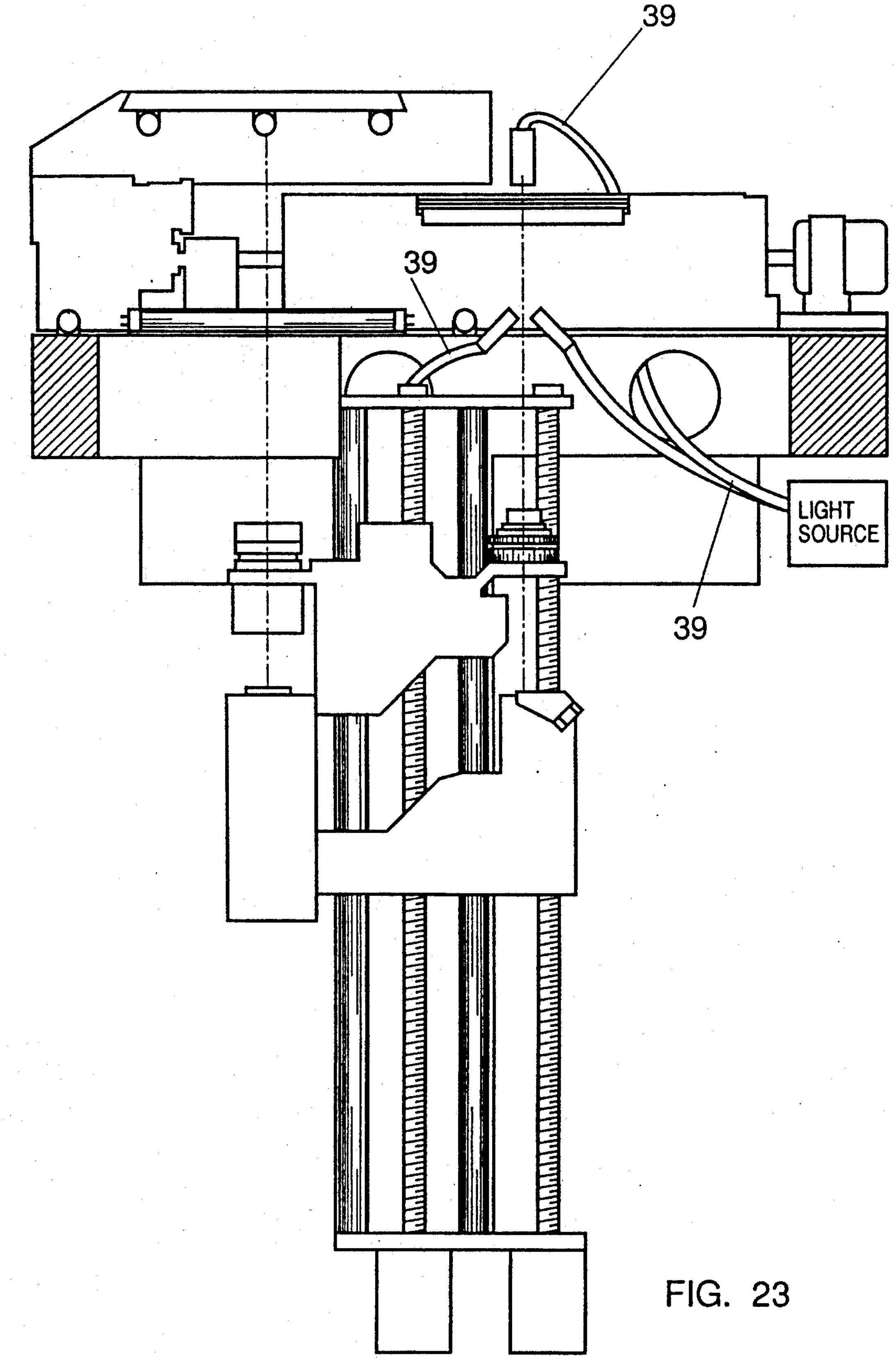
FIG. 23 is an illustration of an alternative embodiment of the apparatus of FIG. 1B, employing fiber optics light guides.

According to an alternative embodiment of the invention, illustrated in FIG. 23, fiber optic light guides 39 may be employed in place of light guides 32 and 37.

The scanning steps of the above-described methods may employ either continuous or step-wise movement of the picture. In a step-wise mode of operation, illustrated diagrammatically in FIG. 20A, the carriage carrying the picture moves a certain distance after a line is exposed, and then stops until the vibration produced by the movement is terminated, exposes a new line and then moves again. In a continuous mode of operation, illustrated diagrammatically in FIG. 20B, exposures are made while the carriage is moving continuously.

Figure 21:
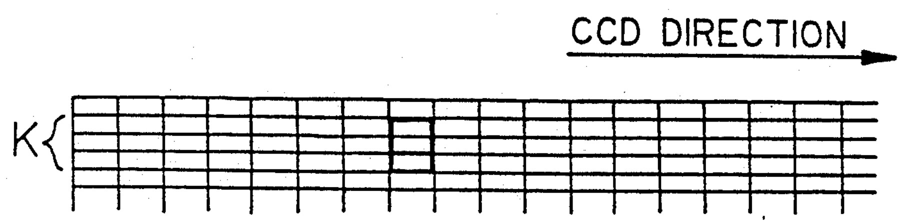
FIG. 21 is a diagram illustrating line averaging according to a preferred embodiment of the invention.

In accordance with a preferred embodiment of the present invention, noise in the picture produced by the scanner is reduced by scanning the original with a resolution higher by a certain integer factor k than the required final resolution and averaging k consecutive lines to form one output line. This technique is illustrated diagrammatically in FIG. 21.

Figure 22:
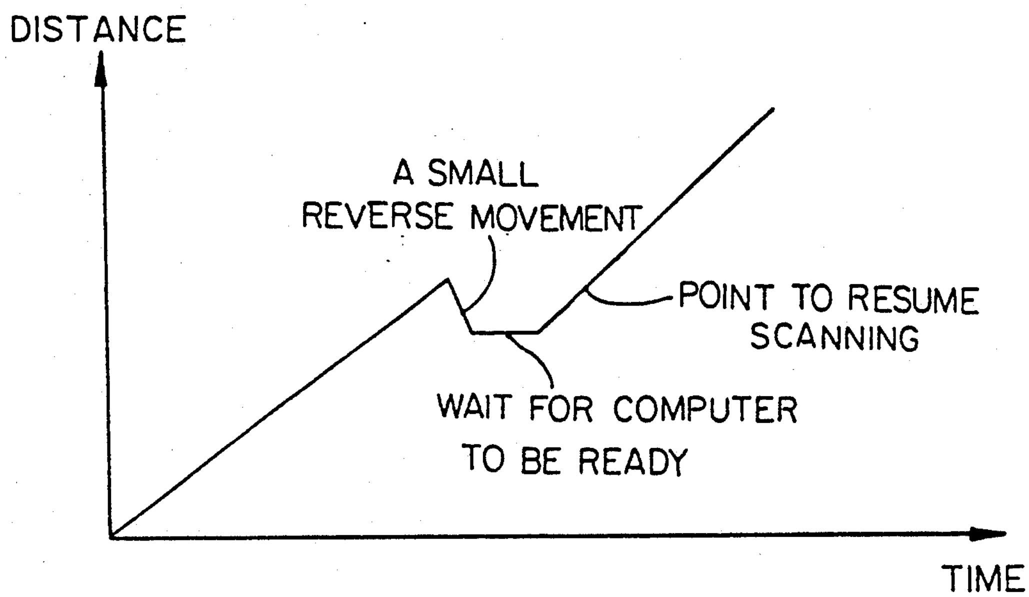
FIG. 22 is a graph illustrating a stop spiral scanning cycle employed in accordance with a preferred embodiment of the present invention.

Additionally in accordance with a preferred embodiment of the present invention, a stop-spiral scanning technique is provided for dealing with situations when the computer system cannot handle the high data rate of the scanner, when the scanner is operating in a continuous scanning mode. The stop-spiral scanning technique, which is illustrated diagramatically in FIG. 22, comprises the following steps:

stop movement;

move backwards;

wait for the computer to be ready to receive data;

begin forward acceleration; resume scanning when the stop location is reached.

Color separation scanning is carried out at the color separation mainframe 16 by causing the input picture to be line scanned at optical axis 19 by scanning head 18 via a selected one of magnification lenses 42.

Scanning head 18 and television camera 14 are mounted on a common mounting member 44 which may be raised and lowered as desired by suitable positioning apparatus, such as a positioning screw 46. It may be appreciated that suitable selection of magnification and focusing may be carried out when the picture is in the prescanning mainframe, thus automatically focusing the optics in the color separation scanning mainframe.

For every choice of lens 28 and every z-axis position of lens carriage 30 and every z-axis position of common mounting member 44 during television prescanning, there exists a corresponding set of parameters for color separation scanning. A look-up table, which may be located in a host computer 103 mentioned hereinbelow, stores the data relating to this correspondence and thus provides operating instructions for automatic focusing and magnification setting on the basis of parameters determined during television prescanning.

It is a particular feature of the present invention that the scanner may be used for both transparencies and reflectives. It is also a particular feature of the present invention that rotation of the input picture to be scanned may be accomplished readily by physically rotating the cassette holder 20.

By virtue of employing input picture mounting cassettes and an easily replaceable carriage, the range of input picture sizes that can be scanned may extend up to 11×11 inch transparencies and reflectives. The scanner typically has a continuous range of optical magnification which varies over a factor of 30 by means of multiple magnification lenses 42.

Figure 2:
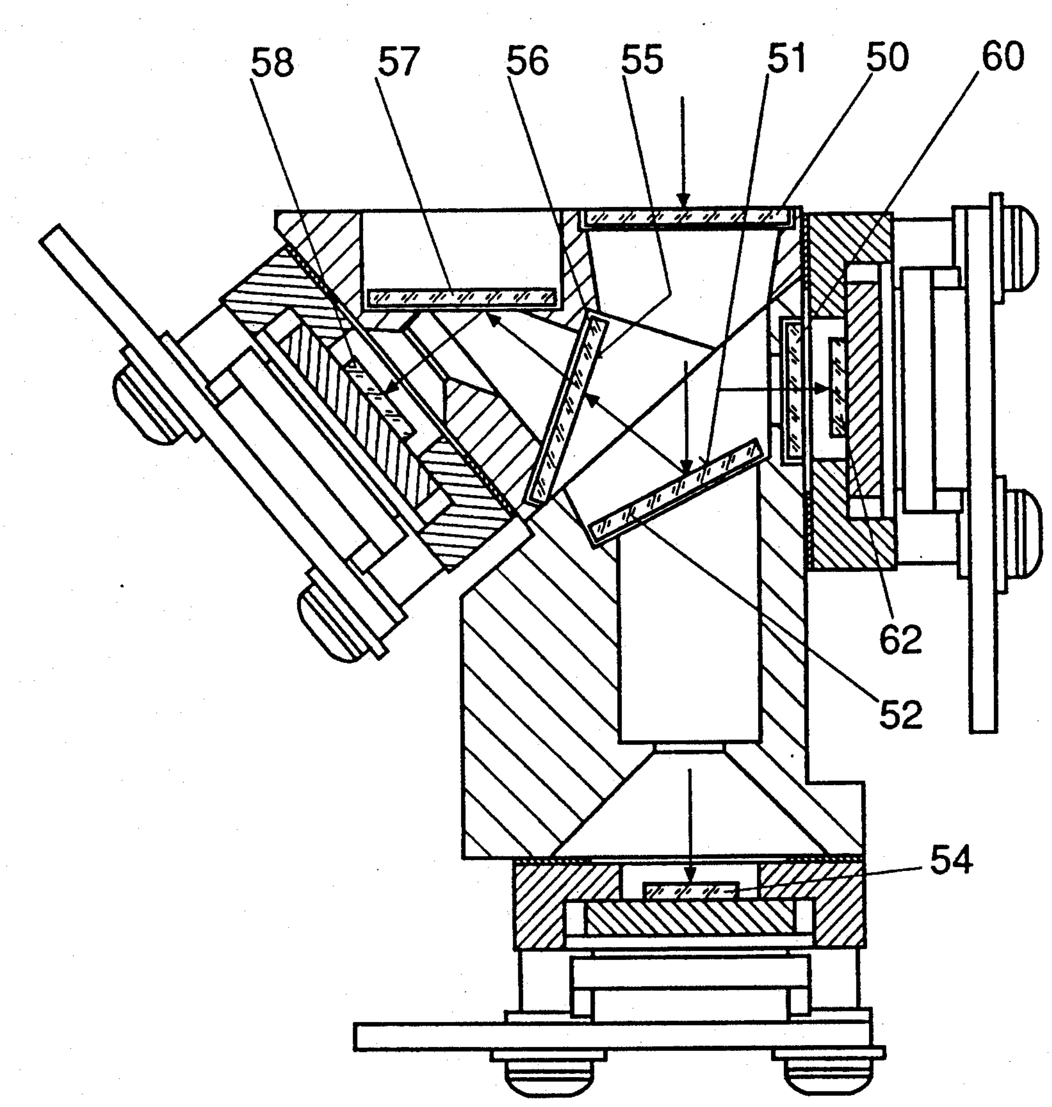
FIG. 2 is a detailed sectional illustration of the optical head forming part of the apparatus of FIG. 1.

Reference is now made to FIG. 2 which illustrates the scanning head 18 of FIGS. 1A and 1B. Light rays from one of lenses 42 (FIG. 1) pass through an entrance window 50, which also serves as an infrared radiation removing filter, and impinge upon a first surface 51 of a first dichroic filter 52. Filter 52 passes the blue separation of the spectrum onto a linear CCD array 54.

The yellow separation, combining the green and red separations, is reflected at the first surface 51 to a first surface 55 of a second dichroic filter 56. Filter 56 passes the green separation via a mirror 57 to another linear CCD array 58. The red separation is reflected at the first surface 55 to a third filter 60, which passes it to yet another linear CCD array 62.

The structure of the optical head described hereinabove and illustrated in FIG. 2 has the following particular features:

The angles of incidence upon all of the color separation filters are less than 25 degrees. This feature reduces optical aberrations which would occur to a greater extent at larger angles of incidence such as 45 degrees.

Color separation occurs at the respective first surfaces 51 and 55 of the respective filters 52 and 56. This feature greatly reduces the incidence of ghost images which could result from multiple reflections from the double surfaces of the filters.

The light corresponding to each of the color separations passes through only a 2 mm thickness of glass in a preferred embodiment, wherein the entrance window 50 is of 1 mm thickness and each of the filters 52, 56, and 60 is of 1 mm thickness. The relatively small thickness of glass through which the light passes maintains optical aberrations at a minimum, thereby improving picture contrast.

The optical scanning head 18 is characterized by a relatively high numerical aperture (F-number 1.85) in a compact configuration defining an optical distance of 50 mm between the entrance window 50 and the various CCD arrays.

The optical head does not limit the length of the optical detector employed.

Filters 52, 56, and 60 are employed herein according to a preferred embodiment of the invention to "slice" the overall spectral range into a number of parts, all of which are to be used, here Red, Green, and Blue. Ghost images may be produced when light impinges at an angle other than 90 degrees on a filter and is reflected backwards by the second surface of the filter and thereafter reflected forward by the first surface thereof towards a detector, resulting in the creation of a second relatively weak and unfocused image in addition to the first image.

The dichroic filters employed in the invention comprise colored glass having a dichroic multilayer coating on their respective first surfaces and a conventional optical anti-reflective coating on their respective second surfaces.

The anti-reflective coating tends to minimize the reflection from the second surface and is effective to reduce ghost images. Additionally, in view of the fact that ghost images consist mainly of parasite colors, i.e. the ghost of the blue separation comprises mainly green and red colors, etc, the colored glass is effective to attenuate these parasite colors. In the blue separation, for example, a blue colored glass substrate in filter 52 absorbs the green and red colors and the anti-reflective coating on the second surface thereof may be optimized to the blue section of the spectrum to eliminate the possibility of a blue color ghost image.

The use of colored glass filters also allows less expensive optical coating techniques to be employed, because the glass filter substrates absorb colors that otherwise would have to be transmitted by the coatings.

It is a particular feature of the present invention that the light guides 32 and 37 employed therein, as described hereinabove with reference to FIGS. 1A and 1B, act as light spatial averaging devices. At the output side of each light guide, each point represents a contribution of all points along the fluorescent lamp. The light is reflected many times within the light guide to create a new light source, i.e. the light guide output, which has a spatially flat intensity distribution. Therefore, changes in the spatial distribution of the intensity of the fluorescent lamps do not affect the spatial distribution of the intensity of the output of the light guide.

According to a preferred embodiment of the present invention, the inner surfaces of the optical head are configured so as to reduce the effect of light reflection. As seen generally in FIG. 18 and in detail in FIG. 30, the inner surfaces of the optical head, such as the light path between filter 52 and CCD array 54 may be grooved to reduce the effect of reflection of stray light.

Figure 24A:
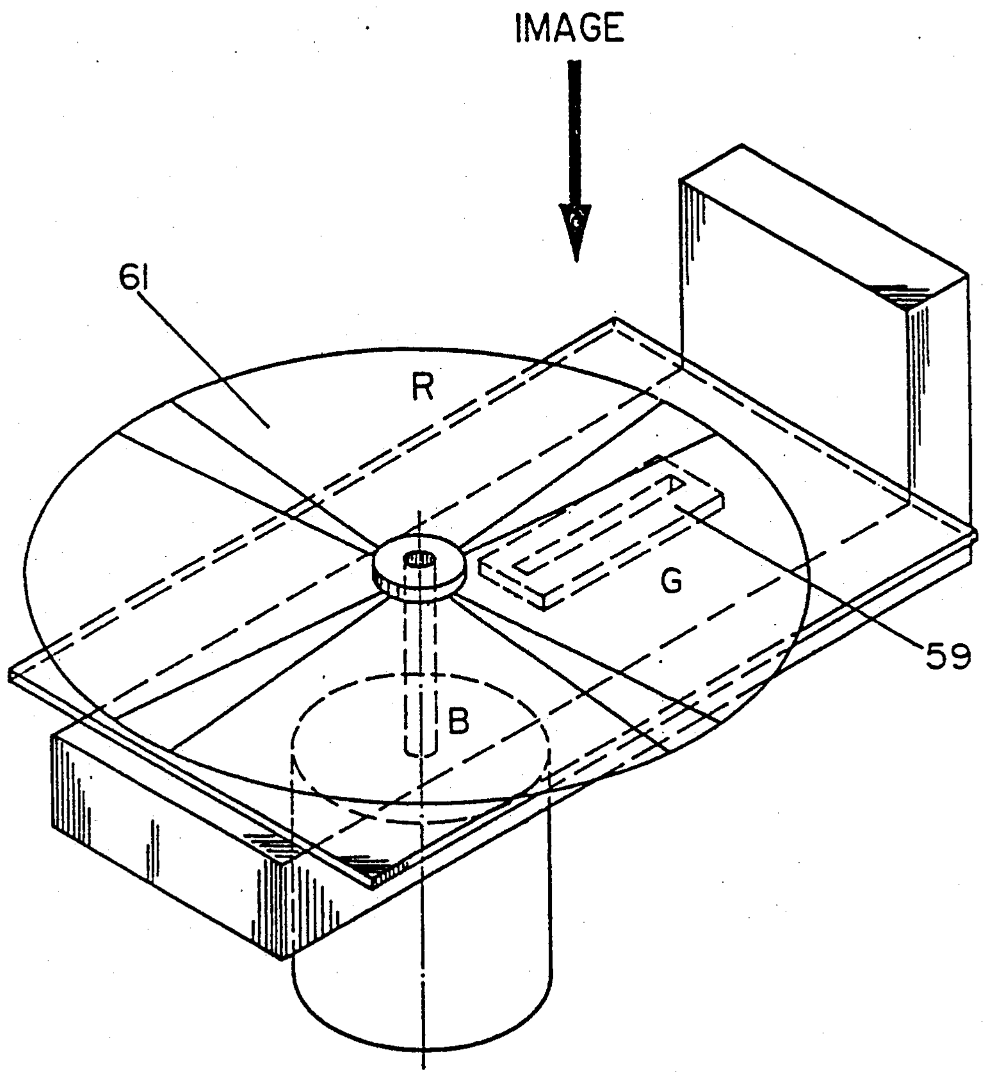
FIGS. 24A and 24B illustrate two alternative color separation configurations employing a rotating color filter wheel.

According to an alternative embodiment of the present invention, color separation may be accomplished alternatively by using a single CCD 59 and a rotating color filter wheel 61 disposed adjacent the CCD. Such a configuration is illustrated in FIG. 24A. Alternatively the rotating color filter wheel 61 may be disposed adjacent a light source 63 as illustrated in FIG. 24B.

Figure 24B:
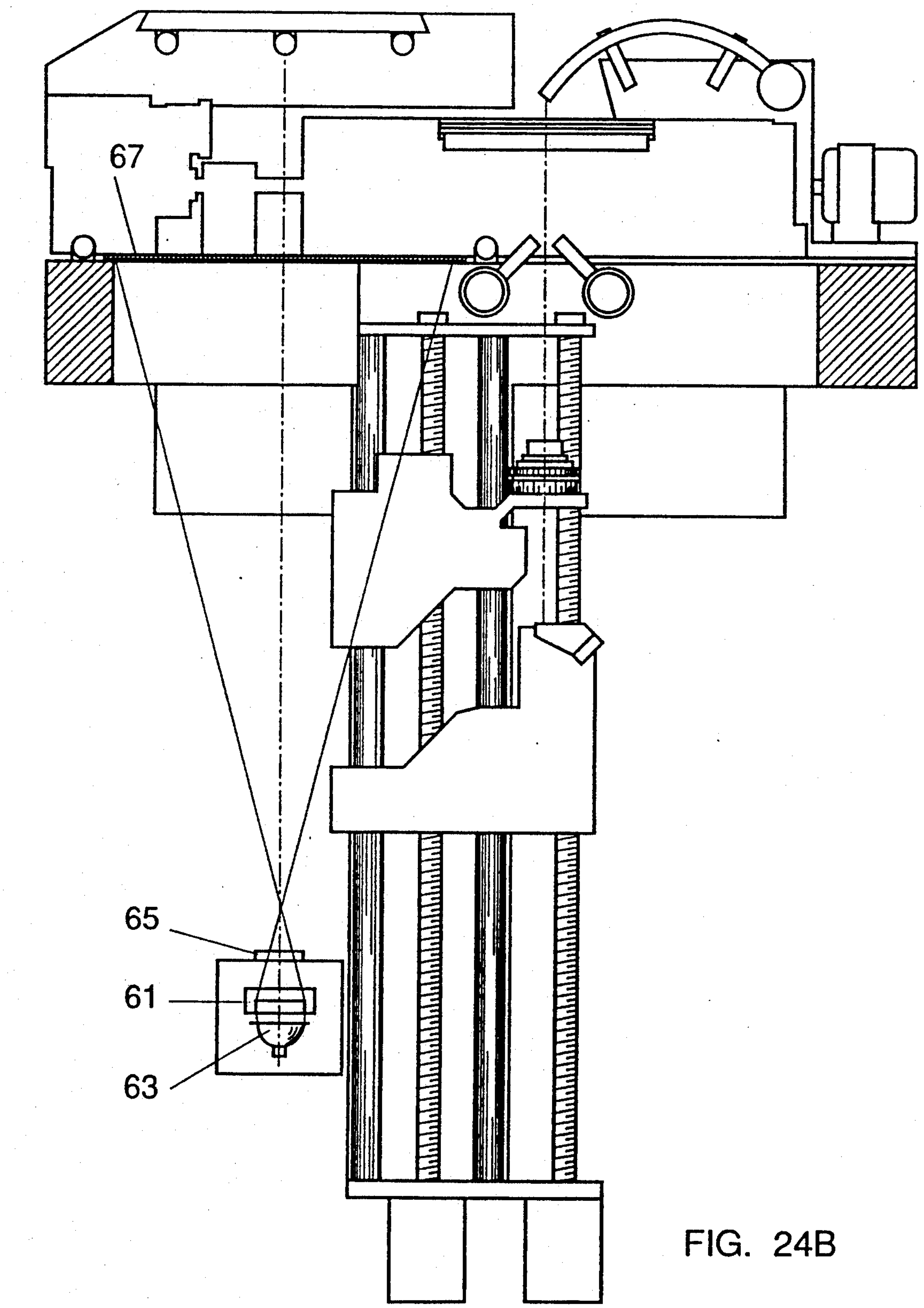

The configuration illustrated in FIG. 24B is generally similar to that illustrated in FIG. 1B except that the FIG. 24B configuration also includes a light table assembly to enable the scanned transparency to be viewed between the scanning cycles. In addition to the light source 63 and the filter wheel 61, the light table assembly also comprises a diffuser 65 and a screen 67.

Figure 25:
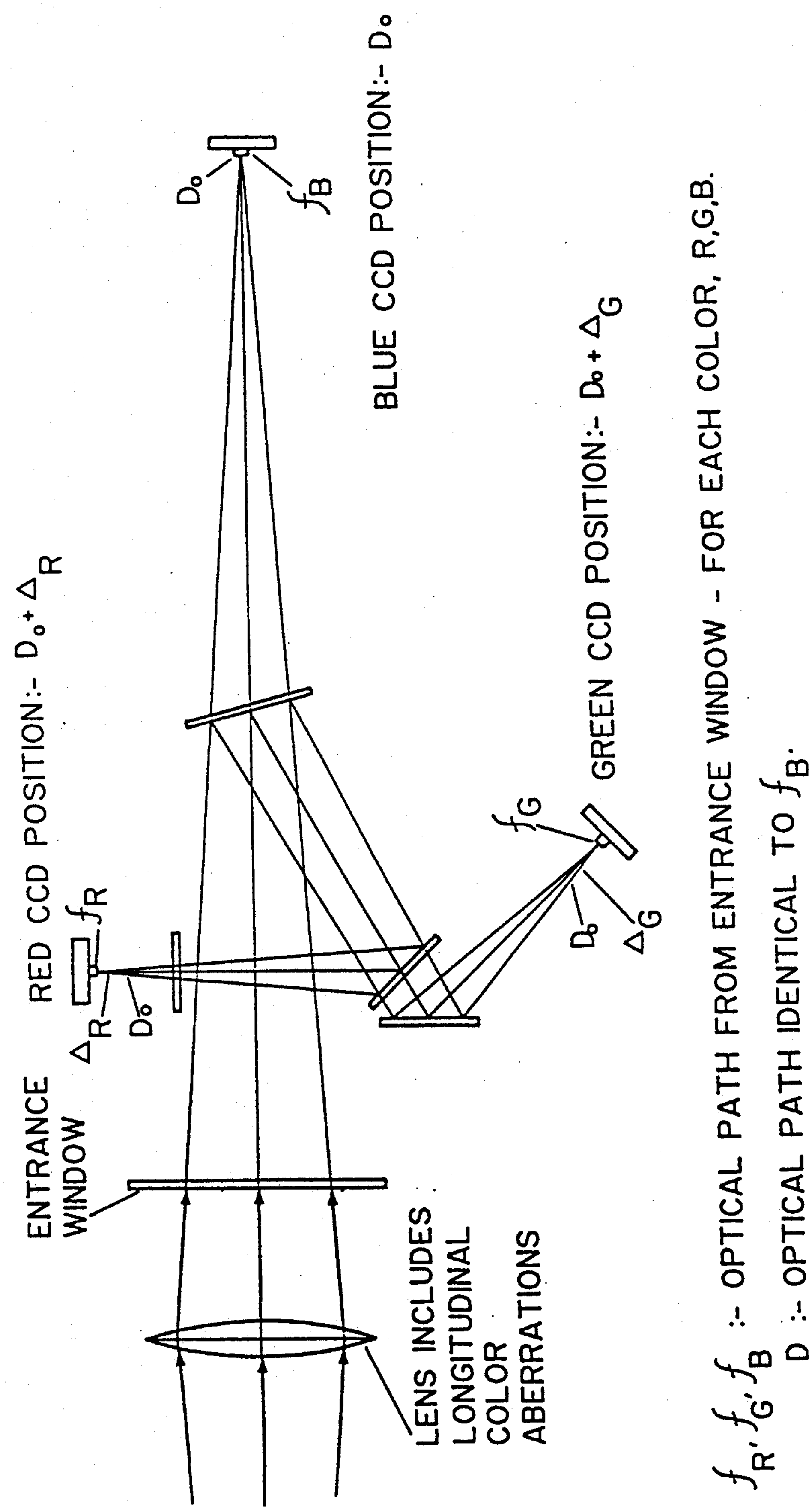
FIG. 25 illustrates an arrangement of CCD arrays to provide best focus in accordance with a preferred embodiment of the invention.

According to a preferred embodiment of the present invention, the CCD arrays are positioned in the optical head, as illustrated in FIG. 25 such that each CCD is positioned at the best focal plane for the color separation that it senses. Due to longitudinal color aberrations of the lenses, magnifications of the CCDs are not equal when they are each in the best focus. This is corrected by suitable electronic processing.

Figure 3B:
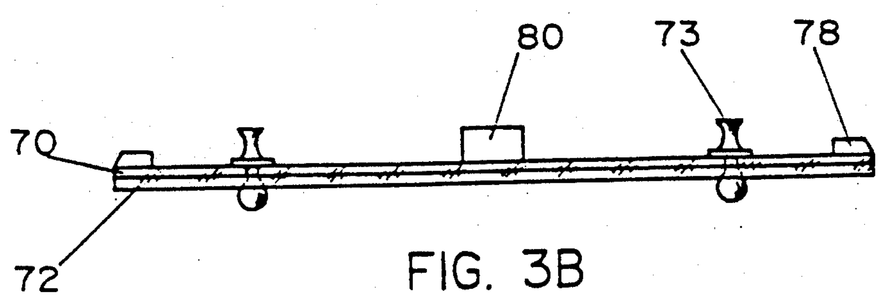
FIGS. 3A and 3B are respective plan and side view illustrations of a cassette useful in the apparatus of FIG. 1 for transmissive scanning.
Figure 3A:
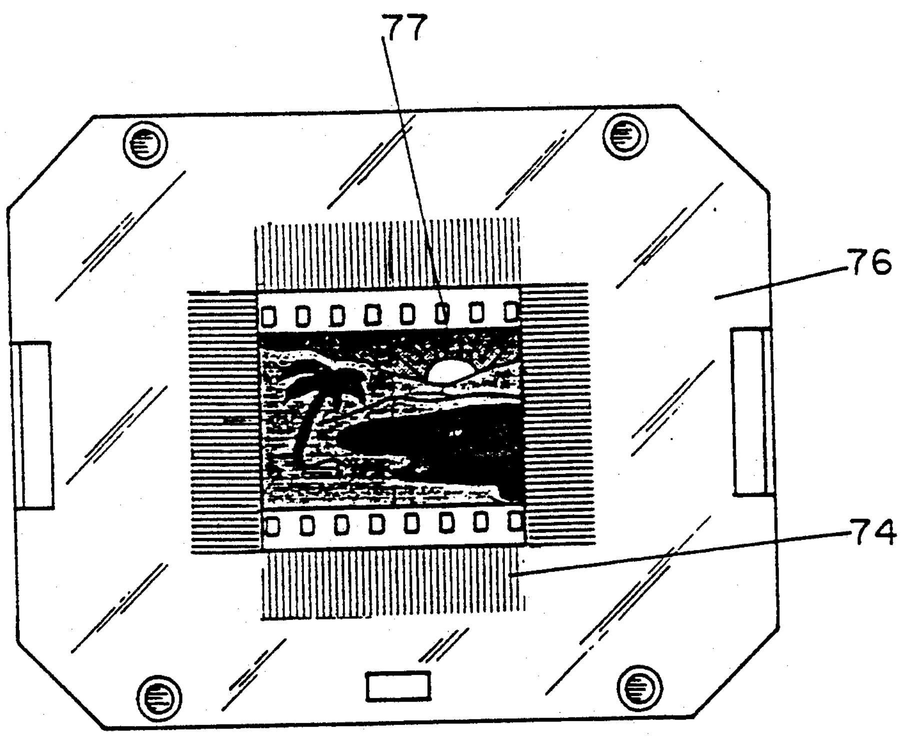

Reference is now made to FIGS. 3A and 3B, which illustrate a cassette 22 (FIG. 1), which is useful in conjunction with transparencies in accordance with a preferred embodiment of the present invention. The cassette 22 is typically formed of two planar pieces of glass 70 and 72, whose inner surfaces are roughened, as by etching, in such a way as not to diminish picture contrast but to eliminate Newton rings which would be created when transparencies are placed against non-etched glass. The foregoing technique eliminates the need for refraction index matching oil between the transparencies and the glass plates, as in conventional scanners.

The two pieces of glass are removably joined together by suitable fasteners 73, such as NYLATCH fasteners, and enclose a transparency sought to be scanned (not shown).

An inner opal mask 74, having a typical optical density of 0.6, is provided to obscure the area external of the film. The mask ensures that the brightest location will be within the transparency but nevertheless allows parts of the transparency which are covered by the mask to be viewed, so that reference points outside of the picture to be scanned can be seen.

An outer opaque black mask 76 is also provided in combination with opal mask 74 and arranged so as to define groups of alternating black and white patterns 77 adjacent the transparency. These patterns are employed for automatic focusing as will be described hereinbelow.

Mounting bars 78 are fixed onto glass 70 for secure mounting of the entire cassette onto cassette holder 20 (FIGS. 1A and 1B).

Figure 4B:
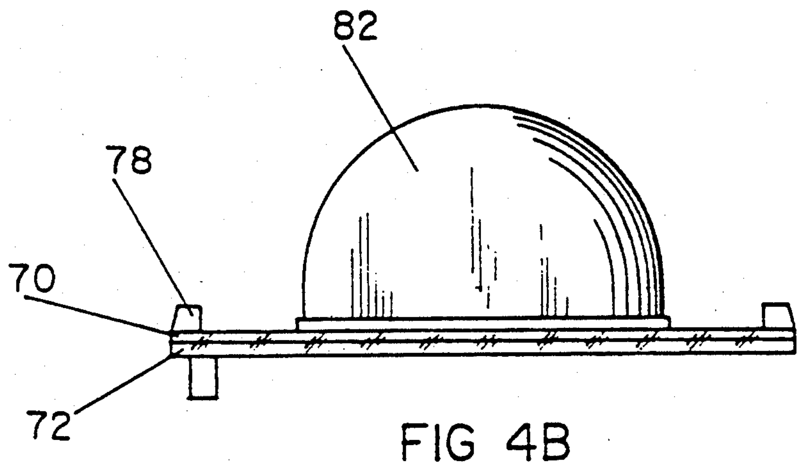
FIGS. 4A and 4B are respective plan and side view illustrations of an alternative embodiment of a cassette useful in the apparatus of FIG. 1 for reflective scanning.
Figure 4A:
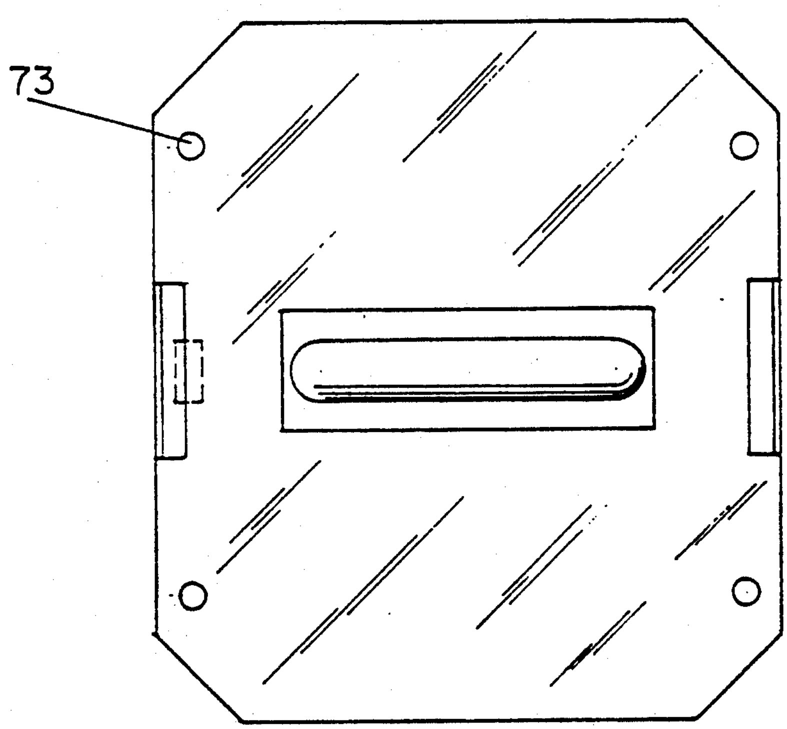

A bar code or other sensible code is typically provided onto an upstanding element 80 mounted onto glass 70 for identifying the input picture size. From this parameter and the operator defined desired output size, the scanner automatically calculates the desired lens 42 to be chosen and the desired location of carriage 30 and common member 44 so as to obtain the proper magnification and focus. Fine tuning of magnification and focus may be performed automatically as described hereinbelow:

Reference is now made to FIGS. 4A and 4B which illustrate a cassette suitable for use in reflection scanning. The cassette is generally similar to that described hereinabove in connection with FIGS. 3A and 3B. However it is arranged for illumination from below and thus is provided with a handle 82 arranged on the top glass piece thereof. For the sake of conciseness, the parts of the cassette which are similar to those of the cassette of FIGS. 3A and 3B are identified by the same reference numerals used therein without repeating the corresponding explanation.

In accordance with a preferred embodiment of the invention, fine tuning of optical magnification and focus is provided. The focusing pattern 77 (FIG. 3A) is optically sensed by means of a CCD array (typically the green array) or by the television camera, if television pre-scan is provided. Pixel counting across the known pattern size is employed in order to set a required magnification. Thereafter, common member 44 is positioned at a position at which optimal focus is achieved. The methods by which optimal focusing is achieved will be described below. When high precision is required in magnification setting, finding the optimal focus requires changing the magnification and therefore a second iteration of positioning of elements 30 and 44 might be required.

A number of alternative focusing techniques may be used within the framework of the invention for utilizing the focus pattern to attain the proper focus.

According to a first method, the focus pattern may employ transparent narrow slits arranged on an opaque black background. The slits are configured to be sufficiently narrow to define a gaussian shaped intensity distribution for each slit, as seen by the detector. The central intensity and width of the signal are highly dependent functions of the focus and are thus good focus parameters. By measuring either the central intensity or its width, the computer can find the focusing orientation where either the intensity is maximized or the width is minimized.

An interative process may be used to effect focusing with stepwise movements of the lenses in a direction parallel to the optical axes 15 and 19 (FIGS. 1A and 1B).

According to an alternative focusing method, the focusing pattern employs alternating black and white bars. Conventional digital methods are employed to detect the edges of the bars, as imaged on the detector.

According to a third focusing method, alternating black and white bars are employed as a focusing pattern. Data received from the detector is used to define a histogram. Sharpness of the peaks of the histogram is an indication of sharpness of focus. The sharpness of peaks may be evaluated by counting statistical populations or alternatively by calculating the standard deviation of the histogram. This technique is highly accurate.

It is a particular feature of all of the focusing techniques described hereinabove that the same detector may be used for providing automatic focusing and for actually scanning the picture.

Figure 16:
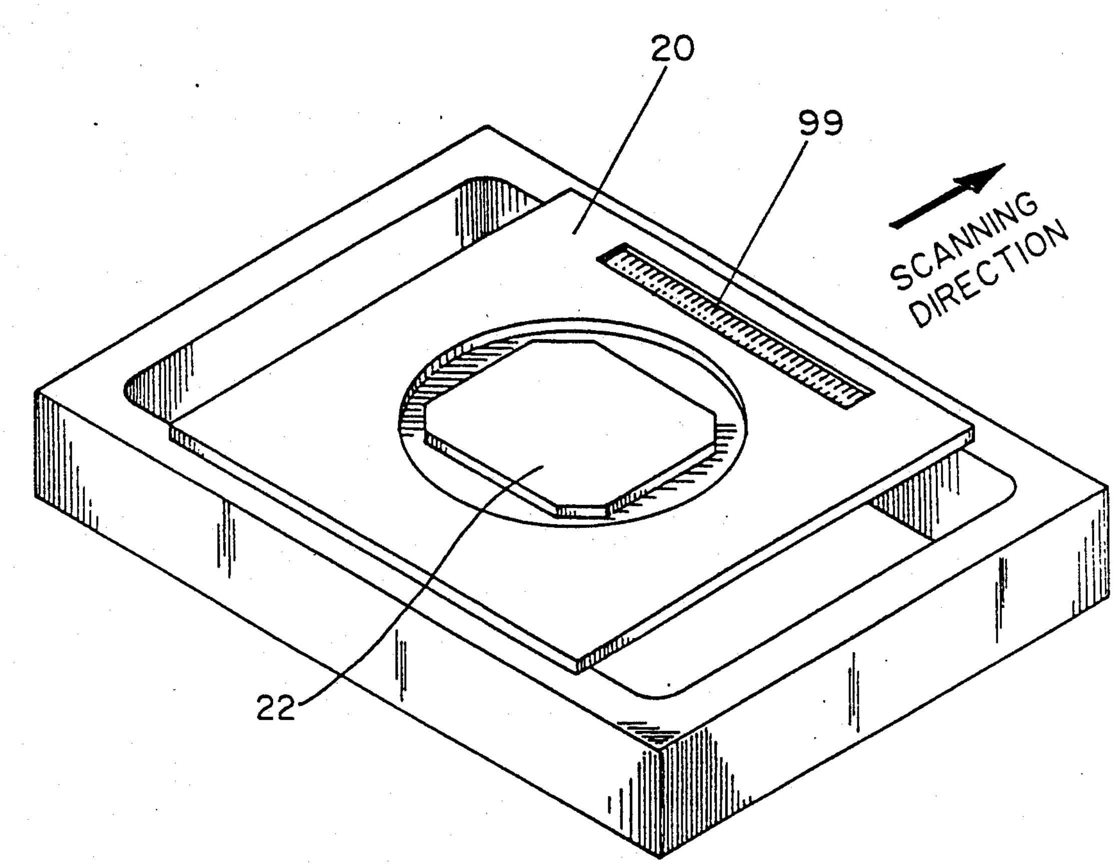
FIG. 16 is a pictorial illustration of a cassette holder having focusing and calibration patterns formed thereon.
Figure 17:
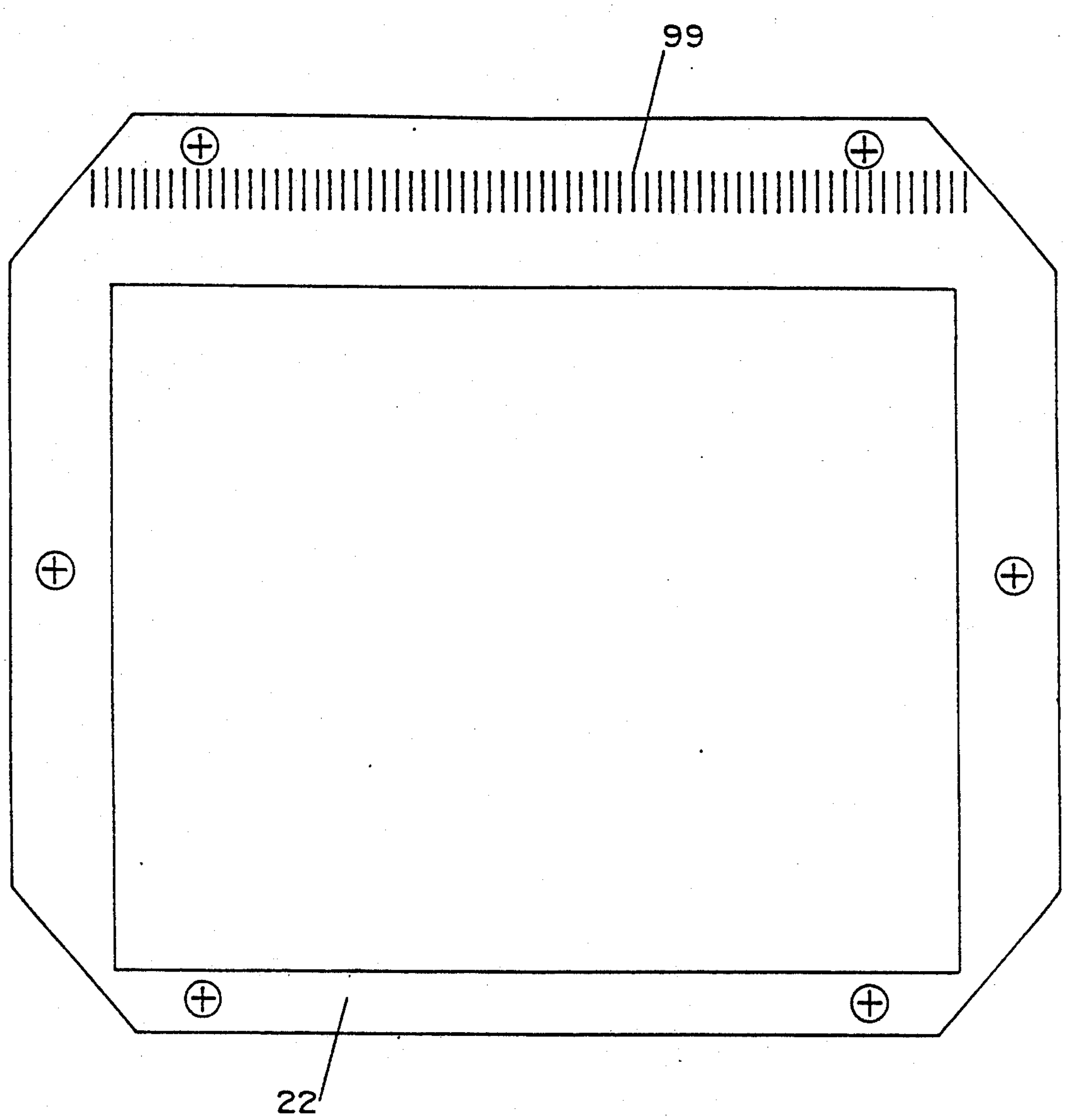
FIG. 17 is a plan view illustration of a cassette having focusing and calibration patterns formed thereon.

According to a preferred embodiment of the invention a focusing pattern and a calibration pattern, collectively indicated by reference numeral 99 may be formed on the cassette holder 20, as seen in FIG. 16. Alternatively the focusing pattern and the calibration pattern 99 may be formed on the cassette 22, as shown in FIG. 17.

The scanning technique will now be described briefly. When a new picture is sought to be scanned, it is first subject to prescan, whereby the television camera 14 (FIGS. 1A and 1B) provides at a suitable monitor (not shown) an image of the picture over the full screen. Alternatively, when television pre-scan is not employed, pre-scan is carried out using the CCD array scanning head 18.

The operative parameters of the pre-scan, such as focus, reflective or transmissive scanning, and nominal input size are initially set in response to reading of the bar code on upstanding element 80 (FIG. 3A).

The dynamic range of the CCD is determined by exposure control of the CCD's. This is achieved by providing motor control of the irises of the lenses 42 and governing the integration time of the CCDs. In practice, the analog amplification is calibrated so that the saturation of the CCDs occurs at a given voltage which is transformed to digital information and read by the computer. This reading enables the computer to decide how to operate the iris and how to set the exposure time.

The scanning sequence is generally as follows:

A first prescan is initiated by placing a loaded cassette in the cassette holder 20. The cassette code is read and the scanner is set to prescan the input picture. Prior to this prescan, however, the CCD arrays are exposed to the light source output of the light guides and the iris openings and the integration times of the CCD arrays are adjusted for full dynamic range. The light source is then masked to provide calibration of the darkness with the same integration time to produce dark correction information. Thereafter, an intermediate light density is provided for calibration of responsivity of individual CCD cells.

Prescan is then performed and the picture is displayed on a monitor to the operator. The brightness of the brightest point is retained in memory.

A second prescan is then carried out if needed, incorporating operator's requests, such as crop lines, rotations and lateral shifts. Responsivity and dark signal calibrations are then carried out to provide a responsivity correction file which is independent of integration time. A new integration time is then calculated taking into account the brightest picture level measured previously in order to stretch this level to the maximum dynamic range of the detector. Dark signal calibrations are then carried out again on the basis of the new integration time.

The image of the picture seen on the screen after a pre-scan is in low resolution so that it is impossible to judge its sharpness. Using a cursor operated by a mouse, a point on the screen can then be selected around which a second prescan can be carried out so that the image will now appear with full resolution and its sharpness can be evaluated.

Figure 15A:
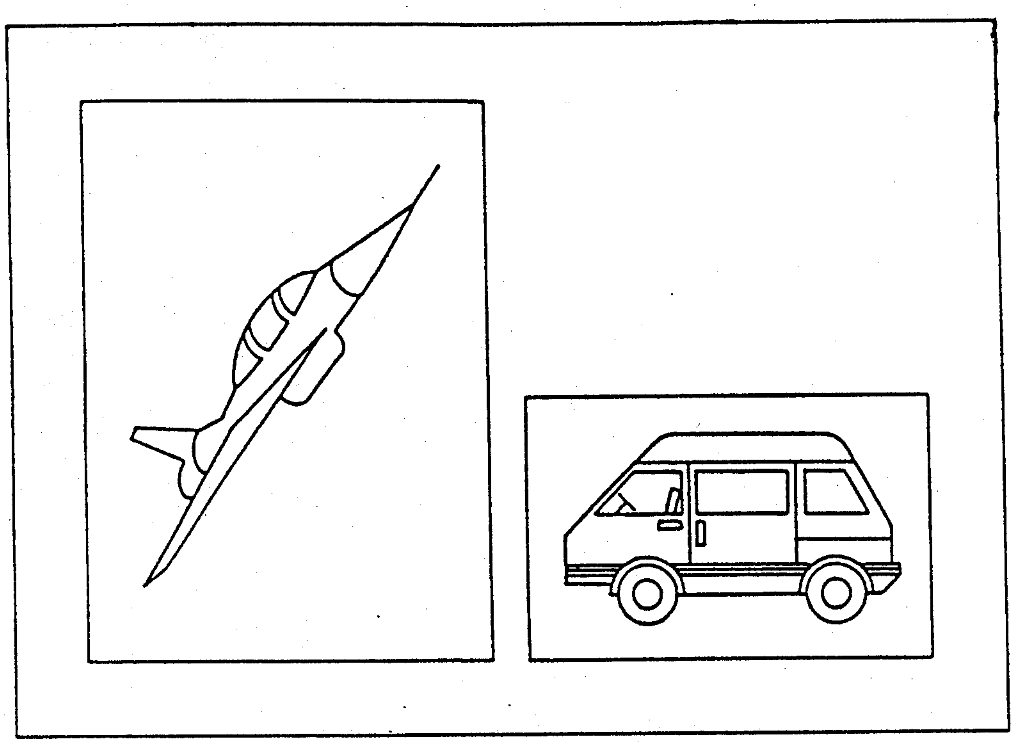
FIGS. 15A and 15B are illustrations of a scan into layout function provided in accordance with a preferred embodiment of the invention.
Figure 15B:
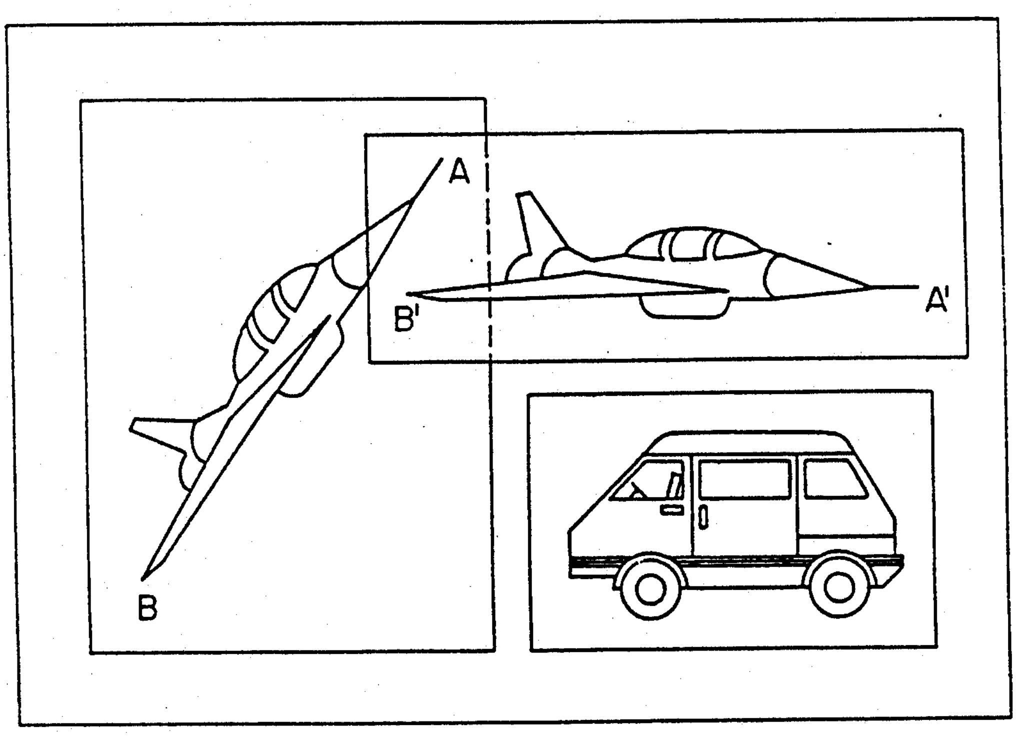

Additionally in accordance with a preferred embodiment of the invention there is provided a method for fitting a picture into a layout of a page during scanning, whereby the picture may be moved, rotated, enlarged or reduced while it is being scanned so that it will fit precisely in a desired location in the scanned layout. The method preferably comprises the steps of:

scanning a picture and displaying it to an operator on a TV screen;

displaying the page layout on the screen so that it is viewed with markings such as thin lines at the top of the picture (FIG. 15A);

using a tablet and a mouse, or similar apparatus, marking two points on the displayed picture and two corresponding points on the layout where the two picture points are to fit; and performing computer computations of the geometrical parameters so as to rescan the picture according to those parameters (FIG. 15B).

The layout can be fed into the host computer either before or during the above procedure, either by scanning a layout drawing or by receiving it from another work station.

As an alternative to displaying the entire layout on the screen, it is possible to supply to the computer coordinates of the two points by using a tablet for the layout drawing and pointing with a mouse or similar apparatus.

Figure 5:
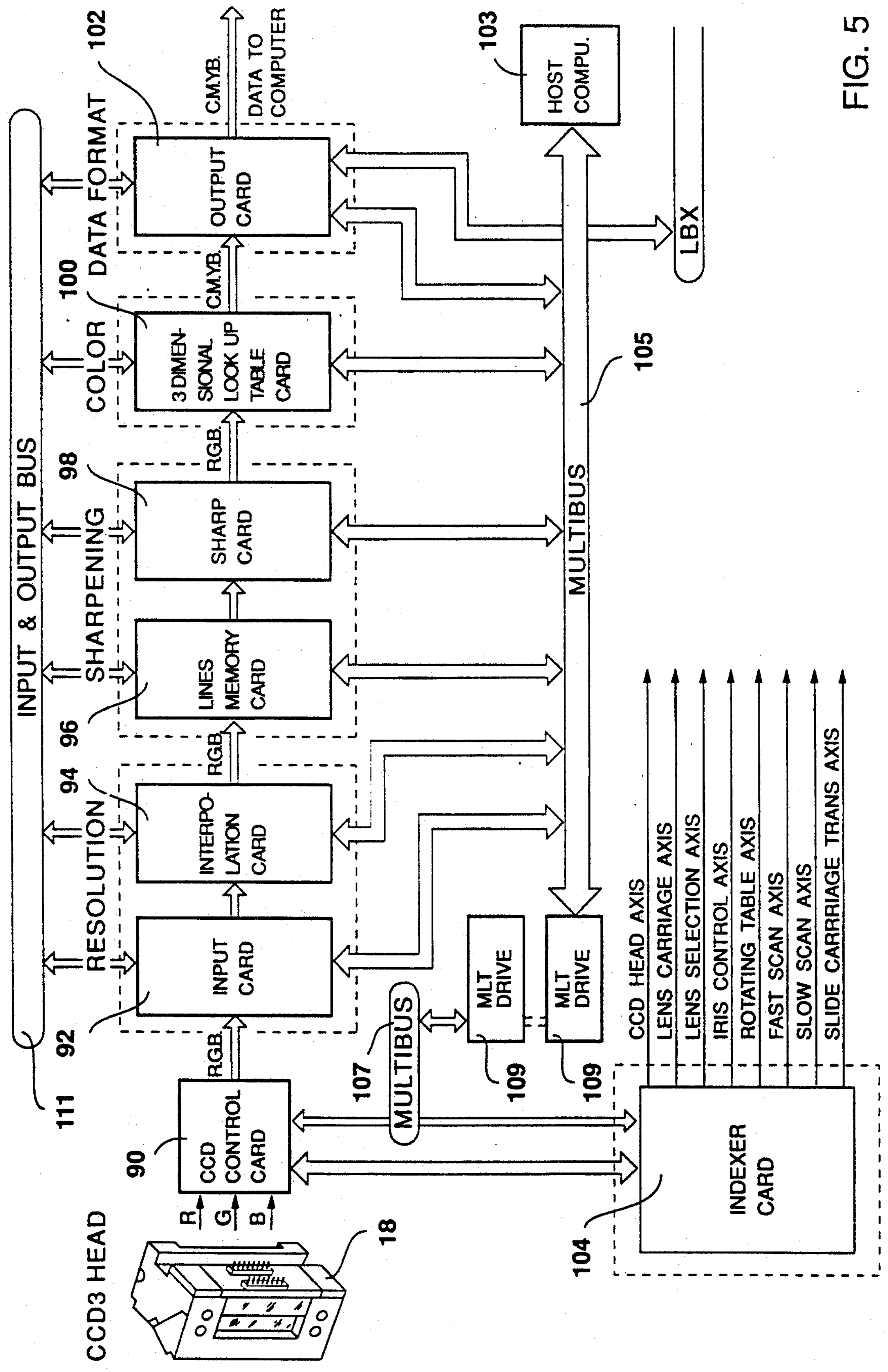
FIG. 5 is an electronic block diagram of the electronic features of the color separation scanner of the present invention.

FIG. 5 shows an electronic block diagram of the electronic features of the present invention. The color separation scanning head 18 (FIG. 1) provides Red, Green and Blue color separation outputs to and otherwise interfaces with a CCD control card 90. CCD control card 90 provides Red, Green and Blue color separation outputs to resolution determination circuitry including an input card 92 which in turn outputs to an interpolation card 94.

The output of resolution determination circuitry, in the form of Red, Green and Blue color separation signals, is supplied to adaptive sharpening circuitry including a lines memory card 96, which outputs to a sharpening card 98. The output of sharpening card 98, in the form of Red, Green and Blue color separation signals, is supplied to color determination circuitry including a 3 dimensional look up-table card 100.

The output of three dimensional look-up table card 100 is supplied as Cyan, Magenta, Yellow, and Black color separation signals to data format circuitry, including an output card 102. Data format output card 102 provides the Cyan, Magenta, Yellow and Black color separation signals in required format to a host computer 103 for storage and further processing. The host computer 103, which stores the Cyan, Magenta, Yellow and Black color separation signals is outside of the scope of the present invention, and is typically a computer based on an Intel 80286, such as a Scitex SOFTPROOF work station manufactured by Scitex Corporation Ltd. of Herzlia, Israel.

An indexer card 104 interfaces with CCD control card 90 for control purposes and provides a plurality of control outputs, indicated in FIG. 5.

Each of the above described cards 92–102 is connected to a multibus 105. CCD control card 90 and indexer card 104 are each connected to a multibus 107. Multibusses 105 and 107 are interconnected via MLT driver circuits 109, associated with each multibus. Each of cards 92–102 is connected additionally to an input and output bus 111, which provides communication between the various cards. Output card 102 may additionally be connected to an LBX bus for communication with an external computer.

Figure 6:
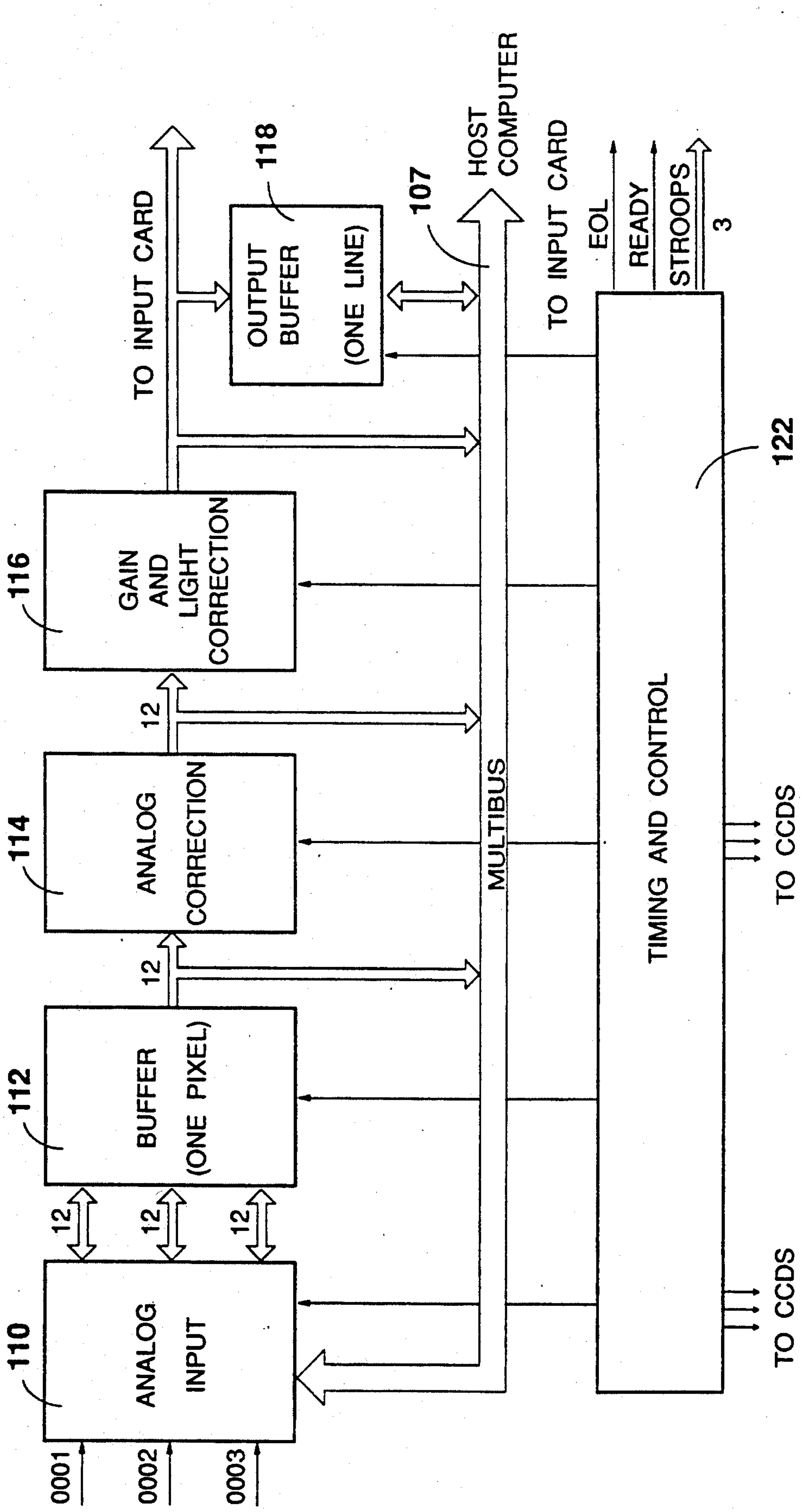
FIG. 6 is a simplified block diagram of the CCD control card employed in the apparatus of FIG. 5.
Figures 1, 7:
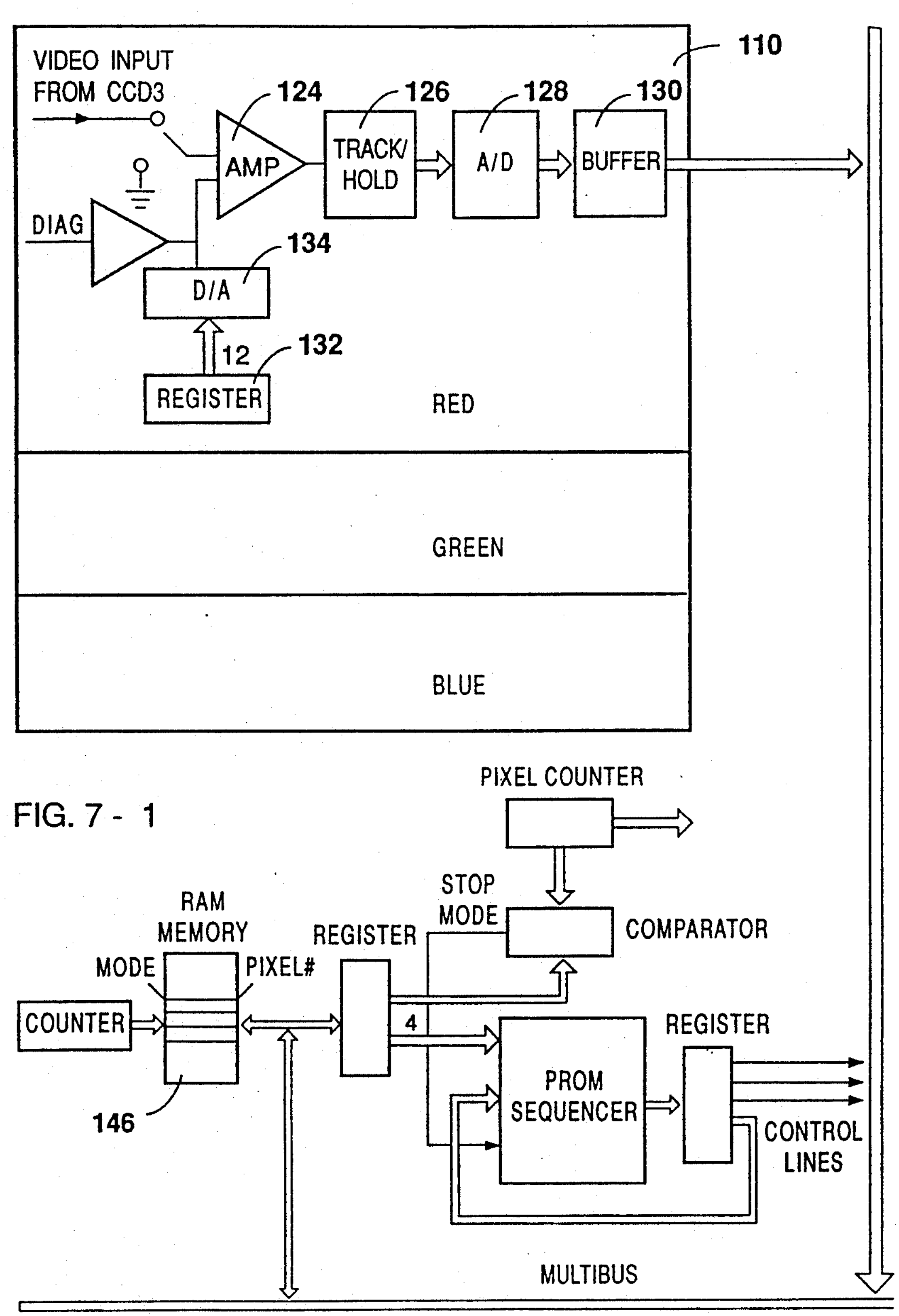
FIG. 7 is a detailed block diagram of the CCD control card employed in the apparatus of FIG. 5.
Figures 2, 7:
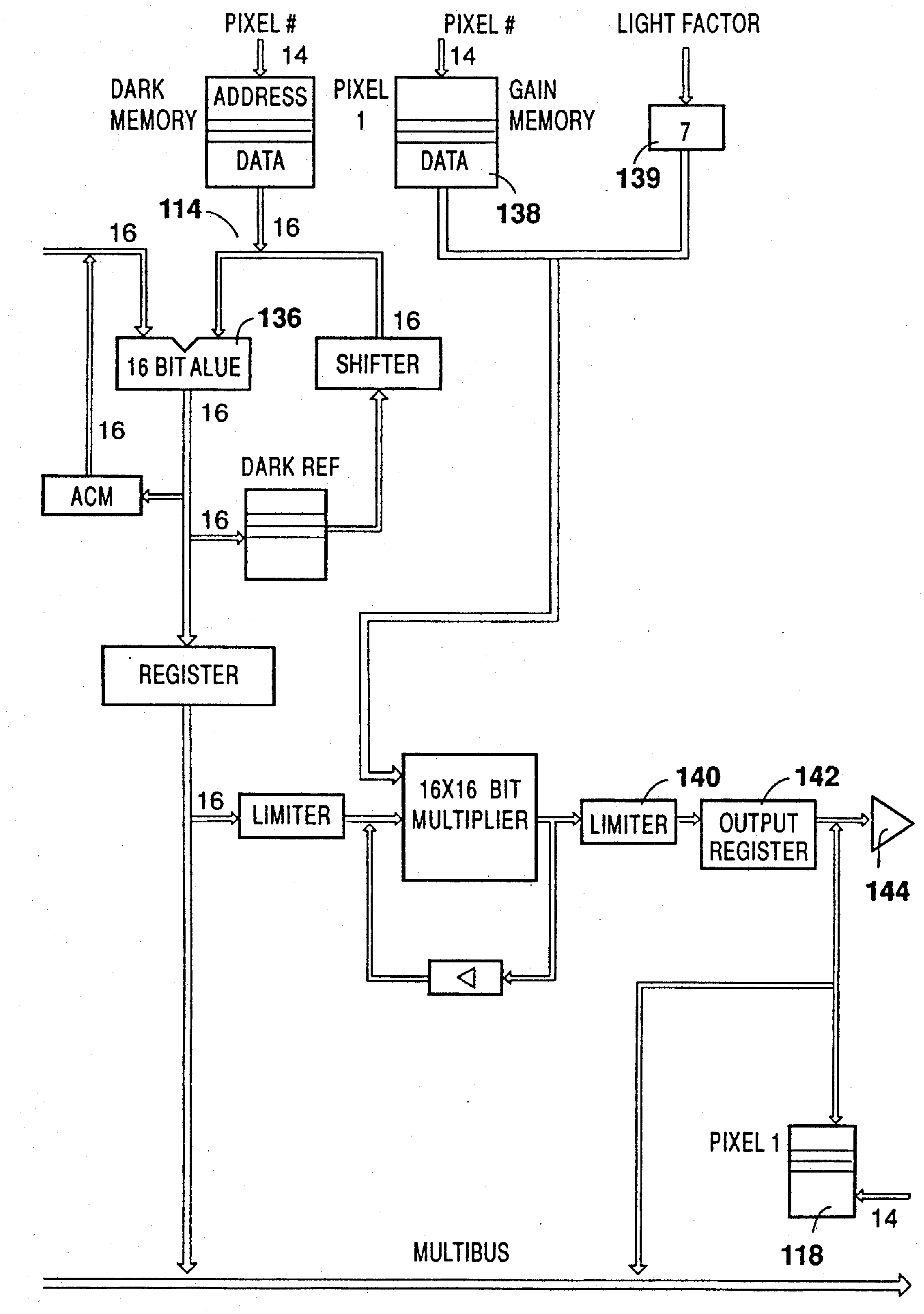
Figures 1, 8A:
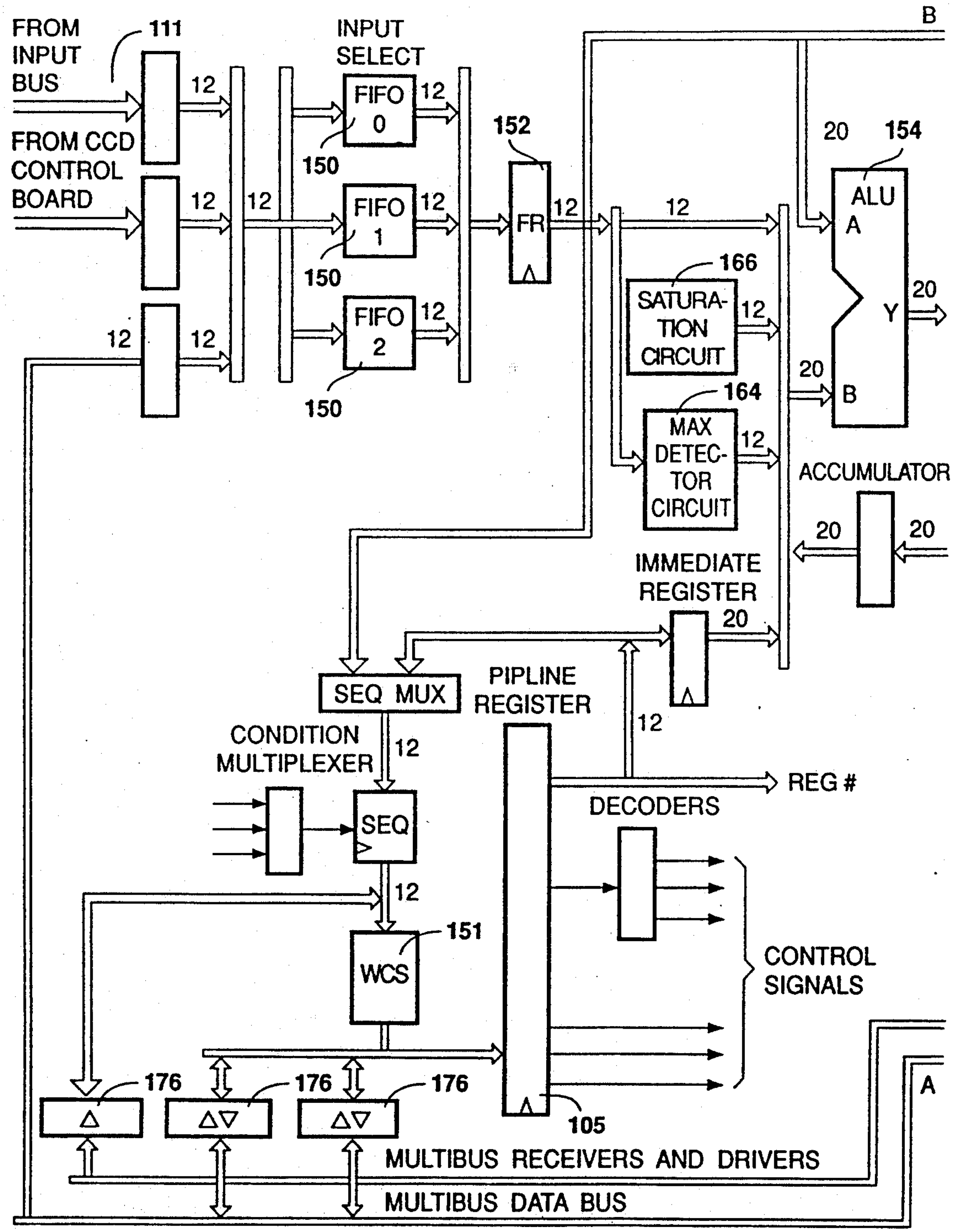
FIGS. 8A, 8B, 8C, 8D, 8E and 8F are together a detailed block diagram of the input card and the interpolation card employed in the apparatus of FIG. 5.
Figures 2, 8A:
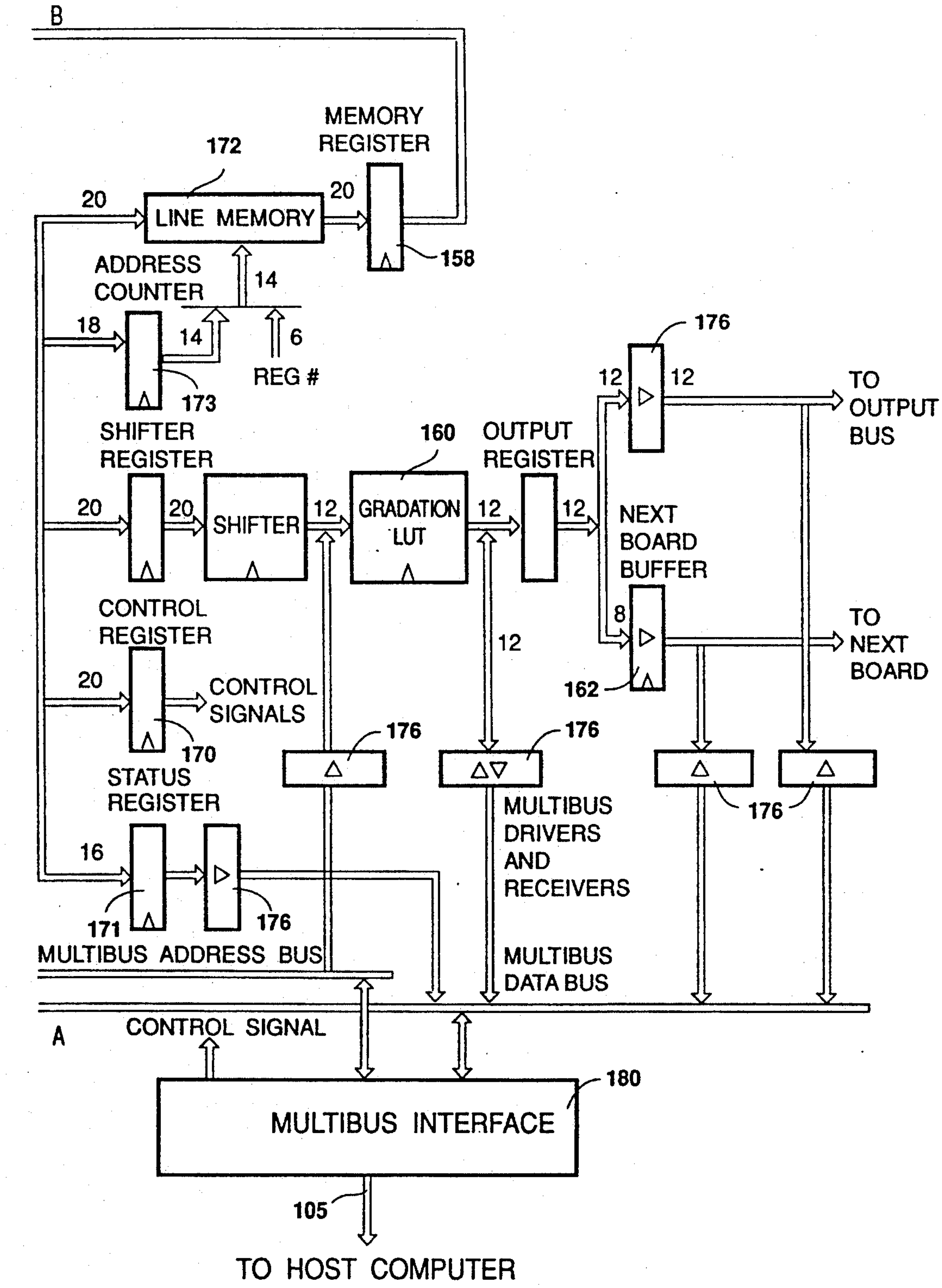
Figure 8B:
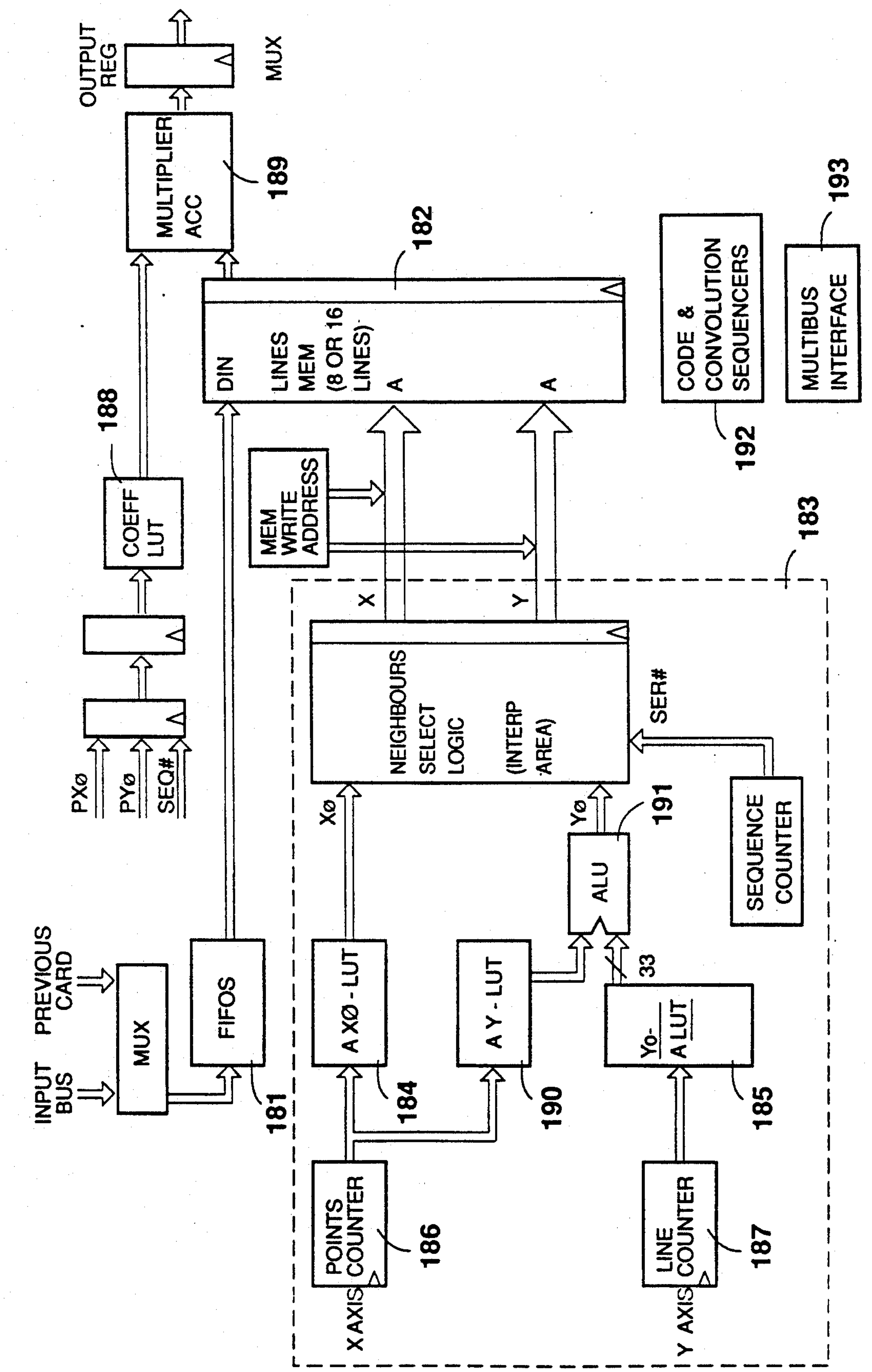
Figure 8C:
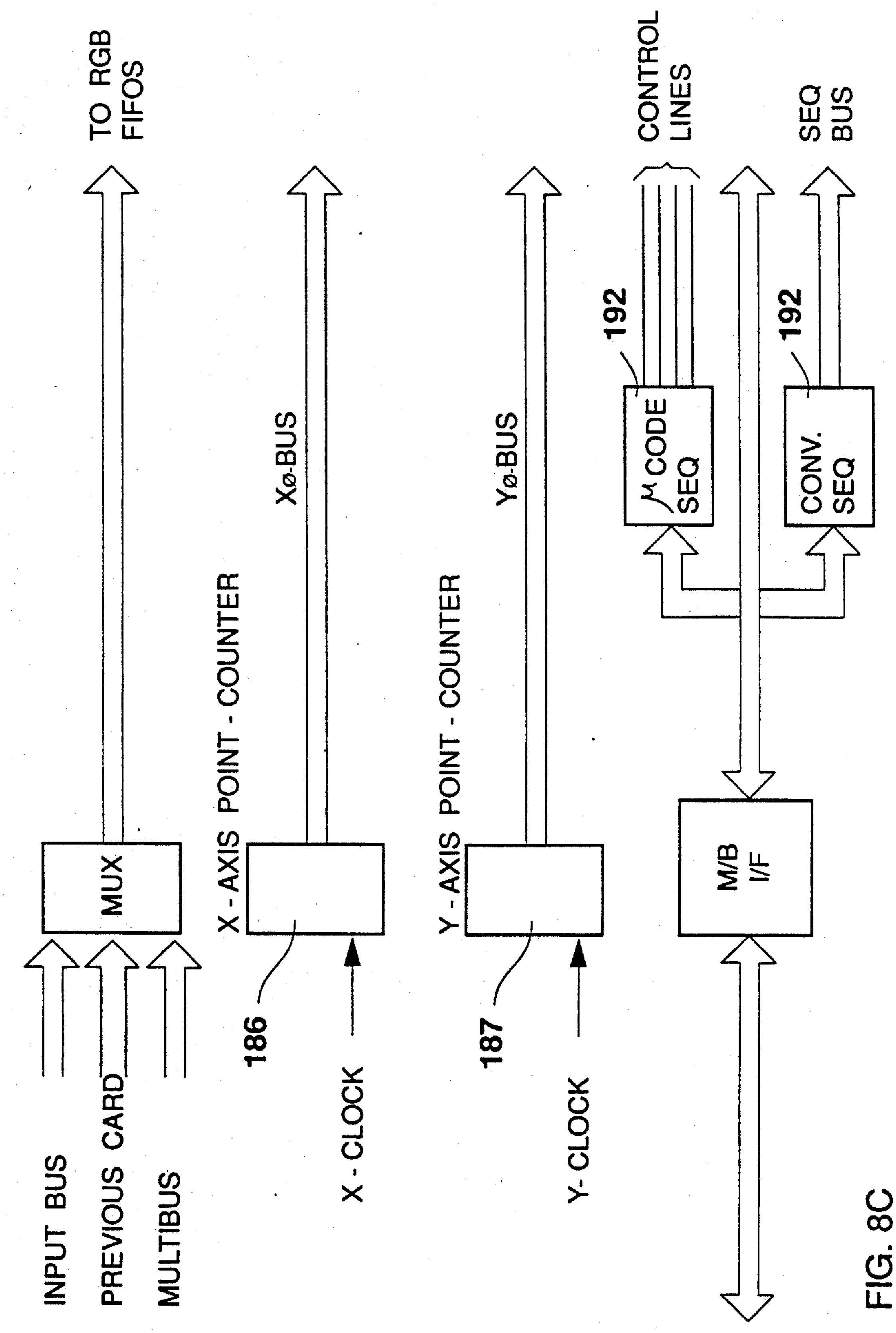
Figure 8D:
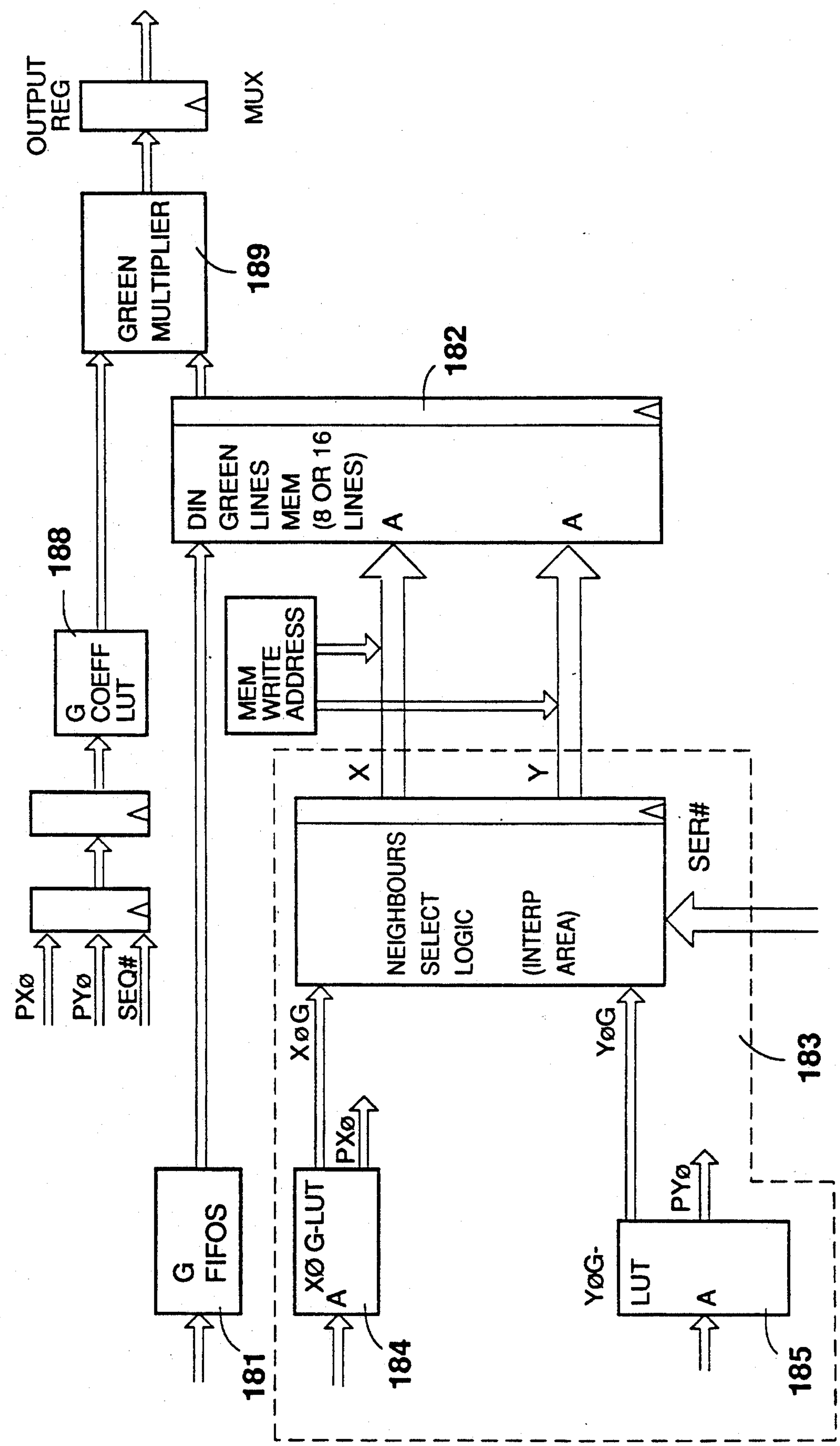
Figure 8E:
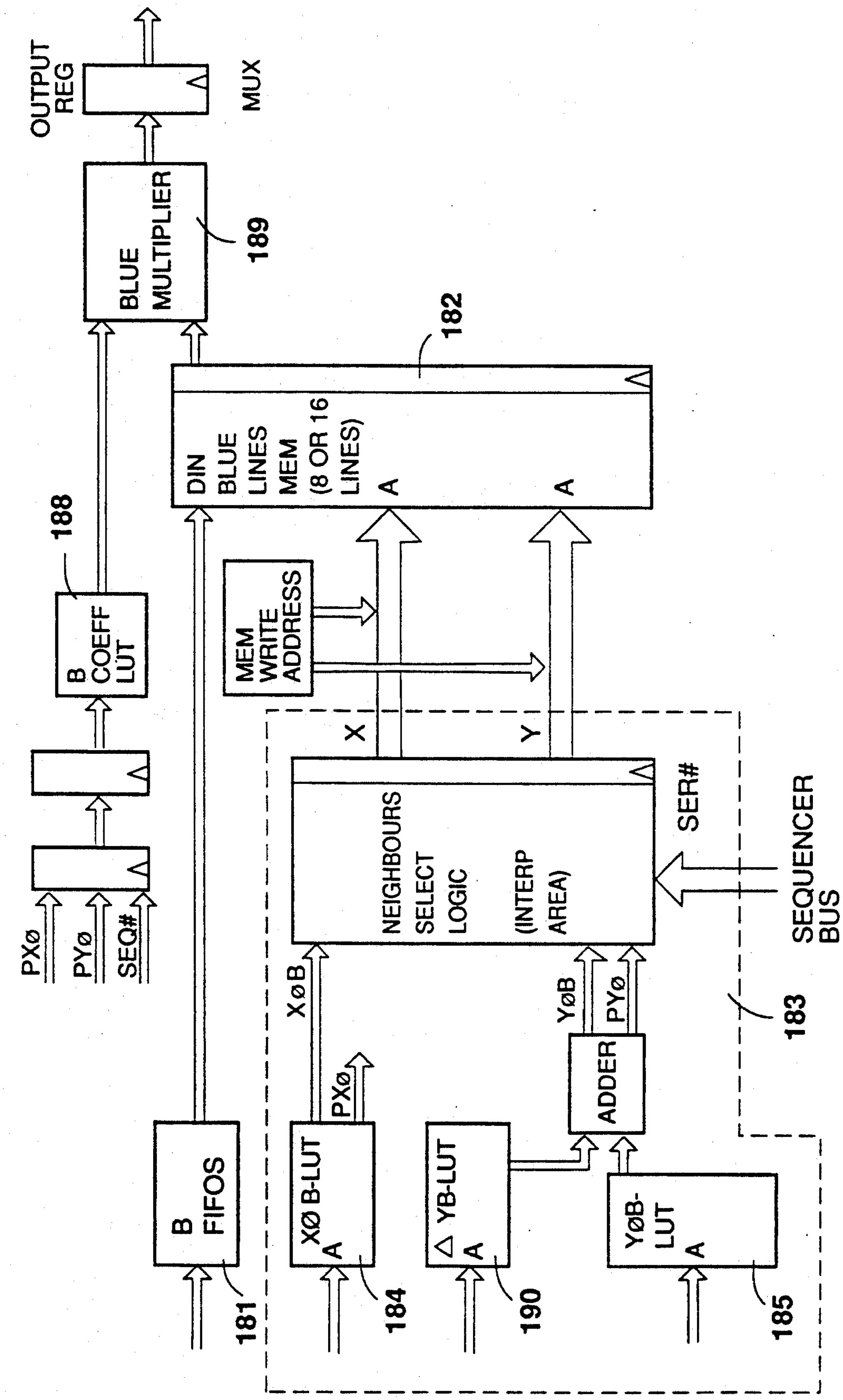
Figure 8F:
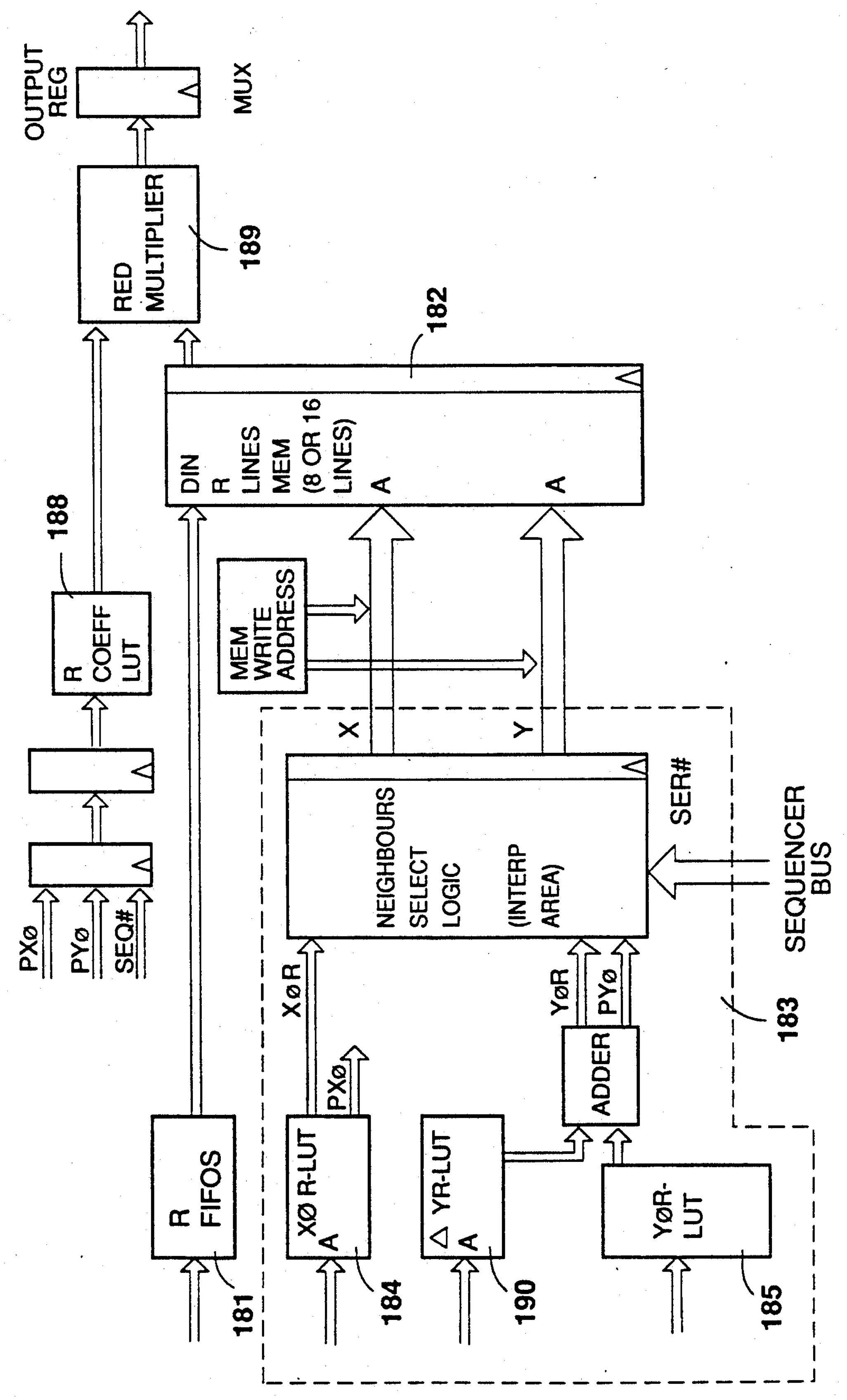

CCD control card 90 is illustrated in simplified block diagram form in FIG. 6 and in more detailed block diagram form in FIG. 7. It is seen that the CCD control card 90 includes analog input circuitry 110, which receives three video inputs from the Red, Green, and Blue CCD arrays, and converts each of them into a 12 bit digital value.

The outputs from the analog input circuitry 110 are supplied to a one pixel buffer 112, which outputs to a dark correction circuitry 114. The output of dark correction circuitry 114 is supplied to a gain and light correction circuitry 116, which in turn outputs to input card 92 (FIG. 5). An output buffer 118, having a one line capacity, also receives an output from gain and light correction circuitry 116 and outputs to multibus 107. A timing and control circuitry 122 provides timing and control outputs to the various circuit elements of the circuitry of FIG. 6 and also to the CCD arrays.

The outputs from the CCD array are corrected in the CCD Control card 90 for dark and gain offsets caused by the non-uniformity of the CCD arrays. Due to the fact that the individual cells in each CCD have different responses to identical lighting conditions and are also plagued by different dark charge generation characteristics, it is necessary to measure the response of each CCD cell in each array, calculate an average response for all cells, and then apply a correction factor to each cell in order for the total array to provide a uniform response. This correction is carried out under both dark and light conditions as follows:

a. A scan of all the cells in the CCD arrays is carried out in total darkness and the output is sent via multibusses 107 and 105 to the host computer 103. The host computer measures the offset value of each cell, calculates a correction factor for that cell based upon the average response of all the cells, and then sends an offset value to the dark correction circuitry 114 to be applied to each cell as its output is read during normal scanning.

b. The same procedure is carried out again, but this time the CCD arrays are exposed to a light source at an intensity half of the normal operating value. The computer measures the offset value of each cell, calculates a correction factor for that cell based upon the average response of all the cells, and then transmits an offset value to the gain and light correction circuitry 116 to be applied to each cell as its output is read during normal scanning.

Reference is now made additionally to FIG. 7, which is a detailed block diagram of the CCD control card 90 of FIG. 6. It is seen that the RGB signals from the CCD arrays are fed into 3 identical circuits, one each for the Red, Blue and Green channels. Each circuit comprises an input operational amplifier 124, a track and hold sampling circuit 126 and a A/D converter 128.

The operational amplifier 124 in each circuit buffers and conditions the input stream from the CCD array and feeds the output to track and hold sampling circuit 126 which holds the information at a steady state, long enough for it to be processed by the A/D converter 128 directly following. The information is then stored in a buffer 130 where it is analyzed by the host computer 103, and corrected for differences in the response of individual cells to light and dark.

An offset value, provided by the host computer 103, is loaded into a register 132 and processed by a bias D/A converter 134 to provide a DC offset voltage to the input of the operational amplifier 124. This offset is equal to and offsets the operating voltage that drives the CCD array and enables the operational amplifier to measure only the differential voltage at its inputs, corresponding to the output charges of the cells of the CCD arrays.

The input A/D converter 128 of analog input circuitry 110, converts the input stream into 4096 gray levels (12-bit data) and transfers it via buffer 130 to a 16-bit ALU 136, forming part of dark correction circuitry 114 (FIG. 6), which performs dark correction to the original input stream.

The one pixel buffer 112 between analog input unit 110 and dark correction circuit 114 (FIG. 6) is in fact embodied in three buffers 130, each of which holds a single pixel of R, G, and B information in a steady state for processing by the dark correction circuitry 114.

Dark correction circuit 114 compensates for differences between the cells of the CCD arrays under dark (absence of light) conditions. During scanning, the host computer loads the dark correction table, calculated during the set-up period of the scanner, into dark memory and the 16-bit ALU 136 adds the offset to each pixel as it is received. The corrected information is transferred to this gain correction circuit for further processing.

Gain and light correction circuit 116 compensates for the uneven distribution of the light source in space and over time and the difference in response between individual CCD cells to the light source. Temporal light factor calibration circuitry 139 provides a calibration factor to correct the gain pixel data for any changes of the light source intensity over time.

During scanning, the host computer loads the pixel offset table, calculated during the set-up period of the scanner, into a gain memory 138. The data stream arriving from analog input circuit 110 is multiplied with the data stored in the gain memory and the resultant corrected signal is transferred via a limiter 140 and output register 142 to one line output buffer 118 (FIG. 6) and a driver 144.

Output buffer 118 is a single line buffer that receives the corrected information from the CCD arrays and transfers it to the host computer 103 via multibusses 107 and 105. The buffer also allows the host computer to access the information directly, before it reaches the input card 92 for diagnostic purposes or processing by various types of computers. The CCD calibration information is also transferred to the input card 92 for further processing by the scanner circuitry in cards 92–102.

Timing and control of the CCD arrays and of the circuitry in CCD control card 90 is performed by timing and control circuitry 122 (FIG. 6), controlled by the host computer software.

A bit map containing the addresses of dead cells, semiresponsive cells, light and dark cells in the CCD arrays is loaded by the host computer 103 into a RAM memory 146 in the timing and control circuitry 122. Circuitry 122 in turn acts upon the bit map in the RAM 146 and selects the correct cells for set-up and scanning.

The timing and control circuitry 122 also employs the bit map to provide the control and timing signals to the indexer card 104 (FIG. 5) to position the optical scanning head in the correct place for each scanning line. A control signal from the indexer card informs the host computer 103 when a line has been scanned and that data can be read.

Reference is now made to FIGS. 8A–8F, which together provide a detailed block diagram of input card 92 and interpolation card 94 of FIG. 5. Picture reduction in the scanner is first carried out by the lenses in the optical path and is limited to the type of lens used. Further reduction is carried out electronically by input card 92 and interpolation card 94 as follows:

Pixel data arriving from the CCD control card 90 is averaged by a factor of $2^n \times 2^m$ in both the x- and y-directions.

When the first pixel arrives from the CCD control card 90 it is buffered and loaded into an input select FIFO circuitry 150. A FIFO circuit is provided for each of the Red, Blue and Green channels. The value of the pixel is then written by a Writable Control Storage (WCS) element 151 into a FIFO register 152.

A microprogram in the WCS 151 strobes the first input pixel from the FIFO register 152 via an ALU 154 to a lines memory 172. The pixel then waits for the next input pixel to be available at the output of the corresponding FIFO. When the pixel becomes available, the microprogram reads it from the FIFO register 152 and sends it to the ALU 154.

At the same time, the first pixel is moved via a memory register 158 back into the ALU 154, where it is accumulated with the second pixel and then sent back to the lines memory 172. This process is repeated until the number of pixels determined by a preselected reduction factor is reached. The process is repeated again for each group of pixels until the end of the line is reached.

A gradation look-up table (LUT) 160 applies gray scale correction to the data stream according to a table downloaded from the host computer 103. The corrected information is then transferred via a next card buffer 162 to another card in the system via the output bus 111.

A microprogram downloaded from the host computer 103 into the WCS 151 controls the operation and timing of input card 92.

Two circuits, a maximum detector 164 and a saturation detector 166, are located between the FIFO register 152 and the ALU 154 and are operative to measure the maximum value of the input pixels and to count how many pixels reached a predetermined saturation level. Those two circuits are not able to differentiate between R, G, and B pixels and are operative to provide a value for either single line or a whole picture. The information derived is for set up purposes only and is not used during normal scanning.

A control register 170 provides an end of line signal, as well as control and clear signals to the saturation and maximum detector circuits 166 and 164 respectively, and to memory address counters 173.

A status register 171 provides the host computer with status information on an interrupt basis.

Each input or output on the input card 92 is connected to multibus 105 via a driver/receiver 176 and allows the host computer to load or read each input or output independently for diagnostic purposes.

For example, a buffer between multibus 105 at the host computer 103 and input FIFO circuits 150 allows data from the host computer to be loaded into the FIFOs for diagnostic purposes. This means that diagnostics can take place without the scanner CCD control card 90 being connected.

A multibus interface 180 arbitrates between the multibus 105 in the host computer 103 and the input card 92. For example, it accepts control data from the host computer and selects the source of the input data. Data may be fed to the input card from three sources: from the CCD Control card 92, from the multibus 105 directly, or from the input bus 111. Control data such as data for magnification, shift, gradation, and WCS microprograms from the host computer are also handled by the multibus interface 180.

The interpolation card 94 performs double functions. One is to correct the optical/mechanical misalignment of the Red, Green, and Blue (RGB) image data separations, and the second is to provide coarse adjustment of image size using electronic interpolation techniques.

The above two operations are performed by interpolating new pixel values from data of neighboring pixels using a two-dimensional convolution technique. Hence, operations can be combined into a single operation to provide the desired result. This is achieved using mathematical preparation algorithms to load look-up tables (LUT) used throughout the image processing.

The first preparation step defines the misregistration of the Red and Blue data with respect to the Green data (which is defined as the reference separation). Since the misregistration occurs on the X axis of the scanner and is unchanged along the Y axis (the scanning axis), mapping is required along that axis only. The second preparation step determines the amount of coarse image adjustment which defines the weight of each of the neighboring pixels. Once the above two operations have been completed, information is loaded into the appropriate LUTs.

Referring to the block diagram of FIGS. 8B–8F, it is seen that interpolation card 94 contains input FIFO's 181 for each of the RGB data separations, all of which are fed from the input card 92 by means of multiplexed data transfer techniques. From the input FIFOs 181, data is loaded into the line buffer memory 182 which typically contains eight lines (extendible to 16 lines) for each one of the RGB separations.

An interpolation processor 183 for each separation calculates the exact corner point location (with an accuracy of 1/16 of a pixel) of the interpolated area matrix. This is carried out differently for the Green separation as compared with the Red and Blue separations because the Green separation does not undergo misalignment corrections, in view of the fact that it serves as the reference.

For the Green separation, the corner point coordinates are taken directly from X0 and Y0 LUTs 184 and 185 respectively, which are addressed by the X axis point counter 186 and the Y axis line counter 187, to determine the corrected address of the corner pixel within the line memory 182.

The fraction portion of the location being interpolated (PX0, PY0) is used to address coefficient LUTs 188 which provide a multiplier 189 with the appropriate weight for every individual pixel used in the convolution matrix. The sum of all the multiplications of the convolved area is the final corrected pixel which is then multiplexed outside the interpolation card via output bus 111.

Registration of the Red and the Blue separations with respect to the Green separation is achieved by the provision of a delta y LUT 190 and an ALU 191 for each of the Red and Blue separations. This enables fine correction along the Y axis which is calculated in real time during interpolation along the X axis (i.e. the CCD pixel axis).

Sequencers 192 are provided to control the operation of the interpolation cards. One of the sequencers 192, termed the micro-code sequencer, controls the overall operation of the interpolation card and the writing operation into the appropriate line memory 182. A second sequencer 192, termed the convolution sequencer, controls only the calculation operation needed for convolution.

A multibus interface 193 provides coordination between the interpolation card buses and the host computer 103 before and after interpolation process and can also be used for diagnostic purposes.

The sharpening circuitry typically comprises two cards, lines memory card 96 and sharpening card 98.

The sharpening card 98 performs all the picture sharpening mathematical functions on data received from the input card 92 or interpolation card 94. The lines memory card 96 supplies the sharpening card 98 with the intensity value of the central pixel being operated on and with a matrix of intensity values of neighboring pixels.

Figure 9:
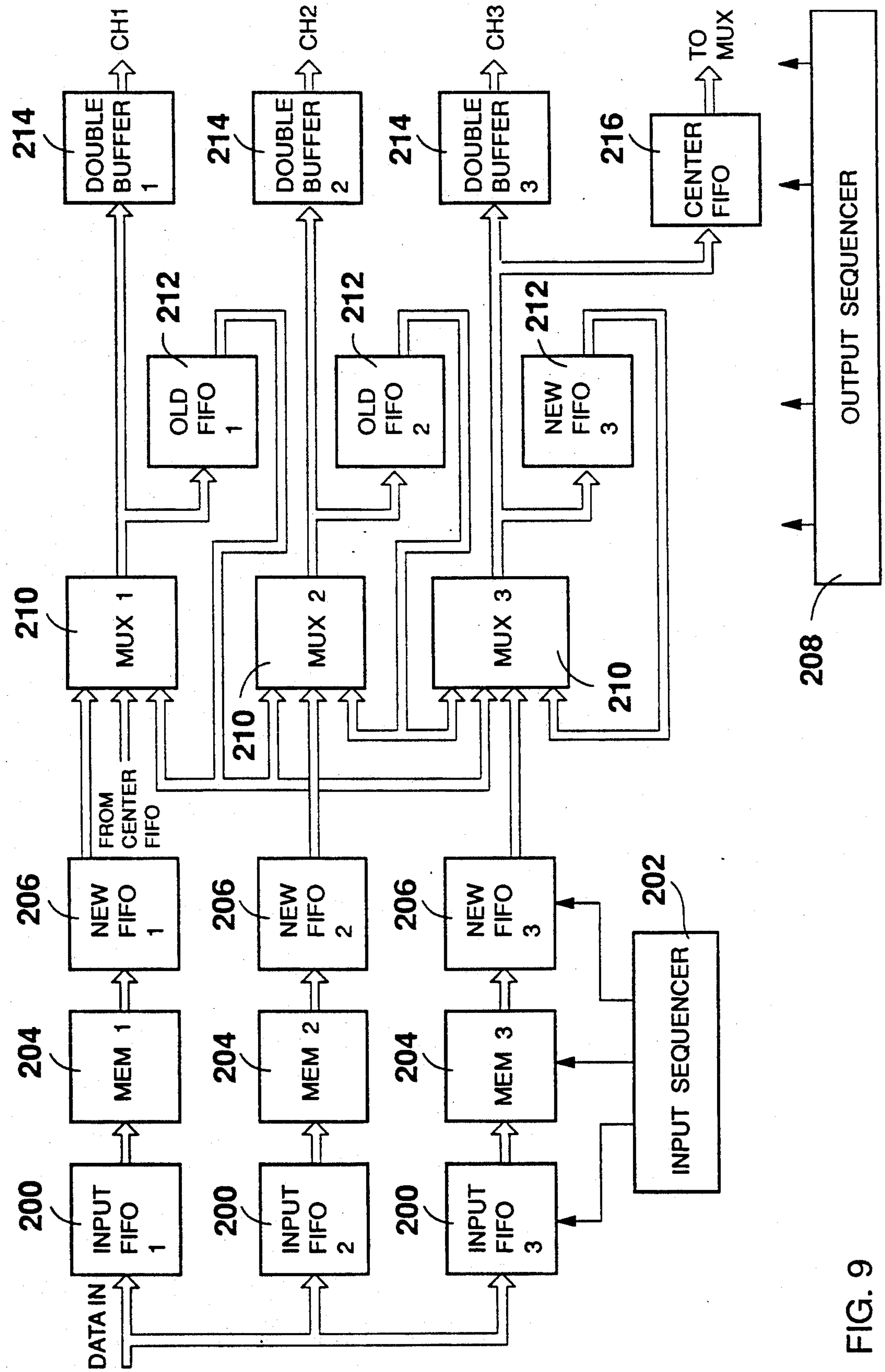
FIG. 9 is a simplified block diagram of the lines memory card forming part of the apparatus of FIG. 5.
Figure 10:
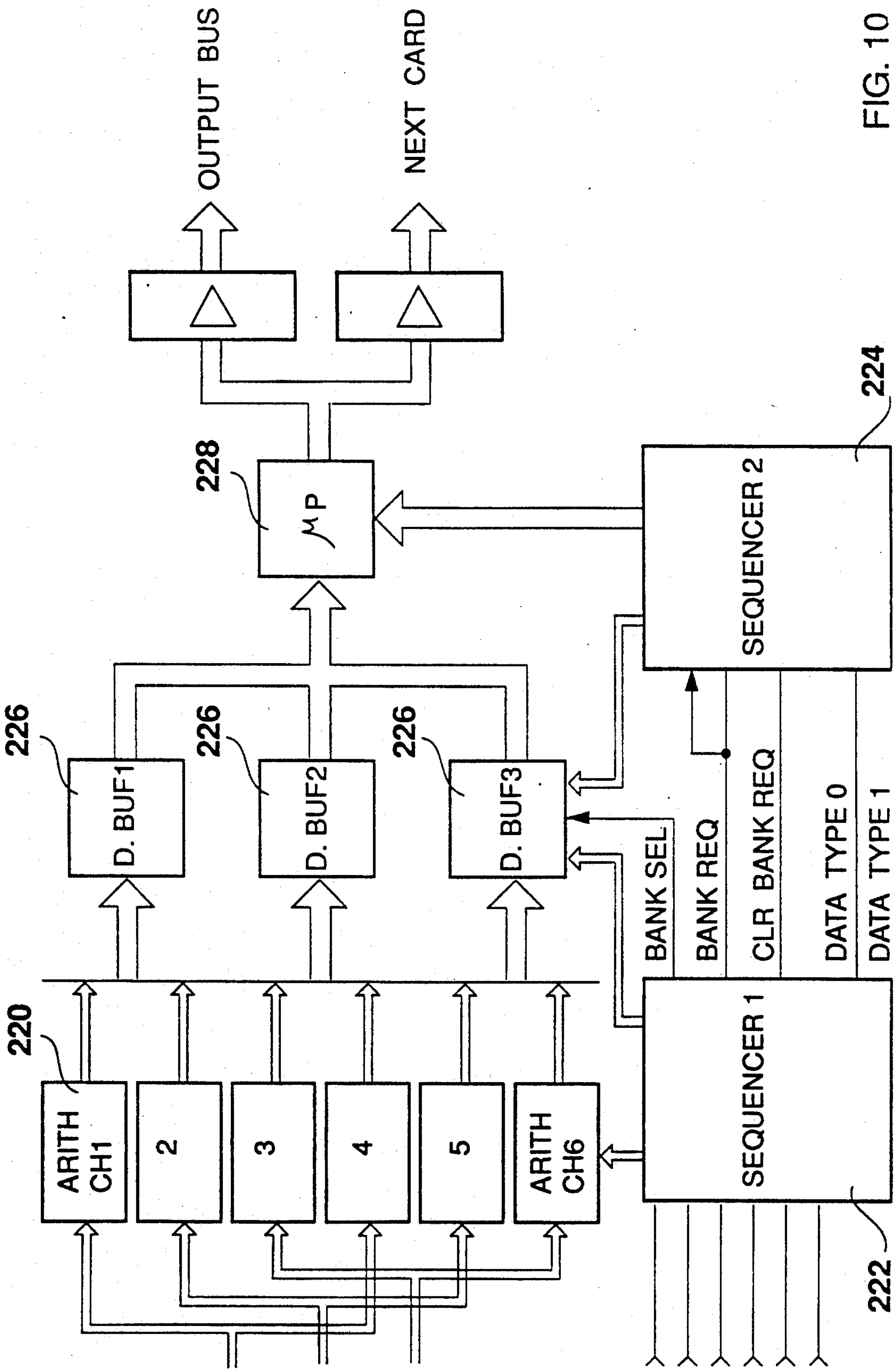
FIG. 10 is a detailed block diagram of the sharpening card employed in the apparatus of FIG. 5.

Reference is now made to FIGS. 9 and 10, which describe lines memory card 96 and sharpening card 98. When the sharpening card receives the pixel matrix from lines memory card 96 it begins to calculate the average value of each pixel matrix about the central pixel in the matrix and compares it with the values of the pixels surrounding it in order to determine the location of the edge of the unsharpened picture. The sharpening card then subtracts the central pixel value previously calculated from the incoming data to sharpen the edges of the picture inside the matrix.

A number of factors enter into the calculation. The color, the contrast, and the brightness of the area surrounding the central pixel all affect the sharpness of the picture. The brightness and color (luminance and chrominance) are calculated as linear transformations of the original RGB signal arriving at the sharpening card. The contrast is calculated as a sum of all the local edges in the matrix.

Data from the input card 92 or the interpolation card 94 is fed to the inputs of three input FIFO circuits 200 (FIG. 9) in the lines memory card 96. Multiplexed data, defined on the input bus 111 and controlled by signals from the input card 92 or interpolation card 94, separates input information into three separate R,G, and B signals and loads them into the three input FIFOs 200 respectively.

An input sequencer 202, controlled by a microprogram downloaded from the host computer 103, moves the R, G, and B data into three memories 204, MEM 1, MEM 2, and MEM 3, and then unloads the data into a series 206 of FIFOs called NEW FIFOs.

A first cycle of an output sequencer 208 unloads the NEW FIFOs 206 via multiplexers 210 into three further FIFOs 212 termed, OLD FIFOs. An output sequencer 208 also sends the same data via a set of double buffers 214 at the output of the lines memory card 96 to the sharpening card 98.

The next cycle of the output sequencer 208 refreshes the OLD FIFOs 212 with new data from the matrix transmitted by the NEW FIFOs 206. This data consists only of data that was not in the previous matrix. In other words, the FIFOs 212 are not completely cleared and then refreshed, but instead they are filled only with new data. The previous data which is still valid remains during the refresh. This method eliminates any time consuming overheads arising from memory intensive operations.

Multiplexer 210 allows the selection of a specific channel of RGB data to be used as a basis for the separation and sharpening of the other color channels. Usually, the Green channel is used as a basis for the other separations, but by juxtaposing the addresses of the other channels, both the Blue and Red can be used alternatively as a basis.

A center FIFO 216 allows the center data of the governing matrix to be passed onto the other two colors as an index for the location and registration of the matrices so that the sharpening factor can be added at the correct point.

Each one of the three data channels from the lines memory card 96 buffers is fed into the inputs of two arithmetic units 220 (FIG. 10) located at the input of the sharpening card 98 as follows:

Channel 1—arithmetic units 1 and 4.
Channel 2—arithmetic units 2 and 5.
Channel 3—arithmetic units 3 and 6.

In the first pass, the arithmetic units calculate the unsharp values of the input data, at the second pass they calculate the contrast values, and at the third pass they calculate the color values.

Figure 12:
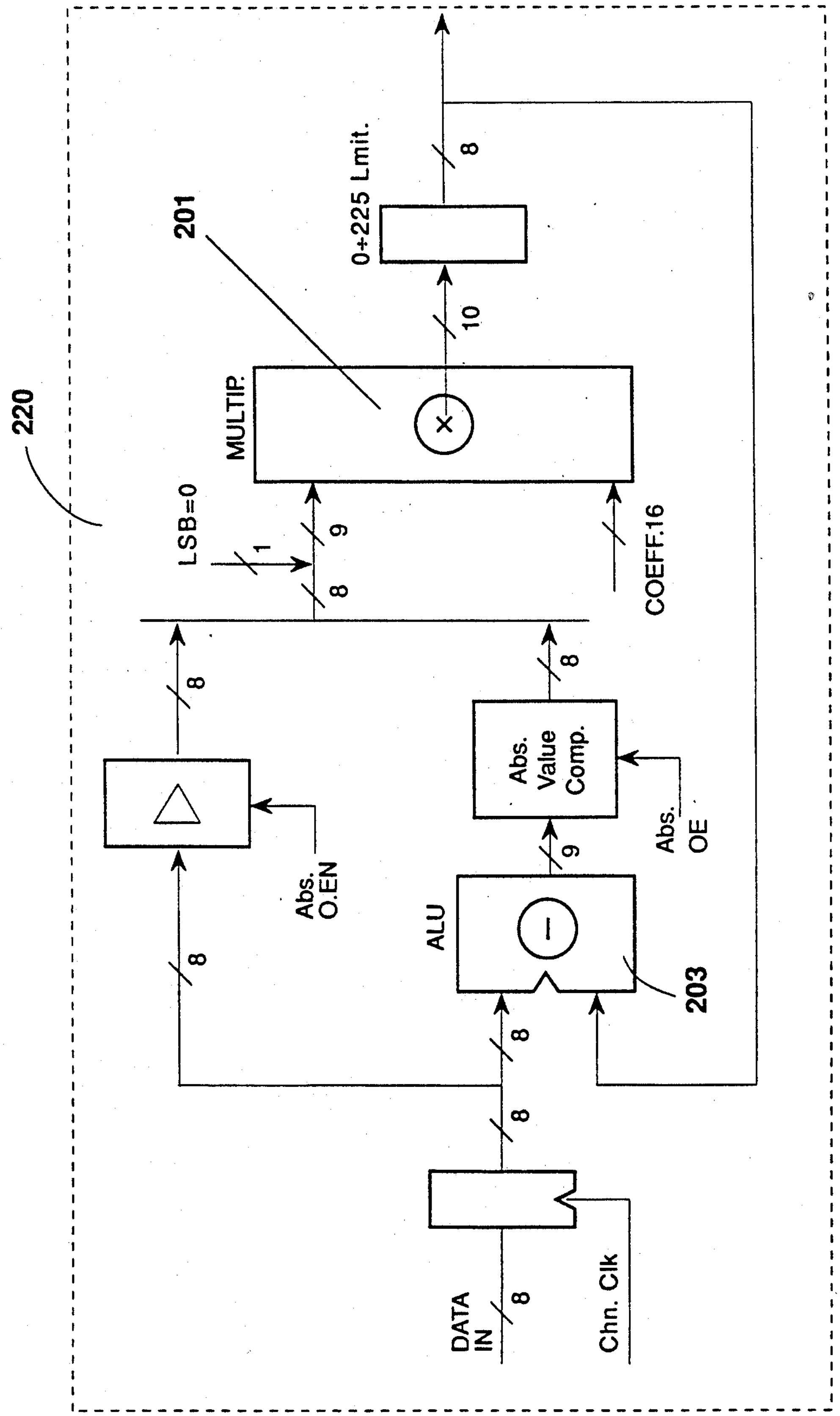
FIG. 12 is a detailed block diagram of a multiplication channel employed in the apparatus of FIG. 10.

Reference is now made to FIG. 12, which describes the arithmetic unit 220. Data is fed from lines memory card 96 directly to a multiplier 201. The summation of pixel matrix element values is performed and the average value thereof is then determined. This data is then transferred to an ALU 203 and is subtracted from the raw data of the same matrix.

Figure 11:
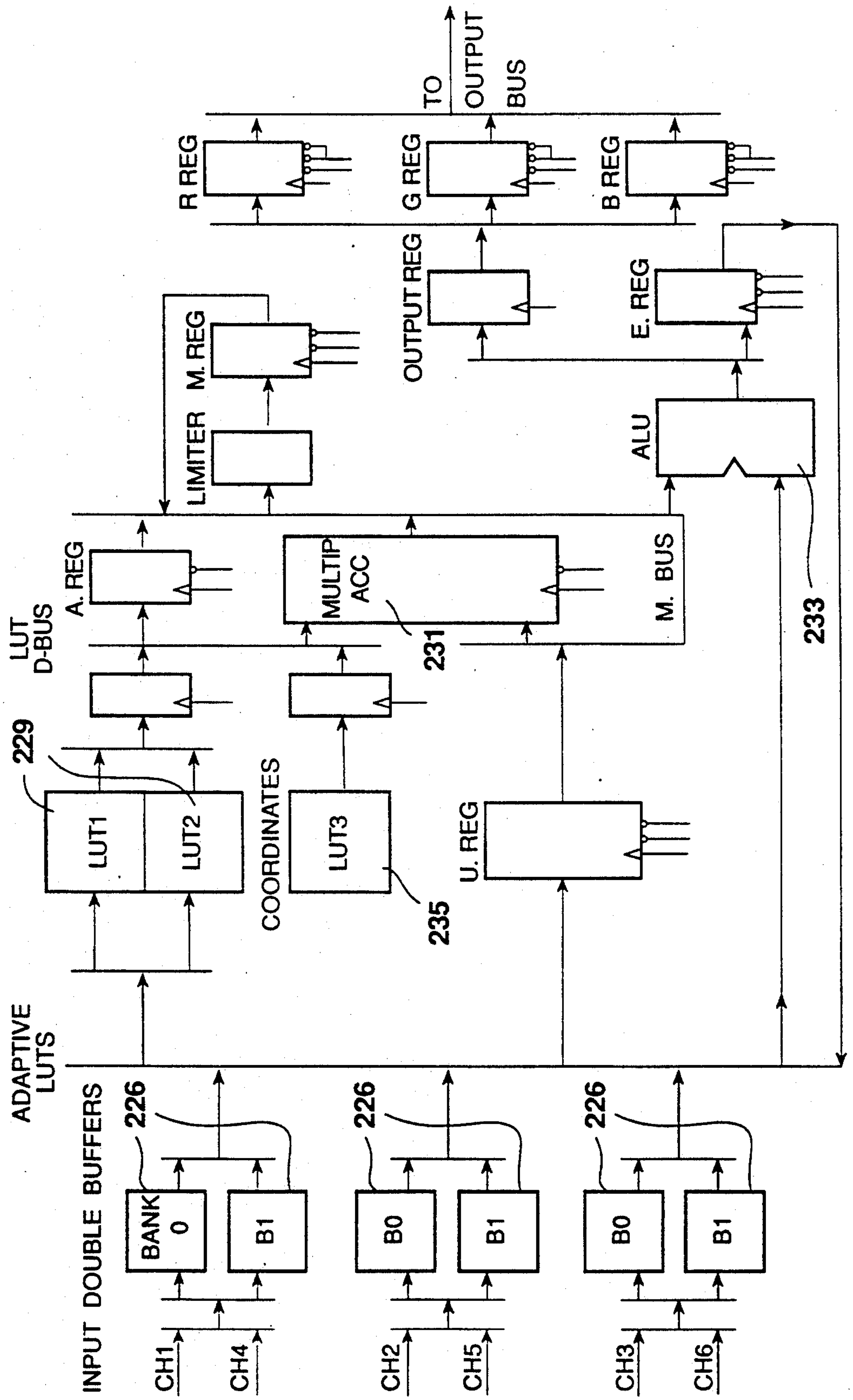
FIG. 11 is a detailed block diagram of the microprocessor employed in the apparatus of FIG. 10.

The result of this operation is a matrix whose values represent the deviation of the value of each pixel from the average value. This matrix, together with the average value, are transferred to a bank of input double buffers 226 (FIG. 11). The same hardware can also perform a transformation to a different color space (e.g. LHS) using a different set of coefficients.

Sequencers 1 and 2, indicated by reference numerals 222 and 224 (FIG. 10), respectively, control the timing, sequence, and flow of data on the sharpening card. Once the data has been processed by the arithmetic units 220, the sequencers 222 and 224 pass the data to double buffers 226, where the data is stored temporarily for use by a microprocessor 228.

Referring now to FIG. 11, it is seen that microprocessor 228 comprises adaptive LUTs 229, a coordinate LUT 235, a multiplier 231, and an ALU circuit 233 that calculates the final output value of the card.

The information processed by the arithmetic units 220 (FIG. 10) is fed simultaneously to LUTs 229 and to the ALU 233. LUT 229 provides the correction factors for color, brightness, contrast, and edge, and then passes them on to the multiplier 231. Multiplier 231 applies the correction factors to the data and then passes the corrected data to the ALU 233. Data from a coordinate LUT 235 controls the sharpening factor and its dependence on the location of the feature to be sharpened. The ALU 233 performs the final addition and subtraction of the data and the sharpened data is finally sent to the 3 dimensional lookup table card 100 (FIG. 5).

Figure 13:
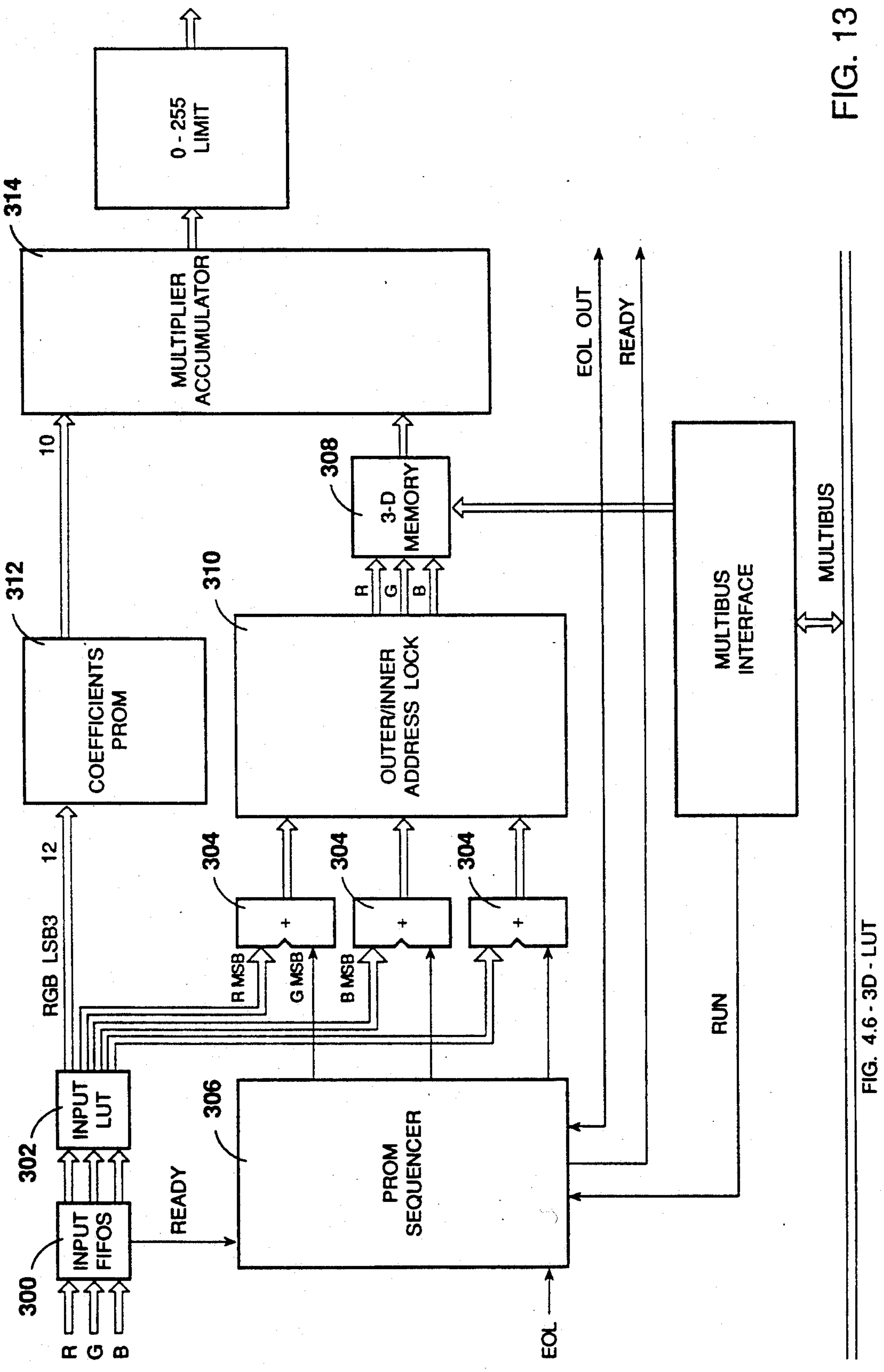
FIG. 13 is a detailed block diagram of a 3-dimensional look-up table card employed in the apparatus of FIG. 5.

Reference is now made to FIG. 13, which is a detailed block diagram of a 3-dimensional look up table (LUT) card 100. Color processing is performed by the 3-D LUT card 100 which also performs the following functions:

RGB to CMYB conversion.

CMYB to RGB conversion.

CMYB gradation.

Division of color space into discrete linework colors.

Translation of RGB signals into any required color space such as XYZ or LHS (luminance, hue, saturation) by using an interpolation process.

Information from the previous card (input card 92, interpolation card 94, lines memory card 96, or sharpening card 98) enters an input FIFO 300 and passes through an input LUT 302, which performs gradation of data. The four most significant bits of each separation (Red, Green and Blue) serve as pointers which define the eight corners of a cube centered about the required point in a three dimensional color space. These corners are calculated by ALUs 304 and are controlled by a PROM sequencer 306.

Each one of the eight corners serves as an address for a 3-D memory 308, addressed by an outer/inner address logic 310. The four least significant bits of every separation serve as addresses for a coefficient table stored in a PROM 312. This table defines the weighting of each corner point of the aforesaid color cube about the calculated pixel color value.

The actual point value is obtained by summing each corner point multiplied by its proportional weight. This operation is performed in a multiplier-accumulator 314. It is noted that a separate 3-D memory 308 and a separate multiplier-accumulator 314 is provided for each one of the output color separations, Cyan, Magenta, Yellow and Black.

Figure 14:
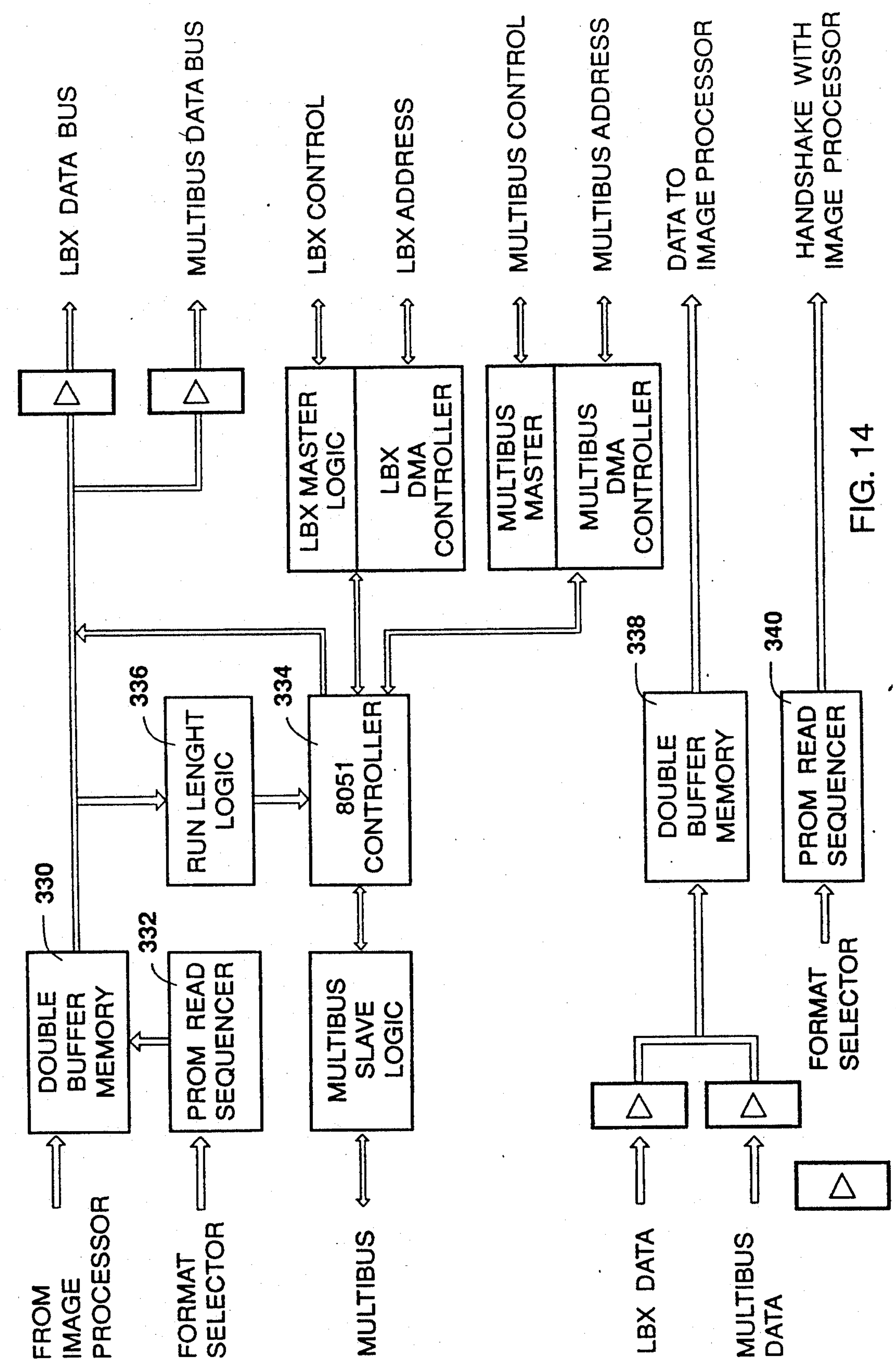
FIG. 14 is a detailed block diagram of an output card employed in the apparatus of FIG. 5.

Reference is now made to FIG. 14 which illustrates, in block diagram form, the output card 102 (FIG. 5). The output card serves to provide communication between the scanner and a multibus or an LBX bus. Information from any of the previous cards 92, 94, 96, 98 and 100 is written into one of the banks of a double buffer memory 330, while information is read out from the other bank to the LBX bus or a multibus.

Information can be organized inside the buffer or can be read out in several forms, for example, 8-bit unpacked, 8-bit packed, 12-bit unpacked, or 12-bit packed. The particular organization is controlled by the PROM read sequencer 332 according to a format loaded from the host computer 103.

An Intel 8051 controller 334 governs the communication between the output card 102 and one of the available buses. The particular pixel location along a scanned line is monitored by a run-length logic circuit 336.

Information can also be inputted to the output card 102 from the host computer 103 via the LBX or multibus. This is shown schematically at the bottom of FIG. 14, where LBX or multibus data is fed into a double buffer memory 338 and is controlled by a PROM read sequencer 340 in a manner similar to that described hereinabove in connection with elements 330 and 332. This data can be returned via input bus 111 to any of the image processing cards 90-100.

Figure 26:
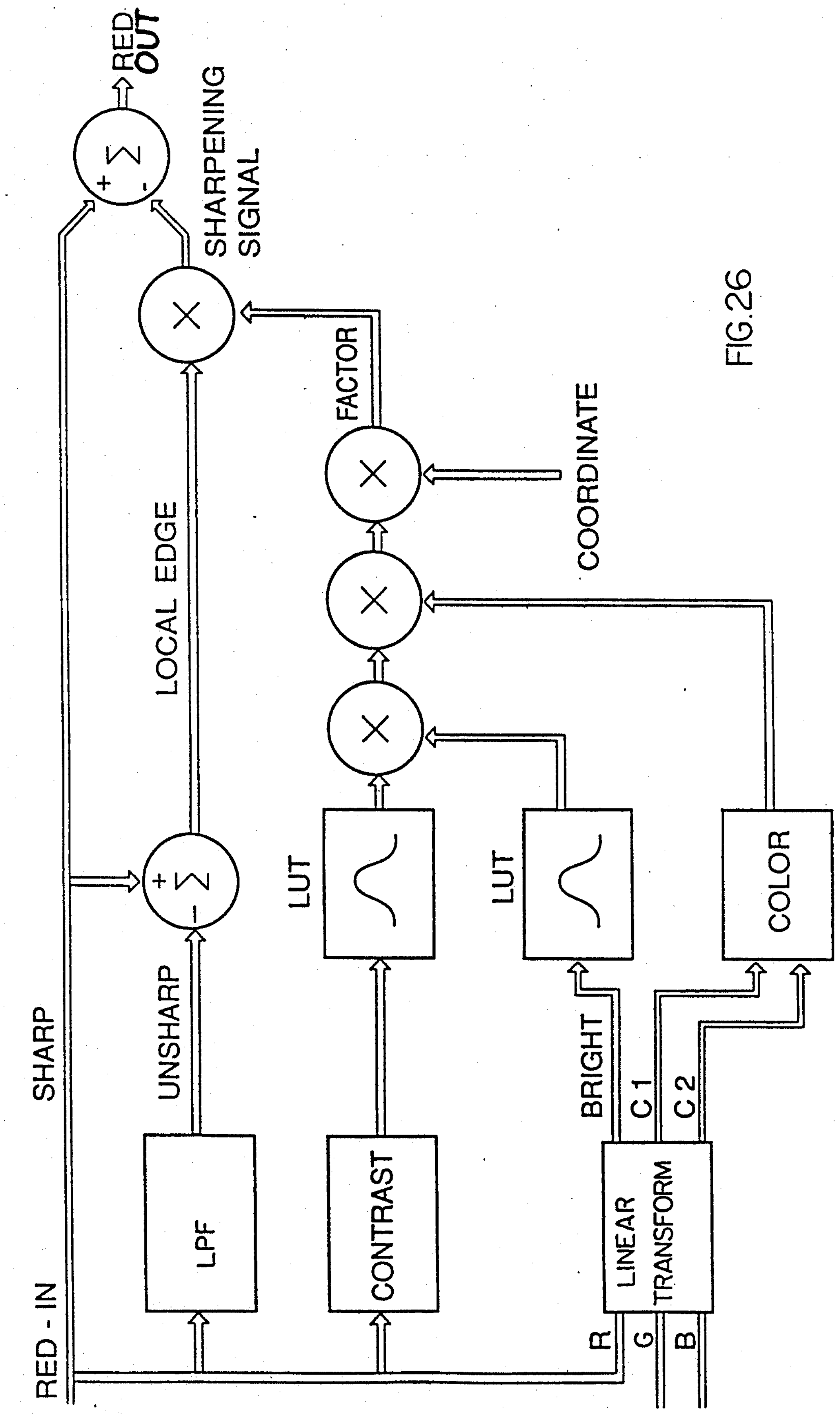
FIG. 26 is a block diagram illustration of apparatus for sharpening pictures in accordance with a preferred embodiment of the present invention.

The adaptive sharpening apparatus of the present invention comprises circuitry of the type illustrated in FIG. 26 for each of the three color separations. The host computer determines the size and shape of the sharp and unsharp features which are emulated by digital processing either automatically or according to instructions from an operator. These features are controlled by loading the appropriate matrix terms into the memory of the arithmetic channels illustrated in FIG. 10.

The adaptive sharpening apparatus may provide color separation of each color separation according to the unsharp values which are calculated on the basis of the available data for that separation. Alternatively all of the separations may be sharpened to correspond with the unsharp values of one particular separation which has been selected by means of the multiplexer units 210 in the Line Memory circuitry illustrated in FIG. 9.

The amount of sharpening at each point of the picture can be adaptively controlled by its intensity, color, location, steepness of the edges and the noise level in the neighborhood of the point. This is accomplished by calculating these attributes in the arithmetic channels (FIG. 12) and applying them to the adaptive LUTs (FIG. 11) in the sharpening processor. The noise value to be used in the adaptive sharpening is calculated by an approximation of "standard deviation" formula in the arithmeti channels (FIG. 12).

Annex A1 is a net list for a front panel board employed in accordance with the present invention;

Annex A2 is a net list for a CCD control card employed in the embodiment of FIG. 5;

Annex A3 is net list for an indexer card employed in the embodiment of FIG. 5;

Annex A4 is a net list for an input card employed in the embodiment of FIG. 5;

Annex A5 is a net list for a lines memory card employed in the embodiment of FIG. 5;

Annex A6 is a net list for a sharpening card employed in the embodiment of FIG. 5;

Annex A7 is a net list for a 3-dimensional look-up table card employed in the embodiment of FIG. 5;

Annex A8 is a net list for an output card employed in the embodiment of FIG. 5;

Annex A9 is a net list for an interconnect card employed in the embodiment of FIG. 5; and Annex A10 is a net list for an MLT driver employed in the embodiment of FIG. 5;

Annex A11 is a net list for an interpolation card employed in the embodiment of FIG. 5;

In view of the detailed nature of the net lists and in the interest of conciseness a verbal description of the above circuitry is not provided.

It will be appreciated by persons skilled in the art that the present invention is not limited to what has been particularly shown and described hereinabove. Rather the scope of the present invention is defined only by the claims which follow:

FRONT PANEL

| Signal_name | Physical_location | Pin_number | Part_name |
|---|---|---|---|
| +12V | BZ1 | 1 | PKB8 |
| +12V | U10 | 14 | 1488 |
| +12V | L2 | 2 | COIL 10UH |
| -12V | C9 | 1 | CAP 10UF |
| -12V | C5 | 2 | CAPE 0.1UF |
| 0:XSIG10 | LED10 | 1 | MV52124 |
| 0:XSIG102 | R4 | 1 | RES 130 |
| 0:XSIG103 | LED12 | 1 | MV52124 |
| 0:XSIG104 | U1 | 12 | LS373 |
| 0:XSIG104 | LED12 | 2 | MV52124 |
| 0:XSIG105 | LED13 | 2 | MV52124 |
| 0:XSIG105 | U1 | 9 | LS373 |
| 0:XSIG1 | LED4 | 1 | MV52124 |
| 0:XSIG11 | LED9 | 1 | MV52124 |
| 0:XSIG12 | LED11 | 1 | MV52124 |
| 0:XSIG123 | U3 | 10 | 2764 |
| 0:XSIG123 | U5 | 2 | LS373 |
| 0:XSIG124 | U5 | 5 | LS373 |
| 0:XSIG124 | U3 | 9 | 2764 |
| 0:XSIG125 | U5 | 6 | LS373 |
| 0:XSIG125 | U3 | 8 | 2764 |
| 0:XSIG126 | U3 | 7 | 2764 |
| 0:XSIG126 | U5 | 9 | LS373 |
| 0:XSIG127 | U5 | 12 | LS373 |
| 0:XSIG127 | U3 | 6 | 2764 |
| 0:XSIG128 | U5 | 15 | LS373 |
| 0:XSIG128 | U3 | 5 | 2764 |
| 0:XSIG129 | U5 | 16 | LS373 |
| 0:XSIG129 | U3 | 4 | 2764 |
| 0:XSIG130 | U5 | 19 | LS373 |
| 0:XSIG130 | U3 | 3 | 2764 |
| 0:XSIG151 | U3 | 2 | 2764 |
| 0:XSIG151 | U2 | 25 | 80C31BH |
| 0:XSIG152 | U3 | 23 | 2764 |
| 0:XSIG152 | U2 | 24 | 80C31BH |
| 0:XSIG153 | U3 | 21 | 2764 |
| 0:XSIG153 | U2 | 23 | 80C31BH |
| 0:XSIG154 | U2 | 22 | 80C31BH |
| 0:XSIG154 | U3 | 24 | 2764 |
| 0:XSIG155 | U2 | 21 | 80C31BH |
| 0:XSIG155 | U3 | 25 | 2764 |
| 0:XSIG188 | C2 | 1 | CAP 33PF |
| 0:XSIG188 | U2 | 19 | 80C31BH |
| 0:XSIG188 | Y1 | 2 | XTAL 11.0592MHZ |
| 0:XSIG189 | Y1 | 1 | XTAL 11.0592MHZ |
| 0:XSIG189 | U2 | 18 | 80C31BH |
| 0:XSIG2 | LED3 | 1 | MV52124 |
| 0:XSIG218 | C12 | 1 | CAP 390PF |
| 0:XSIG218 | U8 | 9 | 1489 |
| 0:XSIG219 | C11 | 1 | CAP 390PF |
| 0:XSIG219 | U8 | 5 | 1489 |
| 0:XSIG220 | C7 | 1 | CAP 390PF |
| 0:XSIG220 | U8 | 2 | 1489 |

| | | | |
|---|---|---|---|
| 0:XSIG223 | U2 | 11 | 80C31BH |
| 0:XSIG223 | U10 | 2 | 1488 |
| 0:XSIG224 | U2 | 10 | 80C31BH |
| 0:XSIG224 | U8 | 3 | 1489 |
| 0:XSIG268 | C1 | 2 | CAPE 1UF |
| 0:XSIG268 | U2 | 9 | 80C31BH |
| 0:XSIG27 | U7 | 15 | LS373 |
| 0:XSIG27 | LED3 | 2 | MV52124 |
| 0:XSIG29 | U7 | 19 | LS373 |
| 0:XSIG29 | LED1 | 2 | MV52124 |
| 0:XSIG3 | LED2 | 1 | MV52124 |
| 0:XSIG31 | LED6 | 2 | MV52124 |
| 0:XSIG31 | U7 | 6 | LS373 |
| 0:XSIG33 | LED8 | 2 | MV52124 |
| 0:XSIG366 | Q1 | . | 2N2222 . |
| 0:XSIG366 | R17 | 2 | RES 1K |
| 0:XSIG380 | R2 | 2 | RES 15K |
| 0:XSIG380 | P1 | 3 | POT 5K |
| 0:XSIG4 | R14 | 1 | RES 130 |
| 0:XSIG5 | LED5 | 1 | MV52124 |
| 0:XSIG6 | LED6 | 1 | MV52124 |
| 0:XSIG7 | LED7 | 1 | MV52124 |
| 0:XSIG8 | LED8 | 1 | MV52124 |
| 0:XSIG86 | U7 | 16 | LS373 |
| 0:XSIG86 | LED2 | 2 | MV52124 |
| 0:XSIG87 | U7 | 12 | LS373 |
| 0:XSIG87 | LED4 | 2 | MV52124 |
| 0:XSIG89 | LED5 | 2 | MV52124 |
| 0:XSIG89 | U7 | 9 | LS373 |
| 0:XSIG90 | LED7 | 2 | MV52124 |
| 0:XSIG90 | U7 | 5 | LS373 |
| 0:XSIG91 | U1 | 16 | LS373 |
| 0:XSIG91 | LED10 | 2 | MV52124 |
| 0:XSIG92 | U1 | 19 | LS373 |
| 0:XSIG92 | LED9 | 2 | MV52124 |
| 0:XSIG93 | U1 | 15 | LS373 |
| 0:XSIG93 | LED11 | 2 | MV52124 |
| BAZZER_ON/OFF | R17 | 1 | RES 1K |
| BAZZER_ON/OFF | U1 | 6 | LS373 |
| CD | U8 | 10 | 1489 |
| CTS | U8 | 4 | 1489 |
| DIAG~ | U6 | 17 | LS244 |
| DIAG~ | U4 | 3 | 4310R101 4.7 KOHM |
| DTR | U10 | 8 | 1488 |
| ENTER~ | U6 | 13 | LS244 |
| ENTER~ | U4 | 5 | 4310R101 4.7 KOHM |
| ESC~ | U6 | 15 | LS244 |
| ESC~ | U4 | 4 | 4310R101 4.7 KOHM |
| GND | Q1 | . | 2N2222 . |
| GND | P1 | 1 | POT 5K |
| GND | C4 | 2 | CAPE 0.1UF |
| GND | U3 | 20 | 2764 |
| GND | U2 | 31 | 80C31BH |
| GND | | J4 1 | CONNECTOR |
| GND | | J4 7 | CONNECTOR |
| GND | | J5 5 | CONNECTOR |
| GND | | J6 1 | CONNECTOR |
| GND | | J8 9 | CONNECTOR |

| | | | |
|---|---|---|---|
| VCC | | J4 11 | CONNECTOR |
| -12V | | J4 18 | CONNECTOR |
| TXD | | J4 2 | CONNECTOR |
| DTR | | J4 20 | CONNECTOR |
| +12V | | J4 25 | CONNECTOR |
| RXD | | J4 3 | CONNECTOR |
| RTS | | J4 4 | CONNECTOR |
| CTS | | J4 5 | CONNECTOR |
| CD | | J4 8 | CONNECTOR |
| PS_+12V | | J5 2 | CONNECTOR |
| PS_-12V | | J5 3 | CONNECTOR |
| PANEL_DB3 | | J6 10 | CONNECTOR |
| PANEL_DB4 | | J6 11 | CONNECTOR |
| PANEL_DB5 | | J6 12 | CONNECTOR |
| PANEL_DB6 | | J6 13 | CONNECTOR |
| PANEL_DB7 | | J6 14 | CONNECTOR |
| LCD_R/S | | J6 4 | CONNECTOR |
| LCD_R/W~ | | J6 5 | CONNECTOR |
| LCD_EN | | J6 6 | CONNECTOR |
| PANEL_DB0 | | J6 7 | CONNECTOR |
| PANEL_DB1 | | J6 8 | CONNECTOR |
| PANEL_DB2 | | J6 9 | CONNECTOR |
| RUN~ | | J8 1 | CONNECTOR |
| RESET~ | | J8 2 | CONNECTOR |
| STOP~ | | J8 3 | CONNECTOR |
| LEFT~ | | J8 4 | CONNECTOR |
| RIGHT~ | | J8 5 | CONNECTOR |
| ENTER~ | | J8 6 | CONNECTOR |
| ESC~ | | J8 7 | CONNECTOR |
| DIAG~ | | J8 8 | CONNECTOR |
| LCD_EN | U2 | 15 | 80C31BH |
| LCD_R/S | U2 | 16 | 80C31BH |
| LCD_R/W~ | U2 | 17 | 80C31BH |
| LCD_VEE | P1 | 2 | POT 5K |
| LCD_VEE | | J6 3 | CONNECTOR |
| LEDS_LSB | U7 | 11 | LS373 |
| LEDS_LSB | U2 | 12 | 80C31BH |
| LEDS_MSB | U1 | 11 | LS373 |
| LEDS_MSB | U2 | 13 | 80C31BH |
| LEFT~ | U4 | 7 | 4310R101 4.7 KOHM |
| LEFT~ | U6 | 8 | LS244 |
| MEM_AD0 | U3 | 11 | 2764 |
| MEM_AD0 | U5 | 3 | LS373 |
| MEM_AD0 | U2 | 39 | 80C31BH |
| MEM_AD1 | U3 | 12 | 2764 |
| MEM_AD1 | U2 | 38 | 80C31BH |
| MEM_AD1 | U5 | 4 | LS373 |
| MEM_AD2 | U3 | 13 | 2764 |
| MEM_AD2 | U2 | 37 | 80C31BH |
| MEM_AD2 | U5 | 7 | LS373 |
| MEM_AD3 | U3 | 15 | 2764 |
| MEM_AD3 | U2 | 36 | 80C31BH |
| MEM_AD3 | U5 | 8 | LS373 |
| MEM_AD4 | U5 | 13 | LS373 |
| MEM_AD4 | U3 | 16 | 2764 |
| MEM_AD4 | U2 | 35 | 80C31BH |
| MEM_AD5 | U5 | 14 | LS373 |
| MEM_AD5 | U3 | 17 | 2764 |
| MEM_AD5 | U2 | 34 | 80C31BH |

| | | | |
|---|---|---|---|
| MEM_AD6 | U5 | 17 | LS373 |
| MEM_AD6 | U3 | 18 | 2764 |
| MEM_AD6 | U2 | 33 | 80C31BH |
| MEM_AD7 | U5 | 18 | LS373 |
| MEM_AD7 | U3 | 19 | 2764 |
| MEM_AD7 | U2 | 32 | 80C31BH |
| PANEL_DB0 | U2 | 1 | 80C31BH |
| PANEL_DB0 | U7 | 18 | LS373 |
| PANEL_DB1 | U6 | 16 | LS244 |
| PANEL_DB1 | U7 | 17 | LS373 |
| PANEL_DB1 | U2 | 2 | 80C31BH |
| PANEL_DB2 | U7 | 14 | LS373 |
| PANEL_DB2 | U2 | 3 | 80C31BH |
| PANEL_DB3 | U6 | 12 | LS244 |
| PANEL_DB3 | U7 | 13 | LS373 |
| PANEL_DB3 | U2 | 4 | 80C31BH |
| PANEL_DB4 | U2 | 5 | 80C31BH |
| PANEL_DB4 | U7 | 8 | LS373 |
| PANEL_DB4 | U6 | 9 | LS244 |
| PANEL_DB5 | U2 | 6 | 80C31BH |
| PANEL_DB5 | U7 | 7 | LS373 |
| PANEL_DB6 | U7 | 4 | LS373 |
| PANEL_DB6 | U6 | 5 | LS244 |
| PANEL_DB6 | U2 | 7 | 80C31BH |
| PANEL_DB7 | U7 | 3 | LS373 |
| PANEL_DB7 | U2 | 8 | 80C31BH |
| PAN_ALE | U5 | 11 | LS373 |
| PAN_ALE | U2 | 30 | 80C31BH |
| PAN_PSEN~ | U3 | 22 | 2764 |
| PAN_PSEN~ | U2 | 29 | 80C31BH |
| PS_+12V | L2 | 1 | COIL 10UH |
| PS_-12V | L1 | 1 | COIL 10UH |
| PU | U3 | 1 | 2764 |
| PU | U4 | 2 | 4310R101 4.7 KOHM |
| PU | U3 | 27 | 2764 |
| READ_KEYBOARD~ | U6 | 1 | LS244 |
| READ_KEYBOARD~ | U2 | 14 | 80C31BH |
| READ_KEYBOARD~ | U6 | 19 | LS244 |
| RESET~ | U6 | 4 | LS244 |
| RESET~ | U4 | 9 | 4310R101 4.7 KOHM |
| RIGHT~ | U6 | 11 | LS244 |
| RIGHT~ | U4 | 6 | 4310R101 4.7 KOHM |
| RTS | U10 | 6 | 1488 |
| RUN~ | U4 | 10 | 4310R101 4.7 KOHM |
| RUN~ | U6 | 2 | LS244 |
| RXD | U8 | 1 | 1489 |
| S376 | BZ1 | 2 | PKB8 |
| S377 | Q1 | . | 2N2222 . |
| S377 | R18 | 1 | RES 1K |
| STOP~ | U6 | 6 | LS244 |
| STOP~ | U4 | 8 | 4310R101 4.7 KOHM |
| STOP~ | | J5 6 | CONNECTOR |
| TXD | U10 | 3 | 1488 |
| VCC | | | LWROPIN |
| VCC | C6 | 1 | CAPE 0.1UF |
| VCC | R14 | 2 | RES 130 |
| VCC | | J5 1 | CONNECTOR |
| VCC | | J6 2 | CONNECTOR |

Annex A2

CCD_CONTROL

| Signal_name | Physical_location | Pin_number | Part_name |
|---|---|---|---|
| +5V | C105 | 1 | CAP 0.01UF |
| +5V | U125 | 11 | IH5341 |
| +VDD | C106 | 1 | CAP 0.01UF |
| +VDD | C103 | 2 | CAP 0.1UF |
| +VDD | U123 | 8 | AD667 |
| -VDD | C107 | 1 | CAP 0.01UF |
| -VDD | U123 | 10 | AD667 |
| -VDD | U125 | 6 | IH5341 |
| 0:XSIG1001 | U505 | 13 | PAL12L10 |
| 0:XSIG1001 | U507 | 14 | PAL20L10 |
| 0:XSIG1048 | U505 | 14 | PAL12L10 |
| 0:XSIG1048 | U118 | 17 | S244 |
| 0:XSIG236 | U508 | 11 | LS240 |
| 0:XSIG236 | U112 | 13 | LS164 |
| 0:XSIG387 | U705 | 14 | LS240 |
| 0:XSIG387 | U112 | 8 | LS164 |
| 0:XSIG581 | U116 | 2 | LS10 |
| 0:XSIG581 | U112 | 5 | LS164 |
| 0:XSIG582 | U112 | 10 | LS164 |
| 0:XSIG582 | U410 | 2 | S240 |
| 0:XSIG607 | U116 | 1 | LS10 |
| 0:XSIG607 | U410 | 18 | S240 |
| 0:XSIG933 | U507 | 23 | PAL20L10 |
| 0:XSIG933 | U112 | 9 | LS164 |
| 0:XSIG937 | U508 | 1 | LS240 |
| 0:XSIG937 | U508 | 9 | LS240 |
| 10:XSIG17 | U414 | 1 | S08 |
| 10:XSIG17 | U512 | 11 | LS74 |
| 10:XSIG17 | U314 | 14 | PAL20RA10 |
| 10:XSIG40 | U314 | 10 | PAL20RA10 |
| 10:XSIG40 | U414 | 3 | S08 |
| 10:XSIG40 | U315 | 4 | S32 |
| 10:XSIG439 | U313 | 2 | S244 |
| 10:XSIG439 | U315 | 6 | S32 |
| 10:XSIG447 | U315 | 5 | S32 |
| 10:XSIG447 | U410 | 7 | S240 |
| 11:XSIG101 | U204 | 15 | PAL20RA10 |
| 11:XSIG101 | U203 | 2 | PAL20L8A |
| 11:XSIG29 | U718 | 11 | LS240 |
| 11:XSIG29 | U103 | 3 | 26LS32 |
| 11:XSIG338 | U103 | 11 | 26LS32 |
| 11:XSIG338 | U718 | 13 | LS240 |
| 11:XSIG338 | U204 | 2 | PAL20RA10 |
| 11:XSIG456 | U711 | 11 | LS244 |
| 11:XSIG456 | U313 | 14 | S244 |
| 11:XSIG456 | U203 | 23 | PAL20L8A |
| 12:XSIG249 | U108 | 1 | LS684 |
| 12:XSIG249 | U208 | 23 | PAL20R8A |
| 12:XSIG286 | U208 | 3 | PAL20R8A |
| 12:XSIG286 | U315 | 8 | S32 |
| 12:XSIG585 | U205 | 1 | LS684 |
| 12:XSIG585 | U206 | 23 | PAL20R8A |
| 12:XSIG588 | U315 | 11 | S32 |

| | | | |
|---|---|---|---|
| 12:XSIG588 | U206 | 3 | PAL20R8A |
| 13:XSIG140 | U116 | 10 | LS10 |
| 13:XSIG140 | U116 | 11 | LS10 |
| 13:XSIG140 | U114 | 13 | LS240 |
| 13:XSIG140 | U115 | 4 | LS164 |
| 13:XSIG146 | U115 | 5 | LS164 |
| 13:XSIG146 | U114 | 8 | LS240 |
| 13:XSIG146 | U219 | 9 | S86 |
| 13:XSIG185 | U117 | 1 | S74 |
| 13:XSIG185 | U116 | 8 | LS10 |
| 13:XSIG21 | U114 | 12 | LS240 |
| 13:XSIG21 | U116 | 9 | LS10 |
| 13:XSIG224 | U118 | 12 | S244 |
| 13:XSIG224 | | J1-13 | CONNECTOR |
| 13:XSIG224 | | J2-13 | CONNECTOR |
| 13:XSIG224 | | J3-13 | CONNECTOR |
| 13:XSIG226 | U118 | 9 | S244 |
| 13:XSIG226 | | J3-9 | CONNECTOR |
| 13:XSIG227 | U118 | 18 | S244 |
| 13:XSIG227 | | J1-11 | CONNECTOR |
| 13:XSIG228 | U118 | 14 | S244 |
| 13:XSIG228 | | J3-11 | CONNECTOR |
| 13:XSIG229 | U118 | 16 | S244 |
| 13:XSIG229 | | J2-11 | CONNECTOR |
| 13:XSIG230 | U118 | 5 | S244 |
| 13:XSIG230 | | J2-9 | CONNECTOR |
| 13:XSIG231 | U118 | 7 | S244 |
| 13:XSIG231 | | J1-9 | CONNECTOR |
| 13:XSIG31 | U114 | 14 | LS240 |
| 13:XSIG31 | U113 | 5 | LS157 |
| 13:XSIG45 | U114 | 16 | LS240 |
| 13:XSIG45 | U113 | 2 | LS157 |
| 13:XSIG79 | U115 | 10 | LS164 |
| 15:XSIG110 | U705 | 11 | LS240 |
| 15:XSIG110 | U316 | 12 | 316A102 1K |
| 15:XSIG111 | U316 | 13 | 316A102 1K |
| 15:XSIG112 | U316 | 14 | 316A102 1K |
| 15:XSIG112 | U705 | 15 | LS240 |
| 15:XSIG113 | U316 | 15 | 316A102 1K |
| 15:XSIG113 | U705 | 17 | LS240 |
| 15:XSIG56 | U214 | 1 | LS374 |
| 15:XSIG56 | U718 | 12 | LS240 |
| 16:XSIG26 | R106 | 2 | RES 51 |
| 16:XSIG26 | U123 | 7 | AD667 |
| 16:XSIG27 | R106 | 1 | RES 51 |
| 16:XSIG27 | U123 | 6 | AD667 |
| 16:XSIG28 | C102 | 2 | CAP 22PF |
| 16:XSIG28 | U123 | 3 | AD667 |
| 16:XSIG61 | J8 | 1 | BNC |
| 16:XSIG61 | U124 | 14 | IH5341 |
| 16:XSIG61 | R103 | 2 | RES 750 |
| 16:XSIG65 | J7 | 1 | BNC |
| 16:XSIG65 | U125 | 14 | IH5341 |
| 16:XSIG65 | R104 | 2 | RES 750 |
| 16:XSIG68 | J6 | 1 | BNC |
| 16:XSIG68 | U126 | 14 | IH5341 |
| 16:XSIG68 | R105 | 2 | RES 750 |
| 16:XSIG71 | R107 | 1 | RES 10K |

| | | | |
|---|---|---|---|
| 16:XSIG71 | R108 | 2 | RES 750 |
| 16:XSIG71 | U125 | 9 | IH5341 |
| 16:XSIG74 | C102 | 1 | CAP 22PF |
| 16:XSIG74 | R107 | 2 | RES 10K |
| 16:XSIG74 | U123 | 9 | AD667 |
| 3:XSIG404 | U306 | 14 | LS461 |
| 3:XSIG404 | U305 | 23 | LS461 |
| 3:XSIG716 | U304 | 1 | S244 |
| 3:XSIG716 | U304 | 19 | S244 |
| 3:XSIG716 | U508 | 3 | LS240 |
| 3:XSIG884 | U718 | 14 | LS240 |
| 3:XSIG884 | U306 | 23 | LS461 |
| 4:XSIG544 | U317 | 13 | PAL20R6 |
| 4:XSIG544 | U410 | 14 | S240 |
| 5:XSIG1285 | U607 | 13 | PAL20R8A |
| 5:XSIG1285 | U718 | 5 | LS240 |
| 6:XSIG1016 | U720 | 1 | LS240 |
| 6:XSIG1016 | U720 | 19 | LS240 |
| 6:XSIG1016 | U116 | 6 | LS10 |
| 7:XSIG1398 | U410 | 12 | S240 |
| 7:XSIG1398 | U405 | 17 | LS2569 |
| 7:XSIG1398 | U313 | 19 | S244 |
| 7:XSIG1504 | U308 | 4 | LS684 |
| 7:XSIG1504 | U210 | 5 | LS377 |
| 7:XSIG1505 | U308 | 6 | LS684 |
| 7:XSIG1506 | U308 | 8 | LS684 |
| 7:XSIG1506 | U210 | 9 | LS377 |
| 7:XSIG1529 | U308 | 11 | LS684 |
| 7:XSIG1529 | U210 | 12 | LS377 |
| 7:XSIG1530 | U308 | 13 | LS684 |
| 7:XSIG1530 | U210 | 15 | LS377 |
| 7:XSIG1531 | U308 | 15 | LS684 |
| 7:XSIG1531 | U210 | 16 | LS377 |
| 7:XSIG1532 | U308 | 17 | LS684 |
| 7:XSIG1532 | U210 | 19 | LS377 |
| 7:XSIG1534 | U307 | 19 | LS684 |
| 7:XSIG1534 | U308 | 2 | LS684 |
| 7:XSIG1600 | U307 | 11 | LS684 |
| 7:XSIG1600 | U211 | 15 | LS377 |
| 7:XSIG1601 | U307 | 13 | LS684 |
| 7:XSIG1601 | U211 | 16 | LS377 |
| 7:XSIG1602 | U307 | 15 | LS684 |
| 7:XSIG1602 | U211 | 19 | LS377 |
| 7:XSIG1604 | U307 | 17 | LS684 |
| 7:XSIG1604 | U210 | 2 | LS377 |
| 7:XSIG1660 | U410 | 16 | S240 |
| 7:XSIG1660 | U405 | 7 | LS2569 |
| 7:XSIG1668 | U211 | 12 | LS377 |
| 7:XSIG1668 | U307 | 8 | LS684 |
| 8:XSIG1130 | U408 | 6 | S139 |
| 8:XSIG1130 | U407 | 7 | S374 |
| 8:XSIG1131 | U407 | 4 | S374 |
| 8:XSIG1131 | U408 | 5 | S139 |
| 8:XSIG1132 | U407 | 3 | S374 |
| 8:XSIG1132 | U408 | 4 | S139 |
| 8:XSIG1156 | U114 | 2 | LS240 |
| 8:XSIG1156 | U414 | 6 | S08 |
| 8:XSIG1161 | U407 | 15 | S374 |
| 8:XSIG1161 | U414 | 5 | S08 |

| | | | |
|---|---|---|---|
| 8:XSIG1162 | U407 | 12 | S374 |
| 8:XSIG1162 | U414 | 4 | S08 |
| 8:XSIG1167 | U407 | 14 | S374 |
| 8:XSIG1167 | U320 | 18 | LS240 |
| 9:XSIG14 | U220 | 14 | LS461 |
| 9:XSIG14 | U410 | 15 | S240 |
| 9:XSIG14 | U220 | 2 | LS461 |
| 9:XSIG14 | U119 | 3 | S109 |
| 9:XSIG152 | U220 | 10 | LS461 |
| 9:XSIG152 | U120 | 19 | LS273 |
| 9:XSIG153 | U120 | 16 | LS273 |
| 9:XSIG153 | U220 | 9 | LS461 |
| 9:XSIG154 | U120 | 15 | LS273 |
| 9:XSIG154 | U220 | 8 | LS461 |
| 9:XSIG155 | U120 | 12 | LS273 |
| 9:XSIG155 | U220 | 7 | LS461 |
| 9:XSIG190 | U218 | 1 | LS164 |
| 9:XSIG190 | U217 | 13 | LS164 |
| 9:XSIG190 | U218 | 2 | LS164 |
| 9:XSIG190 | U219 | 5 | S86 |
| 9:XSIG201 | U219 | 1 | S86 |
| 9:XSIG201 | U218 | 5 | LS164 |
| 9:XSIG271 | U219 | 2 | S86 |
| 9:XSIG271 | U218 | 4 | LS164 |
| 9:XSIG272 | U220 | 6 | LS461 |
| 9:XSIG272 | U120 | 9 | LS273 |
| 9:XSIG334 | U120 | 2 | LS273 |
| 9:XSIG334 | U220 | 3 | LS461 |
| 9:XSIG335 | U220 | 4 | LS461 |
| 9:XSIG335 | U120 | 5 | LS273 |
| 9:XSIG337 | U220 | 5 | LS461 |
| 9:XSIG337 | U120 | 6 | LS273 |
| 9:XSIG446 | U413 | 1 | S74 |
| 9:XSIG446 | U109 | 16 | LS273 |
| 9:XSIG456 | U119 | 2 | S109 |
| 9:XSIG456 | U410 | 5 | S240 |
| 9:XSIG466 | U413 | 2 | S74 |
| 9:XSIG466 | U413 | 6 | S74 |
| 9:XSIG517 | U109 | 2 | LS273 |
| 9:XSIG517 | U216 | 3 | LS161 |
| 9:XSIG518 | U216 | 4 | LS161 |
| 9:XSIG518 | U109 | 5 | LS273 |
| 9:XSIG519 | U216 | 5 | LS161 |
| 9:XSIG519 | U109 | 6 | LS273 |
| 9:XSIG547 | U410 | 3 | S240 |
| 9:XSIG547 | U216 | 9 | LS161 |
| 9:XSIG563 | U220 | 1 | LS461 |
| 9:XSIG563 | U216 | 11 | LS161 |
| 9:XSIG563 | U410 | 17 | S240 |
| 9:XSIG563 | U119 | 4 | S109 |
| 9:XSIG563 | U217 | 8 | LS164 |
| 9:XSIG564 | U216 | 1 | LS161 |
| 9:XSIG564 | U216 | 10 | LS161 |
| 9:XSIG564 | U109 | 19 | LS273 |
| 9:XSIG564 | U216 | 7 | LS161 |
| 9:XSIG564 | U217 | 9 | LS164 |
| 9:XSIG5 | U313 | 8 | S244 |
| 9:XSIG620 | U315 | 1 | S32 |
| 9:XSIG620 | U119 | 6 | S109 |

| | | | |
|---|---|---|---|
| 9:XSIG621 | U119 | 10 | S109 |
| 9:XSIG621 | U315 | 2 | S32 |
| 9:XSIG676 | U119 | 1 | S109 |
| 9:XSIG676 | U320 | 12 | LS240 |
| >5000PIXELS | U714 | 19 | LS273 |
| >5000PIXELS | U215 | 8 | PAL20L10 |
| A0 | U122 | 2 | LS244 |
| A0 | U221 | 21 | PAL20R6 |
| A0 | U615 | 22 | 29823 |
| A0 | U514 | 3 | S381 |
| A10 | U206 | 11 | PAL20R8A |
| A10 | U205 | 15 | LS684 |
| A10 | U222 | 17 | PAL20R6 |
| A10 | U516 | 19 | S381 |
| A10 | U616 | 20 | 29823 |
| A10 | U121 | 6 | LS244 |
| A1 | U514 | 1 | S381 |
| A11 | U206 | 14 | PAL20R8A |
| A11 | U222 | 16 | PAL20R6 |
| A11 | U516 | 17 | S381 |
| A11 | U616 | 19 | 29823 |
| A11 | U121 | 8 | LS244 |
| A1 | U221 | 20 | PAL20R6 |
| A1 | U615 | 21 | 29823 |
| A12 | U121 | 11 | LS244 |
| A12 | U415 | 18 | S244 |
| A12 | U517 | 3 | S381 |
| A13 | U517 | 1 | S381 |
| A13 | U121 | 13 | LS244 |
| A13 | U415 | 16 | S244 |
| A13 | U616 | 17 | 29823 |
| A1 | U122 | 4 | LS244 |
| A14 | U415 | 14 | S244 |
| A14 | U121 | 15 | LS244 |
| A14 | U616 | 16 | 29823 |
| A14 | U517 | 19 | S381 |
| A15 | U415 | 12 | S244 |
| A15 | U616 | 15 | 29823 |
| A15 | U121 | 17 | LS244 |
| A2 | U221 | 19 | PAL20R6 |
| A2 | U615 | 20 | 29823 |
| A2 | U122 | 6 | LS244 |
| A3 | U514 | 17 | S381 |
| A3 | U221 | 18 | PAL20R6 |
| A3 | U615 | 19 | 29823 |
| A3 | U122 | 8 | LS244 |
| A4 | U122 | 11 | LS244 |
| A4 | U221 | 17 | PAL20R6 |
| A4 | U615 | 18 | 29823 |
| A4 | U205 | 2 | LS684 |
| A4 | U515 | 3 | S381 |
| A4 | U206 | 5 | PAL20R8A |
| A5 | U515 | 1 | S381 |
| A5 | U122 | 13 | LS244 |
| A5 | U221 | 16 | PAL20R6 |
| A5 | U615 | 17 | 29823 |
| A5 | U205 | 4 | LS684 |
| A5 | U206 | 6 | PAL20R8A |
| A6 | U122 | 15 | LS244 |

| | | | |
|---|---|---|---|
| A6 | U615 | 16 | 29823 |
| A6 | U515 | 19 | S381 |
| A6 | U222 | 21 | PAL20R6 |
| A6 | U205 | 6 | LS684 |
| A6 | U206 | 7 | PAL20R8A |
| A7 | U615 | 15 | 29823 |
| A7 | U122 | 17 | LS244 |
| A7 | U222 | 20 | PAL20R6 |
| A7 | U205 | 8 | LS684 |
| A8 | U205 | 11 | LS684 |
| A8 | U222 | 19 | PAL20R6 |
| A8 | U121 | 2 | LS244 |
| A8 | U616 | 22 | 29823 |
| A8 | U516 | 3 | S381 |
| A8 | U206 | 9 | PAL20R8A |
| A9 | U516 | 1 | S381 |
| A9 | U206 | 10 | PAL20R8A |
| A9 | U205 | 13 | LS684 |
| A9 | U222 | 18 | PAL20R6 |
| A9 | U616 | 21 | 29823 |
| A9 | U121 | 4 | LS244 |
| ACM/INPUT_EN~ | U415 | 1 | S244 |
| ACM/INPUT_EN~ | U410 | 11 | S240 |
| ACM/INPUT_EN~ | U315 | 13 | S32 |
| ACM/INPUT_EN~ | U409 | 6 | S374 |
| ACM_CE~ | U615 | 14 | 29823 |
| ACM_CE~ | U411 | 2 | S374 |
| ACM_CLR~ | U615 | 11 | 29823 |
| ACM_CLR~ | U411 | 6 | S374 |
| ACM_OE~ | U615 | 1 | 29823 |
| ACM_OE~ | U410 | 9 | S240 |
| ADR10 | U706 | 16 | LS240 |
| ADR10 | U505 | 3 | PAL12L10 |
| ADR10 | U503 | 4 | LS244 |
| ADR10~ | U706 | 4 | LS240 |
| ADR11 | U706 | 14 | LS240 |
| ADR11 | U505 | 4 | PAL12L10 |
| ADR11 | U503 | 6 | LS244 |
| ADR1 | U605 | 18 | LS240 |
| ADR11~ | U706 | 6 | LS240 |
| ADR1 | U406 | 2 | LS244 |
| ADR12 | U706 | 12 | LS240 |
| ADR12 | U505 | 5 | PAL12L10 |
| ADR12 | U503 | 8 | LS244 |
| ADR12~ | U706 | 8 | LS240 |
| ADR1 | U111 | 3 | CRC |
| ADR13 | U503 | 11 | LS244 |
| ADR13 | U505 | 6 | PAL12L10 |
| ADR13 | U706 | 9 | LS240 |
| ADR13~ | U706 | 11 | LS240 |
| ADR14 | U503 | 13 | LS244 |
| ADR14 | U505 | 7 | PAL12L10 |
| ADR14~ | U706 | 13 | LS240 |
| ADR15 | U507 | 1 | PAL20L10 |
| ADR15 | U503 | 15 | LS244 |
| ADR15 | U706 | 5 | LS240 |
| ADR15~ | U706 | 15 | LS240 |
| ADR16 | U507 | 2 | PAL20L10 |

| | | | |
|---|---|---|---|
| ADR16 | U706 | 3 | LS240 |
| ADR16~ | U706 | 17 | LS240 |
| ADR17 | U609 | 18 | LS240 |
| ADR17 | U507 | 3 | PAL20L10 |
| ADR17~ | U609 | 2 | LS240 |
| ADR18 | U609 | 16 | LS240 |
| ADR18 | U507 | 4 | PAL20L10 |
| ADR18~ | U609 | 4 | LS240 |
| ADR19 | U609 | 14 | LS240 |
| ADR19 | U507 | 5 | PAL20L10 |
| ADR19~ | U609 | 6 | LS240 |
| ADR1~ | U605 | 2 | LS240 |
| ADR20 | U609 | 12 | LS240 |
| ADR20 | U507 | 6 | PAL20L10 |
| ADR20~ | U609 | 8 | LS240 |
| ADR2 | U605 | 16 | LS240 |
| ADR21 | U507 | 7 | PAL20L10 |
| ADR21 | U609 | 9 | LS240 |
| ADR21~ | U609 | 11 | LS240 |
| ADR22 | U609 | 7 | LS240 |
| ADR22 | U507 | 8 | PAL20L10 |
| ADR22~ | U609 | 13 | LS240 |
| ADR23 | U609 | 5 | LS240 |
| ADR23 | U507 | 9 | PAL20L10 |
| ADR23~ | U609 | 15 | LS240 |
| ADR2 | U406 | 4 | LS244 |
| ADR2~ | U605 | 4 | LS240 |
| ADR3 | U605 | 14 | LS240 |
| ADR3 | U406 | 6 | LS244 |
| ADR3 | U617 | 9 | PAL20L8A |
| ADR3~ | U605 | 6 | LS240 |
| ADR4 | U617 | 10 | PAL20L8A |
| ADR4 | U605 | 12 | LS240 |
| ADR4 | U406 | 8 | LS244 |
| ADR4~ | U605 | 8 | LS240 |
| ADR5 | U617 | 11 | PAL20L8A |
| ADR5 | U605 | 9 | LS240 |
| ADR5~ | U605 | 11 | LS240 |
| ADR6 | U406 | 13 | LS244 |
| ADR6 | U605 | 7 | LS240 |
| ADR6~ | U605 | 13 | LS240 |
| ADR7 | U406 | 15 | LS244 |
| ADR7 | U605 | 5 | LS240 |
| ADR7~ | U605 | 15 | LS240 |
| ADR8 | U505 | 1 | PAL12L10 |
| ADR8 | U406 | 17 | LS244 |
| ADR8 | U605 | 3 | LS240 |
| ADR8 | U603 | 6 | PAL12L10 |
| ADR8~ | U605 | 17 | LS240 |
| ADR9 | U706 | 18 | LS240 |
| ADR9 | U505 | 2 | PAL12L10 |
| ADR9~ | U706 | 2 | LS240 |
| AGND | C103 | 1 | CAP 0.1UF |
| AGND | U123 | 12 | AD667 |
| AGND | U123 | 13 | AD667 |
| AGND | U123 | 14 | AD667 |
| AGND | U123 | 15 | AD667 |
| AGND | U123 | 16 | AD667 |

| | | | |
|---|---|---|---|
| AGND | C106 | 2 | CAP 0.01UF |
| AGND | U123 | 4 | AD667 |
| AGND | U123 | 5 | AD667 |
| ALU_OE | U611 | 1 | LS244 |
| ALU_OE | U411 | 12 | S374 |
| ALU_OE | U611 | 19 | LS244 |
| ALU_OE | U510 | 23 | PAL20L8A |
| ALU_OUT_CE~ | U610 | 14 | 29823 |
| ALU_OUT_CE~ | U411 | 9 | S374 |
| ALU_OUT_SEL~ | U506 | 1 | LS244 |
| ALU_OUT_SEL~ | U504 | 15 | PAL12L10 |
| ALU_OUT_SEL~ | U506 | 19 | LS244 |
| B0 | U317 | 21 | PAL20R6 |
| B0 | U501 | 22 | 29823 |
| B0 | U514 | 4 | S381 |
| B10 | U318 | 17 | PAL20R6 |
| B10 | U516 | 18 | S381 |
| B10 | U403 | 20 | 29823 |
| B11 | U516 | 16 | S381 |
| B11 | U403 | 19 | 29823 |
| B1 | U514 | 2 | S381 |
| B1 | U317 | 20 | PAL20R6 |
| B1 | U501 | 21 | 29823 |
| B12 | U403 | 18 | 29823 |
| B12 | U319 | 21 | PAL20R6 |
| B12 | U517 | 4 | S381 |
| B13 | U403 | 17 | 29823 |
| B13 | U517 | 2 | S381 |
| B13 | U319 | 20 | PAL20R6 |
| B14 | U403 | 16 | 29823 |
| B14 | U517 | 18 | S381 |
| B14 | U319 | 19 | PAL20R6 |
| B15 | U403 | 15 | 29823 |
| B15 | U517 | 16 | S381 |
| B15 | U319 | 18 | PAL20R6 |
| B2 | U514 | 18 | S381 |
| B2 | U317 | 19 | PAL20R6 |
| B2 | U501 | 20 | 29823 |
| B3 | U514 | 16 | S381 |
| B3 | U317 | 18 | PAL20R6 |
| B3 | U501 | 19 | 29823 |
| B4 | U317 | 17 | PAL20R6 |
| B4 | U501 | 18 | 29823 |
| B4 | U515 | 4 | S381 |
| B5 | U317 | 16 | PAL20R6 |
| B5 | U501 | 17 | 29823 |
| B5 | U515 | 2 | S381 |
| B6 | U501 | 16 | 29823 |
| B6 | U515 | 18 | S381 |
| B6 | U318 | 21 | PAL20R6 |
| B7 | U501 | 15 | 29823 |
| B7 | U515 | 16 | S381 |
| B7 | U318 | 20 | PAL20R6 |
| B8 | U318 | 19 | PAL20R6 |
| B8 | U403 | 22 | 29823 |
| B8 | U516 | 4 | S381 |
| B9 | U318 | 18 | PAL20R6 |
| B9 | U516 | 2 | S381 |
| B9 | U403 | 21 | 29823 |

| | | | |
|---|---|---|---|
| BD0 | U619 | 2 | PAL20R6 |
| BD10 | U618 | 6 | PAL20R6 |
| BD11 | U618 | 7 | PAL20R6 |
| BD1 | U619 | 3 | PAL20R6 |
| BD2 | U619 | 4 | PAL20R6 |
| BD3 | U619 | 5 | PAL20R6 |
| BD4 | U619 | 6 | PAL20R6 |
| BD5 | U619 | 7 | PAL20R6 |
| BD6 | U618 | 2 | PAL20R6 |
| BD7 | U618 | 3 | PAL20R6 |
| BD8 | U618 | 4 | PAL20R6 |
| BD9 | U618 | 5 | PAL20R6 |
| BR0 | U310 | 1 | 27S29 |
| BR0 | U312 | 19 | S273 |
| BR1 | U312 | 16 | S273 |
| BR1 | U310 | 2 | 27S29 |
| BR2 | U312 | 15 | S273 |
| BR2 | U310 | 3 | 27S29 |
| BR3 | U312 | 12 | S273 |
| BR3 | U310 | 4 | 27S29 |
| BR4 | U310 | 19 | 27S29 |
| BR4 | U314 | 6 | PAL20RA10 |
| BR4 | U312 | 9 | S273 |
| BUF_OE~ | U603 | 14 | PAL12L10 |
| BUF_OE~ | U301 | 22 | HM62256 |
| BUF_SEL~ | U603 | 11 | PAL12L10 |
| BUF_SEL~ | U718 | 15 | LS240 |
| BUF_SEL~ | U507 | 19 | PAL20L10 |
| BURST_CLK~ | U617 | 20 | PAL20L8A |
| BURST_CLK~ | U314 | 5 | PAL20RA10 |
| BURST_ENB~ | U505 | 23 | PAL12L10 |
| BURST_ENB~ | U617 | 5 | PAL20L8A |
| B_CLK | U619 | 1 | PAL20R6 |
| B_CLK | U617 | 21 | PAL20L8A |
| B_DATA_SEL~ | U619 | 13 | PAL20R6 |
| B_DATA_SEL~ | U407 | 6 | S374 |
| B_DC_CLK~ | U617 | 17 | PAL20L8A |
| B_STATUS~ | U617 | 3 | PAL20L8A |
| B_VIDEO_IN | U126 | 3 | IH5341 |
| B_VIDEO_IN | U126 | 5 | IH5341 |
| C12 | U517 | 15 | S381 |
| C12 | U513 | 9 | S182 |
| C4 | U513 | 12 | S182 |
| C4 | U515 | 15 | S381 |
| C8 | U513 | 11 | S182 |
| C8 | U516 | 15 | S381 |
| CARD_READY_N | R101 | 2 | RES 330 |
| CARD_READY_N | U103 | 9 | 26LS32 |
| CARD_READY_P | R101 | 1 | RES 330 |
| CARD_READY_P | U103 | 10 | 26LS32 |
| CARD_SEL~ | U507 | 15 | PAL20L10 |
| CARD_SEL~ | U709 | 19 | LS640 |
| CCD_DATA_SIM~ | U123 | 11 | AD667 |
| CCD_DATA_SIM~ | U119 | 12 | S109 |
| CCD_DATA_SIM~ | U504 | 17 | PAL12L10 |
| CCD_EOL | U204 | 10 | PAL20RA10 |
| CCD_EOL | U509 | 15 | PAL20L8A |
| CCD_EOL | U114 | 17 | LS240 |
| CCD_EOL | U117 | 2 | S74 |

| | | | |
|---|---|---|---|
| CCD_EOL_EN | U509 | 13 | PAL20L8A |
| CCD_EOL~ | U114 | 5 | LS240 |
| CCD_RUN_EN~ | U509 | 11 | PAL20L8A |
| CCD_RUN_EN~ | U415 | 9 | S244 |
| CCD_RUN~ | U415 | 11 | S244 |
| CCD_XCK~ | TPS101 | 2 | 4308R103 220/330 |
| CCD_XCK~ | U114 | 4 | LS240 |
| CCLK~ | U705 | 6 | LS240 |
| CI | U513 | 13 | S182 |
| CI | U514 | 15 | S381 |
| CI | U215 | 18 | PAL20L10 |
| CK1 | U607 | 1 | PAL20R8A |
| CK1 | U211 | 11 | LS377 |
| CK1 | U610 | 13 | 29823 |
| CK1 | U313 | 18 | S244 |
| CK1 | U405 | 2 | LS2569 |
| CK1 | U612 | 38 | PGA8034 |
| CK1 | U313 | 4 | S244 |
| CK1 | U612 | 44 | PGA8034 |
| CK1 | U612 | 45 | PGA8034 |
| CK2 | U305 | 1 | LS461 |
| CK2 | U312 | 11 | S273 |
| CK2 | U615 | 13 | 29823 |
| CK2 | U313 | 16 | S244 |
| CK2 | U314 | 4 | PAL20RA10 |
| CLEAR_COUNT~ | U305 | 11 | LS461 |
| CLEAR_COUNT~ | U203 | 15 | PAL20L8A |
| CLEAR_COUNT~ | U305 | 2 | LS461 |
| CLOCK | U414 | 2 | S08 |
| CLOCK | U413 | 5 | S74 |
| CLOCK | U314 | 9 | PAL20RA10 |
| COLOR_1 | U419 | 1 | S189 |
| COLOR_1 | U508 | 13 | LS240 |
| COLOR_1 | U408 | 14 | S139 |
| COLOR_1 | U409 | 2 | S374 |
| COLOR_1 | U203 | 5 | PAL20L8A |
| COLOR_1~ | U711 | 4 | LS244 |
| COLOR_1~ | U508 | 7 | LS240 |
| COLOR_2 | U408 | 13 | S139 |
| COLOR_2 | U419 | 15 | S189 |
| COLOR_2 | U409 | 5 | S374 |
| COLOR_2 | U203 | 6 | PAL20L8A |
| COLOR_2~ | U508 | 5 | LS240 |
| COLOR_2~ | U711 | 6 | LS244 |
| CONTROL_CLK1~ | U109 | 11 | LS273 |
| CONTROL_CLK1~ | U505 | 17 | PAL12L10 |
| CONTROL_CLK2~ | U714 | 11 | LS273 |
| CONTROL_CLK2~ | U505 | 18 | PAL12L10 |
| CONVERT | U320 | 11 | LS240 |
| CONVERT | U111 | 13 | CRC |
| CONVERT | U219 | 3 | S86 |
| CONVERT~ | U320 | 9 | LS240 |
| CRC_CS~ | U505 | 15 | PAL12L10 |
| CRC_CS~ | U111 | 6 | CRC |
| DA0 | U123 | 17 | AD667 |
| DA1 | U123 | 18 | AD667 |
| DA2 | U123 | 19 | AD667 |
| DA3 | U123 | 20 | AD667 |

| | | | |
|---|---|---|---|
| DA4 | U123 | 21 | AD667 |
| DA5 | U123 | 22 | AD667 |
| DA6 | U123 | 23 | AD667 |
| DA7 | U123 | 24 | AD667 |
| DA8 | U123 | 25 | AD667 |
| DA9 | U123 | 26 | AD667 |
| DAA | U123 | 27 | AD667 |
| DAB | U123 | 28 | AD667 |
| DARK_MEM_SEL~ | U507 | 16 | PAL20L10 |
| DARK_MEM_SEL~ | U603 | 8 | PAL12L10 |
| DARK_REF/MEM~ | U501 | 1 | 29823 |
| DARK_REF/MEM~ | U409 | 15 | S374 |
| DARK_REF/MEM~ | U410 | 6 | S240 |
| DARK_REF_SEL~ | U409 | 12 | S374 |
| DARK_REF_SEL~ | U419 | 13 | S189 |
| DAT0 | U111 | 1 | CRC |
| DAT0 | U204 | 11 | PAL20RA10 |
| DAT0 | U117 | 12 | S74 |
| DAT0 | U709 | 18 | LS640 |
| DAT0 | U502 | 2 | LS245 |
| DAT0 | U719 | 3 | LS273 |
| DAT0 | U221 | 8 | PAL20R6 |
| DAT0~ | U709 | 2 | LS640 |
| DAT1 | U122 | 16 | LS244 |
| DAT1 | U709 | 17 | LS640 |
| DAT1 | U502 | 3 | LS245 |
| DAT1 | U719 | 4 | LS273 |
| DAT1 | U221 | 9 | PAL20R6 |
| DAT1~ | U709 | 3 | LS640 |
| DAT2 | U221 | 10 | PAL20R6 |
| DAT2 | U122 | 14 | LS244 |
| DAT2 | U709 | 16 | LS640 |
| DAT2 | U502 | 4 | LS245 |
| DAT2 | U719 | 7 | LS273 |
| DAT2~ | U709 | 4 | LS640 |
| DAT3 | U221 | 11 | PAL20R6 |
| DAT3 | U122 | 12 | LS244 |
| DAT3 | U709 | 15 | LS640 |
| DAT3 | U502 | 5 | LS245 |
| DAT3 | U719 | 8 | LS273 |
| DAT3~ | U709 | 5 | LS640 |
| DAT4 | U719 | 13 | LS273 |
| DAT4 | U709 | 14 | LS640 |
| DAT4 | U502 | 6 | LS245 |
| DAT4 | U122 | 9 | LS244 |
| DAT4~ | U709 | 6 | LS640 |
| DAT5 | U709 | 13 | LS640 |
| DAT5 | U719 | 14 | LS273 |
| DAT5 | U221 | 23 | PAL20R6 |
| DAT5 | U122 | 7 | LS244 |
| DAT5~ | U709 | 7 | LS640 |
| DAT6 | U709 | 12 | LS640 |
| DAT6 | U719 | 17 | LS273 |
| DAT6 | U122 | 5 | LS244 |
| DAT6 | U222 | 8 | PAL20R6 |
| DAT6~ | U709 | 8 | LS640 |

| | | | |
|---|---|---|---|
| DAT7 | U709 | 11 | LS640 |
| DAT7 | U719 | 18 | LS273 |
| DAT7 | U122 | 3 | LS244 |
| DAT7 | U222 | 9 | PAL20R6 |
| DAT7~ | U709 | 9 | LS640 |
| DAT8 | U222 | 10 | PAL20R6 |
| DAT8 | U712 | 18 | LS640 |
| DAT8 | U701 | 2 | LS245 |
| DAT8 | U714 | 3 | LS273 |
| DAT8~ | U712 | 2 | LS640 |
| DAT9 | U222 | 11 | PAL20R6 |
| DAT9 | U121 | 16 | LS244 |
| DAT9 | U712 | 17 | LS640 |
| DAT9 | U701 | 3 | LS245 |
| DAT9 | U714 | 4 | LS273 |
| DAT9~ | U712 | 3 | LS640 |
| DATA | U222 | 14 | PAL20R6 |
| DATA | U712 | 16 | LS640 |
| DATA | U701 | 4 | LS245 |
| DATA | U714 | 7 | LS273 |
| DATA_EN | U203 | 10 | PAL20L8A |
| DATA_EN | U117 | 9 | S74 |
| DATA_EN~ | U117 | 11 | S74 |
| DATA_EN~ | U504 | 18 | PAL12L10 |
| DATA_SIM~ | U505 | 21 | PAL12L10 |
| DATA_SIM~ | U617 | 8 | PAL20L8A |
| DATA~ | U712 | 4 | LS640 |
| DATB | U121 | 12 | LS244 |
| DATB | U712 | 15 | LS640 |
| DATB | U222 | 23 | PAL20R6 |
| DATB | U701 | 5 | LS245 |
| DATB | U714 | 8 | LS273 |
| DATB~ | U712 | 5 | LS640 |
| DATC | U714 | 13 | LS273 |
| DATC | U712 | 14 | LS640 |
| DATC | U701 | 6 | LS245 |
| DATC | U121 | 9 | LS244 |
| DATC~ | U712 | 6 | LS640 |
| DATD | U712 | 13 | LS640 |
| DATD | U714 | 14 | LS273 |
| DATD | U121 | 7 | LS244 |
| DATD~ | U712 | 7 | LS640 |
| DATE | U712 | 12 | LS640 |
| DATE | U714 | 17 | LS273 |
| DATE | U121 | 5 | LS244 |
| DATE | U701 | 8 | LS245 |
| DATE~ | U712 | 8 | LS640 |
| DATF | U712 | 11 | LS640 |
| DATF | U714 | 18 | LS273 |
| DATF | U121 | 3 | LS244 |
| DATF | U701 | 9 | LS245 |
| DATF~ | U712 | 9 | LS640 |
| DC_CLK~ | U505 | 20 | PAL12L10 |
| DC_CLK~ | U617 | 7 | PAL20L8A |
| DIAG | U125 | 10 | IH5341 |
| DIAG~ | U125 | 12 | IH5341 |
| DOUT0 | U107 | 1 | 26LS31 |
| DOUT0 | U301 | 11 | HM62256 |
| DOUT0 | U708 | 18 | LS245 |

| | | | |
|---|---|---|---|
| DOUT0 | U607 | 21 | PAL20R8A |
| DOUT10 | U208 | 11 | PAL20R8A |
| DOUT10 | U401 | 13 | HM62256 |
| DOUT10 | U108 | 15 | LS684 |
| DOUT10 | U713 | 16 | LS245 |
| DOUT10 | U606 | 17 | PAL20R8A |
| DOUT10 | U105 | 9 | 26LS31 |
| DOUT11 | U208 | 14 | PAL20R8A |
| DOUT11 | U713 | 15 | LS245 |
| DOUT11 | U606 | 16 | PAL20R8A |
| DOUT11 | U108 | 17 | LS684 |
| DOUT1 | U301 | 12 | HM62256 |
| DOUT1 | U708 | 17 | LS245 |
| DOUT1 | U607 | 20 | PAL20R8A |
| DOUT12 | U713 | 14 | LS245 |
| DOUT12 | U607 | 15 | PAL20R8A |
| DOUT12 | U401 | 16 | HM62256 |
| DOUT13 | U713 | 13 | LS245 |
| DOUT13 | U401 | 17 | HM62256 |
| DOUT13 | U607 | 22 | PAL20R8A |
| DOUT14 | U713 | 12 | LS245 |
| DOUT14 | U606 | 15 | PAL20R8A |
| DOUT14 | U401 | 18 | HM62256 |
| DOUT15 | U713 | 11 | LS245 |
| DOUT15 | U401 | 19 | HM62256 |
| DOUT15 | U606 | 22 | PAL20R8A |
| DOUT1 | U107 | 7 | 26LS31 |
| DOUT2 | U301 | 13 | HM62256 |
| DOUT2 | U708 | 16 | LS245 |
| DOUT2 | U607 | 19 | PAL20R8A |
| DOUT3 | U107 | 15 | 26LS31 |
| DOUT3 | U607 | 18 | PAL20R8A |
| DOUT4 | U106 | 1 | 26LS31 |
| DOUT4 | U708 | 14 | LS245 |
| DOUT4 | U301 | 16 | HM62256 |
| DOUT4 | U607 | 17 | PAL20R8A |
| DOUT4 | U108 | 2 | LS684 |
| DOUT4 | U208 | 5 | PAL20R8A |
| DOUT5 | U708 | 13 | LS245 |
| DOUT5 | U607 | 16 | PAL20R8A |
| DOUT5 | U301 | 17 | HM62256 |
| DOUT5 | U108 | 4 | LS684 |
| DOUT5 | U208 | 6 | PAL20R8A |
| DOUT5 | U106 | 7 | 26LS31 |
| DOUT6 | U708 | 12 | LS245 |
| DOUT6 | U301 | 18 | HM62256 |
| DOUT6 | U606 | 21 | PAL20R8A |
| DOUT6 | U108 | 6 | LS684 |
| DOUT6 | U208 | 7 | PAL20R8A |
| DOUT6 | U106 | 9 | 26LS31 |
| DOUT7 | U708 | 11 | LS245 |
| DOUT7 | U106 | 15 | 26LS31 |
| DOUT7 | U301 | 19 | HM62256 |
| DOUT7 | U606 | 20 | PAL20R8A |
| DOUT7 | U108 | 8 | LS684 |
| DOUT8 | U105 | 1 | 26LS31 |
| DOUT8 | U108 | 11 | LS684 |
| DOUT8 | U713 | 18 | LS245 |
| DOUT8 | U606 | 19 | PAL20R8A |
| DOUT8 | U208 | 9 | PAL20R8A |

| | | | |
|---|---|---|---|
| DOUT9 | U208 | 10 | PAL20R8A |
| DOUT9 | U401 | 12 | HM62256 |
| DOUT9 | U108 | 13 | LS684 |
| DOUT9 | U713 | 17 | LS245 |
| DOUT9 | U606 | 18 | PAL20R8A |
| DOUT9 | U105 | 7 | 26LS31 |
| DR0 | U402 | 11 | HM62256 |
| DR0 | U502 | 18 | LS245 |
| DR0 | U317 | 22 | PAL20R6 |
| DR0 | U501 | 3 | 29823 |
| DR0 | U416 | 5 | S189 |
| DR10 | U302 | 13 | HM62256 |
| DR10 | U701 | 16 | LS245 |
| DR10 | U318 | 4 | PAL20R6 |
| DR10 | U403 | 5 | 29823 |
| DR10 | U418 | 9 | S189 |
| DR11 | U418 | 11 | S189 |
| DR11 | U302 | 15 | HM62256 |
| DR1 | U402 | 12 | HM62256 |
| DR11 | U318 | 5 | PAL20R6 |
| DR11 | U403 | 6 | 29823 |
| DR1 | U502 | 17 | LS245 |
| DR12 | U701 | 14 | LS245 |
| DR12 | U302 | 16 | HM62256 |
| DR12 | U319 | 22 | PAL20R6 |
| DR1 | U317 | 23 | PAL20R6 |
| DR12 | U419 | 5 | S189 |
| DR12 | U318 | 6 | PAL20R6 |
| DR12 | U403 | 7 | 29823 |
| DR13 | U701 | 13 | LS245 |
| DR13 | U302 | 17 | HM62256 |
| DR13 | U319 | 23 | PAL20R6 |
| DR13 | U419 | 7 | S189 |
| DR13 | U403 | 8 | 29823 |
| DR1 | U501 | 4 | 29823 |
| DR14 | U701 | 12 | LS245 |
| DR14 | U302 | 18 | HM62256 |
| DR14 | U319 | 2 | PAL20R6 |
| DR14 | U318 | 8 | PAL20R6 |
| DR14 | U403 | 9 | 29823 |
| DR15 | U403 | 10 | 29823 |
| DR15 | U701 | 11 | LS245 |
| DR15 | U302 | 19 | HM62256 |
| DR15 | U319 | 3 | PAL20R6 |
| DR15 | U318 | 9 | PAL20R6 |
| DR1 | U416 | 7 | S189 |
| DR2 | U402 | 13 | HM62256 |
| DR2 | U502 | 16 | LS245 |
| DR2 | U317 | 2 | PAL20R6 |
| DR2 | U501 | 5 | 29823 |
| DR2 | U416 | 9 | S189 |
| DR3 | U416 | 11 | S189 |
| DR3 | U402 | 15 | HM62256 |
| DR3 | U317 | 3 | PAL20R6 |
| DR3 | U501 | 6 | 29823 |
| DR4 | U502 | 14 | LS245 |
| DR4 | U402 | 16 | HM62256 |
| DR4 | U317 | 4 | PAL20R6 |
| DR4 | U417 | 5 | S189 |

| | | | |
|---|---|---|---|
| DR4 | U501 | 7 | 29823 |
| DR5 | U502 | 13 | LS245 |
| DR5 | U402 | 17 | HM62256 |
| DR5 | U317 | 5 | PAL20R6 |
| DR5 | U417 | 7 | S189 |
| DR5 | U501 | 8 | 29823 |
| DR6 | U502 | 12 | LS245 |
| DR6 | U402 | 18 | HM62256 |
| DR6 | U318 | 22 | PAL20R6 |
| DR6 | U317 | 6 | PAL20R6 |
| DR6 | U501 | 9 | 29823 |
| DR7 | U501 | 10 | 29823 |
| DR7 | U502 | 11 | LS245 |
| DR7 | U402 | 19 | HM62256 |
| DR7 | U318 | 23 | PAL20R6 |
| DR7 | U317 | 7 | PAL20R6 |
| DR8 | U302 | 11 | HM62256 |
| DR8 | U701 | 18 | LS245 |
| DR8 | U318 | 2 | PAL20R6 |
| DR8 | U403 | 3 | 29823 |
| DR8 | U418 | 5 | S189 |
| DR8 | U317 | 8 | PAL20R6 |
| DR9 | U302 | 12 | HM62256 |
| DR9 | U701 | 17 | LS245 |
| DR9 | U318 | 3 | PAL20R6 |
| DR9 | U403 | 4 | 29823 |
| DR9 | U418 | 7 | S189 |
| DR9 | U317 | 9 | PAL20R6 |
| E0 | U510 | 1 | PAL20L8A |
| E0 | U506 | 2 | LS244 |
| E0 | U511 | 22 | 29823 |
| E10 | U610 | 20 | 29823 |
| E10 | U509 | 4 | PAL20L8A |
| E10 | U608 | 6 | LS244 |
| E11 | U610 | 19 | 29823 |
| E11 | U509 | 5 | PAL20L8A |
| E11 | U608 | 8 | LS244 |
| E1 | U510 | 2 | PAL20L8A |
| E1 | U511 | 21 | 29823 |
| E12 | U608 | 11 | LS244 |
| E12 | U610 | 18 | 29823 |
| E12 | U509 | 6 | PAL20L8A |
| E12 | U510 | 9 | PAL20L8A |
| E13 | U510 | 10 | PAL20L8A |
| E13 | U608 | 13 | LS244 |
| E13 | U610 | 17 | 29823 |
| E13 | U509 | 7 | PAL20L8A |
| E1 | U506 | 4 | LS244 |
| E14 | U510 | 11 | PAL20L8A |
| E14 | U608 | 15 | LS244 |
| E14 | U610 | 16 | 29823 |
| E14 | U509 | 8 | PAL20L8A |
| E15 | U510 | 13 | PAL20L8A |
| E15 | U610 | 15 | 29823 |
| E15 | U608 | 17 | LS244 |
| E15 | U509 | 9 | PAL20L8A |
| E2 | U511 | 20 | 29823 |
| E2 | U510 | 3 | PAL20L8A |
| E2 | U506 | 6 | LS244 |

| | | | |
|---|---|---|---|
| E3 | U511 | 19 | 29823 |
| E3 | U510 | 4 | PAL20L8A |
| E3 | U506 | 8 | LS244 |
| E4 | U506 | 11 | LS244 |
| E4 | U511 | 18 | 29823 |
| E4 | U510 | 5 | PAL20L8A |
| E5 | U506 | 13 | LS244 |
| E5 | U511 | 17 | 29823 |
| E5 | U510 | 6 | PAL20L8A |
| E6 | U506 | 15 | LS244 |
| E6 | U511 | 16 | 29823 |
| E6 | U510 | 7 | PAL20L8A |
| E7 | U509 | 1 | PAL20L8A |
| E7 | U511 | 15 | 29823 |
| E7 | U506 | 17 | LS244 |
| E7 | U510 | 8 | PAL20L8A |
| E8 | U509 | 2 | PAL20L8A |
| E8 | U610 | 22 | 29823 |
| E9 | U610 | 21 | 29823 |
| E9 | U509 | 3 | PAL20L8A |
| E9 | U608 | 4 | LS244 |
| EOC_SIM | U719 | 5 | LS273 |
| EOC_SIM | U617 | 6 | PAL20L8A |
| EOL_N | U104 | 2 | 26LS31 |
| EOL_P | U104 | 3 | 26LS31 |
| EOL~ | U203 | 17 | PAL20L8A |
| EOL~ | U204 | 7 | PAL20RA10 |
| F0 | U615 | 3 | 29823 |
| F0 | U416 | 4 | S189 |
| F0 | U514 | 8 | S381 |
| F10 | U418 | 10 | S189 |
| F10 | U516 | 11 | S381 |
| F10 | U616 | 5 | 29823 |
| F11 | U516 | 12 | S381 |
| F11 | U616 | 6 | 29823 |
| F12 | U419 | 4 | S189 |
| F12 | U616 | 7 | 29823 |
| F12 | U517 | 8 | S381 |
| F13 | U419 | 6 | S189 |
| F13 | U616 | 8 | 29823 |
| F13 | U517 | 9 | S381 |
| F1 | U615 | 4 | 29823 |
| F14 | U419 | 10 | S189 |
| F14 | U517 | 11 | S381 |
| F14 | U616 | 9 | 29823 |
| F15 | U616 | 10 | 29823 |
| F15 | U517 | 12 | S381 |
| F1 | U416 | 6 | S189 |
| F1 | U514 | 9 | S381 |
| F2 | U416 | 10 | S189 |
| F2 | U514 | 11 | S381 |
| F2 | U615 | 5 | 29823 |
| F3 | U514 | 12 | S381 |
| F3 | U615 | 6 | 29823 |
| F4 | U417 | 4 | S189 |
| F4 | U615 | 7 | 29823 |
| F4 | U515 | 8 | S381 |
| F5 | U417 | 6 | S189 |
| F5 | U615 | 8 | 29823 |

| | | | |
|---|---|---|---|
| F5 | U515 | 9 | S381 |
| F6 | U417 | 10 | S189 |
| F6 | U515 | 11 | S381 |
| F6 | U615 | 9 | 29823 |
| F7 | U615 | 10 | 29823 |
| F7 | U515 | 12 | S381 |
| F8 | U616 | 3 | 29823 |
| F8 | U418 | 4 | S189 |
| F8 | U516 | 8 | S381 |
| F9 | U616 | 4 | 29823 |
| F9 | U418 | 6 | S189 |
| F9 | U516 | 9 | S381 |
| FIRST_LINE | U313 | 11 | S244 |
| FIRST_LINE | U204 | 19 | PAL20RA10 |
| FIRST_LINE | U206 | 4 | PAL20R8A |
| G0 | U602 | 11 | HM62256 |
| G0 | U514 | 13 | S381 |
| G0 | U707 | 18 | LS245 |
| G0 | U704 | 2 | LS244 |
| G0 | U513 | 3 | S182 |
| G10 | U601 | 13 | HM62256 |
| G10 | U702 | 16 | LS245 |
| G10 | U703 | 6 | LS244 |
| G1 | U513 | 1 | S182 |
| G11 | U601 | 15 | HM62256 |
| G1 | U602 | 12 | HM62256 |
| G1 | U515 | 13 | S381 |
| G1 | U707 | 17 | LS245 |
| G11 | U703 | 8 | LS244 |
| G12 | U703 | 11 | LS244 |
| G12 | U702 | 14 | LS245 |
| G12 | U601 | 16 | HM62256 |
| G13 | U703 | 13 | LS244 |
| G13 | U601 | 17 | HM62256 |
| G1 | U704 | 4 | LS244 |
| G14 | U702 | 12 | LS245 |
| G14 | U703 | 15 | LS244 |
| G14 | U601 | 18 | HM62256 |
| G15 | U702 | 11 | LS245 |
| G15 | U703 | 17 | LS244 |
| G15 | U601 | 19 | HM62256 |
| G2 | U516 | 13 | S381 |
| G2 | U513 | 14 | S182 |
| G2 | U707 | 16 | LS245 |
| G2 | U704 | 6 | LS244 |
| G3 | U602 | 15 | HM62256 |
| G3 | U704 | 8 | LS244 |
| G4 | U704 | 11 | LS244 |
| G4 | U707 | 14 | LS245 |
| G4 | U602 | 16 | HM62256 |
| G5 | U707 | 13 | LS245 |
| G5 | U602 | 17 | HM62256 |
| G6 | U707 | 12 | LS245 |
| G6 | U704 | 15 | LS244 |
| G6 | U602 | 18 | HM62256 |
| G7 | U707 | 11 | LS245 |
| G7 | U704 | 17 | LS244 |
| G7 | U602 | 19 | HM62256 |
| G8 | U601 | 11 | HM62256 |

| | | | |
|---|---|---|---|
| G8 | U702 | 18 | LS245 |
| G8 | U703 | 2 | LS244 |
| G9 | U601 | 12 | HM62256 |
| G9 | U702 | 17 | LS245 |
| G9 | U703 | 4 | LS244 |
| GAIN_CONTROL~ | U617 | 15 | PAL20L8A |
| GAIN_MEM_SEL~ | U603 | 10 | PAL12L10 |
| GAIN_MEM_SEL~ | U507 | 18 | PAL20L10 |
| GD0 | U420 | 2 | PAL20R6 |
| GD10 | U421 | 6 | PAL20R6 |
| GD11 | U421 | 7 | PAL20R6 |
| GD1 | U420 | 3 | PAL20R6 |
| GD2 | U420 | 4 | PAL20R6 |
| GD3 | U420 | 5 | PAL20R6 |
| GD4 | U420 | 6 | PAL20R6 |
| GD5 | U420 | 7 | PAL20R6 |
| GD6 | U421 | 2 | PAL20R6 |
| GD7 | U421 | 3 | PAL20R6 |
| GD8 | U421 | 4 | PAL20R6 |
| GD9 | U421 | 5 | PAL20R6 |
| GND | U610 | 1 | 29823 |
| GND | U107 | 12 | 26LS31 |
| GND | U119 | 13 | S109 |
| GND | U408 | 15 | S139 |
| GND | U722 | 16 | 316A221 220 |
| GND | U313 | 17 | S244 |
| GND | U207 | 18 | 2018 |
| GND | U508 | 19 | LS240 |
| GND | U415 | 2 | S244 |
| GND | U302 | 20 | HM62256 |
| GND | U302 | 22 | HM62256 |
| GND | U207 | 23 | 2018 |
| GND | U308 | 3 | LS684 |
| GND | U612 | 39 | PGA8034 |
| GND | U415 | 4 | S244 |
| GND | U612 | 40 | PGA8034 |
| GND | U612 | 46 | PGA8034 |
| GND | U612 | 47 | PGA8034 |
| GND | U415 | 6 | S244 |
| GND | U612 | 64 | PGA8034 |
| GND | U612 | 65 | PGA8034 |
| GND | U612 | 66 | PGA8034 |
| GND | U514 | 7 | S381 |
| GND | U415 | 8 | S244 |
| G_CLK | U420 | 1 | PAL20R6 |
| G_CLK | U617 | 22 | PAL20L8A |
| G_DATA_SEL~ | U420 | 13 | PAL20R6 |
| G_DATA_SEL~ | U407 | 5 | S374 |
| G_DC_CLK~ | U617 | 18 | PAL20L8A |
| G_STATUS~ | U617 | 2 | PAL20L8A |
| G_VIDEO_IN | U125 | 3 | IH5341 |
| G_VIDEO_IN | U125 | 5 | IH5341 |
| HOLD/TRACK~ | U320 | 7 | LS240 |
| HOST_CLK~ | U410 | 13 | S240 |
| HOST_CLK~ | U505 | 22 | PAL12L10 |
| I12 | U215 | 19 | PAL20L10 |
| I12 | U307 | 6 | LS684 |
| I13 | U215 | 20 | PAL20L10 |
| I13 | U307 | 4 | LS684 |

| | | | |
|---|---|---|---|
| I14 | U307 | 2 | LS684 |
| I14 | U215 | 21 | PAL20L10 |
| INIT | U609 | 3 | LS240 |
| INIT | U505 | 8 | PAL12L10 |
| INIT~ | U714 | 1 | LS273 |
| INIT~ | U316 | 11 | 316A102 1K |
| INIT~ | U705 | 12 | LS240 |
| INPUT_CARD_RDY | U711 | 17 | LS244 |
| INPUT_CARD_RDY | U718 | 7 | LS240 |
| INPUT_EOL~ | U104 | 1 | 26LS31 |
| INPUT_EOL~ | U203 | 19 | PAL20L8A |
| INPUT_EOL~ | U102 | 8 | LS244 |
| INPUT_SEL~ | U122 | 1 | LS244 |
| INPUT_SEL~ | U122 | 19 | LS244 |
| INPUT_SEL~ | U504 | 22 | PAL12L10 |
| INST_EN~ | U211 | 1 | LS377 |
| INST_EN~ | U314 | 11 | PAL20RA10 |
| INST_EN~ | U312 | 6 | S273 |
| INST_EN~ | U215 | 7 | PAL20L10 |
| INV_DATA | U719 | 12 | LS273 |
| INV_DATA | U221 | 22 | PAL20R6 |
| TIM_PIXEL_CLK~ | | J4-11 | CONNECTOR |
| CCD_EOL~ | | J4-13 | CONNECTOR |
| TRANSPORT_CLK~ | | J4-15 | CONNECTOR |
| CCD_XCK~ | | J4-17 | CONNECTOR |
| OSC | | J4-19 | CONNECTOR |
| OUT1_N | | J5-1 | CONNECTOR |
| OUT5_P | | J5-10 | CONNECTOR |
| OUT6_N | | J5-11 | CONNECTOR |
| OUT6_P | | J5-12 | CONNECTOR |
| OUT7_N | | J5-13 | CONNECTOR |
| OUT7_P | | J5-14 | CONNECTOR |
| OUT8_N | | J5-15 | CONNECTOR |
| OUT8_P | | J5-16 | CONNECTOR |
| OUT9_N | | J5-17 | CONNECTOR |
| OUT9_P | | J5-18 | CONNECTOR |
| OUT10_N | | J5-19 | CONNECTOR |
| OUT1_P | | J5-2 | CONNECTOR |
| OUT10_P | | J5-20 | CONNECTOR |
| OUT11_N | | J5-21 | CONNECTOR |
| OUT11_P | | J5-22 | CONNECTOR |
| OUT12_N | | J5-23 | CONNECTOR |
| OUT12_P | | J5-24 | CONNECTOR |
| STROBE1_N | | J5-25 | CONNECTOR |
| STROBE1_P | | J5-26 | CONNECTOR |
| STROBE2_N | | J5-27 | CONNECTOR |
| STROBE2_P | | J5-28 | CONNECTOR |
| STROBE3_N | | J5-29 | CONNECTOR |
| OUT2_N | | J5-3 | CONNECTOR |
| STROBE3_P | | J5-30 | CONNECTOR |
| EOL_N | | J5-31 | CONNECTOR |
| EOL_P | | J5-32 | CONNECTOR |
| LINE_REQ_N | | J5-33 | CONNECTOR |
| LINE_REQ_P | | J5-34 | CONNECTOR |
| CARD_READY_P | | J5-35 | CONNECTOR |
| CARD_READY_N | | J5-36 | CONNECTOR |
| OUT2_P | | J5-4 | CONNECTOR |
| OUT3_N | | J5-5 | CONNECTOR |
| OUT3_P | | J5-6 | CONNECTOR |

| | | | |
|---|---|---|---|
| OUT4¯N | | J5-7 | CONNECTOR |
| OUT4¯P | | J5-8 | CONNECTOR |
| OUT5¯N | | J5-9 | CONNECTOR |
| LF0~ | U720 | 2 | LS240 |
| LF10~ | U721 | 6 | LS240 |
| LF11~ | U721 | 8 | LS240 |
| LF12~ | U721 | 11 | LS240 |
| LF13~ | U721 | 13 | LS240 |
| LF14~ | U721 | 15 | LS240 |
| LF15~ | U721 | 17 | LS240 |
| LF1~ | U720 | 4 | LS240 |
| LF2~ | U720 | 6 | LS240 |
| LF3~ | U720 | 8 | LS240 |
| LF4~ | U720 | 11 | LS240 |
| LF5~ | U720 | 13 | LS240 |
| LF6~ | U720 | 15 | LS240 |
| LF7~ | U720 | 17 | LS240 |
| LF8~ | U721 | 2 | LS240 |
| LF9~ | U721 | 4 | LS240 |
| LIGHT/GAIN~ | U703 | 1 | LS244 |
| LIGHT/GAIN~ | U320 | 15 | LS240 |
| LIGHT/GAIN~ | U703 | 19 | LS244 |
| LIGHT/GAIN~ | U116 | 3 | LS10 |
| LIGHT_CLK~ | U320 | 5 | LS240 |
| LIGHT¯CLK~ | U711 | 8 | LS244 |
| LIGHT¯FACT_EN | U116 | 4 | LS10 |
| LIGHT¯FACT¯EN | U116 | 5 | LS10 |
| LINE_REQ_N | U103 | 1 | 26LS32 |
| LINE¯REQ¯N | R102 | 2 | RES 330 |
| LINE¯REQ¯P | R102 | 1 | RES 330 |
| LINE¯REQ¯P | U103 | 2 | 26LS32 |
| LOAD¯DARK_CU~ | U501 | 14 | 29823 |
| LOAD¯DARK¯CU~ | U411 | 16 | S374 |
| M1 | U715 | 15 | LS244 |
| M1 | U714 | 5 | LS273 |
| M2 | U715 | 17 | LS244 |
| M2 | U714 | 2 | LS273 |
| MAX_SEL~ | U110 | 1 | LS244 |
| MAX¯SEL~ | U407 | 13 | S374 |
| MAX¯SEL~ | U603 | 18 | PAL12L10 |
| MAX¯SEL~ | U110 | 19 | LS244 |
| MBINIT~ | U609 | 17 | LS240 |
| MBRDC~ | U705 | 2 | LS240 |
| MBWTC~ | U705 | 4 | LS240 |
| MDARK_EN~ | U502 | 19 | LS245 |
| MDARK¯EN~ | U603 | 20 | PAL12L10 |
| MEA0 | U302 | 10 | HM62256 |
| MEA0 | U304 | 18 | S244 |
| MEA10 | U303 | 14 | S244 |
| MEA10 | U302 | 21 | HM62256 |
| MEA11 | U303 | 12 | S244 |
| MEA11 | U302 | 23 | HM62256 |
| MEA1 | U304 | 16 | S244 |
| MEA12 | U302 | 2 | HM62256 |
| MEA12 | U303 | 9 | S244 |
| MEA13 | U302 | 26 | HM62256 |
| MEA13 | U303 | 7 | S244 |
| MEA14 | U302 | 1 | HM62256 |
| MEA14 | U303 | 5 | S244 |

| | | | |
|---|---|---|---|
| MEA1 | U302 | 9 | HM62256 |
| MEA2 | U304 | 14 | S244 |
| MEA2 | U302 | 8 | HM62256 |
| MEA3 | U304 | 12 | S244 |
| MEA3 | U302 | 7 | HM62256 |
| MEA4 | U302 | 6 | HM62256 |
| MEA4 | U304 | 9 | S244 |
| MEA5 | U302 | 5 | HM62256 |
| MEA5 | U304 | 7 | S244 |
| MEA6 | U302 | 4 | HM62256 |
| MEA6 | U304 | 5 | S244 |
| MEA7 | U304 | 3 | S244 |
| MEA8 | U303 | 18 | S244 |
| MEA8 | U302 | 25 | HM62256 |
| MEA9 | U303 | 16 | S244 |
| MEA9 | U302 | 24 | HM62256 |
| MEMORY_SEL~ | U604 | 1 | LS244 |
| MEMORY_SEL~ | U508 | 17 | LS240 |
| MEMORY_SEL~ | U604 | 19 | LS244 |
| MEMORY_SEL~ | U507 | 20 | PAL20L10 |
| MGAIN_EN~ | U707 | 19 | LS245 |
| MODE1 | U310 | 5 | 27S29 |
| MODE1 | U211 | 9 | LS377 |
| MODE2 | U215 | 10 | PAL20L10 |
| MODE2 | U310 | 16 | 27S29 |
| MODE2 | U211 | 6 | LS377 |
| MODE3 | U215 | 11 | PAL20L10 |
| MODE3 | U310 | 17 | 27S29 |
| MODE3 | U211 | 5 | LS377 |
| MODE4 | U215 | 13 | PAL20L10 |
| MODE4 | U310 | 18 | 27S29 |
| MODE4 | U211 | 2 | LS377 |
| MODE_2~ | U413 | 11 | S74 |
| MODE_2~ | U215 | 22 | PAL20L10 |
| MODE_EOL~ | U203 | 11 | PAL20L8A |
| MODE_EOL~ | U413 | 13 | S74 |
| MODE_EOL~ | U215 | 15 | PAL20L10 |
| MODE_EOL~ | U314 | 3 | PAL20RA10 |
| MODE_EOL~ | U204 | 8 | PAL20RA10 |
| MODE_EOL~ | U405 | 9 | LS2569 |
| MRDC | U507 | 11 | PAL20L10 |
| MRDC | U705 | 18 | LS240 |
| MRDC | U504 | 8 | PAL12L10 |
| MRD~ | U709 | 1 | LS640 |
| MRD~ | U505 | 11 | PAL12L10 |
| MRD~ | U507 | 22 | PAL20L10 |
| MRD~ | U111 | 5 | CRC |
| MWE~ | U505 | 10 | PAL12L10 |
| MWE~ | U116 | 12 | LS10 |
| MWE~ | U603 | 13 | PAL12L10 |
| MWE~ | U617 | 14 | PAL20L8A |
| MWE~ | U111 | 7 | CRC |
| MWTC | U116 | 13 | LS10 |
| MWTC | U705 | 16 | LS240 |
| MWTC | U505 | 9 | PAL12L10 |
| M_SHIFT_EN~ | U715 | 19 | LS244 |
| M_SHIFT_EN~ | U413 | 8 | S74 |
| N1 | U715 | 6 | LS244 |
| N1 | U714 | 9 | LS273 |

| | | | |
|---|---|---|---|
| N2 | U714 | 6 | LS273 |
| N2 | U715 | 8 | LS244 |
| NEG_EN | U510 | 14 | PAL20L8A |
| NEG_EN | U719 | 19 | LS273 |
| NEG_EN | U612 | 42 | PGA8034 |
| NEXT_LINE_REQ~ | U711 | 15 | LS244 |
| NEXT_LINE_REQ~ | U718 | 9 | LS240 |
| NO_CON_ADR | U507 | 10 | PAL20L10 |
| NO_CON_ADR | U719 | 6 | LS273 |
| NO_DIVIDE | U317 | 15 | PAL20R6 |
| NO_DIVIDE | U409 | 9 | S374 |
| N_SHIFT_EN~ | U715 | 1 | LS244 |
| N_SHIFT_EN~ | U413 | 9 | S74 |
| ODD/EVEN_CORR. | U512 | 13 | LS74 |
| ODD/EVEN_CORR. | U714 | 15 | LS273 |
| ODD/EVEN~ | U419 | 14 | S189 |
| ODD/EVEN~ | U512 | 9 | LS74 |
| OE1~ | U705 | 1 | LS240 |
| OE1~ | U204 | 13 | PAL20RA10 |
| OE1~ | U605 | 19 | LS240 |
| OE1~ | U705 | 9 | LS240 |
| OE2~ | U409 | 1 | S374 |
| OE2~ | U220 | 13 | LS461 |
| OE2~ | U313 | 19 | S244 |
| OE2~ | U617 | 23 | PAL20L8A |
| OE2~ | U705 | 7 | LS240 |
| OE3~ | U410 | 1 | S240 |
| OE3~ | U305 | 13 | LS461 |
| OE3~ | U410 | 19 | S240 |
| OE3~ | U419 | 2 | S189 |
| OE3~ | U705 | 5 | LS240 |
| OE4~ | U718 | 1 | LS240 |
| OE4~ | U314 | 13 | PAL20RA10 |
| OE4~ | U718 | 19 | LS240 |
| OE4~ | U705 | 3 | LS240 |
| OE4~ | U603 | 7 | PAL12L10 |
| OSC | U114 | 9 | LS240 |
| OSC_16.8MHZ | U114 | 11 | LS240 |
| OSC_16.8MHZ | U313 | 12 | S244 |
| OSC_16.8MHZ | U216 | 2 | LS161 |
| OSC_16.8MHZ | U413 | 3 | S74 |
| OSC_16.8MHZ | U115 | 8 | LS164 |
| OSC_16.8MHZ | U111 | 9 | CRC |
| OTHER_CCD~ | U113 | 1 | LS157 |
| OTHER_CCD~ | U109 | 15 | LS273 |
| OUT10_N | U105 | 5 | 26LS31 |
| OUT10_P | U105 | 6 | 26LS31 |
| OUT11_N | U105 | 11 | 26LS31 |
| OUT11_P | U105 | 10 | 26LS31 |
| OUT12_N | U105 | 13 | 26LS31 |
| OUT12_P | U105 | 14 | 26LS31 |
| OUT1_N | U107 | 3 | 26LS31 |
| OUT1_P | U107 | 2 | 26LS31 |
| OUT2_N | U107 | 5 | 26LS31 |
| OUT2_P | U107 | 6 | 26LS31 |
| OUT3_N | U107 | 11 | 26LS31 |
| OUT3_P | U107 | 10 | 26LS31 |
| OUT4_N | U107 | 13 | 26LS31 |
| OUT4_P | U107 | 14 | 26LS31 |

| | | | |
|---|---|---|---|
| OUT5_N | U106 | 3 | 26LS31 |
| OUT5_P | U106 | 2 | 26LS31 |
| OUT6_N | U106 | 5 | 26LS31 |
| OUT6_P | U106 | 6 | 26LS31 |
| OUT7_N | U106 | 11 | 26LS31 |
| OUT7_P | U106 | 10 | 26LS31 |
| OUT8_N | U106 | 13 | 26LS31 |
| OUT8_P | U106 | 14 | 26LS31 |
| OUT9_N | U105 | 3 | 26LS31 |
| OUT9_P | U105 | 2 | 26LS31 |
| OUTPUT_BUF_SEL | U708 | 19 | LS245 |
| OUTPUT_BUF_SEL | U603 | 23 | PAL12L10 |
| OUTPUT_SEL~ | U504 | 23 | PAL12L10 |
| OUTPUT_SEL~ | U603 | 4 | PAL12L10 |
| OUT_REG_CE | U411 | 19 | S374 |
| OUT_REG_CE | U607 | 23 | PAL20R8A |
| P0 | U514 | 14 | S381 |
| P0 | U110 | 2 | LS244 |
| P0 | U208 | 22 | PAL20R8A |
| P0 | U108 | 3 | LS684 |
| P0 | U513 | 4 | S182 |
| MBINIT~ | | P1-16 | CONNECTOR |
| MBRDC~ | | P1-23 | CONNECTOR |
| MBWTC~ | | P1-24 | CONNECTOR |
| XACK~ | | P1-27 | CONNECTOR |
| ADR16~ | | P1-34 | CONNECTOR |
| ADR17~ | | P1-36 | CONNECTOR |
| CCLK~ | | P1-37 | CONNECTOR |
| ADR18~ | | P1-38 | CONNECTOR |
| ADR19~ | | P1-40 | CONNECTOR |
| ADR14~ | | P1-53 | CONNECTOR |
| ADR15~ | | P1-54 | CONNECTOR |
| ADR12~ | | P1-55 | CONNECTOR |
| ADR13~ | | P1-56 | CONNECTOR |
| ADR10~ | | P1-57 | CONNECTOR |
| ADR11~ | | P1-58 | CONNECTOR |
| ADR8~ | | P1-59 | CONNECTOR |
| ADR9~ | | P1-60 | CONNECTOR |
| ADR6~ | | P1-63 | CONNECTOR |
| ADR7~ | | P1-64 | CONNECTOR |
| ADR4~ | | P1-65 | CONNECTOR |
| ADR5~ | | P1-66 | CONNECTOR |
| ADR2~ | | P1-67 | CONNECTOR |
| ADR3~ | | P1-68 | CONNECTOR |
| ADR1~ | | P1-70 | CONNECTOR |
| DATE~ | | P1-73 | CONNECTOR |
| DATF~ | | P1-74 | CONNECTOR |
| DATC~ | | P1-75 | CONNECTOR |
| DATD~ | | P1-76 | CONNECTOR |
| DATA~ | | P1-77 | CONNECTOR |
| DATB~ | | P1-78 | CONNECTOR |
| DAT8~ | | P1-79 | CONNECTOR |
| DAT9~ | | P1-80 | CONNECTOR |
| DAT6~ | | P1-83 | CONNECTOR |
| DAT7~ | | P1-84 | CONNECTOR |
| DAT4~ | | P1-85 | CONNECTOR |
| DAT5~ | | P1-86 | CONNECTOR |
| DAT2~ | | P1-87 | CONNECTOR |
| DAT3~ | | P1-88 | CONNECTOR |

| | | | |
|---|---|---|---|
| DAT0~ | | P1-89 | CONNECTOR |
| DAT1~ | | P1-90 | CONNECTOR |
| P1 | U515 | 14 | S381 |
| P1 | U513 | 2 | S182 |
| P1 | U208 | 21 | PAL20R8A |
| P1 | U110 | 4 | LS244 |
| P1 | U108 | 5 | LS684 |
| P16 | U612 | 18 | PGA8034 |
| P16 | U607 | 2 | PAL20R8A |
| P17 | U612 | 19 | PGA8034 |
| P17 | U607 | 3 | PAL20R8A |
| P17 | U613 | 4 | LS244 |
| P18 | U612 | 20 | PGA8034 |
| P18 | U607 | 4 | PAL20R8A |
| P18 | U613 | 6 | LS244 |
| P19 | U612 | 21 | PGA8034 |
| P19 | U607 | 5 | PAL20R8A |
| P19 | U613 | 8 | LS244 |
| COLOR_2~ | | P2-11 | CONNECTOR |
| COLOR_1~ | | P2-13 | CONNECTOR |
| PIXEL_CLOCK~ | | P2-14 | CONNECTOR |
| START_LINE~ | | P2-15 | CONNECTOR |
| LIGHT_CLK~ | | P2-16 | CONNECTOR |
| NEXT_LINE_REQ~ | | P2-17 | CONNECTOR |
| CCD_RUN~ | | P2-18 | CONNECTOR |
| INPUT_CARD_RDY | | P2-19 | CONNECTOR |
| STOP_DATA~ | | P2-21 | CONNECTOR |
| LF0~ | | P2-33 | CONNECTOR |
| LF1~ | | P2-34 | CONNECTOR |
| LF2~ | | P2-35 | CONNECTOR |
| LF3~ | | P2-36 | CONNECTOR |
| LF4~ | | P2-37 | CONNECTOR |
| LF5~ | | P2-38 | CONNECTOR |
| LF6~ | | P2-39 | CONNECTOR |
| LF7~ | | P2-40 | CONNECTOR |
| LF8~ | | P2-41 | CONNECTOR |
| LF9~ | | P2-43 | CONNECTOR |
| LF10~ | | P2-44 | CONNECTOR |
| LF11~ | | P2-45 | CONNECTOR |
| LF12~ | | P2-46 | CONNECTOR |
| LF13~ | | P2-47 | CONNECTOR |
| LF14~ | | P2-48 | CONNECTOR |
| LF15~ | | P2-49 | CONNECTOR |
| ADR23~ | | P2-76 | CONNECTOR |
| ADR21~ | | P2-78 | CONNECTOR |
| ADR22~ | | P2-81 | CONNECTOR |
| ADR20~ | | P2-83 | CONNECTOR |
| P20 | U613 | 11 | LS244 |
| P20 | U612 | 22 | PGA8034 |
| P20 | U607 | 6 | PAL20R8A |
| P21 | U613 | 13 | LS244 |
| P21 | U612 | 23 | PGA8034 |
| P2 | U516 | 14 | S381 |
| P2 | U513 | 15 | S182 |
| P21 | U607 | 7 | PAL20R8A |
| P2 | U208 | 20 | PAL20R8A |
| P22 | U613 | 15 | LS244 |
| P22 | U606 | 2 | PAL20R8A |
| P22 | U612 | 24 | PGA8034 |

| | | | |
|---|---|---|---|
| P23 | U613 | 17 | LS244 |
| P23 | U612 | 25 | PGA8034 |
| P23 | U606 | 3 | PAL20R8A |
| P24 | U611 | 2 | LS244 |
| P24 | U612 | 26 | PGA8034 |
| P24 | U606 | 4 | PAL20R8A |
| P25 | U612 | 27 | PGA8034 |
| P25 | U611 | 4 | LS244 |
| P25 | U606 | 5 | PAL20R8A |
| P2 | U110 | 6 | LS244 |
| P26 | U612 | 28 | PGA8034 |
| P26 | U606 | 6 | PAL20R8A |
| P2 | U108 | 7 | LS684 |
| P27 | U612 | 29 | PGA8034 |
| P27 | U606 | 7 | PAL20R8A |
| P27 | U611 | 8 | LS244 |
| P28 | U611 | 11 | LS244 |
| P28 | U612 | 30 | PGA8034 |
| P28 | U607 | 8 | PAL20R8A |
| P29 | U611 | 13 | LS244 |
| P29 | U612 | 31 | PGA8034 |
| P29 | U607 | 9 | PAL20R8A |
| P30 | U607 | 10 | PAL20R8A |
| P30 | U611 | 15 | LS244 |
| P30 | U612 | 32 | PGA8034 |
| P31 | U607 | 11 | PAL20R8A |
| P31 | U611 | 17 | LS244 |
| P31 | U612 | 33 | PGA8034 |
| P3 | U208 | 19 | PAL20R8A |
| P3 | U110 | 8 | LS244 |
| P3 | U108 | 9 | LS684 |
| P4 | U110 | 11 | LS244 |
| P4 | U108 | 12 | LS684 |
| P4 | U208 | 18 | PAL20R8A |
| P5 | U110 | 13 | LS244 |
| P5 | U108 | 14 | LS684 |
| P5 | U208 | 17 | PAL20R8A |
| P6 | U110 | 15 | LS244 |
| P6 | U108 | 16 | LS684 |
| P7 | U208 | 15 | PAL20R8A |
| P7 | U110 | 17 | LS244 |
| P7 | U108 | 18 | LS684 |
| PA0 | U405 | 16 | LS2569 |
| PA0 | U406 | 18 | LS244 |
| PA0 | U207 | 8 | 2018 |
| PA1 | U405 | 15 | LS2569 |
| PA1 | U406 | 16 | LS244 |
| PA1 | U207 | 7 | 2018 |
| PA2 | U406 | 14 | LS244 |
| PA2 | U207 | 6 | 2018 |
| PA3 | U406 | 12 | LS244 |
| PA3 | U405 | 13 | LS2569 |
| PA3 | U207 | 5 | 2018 |
| PA4 | U207 | 4 | 2018 |
| PA4 | U406 | 9 | LS244 |
| PA5 | U207 | 3 | 2018 |
| PA5 | U406 | 7 | LS244 |
| PA6 | U207 | 2 | 2018 |
| PA6 | U406 | 5 | LS244 |

| | | | |
|---|---|---|---|
| PA7 | U207 | 1 | 2018 |
| PA7 | U406 | 3 | LS244 |
| PC_EN | U410 | 4 | S240 |
| PC_EN | U312 | 5 | S273 |
| PD0 | U201 | 18 | LS245 |
| PD0 | U207 | 9 | 2018 |
| PD10 | U209 | 11 | 2018 |
| PD10 | U211 | 14 | LS377 |
| PD10 | U710 | 16 | LS245 |
| PD1 | U207 | 10 | 2018 |
| PD11 | U211 | 13 | LS377 |
| PD11 | U710 | 15 | LS245 |
| PD1 | U201 | 17 | LS245 |
| PD12 | U710 | 14 | LS245 |
| PD12 | U211 | 8 | LS377 |
| PD13 | U710 | 13 | LS245 |
| PD13 | U209 | 15 | 2018 |
| PD13 | U211 | 7 | LS377 |
| PD14 | U710 | 12 | LS245 |
| PD14 | U209 | 16 | 2018 |
| PD14 | U211 | 4 | LS377 |
| PD15 | U710 | 11 | LS245 |
| PD15 | U209 | 17 | 2018 |
| PD15 | U211 | 3 | LS377 |
| PD2 | U207 | 11 | 2018 |
| PD2 | U210 | 14 | LS377 |
| PD2 | U201 | 16 | LS245 |
| PD3 | U207 | 13 | 2018 |
| PD3 | U201 | 15 | LS245 |
| PD4 | U201 | 14 | LS245 |
| PD4 | U210 | 8 | LS377 |
| PD5 | U201 | 13 | LS245 |
| PD5 | U207 | 15 | 2018 |
| PD5 | U210 | 7 | LS377 |
| PD6 | U201 | 12 | LS245 |
| PD6 | U207 | 16 | 2018 |
| PD6 | U210 | 4 | LS377 |
| PD7 | U201 | 11 | LS245 |
| PD7 | U207 | 17 | 2018 |
| PD7 | U210 | 3 | LS377 |
| PD8 | U710 | 18 | LS245 |
| PD8 | U209 | 9 | 2018 |
| PD9 | U209 | 10 | 2018 |
| PD9 | U710 | 17 | LS245 |
| PIXEL_CLK | U115 | 1 | LS164 |
| PIXEL_CLK | U115 | 2 | LS164 |
| PIXEL_CLK | U315 | 3 | S32 |
| PIXEL_CLK_SIM | U119 | 15 | S109 |
| PIXEL_CLK_SIM | U719 | 2 | LS273 |
| PIXEL_CLK_SIM | U320 | 8 | LS240 |
| PIXEL_CLOCK~ | U718 | 16 | LS240 |
| PIXEL_CLOCK~ | U111 | 18 | CRC |
| PIXEL_COUNT_EN | U312 | 2 | S273 |
| PIXEL_COUNT_EN | U718 | 6 | LS240 |
| PIXEL_COUNT_EN | U203 | 8 | PAL20L8A |
| PN0 | U308 | 18 | LS684 |
| PN0 | U304 | 2 | S244 |
| PN0 | U306 | 22 | LS461 |
| PN10 | U307 | 12 | LS684 |

| | | | |
|---|---|---|---|
| PN10 | U305 | 20 | LS461 |
| PN10 | U303 | 6 | S244 |
| PN11 | U305 | 19 | LS461 |
| PN1 | U308 | 16 | LS684 |
| PN11 | U303 | 8 | S244 |
| PN11 | U307 | 9 | LS684 |
| PN1 | U306 | 21 | LS461 |
| PN12 | U303 | 11 | S244 |
| PN12 | U305 | 18 | LS461 |
| PN12 | U307 | 7 | LS684 |
| PN13 | U303 | 13 | S244 |
| PN13 | U305 | 17 | LS461 |
| PN13 | U307 | 5 | LS684 |
| PN1 | U304 | 4 | S244 |
| PN14 | U303 | 15 | S244 |
| PN14 | U305 | 16 | LS461 |
| PN14 | U307 | 3 | LS684 |
| PN2 | U308 | 14 | LS684 |
| PN2 | U306 | 20 | LS461 |
| PN2 | U304 | 6 | S244 |
| PN3 | U308 | 12 | LS684 |
| PN3 | U306 | 19 | LS461 |
| PN3 | U304 | 8 | S244 |
| PN4 | U304 | 11 | S244 |
| PN4 | U306 | 18 | LS461 |
| PN4 | U308 | 9 | LS684 |
| PN5 | U304 | 13 | S244 |
| PN5 | U306 | 17 | LS461 |
| PN5 | U308 | 7 | LS684 |
| PN6 | U304 | 15 | S244 |
| PN6 | U306 | 16 | LS461 |
| PN6 | U308 | 5 | LS684 |
| PN7 | U306 | 15 | LS461 |
| PN7 | U304 | 17 | S244 |
| PN7 | U307 | 18 | LS684 |
| PN8 | U307 | 16 | LS684 |
| PN8 | U303 | 2 | S244 |
| PN8 | U305 | 22 | LS461 |
| PN9 | U307 | 14 | LS684 |
| PN9 | U305 | 21 | LS461 |
| PN9 | U303 | 4 | S244 |
| PROG_MEM_ACC~ | U406 | 1 | LS244 |
| PROG_MEM_ACC~ | U406 | 19 | LS244 |
| PROG_MEM_ACC~ | U507 | 21 | PAL20L10 |
| PROG_MEM_ACC~ | U410 | 8 | S240 |
| PROG_MEM_SEL~ | U507 | 17 | PAL20L10 |
| PROG_MEM_SEL~ | U201 | 19 | LS245 |
| PROG_MEM_SEL~ | U603 | 9 | PAL12L10 |
| PROG_SEL0 | U313 | 13 | S244 |
| PROG_SEL0 | U719 | 15 | LS273 |
| PROG_SEL1 | U313 | 15 | S244 |
| PROG_SEL1 | U719 | 16 | LS273 |
| PU10 | U316 | 10 | 316A102 1K |
| PU10 | U119 | 11 | S109 |
| PU10 | U119 | 14 | S109 |
| PU10 | U119 | 5 | S109 |
| PU1 | U112 | 1 | LS164 |
| PU1 | U501 | 11 | 29823 |
| PU1 | U112 | 2 | LS164 |

| | | | |
|---|---|---|---|
| PU2 | U610 | 11 | 29823 |
| PU2 | U111 | 12 | CRC |
| PU2 | U316 | 2 | 316A102 1K |
| PU2 | U117 | 4 | S74 |
| PU2 | U115 | 9 | LS164 |
| PU5 | U319 | 4 | PAL20R6 |
| PU5 | U319 | 5 | PAL20R6 |
| PU5 | U319 | 6 | PAL20R6 |
| PU5 | U319 | 7 | PAL20R6 |
| PU5 | U319 | 8 | PAL20R6 |
| PU5 | U319 | 9 | PAL20R6 |
| PU6 | U612 | 41 | PGA8034 |
| PU6 | U612 | 48 | PGA8034 |
| PU6 | U612 | 49 | PGA8034 |
| PU6 | U316 | 6 | 316A102 1K |
| PU7 | U107 | 4 | 26LS31 |
| PU7 | U316 | 7 | 316A102 1K |
| PU8 | U405 | 1 | LS2569 |
| PU8 | U413 | 10 | S74 |
| PU8 | U405 | 11 | LS2569 |
| PU8 | U413 | 12 | S74 |
| PU8 | U316 | 8 | 316A102 1K |
| PU9 | U314 | 1 | PAL20RA10 |
| PU9 | U512 | 10 | LS74 |
| PU9 | U103 | 4 | 26LS32 |
| PU9 | U316 | 9 | 316A102 1K |
| RCK | U111 | 16 | CRC |
| RCK | U118 | 8 | S244 |
| RD0 | U221 | 2 | PAL20R6 |
| RD10 | U222 | 6 | PAL20R6 |
| RD11 | U222 | 7 | PAL20R6 |
| RD1 | U221 | 3 | PAL20R6 |
| RD2 | U221 | 4 | PAL20R6 |
| RD3 | U221 | 5 | PAL20R6 |
| RD4 | U221 | 6 | PAL20R6 |
| RD5 | U221 | 7 | PAL20R6 |
| RD6 | U222 | 2 | PAL20R6 |
| RD7 | U222 | 3 | PAL20R6 |
| RD8 | U222 | 4 | PAL20R6 |
| RD9 | U222 | 5 | PAL20R6 |
| READ_BUF_EN | U203 | 14 | PAL20L8A |
| READ_BUF_EN | U102 | 15 | LS244 |
| READ_BUF_EN | U204 | 21 | PAL20RA10 |
| READ_BUF_EN | U603 | 3 | PAL12L10 |
| READ_REQ~ | U504 | 21 | PAL12L10 |
| READ_REQ~ | U204 | 3 | PAL20RA10 |
| RGB_SEL | U206 | 2 | PAL20R8A |
| RGB_SEL | U408 | 9 | S139 |
| R_CLK | U221 | 1 | PAL20R6 |
| R_CLK | U617 | 16 | PAL20L8A |
| R_DATA_SEL~ | U221 | 13 | PAL20R6 |
| R_DATA_SEL~ | U407 | 2 | S374 |
| R_DC_CLK~ | U617 | 19 | PAL20L8A |
| R_STATUS~ | U617 | 1 | PAL20L8A |
| R_VIDEO_IN | U124 | 3 | IH5341 |
| R_VIDEO_IN | U124 | 5 | IH5341 |
| S0 | U215 | 14 | PAL20L10 |
| S0 | U514 | 5 | S381 |
| S1 | U317 | 10 | PAL20R6 |
| S1 | U715 | 14 | LS244 |
| S1 | U215 | 16 | PAL20L10 |

| | | | |
|---|---|---|---|
| S1 | U715 | 5 | LS244 |
| S1 | U514 | 6 | S381 |
| S2 | U317 | 11 | PAL20R6 |
| S2 | U715 | 12 | LS244 |
| S2 | U715 | 3 | LS244 |
| SCAN | U203 | 1 | PAL20L8A |
| SCAN | U102 | 13 | LS244 |
| SCAN | U204 | 14 | PAL20RA10 |
| SEQ_DATA1~ | U214 | 11 | LS374 |
| SEQ_DATA1~ | U504 | 14 | PAL12L10 |
| SEQ_DATA2~ | U212 | 11 | LS374 |
| SEQ_DATA2~ | U504 | 16 | PAL12L10 |
| SEQ_EOL | U509 | 10 | PAL20L8A |
| SEQ_EOL | U314 | 23 | PAL20RA10 |
| SEQ_SIM | U310 | 15 | 27S29 |
| SEQ_SIM | U203 | 4 | PAL20L8A |
| SEQ_SIM | U718 | 8 | LS240 |
| SEQ_SIM | U719 | 9 | LS273 |
| SIM | U714 | 12 | LS273 |
| SIM | U617 | 13 | PAL20L8A |
| SIM | U221 | 15 | PAL20R6 |
| SINGLE_CLK~ | U505 | 16 | PAL12L10 |
| SINGLE_CLK~ | U413 | 4 | S74 |
| SIX_NINE~ | U714 | 16 | LS273 |
| SIX_NINE~ | U314 | 7 | PAL20RA10 |
| SIX_NINE~ | U203 | 9 | PAL20L8A |
| SO0 | U312 | 18 | S273 |
| SO0 | U214 | 2 | LS374 |
| SO0 | U311 | 6 | 27S29 |
| SO10 | U411 | 14 | S374 |
| SO10 | U213 | 6 | LS374 |
| SO10 | U310 | 8 | 27S29 |
| SO11 | U411 | 13 | S374 |
| SO1 | U312 | 17 | S273 |
| SO11 | U310 | 9 | 27S29 |
| SO12 | U310 | 11 | 27S29 |
| SO12 | U213 | 12 | LS374 |
| SO12 | U411 | 8 | S374 |
| SO13 | U310 | 12 | 27S29 |
| SO13 | U213 | 15 | LS374 |
| SO13 | U411 | 7 | S374 |
| SO14 | U310 | 13 | 27S29 |
| SO14 | U213 | 16 | LS374 |
| SO14 | U411 | 4 | S374 |
| SO1 | U214 | 5 | LS374 |
| SO15 | U310 | 14 | 27S29 |
| SO15 | U213 | 19 | LS374 |
| SO15 | U411 | 3 | S374 |
| SO16 | U409 | 18 | S374 |
| SO16 | U212 | 2 | LS374 |
| SO16 | U309 | 6 | 27S29 |
| SO1 | U311 | 7 | 27S29 |
| SO17 | U409 | 17 | S374 |
| SO17 | U212 | 5 | LS374 |
| SO17 | U309 | 7 | 27S29 |
| SO18 | U409 | 14 | S374 |
| SO18 | U212 | 6 | LS374 |
| SO18 | U309 | 8 | 27S29 |
| SO19 | U409 | 13 | S374 |

| | | | |
|---|---|---|---|
| SO19 | U309 | 9 | 27S29 |
| SO20 | U309 | 11 | 27S29 |
| SO20 | U212 | 12 | LS374 |
| SO20 | U409 | 8 | S374 |
| SO21 | U408 | 1 | S139 |
| SO21 | U309 | 12 | 27S29 |
| SO21 | U212 | 15 | LS374 |
| SO2 | U312 | 14 | S273 |
| SO21 | U409 | 7 | S374 |
| SO22 | U309 | 13 | 27S29 |
| SO22 | U212 | 16 | LS374 |
| SO22 | U408 | 3 | S139 |
| SO22 | U409 | 4 | S374 |
| SO23 | U309 | 14 | 27S29 |
| SO23 | U212 | 19 | LS374 |
| SO23 | U408 | 2 | S139 |
| SO23 | U409 | 3 | S374 |
| SO2 | U214 | 6 | LS374 |
| SO2 | U311 | 8 | 27S29 |
| SO3 | U312 | 13 | S273 |
| SO3 | U311 | 9 | 27S29 |
| SO4 | U311 | 11 | 27S29 |
| SO4 | U214 | 12 | LS374 |
| SO4 | U407 | 8 | S374 |
| SO5 | U311 | 12 | 27S29 |
| SO5 | U214 | 15 | LS374 |
| SO5 | U312 | 7 | S273 |
| SO6 | U311 | 13 | 27S29 |
| SO6 | U214 | 16 | LS374 |
| SO6 | U312 | 4 | S273 |
| SO7 | U311 | 14 | 27S29 |
| SO7 | U214 | 19 | LS374 |
| SO7 | U312 | 3 | S273 |
| SO8 | U411 | 18 | S374 |
| SO8 | U213 | 2 | LS374 |
| SO8 | U310 | 6 | 27S29 |
| SO9 | U411 | 17 | S374 |
| SO9 | U213 | 5 | LS374 |
| SO9 | U310 | 7 | 27S29 |
| STAND_ALONE | U204 | 6 | PAL20RA10 |
| STAND_ALONE | U109 | 9 | LS273 |
| START_BURST | U314 | 20 | PAL20RA10 |
| START_BURST | U215 | 6 | PAL20L10 |
| START_CLK~ | U312 | 1 | S273 |
| START_CLK~ | U117 | 13 | S74 |
| START_CLK~ | U314 | 2 | PAL20RA10 |
| START_CLK~ | U118 | 3 | S244 |
| START_CLK~ | U405 | 8 | LS2569 |
| START_CLK~ | U204 | 9 | PAL20RA10 |
| START_LINE~ | U718 | 18 | LS240 |
| START_LINE~ | U111 | 19 | CRC |
| START_SCAN~ | U504 | 19 | PAL12L10 |
| START_SCAN~ | U204 | 5 | PAL20RA10 |
| STATUS_SEL~ | U102 | 1 | LS244 |
| STATUS_SEL~ | U505 | 19 | PAL12L10 |
| STOP_DATA~ | U316 | 3 | 316A102 1K |
| STOP_DATA~ | U313 | 6 | S244 |
| STOP_LOAD | U315 | 12 | S32 |
| STOP_LOAD | U114 | 18 | LS240 |

| | | | |
|---|---|---|---|
| STOP_LOAD | U315 | 9 | S32 |
| STOP_MODE | U718 | 3 | LS240 |
| STOP_MODE | U312 | 8 | S273 |
| STOP_MODE~ | U203 | 13 | PAL20L8A |
| STOP_MODE~ | U718 | 17 | LS240 |
| STOP_MODE~ | U308 | 19 | LS684 |
| STOP_MODE~ | U711 | 2 | LS244 |
| STOP_READ~ | U504 | 20 | PAL12L10 |
| STOP_READ~ | U204 | 4 | PAL20RA10 |
| STROBE1_N | U104 | 6 | 26LS31 |
| STROBE1_P | U104 | 5 | 26LS31 |
| STROBE1~ | U102 | 2 | LS244 |
| STROBE1~ | U203 | 20 | PAL20L8A |
| STROBE1~ | U104 | 7 | 26LS31 |
| STROBE2_N | U104 | 10 | 26LS31 |
| STROBE2_P | U104 | 11 | 26LS31 |
| STROBE2~ | U104 | 15 | 26LS31 |
| STROBE2~ | U203 | 22 | PAL20L8A |
| STROBE2~ | U102 | 4 | LS244 |
| STROBE3_N | U104 | 14 | 26LS31 |
| STROBE3_P | U104 | 13 | 26LS31 |
| STROBE3~ | U203 | 21 | PAL20L8A |
| STROBE3~ | U102 | 6 | LS244 |
| STROBE3~ | U104 | 9 | 26LS31 |
| STROBE_EN~ | U315 | 10 | S32 |
| STROBE_EN~ | U409 | 19 | S374 |
| STROBE_EN~ | U203 | 7 | PAL20L8A |
| SYNC | TP10 | 1 | TP |
| SYNC | U114 | 3 | LS240 |
| T0 | U202 | 2 | LS244 |
| T0 | U206 | 22 | PAL20R8A |
| T0 | U205 | 3 | LS684 |
| T1 | U206 | 21 | PAL20R8A |
| T1 | U202 | 4 | LS244 |
| T1 | U205 | 5 | LS684 |
| T2 | U206 | 20 | PAL20R8A |
| T2 | U202 | 6 | LS244 |
| T2 | U205 | 7 | LS684 |
| T3 | U206 | 19 | PAL20R8A |
| T3 | U202 | 8 | LS244 |
| T3 | U205 | 9 | LS684 |
| T4 | U202 | 11 | LS244 |
| T4 | U205 | 12 | LS684 |
| T4 | U206 | 18 | PAL20R8A |
| T5 | U202 | 13 | LS244 |
| T5 | U205 | 14 | LS684 |
| T5 | U206 | 17 | PAL20R8A |
| T6 | U202 | 15 | LS244 |
| T6 | U205 | 16 | LS684 |
| T7 | U206 | 15 | PAL20R8A |
| T7 | U202 | 17 | LS244 |
| T7 | U205 | 18 | LS684 |
| TCK | U118 | 11 | S244 |
| TCK | U115 | 12 | LS164 |
| TCK~ | U118 | 13 | S244 |
| TCK | U118 | 15 | S244 |
| TCK | U111 | 17 | CRC |
| TCK | U117 | 3 | S74 |
| TCK | U113 | 6 | LS157 |

| | | | |
|---|---|---|---|
| TIM_PIXEL_CLK~ | U114 | 7 | LS240 |
| TRACK/HOLD~ | U320 | 13 | LS240 |
| TRACK/HOLD~ | U111 | 14 | CRC |
| TRACK/HOLD~ | U617 | 4 | PAL20L8A |
| TRACK/HOLD~ | U219 | 6 | S86 |
| TRANSFER_CLK | U718 | 2 | LS240 |
| TRANSFER_CLK | U113 | 4 | LS157 |
| TRANSFER_CLK | U314 | 8 | PAL20RA10 |
| TRANSPORT_CLK | U217 | 1 | LS164 |
| TRANSPORT_CLK | U512 | 12 | LS74 |
| TRANSPORT_CLK | U217 | 2 | LS164 |
| TRANSPORT_CLK | U718 | 4 | LS240 |
| TRANSPORT_CLK | U113 | 7 | LS157 |
| TRANSPORT_CLK~ | TPS101 | 3 | 4308R103 220/330 |
| TRANSPORT_CLK~ | U114 | 6 | LS240 |
| VCC | U316 | 16 | 316A102 1K |
| VCC | TPS101 | 8 | 4308R103 220/330 |
| WE_BUF_EN~ | U603 | 5 | PAL12L10 |
| WE_BUF_EN~ | U407 | 9 | S374 |
| WE_BUF~ | U603 | 16 | PAL12L10 |
| WE_BUF~ | U301 | 27 | HM62256 |
| WE_DARK_MEM~ | U603 | 21 | PAL12L10 |
| WE_DARK_MEM~ | U302 | 27 | HM62256 |
| WE_DARK_REF~ | U409 | 16 | S374 |
| WE_DARK_REF~ | U419 | 3 | S189 |
| WE_GAIN_MEM~ | U603 | 15 | PAL12L10 |
| WE_GAIN_MEM~ | U601 | 27 | HM62256 |
| WE_PROG_MEM~ | U207 | 21 | 2018 |
| WE_PROG_MEM~ | U603 | 22 | PAL12L10 |
| WRITE_BUF~ | U203 | 18 | PAL20L8A |
| WRITE_BUF~ | U320 | 2 | LS240 |
| X0 | U613 | 18 | LS244 |
| X0 | U510 | 22 | PAL20L8A |
| X0 | U612 | 63 | PGA8034 |
| X10 | U611 | 14 | LS244 |
| X10 | U509 | 20 | PAL20L8A |
| X10 | U612 | 53 | PGA8034 |
| X11 | U611 | 12 | LS244 |
| X11 | U509 | 19 | PAL20L8A |
| X11 | U612 | 52 | PGA8034 |
| X1 | U613 | 16 | LS244 |
| X1 | U510 | 21 | PAL20L8A |
| X12 | U509 | 18 | PAL20L8A |
| X12 | U612 | 50 | PGA8034 |
| X12 | U611 | 9 | LS244 |
| X1 | U612 | 62 | PGA8034 |
| X2 | U613 | 14 | LS244 |
| X2 | U510 | 20 | PAL20L8A |
| X2 | U612 | 61 | PGA8034 |
| X3 | U613 | 12 | LS244 |
| X3 | U510 | 19 | PAL20L8A |
| X3 | U612 | 60 | PGA8034 |
| X4 | U510 | 18 | PAL20L8A |
| X4 | U612 | 59 | PGA8034 |
| X4 | U613 | 9 | LS244 |
| X5 | U510 | 17 | PAL20L8A |
| X5 | U612 | 58 | PGA8034 |
| X5 | U613 | 7 | LS244 |
| X6 | U510 | 16 | PAL20L8A |
| X6 | U613 | 5 | LS244 |
| X6 | U612 | 57 | PGA8034 |

| | | | |
|---|---|---|---|
| X7 | U510 | 15 | PAL20L8A |
| X7 | U613 | 3 | LS244 |
| X7 | U612 | 56 | PGA8034 |
| X8 | U611 | 18 | LS244 |
| X8 | U509 | 22 | PAL20L8A |
| X8 | U612 | 55 | PGA8034 |
| X9 | U611 | 16 | LS244 |
| X9 | U509 | 21 | PAL20L8A |
| X9 | U612 | 54 | PGA8034 |
| XACK~ | U508 | 18 | LS240 |
| XCK | U111 | 15 | CRC |
| XCK | U118 | 2 | S244 |
| XCK | U113 | 3 | LS157 |
| XCK | U118 | 4 | S244 |
| XCK | U117 | 5 | S74 |
| XCK | U118 | 6 | S244 |
| Y0 | U722 | 1 | 316A221 220 |
| Y0 | U720 | 18 | LS240 |
| Y0 | U612 | 67 | PGA8034 |
| Y10 | U612 | 11 | PGA8034 |
| Y10 | U703 | 14 | LS244 |
| Y1 | U612 | 1 | PGA8034 |
| Y11 | U612 | 12 | PGA8034 |
| Y1 | U720 | 16 | LS240 |
| Y1 | U722 | 2 | 316A221 220 |
| Y12 | U612 | 13 | PGA8034 |
| Y12 | U703 | 9 | LS244 |
| Y13 | U612 | 14 | PGA8034 |
| Y13 | U316 | 4 | 316A102 1K |
| Y13 | U703 | 7 | LS244 |
| Y14 | U722 | 14 | 316A221 220 |
| Y14 | U612 | 15 | PGA8034 |
| Y14 | U703 | 5 | LS244 |
| Y15 | U722 | 15 | 316A221 220 |
| Y15 | U612 | 16 | PGA8034 |
| Y15 | U703 | 3 | LS244 |
| Y2 | U720 | 14 | LS240 |
| Y2 | U612 | 2 | PGA8034 |
| Y2 | U722 | 3 | 316A221 220 |
| Y3 | U720 | 12 | LS240 |
| Y3 | U612 | 3 | PGA8034 |
| Y3 | U722 | 4 | 316A221 220 |
| Y4 | U612 | 4 | PGA8034 |
| Y4 | U722 | 5 | 316A221 220 |
| Y4 | U720 | 9 | LS240 |
| Y5 | U612 | 5 | PGA8034 |
| Y5 | U722 | 6 | 316A221 220 |
| Y5 | U720 | 7 | LS240 |
| Y6 | U720 | 5 | LS240 |
| Y6 | U612 | 6 | PGA8034 |
| Y6 | U722 | 7 | 316A221 220 |
| Y7 | U720 | 3 | LS240 |
| Y7 | U612 | 7 | PGA8034 |
| Y7 | U722 | 8 | 316A221 220 |
| Y8 | U703 | 18 | LS244 |
| Y8 | U612 | 9 | PGA8034 |
| Y9 | U612 | 10 | PGA8034 |
| Y9 | U703 | 16 | LS244 |
| ZERO_OUT~ | U317 | 14 | PAL20R6 |
| ZERO_OUT~ | U215 | 23 | PAL20L10 |

INDEXER

| Signal_name | Physical_location | Pin_number | Part_name |
|---|---|---|---|
| +12V | R102 | 1 | RES 4.7K |
| +12V | U103 | 14 | 1488 |
| +12V | L102 | 2 | COIL 10uHY |
| -12V | U103 | 1 | 1488 |
| -12V | L101 | 2 | COIL 10uHY |
| 0:XSIG309 | U506 | 10 | LS04 |
| 0:XSIG309 | U307 | 19 | LS244 |
| 0:XSIG311 | U615 | 6 | S04 |
| 0:XSIG311 | U701 | 9 | LS164 |
| 0:XSIG386 | U601 | 1 | LS08 |
| 0:XSIG386 | U506 | 12 | LS04 |
| 0F_MOTION_COMP | U217 | 1 | 07 |
| 0F_MOTION_COMP | U220 | 16 | LS373 |
| 0F_PA0/PULSE | U218 | 1 | 07 |
| 0F_PA0/PULSE | U220 | 2 | LS373 |
| 0F_PA1/DIR | U218 | 3 | 07 |
| 0F_PA1/DIR | U220 | 5 | LS373 |
| 0F_PA2 | U218 | 5 | 07 |
| 0F_PA2 | U220 | 6 | LS373 |
| 0F_PA3 | U218 | 9 | 07 |
| 0F_PB0 | U218 | 11 | 07 |
| 0F_PB0 | U220 | 12 | LS373 |
| 0F_PB1 | U218 | 13 | 07 |
| 0F_PB1 | U220 | 15 | LS373 |
| 0S_MOTION_COMP | U219 | 16 | LS373 |
| 0S_MOTION_COMP | U216 | 3 | 07 |
| 0S_PA0/PULSE | U219 | 2 | LS373 |
| 0S_PA0/PULSE | U217 | 3 | 07 |
| 0S_PA1/DIR | U217 | 5 | 07 |
| 0S_PA2 | U219 | 6 | LS373 |
| 0S_PA2 | U217 | 9 | 07 |
| 0S_PA3 | U217 | 11 | 07 |
| 0S_PA3 | U219 | 9 | LS373 |
| 0S_PB0 | U219 | 12 | LS373 |
| 0S_PB0 | U217 | 13 | 07 |
| 0S_PB1 | U216 | 1 | 07 |
| 0S_PB1 | U219 | 15 | LS373 |
| 0_FAST_CLUTCH~ | U501 | 16 | LS273 |
| 0_FAST_CLUTCH~ | U105 | 9 | 07 |
| 0_FAST_DRIVER~ | U220 | 11 | LS373 |
| 0_FAST_DRIVER~ | U501 | 15 | LS273 |
| 0_HOME_POS~ | U315 | 16 | 80C31BH |
| 0_HOME_POS~ | U516 | 18 | LS240 |
| 0_HOME_POS~ | U719 | 2 | LS244 |
| 0_LEFT_LSW~ | U621 | 13 | LS08 |
| 0_LEFT_LSW~ | U315 | 17 | 80C31BH |
| 0_LEFT_LSW~ | U517 | 18 | LS240 |
| 0_RIGHT_LSW~ | U621 | 12 | LS08 |
| 0_RIGHT_LSW~ | U517 | 16 | LS240 |
| 0_SLOW_CLUTCH~ | U105 | 13 | 07 |
| 0_SLOW_CLUTCH~ | U501 | 19 | LS273 |
| 0_SLOW_DRIVER | U219 | 11 | LS373 |
| 0_SLOW_DRIVER | U501 | 12 | LS273 |

| | | | |
|---|---|---|---|
| 11:XSIG1 | U405 | 2 | LS20 |
| 11:XSIG151 | U204 | 13 | LS00 |
| 11:XSIG151 | U306 | 9 | LS240 |
| 11:XSIG15 | U405 | 4 | LS20 |
| 11:XSIG15 | U404 | 5 | LS74 |
| 11:XSIG158 | U306 | 15 | LS240 |
| 11:XSIG158 | U404 | 8 | LS74 |
| 11:XSIG1 | U506 | 6 | LS04 |
| 11:XSIG178 | U615 | 8 | S04 |
| 11:XSIG178 | U317 | 9 | 06 |
| 11:XSIG18 | U307 | 4 | LS244 |
| 11:XSIG18 | U306 | 6 | LS240 |
| 11:XSIG4 | U405 | 1 | LS20 |
| 11:XSIG4 | U307 | 18 | LS244 |
| 11:XSIG4 | U404 | 4 | LS74 |
| 11:XSIG9 | R501 | 1 | RES 1K |
| 11:XSIG9 | U105 | 10 | 07 |
| 11:XSIG9 | U307 | 2 | LS244 |
| 12:XSIG103 | U302 | 38 | 8274 |
| 12:XSIG103 | U103 | 4 | 1488 |
| 12:XSIG103 | U103 | 5 | 1488 |
| 12:XSIG104 | U103 | 10 | 1488 |
| 12:XSIG104 | U302 | 31 | 8274 |
| 12:XSIG104 | U103 | 9 | 1488 |
| 12:XSIG105 | U103 | 12 | 1488 |
| 12:XSIG105 | U103 | 13 | 1488 |
| 12:XSIG105 | U302 | 8 | 8274 |
| 12:XSIG106 | U302 | 26 | 8274 |
| 12:XSIG106 | U102 | 4 | 1488 |
| 12:XSIG106 | U102 | 5 | 1488 |
| 12:XSIG132 | U602 | 15 | LS161 |
| 12:XSIG132 | U506 | 3 | LS04 |
| 12:XSIG133 | U506 | 4 | LS04 |
| 12:XSIG133 | U602 | 9 | LS161 |
| 12:XSIG152 | U302 | 10 | 8274 |
| 12:XSIG152 | U102 | 2 | 1488 |
| 12:XSIG200 | C103 | 2 | CAP 390PF |
| 12:XSIG202 | C104 | 2 | CAP 390PF |
| 12:XSIG202 | U101 | 5 | 1489 |
| 12:XSIG204 | U101 | 6 | 1489 |
| 12:XSIG205 | U101 | 3 | 1489 |
| 12:XSIG205 | U302 | 5 | 8274 |
| 12:XSIG213 | C112 | 2 | CAP 390PF |
| 12:XSIG214 | C115 | 2 | CAP 390PF |
| 12:XSIG214 | U104 | 9 | 1489 |
| 12:XSIG216 | C114 | 2 | CAP 390PF |
| 12:XSIG216 | U104 | 5 | 1489 |
| 12:XSIG219 | U104 | 12 | 1489 |
| 12:XSIG219 | C111 | 2 | CAP 390PF |
| 12:XSIG222 | U104 | 11 | 1489 |
| 12:XSIG222 | U302 | 9 | 8274 |
| 12:XSIG223 | U302 | 34 | 8274 |
| 12:XSIG223 | U104 | 8 | 1489 |
| 12:XSIG224 | U302 | 39 | 8274 |
| 12:XSIG224 | U104 | 6 | 1489 |
| 12:XSIG225 | U104 | 3 | 1489 |
| 12:XSIG52 | U103 | 2 | 1488 |
| 12:XSIG52 | U302 | 37 | 8274 |
| 13:XSIG35 | L101 | 1 | COIL 10uHY |

| | | | |
|---|---|---|---|
| 13:XSIG35 | | P1 93 | CONNECTOR |
| 13:XSIG35 | | P1 94 | CONNECTOR |
| 13:XSIG46 | L102 | 1 | COIL 10uHY |
| 13:XSIG46 | | P1 10 | CONNECTOR |
| 13:XSIG46 | | P1 9 | CONNECTOR |
| 14:XSIG264 | U723 | 2 | LS374 |
| 14:XSIG264 | U721 | 3 | LS374 |
| 14:XSIG265 | U721 | 4 | LS374 |
| 14:XSIG265 | U723 | 5 | LS374 |
| 14:XSIG266 | U723 | 6 | LS374 |
| 14:XSIG266 | U721 | 7 | LS374 |
| 14:XSIG267 | U721 | 8 | LS374 |
| 14:XSIG267 | U723 | 9 | LS374 |
| 14:XSIG268 | U723 | 12 | LS374 |
| 14:XSIG268 | U721 | 13 | LS374 |
| 14:XSIG269 | U721 | 14 | LS374 |
| 14:XSIG269 | U723 | 15 | LS374 |
| 14:XSIG270 | U723 | 16 | LS374 |
| 14:XSIG270 | U721 | 17 | LS374 |
| 14:XSIG271 | U721 | 18 | LS374 |
| 14:XSIG271 | U723 | 19 | LS374 |
| 14:XSIG272 | U722 | 2 | LS374 |
| 14:XSIG272 | U720 | 3 | LS374 |
| 14:XSIG273 | U720 | 4 | LS374 |
| 14:XSIG273 | U722 | 5 | LS374 |
| 14:XSIG274 | U722 | 6 | LS374 |
| 14:XSIG274 | U720 | 7 | LS374 |
| 14:XSIG275 | U720 | 8 | LS374 |
| 14:XSIG275 | U722 | 9 | LS374 |
| 14:XSIG276 | U722 | 12 | LS374 |
| 14:XSIG276 | U720 | 13 | LS374 |
| 14:XSIG277 | U720 | 14 | LS374 |
| 14:XSIG277 | U722 | 15 | LS374 |
| 14:XSIG278 | U722 | 16 | LS374 |
| 14:XSIG278 | U720 | 17 | LS374 |
| 14:XSIG279 | U720 | 18 | LS374 |
| 14:XSIG279 | U722 | 19 | LS374 |
| 1:XSIG189 | U717 | 13 | LS74 |
| 1:XSIG189 | U601 | 8 | LS08 |
| 1_HOME_POS~ | U314 | 16 | 80C31BH |
| 1_HOME_POS~ | U719 | 4 | LS244 |
| 1_LEFT_LSW~ | U517 | 14 | LS240 |
| 1_LEFT_LSW~ | U314 | 17 | 80C31BH |
| 1_LEFT_LSW~ | U515 | 5 | LS08 |
| 1_RIGHT_LSW~ | U517 | 12 | LS240 |
| 1_RIGHT_LSW~ | U515 | 4 | LS08 |
| 2:XSIG176 | U203 | 19 | LS245 |
| 2:XSIG176 | U601 | 6 | LS08 |
| 2:XSIG180 | U601 | 13 | LS08 |
| 2:XSIG180 | U303 | 17 | 80C31BH |
| 2:XSIG216 | R401 | 1 | RES 1K |
| 2:XSIG216 | U614 | 16 | S240 |
| 2:XSIG216 | U303 | 19 | 80C31BH |
| 2:XSIG331 | U205 | 11 | LS273 |
| 2:XSIG331 | U204 | 3 | LS00 |
| 2:XSIG332 | U205 | 1 | LS273 |
| 2:XSIG332 | U204 | 10 | LS00 |
| 2:XSIG332 | U204 | 6 | LS00 |
| 2:XSIG335 | U506 | 8 | LS04 |

| | | | |
|---|---|---|---|
| 2:XSIG335 | U204 | 9 | LS00 |
| 2_HOME_POS~ | U516 | 14 | LS240 |
| 2_HOME_POS~ | U313 | 16 | 80C31BH |
| 2_HOME_POS~ | U719 | 6 | LS244 |
| 2_LEFT_LSW~ | U313 | 17 | 80C31BH |
| 2_LEFT_LSW~ | U515 | 2 | LS08 |
| 2_LEFT_LSW~ | U517 | 9 | LS240 |
| 2_RIGHT_LSW~ | U515 | 1 | LS08 |
| 2_RIGHT_LSW~ | U517 | 7 | LS240 |
| 3:XSIG1 | U304 | 6 | LS273 |
| 3:XSIG1 | U305 | 9 | LS151 |
| 3:XSIG196 | C602 | 1 | CAP 150PF |
| 3:XSIG198 | U615 | 2 | S04 |
| 3:XSIG198 | U615 | 3 | S04 |
| 3:XSIG199 | R601 | 1 | RES 220 |
| 3:XSIG199 | XTL601 | 2 | XTAL 11.0592MHZ |
| 3:XSIG199 | U615 | 4 | S04 |
| 3:XSIG199 | U614 | 6 | S240 |
| 3:XSIG200 | U615 | 1 | S04 |
| 3:XSIG200 | C602 | 2 | CAP 150PF |
| 3:XSIG2 | U305 | 10 | LS151 |
| 3:XSIG2 | U304 | 5 | LS273 |
| 3:XSIG3 | U305 | 11 | LS151 |
| 3:XSIG3 | U304 | 2 | LS273 |
| 3:XSIG4 | U403 | 1 | LS138 |
| 3:XSIG4 | U304 | 15 | LS273 |
| 3:XSIG5 | U304 | 16 | LS273 |
| 3:XSIG5 | U403 | 2 | LS138 |
| 3:XSIG6 | U304 | 19 | LS273 |
| 3:XSIG6 | U403 | 3 | LS138 |
| 3_HOME_POS~ | U516 | 12 | LS240 |
| 3_HOME_POS~ | U312 | 16 | 80C31BH |
| 3_HOME_POS~ | U719 | 8 | LS244 |
| 3_LEFT_LSW~ | U515 | 13 | LS08 |
| 3_LEFT_LSW~ | U312 | 17 | 80C31BH |
| 3_LEFT_LSW~ | U517 | 5 | LS240 |
| 3_RIGHT_LSW~ | U515 | 12 | LS08 |
| 3_RIGHT_LSW~ | U517 | 3 | LS240 |
| 4:XSIG19 | R409 | 1 | RES 1K |
| 4:XSIG19 | U616 | 18 | S240 |
| 4:XSIG19 | U315 | 19 | 80C31BH |
| 4:XSIG49 | U619 | 11 | LS373 |
| 4:XSIG49 | U315 | 30 | 80C31BH |
| 4:XSIG72 | U514 | 10 | 27C64 |
| 4:XSIG72 | U619 | 2 | LS373 |
| 4:XSIG73 | U619 | 5 | LS373 |
| 4:XSIG73 | U514 | 9 | 27C64 |
| 4:XSIG74 | U619 | 6 | LS373 |
| 4:XSIG74 | U514 | 8 | 27C64 |
| 4:XSIG75 | U514 | 7 | 27C64 |
| 4:XSIG75 | U619 | 9 | LS373 |
| 4:XSIG76 | U619 | 12 | LS373 |
| 4:XSIG76 | U514 | 6 | 27C64 |
| 4:XSIG77 | U619 | 15 | LS373 |
| 4:XSIG77 | U514 | 5 | 27C64 |
| 4:XSIG78 | U619 | 16 | LS373 |
| 4:XSIG78 | U514 | 4 | 27C64 |
| 4:XSIG79 | U619 | 19 | LS373 |
| 4:XSIG79 | U514 | 3 | 27C64 |

| | | | |
|---|---|---|---|
| 4_HOME_POS~ | U719 | 11 | LS244 |
| 4_HOME_POS~ | U311 | 16 | 80C31BH |
| 4_HOME_POS~ | U516 | 9 | LS240 |
| 4_LEFT_LSW~ | U515 | 10 | LS08 |
| 4_LEFT_LSW~ | U311 | 17 | 80C31BH |
| 4_LEFT_LSW~ | U408 | 18 | LS240 |
| 4_RIGHT_LSW~ | U408 | 16 | LS240 |
| 4_RIGHT_LSW~ | U515 | 9 | LS08 |
| 5:XSIG136 | R407 | 1 | RES 1K |
| 5:XSIG136 | U616 | 14 | S240 |
| 5:XSIG136 | U313 | 19 | 80C31BH |
| 5:XSIG157 | U617 | 11 | LS373 |
| 5:XSIG157 | U313 | 30 | 80C31BH |
| 5:XSIG161 | U512 | 10 | 27C64 |
| 5:XSIG161 | U617 | 2 | LS373 |
| 5:XSIG162 | U617 | 5 | LS373 |
| 5:XSIG162 | U512 | 9 | 27C64 |
| 5:XSIG163 | U617 | 6 | LS373 |
| 5:XSIG163 | U512 | 8 | 27C64 |
| 5:XSIG164 | U512 | 7 | 27C64 |
| 5:XSIG164 | U617 | 9 | LS373 |
| 5:XSIG165 | U617 | 12 | LS373 |
| 5:XSIG165 | U512 | 6 | 27C64 |
| 5:XSIG167 | U617 | 15 | LS373 |
| 5:XSIG167 | U512 | 5 | 27C64 |
| 5:XSIG168 | U617 | 16 | LS373 |
| 5:XSIG168 | U512 | 4 | 27C64 |
| 5:XSIG169 | U617 | 19 | LS373 |
| 5:XSIG169 | U512 | 3 | 27C64 |
| 5:XSIG31 | R408 | 1 | RES 1K |
| 5:XSIG31 | U616 | 16 | S240 |
| 5:XSIG31 | U314 | 19 | 80C31BH |
| 5:XSIG56 | U618 | 11 | LS373 |
| 5:XSIG56 | U314 | 30 | 80C31BH |
| 5:XSIG60 | U513 | 10 | 27C64 |
| 5:XSIG60 | U618 | 2 | LS373 |
| 5:XSIG61 | U618 | 5 | LS373 |
| 5:XSIG61 | U513 | 9 | 27C64 |
| 5:XSIG62 | U618 | 6 | LS373 |
| 5:XSIG62 | U513 | 8 | 27C64 |
| 5:XSIG63 | U513 | 7 | 27C64 |
| 5:XSIG63 | U618 | 9 | LS373 |
| 5:XSIG64 | U618 | 12 | LS373 |
| 5:XSIG64 | U513 | 6 | 27C64 |
| 5:XSIG66 | U618 | 15 | LS373 |
| 5:XSIG66 | U513 | 5 | 27C64 |
| 5:XSIG67 | U618 | 16 | LS373 |
| 5:XSIG67 | U513 | 4 | 27C64 |
| 5:XSIG68 | U618 | 19 | LS373 |
| 5:XSIG68 | U513 | 3 | 27C64 |
| 5_HOME_POS~ | U719 | 13 | LS244 |
| 5_HOME_POS~ | U310 | 16 | 80C31BH |
| 5_HOME_POS~ | U516 | 7 | LS240 |
| 5_LEFT_LSW~ | U408 | 14 | LS240 |
| 5_LEFT_LSW~ | U310 | 17 | 80C31BH |
| 5_LEFT_LSW~ | U621 | 5 | LS08 |
| 5_RIGHT_LSW~ | U408 | 12 | LS240 |
| 5_RIGHT_LSW~ | U621 | 4 | LS08 |
| 6:XSIG138 | R405 | 1 | RES 1K |

| | | | |
|---|---|---|---|
| 6:XSIG138 | U311 | 19 | 80C31BH |
| 6:XSIG138 | U616 | 9 | S240 |
| 6:XSIG157 | U714 | 11 | LS373 |
| 6:XSIG157 | U311 | 30 | 80C31BH |
| 6:XSIG161 | U510 | 10 | 27C64 |
| 6:XSIG161 | U714 | 2 | LS373 |
| 6:XSIG162 | U714 | 5 | LS373 |
| 6:XSIG162 | U510 | 9 | 27C64 |
| 6:XSIG163 | U714 | 6 | LS373 |
| 6:XSIG163 | U510 | 8 | 27C64 |
| 6:XSIG164 | U510 | 7 | 27C64 |
| 6:XSIG164 | U714 | 9 | LS373 |
| 6:XSIG165 | U714 | 12 | LS373 |
| 6:XSIG165 | U510 | 6 | 27C64 |
| 6:XSIG167 | U714 | 15 | LS373 |
| 6:XSIG167 | U510 | 5 | 27C64 |
| 6:XSIG168 | U714 | 16 | LS373 |
| 6:XSIG168 | U510 | 4 | 27C64 |
| 6:XSIG169 | U714 | 19 | LS373 |
| 6:XSIG169 | U510 | 3 | 27C64 |
| 6:XSIG38 | R406 | 1 | RES 1K |
| 6:XSIG38 | U616 | 12 | S240 |
| 6:XSIG38 | U312 | 19 | 80C31BH |
| 6:XSIG59 | U715 | 11 | LS373 |
| 6:XSIG59 | U312 | 30 | 80C31BH |
| 6:XSIG63 | U511 | 10 | 27C64 |
| 6:XSIG63 | U715 | 2 | LS373 |
| 6:XSIG64 | U715 | 5 | LS373 |
| 6:XSIG64 | U511 | 9 | 27C64 |
| 6:XSIG65 | U715 | 6 | LS373 |
| 6:XSIG65 | U511 | 8 | 27C64 |
| 6:XSIG66 | U511 | 7 | 27C64 |
| 6:XSIG66 | U715 | 9 | LS373 |
| 6:XSIG67 | U715 | 12 | LS373 |
| 6:XSIG67 | U511 | 6 | 27C64 |
| 6:XSIG69 | U715 | 15 | LS373 |
| 6:XSIG69 | U511 | 5 | 27C64 |
| 6:XSIG70 | U715 | 16 | LS373 |
| 6:XSIG70 | U511 | 4 | 27C64 |
| 6:XSIG71 | U715 | 19 | LS373 |
| 6:XSIG71 | U511 | 3 | 27C64 |
| 6_HOME_POS~ | U719 | 15 | LS244 |
| 6¯HOME¯POS~ | U309 | 16 | 80C31BH |
| 6¯HOME¯POS~ | U516 | 5 | LS240 |
| 6¯LEFT¯LSW~ | U309 | 17 | 80C31BH |
| 6¯LEFT¯LSW~ | U621 | 2 | LS08 |
| 6¯LEFT¯LSW~ | U408 | 9 | LS240 |
| 6¯RIGHT¯LSW~ | U621 | 1 | LS08 |
| 6¯RIGHT¯LSW~ | U408 | 7 | LS240 |
| 7:XSIG139 | R403 | 1 | RES 1K |
| 7:XSIG139 | U309 | 19 | 80C31BH |
| 7:XSIG139 | U616 | 5 | S240 |
| 7:XSIG158 | U612 | 11 | LS373 |
| 7:XSIG158 | U309 | 30 | 80C31BH |
| 7:XSIG162 | U508 | 10 | 27C64 |
| 7:XSIG162 | U612 | 2 | LS373 |
| 7:XSIG163 | U612 | 5 | LS373 |
| 7:XSIG163 | U508 | 9 | 27C64 |
| 7:XSIG164 | U612 | 6 | LS373 |

| | | | |
|---|---|---|---|
| 7:XSIG164 | U508 | 8 | 27C64 |
| 7:XSIG165 | U508 | 7 | 27C64 |
| 7:XSIG165 | U612 | 9 | LS373 |
| 7:XSIG166 | U612 | 12 | LS373 |
| 7:XSIG166 | U508 | 6 | 27C64 |
| 7:XSIG168 | U612 | 15 | LS373 |
| 7:XSIG168 | U508 | 5 | 27C64 |
| 7:XSIG169 | U612 | 16 | LS373 |
| 7:XSIG169 | U508 | 4 | 27C64 |
| 7:XSIG170 | U612 | 19 | LS373 |
| 7:XSIG170 | U508 | 3 | 27C64 |
| 7:XSIG40 | R404 | 1 | RES 1K |
| 7:XSIG40 | U310 | 19 | 80C31BH |
| 7:XSIG40 | U616 | 7 | S240 |
| 7:XSIG59 | U613 | 11 | LS373 |
| 7:XSIG59 | U310 | 30 | 80C31BH |
| 7:XSIG63 | U509 | 10 | 27C64 |
| 7:XSIG63 | U613 | 2 | LS373 |
| 7:XSIG64 | U613 | 5 | LS373 |
| 7:XSIG64 | U509 | 9 | 27C64 |
| 7:XSIG65 | U613 | 6 | LS373 |
| 7:XSIG65 | U509 | 8 | 27C64 |
| 7:XSIG66 | U509 | 7 | 27C64 |
| 7:XSIG66 | U613 | 9 | LS373 |
| 7:XSIG67 | U613 | 12 | LS373 |
| 7:XSIG67 | U509 | 6 | 27C64 |
| 7:XSIG69 | U613 | 15 | LS373 |
| 7:XSIG69 | U509 | 5 | 27C64 |
| 7:XSIG70 | U613 | 16 | LS373 |
| 7:XSIG70 | U509 | 4 | 27C64 |
| 7:XSIG71 | U613 | 19 | LS373 |
| 7:XSIG71 | U509 | 3 | 27C64 |
| 7_HOME_POS~ | U308 | 16 | 80C31BH |
| 7_HOME_POS~ | U719 | 17 | LS244 |
| 7_HOME_POS~ | U516 | 3 | LS240 |
| 7_LEFT_LSW~ | U621 | 10 | LS08 |
| 7_LEFT_LSW~ | U308 | 17 | 80C31BH |
| 7_LEFT_LSW~ | U408 | 5 | LS240 |
| 7_RIGHT_LSW~ | U408 | 3 | LS240 |
| 7_RIGHT_LSW~ | U621 | 9 | LS08 |
| 8:XSIG38 | R402 | 1 | RES 1K |
| 8:XSIG38 | U308 | 19 | 80C31BH |
| 8:XSIG38 | U616 | 3 | S240 |
| 8:XSIG59 | U611 | 11 | LS373 |
| 8:XSIG59 | U308 | 30 | 80C31BH |
| 8:XSIG63 | U507 | 10 | 27C64 |
| 8:XSIG63 | U611 | 2 | LS373 |
| 8:XSIG64 | U611 | 5 | LS373 |
| 8:XSIG64 | U507 | 9 | 27C64 |
| 8:XSIG65 | U611 | 6 | LS373 |
| 8:XSIG65 | U507 | 8 | 27C64 |
| 8:XSIG66 | U507 | 7 | 27C64 |
| 8:XSIG66 | U611 | 9 | LS373 |
| 8:XSIG67 | U611 | 12 | LS373 |
| 8:XSIG67 | U507 | 6 | 27C64 |
| 8:XSIG69 | U611 | 15 | LS373 |
| 8:XSIG69 | U507 | 5 | 27C64 |
| 8:XSIG70 | U611 | 16 | LS373 |
| 8:XSIG70 | U507 | 4 | 27C64 |

| | | | |
|---|---|---|---|
| 8:XSIG71 | U611 | 19 | LS373 |
| 8:XSIG71 | U507 | 3 | 27C64 |
| 921.6KHZ_CLOCK | U302 | 1 | 8274 |
| 921.6KHZ_CLOCK | U602 | 11 | LS161 |
| 921.6KHZ_CLOCK | U502 | 15 | 8254 |
| 921.6KHZ_CLOCK | U502 | 18 | 8254 |
| 921.6KHZ_CLOCK | U502 | 9 | 8254 |
| A/D_STATUS | U622 | 11 | LS240 |
| A/D_STATUS | U316 | 14 | 316A102 1K |
| A/D_STATUS | | J3 15 | CONNECTOR |
| A/D_STATUS~ | U303 | 15 | 80C31BH |
| A/D_STATUS~ | U622 | 9 | LS240 |
| AAA | U307 | 14 | LS244 |
| AAA | | P2 18 | CONNECTOR |
| ADR0~ | U706 | 2 | LS240 |
| ADR0~ | | P1 69 | CONNECTOR |
| ADR10~ | U704 | 2 | LS240 |
| ADR10~ | | P1 34 | CONNECTOR |
| ADR11~ | U704 | 4 | LS240 |
| ADR11~ | | P1 36 | CONNECTOR |
| ADR12~ | U704 | 6 | LS240 |
| ADR12~ | | P1 38 | CONNECTOR |
| ADR13~ | U704 | 8 | LS240 |
| ADR13~ | | P1 40 | CONNECTOR |
| ADR14~ | U704 | 11 | LS240 |
| ADR14~ | | P2 83 | CONNECTOR |
| ADR15~ | U704 | 13 | LS240 |
| ADR15~ | | P2 78 | CONNECTOR |
| ADR16~ | U704 | 15 | LS240 |
| ADR16~ | | P2 81 | CONNECTOR |
| ADR17~ | U704 | 17 | LS240 |
| ADR17~ | | P2 76 | CONNECTOR |
| ADR1~ | U706 | 4 | LS240 |
| ADR1~ | | P1 70 | CONNECTOR |
| ADR2~ | U706 | 6 | LS240 |
| ADR2~ | | P1 67 | CONNECTOR |
| ADR3~ | U706 | 8 | LS240 |
| ADR3~ | | P1 68 | CONNECTOR |
| ADR4~ | U706 | 11 | LS240 |
| ADR4~ | | P1 65 | CONNECTOR |
| ADR5~ | U706 | 13 | LS240 |
| ADR5~ | | P1 66 | CONNECTOR |
| ADR6~ | U706 | 15 | LS240 |
| ADR6~ | | P1 63 | CONNECTOR |
| ADR7~ | U706 | 17 | LS240 |
| ADR7~ | | P1 64 | CONNECTOR |
| ADR8~ | U705 | 2 | LS240 |
| ADR8~ | | P1 59 | CONNECTOR |
| ADR9~ | U705 | 4 | LS240 |
| ADR9~ | | P1 60 | CONNECTOR |
| ADRA~ | U705 | 6 | LS240 |
| ADRA~ | | P1 57 | CONNECTOR |
| ADRB~ | U705 | 8 | LS240 |
| ADRB~ | | P1 58 | CONNECTOR |
| ADRC~ | U705 | 11 | LS240 |
| ADRC~ | | P1 55 | CONNECTOR |
| ADRD~ | U705 | 13 | LS240 |
| ADRD~ | | P1 56 | CONNECTOR |
| ADRE~ | U705 | 15 | LS240 |

| | | | |
|---|---|---|---|
| ADRE~ | | P1 53 | CONNECTOR |
| ADRF~ | U705 | 17 | LS240 |
| ADRF~ | | P1 54 | CONNECTOR |
| AX0_HP | C118 | 1 | CAP 1UF |
| AX0_HP | U109 | 16 | 316B 47 |
| AX0_HP | U407 | 2 | 316A102 1K |
| AX0_HPOS_1 | U109 | 1 | 316B 47 |
| AX0_HPOS_1 | | J4 18 | CONNECTOR |
| AX0_LEFT | C210 | 1 | CAP 1UF |
| AX0_LEFT | U222 | 16 | 316B 47 |
| AX0_LEFT | U517 | 2 | LS240 |
| AX0_LEFT_LSW | U222 | 1 | 316B 47 |
| AX0_LEFT_LSW | | J4 1 | CONNECTOR |
| AX0_RIGHT | C211 | 1 | CAP 1UF |
| AX0_RIGHT | U222 | 15 | 316B 47 |
| AX0_RIGHT | U318 | 2 | 316A102 1K |
| AX0_RIGHT | U517 | 4 | LS240 |
| AX0_RIGHT_LSW | U222 | 2 | 316B 47 |
| AX0_RIGHT_LSW | | J4 2 | CONNECTOR |
| AX1_HP | C119 | 1 | CAP 1UF |
| AX1_HP | U109 | 15 | 316B 47 |
| AX1_HP | U407 | 3 | 316A102 1K |
| AX1_HP | U516 | 4 | LS240 |
| AX1_HPOS | U109 | 2 | 316B 47 |
| AX1_HPOS | | J4 20 | CONNECTOR |
| AX1_LEFT | C212 | 1 | CAP 1UF |
| AX1_LEFT | U222 | 14 | 316B 47 |
| AX1_LEFT | U318 | 3 | 316A102 1K |
| AX1_LEFT | U517 | 6 | LS240 |
| AX1_LEFT_LSW | U222 | 3 | 316B 47 |
| AX1_LEFT_LSW | | J4 3 | CONNECTOR |
| AX1_RIGHT | C213 | 1 | CAP 1UF |
| AX1_RIGHT | U222 | 13 | 316B 47 |
| AX1_RIGHT | U318 | 4 | 316A102 1K |
| AX1_RIGHT | U517 | 8 | LS240 |
| AX1_RIGHT_LSW | U222 | 4 | 316B 47 |
| AX1_RIGHT_LSW | | J4 4 | CONNECTOR |
| AX2_HP | C120 | 1 | CAP 1UF |
| AX2_HP | U109 | 14 | 316B 47 |
| AX2_HP | U407 | 4 | 316A102 1K |
| AX2_HP | U516 | 6 | LS240 |
| AX2_HPOS | U109 | 3 | 316B 47 |
| AX2_HPOS | | J4 21 | CONNECTOR |
| AX2_LEFT | C214 | 1 | CAP 1UF |
| AX2_LEFT | U517 | 11 | LS240 |
| AX2_LEFT | U222 | 12 | 316B 47 |
| AX2_LEFT | U318 | 5 | 316A102 1K |
| AX2_LEFT_LSW | U222 | 5 | 316B 47 |
| AX2_LEFT_LSW | | J4 5 | CONNECTOR |
| AX2_RIGHT | C215 | 1 | CAP 1UF |
| AX2_RIGHT | U222 | 11 | 316B 47 |
| AX2_RIGHT | U517 | 13 | LS240 |
| AX2_RIGHT | U318 | 6 | 316A102 1K |
| AX2_RIGHT_LSW | U222 | 6 | 316B 47 |
| AX2_RIGHT_LSW | | J4 6 | CONNECTOR |
| AX3_HP | C121 | 1 | CAP 1UF |
| AX3_HP | U109 | 13 | 316B 47 |
| AX3_HP | U407 | 5 | 316A102 1K |
| AX3_HP | U516 | 8 | LS240 |

| | | | |
|---|---|---|---|
| AX3_HPOS | U109 | 4 | 316B 47 |
| AX3_HPOS | | J4 22 | CONNECTOR |
| AX3_LEFT | C216 | 1 | CAP 1UF |
| AX3_LEFT | U222 | 10 | 316B 47 |
| AX3_LEFT | U517 | 15 | LS240 |
| AX3_LEFT | U318 | 7 | 316A102 1K |
| AX3_LEFT_LSW | U222 | 7 | 316B 47 |
| AX3_LEFT_LSW | | J4 7 | CONNECTOR |
| AX3_RIGHT | C217 | 1 | CAP 1UF |
| AX3_RIGHT | U517 | 17 | LS240 |
| AX3_RIGHT | U318 | 8 | 316A102 1K |
| AX3_RIGHT | U222 | 9 | 316B 47 |
| AX3_RIGHT_LSW | U222 | 8 | 316B 47 |
| AX3_RIGHT_LSW | | J4 8 | CONNECTOR |
| AX4_HP | C122 | 1 | CAP 1UF |
| AX4_HP | U516 | 11 | LS240 |
| AX4_HP | U109 | 12 | 316B 47 |
| AX4_HP | U407 | 6 | 316A102 1K |
| AX4_HPOS | U109 | 5 | 316B 47 |
| AX4_HPOS | | J4 23 | CONNECTOR |
| AX4_LEFT | C202 | 1 | CAP 1UF |
| AX4_LEFT | U221 | 16 | 316B 47 |
| AX4_LEFT | U408 | 2 | LS240 |
| AX4_LEFT | U318 | 9 | 316A102 1K |
| AX4_LEFT_LSW | U221 | 1 | 316B 47 |
| AX4_LEFT_LSW | | J4 9 | CONNECTOR |
| AX4_RIGHT | C203 | 1 | CAP 1UF |
| AX4_RIGHT | U318 | 10 | 316A102 1K |
| AX4_RIGHT | U221 | 15 | 316B 47 |
| AX4_RIGHT | U408 | 4 | LS240 |
| AX4_RIGHT_LSW | U221 | 2 | 316B 47 |
| AX4_RIGHT_LSW | | J4 10 | CONNECTOR |
| AX5_HP | C123 | 1 | CAP 1UF |
| AX5_HP | U109 | 11 | 316B 47 |
| AX5_HP | U516 | 13 | LS240 |
| AX5_HP | U407 | 7 | 316A102 1K |
| AX5_HPOS | U109 | 6 | 316B 47 |
| AX5_HPOS | | J4 24 | CONNECTOR |
| AX5_LEFT | C204 | 1 | CAP 1UF |
| AX5_LEFT | U318 | 11 | 316A102 1K |
| AX5_LEFT | U221 | 14 | 316B 47 |
| AX5_LEFT | U408 | 6 | LS240 |
| AX5_LEFT_LSW | U221 | 3 | 316B 47 |
| AX5_LEFT_LSW | | J4 11 | CONNECTOR |
| AX5_RIGHT | C205 | 1 | CAP 1UF |
| AX5_RIGHT | U318 | 12 | 316A102 1K |
| AX5_RIGHT | U221 | 13 | 316B 47 |
| AX5_RIGHT | U408 | 8 | LS240 |
| AX5_RIGHT_LSW | U221 | 4 | 316B 47 |
| AX5_RIGHT_LSW | | J4 12 | CONNECTOR |
| AX6_HP | C124 | 1 | CAP 1UF |
| AX6_HP | U109 | 10 | 316B 47 |
| AX6_HP | U516 | 15 | LS240 |
| AX6_HP | U407 | 8 | 316A102 1K |
| AX6_HPOS | U109 | 7 | 316B 47 |
| AX6_HPOS | | J4 25 | CONNECTOR |
| AX6_LEFT | C206 | 1 | CAP 1UF |
| AX6_LEFT | U408 | 11 | LS240 |

| | | | |
|---|---|---|---|
| AX6_LEFT | U221 | 12 | 316B 47 |
| AX6_LEFT | U318 | 13 | 316A102 1K |
| AX6_LEFT_LSW | U221 | 5 | 316B 47 |
| AX6_LEFT_LSW | | J4 13 | CONNECTOR |
| AX6_RIGHT | C207 | 1 | CAP 1UF |
| AX6_RIGHT | U221 | 11 | 316B 47 |
| AX6_RIGHT | U408 | 13 | LS240 |
| AX6_RIGHT | U318 | 14 | 316A102 1K |
| AX6_RIGHT_LSW | U221 | 6 | 316B 47 |
| AX6_RIGHT_LSW | | J4 14 | CONNECTOR |
| AX7_HP | C125 | 1 | CAP 1UF |
| AX7_HP | U516 | 17 | LS240 |
| AX7_HP | U407 | 9 | 316A102 1K |
| AX7_HPOS | U109 | 8 | 316B 47 |
| AX7_HPOS | | J4 26 | CONNECTOR |
| AX7_LEFT | C208 | 1 | CAP 1UF |
| AX7_LEFT | U221 | 10 | 316B 47 |
| AX7_LEFT | U318 | 15 | 316A102 1K |
| AX7_LEFT_LSW | U221 | 7 | 316B 47 |
| AX7_LEFT_LSW | | J4 15 | CONNECTOR |
| AX7_RIGHT | C209 | 1 | CAP 1UF |
| AX7_RIGHT | U408 | 17 | LS240 |
| AX7_RIGHT | U221 | 9 | 316B 47 |
| AX7_RIGHT_LSW | U221 | 8 | 316B 47 |
| AX7_RIGHT_LSW | | J4 16 | CONNECTOR |
| BAK_TV_LAMP~ | U201 | 19 | LS273 |
| BAK_TV_LAMP~ | U317 | 3 | 06 |
| BAR_A | U108 | 1 | 316B 47 |
| BAR_A | | J4 27 | CONNECTOR |
| BAR_B | U108 | 2 | 316B 47 |
| BAR_B | | J4 28 | CONNECTOR |
| BAR_CODE_B | C128 | 1 | CAP 1UF |
| BAR_CODE_B | U407 | 13 | 316A102 1K |
| BAR_CODE_B | U108 | 15 | 316B 47 |
| BAR_CODE_B | U620 | 4 | LS240 |
| CARD_SELECT~ | U703 | 15 | PAL14L4 |
| CARD_SELECT~ | U708 | 19 | LS640 |
| CARD_SELECT~ | U615 | 5 | S04 |
| CASET_DR_OPEN | U108 | 3 | 316B 47 |
| CASET_DR_OPEN | | J4 35 | CONNECTOR |
| CASET_OPEN | C127 | 1 | CAP 1UF |
| CASET_OPEN | U407 | 14 | 316A102 1K |
| CASET_OPEN | U620 | 6 | LS240 |
| CCLK | U702 | 14 | S240 |
| CCLK | U701 | 8 | LS164 |
| CCLK~ | U702 | 6 | S240 |
| CCLK~ | | P1 37 | CONNECTOR |
| CD_A | U104 | 1 | 1489 |
| CD_A | | J5 8 | CONNECTOR |
| CD_B | U101 | 1 | 1489 |
| CD_B | | J6 8 | CONNECTOR |
| CD_INIT~ | U718 | 1 | LS74 |
| CD_INIT~ | U601 | 10 | LS08 |
| CD_INIT~ | U317 | 13 | 06 |
| CD_INIT~ | U306 | 14 | LS240 |
| CD_INIT~ | U302 | 2 | 8274 |
| CD_INIT~ | U717 | 4 | LS74 |
| CLOCK_A | U502 | 10 | 8254 |
| CLOCK_A | U302 | 35 | 8274 |

| | | | |
|---|---|---|---|
| CLOCK_A | U302 | 36 | 8274 |
| CLOCK_B | U502 | 13 | 8254 |
| CLOCK_B | U302 | 4 | 8274 |
| CLOCK_B | U302 | 7 | 8274 |
| CP0_A10 | U514 | 21 | 27C64 |
| CP0_A10 | U315 | 23 | 80C31BH |
| CP0_A11 | U514 | 23 | 27C64 |
| CP0_A11 | U315 | 24 | 80C31BH |
| CP0_A12 | U514 | 2 | 27C64 |
| CP0_A12 | U315 | 25 | 80C31BH |
| CP0_A8 | U315 | 21 | 80C31BH |
| CP0_A8 | U514 | 25 | 27C64 |
| CP0_A9 | U315 | 22 | 80C31BH |
| CP0_A9 | U514 | 24 | 27C64 |
| CP0_AD0 | U514 | 11 | 27C64 |
| CP0_AD0 | U619 | 3 | LS373 |
| CP0_AD0 | U315 | 39 | 80C31BH |
| CP0_AD1 | U514 | 12 | 27C64 |
| CP0_AD1 | U315 | 38 | 80C31BH |
| CP0_AD1 | U619 | 4 | LS373 |
| CP0_AD2 | U514 | 13 | 27C64 |
| CP0_AD2 | U315 | 37 | 80C31BH |
| CP0_AD2 | U619 | 7 | LS373 |
| CP0_AD3 | U514 | 15 | 27C64 |
| CP0_AD3 | U315 | 36 | 80C31BH |
| CP0_AD3 | U619 | 8 | LS373 |
| CP0_AD4 | U619 | 13 | LS373 |
| CP0_AD4 | U514 | 16 | 27C64 |
| CP0_AD4 | U315 | 35 | 80C31BH |
| CP0_AD5 | U619 | 14 | LS373 |
| CP0_AD5 | U514 | 17 | 27C64 |
| CP0_AD5 | U315 | 34 | 80C31BH |
| CP0_AD6 | U619 | 17 | LS373 |
| CP0_AD6 | U514 | 18 | 27C64 |
| CP0_AD6 | U315 | 33 | 80C31BH |
| CP0_AD7 | U619 | 18 | LS373 |
| CP0_AD7 | U514 | 19 | 27C64 |
| CP0_AD7 | U315 | 32 | 80C31BH |
| CP0_MOTION_CMP | U220 | 17 | LS373 |
| CP0_MOTION_CMP | U315 | 8 | 80C31BH |
| CP0_PA0/PULSE | U315 | 1 | 80C31BH |
| CP0_PA0/PULSE | U220 | 3 | LS373 |
| CP0_PA1/DIR | U315 | 2 | 80C31BH |
| CP0_PA1/DIR | U220 | 4 | LS373 |
| CP0_PA2 | U315 | 3 | 80C31BH |
| CP0_PA2 | U220 | 7 | LS373 |
| CP0_PA3 | U315 | 4 | 80C31BH |
| CP0_PA3 | U220 | 8 | LS373 |
| CP0_PB0 | U220 | 13 | LS373 |
| CP0_PB0 | U315 | 5 | 80C31BH |
| CP0_PB1 | U220 | 14 | LS373 |
| CP0_PB1 | U315 | 6 | 80C31BH |
| CP1_A10 | U513 | 21 | 27C64 |
| CP1_A10 | U314 | 23 | 80C31BH |
| CP1_A11 | U513 | 23 | 27C64 |
| CP1_A11 | U314 | 24 | 80C31BH |
| CP1_A12 | U513 | 2 | 27C64 |
| CP1_A12 | U314 | 25 | 80C31BH |
| CP1_A8 | U314 | 21 | 80C31BH |

| | | | |
|---|---|---|---|
| CP1_A8 | U513 | 25 | 27C64 |
| CP1_A9 | U314 | 22 | 80C31BH |
| CP1_A9 | U513 | 24 | 27C64 |
| CP1_AD0 | U513 | 11 | 27C64 |
| CP1_AD0 | U618 | 3 | LS373 |
| CP1_AD0 | U314 | 39 | 80C31BH |
| CP1_AD1 | U513 | 12 | 27C64 |
| CP1_AD1 | U314 | 38 | 80C31BH |
| CP1_AD1 | U618 | 4 | LS373 |
| CP1_AD2 | U513 | 13 | 27C64 |
| CP1_AD2 | U314 | 37 | 80C31BH |
| CP1_AD2 | U618 | 7 | LS373 |
| CP1_AD3 | U513 | 15 | 27C64 |
| CP1_AD3 | U314 | 36 | 80C31BH |
| CP1_AD3 | U618 | 8 | LS373 |
| CP1_AD4 | U618 | 13 | LS373 |
| CP1_AD4 | U513 | 16 | 27C64 |
| CP1_AD4 | U314 | 35 | 80C31BH |
| CP1_AD5 | U618 | 14 | LS373 |
| CP1_AD5 | U513 | 17 | 27C64 |
| CP1_AD5 | U314 | 34 | 80C31BH |
| CP1_AD6 | U618 | 17 | LS373 |
| CP1_AD6 | U513 | 18 | 27C64 |
| CP1_AD6 | U314 | 33 | 80C31BH |
| CP1_AD7 | U618 | 18 | LS373 |
| CP1_AD7 | U513 | 19 | 27C64 |
| CP1_AD7 | U314 | 32 | 80C31BH |
| CP1_MOTION_CMP | U215 | 5 | 07 |
| CP1_MOTION_CMP | U314 | 8 | 80C31BH |
| CP1_PA0/PULSE | U215 | 1 | 07 |
| CP1_PA1/DIR | U216 | 13 | 07 |
| CP1_PA1/DIR | U314 | 2 | 80C31BH |
| CP1_PA2 | U216 | 11 | 07 |
| CP1_PA2 | U314 | 3 | 80C31BH |
| CP1_PA3 | U314 | 4 | 80C31BH |
| CP1_PA3 | U216 | 5 | 07 |
| CP1_PB0 | U314 | 5 | 80C31BH |
| CP1_PB0 | U216 | 9 | 07 |
| CP1_PB1 | U215 | 3 | 07 |
| CP1_PB1 | U314 | 6 | 80C31BH |
| CP2_A10 | U512 | 21 | 27C64 |
| CP2_A10 | U313 | 23 | 80C31BH |
| CP2_A11 | U512 | 23 | 27C64 |
| CP2_A11 | U313 | 24 | 80C31BH |
| CP2_A12 | U512 | 2 | 27C64 |
| CP2_A12 | U313 | 25 | 80C31BH |
| CP2_A8 | U313 | 21 | 80C31BH |
| CP2_A8 | U512 | 25 | 27C64 |
| CP2_A9 | U313 | 22 | 80C31BH |
| CP2_A9 | U512 | 24 | 27C64 |
| CP2_AD0 | U512 | 11 | 27C64 |
| CP2_AD0 | U617 | 3 | LS373 |
| CP2_AD0 | U313 | 39 | 80C31BH |
| CP2_AD1 | U512 | 12 | 27C64 |
| CP2_AD1 | U313 | 38 | 80C31BH |
| CP2_AD1 | U617 | 4 | LS373 |
| CP2_AD2 | U512 | 13 | 27C64 |
| CP2_AD2 | U313 | 37 | 80C31BH |

| | | | |
|---|---|---|---|
| CP2_AD2 | U617 | 7 | LS373 |
| CP2_AD3 | U512 | 15 | 27C64 |
| CP2_AD3 | U313 | 36 | 80C31BH |
| CP2_AD3 | U617 | 8 | LS373 |
| CP2_AD4 | U617 | 13 | LS373 |
| CP2_AD4 | U512 | 16 | 27C64 |
| CP2_AD4 | U313 | 35 | 80C31BH |
| CP2_AD5 | U617 | 14 | LS373 |
| CP2_AD5 | U512 | 17 | 27C64 |
| CP2_AD5 | U313 | 34 | 80C31BH |
| CP2_AD6 | U617 | 17 | LS373 |
| CP2_AD6 | U512 | 18 | 27C64 |
| CP2_AD6 | U313 | 33 | 80C31BH |
| CP2_AD7 | U617 | 18 | LS373 |
| CP2_AD7 | U512 | 19 | 27C64 |
| CP2_AD7 | U313 | 32 | 80C31BH |
| CP2_MOTION_CMP | U313 | 8 | 80C31BH |
| CP2_MOTION_CMP | U214 | 9 | 07 |
| CP2_PA0/PULSE | U313 | 1 | 80C31BH |
| CP2_PA0/PULSE | U214 | 3 | 07 |
| CP2_PA1/DIR | U214 | 1 | 07 |
| CP2_PA1/DIR | U313 | 2 | 80C31BH |
| CP2_PA2 | U215 | 13 | 07 |
| CP2_PA2 | U313 | 3 | 80C31BH |
| CP2_PA3 | U313 | 4 | 80C31BH |
| CP2_PA3 | U215 | 9 | 07 |
| CP2_PB0 | U215 | 11 | 07 |
| CP2_PB0 | U313 | 5 | 80C31BH |
| CP2_PB1 | U214 | 5 | 07 |
| CP2_PB1 | U313 | 6 | 80C31BH |
| CP3_A10 | U511 | 21 | 27C64 |
| CP3_A10 | U312 | 23 | 80C31BH |
| CP3_A11 | U511 | 23 | 27C64 |
| CP3_A11 | U312 | 24 | 80C31BH |
| CP3_A12 | U511 | 2 | 27C64 |
| CP3_A12 | U312 | 25 | 80C31BH |
| CP3_A8 | U312 | 21 | 80C31BH |
| CP3_A8 | U511 | 25 | 27C64 |
| CP3_A9 | U312 | 22 | 80C31BH |
| CP3_A9 | U511 | 24 | 27C64 |
| CP3_AD0 | U511 | 11 | 27C64 |
| CP3_AD0 | U715 | 3 | LS373 |
| CP3_AD0 | U312 | 39 | 80C31BH |
| CP3_AD1 | U511 | 12 | 27C64 |
| CP3_AD1 | U312 | 38 | 80C31BH |
| CP3_AD1 | U715 | 4 | LS373 |
| CP3_AD2 | U511 | 13 | 27C64 |
| CP3_AD2 | U312 | 37 | 80C31BH |
| CP3_AD2 | U715 | 7 | LS373 |
| CP3_AD3 | U511 | 15 | 27C64 |
| CP3_AD3 | U312 | 36 | 80C31BH |
| CP3_AD3 | U715 | 8 | LS373 |
| CP3_AD4 | U715 | 13 | LS373 |
| CP3_AD4 | U511 | 16 | 27C64 |
| CP3_AD4 | U312 | 35 | 80C31BH |
| CP3_AD5 | U715 | 14 | LS373 |
| CP3_AD5 | U511 | 17 | 27C64 |
| CP3_AD5 | U312 | 34 | 80C31BH |
| CP3_AD6 | U715 | 17 | LS373 |

| | | | |
|---|---|---|---|
| CP3_AD6 | U511 | 18 | 27C64 |
| CP3_AD6 | U312 | 33 | 80C31BH |
| CP3_AD7 | U715 | 18 | LS373 |
| CP3_AD7 | U511 | 19 | 27C64 |
| CP3_AD7 | U312 | 32 | 80C31BH |
| CP3_MOTION_CMP | U208 | 11 | 07 |
| CP3_MOTION_CMP | U312 | 8 | 80C31BH |
| CP3_PA0/PULSE | U312 | 1 | 80C31BH |
| CP3_PA0/PULSE | U208 | 5 | 07 |
| CP3_PA1/DIR | U312 | 2 | 80C31BH |
| CP3_PA1/DIR | U208 | 3 | 07 |
| CP3_PA2 | U208 | 1 | 07 |
| CP3_PA2 | U312 | 3 | 80C31BH |
| CP3_PA3 | U214 | 11 | 07 |
| CP3_PA3 | U312 | 4 | 80C31BH |
| CP3_PB0 | U214 | 13 | 07 |
| CP3_PB0 | U312 | 5 | 80C31BH |
| CP3_PB1 | U312 | 6 | 80C31BH |
| CP3_PB1 | U208 | 9 | 07 |
| CP4_A10 | U510 | 21 | 27C64 |
| CP4_A10 | U311 | 23 | 80C31BH |
| CP4_A11 | U510 | 23 | 27C64 |
| CP4_A11 | U311 | 24 | 80C31BH |
| CP4_A12 | U510 | 2 | 27C64 |
| CP4_A12 | U311 | 25 | 80C31BH |
| CP4_A8 | U311 | 21 | 80C31BH |
| CP4_A8 | U510 | 25 | 27C64 |
| CP4_A9 | U311 | 22 | 80C31BH |
| CP4_A9 | U510 | 24 | 27C64 |
| CP4_AD0 | U510 | 11 | 27C64 |
| CP4_AD0 | U714 | 3 | LS373 |
| CP4_AD0 | U311 | 39 | 80C31BH |
| CP4_AD1 | U510 | 12 | 27C64 |
| CP4_AD1 | U311 | 38 | 80C31BH |
| CP4_AD1 | U714 | 4 | LS373 |
| CP4_AD2 | U510 | 13 | 27C64 |
| CP4_AD2 | U311 | 37 | 80C31BH |
| CP4_AD2 | U714 | 7 | LS373 |
| CP4_AD3 | U510 | 15 | 27C64 |
| CP4_AD3 | U311 | 36 | 80C31BH |
| CP4_AD3 | U714 | 8 | LS373 |
| CP4_AD4 | U714 | 13 | LS373 |
| CP4_AD4 | U510 | 16 | 27C64 |
| CP4_AD4 | U311 | 35 | 80C31BH |
| CP4_AD5 | U714 | 14 | LS373 |
| CP4_AD5 | U510 | 17 | 27C64 |
| CP4_AD5 | U311 | 34 | 80C31BH |
| CP4_AD6 | U714 | 17 | LS373 |
| CP4_AD6 | U510 | 18 | 27C64 |
| CP4_AD6 | U311 | 33 | 80C31BH |
| CP4_AD7 | U714 | 18 | LS373 |
| CP4_AD7 | U510 | 19 | 27C64 |
| CP4_AD7 | U311 | 32 | 80C31BH |
| CP4_MOTION_CMP | U207 | 13 | 07 |
| CP4_MOTION_CMP | U311 | 8 | 80C31BH |
| CP4_PA0/PULSE | U311 | 1 | 80C31BH |
| CP4_PA0/PULSE | U207 | 9 | 07 |
| CP4_PA1/DIR | U311 | 2 | 80C31BH |
| CP4_PA1/DIR | U207 | 5 | 07 |

| | | | |
|---|---|---|---|
| CP4_PA2 | U207 | 1 | 07 |
| CP4_PA2 | U311 | 3 | 80C31BH |
| CP4_PA3 | U208 | 13 | 07 |
| CP4_PA3 | U311 | 4 | 80C31BH |
| CP4_PB0 | U207 | 3 | 07 |
| CP4_PB0 | U311 | 5 | 80C31BH |
| CP4_PB1 | U207 | 11 | 07 |
| CP4_PB1 | U311 | 6 | 80C31BH |
| CP5_A10 | U509 | 21 | 27C64 |
| CP5_A10 | U310 | 23 | 80C31BH |
| CP5_A11 | U509 | 23 | 27C64 |
| CP5_A11 | U310 | 24 | 80C31BH |
| CP5_A12 | U509 | 2 | 27C64 |
| CP5_A12 | U310 | 25 | 80C31BH |
| CP5_A8 | U310 | 21 | 80C31BH |
| CP5_A8 | U509 | 25 | 27C64 |
| CP5_A9 | U310 | 22 | 80C31BH |
| CP5_A9 | U509 | 24 | 27C64 |
| CP5_AD0 | U509 | 11 | 27C64 |
| CP5_AD0 | U613 | 3 | LS373 |
| CP5_AD0 | U310 | 39 | 80C31BH |
| CP5_AD1 | U509 | 12 | 27C64 |
| CP5_AD1 | U310 | 38 | 80C31BH |
| CP5_AD1 | U613 | 4 | LS373 |
| CP5_AD2 | U509 | 13 | 27C64 |
| CP5_AD2 | U310 | 37 | 80C31BH |
| CP5_AD2 | U613 | 7 | LS373 |
| CP5_AD3 | U509 | 15 | 27C64 |
| CP5_AD3 | U310 | 36 | 80C31BH |
| CP5_AD3 | U613 | 8 | LS373 |
| CP5_AD4 | U613 | 13 | LS373 |
| CP5_AD4 | U509 | 16 | 27C64 |
| CP5_AD4 | U310 | 35 | 80C31BH |
| CP5_AD5 | U613 | 14 | LS373 |
| CP5_AD5 | U509 | 17 | 27C64 |
| CP5_AD5 | U310 | 34 | 80C31BH |
| CP5_AD6 | U613 | 17 | LS373 |
| CP5_AD6 | U509 | 18 | 27C64 |
| CP5_AD6 | U310 | 33 | 80C31BH |
| CP5_AD7 | U613 | 18 | LS373 |
| CP5_AD7 | U509 | 19 | 27C64 |
| CP5_AD7 | U310 | 32 | 80C31BH |
| CP5_MOTION_CMPU310 | | 8 | 80C31BH |
| CP5_MOTION_CMPU206 | | 9 | 07 |
| CP5_PA0/PULSE | U310 | 1 | 80C31BH |
| CP5_PA1/DIR | U206 | 13 | 07 |
| CP5_PA1/DIR | U310 | 2 | 80C31BH |
| CP5_PA2 | U206 | 11 | 07 |
| CP5_PA2 | U310 | 3 | 80C31BH |
| CP5_PA3 | U206 | 1 | 07 |
| CP5_PA3 | U310 | 4 | 80C31BH |
| CP5_PB0 | U206 | 3 | 07 |
| CP5_PB0 | U310 | 5 | 80C31BH |
| CP5_PB1 | U206 | 5 | 07 |
| CP5_PB1 | U310 | 6 | 80C31BH |
| CP6_A10 | U508 | 21 | 27C64 |
| CP6_A10 | U309 | 23 | 80C31BH |
| CP6_A11 | U508 | 23 | 27C64 |
| CP6_A11 | U309 | 24 | 80C31BH |

| | | | |
|---|---|---|---|
| CP6_A12 | U508 | 2 | 27C64 |
| CP6_A12 | U309 | 25 | 80C31BH |
| CP6_A8 | U309 | 21 | 80C31BH |
| CP6_A8 | U508 | 25 | 27C64 |
| CP6_A9 | U309 | 22 | 80C31BH |
| CP6_A9 | U508 | 24 | 27C64 |
| CP6_AD0 | U508 | 11 | 27C64 |
| CP6_AD0 | U612 | 3 | LS373 |
| CP6_AD0 | U309 | 39 | 80C31BH |
| CP6_AD1 | U508 | 12 | 27C64 |
| CP6_AD1 | U309 | 38 | 80C31BH |
| CP6_AD1 | U612 | 4 | LS373 |
| CP6_AD2 | U508 | 13 | 27C64 |
| CP6_AD2 | U309 | 37 | 80C31BH |
| CP6_AD2 | U612 | 7 | LS373 |
| CP6_AD3 | U508 | 15 | 27C64 |
| CP6_AD3 | U309 | 36 | 80C31BH |
| CP6_AD3 | U612 | 8 | LS373 |
| CP6_AD4 | U612 | 13 | LS373 |
| CP6_AD4 | U508 | 16 | 27C64 |
| CP6_AD4 | U309 | 35 | 80C31BH |
| CP6_AD5 | U612 | 14 | LS373 |
| CP6_AD5 | U508 | 17 | 27C64 |
| CP6_AD5 | U309 | 34 | 80C31BH |
| CP6_AD6 | U612 | 17 | LS373 |
| CP6_AD6 | U508 | 18 | 27C64 |
| CP6_AD6 | U309 | 33 | 80C31BH |
| CP6_AD7 | U612 | 18 | LS373 |
| CP6_AD7 | U508 | 19 | 27C64 |
| CP6_AD7 | U309 | 32 | 80C31BH |
| CP6_MOTION_CMPU210 | | 11 | 07 |
| CP6_MOTION_CMPU309 | | 8 | 80C31BH |
| CP6_PA0/PULSE | U309 | 1 | 80C31BH |
| CP6_PA0/PULSE | U106 | 3 | 07 |
| CP6_PA1/DIR | U106 | 1 | 07 |
| CP6_PA1/DIR | U309 | 2 | 80C31BH |
| CP6_PA2 | U210 | 13 | 07 |
| CP6_PA2 | U309 | 3 | 80C31BH |
| CP6_PA3 | U210 | 3 | 07 |
| CP6_PA3 | U309 | 4 | 80C31BH |
| CP6_PB0 | U210 | 5 | 07 |
| CP6_PB1 | U309 | 6 | 80C31BH |
| CP6_PB1 | U210 | 9 | 07 |
| CP7_A10 | U507 | 21 | 27C64 |
| CP7_A10 | U308 | 23 | 80C31BH |
| CP7_A11 | U507 | 23 | 27C64 |
| CP7_A11 | U308 | 24 | 80C31BH |
| CP7_A12 | U507 | 2 | 27C64 |
| CP7_A12 | U308 | 25 | 80C31BH |
| CP7_A8 | U308 | 21 | 80C31BH |
| CP7_A8 | U507 | 25 | 27C64 |
| CP7_A9 | U308 | 22 | 80C31BH |
| CP7_A9 | U507 | 24 | 27C64 |
| CP7_AD0 | U507 | 11 | 27C64 |
| CP7_AD0 | U611 | 3 | LS373 |
| CP7_AD0 | U308 | 39 | 80C31BH |
| CP7_AD1 | U507 | 12 | 27C64 |
| CP7_AD1 | U308 | 38 | 80C31BH |
| CP7_AD1 | U611 | 4 | LS373 |

| | | | |
|---|---|---|---|
| CP7_AD2 | U507 | 13 | 27C64 |
| CP7_AD2 | U308 | 37 | 80C31BH |
| CP7_AD2 | U611 | 7 | LS373 |
| CP7_AD3 | U507 | 15 | 27C64 |
| CP7_AD3 | U308 | 36 | 80C31BH |
| CP7_AD3 | U611 | 8 | LS373 |
| CP7_AD4 | U611 | 13 | LS373 |
| CP7_AD4 | U507 | 16 | 27C64 |
| CP7_AD4 | U308 | 35 | 80C31BH |
| CP7_AD5 | U611 | 14 | LS373 |
| CP7_AD5 | U507 | 17 | 27C64 |
| CP7_AD5 | U308 | 34 | 80C31BH |
| CP7_AD6 | U611 | 17 | LS373 |
| CP7_AD6 | U507 | 18 | 27C64 |
| CP7_AD6 | U308 | 33 | 80C31BH |
| CP7_AD7 | U611 | 18 | LS373 |
| CP7_AD7 | U507 | 19 | 27C64 |
| CP7_AD7 | U308 | 32 | 80C31BH |
| CP7_MOTION_CMP | U105 | 5 | 07 |
| CP7_MOTION_CMP | U308 | 8 | 80C31BH |
| CP7_PA0/PULSE | U308 | 1 | 80C31BH |
| CP7_PA1/DIR | U106 | 13 | 07 |
| CP7_PA1/DIR | U308 | 2 | 80C31BH |
| CP7_PA2 | U106 | 11 | 07 |
| CP7_PA2 | U308 | 3 | 80C31BH |
| CP7_PA3 | U308 | 4 | 80C31BH |
| CP7_PA3 | U106 | 5 | 07 |
| CP7_PB0 | U308 | 5 | 80C31BH |
| CP7_PB0 | U106 | 9 | 07 |
| CP7_PB1 | U105 | 3 | 07 |
| CP7_PB1 | U308 | 6 | 80C31BH |
| CPU0_LSWS~ | U621 | 11 | LS08 |
| CPU0_LSWS~ | U315 | 12 | 80C31BH |
| CPU0_PSEN~ | U514 | 22 | 27C64 |
| CPU0_PSEN~ | U315 | 29 | 80C31BH |
| CPU0_RXD | U315 | 10 | 80C31BH |
| CPU0_RXD | U403 | 15 | LS138 |
| CPU0_TXD | U315 | 11 | 80C31BH |
| CPU0_TXD | U305 | 4 | LS151 |
| CPU1_LSWS~ | U314 | 12 | 80C31BH |
| CPU1_LSWS~ | U515 | 6 | LS08 |
| CPU1_PSEN~ | U513 | 22 | 27C64 |
| CPU1_PSEN~ | U314 | 29 | 80C31BH |
| CPU1_RXD | U314 | 10 | 80C31BH |
| CPU1_RXD | U403 | 14 | LS138 |
| CPU1_TXD | U314 | 11 | 80C31BH |
| CPU1_TXD | U305 | 3 | LS151 |
| CPU2_LSWS~ | U313 | 12 | 80C31BH |
| CPU2_LSWS~ | U515 | 3 | LS08 |
| CPU2_PSEN~ | U512 | 22 | 27C64 |
| CPU2_PSEN~ | U313 | 29 | 80C31BH |
| CPU2_RXD | U313 | 10 | 80C31BH |
| CPU2_RXD | U403 | 13 | LS138 |
| CPU2_TXD | U313 | 11 | 80C31BH |
| CPU2_TXD | U305 | 2 | LS151 |
| CPU3_LSWS~ | U515 | 11 | LS08 |
| CPU3_LSWS~ | U312 | 12 | 80C31BH |
| CPU3_PSEN~ | U511 | 22 | 27C64 |
| CPU3_PSEN~ | U312 | 29 | 80C31BH |

| | | | |
|---|---|---|---|
| CPU3_RXD | U312 | 10 | 80C31BH |
| CPU3_RXD | U403 | 12 | LS138 |
| CPU3_TXD | U305 | 1 | LS151 |
| CPU3_TXD | U312 | 11 | 80C31BH |
| CPU4_LSWS~ | U311 | 12 | 80C31BH |
| CPU4_LSWS~ | U515 | 8 | LS08 |
| CPU4_PSEN~ | U510 | 22 | 27C64 |
| CPU4_PSEN~ | U311 | 29 | 80C31BH |
| CPU4_RXD | U311 | 10 | 80C31BH |
| CPU4_RXD | U403 | 11 | LS138 |
| CPU4_TXD | U311 | 11 | 80C31BH |
| CPU4_TXD | U305 | 15 | LS151 |
| CPU5_LSWS~ | U310 | 12 | 80C31BH |
| CPU5_LSWS~ | U621 | 6 | LS08 |
| CPU5_PSEN~ | U509 | 22 | 27C64 |
| CPU5_PSEN~ | U310 | 29 | 80C31BH |
| CPU5_RXD | U403 | 10 | LS138 |
| CPU5_TXD | U310 | 11 | 80C31BH |
| CPU5_TXD | U305 | 14 | LS151 |
| CPU6_LSWS~ | U309 | 12 | 80C31BH |
| CPU6_LSWS~ | U621 | 3 | LS08 |
| CPU6_PSEN~ | U508 | 22 | 27C64 |
| CPU6_PSEN~ | U309 | 29 | 80C31BH |
| CPU6_RXD | U309 | 10 | 80C31BH |
| CPU6_RXD | U403 | 9 | LS138 |
| CPU6_TXD | U309 | 11 | 80C31BH |
| CPU6_TXD | U305 | 13 | LS151 |
| CPU7_LSWS~ | U308 | 12 | 80C31BH |
| CPU7_LSWS~ | U621 | 8 | LS08 |
| CPU7_PSEN~ | U507 | 22 | 27C64 |
| CPU7_PSEN~ | U308 | 29 | 80C31BH |
| CPU7_RXD | U308 | 10 | 80C31BH |
| CPU7_RXD | U403 | 7 | LS138 |
| CPU7_TXD | U308 | 11 | 80C31BH |
| CPU7_TXD | U305 | 12 | LS151 |
| CPUS_CLOCK | U506 | 2 | LS04 |
| CPUS_CLOCK~ | U204 | 1 | LS00 |
| CPUS_CLOCK~ | U616 | 11 | S240 |
| CPUS_CLOCK~ | U616 | 13 | S240 |
| CPUS_CLOCK~ | U614 | 14 | S240 |
| CPUS_CLOCK~ | U616 | 15 | S240 |
| CPUS_CLOCK~ | U616 | 17 | S240 |
| CPUS_CLOCK~ | U204 | 2 | LS00 |
| CPUS_CLOCK~ | U614 | 4 | S240 |
| CPUS_CLOCK~ | U616 | 6 | S240 |
| CPUS_CLOCK~ | U616 | 8 | S240 |
| CPUS_INIT | U317 | 12 | 06 |
| CPUS_INIT | U505 | 4 | 316A102 |
| CPUS_INIT | U505 | 5 | 316A102 |
| CPUS_INIT | U505 | 6 | 316A102 |
| CPUS_INIT | U303 | 9 | 80C31BH |
| CTS_A | U104 | 4 | 1489 |
| CTS_A | | J5 5 | CONNECTOR |
| CTS_B | U101 | 4 | 1489 |
| CTS_B | | J6 5 | CONNECTOR |
| DATA~0 | U708 | 2 | LS640 |
| DATA~0 | | P1 89 | CONNECTOR |
| DATA~1 | U708 | 3 | LS640 |
| DATA~1 | | P1 90 | CONNECTOR |

| | | | |
|---|---|---|---|
| DATA~2 | U708 | 4 | LS640 |
| DATA~2 | | P1 87 | CONNECTOR |
| DATA~3 | U708 | 5 | LS640 |
| DATA~3 | | P1 88 | CONNECTOR |
| DATA~4 | U708 | 6 | LS640 |
| DATA~4 | | P1 85 | CONNECTOR |
| DATA~5 | U708 | 7 | LS640 |
| DATA~5 | | P1 86 | CONNECTOR |
| DATA~6 | U708 | 8 | LS640 |
| DATA~6 | | P1 83 | CONNECTOR |
| DATA~7 | U708 | 9 | LS640 |
| DATA~7 | | P1 84 | CONNECTOR |
| DATA~8 | U707 | 2 | LS640 |
| DATA~8 | | P1 79 | CONNECTOR |
| DATA~9 | U707 | 3 | LS640 |
| DATA~9 | | P1 80 | CONNECTOR |
| DATA~A | U707 | 4 | LS640 |
| DATA~A | | P1 77 | CONNECTOR |
| DATA~B | U707 | 5 | LS640 |
| DATA~B | | P1 78 | CONNECTOR |
| DATA~C | U707 | 6 | LS640 |
| DATA~C | | P1 75 | CONNECTOR |
| DATA~D | U707 | 7 | LS640 |
| DATA~D | | P1 76 | CONNECTOR |
| DATA~E | U707 | 8 | LS640 |
| DATA~E | | P1 73 | CONNECTOR |
| DATA~F | U707 | 9 | LS640 |
| DATA~F | | P1 74 | CONNECTOR |
| DOORS_OPEN | U716 | 13 | LS240 |
| DOORS_OPEN | U303 | 6 | 80C31BH |
| DOOR_DR_OPEN | U108 | 4 | 316B 47 |
| DOOR_DR_OPEN | | J4 36 | CONNECTOR |
| DOOR_OPEN | C126 | 1 | CAP 1UF |
| DOOR_OPEN | U108 | 13 | 316B 47 |
| DOOR_OPEN | U407 | 15 | 316A102 1K |
| DOOR_OPEN | U620 | 8 | LS240 |
| DTR_A | C110 | 2 | CAP 390PF |
| DTR_A | U103 | 8 | 1488 |
| DTR_A | | J5 20 | CONNECTOR |
| DTR_B | C109 | 2 | CAP 390PF |
| DTR_B | U102 | 6 | 1488 |
| DTR_B | | J6 20 | CONNECTOR |
| EXT_RESET~ | U105 | 11 | 07 |
| EXT_RESET~ | U505 | 7 | 316A102 |
| EXT_RESET~ | | J4 37 | CONNECTOR |
| GND | C113 | 1 | CAP 390PF |
| GND | U717 | 11 | LS74 |
| GND | U702 | 19 | S240 |
| GND | C209 | 2 | CAP 1UF |
| GND | U302 | 29 | 8274 |
| GND | W101 | 3 | JUMP |
| GND | U303 | 31 | 80C31BH |
| GND | U316 | 8 | 316A102 1K |
| GND | | J3 19 | CONNECTOR |
| GND | | J3 20 | CONNECTOR |
| GND | | J5 1 | CONNECTOR |
| GND | | J5 7 | CONNECTOR |
| GND | | J6 1 | CONNECTOR |
| GND | | J6 7 | CONNECTOR |

| | | | |
|---|---|---|---|
| GND | | P1 12 | CONNECTOR |
| GND | | P1 22 | CONNECTOR |
| GND | | P1 32 | CONNECTOR |
| GND | | P1 42 | CONNECTOR |
| GND | | P1 52 | CONNECTOR |
| GND | | P1 62 | CONNECTOR |
| GND | | P1 72 | CONNECTOR |
| GND | | P1 82 | CONNECTOR |
| GND | | P1 92 | CONNECTOR |
| GND | | P2 12 | CONNECTOR |
| GND | | P2 2 | CONNECTOR |
| GND | | P2 22 | CONNECTOR |
| GND | | P2 32 | CONNECTOR |
| GND | | P2 42 | CONNECTOR |
| GND | | P2 52 | CONNECTOR |
| GND | | P2 62 | CONNECTOR |
| GND | | P2 72 | CONNECTOR |
| GND | | P2 82 | CONNECTOR |
| GND | | P2 92 | CONNECTOR |
| HIGH1 | U701 | 1 | LS164 |
| HIGH1 | U505 | 15 | 316A102 |
| HIGH1 | U701 | 2 | LS164 |
| HIGH1 | U604 | 6 | LS138 |
| HIGH2 | U503 | 1 | 27C64 |
| HIGH2 | U609 | 11 | LS373 |
| HIGH2 | U505 | 14 | 316A102 |
| HIGH2 | U504 | 26 | MP6264 |
| HIGH2 | U503 | 27 | 27C64 |
| HIGH2 | U205 | 3 | LS273 |
| HIGH2 | U605 | 6 | LS138 |
| HIGH3 | U514 | 1 | 27C64 |
| HIGH3 | U505 | 13 | 316A102 |
| HIGH3 | U514 | 27 | 27C64 |
| HIGH4 | U510 | 1 | 27C64 |
| HIGH4 | U505 | 12 | 316A102 |
| HIGH4 | U510 | 27 | 27C64 |
| HIGH5 | U507 | 1 | 27C64 |
| HIGH5 | U404 | 10 | LS74 |
| HIGH5 | U505 | 11 | 316A102 |
| HIGH5 | U507 | 27 | 27C64 |
| HIGH5 | U405 | 5 | LS20 |
| HIGH6 | U602 | 1 | LS161 |
| HIGH6 | U602 | 10 | LS161 |
| HIGH6 | U602 | 5 | LS161 |
| HIGH6 | U602 | 7 | LS161 |
| HIGH7 | U702 | 11 | S240 |
| HIGH7 | U702 | 15 | S240 |
| HIGH7 | U702 | 17 | S240 |
| HIGH7 | U505 | 9 | 316A102 |
| HOLD/SAMPLE~ | U622 | 15 | LS240 |
| HOLD/SAMPLE~ | U201 | 2 | LS273 |
| HOST_CHANGE | U306 | 8 | LS240 |
| HOST_CHANGE | U501 | 9 | LS273 |
| HOST_CHANGE~ | U306 | 12 | LS240 |
| HOST_CHANGE~ | | P2 80 | CONNECTOR |
| HOST_PULSE | U601 | 3 | LS08 |
| HOST_PULSE | U603 | 6 | LS138 |
| IBFULL | U716 | 15 | LS240 |
| IBFULL | U717 | 5 | LS74 |

| | | | |
|---|---|---|---|
| INDEXER_INT | U610 | 1 | 06 |
| INDEXER_INT | U718 | 5 | LS74 |
| INDEXER_INT | U716 | 8 | LS240 |
| INIT~ | U702 | 8 | S240 |
| INIT~ | | P1 16 | CONNECTOR |
| INPUT_READY~ | U306 | 11 | LS240 |
| INPUT_READY~ | | P2 19 | CONNECTOR |
| INTERRUPT | U610 | 2 | 06 |
| INTERRUPT | | P2 29 | CONNECTOR |
| INT_PROG_STA | U303 | 4 | 80C31BH |
| INT_PROG_STA | U718 | 6 | LS74 |
| IN_SPARE_0 | U316 | 1 | 316A102_1K |
| IN_SPARE_0 | U406 | 2 | LS240 |
| IN_SPARE_1 | U316 | 2 | 316A102 1K |
| IN_SPARE_1 | U406 | 4 | LS240 |
| IN_SPARE_2 | U316 | 11 | 316A102 1K |
| IN_SPARE_2 | U622 | 4 | LS240 |
| IN_SPARE_3 | U316 | 12 | 316A102 1K |
| IN_SPARE_3 | U622 | 6 | LS240 |
| IN_SPARE_4 | U316 | 13 | 316A102 1K |
| IN_SPARE_4 | U622 | 8 | LS240 |
| LED_CONTROL | U702 | 13 | S240 |
| LED_CONTROL | U303 | 7 | 80C31BH |
| LIGHT_F_0~ | U721 | 2 | LS374 |
| LIGHT_F_0~ | | P2 33 | CONNECTOR |
| LIGHT_F_10~ | U720 | 6 | LS374 |
| LIGHT_F_10~ | | P2 44 | CONNECTOR |
| LIGHT_F_11~ | U720 | 9 | LS374 |
| LIGHT_F_11~ | | P2 45 | CONNECTOR |
| LIGHT_F_12~ | U720 | 12 | LS374 |
| LIGHT_F_12~ | | P2 46 | CONNECTOR |
| LIGHT_F_13~ | U720 | 15 | LS374 |
| LIGHT_F_13~ | | P2 47 | CONNECTOR |
| LIGHT_F_14~ | U720 | 16 | LS374 |
| LIGHT_F_14~ | | P2 48 | CONNECTOR |
| LIGHT_F_15~ | U720 | 19 | LS374 |
| LIGHT_F_15~ | | P2 49 | CONNECTOR |
| LIGHT_F_1~ | U721 | 5 | LS374 |
| LIGHT_F_1~ | | P2 34 | CONNECTOR |
| LIGHT_F_2~ | U721 | 6 | LS374 |
| LIGHT_F_2~ | | P2 35 | CONNECTOR |
| LIGHT_F_3~ | U721 | 9 | LS374 |
| LIGHT_F_3~ | | P2 36 | CONNECTOR |
| LIGHT_F_4~ | U721 | 12 | LS374 |
| LIGHT_F_4~ | | P2 37 | CONNECTOR |
| LIGHT_F_5~ | U721 | 15 | LS374 |
| LIGHT_F_5~ | | P2 38 | CONNECTOR |
| LIGHT_F_6~ | U721 | 16 | LS374 |
| LIGHT_F_6~ | | P2 39 | CONNECTOR |
| LIGHT_F_7~ | U721 | 19 | LS374 |
| LIGHT_F_7~ | | P2 40 | CONNECTOR |
| LIGHT_F_8~ | U720 | 2 | LS374 |
| LIGHT_F_8~ | | P2 41 | CONNECTOR |
| LIGHT_F_9~ | U720 | 5 | LS374 |
| LIGHT_F_9~ | | P2 43 | CONNECTOR |
| LINE_REQUEST | U315 | 14 | 80C31BH |
| LINE_REQUEST | U306 | 16 | LS240 |
| LINE_REQUEST~ | U306 | 4 | LS240 |
| LINE_REQUEST~ | | P2 17 | CONNECTOR |

| | | | |
|---|---|---|---|
| LOW1 | U706 | 1 | LS240 |
| LOW1 | U307 | 17 | LS244 |
| LOW1 | U706 | 19 | LS240 |
| LOW1 | U702 | 3 | S240 |
| LOW1 | U603 | 4 | LS138 |
| LOW1 | U606 | 5 | LS138 |
| LOW1 | U305 | 7 | LS151 |
| LOW2 | U619 | 1 | LS373 |
| LOW2 | U616 | 19 | S240 |
| LOW2 | U514 | 20 | 27C64 |
| LOW2 | U702 | 5 | S240 |
| LOW3 | U306 | 1 | LS240 |
| LOW3 | U408 | 19 | LS240 |
| LOW3 | U507 | 20 | 27C64 |
| LOW3 | U602 | 3 | LS161 |
| LOW3 | U602 | 4 | LS161 |
| LOW3 | U602 | 6 | LS161 |
| LOW3 | U702 | 9 | S240 |
| MASTER_WR~ | U303 | 16 | 80C31BH |
| MASTER_WR~ | U204 | 4 | LS00 |
| MASTER_WR~ | U204 | 5 | LS00 |
| MBAB12 | U703 | 1 | PAL14L4 |
| MBAB12 | U705 | 9 | LS240 |
| MBAB13 | U703 | 2 | PAL14L4 |
| MBAB13 | U705 | 7 | LS240 |
| MBAB14 | U703 | 3 | PAL14L4 |
| MBAB14 | U705 | 5 | LS240 |
| MBAB15 | U705 | 3 | LS240 |
| MBAB15 | U703 | 4 | PAL14L4 |
| MBAB16 | U704 | 18 | LS240 |
| MBAB16 | U703 | 5 | PAL14L4 |
| MBAB17 | U704 | 16 | LS240 |
| MBAB17 | U703 | 6 | PAL14L4 |
| MBAB18 | U704 | 14 | LS240 |
| MBAB18 | U703 | 7 | PAL14L4 |
| MBAB19 | U704 | 12 | LS240 |
| MBAB19 | U703 | 8 | PAL14L4 |
| MBAB20 | U703 | 9 | PAL14L4 |
| MBAB2 | U603 | 1 | LS138 |
| MBAB21 | U703 | 11 | PAL14L4 |
| MBAB2 | U706 | 14 | LS240 |
| MBAB21 | U704 | 7 | LS240 |
| MBAB22 | U703 | 12 | PAL14L4 |
| MBAB22 | U704 | 5 | LS240 |
| MBAB23 | U703 | 13 | PAL14L4 |
| MBAB23 | U704 | 3 | LS240 |
| MBAB3 | U706 | 12 | LS240 |
| MBAB3 | U603 | 2 | LS138 |
| MBAB4 | U603 | 3 | LS138 |
| MBAB4 | U706 | 9 | LS240 |
| MB_COM_INIT~ | U603 | 13 | LS138 |
| MB_COM_INIT~ | U404 | 3 | LS74 |
| MB_DB0 | U708 | 18 | LS640 |
| MB_DB0 | U709 | 2 | LS374 |
| MB_DB0 | U711 | 3 | LS374 |
| MB_DB1 | U708 | 17 | LS640 |
| MB_DB1 | U711 | 4 | LS374 |
| MB_DB1 | U709 | 5 | LS374 |
| MB_DB2 | U708 | 16 | LS640 |

| | | | |
|---|---|---|---|
| MB_DB2 | U709 | 6 | LS374 |
| MB_DB2 | U711 | 7 | LS374 |
| MB_DB3 | U708 | 15 | LS640 |
| MB_DB3 | U711 | 8 | LS374 |
| MB_DB3 | U709 | 9 | LS374 |
| MB_DB4 | U709 | 12 | LS374 |
| MB_DB4 | U711 | 13 | LS374 |
| MB_DB4 | U708 | 14 | LS640 |
| MB_DB5 | U708 | 13 | LS640 |
| MB_DB5 | U711 | 14 | LS374 |
| MB_DB5 | U709 | 15 | LS374 |
| MB_DB6 | U708 | 12 | LS640 |
| MB_DB6 | U709 | 16 | LS374 |
| MB_DB6 | U711 | 17 | LS374 |
| MB_DB7 | U708 | 11 | LS640 |
| MB_DB7 | U711 | 18 | LS374 |
| MB_DB7 | U709 | 19 | LS374 |
| MB_DB8 | U707 | 18 | LS640 |
| MB_DB8 | U710 | 2 | LS374 |
| MB_DB8 | U712 | 3 | LS374 |
| MB_DB9 | U707 | 17 | LS640 |
| MB_DB9 | U712 | 4 | LS374 |
| MB_DB9 | U710 | 5 | LS374 |
| MB_DBA | U707 | 16 | LS640 |
| MB_DBA | U710 | 6 | LS374 |
| MB_DBA | U712 | 7 | LS374 |
| MB_DBB | U716 | 12 | LS240 |
| MB_DBB | U707 | 15 | LS640 |
| MB_DBB | U712 | 8 | LS374 |
| MB_DBB | U710 | 9 | LS374 |
| MB_DBC | U710 | 12 | LS374 |
| MB_DBC | U712 | 13 | LS374 |
| MB_DBC | U707 | 14 | LS640 |
| MB_DBC | U716 | 9 | LS240 |
| MB_DBD | U707 | 13 | LS640 |
| MB_DBD | U712 | 14 | LS374 |
| MB_DBD | U710 | 15 | LS374 |
| MB_DBD | U716 | 7 | LS240 |
| MB_DBE | U707 | 12 | LS640 |
| MB_DBE | U710 | 16 | LS374 |
| MB_DBE | U712 | 17 | LS374 |
| MB_DBE | U716 | 5 | LS240 |
| MB_DBF | U707 | 11 | LS640 |
| MB_DBF | U712 | 18 | LS374 |
| MB_DBF | U710 | 19 | LS374 |
| MB_DBF | U716 | 3 | LS240 |
| MB_HARD_INIT | U702 | 12 | S240 |
| MB_HARD_INIT | U506 | 5 | LS04 |
| MB_INT2~ | W102 | 3 | JUMP |
| MB_INT2~ | | P1 47 | CONNECTOR |
| MB_INT6~ | W102 | 1 | JUMP |
| MB_INT6~ | | P1 43 | CONNECTOR |
| MB_INT_PROG~ | U603 | 14 | LS138 |
| MB_INT_PROG~ | U718 | 3 | LS74 |
| MB_RDEN~ | U708 | 1 | LS640 |
| MB_RDEN~ | U703 | 16 | PAL14L4 |
| MB_RDEN~ | U604 | 5 | LS138 |
| MB_READ_DATA~ | U709 | 1 | LS374 |
| MB_READ_DATA~ | U604 | 15 | LS138 |

| | | | |
|---|---|---|---|
| MB_READ_DATA~ | U601 | 9 | LS08 |
| MB_READ_STATUS | U716 | 1 | LS240 |
| MB_READ_STATUS | U604 | 14 | LS138 |
| MB_READ_STATUS | U716 | 19 | LS240 |
| MB_WREN~ | U703 | 17 | PAL14L4 |
| MB_WREN~ | U603 | 5 | LS138 |
| MB_WRITE_DATA~ | U711 | 11 | LS374 |
| MB_WRITE_DATA~ | U603 | 15 | LS138 |
| MB_WRITE_DATA~ | U717 | 3 | LS74 |
| MRDC | U702 | 18 | S240 |
| MRDC~ | U702 | 2 | S240 |
| MRDC~ | | P1 23 | CONNECTOR |
| MS_A0 | U605 | 1 | LS138 |
| MS_A0 | U503 | 10 | 27C64 |
| MS_A0 | U402 | 19 | LS373 |
| MS_A0 | U302 | 25 | 8274 |
| MS_A10 | U609 | 15 | LS373 |
| MS_A10 | U503 | 21 | 27C64 |
| MS_A11 | U609 | 12 | LS373 |
| MS_A11 | U503 | 23 | 27C64 |
| MS_A1 | U402 | 16 | LS373 |
| MS_A1 | U605 | 2 | LS138 |
| MS_A1 | U502 | 20 | 8254 |
| MS_A12 | U503 | 2 | 27C64 |
| MS_A1 | U302 | 24 | 8274 |
| MS_A12 | U609 | 9 | LS373 |
| MS_A13 | U606 | 1 | LS138 |
| MS_A13 | U609 | 6 | LS373 |
| MS_A14 | U606 | 2 | LS138 |
| MS_A14 | U609 | 5 | LS373 |
| MS_A15 | U609 | 2 | LS373 |
| MS_A15 | U606 | 3 | LS138 |
| MS_A1 | U503 | 9 | 27C64 |
| MS_A2 | U402 | 15 | LS373 |
| MS_A2 | U605 | 3 | LS138 |
| MS_A2 | U503 | 8 | 27C64 |
| MS_A3 | U402 | 12 | LS373 |
| MS_A3 | U503 | 7 | 27C64 |
| MS_A4 | U503 | 6 | 27C64 |
| MS_A4 | U402 | 9 | LS373 |
| MS_A5 | U503 | 5 | 27C64 |
| MS_A5 | U402 | 6 | LS373 |
| MS_A6 | U503 | 4 | 27C64 |
| MS_A6 | U402 | 5 | LS373 |
| MS_A7 | U402 | 2 | LS373 |
| MS_A7 | U503 | 3 | 27C64 |
| MS_A8 | U609 | 19 | LS373 |
| MS_A8 | U503 | 25 | 27C64 |
| MS_A9 | U609 | 16 | LS373 |
| MS_A9 | U503 | 24 | 27C64 |
| MS_AD0 | U402 | 18 | LS373 |
| MS_AD0 | U203 | 2 | LS245 |
| MS_AD0 | U303 | 39 | 80C31BH |
| MS_AD10 | U609 | 14 | LS373 |
| MS_AD10 | U303 | 23 | 80C31BH |
| MS_AD11 | U609 | 13 | LS373 |
| MS_AD11 | U303 | 24 | 80C31BH |
| MS_AD1 | U402 | 17 | LS373 |
| MS_AD12 | U303 | 25 | 80C31BH |

| | | | |
|---|---|---|---|
| MS_AD12 | U609 | 8 | LS373 |
| MS_AD1 | U203 | 3 | LS245 |
| MS_AD13 | U303 | 26 | 80C31BH |
| MS_AD13 | U609 | 7 | LS373 |
| MS_AD1 | U303 | 38 | 80C31BH |
| MS_AD14 | U303 | 27 | 80C31BH |
| MS_AD14 | U609 | 4 | LS373 |
| MS_AD15 | U303 | 28 | 80C31BH |
| MS_AD15 | U609 | 3 | LS373 |
| MS_AD2 | U402 | 14 | LS373 |
| MS_AD2 | U303 | 37 | 80C31BH |
| MS_AD2 | U203 | 4 | LS245 |
| MS_AD3 | U402 | 13 | LS373 |
| MS_AD3 | U303 | 36 | 80C31BH |
| MS_AD3 | U203 | 5 | LS245 |
| MS_AD4 | U303 | 35 | 80C31BH |
| MS_AD4 | U203 | 6 | LS245 |
| MS_AD4 | U402 | 8 | LS373 |
| MS_AD5 | U303 | 34 | 80C31BH |
| MS_AD5 | U402 | 7 | LS373 |
| MS_AD6 | U303 | 33 | 80C31BH |
| MS_AD6 | U402 | 4 | LS373 |
| MS_AD6 | U203 | 8 | LS245 |
| MS_AD7 | U402 | 3 | LS373 |
| MS_AD7 | U303 | 32 | 80C31BH |
| MS_AD7 | U203 | 9 | LS245 |
| MS_AD8 | U609 | 18 | LS373 |
| MS_AD8 | U303 | 21 | 80C31BH |
| MS_AD9 | U609 | 17 | LS373 |
| MS_AD9 | U303 | 22 | 80C31BH |
| MS_ALE | U402 | 11 | LS373 |
| MS_ALE | U303 | 30 | 80C31BH |
| MS_CNT_0_GATE | U502 | 11 | 8254 |
| MS_CNT_0_GATE | U501 | 2 | LS273 |
| MS_CNT_1_GATE | U502 | 14 | 8254 |
| MS_CNT_1_GATE | U501 | 5 | LS273 |
| MS_CNT_2_GATE | U502 | 16 | 8254 |
| MS_CNT_2_GATE | U501 | 6 | LS273 |
| MS_DB0 | U503 | 11 | 27C64 |
| MS_DB0 | U203 | 18 | LS245 |
| MS_DB0 | U302 | 19 | 8274 |
| MS_DB0 | U711 | 2 | LS374 |
| MS_DB0 | U709 | 3 | LS374 |
| MS_DB0 | U502 | 8 | 8254 |
| MS_DB1 | U503 | 12 | 27C64 |
| MS_DB1 | U620 | 16 | LS240 |
| MS_DB1 | U203 | 17 | LS245 |
| MS_DB1 | U302 | 18 | 8274 |
| MS_DB1 | U709 | 4 | LS374 |
| MS_DB1 | U711 | 5 | LS374 |
| MS_DB1 | U502 | 7 | 8254 |
| MS_DB2 | U503 | 13 | 27C64 |
| MS_DB2 | U620 | 14 | LS240 |
| MS_DB2 | U203 | 16 | LS245 |
| MS_DB2 | U302 | 17 | 8274 |
| MS_DB2 | U711 | 6 | LS374 |
| MS_DB2 | U709 | 7 | LS374 |
| MS_DB3 | U620 | 12 | LS240 |
| MS_DB3 | U503 | 15 | 27C64 |

| | | | |
|---|---|---|---|
| MS_DB3 | U302 | 16 | 8274 |
| MS_DB3 | U502 | 5 | 8254 |
| MS_DB3 | U709 | 8 | LS374 |
| MS_DB3 | U711 | 9 | LS374 |
| MS_DB4 | U711 | 12 | LS374 |
| MS_DB4 | U709 | 13 | LS374 |
| MS_DB4 | U203 | 14 | LS245 |
| MS_DB4 | U302 | 15 | 8274 |
| MS_DB4 | U503 | 16 | 27C64 |
| MS_DB4 | U502 | 4 | 8254 |
| MS_DB4 | U620 | 9 | LS240 |
| MS_DB5 | U203 | 13 | LS245 |
| MS_DB5 | U709 | 14 | LS374 |
| MS_DB5 | U711 | 15 | LS374 |
| MS_DB5 | U503 | 17 | 27C64 |
| MS_DB5 | U502 | 3 | 8254 |
| MS_DB5 | U620 | 7 | LS240 |
| MS_DB6 | U203 | 12 | LS245 |
| MS_DB6 | U302 | 13 | 8274 |
| MS_DB6 | U711 | 16 | LS374 |
| MS_DB6 | U709 | 17 | LS374 |
| MS_DB6 | U503 | 18 | 27C64 |
| MS_DB6 | U502 | 2 | 8254 |
| MS_DB6 | U620 | 5 | LS240 |
| MS_DB7 | U502 | 1 | 8254 |
| MS_DB7 | U203 | 11 | LS245 |
| MS_DB7 | U302 | 12 | 8274 |
| MS_DB7 | U709 | 18 | LS374 |
| MS_DB7 | U711 | 19 | LS374 |
| MS_DB7 | U620 | 3 | LS240 |
| MS_IBFCLR~ | U717 | 1 | LS74 |
| MS_IBFULL~ | U303 | 12 | 80C31BH |
| MS_IBFULL~ | U717 | 6 | LS74 |
| MS_INT_PROG~ | U718 | 4 | LS74 |
| MS_INT_PROG~ | U303 | 8 | 80C31BH |
| MS_MSEL0~ | U606 | 15 | LS138 |
| MS_MSEL0~ | U503 | 20 | 27C64 |
| MS_MSEL1~ | U606 | 14 | LS138 |
| MS_MSEL1~ | U504 | 20 | MP6264 |
| MS_MSEL2~ | U606 | 13 | LS138 |
| MS_MSEL2~ | U608 | 4 | LS138 |
| MS_MSEL3~ | U606 | 12 | LS138 |
| MS_MSEL3~ | U607 | 4 | LS138 |
| MS_MSEL4~ | U606 | 11 | LS138 |
| MS_MSEL4~ | U605 | 4 | LS138 |
| MS_MSEL6~ | U502 | 21 | 8254 |
| MS_MSEL6~ | U606 | 9 | LS138 |
| MS_MSEL7~ | U302 | 23 | 8274 |
| MS_MSEL7~ | U606 | 7 | LS138 |
| MS_OBFSET~ | U717 | 10 | LS74 |
| MS_OBFSET~ | U303 | 2 | 80C31BH |
| MS_OBFULL~ | U303 | 3 | 80C31BH |
| MS_OBFULL~ | U717 | 8 | LS74 |
| MS_PSEN~ | U601 | 12 | LS08 |
| MS_PSEN~ | U303 | 29 | 80C31BH |
| MS_RD~ | U203 | 1 | LS245 |
| MS_RD~ | U601 | 11 | LS08 |
| MS_RD~ | U503 | 22 | 27C64 |
| MS_RD~ | U601 | 4 | LS08 |

| | | | |
|---|---|---|---|
| MS_RD~ | U605 | 5 | LS138 |
| MS_RSEL0~ | U711 | 1 | LS374 |
| MS_RSEL0~ | U605 | 15 | LS138 |
| MS_RSEL1~ | U712 | 1 | LS374 |
| MS_RSEL1~ | U605 | 14 | LS138 |
| MS_RSEL2~ | U719 | 1 | LS244 |
| MS_RSEL2~ | U605 | 13 | LS138 |
| MS_RSEL2~ | U719 | 19 | LS244 |
| MS_RSEL3~ | U406 | 1 | LS240 |
| MS_RSEL3~ | U605 | 12 | LS138 |
| MS_RSEL3~ | U406 | 19 | LS240 |
| MS_RSEL4~ | U622 | 1 | LS240 |
| MS_RSEL4~ | U605 | 11 | LS138 |
| MS_RSEL7~ | U620 | 1 | LS240 |
| MS_RSEL7~ | U620 | 19 | LS240 |
| MS_RSEL7~ | U605 | 7 | LS138 |
| MS_RXD | U303 | 10 | 80C31BH |
| MS_RXD | U305 | 5 | LS151 |
| MS_TXD | TPCOM1 | 1 | TP |
| MS_TXD | U303 | 11 | 80C31BH |
| MS_TXD | U403 | 4 | LS138 |
| MS_WR~ | U302 | 21 | 8274 |
| MS_WR~ | U502 | 23 | 8254 |
| MS_WR~ | U504 | 27 | MP6264 |
| MS_WR~ | U601 | 5 | LS08 |
| MS_WR~ | U204 | 8 | LS00 |
| MS_WSEL0~ | U709 | 11 | LS374 |
| MS_WSEL0~ | U608 | 15 | LS138 |
| MS_WSEL10~ | U202 | 11 | LS273 |
| MS_WSEL10~ | U607 | 13 | LS138 |
| MS_WSEL11~ | U201 | 11 | LS273 |
| MS_WSEL11~ | U607 | 12 | LS138 |
| MS_WSEL1~ | U710 | 11 | LS374 |
| MS_WSEL1~ | U608 | 14 | LS138 |
| MS_WSEL2~ | U713 | 11 | LS374 |
| MS_WSEL2~ | U608 | 13 | LS138 |
| MS_WSEL3~ | U723 | 11 | LS374 |
| MS_WSEL3~ | U608 | 12 | LS138 |
| MS_WSEL4~ | U608 | 11 | LS138 |
| MS_WSEL5~ | U608 | 10 | LS138 |
| MS_WSEL5~ | U304 | 11 | LS273 |
| MS_WSEL7~ | U501 | 11 | LS273 |
| MS_WSEL7~ | U608 | 7 | LS138 |
| MWTC | U702 | 16 | S240 |
| MWTC | U703 | 19 | PAL14L4 |
| MWTC~ | U702 | 4 | S240 |
| MWTC~ | | P1 24 | CONNECTOR |
| OBFULL | U716 | 17 | LS240 |
| OBFULL | U717 | 9 | LS74 |
| OCF_CP0_MO_CMPU217 | | 2 | 07 |
| OCF_CP0_MO_CMPU212 | | 5 | 316A102 |
| OCF_CP0_MO_CMP | | J1 5 | CONNECTOR |
| OCF_CP0_PA0/PLU212 | | 1 | 316A102 |
| OCF_CP0_PA0/PLU218 | | 2 | 07 |
| OCF_CP0_PA0/PL | | J1 1 | CONNECTOR |
| OCF_CP0_PA1/DIU212 | | 2 | 316A102 |
| OCF_CP0_PA1/DIU218 | | 4 | 07 |
| OCF_CP0_PA1/DI | | J1 2 | CONNECTOR |

| | | | |
|---|---|---|---|
| OCF_CP0_PA2 | U212 | 3 | 316A102 |
| OCF_CP0_PA2 | U218 | 6 | 07 |
| OCF_CP0_PA2 | | J1 3 | CONNECTOR |
| OCF_CP0_PA3 | U212 | 4 | 316A102 |
| OCF_CP0_PA3 | U218 | 8 | 07 |
| OCF_CP0_PA3 | | J1 4 | CONNECTOR |
| OCF_CP0_PB0 | U213 | 1 | 316A102 |
| OCF_CP0_PB0 | U218 | 10 | 07 |
| OCF_CP0_PB0 | | J2 1 | CONNECTOR |
| OCF_CP0_PB1 | U218 | 12 | 07 |
| OCF_CP0_PB1 | U213 | 2 | 316A102 |
| OCF_CP0_PB1 | | J2 2 | CONNECTOR |
| OCS_CP0_MO_CMP | U212 | 10 | 316A102 |
| OCS_CP0_MO_CMP | U216 | 4 | 07 |
| OCS_CP0_MO_CMP | | J1 10 | CONNECTOR |
| OCS_CP0_PA0/PL | U217 | 4 | 07 |
| OCS_CP0_PA0/PL | U212 | 6 | 316A102 |
| OCS_CP0_PA0/PL | | J1 6 | CONNECTOR |
| OCS_CP0_PA1/DI | U217 | 6 | 07 |
| OCS_CP0_PA1/DI | U212 | 7 | 316A102 |
| OCS_CP0_PA1/DI | | J1 7 | CONNECTOR |
| OCS_CP0_PA2 | U217 | 8 | 07 |
| OCS_CP0_PA2 | | J1 8 | CONNECTOR |
| OCS_CP0_PA3 | U217 | 10 | 07 |
| OCS_CP0_PA3 | U212 | 9 | 316A102 |
| OCS_CP0_PA3 | | J1 9 | CONNECTOR |
| OCS_CP0_PB0 | U217 | 12 | 07 |
| OCS_CP0_PB0 | U213 | 3 | 316A102 |
| OCS_CP0_PB0 | | J2 3 | CONNECTOR |
| OCS_CP0_PB1 | U216 | 2 | 07 |
| OCS_CP0_PB1 | U213 | 4 | 316A102 |
| OCS_CP0_PB1 | | J2 4 | CONNECTOR |
| OC_BAK_TV_LAMP | U317 | 4 | 06 |
| OC_BAK_TV_LAMP | U623 | 6 | 316A102 |
| OC_BAK_TV_LAMP | | J4 33 | CONNECTOR |
| OC_CP1_MO_CMP~ | U212 | 15 | 316A102 |
| OC_CP1_MO_CMP~ | U215 | 6 | 07 |
| OC_CP1_MO_CMP~ | | J1 15 | CONNECTOR |
| OC_CP1_PA0/PLS | U212 | 11 | 316A102 |
| OC_CP1_PA0/PLS | U215 | 2 | 07 |
| OC_CP1_PA0/PLS | | J1 11 | CONNECTOR |
| OC_CP1_PA1/DIR | U216 | 12 | 07 |
| OC_CP1_PA1/DIR | | J1 12 | CONNECTOR |
| OC_CP1_PA2 | U216 | 10 | 07 |
| OC_CP1_PA2 | U212 | 13 | 316A102 |
| OC_CP1_PA2 | | J1 13 | CONNECTOR |
| OC_CP1_PA3 | U212 | 14 | 316A102 |
| OC_CP1_PA3 | U216 | 6 | 07 |
| OC_CP1_PA3 | | J1 14 | CONNECTOR |
| OC_CP1_PB0 | U213 | 5 | 316A102 |
| OC_CP1_PB0 | U216 | 8 | 07 |
| OC_CP1_PB0 | | J2 5 | CONNECTOR |
| OC_CP1_PB1 | U215 | 4 | 07 |
| OC_CP1_PB1 | U213 | 6 | 316A102 |
| OC_CP1_PB1 | | J2 6 | CONNECTOR |
| OC_CP2_MO_CMP~ | U211 | 5 | 316A102 |
| OC_CP2_MO_CMP~ | U214 | 8 | 07 |
| OC_CP2_MO_CMP~ | | J1 20 | CONNECTOR |
| OC_CP2_PA0/PLS | U211 | 1 | 316A102 |

| | | |
|---|---|---|
| OC_CP2_PA0/PLSU214 | 4 | 07 |
| OC_CP2_PA0/PLS | J1 16 | CONNECTOR |
| OC_CP2_PA1/DIRU214 | 2 | 07 |
| OC_CP2_PA1/DIR | J1 17 | CONNECTOR |
| OC_CP2_PA2 U215 | 12 | 07 |
| OC_CP2_PA2 U211 | 3 | 316A102 |
| OC_CP2_PA2 | J1 18 | CONNECTOR |
| OC_CP2_PA3 U211 | 4 | 316A102 |
| OC_CP2_PA3 U215 | 8 | 07 |
| OC_CP2_PA3 | J1 19 | CONNECTOR |
| OC_CP2_PB0 U215 | 10 | 07 |
| OC_CP2_PB0 U213 | 7 | 316A102 |
| OC_CP2_PB0 | J2 7 | CONNECTOR |
| OC_CP2_PB1 U214 | 6 | 07 |
| OC_CP2_PB1 U213 | 8 | 316A102 |
| OC_CP2_PB1 | J2 8 | CONNECTOR |
| OC_CP3_MO_CMP~U208 | 10 | 07 |
| OC_CP3_MO_CMP~ | J1 25 | CONNECTOR |
| OC_CP3_PA0/PLSU208 | 6 | 07 |
| OC_CP3_PA0/PLS | J1 21 | CONNECTOR |
| OC_CP3_PA1/DIRU208 | 4 | 07 |
| OC_CP3_PA1/DIRU211 | 7 | 316A102 |
| OC_CP3_PA1/DIR | J1 22 | CONNECTOR |
| OC_CP3_PA2 U208 | 2 | 07 |
| OC_CP3_PA2 U211 | 8 | 316A102 |
| OC_CP3_PA2 | J1 23 | CONNECTOR |
| OC_CP3_PA3 U214 | 10 | 07 |
| OC_CP3_PA3 U211 | 9 | 316A102 |
| OC_CP3_PA3 | J1 24 | CONNECTOR |
| OC_CP3_PB0 U214 | 12 | 07 |
| OC_CP3_PB0 U213 | 9 | 316A102 |
| OC_CP3_PB0 | J2 9 | CONNECTOR |
| OC_CP3_PB1 U213 | 10 | 316A102 |
| OC_CP3_PB1 U208 | 8 | 07 |
| OC_CP3_PB1 | J2 10 | CONNECTOR |
| OC_CP4_MO_CMP~U207 | 12 | 07 |
| OC_CP4_MO_CMP~U211 | 15 | 316A102 |
| OC_CP4_MO_CMP~ | J1 30 | CONNECTOR |
| OC_CP4_PA0/PLSU211 | 11 | 316A102 |
| OC_CP4_PA0/PLSU207 | 8 | 07 |
| OC_CP4_PA0/PLS | J1 26 | CONNECTOR |
| OC_CP4_PA1/DIRU211 | 12 | 316A102 |
| OC_CP4_PA1/DIRU207 | 6 | 07 |
| OC_CP4_PA1/DIR | J1 27 | CONNECTOR |
| OC_CP4_PA2 U211 | 13 | 316A102 |
| OC_CP4_PA2 U207 | 2 | 07 |
| OC_CP4_PA2 | J1 28 | CONNECTOR |
| OC_CP4_PA3 U208 | 12 | 07 |
| OC_CP4_PA3 U211 | 14 | 316A102 |
| OC_CP4_PA3 | J1 29 | CONNECTOR |
| OC_CP4_PB0 U213 | 11 | 316A102 |
| OC_CP4_PB0 U207 | 4 | 07 |
| OC_CP4_PB0 | J2 11 | CONNECTOR |
| OC_CP4_PB1 U207 | 10 | 07 |
| OC_CP4_PB1 U213 | 12 | 316A102 |
| OC_CP4_PB1 | J2 12 | CONNECTOR |
| OC_CP5_MO_CMP~U209 | 5 | 316A102 |
| OC_CP5_MO_CMP~U206 | 8 | 07 |
| OC_CP5_MO_CMP~ | J1 35 | CONNECTOR |

| | | |
|---|---|---|
| OC_CP5_PA0/PLSU209 | 1 | 316A102 |
| OC_CP5_PA0/PLSU210 | 2 | 07 |
| OC_CP5_PA0/PLS | J1 31 | CONNECTOR |
| OC_CP5_PA1/DIRU206 | 12 | 07 |
| OC_CP5_PA1/DIRU209 | 2 | 316A102 |
| OC_CP5_PA1/DIR | J1 32 | CONNECTOR |
| OC_CP5_PA2 U206 | 10 | 07 |
| OC_CP5_PA2 U209 | 3 | 316A102 |
| OC_CP5_PA2 | J1 33 | CONNECTOR |
| OC_CP5_PA3 U206 | 2 | 07 |
| OC_CP5_PA3 U209 | 4 | 316A102 |
| OC_CP5_PA3 | J1 34 | CONNECTOR |
| OC_CP5_PB0 U213 | 13 | 316A102 |
| OC_CP5_PB0 U206 | 4 | 07 |
| OC_CP5_PB0 | J2 13 | CONNECTOR |
| OC_CP5_PB1 U213 | 14 | 316A102 |
| OC_CP5_PB1 U206 | 6 | 07 |
| OC_CP5_PB1 | J2 14 | CONNECTOR |
| OC_CP6_MO_CMP~U210 | 10 | 07 |
| OC_CP6_MO_CMP~ | J1 40 | CONNECTOR |
| OC_CP6_PA0/PLSU106 | 4 | 07 |
| OC_CP6_PA0/PLSU209 | 6 | 316A102 |
| OC_CP6_PA0/PLS | J1 36 | CONNECTOR |
| OC_CP6_PA1/DIRU106 | 2 | 07 |
| OC_CP6_PA1/DIRU209 | 7 | 316A102 |
| OC_CP6_PA1/DIR | J1 37 | CONNECTOR |
| OC_CP6_PA2 U210 | 12 | 07 |
| OC_CP6_PA2 U209 | 8 | 316A102 |
| OC_CP6_PA2 | J1 38 | CONNECTOR |
| OC_CP6_PA3 U210 | 4 | 07 |
| OC_CP6_PA3 U209 | 9 | 316A102 |
| OC_CP6_PA3 | J1 39 | CONNECTOR |
| OC_CP6_PB0 U213 | 15 | 316A102 |
| OC_CP6_PB0 U210 | 6 | 07 |
| OC_CP6_PB0 | J2 15 | CONNECTOR |
| OC_CP6_PB1 U623 | 1 | 316A102 |
| OC_CP6_PB1 U210 | 8 | 07 |
| OC_CP6_PB1 | J2 16 | CONNECTOR |
| OC_CP7_MO_CMP~U209 | 15 | 316A102 |
| OC_CP7_MO_CMP~U105 | 6 | 07 |
| OC_CP7_MO_CMP~ | J1 45 | CONNECTOR |
| OC_CP7_PA0/PLSU209 | 11 | 316A102 |
| OC_CP7_PA0/PLSU105 | 2 | 07 |
| OC_CP7_PA0/PLS | J1 41 | CONNECTOR |
| OC_CP7_PA1/DIRU106 | 12 | 07 |
| OC_CP7_PA1/DIR | J1 42 | CONNECTOR |
| OC_CP7_PA2 U106 | 10 | 07 |
| OC_CP7_PA2 U209 | 13 | 316A102 |
| OC_CP7_PA2 | J1 43 | CONNECTOR |
| OC_CP7_PA3 U209 | 14 | 316A102 |
| OC_CP7_PA3 U106 | 6 | 07 |
| OC_CP7_PA3 | J1 44 | CONNECTOR |
| OC_CP7_PB0 U623 | 2 | 316A102 |
| OC_CP7_PB0 U106 | 8 | 07 |
| OC_CP7_PB0 | J2 17 | CONNECTOR |
| OC_CP7_PB1 U623 | 3 | 316A102 |
| OC_CP7_PB1 U105 | 4 | 07 |
| OC_CP7_PB1 | J2 18 | CONNECTOR |

| | | | |
|---|---|---|---|
| OC_FAST_CLTCH~ | U623 | 10 | 316A102 |
| OC_FAST_CLTCH~ | U105 | 8 | 07 |
| OC_FAST_CLTCH~ | | J1 46 | CONNECTOR |
| OC_FAST_CLTCH~ | | J4 38 | CONNECTOR |
| OC_REFC_LAMP~ | U317 | 10 | 06 |
| OC_REFC_LAMP~ | U623 | 9 | 316A102 |
| OC_REFC_LAMP~ | | J4 31 | CONNECTOR |
| OC_SLOW_CLTCH~ | U623 | 11 | 316A102 |
| OC_SLOW_CLTCH~ | U105 | 12 | 07 |
| OC_SLOW_CLTCH~ | | J1 47 | CONNECTOR |
| OC_SLOW_CLTCH~ | | J4 39 | CONNECTOR |
| OC_TRANS_P_LMP | U317 | 8 | 06 |
| OC_TRANS_P_LMP | | J4 30 | CONNECTOR |
| OC_TV_LAMP_SPR | U317 | 6 | 06 |
| OC_TV_LAMP_SPR | U623 | 7 | 316A102 |
| OC_TV_LAMP_SPR | | J4 34 | CONNECTOR |
| OC_TV_LAMP~ | U317 | 2 | 06 |
| OC_TV_LAMP~ | U623 | 5 | 316A102 |
| OC_TV_LAMP~ | | J4 32 | CONNECTOR |
| PANEL_INPUT_0 | U316 | 3 | 316A102 1K |
| PANEL_INPUT_0 | U406 | 6 | LS240 |
| PANEL_INPUT_0 | | J3 3 | CONNECTOR |
| PANEL_INPUT_1 | U316 | 4 | 316A102 1K |
| PANEL_INPUT_1 | U406 | 8 | LS240 |
| PANEL_INPUT_1 | | J3 4 | CONNECTOR |
| PANEL_INPUT_2 | U406 | 11 | LS240 |
| PANEL_INPUT_2 | U316 | 5 | 316A102 1K |
| PANEL_INPUT_2 | | J3 5 | CONNECTOR |
| PANEL_INPUT_3 | U406 | 13 | LS240 |
| PANEL_INPUT_3 | U316 | 6 | 316A102 1K |
| PANEL_INPUT_3 | | J3 6 | CONNECTOR |
| PANEL_INPUT_4 | U406 | 15 | LS240 |
| PANEL_INPUT_4 | U316 | 7 | 316A102 1K |
| PANEL_INPUT_4 | | J3 7 | CONNECTOR |
| PANEL_INPUT_5 | U406 | 17 | LS240 |
| PANEL_INPUT_5 | U316 | 9 | 316A102 1K |
| PANEL_INPUT_5 | | J3 8 | CONNECTOR |
| PANEL_INPUT_6 | U316 | 10 | 316A102 1K |
| PANEL_INPUT_6 | U622 | 2 | LS240 |
| PANEL_INPUT_6 | | J3 9 | CONNECTOR |
| PANEL_LED_0 | U202 | 2 | LS273 |
| PANEL_LED_0 | U610 | 3 | 06 |
| PANEL_LED_0~ | U623 | 12 | 316A102 |
| PANEL_LED_0~ | U610 | 4 | 06 |
| PANEL_LED_0~ | | J3 1 | CONNECTOR |
| PANEL_LED_1 | U202 | 5 | LS273 |
| PANEL_LED_1~ | U623 | 13 | 316A102 |
| PANEL_LED_1~ | U610 | 6 | 06 |
| PANEL_LED_1~ | | J3 2 | CONNECTOR |
| PANEL_LED_2 | U202 | 6 | LS273 |
| PANEL_LED_2 | U610 | 9 | 06 |
| PANEL_LED_2~ | U623 | 14 | 316A102 |
| PANEL_LED_2~ | U610 | 8 | 06 |
| PANEL_LED_2~ | | J3 10 | CONNECTOR |
| PANEL_LED_3 | U610 | 11 | 06 |
| PANEL_LED_3 | U202 | 9 | LS273 |
| PANEL_LED_3~ | U610 | 10 | 06 |
| PANEL_LED_3~ | U623 | 15 | 316A102 |
| PANEL_LED_3~ | | J3 11 | CONNECTOR |

| | | | |
|---|---|---|---|
| PSR_A | R102 | 2 | RES 4.7K |
| PSR_A | | J5 6 | CONNECTOR |
| PSR_B | R101 | 2 | RES 4.7K |
| PSR_B | | J6 6 | CONNECTOR |
| Q1 | U205 | 2 | LS273 |
| Q1 | U205 | 4 | LS273 |
| Q2 | U205 | 5 | LS273 |
| Q2 | U205 | 7 | LS273 |
| Q3 | U205 | 6 | LS273 |
| Q3 | U205 | 8 | LS273 |
| Q4 | U205 | 13 | LS273 |
| Q4 | U205 | 9 | LS273 |
| Q5 | U205 | 12 | LS273 |
| Q5 | U205 | 14 | LS273 |
| Q5 | U506 | 9 | LS04 |
| RD/CONVERT | U622 | 17 | LS240 |
| RD/CONVERT | U201 | 5 | LS273 |
| RD/CONVERT~ | U622 | 3 | LS240 |
| RD/CONVERT~ | | J3 13 | CONNECTOR |
| REFL_LAMP~ | U317 | 11 | 06 |
| REFL_LAMP~ | U201 | 15 | LS273 |
| RS232C_MODE | U620 | 17 | LS240 |
| RS232C_MODE | W101 | 2 | JUMP |
| RS232_INTA~ | U407 | 11 | 316A102 1K |
| RS232_INTA~ | U302 | 27 | 8274 |
| RS232_INT~ | U407 | 10 | 316A102 1K |
| RS232_INT~ | U303 | 13 | 80C31BH |
| RS232_INT~ | U302 | 28 | 8274 |
| RS232_INT~ | U623 | 4 | 316A102 |
| RTS_A | C116 | 2 | CAP 390PF |
| RTS_A | U103 | 6 | 1488 |
| RTS_A | | J5 4 | CONNECTOR |
| RTS_B | C107 | 2 | CAP 390PF |
| RTS_B | U102 | 3 | 1488 |
| RTS_B | | J6 4 | CONNECTOR |
| RXD_A | U104 | 10 | 1489 |
| RXD_A | | J5 3 | CONNECTOR |
| RXD_B | U104 | 13 | 1489 |
| RXD_B | | J6 3 | CONNECTOR |
| S313 | LED1 | 2 | LED |
| S313 | U702 | 7 | S240 |
| SCANNER_DOORS | C117 | 1 | CAP 1UF |
| SCANNER_DOORS | U407 | 12 | 316A102 1K |
| SCANNER_DOORS | U108 | 16 | 316B 47 |
| SCANNER_DOORS | U620 | 2 | LS240 |
| SHIFT_200NS | U601 | 2 | LS08 |
| SHIFT_200NS | U701 | 4 | LS164 |
| SHIFT_300NS | U506 | 13 | LS04 |
| SHIFT_300NS | U701 | 5 | LS164 |
| SHIFT_500NS | U701 | 10 | LS164 |
| SHIFT_500NS | U506 | 11 | LS04 |
| STARTLINE/INPU | U204 | 11 | LS00 |
| STARTLINE/INPU | U315 | 13 | 80C31BH |
| START_LINE | U404 | 11 | LS74 |
| START_LINE | U204 | 12 | LS00 |
| START_LINE | U303 | 14 | 80C31BH |
| START_LINE | U306 | 18 | LS240 |
| START_LINE~ | U306 | 2 | LS240 |
| START_LINE~ | | P2 15 | CONNECTOR |

| | | | |
|---|---|---|---|
| STA_SPARE_0 | U716 | 11 | LS240 |
| STA_SPARE_0 | U303 | 5 | 80C31BH |
| STOP_DATA_CNTR | U404 | 12 | LS74 |
| STOP_DATA_CNTR | U315 | 15 | 80C31BH |
| STOP_DATA~ | U306 | 5 | LS240 |
| STOP_DATA~ | | P2 21 | CONNECTOR |
| SYNC_A | U622 | 13 | LS240 |
| SYNC_A | U201 | 6 | LS273 |
| SYNC_A~ | U622 | 7 | LS240 |
| SYNC_A~ | | J3 16 | CONNECTOR |
| SYNC_START_LIN | U307 | 6 | LS244 |
| SYNC_START_LIN | U315 | 7 | 80C31BH |
| TERMINAL_MODE | W101 | 1 | JUMP |
| TERMINAL_MODE | U505 | 8 | 316A102 |
| TRANS_P_LAMP~ | U201 | 12 | LS273 |
| TRANS_P_LAMP~ | U615 | 9 | S04 |
| TV_LAMP_SPARE~ | U317 | 5 | 06 |
| TV_LAMP_SPARE~ | U201 | 9 | LS273 |
| TV_LAMP~ | U317 | 1 | 06 |
| TV_LAMP~ | U201 | 16 | LS273 |
| TXD_A | C113 | 2 | CAP 390PF |
| TXD_A | U103 | 3 | 1488 |
| TXD_A | | J5 2 | CONNECTOR |
| TXD_B | U103 | 11 | 1488 |
| TXD_B | C108 | 2 | CAP 390PF |
| TXD_B | | J6 2 | CONNECTOR |
| VCC | LED1 | 1 | LED |
| VCC | U318 | 16 | 316A102 1K |
| VCC | R401 | 2 | RES 1K |
| VCC | | P1 1 | CONNECTOR |
| VCC | | P1 2 | CONNECTOR |
| VCC | | P1 3 | CONNECTOR |
| VCC | | P1 4 | CONNECTOR |
| VCC | | P1 5 | CONNECTOR |
| VCC | | P1 6 | CONNECTOR |
| VCC | | P1 7 | CONNECTOR |
| VCC | | P1 8 | CONNECTOR |
| XACKNOWLEDGE | U307 | 3 | LS244 |
| XACKNOWLEDGE | | P1 27 | CONNECTOR |

INPUT

| Signal_name | Physical_location | Pin_number | Part_name |
|---|---|---|---|
| 0:XSIG552 | U704 | 13 | LS164 |
| 0:XSIG552 | U707 | 3 | LS153 |
| 0:XSIG552 | U707 | 5 | LS153 |
| 0:XSIG552 | U707 | 6 | LS153 |
| 0:XSIG553 | U706 | 10 | LS138 |
| 0:XSIG553 | U602 | 5 | LS04 |
| 0:XSIG595 | U602 | 1 | LS04 |
| 0:XSIG595 | U802 | 12 | LS240 |
| 0:XSIG627 | U607 | 1 | F74 |
| 0:XSIG627 | U602 | 4 | LS04 |
| 0:XSIG627 | U704 | 9 | LS164 |
| 0:XSIG640 | U602 | 10 | LS04 |
| 0:XSIG640 | U802 | 19 | LS240 |

| | | | |
|---|---|---|---|
| 0:XSIG647 | U707 | 1 | LS153 |
| 0:XSIG647 | U602 | 12 | LS04 |
| 0:XSIG647 | U707 | 15 | LS153 |
| 0:XSIG647 | U604 | 2 | F10 |
| 0:XSIG67 | U602 | 13 | LS04 |
| 0:XSIG67 | U704 | 6 | LS164 |
| 0:XSIG75 | U604 | 1 | F10 |
| 0:XSIG75 | U704 | 4 | LS164 |
| 0:XSIG88 | U602 | 11 | LS04 |
| 0:XSIG88 | U707 | 7 | LS153 |
| 10:XSIG177 | U124 | 14 | F139 |
| 10:XSIG177 | U525 | 2 | S377 |
| 10:XSIG178 | U124 | 13 | F139 |
| 10:XSIG178 | U525 | 5 | S377 |
| 10:XSIG220 | U508 | 11 | F04 |
| 10:XSIG220 | U512 | 3 | S112 |
| 10:XSIG220 | U426 | 9 | S273 |
| 10:XSIG221 | U508 | 10 | F04 |
| 10:XSIG221 | U512 | 2 | S112 |
| 10:XSIG236 | U418 | 12 | LS04 |
| 10:XSIG236 | U426 | 3 | S273 |
| 10:XSIG285 | U525 | 1 | S377 |
| 10:XSIG285 | U508 | 12 | F04 |
| 10:XSIG447 | U226 | 18 | S244 |
| 10:XSIG447 | U123 | 3 | S151 |
| 10:XSIG448 | U226 | 16 | S244 |
| 10:XSIG448 | U123 | 2 | S151 |
| 10:XSIG449 | U123 | 1 | S151 |
| 10:XSIG449 | U226 | 14 | S244 |
| 10:XSIG450 | U226 | 12 | S244 |
| 10:XSIG450 | U123 | 15 | S151 |
| 10:XSIG451 | U123 | 14 | S151 |
| 10:XSIG451 | U226 | 9 | S244 |
| 10:XSIG452 | U123 | 13 | S151 |
| 10:XSIG452 | U226 | 7 | S244 |
| 10:XSIG549 | U826 | 1 | F240 |
| 10:XSIG549 | U826 | 19 | F240 |
| 10:XSIG549 | U508 | 8 | F04 |
| 10:XSIG567 | U827 | 1 | F240 |
| 10:XSIG567 | U809 | 6 | F86 |
| 11:XSIG150 | U613 | 10 | F02 |
| 11:XSIG150 | U512 | 14 | S112 |
| 11:XSIG240 | U513 | 1 | F74 |
| 11:XSIG240 | U513 | 13 | F74 |
| 11:XSIG240 | U404 | 6 | F00 |
| 11:XSIG263 | U511 | 2 | S244 |
| 11:XSIG263 | U611 | 6 | F11 |
| 11:XSIG31 | U303 | 16 | PAL20L8A |
| 11:XSIG31 | U506 | 4 | F08 |
| 11:XSIG319 | U613 | 12 | F02 |
| 11:XSIG319 | U514 | 3 | F32 |
| 11:XSIG319 | U514 | 4 | F32 |
| 11:XSIG320 | U515 | 11 | F74 |
| 11:XSIG320 | U515 | 5 | F74 |
| 11:XSIG321 | U515 | 12 | F74 |
| 11:XSIG321 | U515 | 8 | F74 |
| 11:XSIG34 | U303 | 15 | PAL20L8A |
| 11:XSIG34 | U506 | 5 | F08 |
| 11:XSIG378 | U515 | 2 | F74 |

| | | | |
|---|---|---|---|
| 11:XSIG378 | U515 | 6 | F74 |
| 11:XSIG379 | U515 | 3 | F74 |
| 11:XSIG379 | U516 | 8 | OSC |
| 11:XSIG39 | U506 | 13 | F08 |
| 11:XSIG392 | U620 | 11 | S244 |
| 11:XSIG392 | U424 | 2 | S244 |
| 11:XSIG394 | U506 | 8 | F08 |
| 11:XSIG394 | U613 | 9 | F02 |
| 11:XSIG39 | U404 | 5 | F00 |
| 11:XSIG39 | U512 | 7 | S112 |
| 11:XSIG405 | U514 | 8 | F32 |
| 11:XSIG405 | U503 | 9 | S32 |
| 11:XSIG43 | U512 | 12 | S112 |
| 11:XSIG43 | U613 | 13 | F02 |
| 11:XSIG67 | U613 | 5 | F02 |
| 11:XSIG67 | U513 | 9 | F74 |
| 11:XSIG68 | U513 | 12 | F74 |
| 11:XSIG68 | U513 | 5 | F74 |
| 11:XSIG72 | U613 | 1 | F02 |
| 11:XSIG72 | U513 | 3 | F74 |
| 11:XSIG73 | U603 | 10 | F02 |
| 11:XSIG73 | U613 | 2 | F02 |
| 11:XSIG75 | U603 | 4 | F02 |
| 11:XSIG75 | U603 | 9 | F02 |
| 12:XSIG219 | C602 | 2 | CAPE 6.8 |
| 12:XSIG219 | | P1-12 | CONNECTOR |
| 12:XSIG219 | | P1-22 | CONNECTOR |
| 12:XSIG219 | | P1-32 | CONNECTOR |
| 12:XSIG219 | | P1-42 | CONNECTOR |
| 12:XSIG219 | | P1-52 | CONNECTOR |
| 12:XSIG219 | | P1-62 | CONNECTOR |
| 12:XSIG219 | | P1-72 | CONNECTOR |
| 12:XSIG219 | | P1-82 | CONNECTOR |
| 12:XSIG219 | | P1-92 | CONNECTOR |
| 12:XSIG219 | | P2-12 | CONNECTOR |
| 12:XSIG219 | | P2-2 | CONNECTOR |
| 12:XSIG219 | | P2-22 | CONNECTOR |
| 12:XSIG219 | | P2-32 | CONNECTOR |
| 12:XSIG219 | | P2-42 | CONNECTOR |
| 12:XSIG219 | | P2-52 | CONNECTOR |
| 12:XSIG219 | | P2-62 | CONNECTOR |
| 12:XSIG219 | | P2-72 | CONNECTOR |
| 12:XSIG219 | | P2-82 | CONNECTOR |
| 12:XSIG219 | | P2-92 | CONNECTOR |
| 1:XSIG3 | U302 | 11 | LS273 |
| 1:XSIG3 | U504 | 6 | LS27 |
| 1:XSIG467 | U224 | 1 | LS04 |
| 1:XSIG467 | U319 | 6 | LS377 |
| 1:XSIG468 | U224 | 3 | LS04 |
| 1:XSIG468 | U319 | 9 | LS377 |
| 1:XSIG469 | U319 | 12 | LS377 |
| 1:XSIG469 | U224 | 5 | LS04 |
| 1:XSIG470 | U319 | 15 | LS377 |
| 1:XSIG470 | U224 | 9 | LS04 |
| 1:XSIG471 | U224 | 11 | LS04 |
| 1:XSIG471 | U319 | 16 | LS377 |
| 1:XSIG602 | U224 | 13 | LS04 |
| 1:XSIG602 | U319 | 19 | LS377 |
| 1:XSIG603 | U801 | 15 | LS273 |

| | | | |
|---|---|---|---|
| 1:XSIG603 | U403 | 2 | LS139 |
| 1:XSIG604 | U801 | 16 | LS273 |
| 1:XSIG604 | U403 | 3 | LS139 |
| 1:XSIG606 | U403 | 1 | LS139 |
| 1:XSIG606 | U510 | 3 | LS32 |
| 1:XSIG6 | U801 | 11 | LS273 |
| 1:XSIG6 | U504 | 12 | LS27 |
| 1:XSIG624 | U824 | 13 | PAL20R8A |
| 1:XSIG624 | U510 | 8 | LS32 |
| 1:XSIG625 | U510 | 10 | LS32 |
| 1:XSIG625 | U510 | 2 | LS32 |
| 1:XSIG625 | U505 | 8 | LS32 |
| 1:XSIG626 | U510 | 1 | LS32 |
| 1:XSIG626 | U418 | 8 | LS04 |
| 1:XSIG6 | U703 | 3 | LS74 |
| 1:XSIG634 | U607 | 10 | F74 |
| 1:XSIG634 | U607 | 8 | F74 |
| 1:XSIG91 | U607 | 12 | F74 |
| 1:XSIG91 | U506 | 3 | F08 |
| 2:XSIG301 | U817 | 1 | LS245 |
| 2:XSIG301 | U717 | 11 | IMS1421 |
| 2:XSIG301 | U510 | 6 | LS32 |
| 2:XSIG541 | U814 | 1 | LS245 |
| 2:XSIG541 | U510 | 11 | LS32 |
| 3:XSIG141 | U608 | 29 | 2910A |
| 3:XSIG141 | U602 | 8 | LS04 |
| 3:XSIG143 | U608 | 14 | 2910A |
| 3:XSIG143 | U809 | 3 | F86 |
| 3:XSIG239 | U418 | 2 | LS04 |
| 3:XSIG239 | U811 | 7 | F251 |
| 3:XSIG284 | U809 | 1 | F86 |
| 3:XSIG284 | U811 | 6 | F251 |
| 3:XSIG309 | U811 | 15 | F251 |
| 3:XSIG309 | U813 | 9 | S374 |
| 3:XSIG310 | U813 | 2 | S374 |
| 3:XSIG310 | U811 | 4 | F251 |
| 3:XSIG311 | U811 | 3 | F251 |
| 3:XSIG311 | U813 | 5 | S374 |
| 3:XSIG312 | U811 | 1 | F251 |
| 3:XSIG312 | U813 | 6 | S374 |
| 3:XSIG313 | U813 | 19 | S374 |
| 3:XSIG313 | U812 | 2 | F251 |
| 3:XSIG314 | U813 | 16 | S374 |
| 3:XSIG314 | U812 | 3 | F251 |
| 3:XSIG315 | U813 | 15 | S374 |
| 3:XSIG315 | U812 | 4 | F251 |
| 4:XSIG195 | U318 | 11 | F11 |
| 4:XSIG195 | U113 | 14 | 67401A |
| 4:XSIG206 | U318 | 10 | F11 |
| 4:XSIG206 | U120 | 14 | 67401A |
| 4:XSIG217 | U101 | 1 | F11 |
| 4:XSIG217 | U114 | 14 | 67401A |
| 4:XSIG228 | U116 | 14 | 67401A |
| 4:XSIG228 | U101 | 2 | F11 |
| 4:XSIG250 | U101 | 10 | F11 |
| 4:XSIG250 | U110 | 14 | 67401A |
| 4:XSIG261 | U101 | 11 | F11 |
| 4:XSIG261 | U109 | 14 | 67401A |
| 4:XSIG272 | U111 | 14 | 67401A |

| | | | |
|---|---|---|---|
| 4:XSIG272 | U101 | 9 | F11 |
| 4:XSIG388 | U318 | 1 | F11 |
| 4:XSIG388 | U115 | 2 | 67401A |
| 4:XSIG389 | U120 | 2 | 67401A |
| 4:XSIG390 | U318 | 13 | F11 |
| 4:XSIG390 | U113 | 2 | 67401A |
| 4:XSIG393 | U115 | 14 | 67401A |
| 4:XSIG393 | U318 | 9 | F11 |
| 4:XSIG394 | U112 | 2 | 67401A |
| 4:XSIG394 | U318 | 3 | F11 |
| 4:XSIG395 | U116 | 2 | 67401A |
| 4:XSIG395 | U318 | 4 | F11 |
| 4:XSIG396 | U114 | 2 | 67401A |
| 4:XSIG396 | U318 | 5 | F11 |
| 4:XSIG403 | U101 | 13 | F11 |
| 4:XSIG403 | U112 | 14 | 67401A |
| 4:XSIG413 | U109 | 2 | 67401A |
| 4:XSIG413 | U101 | 3 | F11 |
| 4:XSIG414 | U110 | 2 | 67401A |
| 4:XSIG414 | U101 | 4 | F11 |
| 4:XSIG415 | U111 | 2 | 67401A |
| 4:XSIG415 | U101 | 5 | F11 |
| 5:XSIG154 | U320 | 12 | F182 |
| 5:XSIG154 | U316 | 7 | S181 |
| 5:XSIG155 | U320 | 11 | F182 |
| 5:XSIG155 | U313 | 7 | S181 |
| 5:XSIG156 | U312 | 7 | S181 |
| 5:XSIG156 | U320 | 9 | F182 |
| 5:XSIG157 | U320 | 10 | F182 |
| 5:XSIG157 | U225 | 3 | F182 |
| 5:XSIG158 | U225 | 4 | F182 |
| 5:XSIG158 | U320 | 7 | F182 |
| 5:XSIG159 | U225 | 12 | F182 |
| 5:XSIG159 | U315 | 7 | S181 |
| 5:XSIG462 | U315 | 16 | S181 |
| 5:XSIG462 | U307 | 17 | F374 |
| 5:XSIG486 | U305 | 12 | ALS569 |
| 5:XSIG486 | U304 | 19 | ALS569 |
| 5:XSIG491 | U311 | 12 | ALS569 |
| 5:XSIG491 | U305 | 19 | ALS569 |
| 5:XSIG508 | U605 | 1 | S244 |
| 5:XSIG508 | U605 | 19 | S244 |
| 5:XSIG508 | U508 | 2 | F04 |
| 5:XSIG512 | U310 | 12 | ALS569 |
| 5:XSIG512 | U311 | 19 | ALS569 |
| 5:XSIG562 | U620 | 5 | S244 |
| 5:XSIG562 | U304 | 7 | ALS569 |
| 7:XSIG236 | U324 | 1 | LS173 |
| 7:XSIG236 | U523 | 13 | PAL20R4 |
| 7:XSIG236 | U324 | 2 | LS173 |
| 7:XSIG236 | U418 | 4 | LS04 |
| 7:XSIG254 | U324 | 13 | LS173 |
| 7:XSIG254 | U322 | 5 | S374 |
| 7:XSIG255 | U324 | 14 | LS173 |
| 7:XSIG255 | U322 | 2 | S374 |
| 7:XSIG759 | U822 | 1 | LS245 |
| 7:XSIG759 | U624 | 27 | MP6264 |
| 7:XSIG759 | U503 | 3 | S32 |
| 8:XSIG1030 | U617 | 2 | S244 |

| | | | |
|---|---|---|---|
| 8:XSIG1030 | U522 | 22 | PAL20R8A |
| 8:XSIG1030 | U422 | 3 | LS684 |
| 8:XSIG1032 | U522 | 21 | PAL20R8A |
| 8:XSIG1032 | U617 | 4 | S244 |
| 8:XSIG1032 | U422 | 5 | LS684 |
| 8:XSIG1033 | U522 | 20 | PAL20R8A |
| 8:XSIG1033 | U617 | 6 | S244 |
| 8:XSIG1033 | U422 | 7 | LS684 |
| 8:XSIG1034 | U617 | 11 | S244 |
| 8:XSIG1034 | U422 | 12 | LS684 |
| 8:XSIG1034 | U522 | 18 | PAL20R8A |
| 8:XSIG1035 | U522 | 19 | PAL20R8A |
| 8:XSIG1035 | U617 | 8 | S244 |
| 8:XSIG1035 | U422 | 9 | LS684 |
| 8:XSIG1036 | U617 | 13 | S244 |
| 8:XSIG1036 | U422 | 14 | LS684 |
| 8:XSIG1036 | U522 | 17 | PAL20R8A |
| 8:XSIG1037 | U522 | 15 | PAL20R8A |
| 8:XSIG1037 | U617 | 17 | S244 |
| 8:XSIG1037 | U422 | 18 | LS684 |
| 8:XSIG1038 | U617 | 15 | S244 |
| 8:XSIG1038 | U422 | 16 | LS684 |
| 8:XSIG1049 | U522 | 11 | PAL20R8A |
| 8:XSIG1049 | U503 | 6 | S32 |
| 8:XSIG1091 | U619 | 10 | PAL20R8A |
| 8:XSIG1091 | U603 | 13 | F02 |
| 8:XSIG1095 | U421 | 13 | PAL20R8A |
| 8:XSIG1095 | U404 | 8 | F00 |
| 8:XSIG1109 | U620 | 3 | S244 |
| 8:XSIG1109 | U518 | 9 | LS173 |
| 8:XSIG1120 | U503 | 13 | S32 |
| 8:XSIG1120 | U308 | 8 | F32 |
| 8:XSIG1121 | U418 | 6 | LS04 |
| 8:XSIG1121 | U308 | 9 | F32 |
| 8:XSIG124 | U503 | 12 | S32 |
| 8:XSIG124 | U718 | 8 | LS30 |
| 8:XSIG201 | U503 | 11 | S32 |
| 8:XSIG201 | U521 | 7 | ALS569 |
| 8:XSIG226 | U519 | 19 | ALS569 |
| 8:XSIG226 | U418 | 5 | LS04 |
| 8:XSIG235 | U520 | 12 | ALS569 |
| 8:XSIG235 | U521 | 19 | ALS569 |
| 8:XSIG236 | U519 | 12 | ALS569 |
| 8:XSIG236 | U520 | 19 | ALS569 |
| 8:XSIG354 | U422 | 1 | LS684 |
| 8:XSIG354 | U503 | 4 | S32 |
| 9:XSIG11 | U308 | 3 | F32 |
| 9:XSIG11 | U308 | 4 | F32 |
| 9:XSIG212 | U611 | 12 | F11 |
| 9:XSIG212 | U509 | 2 | F74 |
| 9:XSIG226 | U509 | 12 | F74 |
| 9:XSIG226 | U509 | 5 | F74 |
| 9:XSIG226 | U517 | 9 | F08 |
| 9:XSIG227 | U502 | 1 | F11 |
| 9:XSIG227 | U502 | 11 | F11 |
| 9:XSIG227 | U502 | 3 | F11 |
| 9:XSIG227 | U517 | 8 | F08 |
| 9:XSIG228 | U308 | 12 | F32 |
| 9:XSIG228 | U509 | 8 | F74 |

| | | | |
|---|---|---|---|
| 9:XSIG241 | U509 | 1 | F74 |
| 9:XSIG241 | U308 | 11 | F32 |
| 9:XSIG243 | U407 | 2 | F374 |
| 9:XSIG243 | U502 | 9 | F11 |
| 9:XSIG244 | U502 | 13 | F11 |
| 9:XSIG244 | U502 | 5 | F11 |
| 9:XSIG244 | U407 | 9 | F374 |
| 9:XSIG247 | R502 | 1 | RES 2K |
| 9:XSIG247 | U501 | 11 | S151 |
| 9:XSIG247 | U502 | 4 | F11 |
| 9:XSIG247 | U407 | 5 | F374 |
| 9:XSIG248 | R501 | 1 | RES 2K |
| 9:XSIG248 | U501 | 10 | S151 |
| 9:XSIG248 | U407 | 6 | F374 |
| 9:XSIG266 | U309 | 4 | F74 |
| 9:XSIG266 | U309 | 6 | F74 |
| 9:XSIG354 | U407 | 3 | F374 |
| 9:XSIG354 | U508 | 4 | F04 |
| 9:XSIG357 | U508 | 6 | F04 |
| 9:XSIG357 | U407 | 8 | F374 |
| 9:XSIG364 | U407 | 12 | F374 |
| 9:XSIG364 | U501 | 9 | S151 |
| 9:XSIG391 | U509 | 11 | F74 |
| 9:XSIG391 | U404 | 3 | F00 |
| 9:XSIG64 | U309 | 11 | F74 |
| 9:XSIG64 | U308 | 6 | F32 |
| 9:XSIG65 | U309 | 10 | F74 |
| 9:XSIG65 | U309 | 8 | F74 |
| 9:XSIG82 | U309 | 12 | F74 |
| 9:XSIG82 | U604 | 6 | F10 |
| 9:XSIG86 | U417 | 13 | S240 |
| 9:XSIG86 | U517 | 6 | F08 |
| 9:XSIG87 | U517 | 11 | F08 |
| 9:XSIG87 | U417 | 15 | S240 |
| 9:XSIG91 | U417 | 11 | S240 |
| 9:XSIG91 | U517 | 3 | F08 |
| A0 | . | 1 | IMS1400 |
| A10 | . | 6 | IMS1400 |
| A11 | . | 14 | IMS1400 |
| A1 | . | 19 | IMS1400 |
| A12 | . | 7 | IMS1400 |
| A13 | . | 13 | IMS1400 |
| A2 | . | 2 | IMS1400 |
| A3 | . | 18 | IMS1400 |
| A4 | . | 3 | IMS1400 |
| A5 | . | 17 | IMS1400 |
| A6 | . | 4 | IMS1400 |
| A7 | . | 16 | IMS1400 |
| A8 | . | 5 | IMS1400 |
| A9 | . | 15 | IMS1400 |
| AD10~ | U805 | 17 | LS240 |
| AD11~ | U804 | 2 | LS240 |
| AD12~ | U804 | 4 | LS240 |
| AD13~ | U804 | 6 | LS240 |
| AD14~ | U804 | 8 | LS240 |
| AD15~ | U804 | 11 | LS240 |
| AD16~ | U804 | 13 | LS240 |
| AD17~ | U804 | 15 | LS240 |
| ADR1~ | U806 | 2 | LS240 |

| | | | |
|---|---|---|---|
| ADR2~ | U806 | 4 | LS240 |
| ADR3~ | U806 | 6 | LS240 |
| ADR4~ | U806 | 8 | LS240 |
| ADR5~ | U806 | 11 | LS240 |
| ADR6~ | U806 | 13 | LS240 |
| ADR7~ | U806 | 15 | LS240 |
| ADR8~ | U806 | 17 | LS240 |
| ADR9~ | U805 | 2 | LS240 |
| ADRA~ | U805 | 4 | LS240 |
| ADRB~ | U805 | 6 | LS240 |
| ADRC~ | U805 | 8 | LS240 |
| ADRD~ | U805 | 11 | LS240 |
| ADRE~ | U805 | 13 | LS240 |
| ADRF~ | U805 | 15 | LS240 |
| ALUY0 | U201 | 12 | IMS1400 |
| ALUY0 | U322 | 13 | S374 |
| ALUY0 | U824 | 23 | PAL20R8A |
| ALUY0 | U319 | 3 | LS377 |
| ALUY0 | U314 | 9 | S181 |
| ALUY10 | U313 | 11 | S181 |
| ALUY10 | U227 | 17 | F374 |
| ALUY10 | U820 | 3 | PAL20R8A |
| ALUY10 | U311 | 5 | ALS569 |
| ALUY10 | U228 | 7 | LS377 |
| ALUY1 | U314 | 10 | S181 |
| ALUY11 | U313 | 13 | S181 |
| ALUY11 | U227 | 18 | F374 |
| ALUY11 | U820 | 4 | PAL20R8A |
| ALUY11 | U311 | 6 | ALS569 |
| ALUY11 | U228 | 8 | LS377 |
| ALUY1 | U824 | 2 | PAL20R8A |
| ALUY12 | U228 | 13 | LS377 |
| ALUY12 | U310 | 3 | ALS569 |
| ALUY12 | U820 | 5 | PAL20R8A |
| ALUY12 | U312 | 9 | S181 |
| ALUY13 | U312 | 10 | S181 |
| ALUY13 | U228 | 14 | LS377 |
| ALUY13 | U310 | 4 | ALS569 |
| ALUY13 | U820 | 6 | PAL20R8A |
| ALUY1 | U319 | 4 | LS377 |
| ALUY14 | U312 | 11 | S181 |
| ALUY14 | U205 | 12 | IMS1400 |
| ALUY14 | U228 | 17 | LS377 |
| ALUY14 | U310 | 5 | ALS569 |
| ALUY14 | U820 | 7 | PAL20R8A |
| ALUY15 | U312 | 13 | S181 |
| ALUY15 | U228 | 18 | LS377 |
| ALUY15 | U310 | 6 | ALS569 |
| ALUY15 | U820 | 8 | PAL20R8A |
| ALUY16 | U424 | 11 | S244 |
| ALUY16 | U126 | 13 | F374 |
| ALUY16 | U412 | 14 | LS173 |
| ALUY16 | U506 | 2 | F08 |
| ALUY16 | U125 | 3 | LS377 |
| ALUY16 | U315 | 9 | S181 |
| ALUY17 | U315 | 10 | S181 |
| ALUY17 | U424 | 13 | S244 |
| ALUY17 | U126 | 14 | F374 |
| ALUY17 | U125 | 4 | LS377 |

| | | | |
|---|---|---|---|
| ALUY18 | U315 | 11 | S181 |
| ALUY18 | U412 | 12 | LS173 |
| ALUY18 | U424 | 15 | S244 |
| ALUY18 | U126 | 17 | F374 |
| ALUY18 | U125 | 7 | LS377 |
| ALUY19 | U412 | 11 | LS173 |
| ALUY19 | U307 | 13 | F374 |
| ALUY19 | U424 | 17 | S244 |
| ALUY19 | U126 | 18 | F374 |
| ALUY19 | U125 | 8 | LS377 |
| ALUY2 | U314 | 11 | S181 |
| ALUY2 | U322 | 17 | S374 |
| ALUY2 | U824 | 3 | PAL20R8A |
| ALUY2 | U304 | 5 | ALS569 |
| ALUY2 | U319 | 7 | LS377 |
| ALUY3 | U314 | 13 | S181 |
| ALUY3 | U322 | 18 | S374 |
| ALUY3 | U824 | 4 | PAL20R8A |
| ALUY3 | U304 | 6 | ALS569 |
| ALUY3 | U319 | 8 | LS377 |
| ALUY4 | U319 | 13 | LS377 |
| ALUY4 | U305 | 3 | ALS569 |
| ALUY4 | U824 | 5 | PAL20R8A |
| ALUY4 | U316 | 9 | S181 |
| ALUY5 | U316 | 10 | S181 |
| ALUY5 | U319 | 14 | LS377 |
| ALUY5 | U305 | 4 | ALS569 |
| ALUY5 | U824 | 6 | PAL20R8A |
| ALUY6 | U316 | 11 | S181 |
| ALUY6 | U319 | 17 | LS377 |
| ALUY6 | U305 | 5 | ALS569 |
| ALUY6 | U824 | 7 | PAL20R8A |
| ALUY7 | U204 | 12 | IMS1400 |
| ALUY7 | U316 | 13 | S181 |
| ALUY7 | U319 | 18 | LS377 |
| ALUY7 | U305 | 6 | ALS569 |
| ALUY7 | U824 | 8 | PAL20R8A |
| ALUY8 | U227 | 13 | F374 |
| ALUY8 | U820 | 23 | PAL20R8A |
| ALUY8 | U228 | 3 | LS377 |
| ALUY8 | U313 | 9 | S181 |
| ALUY9 | U313 | 10 | S181 |
| ALUY9 | U227 | 14 | F374 |
| ALUY9 | U820 | 2 | PAL20R8A |
| ALUY9 | U228 | 4 | LS377 |
| ALU_A0 | U606 | 1 | PAL20L8A |
| ALU_A0 | U314 | 2 | S181 |
| ALU_A10 | U313 | 21 | S181 |
| ALU_A10 | U406 | 5 | PAL20L8A |
| ALU_A10 | U306 | 6 | F374 |
| ALU_A11 | U313 | 19 | S181 |
| ALU_A11 | U406 | 6 | PAL20L8A |
| ALU_A11 | U306 | 9 | F374 |
| ALU_A1 | U606 | 2 | PAL20L8A |
| ALU_A12 | U306 | 12 | F374 |
| ALU_A12 | U312 | 2 | S181 |
| ALU_A1 | U314 | 23 | S181 |
| ALU_A13 | U306 | 15 | F374 |
| ALU_A13 | U312 | 23 | S181 |

| | | | |
|---|---|---|---|
| ALU_A14 | U306 | 16 | F374 |
| ALU_A14 | U312 | 21 | S181 |
| ALU_A1 | U416 | 5 | F374 |
| ALU_A15 | U306 | 19 | F374 |
| ALU_A16 | U307 | 2 | F374 |
| ALU_A17 | U315 | 23 | S181 |
| ALU_A17 | U307 | 5 | F374 |
| ALU_A18 | U315 | 21 | S181 |
| ALU_A18 | U307 | 6 | F374 |
| ALU_A19 | U315 | 19 | S181 |
| ALU_A19 | U307 | 9 | F374 |
| ALU_A2 | U314 | 21 | S181 |
| ALU_A2 | U606 | 3 | PAL20L8A |
| ALU_A2 | U416 | 6 | F374 |
| ALU_A3 | U314 | 19 | S181 |
| ALU_A3 | U606 | 4 | PAL20L8A |
| ALU_A3 | U416 | 9 | F374 |
| ALU_A4 | U416 | 12 | F374 |
| ALU_A4 | U316 | 2 | S181 |
| ALU_A4 | U606 | 5 | PAL20L8A |
| ALU_A5 | U416 | 15 | F374 |
| ALU_A5 | U316 | 23 | S181 |
| ALU_A5 | U606 | 6 | PAL20L8A |
| ALU_A6 | U406 | 1 | PAL20L8A |
| ALU_A6 | U416 | 16 | F374 |
| ALU_A6 | U316 | 21 | S181 |
| ALU_A7 | U316 | 19 | S181 |
| ALU_A7 | U406 | 2 | PAL20L8A |
| ALU_A8 | U306 | 2 | F374 |
| ALU_A8 | U406 | 3 | PAL20L8A |
| ALU_A9 | U313 | 23 | S181 |
| ALU_A9 | U406 | 4 | PAL20L8A |
| ALU_A9 | U306 | 5 | F374 |
| ALU_B0 | U314 | 1 | S181 |
| ALU_B0 | U521 | 16 | ALS569 |
| ALU_B0 | U420 | 2 | S374 |
| ALU_B0 | U619 | 22 | PAL20R8A |
| ALU_B10 | U718 | 11 | LS30 |
| ALU_B10 | U519 | 14 | ALS569 |
| ALU_B10 | U422 | 15 | LS684 |
| ALU_B10 | U313 | 20 | S181 |
| ALU_B10 | U617 | 5 | S244 |
| ALU_B10 | U423 | 6 | S374 |
| ALU_B10 | U522 | 7 | PAL20R8A |
| ALU_B11 | U718 | 12 | LS30 |
| ALU_B11 | U519 | 13 | ALS569 |
| ALU_B11 | U422 | 17 | LS684 |
| ALU_B11 | U313 | 18 | S181 |
| ALU_B11 | U414 | 19 | PAL20R8A |
| ALU_B11 | U617 | 3 | S244 |
| ALU_B1 | U521 | 15 | ALS569 |
| ALU_B11 | U518 | 6 | LS173 |
| ALU_B11 | U522 | 8 | PAL20R8A |
| ALU_B11 | U423 | 9 | S374 |
| ALU_B12 | U312 | 1 | S181 |
| ALU_B12 | U222 | 11 | LS244 |
| ALU_B12 | U414 | 18 | PAL20R8A |
| ALU_B1 | U314 | 22 | S181 |
| ALU_B12 | U421 | 22 | PAL20R8A |

| | | | |
|---|---|---|---|
| ALU_B13 | U222 | 13 | LS244 |
| ALU_B13 | U414 | 17 | PAL20R8A |
| ALU_B13 | U421 | 21 | PAL20R8A |
| ALU_B13 | U312 | 22 | S181 |
| ALU_B1 | U419 | 4 | LS244 |
| ALU_B14 | U222 | 15 | LS244 |
| ALU_B14 | U414 | 16 | PAL20R8A |
| ALU_B14 | U312 | 20 | S181 |
| ALU_B1 | U420 | 5 | S374 |
| ALU_B15 | U414 | 15 | PAL20R8A |
| ALU_B15 | U222 | 17 | LS244 |
| ALU_B15 | U312 | 18 | S181 |
| ALU_B15 | U421 | 19 | PAL20R8A |
| ALU_B16 | U315 | 1 | S181 |
| ALU_B16 | U511 | 11 | S244 |
| ALU_B16 | U421 | 18 | PAL20R8A |
| ALU_B16 | U412 | 3 | LS173 |
| ALU_B17 | U511 | 13 | S244 |
| ALU_B17 | U421 | 17 | PAL20R8A |
| ALU_B17 | U315 | 22 | S181 |
| ALU_B17 | U412 | 4 | LS173 |
| ALU_B18 | U511 | 15 | S244 |
| ALU_B18 | U421 | 16 | PAL20R8A |
| ALU_B18 | U315 | 20 | S181 |
| ALU_B18 | U412 | 5 | LS173 |
| ALU_B19 | U421 | 15 | PAL20R8A |
| ALU_B19 | U511 | 17 | S244 |
| ALU_B19 | U315 | 18 | S181 |
| ALU_B19 | U412 | 6 | LS173 |
| ALU_B2 | U521 | 14 | ALS569 |
| ALU_B2 | U314 | 20 | S181 |
| ALU_B2 | U420 | 6 | S374 |
| ALU_B3 | U521 | 13 | ALS569 |
| ALU_B3 | U314 | 18 | S181 |
| ALU_B3 | U619 | 19 | PAL20R8A |
| ALU_B3 | U419 | 8 | LS244 |
| ALU_B3 | U420 | 9 | S374 |
| ALU_B4 | U316 | 1 | S181 |
| ALU_B4 | U419 | 11 | LS244 |
| ALU_B4 | U420 | 12 | S374 |
| ALU_B4 | U520 | 16 | ALS569 |
| ALU_B4 | U617 | 18 | S244 |
| ALU_B4 | U422 | 2 | LS684 |
| ALU_B4 | U522 | 23 | PAL20R8A |
| ALU_B5 | U419 | 13 | LS244 |
| ALU_B5 | U420 | 15 | S374 |
| ALU_B5 | U617 | 16 | S244 |
| ALU_B5 | U619 | 17 | PAL20R8A |
| ALU_B5 | U718 | 2 | LS30 |
| ALU_B5 | U316 | 22 | S181 |
| ALU_B5 | U422 | 4 | LS684 |
| ALU_B6 | U617 | 14 | S244 |
| ALU_B6 | U419 | 15 | LS244 |
| ALU_B6 | U420 | 16 | S374 |
| ALU_B6 | U316 | 20 | S181 |
| ALU_B6 | U718 | 3 | LS30 |
| ALU_B6 | U422 | 6 | LS684 |
| ALU_B7 | U617 | 12 | S244 |
| ALU_B7 | U520 | 13 | ALS569 |

| | | | |
|---|---|---|---|
| ALU_B7 | U619 | 15 | PAL20R8A |
| ALU_B7 | U419 | 17 | LS244 |
| ALU_B7 | U316 | 18 | S181 |
| ALU_B7 | U420 | 19 | S374 |
| ALU_B7 | U718 | 4 | LS30 |
| ALU_B7 | U422 | 8 | LS684 |
| ALU_B8 | U313 | 1 | S181 |
| ALU_B8 | U422 | 11 | LS684 |
| ALU_B8 | U519 | 16 | ALS569 |
| ALU_B8 | U423 | 2 | S374 |
| ALU_B8 | U414 | 22 | PAL20R8A |
| ALU_B8 | U518 | 3 | LS173 |
| ALU_B8 | U718 | 5 | LS30 |
| ALU_B8 | U617 | 9 | S244 |
| ALU_B9 | U422 | 13 | LS684 |
| ALU_B9 | U519 | 15 | ALS569 |
| ALU_B9 | U414 | 21 | PAL20R8A |
| ALU_B9 | U313 | 22 | S181 |
| ALU_B9 | U518 | 4 | LS173 |
| ALU_B9 | U423 | 5 | S374 |
| ALU_B9 | U718 | 6 | LS30 |
| ALU_B9 | U617 | 7 | S244 |
| A_EQ_B | R301 | 1 | RES 280 |
| A_EQ_B | U316 | 14 | S181 |
| CATASTROPHE | U813 | 8 | S374 |
| CATASTROPHE | U309 | 9 | F74 |
| CCLK | U802 | 14 | LS240 |
| CCLK | U704 | 8 | LS164 |
| CCLK~ | U802 | 6 | LS240 |
| CE | . | 11 | IMS1400 |
| CK0 | U404 | 1 | F00 |
| CK0 | U517 | 10 | F08 |
| CK0 | U609 | 11 | F374 |
| CK0 | U308 | 13 | F32 |
| CK0 | U511 | 18 | S244 |
| CK0 | U304 | 2 | ALS569 |
| CK0 | U509 | 3 | F74 |
| CK0 | U608 | 31 | 2910A |
| CK0 | U412 | 7 | LS173 |
| CK1 | U523 | 1 | PAL20R4 |
| CK1 | U227 | 11 | F374 |
| CK1 | U521 | 2 | ALS569 |
| CK1 | U611 | 4 | F11 |
| CK1 | U324 | 7 | LS173 |
| CK1 | U620 | 9 | S244 |
| CK2 | U824 | 1 | PAL20R8A |
| CK2 | U607 | 11 | F74 |
| CK2 | U424 | 18 | S244 |
| CK2 | U611 | 3 | F11 |
| CLK_PER_CMD | U603 | 8 | F02 |
| CLK_PER_CMD | U801 | 9 | LS273 |
| CLOCK_ON | U506 | 10 | F08 |
| CLOCK_ON | U707 | 2 | LS153 |
| CLOCK_ON | U801 | 5 | LS273 |
| CLOCK_ON | U613 | 6 | F02 |
| CLR_ADDR_CNTR~ | U224 | 4 | LS04 |
| CLR_ADDR_CNTR~ | U304 | 8 | ALS569 |
| CLR_CATASTROPH | U309 | 1 | F74 |
| CLR_CATASTROPH | U309 | 13 | F74 |

| | | | |
|---|---|---|---|
| CLR_CATASTROPH | U224 | 6 | LS04 |
| CLR_FLAG1~ | U703 | 1 | LS74 |
| CLR_FLAG1~ | U224 | 8 | LS04 |
| CLR_FLAG2~ | U224 | 10 | LS04 |
| CLR_FLAG2~ | U703 | 13 | LS74 |
| CLR_MXR~ | U224 | 12 | LS04 |
| CLR_MXR~ | U522 | 14 | PAL20R8A |
| CLR_SAT_CNTR~ | U224 | 2 | LS04 |
| CLR_SAT_CNTR~ | U521 | 8 | ALS569 |
| CMD_SEL~ | U705 | 12 | LS139 |
| CMD_SEL~ | U706 | 5 | LS138 |
| CO | U812 | 1 | F251 |
| CO | U307 | 16 | F374 |
| COL_0~ | U223 | 1 | LS244 |
| COL_0~ | U223 | 19 | LS244 |
| COL_0~ | U124 | 4 | F139 |
| COL_1~ | U119 | 1 | LS244 |
| COL_1~ | U122 | 19 | LS244 |
| COL_1~ | U124 | 5 | F139 |
| COL_2~ | U121 | 1 | LS244 |
| COL_2~ | U121 | 19 | LS244 |
| COL_2~ | U124 | 6 | F139 |
| COL_3~ | U421 | 11 | PAL20R8A |
| COL_3~ | U603 | 12 | F02 |
| COL_3~ | U620 | 17 | S244 |
| COL_3~ | U124 | 7 | F139 |
| COND_MUX_SEL | U418 | 1 | LS04 |
| COND_MUX_SEL | U228 | 2 | LS377 |
| COND_MUX_SEL | U812 | 7 | F251 |
| CR_FIFOS_RST | U319 | 2 | LS377 |
| CR_FIFOS_RST | U603 | 3 | F02 |
| DAT0~ | U808 | 2 | LS640 |
| DAT1~ | U808 | 3 | LS640 |
| DAT2~ | U808 | 4 | LS640 |
| DAT3~ | U808 | 5 | LS640 |
| DAT4~ | U808 | 6 | LS640 |
| DAT5~ | U808 | 7 | LS640 |
| DAT6~ | U808 | 8 | LS640 |
| DAT7~ | U808 | 9 | LS640 |
| DAT8~ | U807 | 2 | LS640 |
| DAT9~ | U807 | 3 | LS640 |
| DATA~ | U807 | 4 | LS640 |
| DATB~ | U807 | 5 | LS640 |
| DATC~ | U807 | 6 | LS640 |
| DATD~ | U807 | 7 | LS640 |
| DATE~ | U807 | 8 | LS640 |
| DATF~ | U807 | 9 | LS640 |
| DIAG_ALU_B_BUS | U222 | 1 | LS244 |
| DIAG_ALU_B_BUS | U222 | 19 | LS244 |
| DIAG_ALU_B_BUS | U403 | 6 | LS139 |
| DIAG_OTHERS | U401 | 1 | LS244 |
| DIAG_OTHERS | U424 | 19 | S244 |
| DIAG_OTHERS | U403 | 7 | LS139 |
| DIAG_PLR_LSB~ | U616 | 1 | LS244 |
| DIAG_PLR_LSB~ | U616 | 19 | LS244 |
| DIAG_PLR_LSB~ | U403 | 4 | LS139 |
| DIAG_PLR_MSB~ | U301 | 1 | LS244 |
| DIAG_PLR_MSB~ | U301 | 19 | LS244 |
| DIAG_PLR_MSB~ | U403 | 5 | LS139 |

| | | | |
|---|---|---|---|
| DIN | . | 12 | IMS1400 |
| DISABLE_WAIT | U319 | 5 | LS377 |
| DISABLE_WAIT | U506 | 9 | F08 |
| DO0~ | U819 | 18 | F240 |
| DO0~ | U818 | 2 | LS240 |
| DO1~ | U819 | 16 | F240 |
| DO1~ | U818 | 4 | LS240 |
| DO2~ | U819 | 14 | F240 |
| DO2~ | U818 | 6 | LS240 |
| DO3~ | U819 | 12 | F240 |
| DO3~ | U818 | 8 | LS240 |
| DO4~ | U818 | 11 | LS240 |
| DO4~ | U819 | 9 | F240 |
| DO5~ | U818 | 13 | LS240 |
| DO5~ | U819 | 7 | F240 |
| DO6~ | U818 | 15 | LS240 |
| DO6~ | U819 | 5 | F240 |
| DO7~ | U818 | 17 | LS240 |
| DO7~ | U819 | 3 | F240 |
| DOUT | . | 8 | IMS1400 |
| ENABLE_INT | U507 | 1 | LS38 |
| ENABLE_INT | U801 | 2 | LS273 |
| EOL_C | U309 | 5 | F74 |
| EOL_C | U813 | 7 | S374 |
| EOL_IN | U103 | 11 | 2632 |
| EOL_IN | U711 | 12 | LS240 |
| EOL_IN | U309 | 2 | F74 |
| EOL_IN | U711 | 3 | LS240 |
| EOL_OUT | U825 | 17 | F244 |
| EOL_OUT | U228 | 6 | LS377 |
| EOL_OUT | U825 | 8 | F244 |
| EOL_OUT~ | U401 | 11 | LS244 |
| EOL_OUT~ | U825 | 3 | F244 |
| EQ | U812 | 15 | F251 |
| F0_O0 | U113 | 13 | 67401A |
| F0_O0 | U223 | 2 | LS244 |
| F0_O10 | U115 | 11 | 67401A |
| F0_O10 | U122 | 6 | LS244 |
| F0_O11 | U115 | 10 | 67401A |
| F0_O1 | U113 | 12 | 67401A |
| F0_O11 | U122 | 8 | LS244 |
| F0_O1 | U223 | 4 | LS244 |
| F0_O2 | U113 | 11 | 67401A |
| F0_O2 | U223 | 6 | LS244 |
| F0_O3 | U113 | 10 | 67401A |
| F0_O3 | U223 | 8 | LS244 |
| F0_O4 | U223 | 11 | LS244 |
| F0_O4 | U120 | 13 | 67401A |
| F0_O5 | U120 | 12 | 67401A |
| F0_O5 | U223 | 13 | LS244 |
| F0_O6 | U120 | 11 | 67401A |
| F0_O6 | U223 | 15 | LS244 |
| F0_O7 | U120 | 10 | 67401A |
| F0_O7 | U223 | 17 | LS244 |
| F0_O8 | U115 | 13 | 67401A |
| F0_O8 | U122 | 2 | LS244 |
| F0_O9 | U115 | 12 | 67401A |
| F0_O9 | U122 | 4 | LS244 |
| F1_O0 | U122 | 11 | LS244 |

| | | | |
|---|---|---|---|
| F1_O0 | U114 | 13 | 67401A |
| F1_O10 | U112 | 11 | 67401A |
| F1_O10 | U119 | 15 | LS244 |
| F1_O11 | U112 | 10 | 67401A |
| F1_O11 | U119 | 17 | LS244 |
| F1_O1 | U114 | 12 | 67401A |
| F1_O1 | U122 | 13 | LS244 |
| F1_O2 | U114 | 11 | 67401A |
| F1_O2 | U122 | 15 | LS244 |
| F1_O3 | U114 | 10 | 67401A |
| F1_O3 | U122 | 17 | LS244 |
| F1_O4 | U116 | 13 | 67401A |
| F1_O4 | U119 | 2 | LS244 |
| F1_O5 | U116 | 12 | 67401A |
| F1_O5 | U119 | 4 | LS244 |
| F1_O6 | U116 | 11 | 67401A |
| F1_O6 | U119 | 6 | LS244 |
| F1_O7 | U116 | 10 | 67401A |
| F1_O7 | U119 | 8 | LS244 |
| F1_O8 | U119 | 11 | LS244 |
| F1_O8 | U112 | 13 | 67401A |
| F1_O9 | U112 | 12 | 67401A |
| F1_O9 | U119 | 13 | LS244 |
| F2_O0 | U111 | 13 | 67401A |
| F2_O0 | U121 | 2 | LS244 |
| F2_O10 | U109 | 11 | 67401A |
| F2_O10 | U118 | 15 | LS244 |
| F2_O11 | U109 | 10 | 67401A |
| F2_O11 | U118 | 17 | LS244 |
| F2_O1 | U111 | 12 | 67401A |
| F2_O1 | U121 | 4 | LS244 |
| F2_O2 | U111 | 11 | 67401A |
| F2_O2 | U121 | 6 | LS244 |
| F2_O3 | U111 | 10 | 67401A |
| F2_O3 | U121 | 8 | LS244 |
| F2_O4 | U121 | 11 | LS244 |
| F2_O4 | U110 | 13 | 67401A |
| F2_O5 | U110 | 12 | 67401A |
| F2_O5 | U121 | 13 | LS244 |
| F2_O6 | U110 | 11 | 67401A |
| F2_O6 | U121 | 15 | LS244 |
| F2_O7 | U110 | 10 | 67401A |
| F2_O7 | U121 | 17 | LS244 |
| F2_O8 | U118 | 11 | LS244 |
| F2_O8 | U109 | 13 | 67401A |
| F2_O9 | U109 | 12 | 67401A |
| F2_O9 | U118 | 13 | LS244 |
| FIFOS_RST | U603 | 1 | F02 |
| FIFOS_RST | U113 | 9 | 67401A |
| FLAG1 | U813 | 14 | S374 |
| FLAG1 | U703 | 5 | LS74 |
| FLAG2 | U813 | 17 | S374 |
| FLAG2 | U703 | 9 | LS74 |
| FRI_0 | U223 | 18 | LS244 |
| FRI_0 | U420 | 3 | S374 |
| FRI_0 | U122 | 9 | LS244 |
| FRI_10 | U122 | 14 | LS244 |
| FRI_10 | U119 | 5 | LS244 |
| FRI_10 | U423 | 7 | S374 |

| | | | |
|---|---|---|---|
| FRI_11 | U122 | 12 | LS244 |
| FRI_11 | U119 | 3 | LS244 |
| FRI_1 | U223 | 16 | LS244 |
| FRI_11 | U423 | 8 | S374 |
| FRI_1 | U420 | 4 | S374 |
| FRI_1 | U122 | 7 | LS244 |
| FRI_2 | U223 | 14 | LS244 |
| FRI_2 | U122 | 5 | LS244 |
| FRI_2 | U420 | 7 | S374 |
| FRI_3 | U223 | 12 | LS244 |
| FRI_3 | U122 | 3 | LS244 |
| FRI_3 | U420 | 8 | S374 |
| FRI_4 | U420 | 13 | S374 |
| FRI_4 | U119 | 18 | LS244 |
| FRI_4 | U223 | 9 | LS244 |
| FRI_5 | U420 | 14 | S374 |
| FRI_5 | U119 | 16 | LS244 |
| FRI_5 | U223 | 7 | LS244 |
| FRI_6 | U119 | 14 | LS244 |
| FRI_6 | U420 | 17 | S374 |
| FRI_6 | U223 | 5 | LS244 |
| FRI_7 | U119 | 12 | LS244 |
| FRI_7 | U420 | 18 | S374 |
| FRI_7 | U223 | 3 | LS244 |
| FRI_8 | U122 | 18 | LS244 |
| FRI_8 | U423 | 3 | S374 |
| FRI_8 | U119 | 9 | LS244 |
| FRI_9 | U122 | 16 | LS244 |
| FRI_9 | U423 | 4 | S374 |
| FRI_9 | U119 | 7 | LS244 |
| G0 | U314 | 17 | S181 |
| G0 | U320 | 3 | F182 |
| G1 | U320 | 1 | F182 |
| G1 | U316 | 17 | S181 |
| G2 | U320 | 14 | F182 |
| G2 | U313 | 17 | S181 |
| G3 | U312 | 17 | S181 |
| G3 | U320 | 5 | F182 |
| GND | U424 | 1 | S244 |
| GND | U201 | 11 | IMS1400 |
| GND | U425 | 12 | LS125 |
| GND | U608 | 13 | 2910A |
| GND | U324 | 15 | LS173 |
| GND | U620 | 19 | S244 |
| GND | U425 | 2 | LS125 |
| GND | U622 | 20 | MP6264 |
| GND | U624 | 22 | MP6264 |
| GND | W101 | 3 | JUMP |
| GND | U708 | 4 | S138 |
| GND | U708 | 5 | S138 |
| GND | U317 | 6 | LS240 |
| GND | U123 | 7 | S151 |
| GND | U317 | 8 | LS240 |
| GND | U717 | 9 | IMS1421 |
| GND | | J3 45 | CONNECTOR |
| GND | | J3 46 | CONNECTOR |
| GND | | J3 47 | CONNECTOR |
| GND | | J3 48 | CONNECTOR |
| GND | | J3 49 | CONNECTOR |

| | | | |
|---|---|---|---|
| GND | | J3 50 | CONNECTOR |
| GRAD_LUT_SEL~ | U427 | 1 | LS244 |
| GRAD_LUT_SEL~ | U803 | 19 | PAL14L8 |
| GRAD_LUT_SEL~ | U503 | 2 | S32 |
| GRAD_LUT_SEL~ | U418 | 3 | LS04 |
| GRD_A0 | U624 | 10 | MP6264 |
| GRD_A0 | U719 | 18 | LS244 |
| GRD_A0 | U523 | 20 | PAL20R4 |
| GRD_A10 | U427 | 14 | LS244 |
| GRD_A10 | U526 | 18 | PAL20R4 |
| GRD_A10 | U624 | 21 | MP6264 |
| GRD_A11 | U427 | 12 | LS244 |
| GRD_A11 | U526 | 17 | PAL20R4 |
| GRD_A11 | U624 | 23 | MP6264 |
| GRD_A1 | U719 | 16 | LS244 |
| GRD_A1 | U523 | 19 | PAL20R4 |
| GRD_A12 | U624 | 2 | MP6264 |
| GRD_A12 | U324 | 3 | LS173 |
| GRD_A12 | U303 | 7 | PAL20L8A |
| GRD_A12 | U427 | 9 | LS244 |
| GRD_A13 | U624 | 20 | MP6264 |
| GRD_A13 | U622 | 26 | MP6264 |
| GRD_A13 | U324 | 4 | LS173 |
| GRD_A13 | U427 | 7 | LS244 |
| GRD_A13 | U303 | 8 | PAL20L8A |
| GRD_A1 | U624 | 9 | MP6264 |
| GRD_A2 | U719 | 14 | LS244 |
| GRD_A2 | U523 | 18 | PAL20R4 |
| GRD_A2 | U624 | 8 | MP6264 |
| GRD_A3 | U719 | 12 | LS244 |
| GRD_A3 | U523 | 17 | PAL20R4 |
| GRD_A3 | U624 | 7 | MP6264 |
| GRD_A4 | U524 | 20 | PAL20R4 |
| GRD_A4 | U624 | 6 | MP6264 |
| GRD_A4 | U719 | 9 | LS244 |
| GRD_A5 | U524 | 19 | PAL20R4 |
| GRD_A5 | U624 | 5 | MP6264 |
| GRD_A5 | U719 | 7 | LS244 |
| GRD_A6 | U524 | 18 | PAL20R4 |
| GRD_A6 | U624 | 4 | MP6264 |
| GRD_A6 | U719 | 5 | LS244 |
| GRD_A7 | U524 | 17 | PAL20R4 |
| GRD_A7 | U719 | 3 | LS244 |
| GRD_A8 | U427 | 18 | LS244 |
| GRD_A8 | U526 | 20 | PAL20R4 |
| GRD_A8 | U624 | 25 | MP6264 |
| GRD_A9 | U427 | 16 | LS244 |
| GRD_A9 | U526 | 19 | PAL20R4 |
| GRD_A9 | U624 | 24 | MP6264 |
| GRD_D0 | U623 | 11 | MP6264 |
| GRD_D0 | U525 | 13 | S377 |
| GRD_D0 | U822 | 2 | LS245 |
| GRD_D10 | U624 | 13 | MP6264 |
| GRD_D10 | U828 | 17 | S377 |
| GRD_D10 | U821 | 4 | LS245 |
| GRD_D11 | U624 | 15 | MP6264 |

| | | | |
|---|---|---|---|
| GRD_D11 | U828 | 18 | S377 |
| GRD_D1 | U623 | 12 | MP6264 |
| GRD_D1 | U525 | 14 | S377 |
| GRD_D11 | U821 | 5 | LS245 |
| GRD_D1 | U822 | 3 | LS245 |
| GRD_D2 | U623 | 13 | MP6264 |
| GRD_D2 | U525 | 17 | S377 |
| GRD_D2 | U822 | 4 | LS245 |
| GRD_D3 | U623 | 15 | MP6264 |
| GRD_D3 | U525 | 18 | S377 |
| GRD_D3 | U822 | 5 | LS245 |
| GRD_D4 | U623 | 16 | MP6264 |
| GRD_D4 | U828 | 3 | S377 |
| GRD_D4 | U822 | 6 | LS245 |
| GRD_D5 | U623 | 17 | MP6264 |
| GRD_D5 | U828 | 4 | S377 |
| GRD_D5 | U822 | 7 | LS245 |
| GRD_D6 | U623 | 18 | MP6264 |
| GRD_D6 | U828 | 7 | S377 |
| GRD_D6 | U822 | 8 | LS245 |
| GRD_D7 | U623 | 19 | MP6264 |
| GRD_D7 | U828 | 8 | S377 |
| GRD_D7 | U822 | 9 | LS245 |
| GRD_D8 | U624 | 11 | MP6264 |
| GRD_D8 | U828 | 13 | S377 |
| GRD_D8 | U821 | 2 | LS245 |
| GRD_D9 | U624 | 12 | MP6264 |
| GRD_D9 | U828 | 14 | S377 |
| GRD_D9 | U821 | 3 | LS245 |
| HCFGR0 | U302 | 2 | LS273 |
| HCFGR0 | U510 | 9 | LS32 |
| HCFGR10 | U123 | 10 | S151 |
| HCFGR10 | U402 | 6 | LS273 |
| HCFGR1 | U303 | 1 | PAL20L8A |
| HCFGR1 | U403 | 14 | LS139 |
| HCFGR11 | U402 | 9 | LS273 |
| HCFGR12 | U402 | 12 | LS273 |
| HCFGR12 | U827 | 2 | F240 |
| HCFGR13 | U402 | 15 | LS273 |
| HCFGR13 | U827 | 4 | F240 |
| HCFGR14 | U402 | 16 | LS273 |
| HCFGR14 | U827 | 6 | F240 |
| HCFGR1 | U302 | 5 | LS273 |
| HCFGR15 | U402 | 19 | LS273 |
| HCFGR15 | U827 | 8 | F240 |
| HCFGR2 | U403 | 13 | LS139 |
| HCFGR2 | U303 | 2 | PAL20L8A |
| HCFGR2 | U302 | 6 | LS273 |
| HCFGR3 | U303 | 5 | PAL20L8A |
| HCFGR3 | U302 | 9 | LS273 |
| HCFGR4 | U302 | 12 | LS273 |
| HCFGR4 | U303 | 6 | PAL20L8A |
| HCFGR5 | U302 | 15 | LS273 |
| HCFGR5 | U508 | 9 | F04 |
| HCFGR6 | U620 | 1 | S244 |
| HCFGR6 | U302 | 16 | LS273 |
| HCFGR6 | U809 | 4 | F86 |
| HCFGR7 | U302 | 19 | LS273 |
| HCFGR7 | U303 | 3 | PAL20L8A |

| | | | |
|---|---|---|---|
| HCFGR8 | U402 | 2 | LS273 |
| HCFGR8 | U303 | 4 | PAL20L8A |
| HCFGR9 | U123 | 11 | S151 |
| HCFGR9 | U402 | 5 | LS273 |
| HCR9 | U407 | 1 | F374 |
| HCR9 | U801 | 19 | LS273 |
| HDB0N | U108 | 1 | 2632 |
| HDB0P | U107 | 16 | 316B 220 |
| HDB0P | U108 | 2 | 2632 |
| HDB10N | U104 | 3 | 316B 220 |
| HDB10N | U105 | 7 | 2632 |
| HDB10P | U104 | 14 | 316B 220 |
| HDB10P | U105 | 6 | 2632 |
| HDB11N | U104 | 4 | 316B 220 |
| HDB11N | U105 | 9 | 2632 |
| HDB11P | U105 | 10 | 2632 |
| HDB11P | U104 | 13 | 316B 220 |
| HDB1N | U108 | 15 | 2632 |
| HDB1N | U107 | 2 | 316B 220 |
| HDB1P | U108 | 14 | 2632 |
| HDB1P | U107 | 15 | 316B 220 |
| HDB2N | U107 | 3 | 316B 220 |
| HDB2N | U108 | 7 | 2632 |
| HDB2P | U107 | 14 | 316B 220 |
| HDB2P | U108 | 6 | 2632 |
| HDB3N | U107 | 4 | 316B 220 |
| HDB3N | U108 | 9 | 2632 |
| HDB3P | U108 | 10 | 2632 |
| HDB3P | U107 | 13 | 316B 220 |
| HDB4N | U106 | 1 | 2632 |
| HDB4N | U107 | 5 | 316B 220 |
| HDB4P | U107 | 12 | 316B 220 |
| HDB4P | U106 | 2 | 2632 |
| HDB5N | U106 | 15 | 2632 |
| HDB5N | U107 | 6 | 316B 220 |
| HDB5P | U107 | 11 | 316B 220 |
| HDB5P | U106 | 14 | 2632 |
| HDB6N | U106 | 7 | 2632 |
| HDB6P | U107 | 10 | 316B 220 |
| HDB6P | U106 | 6 | 2632 |
| HDB7N | U107 | 8 | 316B 220 |
| HDB7N | U106 | 9 | 2632 |
| HDB7P | U106 | 10 | 2632 |
| HDB7P | U107 | 9 | 316B 220 |
| HDB8N | U105 | 1 | 2632 |
| HDB8P | U104 | 16 | 316B 220 |
| HDB8P | U105 | 2 | 2632 |
| HDB9N | U105 | 15 | 2632 |
| HDB9N | U104 | 2 | 316B 220 |
| HDB9P | U105 | 14 | 2632 |
| HDB9P | U104 | 15 | 316B 220 |
| HD_EOL_N | U104 | 8 | 316B 220 |
| HD_EOL_N | U103 | 9 | 2632 |
| HD_EOL_P | U103 | 10 | 2632 |
| HD_EOL_P | U104 | 9 | 316B 220 |
| HD_LINE_REQ_N | U102 | 2 | 2631 |
| HD_LINE_REQ_P | U102 | 3 | 2631 |
| HD_SI0N | U103 | 1 | 2632 |
| HD_SI0N | U104 | 5 | 316B 220 |

| | | | |
|---|---|---|---|
| HD_SI0P | U104 | 12 | 316B 220 |
| HD_SI0P | U103 | 2 | 2632 |
| HD_SI1N | U103 | 15 | 2632 |
| HD_SI1N | U104 | 6 | 316B 220 |
| HD_SI1P | U104 | 11 | 316B 220 |
| HD_SI1P | U103 | 14 | 2632 |
| HD_SI2N | U103 | 7 | 2632 |
| HD_SI2P | U104 | 10 | 316B 220 |
| HD_SI2P | U103 | 6 | 2632 |
| HIGH1 | U515 | 1 | F74 |
| HIGH1 | U509 | 10 | F74 |
| HIGH1 | U509 | 13 | F74 |
| HIGH1 | U405 | 14 | LS244 |
| HIGH1 | U513 | 2 | F74 |
| HIGH1 | U624 | 26 | MP6264 |
| HIGH1 | U509 | 4 | F74 |
| HIGH1 | U809 | 5 | F86 |
| HIGH2 | U704 | 1 | LS164 |
| HIGH2 | U824 | 10 | PAL20R8A |
| HIGH2 | U405 | 12 | LS244 |
| HIGH2 | U811 | 13 | F251 |
| HIGH2 | U824 | 14 | PAL20R8A |
| HIGH2 | U608 | 15 | 2910A |
| HIGH2 | U802 | 17 | LS240 |
| HIGH2 | U607 | 2 | F74 |
| HIGH2 | U608 | 32 | 2910A |
| HIGH2 | U607 | 4 | F74 |
| HIGH2 | U706 | 6 | LS138 |
| HIGH3 | U604 | 10 | F10 |
| HIGH3 | U221 | 11 | S244 |
| HIGH3 | U221 | 13 | S244 |
| HIGH3 | U317 | 14 | LS240 |
| HIGH3 | U605 | 15 | S244 |
| HIGH3 | U605 | 17 | S244 |
| HIGH3 | U221 | 2 | S244 |
| HIGH3 | U221 | 4 | S244 |
| HIGH3 | U221 | 6 | S244 |
| HIGH3 | U221 | 8 | S244 |
| HIGH3 | U304 | 9 | ALS569 |
| HIGH4 | U521 | 1 | ALS569 |
| HIGH4 | U522 | 10 | PAL20R8A |
| HIGH4 | U521 | 11 | ALS569 |
| HIGH4 | U501 | 12 | S151 |
| HIGH4 | U619 | 14 | PAL20R8A |
| HIGH4 | U501 | 2 | S151 |
| HIGH4 | U501 | 3 | S151 |
| HIGH4 | U501 | 4 | S151 |
| HIGH4 | U405 | 6 | LS244 |
| HIGH4 | U405 | 8 | LS244 |
| HIGH4 | U521 | 9 | ALS569 |
| HOST_CLR_IRQ~ | U607 | 13 | F74 |
| HOST_CLR_IRQ~ | U706 | 15 | LS138 |
| HOST_CNFIG_SEL | U706 | 14 | LS138 |
| HOST_CNFIG_SEL | U504 | 3 | LS27 |
| HOST_CNFIG_SEL | U504 | 4 | LS27 |
| HOST_CNTRL_SEL | U504 | 1 | LS27 |
| HOST_CNTRL_SEL | U706 | 13 | LS138 |
| HOST_CNTRL_SEL | U504 | 2 | LS27 |
| HOST_EOL~ | U711 | 17 | LS240 |

| | | | |
|---|---|---|---|
| HOST_EOL~ | U706 | 9 | LS138 |
| HOST_FIFOS_RST | U603 | 2 | F02 |
| HOST_FIFOS_RST | U602 | 6 | LS04 |
| HOST_FIFO_0~ | U711 | 11 | LS240 |
| HOST_FIFO_0~ | U705 | 4 | LS139 |
| HOST_FIFO_1~ | U711 | 13 | LS240 |
| HOST_FIFO_1~ | U705 | 5 | LS139 |
| HOST_FIFO_2~ | U711 | 15 | LS240 |
| HOST_FIFO_2~ | U705 | 6 | LS139 |
| HOST_IR~ | U505 | 11 | LS32 |
| HOST_IR~ | U707 | 14 | LS153 |
| HOST_NXT_SEL~ | U818 | 1 | LS240 |
| HOST_NXT_SEL~ | U818 | 19 | LS240 |
| HOST_OB_SEL~ | U823 | 1 | LS240 |
| HOST_OB_SEL~ | U303 | 18 | PAL20L8A |
| HOST_OB_SEL~ | U823 | 19 | LS240 |
| HOST_SEL~ | U705 | 15 | LS139 |
| HOST_SEL~ | U803 | 18 | PAL14L8 |
| HOST_SINGLE_CK | U603 | 5 | F02 |
| HOST_SINGLE_CK | U603 | 6 | F02 |
| HOST_SINGLE_CK | U706 | 7 | LS138 |
| HOST_SI~ | U705 | 1 | LS139 |
| HOST_SI~ | U505 | 3 | LS32 |
| HOST_STTS_RD~ | U505 | 10 | LS32 |
| HOST_STTS_RD~ | U706 | 12 | LS138 |
| H_INIT~ | U302 | 1 | LS273 |
| H_INIT~ | U602 | 2 | LS04 |
| IB0~ | U411 | 1 | 316A 330 |
| IB0~ | U815 | 2 | S240 |
| IB10~ | U411 | 11 | 316A 330 |
| IB10~ | U417 | 6 | S240 |
| IB11~ | U411 | 12 | 316A 330 |
| IB11~ | U417 | 8 | S240 |
| IB1~ | U411 | 2 | 316A 330 |
| IB1~ | U815 | 4 | S240 |
| IB2~ | U411 | 3 | 316A 330 |
| IB2~ | U815 | 6 | S240 |
| IB3~ | U411 | 4 | 316A 330 |
| IB3~ | U815 | 8 | S240 |
| IB4~ | U815 | 11 | S240 |
| IB4~ | U411 | 5 | 316A 330 |
| IB5~ | U815 | 13 | S240 |
| IB5~ | U411 | 6 | 316A 330 |
| IB6~ | U815 | 15 | S240 |
| IB6~ | U411 | 7 | 316A 330 |
| IB7~ | U815 | 17 | S240 |
| IB7~ | U411 | 8 | 316A 330 |
| IB8~ | U417 | 2 | S240 |
| IB8~ | U411 | 9 | 316A 330 |
| IB9~ | U411 | 10 | 316A 330 |
| IB9~ | U417 | 4 | S240 |
| IB_12BITS~ | U417 | 1 | S240 |
| IB_12BITS~ | U403 | 11 | LS139 |
| IB_8BITS~ | U425 | 1 | LS125 |
| IB_8BITS~ | U425 | 10 | LS125 |
| IB_8BITS~ | U425 | 13 | LS125 |
| IB_8BITS~ | U425 | 4 | LS125 |
| IB_EOL~ | R802 | 2 | RES 330 |
| IB_EOL~ | U711 | 8 | LS240 |

| | | | |
|---|---|---|---|
| IB_IR0~ | U401 | 2 | LS244 |
| IB_IR0~ | U417 | 9 | S240 |
| IB_IR1~ | U401 | 4 | LS244 |
| IB_IR1~ | U417 | 7 | S240 |
| IB_IR2~ | U417 | 5 | S240 |
| IB_IR2~ | U401 | 6 | LS244 |
| IB_SI0~ | U411 | 13 | 316A 330 |
| IB_SI0~ | U711 | 2 | LS240 |
| IB_SI1~ | U411 | 14 | 316A 330 |
| IB_SI1~ | U711 | 4 | LS240 |
| IB_SI2~ | U411 | 15 | 316A 330 |
| IB_SI2~ | U711 | 6 | LS240 |
| IFD0 | U815 | 18 | S240 |
| IFD0 | U108 | 3 | 2632 |
| IFD0 | U113 | 4 | 67401A |
| IFD10 | U417 | 14 | S240 |
| IFD10 | U117 | 5 | LS244 |
| IFD10 | U115 | 6 | 67401A |
| IFD10 | U425 | 8 | LS125 |
| IFD11 | U425 | 11 | LS125 |
| IFD11 | U417 | 12 | S240 |
| IFD11 | U117 | 3 | LS244 |
| IFD1 | U815 | 16 | S240 |
| IFD11 | U115 | 7 | 67401A |
| IFD1 | U113 | 5 | 67401A |
| IFD2 | U815 | 14 | S240 |
| IFD2 | U108 | 5 | 2632 |
| IFD2 | U113 | 6 | 67401A |
| IFD3 | U108 | 11 | 2632 |
| IFD3 | U815 | 12 | S240 |
| IFD3 | U113 | 7 | 67401A |
| IFD4 | U117 | 18 | LS244 |
| IFD4 | U106 | 3 | 2632 |
| IFD4 | U120 | 4 | 67401A |
| IFD4 | U815 | 9 | S240 |
| IFD5 | U106 | 13 | 2632 |
| IFD5 | U117 | 16 | LS244 |
| IFD5 | U120 | 5 | 67401A |
| IFD5 | U815 | 7 | S240 |
| IFD6 | U117 | 14 | LS244 |
| IFD6 | U815 | 5 | S240 |
| IFD6 | U120 | 6 | 67401A |
| IFD7 | U106 | 11 | 2632 |
| IFD7 | U117 | 12 | LS244 |
| IFD7 | U815 | 3 | S240 |
| IFD7 | U120 | 7 | 67401A |
| IFD8 | U417 | 18 | S240 |
| IFD8 | U425 | 3 | LS125 |
| IFD8 | U115 | 4 | 67401A |
| IFD8 | U117 | 9 | LS244 |
| IFD9 | U105 | 13 | 2632 |
| IFD9 | U417 | 16 | S240 |
| IFD9 | U115 | 5 | 67401A |
| IFD9 | U425 | 6 | LS125 |
| IFD9 | U117 | 7 | LS244 |
| IF_HEAD_SEL~ | U108 | 12 | 2632 |
| IF_HEAD_SEL~ | U303 | 22 | PAL20L8A |
| IF_HOST_SEL~ | U117 | 1 | LS244 |
| IF_HOST_SEL~ | U117 | 19 | LS244 |

| | | | |
|---|---|---|---|
| IF_HOST_SEL~ | U303 | 20 | PAL20L8A |
| IF_IN_BUS_SEL~ | U815 | 1 | S240 |
| IF_IN_BUS_SEL~ | U815 | 19 | S240 |
| IF_IN_BUS_SEL~ | U303 | 21 | PAL20L8A |
| IF_IR0 | U318 | 12 | F11 |
| IF_IR0 | U517 | 2 | F08 |
| IF_IR0 | U604 | 3 | F10 |
| IF_IR1 | U604 | 4 | F10 |
| IF_IR1 | U517 | 5 | F08 |
| IF_IR1 | U318 | 6 | F11 |
| IF_IR2 | U517 | 12 | F08 |
| IF_IR2 | U604 | 5 | F10 |
| IF_IR2 | U101 | 6 | F11 |
| IF_OR0 | U501 | 15 | S151 |
| IF_OR0 | U318 | 8 | F11 |
| IF_OR1 | U101 | 12 | F11 |
| IF_OR1 | U501 | 14 | S151 |
| IF_OR2 | U501 | 13 | S151 |
| IF_OR2 | U101 | 8 | F11 |
| IF_SI0 | U308 | 1 | F32 |
| IF_SI0 | U711 | 18 | LS240 |
| IF_SI0 | U113 | 3 | 67401A |
| IF_SI0 | U711 | 9 | LS240 |
| IF_SI1 | U103 | 13 | 2632 |
| IF_SI1 | U711 | 16 | LS240 |
| IF_SI1 | U308 | 2 | F32 |
| IF_SI1 | U116 | 3 | 67401A |
| IF_SI1 | U711 | 7 | LS240 |
| IF_SI2 | U711 | 14 | LS240 |
| IF_SI2 | U110 | 3 | 67401A |
| IF_SI2 | U711 | 5 | LS240 |
| IF_SO0 | U502 | 12 | F11 |
| IF_SO0 | U113 | 15 | 67401A |
| IF_SO1 | U116 | 15 | 67401A |
| IF_SO1 | U502 | 6 | F11 |
| IF_SO2 | U110 | 15 | 67401A |
| IF_SO2 | U502 | 8 | F11 |
| INFIFO_SEL~ | U705 | 11 | LS139 |
| INFIFO_SEL~ | U505 | 2 | LS32 |
| INIT~ | U802 | 8 | LS240 |
| INPUT_CARD_RDY | U517 | 1 | F08 |
| INPUT_CARD_RDY | U517 | 13 | F08 |
| INPUT_CARD_RDY | U102 | 15 | 2631 |
| INPUT_CARD_RDY | U517 | 4 | F08 |
| INPUT_CARD_RDY | U228 | 5 | LS377 |
| INPUT_CARD_RDY | U102 | 13 | 2631 |
| INPUT_CARD_RDY | U102 | 14 | 2631 |
| INPUT_CARD_SEL | U803 | 16 | PAL14L8 |
| INPUT_CARD_SEL | U808 | 19 | LS640 |
| INPUT_CARD_SEL | U602 | 3 | LS04 |
| INPUT_WAIT | U613 | 11 | F02 |
| INPUT_WAIT | U514 | 5 | F32 |
| INPUT_WAIT | U501 | 6 | S151 |
| INT~ | R601 | 1 | RES 10K |
| INT~ | U507 | 3 | LS38 |
| IRQ | U813 | 18 | S374 |
| IRQ | U507 | 2 | LS38 |
| IRQ | U607 | 9 | F74 |

| | | | |
|---|---|---|---|
| IR_IN0~ | U620 | 2 | S244 |
| IR_IN1~ | U620 | 4 | S244 |
| IR_IN2~ | U620 | 6 | S244 |
| HDB0N | | J3 1 | CONNECTOR |
| HDB4P | | J3 10 | CONNECTOR |
| HDB5N | | J3 11 | CONNECTOR |
| HDB5P | | J3 12 | CONNECTOR |
| HDB6N | | J3 13 | CONNECTOR |
| HDB6P | | J3 14 | CONNECTOR |
| HDB7N | | J3 15 | CONNECTOR |
| HDB7P | | J3 16 | CONNECTOR |
| HDB8N | | J3 17 | CONNECTOR |
| HDB8P | | J3 18 | CONNECTOR |
| HDB9N | | J3 19 | CONNECTOR |
| HDB0P | | J3 2 | CONNECTOR |
| HDB9P | | J3 20 | CONNECTOR |
| HDB10N | | J3 21 | CONNECTOR |
| HDB10P | | J3 22 | CONNECTOR |
| HDB11N | | J3 23 | CONNECTOR |
| HDB11P | | J3 24 | CONNECTOR |
| HD_SI0N | | J3 25 | CONNECTOR |
| HD_SI0P | | J3 26 | CONNECTOR |
| HD_SI1N | | J3 27 | CONNECTOR |
| HD_SI1P | | J3 28 | CONNECTOR |
| HD_SI2N | | J3 29 | CONNECTOR |
| HDB1N | | J3 3 | CONNECTOR |
| HD_SI2P | | J3 30 | CONNECTOR |
| HD_EOL_N | | J3 31 | CONNECTOR |
| HD_EOL_P | | J3 32 | CONNECTOR |
| HD_LINE_REQ_N | | J3 33 | CONNECTOR |
| HD_LINE_REQ_P | | J3 34 | CONNECTOR |
| INPUT_CARD_RDY | | J3 35 | CONNECTOR |
| INPUT_CARD_RDY | | J3 36 | CONNECTOR |
| HDB1P | | J3 4 | CONNECTOR |
| HDB2N | | J3 5 | CONNECTOR |
| HDB2P | | J3 6 | CONNECTOR |
| HDB3N | | J3 7 | CONNECTOR |
| HDB3P | | J3 8 | CONNECTOR |
| HDB4N | | J3 9 | CONNECTOR |
| JMP_TO_ZERO | U604 | 11 | F10 |
| JMP_TO_ZERO | U801 | 6 | LS273 |
| JMP_ZERO~ | U610 | 1 | F08 |
| JMP_ZERO~ | U610 | 12 | F08 |
| JMP_ZERO~ | U512 | 15 | S112 |
| JMP_ZERO~ | U610 | 4 | F08 |
| JMP_ZERO~ | U413 | 6 | S138 |
| JMP_ZERO~ | U604 | 8 | F10 |
| JMP_ZERO~ | U610 | 9 | F08 |
| LD_ACR~ | U412 | 10 | LS173 |
| LD_ACR~ | U415 | 11 | PAL20R8A |
| LD_ACR~ | U413 | 7 | S138 |
| LD_ACR~ | U412 | 9 | LS173 |
| LD_ADDR_CNTR~ | U413 | 11 | S138 |
| LD_CONTROL_REG | U319 | 1 | LS377 |
| LD_CONTROL_REG | U413 | 10 | S138 |
| LD_STTS_REG | U506 | 1 | F08 |
| LD_STTS_REG | U809 | 8 | F86 |
| LD_STTS_REG~ | U824 | 11 | PAL20R8A |

| | | | |
|---|---|---|---|
| LD_STTS_REG~ | U809 | 9 | F86 |
| LINE_MEM_WRITE | U413 | 13 | S138 |
| LINE_MEM_WRITE | U514 | 9 | F32 |
| LINE_MEM_WR~ | U611 | 5 | F11 |
| LINE_MEM_WR~ | U503 | 8 | S32 |
| LINE_MEM_WR~ | U201 | 9 | IMS1400 |
| LINE_REQ~ | R701 | 1 | RES 2K |
| LINE_REQ~ | U226 | 17 | S244 |
| LMA_0 | U201 | 1 | IMS1400 |
| LMA_0 | U304 | 16 | ALS569 |
| LMA_0 | U605 | 18 | S244 |
| LMA_10 | U311 | 14 | ALS569 |
| LMA_10 | U201 | 6 | IMS1400 |
| LMA_10 | U221 | 9 | S244 |
| LMA_11 | U311 | 13 | ALS569 |
| LMA_11 | U201 | 14 | IMS1400 |
| LMA_1 | U304 | 15 | ALS569 |
| LMA_1 | U605 | 16 | S244 |
| LMA_11 | U221 | 7 | S244 |
| LMA_1 | U201 | 19 | IMS1400 |
| LMA_12 | U310 | 16 | ALS569 |
| LMA_12 | U221 | 5 | S244 |
| LMA_12 | U201 | 7 | IMS1400 |
| LMA_13 | U201 | 13 | IMS1400 |
| LMA_13 | U310 | 15 | ALS569 |
| LMA_13 | U221 | 3 | S244 |
| LMA_14 | U310 | 14 | ALS569 |
| LMA_14 | U605 | 5 | S244 |
| LMA_15 | U310 | 13 | ALS569 |
| LMA_15 | U605 | 3 | S244 |
| LMA_2 | U605 | 14 | S244 |
| LMA_2 | U201 | 2 | IMS1400 |
| LMA_3 | U605 | 12 | S244 |
| LMA_3 | U304 | 13 | ALS569 |
| LMA_3 | U201 | 18 | IMS1400 |
| LMA_4 | U305 | 16 | ALS569 |
| LMA_4 | U201 | 3 | IMS1400 |
| LMA_4 | U605 | 9 | S244 |
| LMA_5 | U305 | 15 | ALS569 |
| LMA_5 | U201 | 17 | IMS1400 |
| LMA_5 | U605 | 7 | S244 |
| LMA_6 | U305 | 14 | ALS569 |
| LMA_6 | U221 | 18 | S244 |
| LMA_6 | U201 | 4 | IMS1400 |
| LMA_7 | U305 | 13 | ALS569 |
| LMA_7 | U221 | 16 | S244 |
| LMA_8 | U221 | 14 | S244 |
| LMA_8 | U311 | 16 | ALS569 |
| LMA_8 | U201 | 5 | IMS1400 |
| LMA_9 | U221 | 12 | S244 |
| LMA_9 | U311 | 15 | ALS569 |
| LMDO_0 | U416 | 3 | F374 |
| LMDO_0 | U201 | 8 | IMS1400 |
| LMDO_10 | U306 | 7 | F374 |
| LMDO_11 | U306 | 8 | F374 |
| LMDO_12 | U306 | 13 | F374 |
| LMDO_13 | U306 | 14 | F374 |
| LMDO_1 | U416 | 4 | F374 |
| LMDO_14 | U306 | 17 | F374 |

| | | | |
|---|---|---|---|
| LMDO_14 | U205 | 8 | IMS1400 |
| LMDO_15 | U306 | 18 | F374 |
| LMDO_16 | U307 | 3 | F374 |
| LMDO_17 | U307 | 4 | F374 |
| LMDO_18 | U307 | 7 | F374 |
| LMDO_19 | U307 | 8 | F374 |
| LMDO_2 | U416 | 7 | F374 |
| LMDO_3 | U416 | 8 | F374 |
| LMDO_4 | U416 | 13 | F374 |
| LMDO_5 | U416 | 14 | F374 |
| LMDO_6 | U416 | 17 | F374 |
| LMDO_7 | U416 | 18 | F374 |
| LMDO_7 | U204 | 8 | IMS1400 |
| LMDO_8 | U306 | 3 | F374 |
| LMDO_9 | U306 | 4 | F374 |
| LN_REQ~ | U226 | 3 | S244 |
| LN_REQ~ | U601 | 9 | LS164 |
| LOW1 | U805 | 1 | LS240 |
| LOW1 | U406 | 14 | PAL20L8A |
| LOW1 | U405 | 18 | LS244 |
| LOW1 | U805 | 19 | LS240 |
| LOW1 | U501 | 7 | S151 |
| LOW2 | U609 | 1 | F374 |
| LOW2 | U405 | 16 | LS244 |
| LOW2 | U825 | 19 | F244 |
| LOW3 | U416 | 1 | F374 |
| LOW3 | U317 | 18 | LS240 |
| LOW3 | U108 | 4 | 2632 |
| LOW4 | U226 | 1 | S244 |
| LOW4 | U521 | 12 | ALS569 |
| LOW4 | U522 | 13 | PAL20R8A |
| LOW4 | U317 | 16 | LS240 |
| LOW4 | U226 | 19 | S244 |
| LOW4 | U103 | 4 | 2632 |
| MBAB0 | U706 | 1 | LS138 |
| MBAB0 | U806 | 18 | LS240 |
| MBAB0 | U618 | 2 | LS244 |
| MBAB10 | U805 | 14 | LS240 |
| MBAB10 | U405 | 15 | LS244 |
| MBAB10 | U427 | 6 | LS244 |
| MBAB11 | U805 | 12 | LS240 |
| MBAB11 | U405 | 17 | LS244 |
| MBAB1 | U806 | 16 | LS240 |
| MBAB11 | U427 | 8 | LS244 |
| MBAB1 | U706 | 2 | LS138 |
| MBAB12 | U427 | 11 | LS244 |
| MBAB12 | U803 | 2 | PAL14L8 |
| MBAB12 | U805 | 9 | LS240 |
| MBAB13 | U427 | 13 | LS244 |
| MBAB13 | U803 | 3 | PAL14L8 |
| MBAB13 | U805 | 7 | LS240 |
| MBAB1 | U618 | 4 | LS244 |
| MBAB14 | U803 | 4 | PAL14L8 |
| MBAB14 | U805 | 5 | LS240 |
| MBAB15 | U805 | 3 | LS240 |
| MBAB15 | U803 | 5 | PAL14L8 |
| MBAB16 | U804 | 18 | LS240 |
| MBAB16 | U803 | 6 | PAL14L8 |
| MBAB17 | U804 | 16 | LS240 |
| MBAB17 | U803 | 7 | PAL14L8 |

| | | | |
|---|---|---|---|
| MBAB18 | U804 | 14 | LS240 |
| MBAB18 | U803 | 8 | PAL14L8 |
| MBAB19 | U804 | 12 | LS240 |
| MBAB19 | U803 | 9 | PAL14L8 |
| MBAB20 | U803 | 10 | PAL14L8 |
| MBAB20 | U804 | 9 | LS240 |
| MBAB21 | U803 | 11 | PAL14L8 |
| MBAB2 | U806 | 14 | LS240 |
| MBAB21 | U804 | 7 | LS240 |
| MBAB22 | U803 | 13 | PAL14L8 |
| MBAB22 | U804 | 5 | LS240 |
| MBAB2 | U706 | 3 | LS138 |
| MBAB2 | U618 | 6 | LS244 |
| MBAB3 | U806 | 12 | LS240 |
| MBAB3 | U706 | 4 | LS138 |
| MBAB3 | U618 | 8 | LS244 |
| MBAB4 | U618 | 11 | LS244 |
| MBAB4 | U806 | 9 | LS240 |
| MBAB5 | U618 | 13 | LS244 |
| MBAB5 | U806 | 7 | LS240 |
| MBAB6 | U618 | 15 | LS244 |
| MBAB6 | U705 | 2 | LS139 |
| MBAB6 | U806 | 5 | LS240 |
| MBAB7 | U618 | 17 | LS244 |
| MBAB7 | U705 | 3 | LS139 |
| MBAB8 | U405 | 11 | LS244 |
| MBAB8 | U705 | 14 | LS139 |
| MBAB8 | U805 | 18 | LS240 |
| MBAB8 | U427 | 2 | LS244 |
| MBAB9 | U705 | 13 | LS139 |
| MBAB9 | U805 | 16 | LS240 |
| MBAB9 | U427 | 4 | LS244 |
| MBDB0 | U808 | 18 | LS640 |
| MBDB0 | U703 | 2 | LS74 |
| MBDB0 | U824 | 22 | PAL20R8A |
| MBDB0 | U302 | 3 | LS273 |
| MBDB10 | U222 | 14 | LS244 |
| MBDB10 | U117 | 15 | LS244 |
| MBDB10 | U807 | 16 | LS640 |
| MBDB10 | U820 | 20 | PAL20R8A |
| MBDB10 | U424 | 5 | S244 |
| MBDB10 | U402 | 7 | LS273 |
| MBDB11 | U222 | 12 | LS244 |
| MBDB11 | U807 | 15 | LS640 |
| MBDB11 | U117 | 17 | LS244 |
| MBDB11 | U820 | 19 | PAL20R8A |
| MBDB1 | U703 | 12 | LS74 |
| MBDB11 | U424 | 3 | S244 |
| MBDB1 | U401 | 16 | LS244 |
| MBDB1 | U808 | 17 | LS640 |
| MBDB11 | U402 | 8 | LS273 |
| MBDB1 | U824 | 21 | PAL20R8A |
| MBDB12 | U402 | 13 | LS273 |
| MBDB12 | U807 | 14 | LS640 |
| MBDB12 | U820 | 18 | PAL20R8A |
| MBDB12 | U511 | 9 | S244 |
| MBDB13 | U807 | 13 | LS640 |
| MBDB13 | U402 | 14 | LS273 |
| MBDB13 | U820 | 17 | PAL20R8A |

| | | | |
|---|---|---|---|
| MBDB13 | U511 | 7 | S244 |
| MBDB1 | U302 | 4 | LS273 |
| MBDB14 | U807 | 12 | LS640 |
| MBDB14 | U820 | 16 | PAL20R8A |
| MBDB14 | U402 | 17 | LS273 |
| MBDB14 | U511 | 5 | S244 |
| MBDB15 | U807 | 11 | LS640 |
| MBDB15 | U820 | 15 | PAL20R8A |
| MBDB15 | U402 | 18 | LS273 |
| MBDB15 | U511 | 3 | S244 |
| MBDB2 | U401 | 14 | LS244 |
| MBDB2 | U808 | 16 | LS640 |
| MBDB2 | U824 | 20 | PAL20R8A |
| MBDB2 | U801 | 3 | LS273 |
| MBDB2 | U118 | 6 | LS244 |
| MBDB2 | U302 | 7 | LS273 |
| MBDB3 | U401 | 12 | LS244 |
| MBDB3 | U808 | 15 | LS640 |
| MBDB3 | U824 | 19 | PAL20R8A |
| MBDB3 | U801 | 4 | LS273 |
| MBDB3 | U302 | 8 | LS273 |
| MBDB4 | U302 | 13 | LS273 |
| MBDB4 | U808 | 14 | LS640 |
| MBDB4 | U824 | 18 | PAL20R8A |
| MBDB4 | U117 | 2 | LS244 |
| MBDB4 | U801 | 7 | LS273 |
| MBDB4 | U401 | 9 | LS244 |
| MBDB5 | U808 | 13 | LS640 |
| MBDB5 | U302 | 14 | LS273 |
| MBDB5 | U824 | 17 | PAL20R8A |
| MBDB5 | U117 | 4 | LS244 |
| MBDB5 | U401 | 7 | LS244 |
| MBDB5 | U801 | 8 | LS273 |
| MBDB6 | U808 | 12 | LS640 |
| MBDB6 | U801 | 13 | LS273 |
| MBDB6 | U824 | 16 | PAL20R8A |
| MBDB6 | U302 | 17 | LS273 |
| MBDB6 | U401 | 5 | LS244 |
| MBDB6 | U117 | 6 | LS244 |
| MBDB7 | U808 | 11 | LS640 |
| MBDB7 | U801 | 14 | LS273 |
| MBDB7 | U824 | 15 | PAL20R8A |
| MBDB7 | U302 | 18 | LS273 |
| MBDB7 | U401 | 3 | LS244 |
| MBDB7 | U117 | 8 | LS244 |
| MBDB8 | U117 | 11 | LS244 |
| MBDB8 | U801 | 17 | LS273 |
| MBDB8 | U807 | 18 | LS640 |
| MBDB8 | U820 | 22 | PAL20R8A |
| MBDB8 | U402 | 3 | LS273 |
| MBDB8 | U424 | 9 | S244 |
| MBDB9 | U117 | 13 | LS244 |
| MBDB9 | U222 | 16 | LS244 |
| MBDB9 | U807 | 17 | LS640 |
| MBDB9 | U801 | 18 | LS273 |
| MBDB9 | U820 | 21 | PAL20R8A |
| MBDB9 | U402 | 4 | LS273 |
| MBDB9 | U424 | 7 | S244 |
| MRDC | U803 | 14 | PAL14L8 |

| | | | |
|---|---|---|---|
| MRDC | U802 | 18 | LS240 |
| MRDC~ | U802 | 2 | LS240 |
| MRD~ | U808 | 1 | LS640 |
| MRD~ | U505 | 12 | LS32 |
| MRD~ | U803 | 15 | PAL14L8 |
| MRD~ | U505 | 9 | LS32 |
| MWR~ | U505 | 1 | LS32 |
| MWR~ | U604 | 12 | F10 |
| MWR~ | U504 | 13 | LS27 |
| MWR~ | U504 | 5 | LS27 |
| MWTC | U604 | 13 | F10 |
| MWTC | U802 | 16 | LS240 |
| MWTC | U803 | 23 | PAL14L8 |
| MWTC~ | U802 | 4 | LS240 |
| NG | U307 | 12 | F374 |
| NG | U812 | 14 | F251 |
| NO_DEST_0~ | U413 | 15 | S138 |
| NO_DEST_0~ | U809 | 2 | F86 |
| OB0~ | U826 | 18 | F240 |
| OB0~ | U823 | 2 | LS240 |
| OB10~ | U317 | 15 | LS240 |
| OB10~ | U827 | 5 | F240 |
| OB11~ | U317 | 17 | LS240 |
| OB11~ | U827 | 3 | F240 |
| OB1~ | U826 | 16 | F240 |
| OB1~ | U823 | 4 | LS240 |
| OB2~ | U826 | 14 | F240 |
| OB2~ | U823 | 6 | LS240 |
| OB3~ | U826 | 12 | F240 |
| OB3~ | U823 | 8 | LS240 |
| OB4~ | U823 | 11 | LS240 |
| OB4~ | U826 | 9 | F240 |
| OB5~ | U823 | 13 | LS240 |
| OB5~ | U826 | 7 | F240 |
| OB6~ | U823 | 15 | LS240 |
| OB6~ | U826 | 5 | F240 |
| OB7~ | U823 | 17 | LS240 |
| OB7~ | U826 | 3 | F240 |
| OB8~ | U317 | 11 | LS240 |
| OB8~ | U827 | 9 | F240 |
| OB9~ | U317 | 13 | LS240 |
| OB9~ | U827 | 7 | F240 |
| OB_EOL~ | U825 | 12 | F244 |
| OB_EOL~ | U401 | 8 | LS244 |
| OB_RDY~ | R900 | 1 | RES 330 |
| OB_RDY~ | U620 | 8 | S244 |
| OB_READY~ | U620 | 12 | S244 |
| OB_READY~ | U303 | 13 | PAL20L8A |
| OB_SI~ | U825 | 18 | F244 |
| OB_SI~ | U226 | 2 | S244 |
| OF_IR0~ | U620 | 18 | S244 |
| OF_IR0~ | U303 | 9 | PAL20L8A |
| OF_IR1~ | U303 | 10 | PAL20L8A |
| OF_IR1~ | U620 | 16 | S244 |
| OF_IR2~ | U303 | 11 | PAL20L8A |
| OF_IR2~ | U620 | 14 | S244 |
| OF_SI0~ | U825 | 11 | F244 |
| OF_SI0~ | U124 | 12 | F139 |
| OF_SI1~ | U124 | 11 | F139 |

| | | | |
|---|---|---|---|
| OF_SI1~ | U825 | 13 | F244 |
| OF_SI2~ | U124 | 10 | F139 |
| OF_SI2~ | U825 | 15 | F244 |
| OF_SI~ | U124 | 15 | F139 |
| OF_SI~ | U825 | 2 | F244 |
| OF_SI~ | U123 | 4 | S151 |
| OF_SI~ | U512 | 6 | S112 |
| OUTFIFO_ACK~ | U303 | 23 | PAL20L8A |
| OUTFIFO_ACK~ | U707 | 4 | LS153 |
| OUTFIFO_ACK~ | U607 | 5 | F74 |
| OUTFIFO_SEL~ | U705 | 10 | LS139 |
| OUTFIFO_SEL~ | U505 | 13 | LS32 |
| OUTFIFO_SI | U307 | 18 | F374 |
| OUTFIFO_SI | U607 | 3 | F74 |
| OUTFIFO_SI | U123 | 6 | S151 |
| OUTFIFO_SI_C | U307 | 19 | F374 |
| OUTFIFO_SI_C | U811 | 2 | F251 |
| OUTPUT_WAIT | U514 | 1 | F32 |
| OUTPUT_WAIT | U813 | 4 | S374 |
| OUTPUT_WAIT | U506 | 6 | F08 |
| OUTPUT_WAIT_RE | U508 | 13 | F04 |
| OUTPUT_WAIT_RE | U303 | 17 | PAL20L8A |
| OUTPUT_WAIT_RE | U426 | 6 | S273 |
| OUTPUT_WAIT_RE | U426 | 8 | S273 |
| OUTR0 | U525 | 12 | S377 |
| OUTR0 | U826 | 2 | F240 |
| OUTR10 | U827 | 15 | F240 |
| OUTR10 | U828 | 16 | S377 |
| OUTR11 | U827 | 17 | F240 |
| OUTR11 | U828 | 19 | S377 |
| OUTR1 | U525 | 15 | S377 |
| OUTR1 | U826 | 4 | F240 |
| OUTR2 | U525 | 16 | S377 |
| OUTR2 | U826 | 6 | F240 |
| OUTR3 | U525 | 19 | S377 |
| OUTR3 | U826 | 8 | F240 |
| OUTR4 | U826 | 11 | F240 |
| OUTR4 | U828 | 2 | S377 |
| OUTR5 | U826 | 13 | F240 |
| OUTR5 | U828 | 5 | S377 |
| OUTR6 | U826 | 15 | F240 |
| OUTR6 | U828 | 6 | S377 |
| OUTR7 | U826 | 17 | F240 |
| OUTR7 | U828 | 9 | S377 |
| OUTR8 | U827 | 11 | F240 |
| OUTR8 | U828 | 12 | S377 |
| OUTR9 | U827 | 13 | F240 |
| OUTR9 | U828 | 15 | S377 |
| P0 | U314 | 15 | S181 |
| P0 | U320 | 4 | F182 |
| INIT~ | | P1-16 | CONNECTOR |
| IB2~ | | P1-21 | CONNECTOR |
| MRDC~ | | P1-23 | CONNECTOR |
| MWTC~ | | P1-24 | CONNECTOR |
| XACK~ | | P1-27 | CONNECTOR |
| IB6~ | | P1-31 | CONNECTOR |
| AD10~ | | P1-34 | CONNECTOR |
| AD11~ | | P1-36 | CONNECTOR |
| CCLK~ | | P1-37 | CONNECTOR |

| | | | |
|---|---|---|---|
| AD12~ | | P1-38 | CONNECTOR |
| AD13~ | | P1-40 | CONNECTOR |
| IB7~ | | P1-41 | CONNECTOR |
| IB8~ | | P1-51 | CONNECTOR |
| ADRE~ | | P1-53 | CONNECTOR |
| ADRF~ | | P1-54 | CONNECTOR |
| ADRC~ | | P1-55 | CONNECTOR |
| ADRD~ | | P1-56 | CONNECTOR |
| ADRA~ | | P1-57 | CONNECTOR |
| ADRB~ | | P1-58 | CONNECTOR |
| ADR8~ | | P1-59 | CONNECTOR |
| ADR9~ | | P1-60 | CONNECTOR |
| IB_EOL~ | | P1-61 | CONNECTOR |
| ADR6~ | | P1-63 | CONNECTOR |
| ADR7~ | | P1-64 | CONNECTOR |
| ADR4~ | | P1-65 | CONNECTOR |
| ADR5~ | | P1-66 | CONNECTOR |
| ADR2~ | | P1-67 | CONNECTOR |
| ADR3~ | | P1-68 | CONNECTOR |
| ADR1~ | | P1-70 | CONNECTOR |
| OB_EOL~ | | P1-71 | CONNECTOR |
| DATE~ | | P1-73 | CONNECTOR |
| DATF~ | | P1-74 | CONNECTOR |
| DATC~ | | P1-75 | CONNECTOR |
| DATD~ | | P1-76 | CONNECTOR |
| DATA~ | | P1-77 | CONNECTOR |
| DATB~ | | P1-78 | CONNECTOR |
| DAT8~ | | P1-79 | CONNECTOR |
| DAT9~ | | P1-80 | CONNECTOR |
| LINE_REQ~ | | P1-81 | CONNECTOR |
| DAT6~ | | P1-83 | CONNECTOR |
| DAT7~ | | P1-84 | CONNECTOR |
| DAT4~ | | P1-85 | CONNECTOR |
| DAT5~ | | P1-86 | CONNECTOR |
| DAT2~ | | P1-87 | CONNECTOR |
| DAT3~ | | P1-88 | CONNECTOR |
| DAT0~ | | P1-89 | CONNECTOR |
| DAT1~ | | P1-90 | CONNECTOR |
| OB_RDY~ | | P1-91 | CONNECTOR |
| P1 | U316 | 15 | S181 |
| P1 | U320 | 2 | F182 |
| IB0~ | | P2-1 | CONNECTOR |
| IB5~ | | P2-100 | CONNECTOR |
| IB10~ | | P2-11 | CONNECTOR |
| IB11~ | | P2-13 | CONNECTOR |
| IB9~ | | P2-14 | CONNECTOR |
| IB_SI0~ | | P2-15 | CONNECTOR |
| IB_SI1~ | | P2-17 | CONNECTOR |
| IB_SI2~ | | P2-19 | CONNECTOR |
| IBI~ | | P2-21 | CONNECTOR |
| IB_IR0~ | | P2-23 | CONNECTOR |
| IB_IR1~ | | P2-25 | CONNECTOR |
| IB_IR2~ | | P2-27 | CONNECTOR |
| INT~ | | P2-29 | CONNECTOR |
| DO0~ | | P2-30 | CONNECTOR |
| DO1~ | | P2-34 | CONNECTOR |
| DO2~ | | P2-36 | CONNECTOR |
| DO3~ | | P2-38 | CONNECTOR |
| DO4~ | | P2-40 | CONNECTOR |
| DO5~ | | P2-44 | CONNECTOR |

| | | | |
|---|---|---|---|
| DO6~ | | P2-46 | CONNECTOR |
| DO7~ | | P2-48 | CONNECTOR |
| IR_IN0~ | | P2-54 | CONNECTOR |
| IR_IN1~ | | P2-56 | CONNECTOR |
| IR_IN2~ | | P2-58 | CONNECTOR |
| SI_OUT0~ | | P2-64 | CONNECTOR |
| SI_OUT1~ | | P2-66 | CONNECTOR |
| SI_OUT2~ | | P2-68 | CONNECTOR |
| EOL_OUT~ | | P2-74 | CONNECTOR |
| AD17~ | | P2-76 | CONNECTOR |
| AD15~ | | P2-78 | CONNECTOR |
| AD16~ | | P2-81 | CONNECTOR |
| AD14~ | | P2-83 | CONNECTOR |
| OB1~ | | P2-84 | CONNECTOR |
| OB0~ | | P2-85 | CONNECTOR |
| OB3~ | | P2-86 | CONNECTOR |
| OB2~ | | P2-87 | CONNECTOR |
| OB5~ | | P2-88 | CONNECTOR |
| OB4~ | | P2-89 | CONNECTOR |
| OB7~ | | P2-90 | CONNECTOR |
| OB6~ | | P2-91 | CONNECTOR |
| OB8~ | | P2-93 | CONNECTOR |
| OB9~ | | P2-94 | CONNECTOR |
| OB10~ | | P2-95 | CONNECTOR |
| OB11~ | | P2-96 | CONNECTOR |
| OB_SI~ | | P2-97 | CONNECTOR |
| IB4~ | | P2-98 | CONNECTOR |
| IB3~ | | P2-99 | CONNECTOR |
| P2 | U320 | 15 | F182 |
| P3 | U312 | 15 | S181 |
| P3 | U320 | 6 | F182 |
| PLR0 | U615 | 2 | F374 |
| PLR0 | U619 | 23 | PAL20R8A |
| PLR0 | U606 | 7 | PAL20L8A |
| PLR10 | U406 | 11 | PAL20L8A |
| PLR10 | U518 | 12 | LS173 |
| PLR10 | U316 | 4 | S181 |
| PLR10 | U614 | 6 | F374 |
| PLR11 | U518 | 11 | LS173 |
| PLR11 | U406 | 13 | PAL20L8A |
| PLR11 | U316 | 3 | S181 |
| PLR11 | U408 | 8 | LS244 |
| PLR11 | U614 | 9 | F374 |
| PLR1 | U619 | 2 | PAL20R8A |
| PLR12 | U508 | 1 | F04 |
| PLR12 | U421 | 10 | PAL20R8A |
| PLR12 | U619 | 11 | PAL20R8A |
| PLR12 | U614 | 12 | F374 |
| PLR12 | U620 | 13 | S244 |
| PLR12 | U406 | 23 | PAL20L8A |
| PLR12BF | U518 | 10 | LS173 |
| PLR12BF | U304 | 17 | ALS569 |
| PLR12BF | U620 | 7 | S244 |
| PLR13 | U708 | 1 | S138 |
| PLR13 | U811 | 11 | F251 |
| PLR13 | U408 | 13 | LS244 |
| PLR13 | U614 | 15 | F374 |
| PLR1 | U605 | 4 | S244 |
| PLR14 | U811 | 10 | F251 |

| | | | |
|---|---|---|---|
| PLR14 | U408 | 15 | LS244 |
| PLR14 | U614 | 16 | F374 |
| PLR14 | U708 | 2 | S138 |
| PLR1 | U615 | 5 | F374 |
| PLR15 | U408 | 17 | LS244 |
| PLR15 | U614 | 19 | F374 |
| PLR15 | U708 | 3 | S138 |
| PLR15 | U811 | 9 | F251 |
| PLR16 | U413 | 1 | S138 |
| PLR16 | U612 | 2 | F374 |
| PLR17 | U413 | 2 | S138 |
| PLR17 | U301 | 4 | LS244 |
| PLR17 | U612 | 5 | F374 |
| PLR1 | U606 | 8 | PAL20L8A |
| PLR18 | U413 | 3 | S138 |
| PLR18 | U612 | 6 | F374 |
| PLR19 | U413 | 4 | S138 |
| PLR19 | U301 | 8 | LS244 |
| PLR19 | U612 | 9 | F374 |
| PLR20 | U301 | 11 | LS244 |
| PLR20 | U612 | 12 | F374 |
| PLR20 | U610 | 2 | F08 |
| PLR21 | U301 | 13 | LS244 |
| PLR21 | U612 | 15 | F374 |
| PLR21 | U610 | 5 | F08 |
| PLR22 | U610 | 10 | F08 |
| PLR22 | U301 | 15 | LS244 |
| PLR22 | U612 | 16 | F374 |
| PLR2 | U619 | 3 | PAL20R8A |
| PLR23 | U610 | 13 | F08 |
| PLR23 | U301 | 17 | LS244 |
| PLR23 | U612 | 19 | F374 |
| PLR24 | U620 | 15 | S244 |
| PLR24 | U609 | 2 | F374 |
| PLR25 | U410 | 4 | LS244 |
| PLR25 | U609 | 5 | F374 |
| PLR2 | U615 | 6 | F374 |
| PLR26 | U124 | 2 | F139 |
| PLR26 | U322 | 3 | S374 |
| PLR26 | U609 | 6 | F374 |
| PLR27 | U124 | 3 | F139 |
| PLR27 | U322 | 4 | S374 |
| PLR27 | U410 | 8 | LS244 |
| PLR27 | U609 | 9 | F374 |
| PLR28 | U410 | 11 | LS244 |
| PLR28 | U609 | 12 | F374 |
| PLR28 | U424 | 8 | S244 |
| PLR2 | U606 | 9 | PAL20L8A |
| PLR29 | U410 | 13 | LS244 |
| PLR29 | U609 | 15 | F374 |
| PLR30 | U410 | 15 | LS244 |
| PLR30 | U609 | 16 | F374 |
| PLR3 | U606 | 10 | PAL20L8A |
| PLR31 | U410 | 17 | LS244 |
| PLR31 | U609 | 19 | F374 |
| PLR3 | U619 | 4 | PAL20R8A |
| PLR3 | U605 | 8 | S244 |
| PLR3 | U615 | 9 | F374 |
| PLR4 | U606 | 11 | PAL20L8A |
| PLR4 | U615 | 12 | F374 |

| | | | |
|---|---|---|---|
| PLR4 | U619 | 5 | PAL20R8A |
| PLR5 | U606 | 13 | PAL20L8A |
| PLR5 | U615 | 15 | F374 |
| PLR5 | U619 | 6 | PAL20R8A |
| PLR6 | U320 | 13 | F182 |
| PLR6 | U616 | 15 | LS244 |
| PLR6 | U615 | 16 | F374 |
| PLR6 | U406 | 7 | PAL20L8A |
| PLR7 | U616 | 17 | LS244 |
| PLR7 | U615 | 19 | F374 |
| PLR7 | U406 | 8 | PAL20L8A |
| PLR8 | U518 | 14 | LS173 |
| PLR8 | U614 | 2 | F374 |
| PLR8 | U316 | 6 | S181 |
| PLR8 | U406 | 9 | PAL20L8A |
| PLR9 | U406 | 10 | PAL20L8A |
| PLR9 | U518 | 13 | LS173 |
| PLR9 | U408 | 4 | LS244 |
| PLR9 | U614 | 5 | F374 |
| PRIM_CK | U503 | 10 | S32 |
| PRIM_CK | U513 | 11 | F74 |
| PRIM_CK | U506 | 12 | F08 |
| PRIM_CK | U512 | 13 | S112 |
| PRIM_CK | U309 | 3 | F74 |
| PRIM_CK | U404 | 4 | F00 |
| PRIM_CK | U515 | 9 | F74 |
| PRIM_CLK | U601 | 8 | LS164 |
| PSEUDO_WAIT | U514 | 2 | F32 |
| PSEUDO_WAIT | U613 | 4 | F02 |
| SEQ_I0 | U608 | 12 | 2910A |
| SEQ_I0 | U610 | 3 | F08 |
| SEQ_I1 | U608 | 11 | 2910A |
| SEQ_I1 | U610 | 6 | F08 |
| SEQ_I2 | U610 | 8 | F08 |
| SEQ_I2 | U608 | 9 | 2910A |
| SEQ_I3 | U610 | 11 | F08 |
| SEQ_I3 | U608 | 8 | 2910A |
| SEQ_IN0 | U606 | 22 | PAL20L8A |
| SEQ_IN0 | U608 | 34 | 2910A |
| SEQ_IN10 | U406 | 17 | PAL20L8A |
| SEQ_IN10 | U608 | 25 | 2910A |
| SEQ_IN11 | U406 | 15 | PAL20L8A |
| SEQ_IN11 | U608 | 27 | 2910A |
| SEQ_IN1 | U606 | 20 | PAL20L8A |
| SEQ_IN1 | U608 | 36 | 2910A |
| SEQ_IN2 | U606 | 19 | PAL20L8A |
| SEQ_IN2 | U608 | 38 | 2910A |
| SEQ_IN3 | U606 | 18 | PAL20L8A |
| SEQ_IN3 | U608 | 40 | 2910A |
| SEQ_IN4 | U606 | 17 | PAL20L8A |
| SEQ_IN4 | U608 | 2 | 2910A |
| SEQ_IN5 | U606 | 15 | PAL20L8A |
| SEQ_IN5 | U608 | 4 | 2910A |
| SEQ_IN6 | U608 | 17 | 2910A |
| SEQ_IN6 | U406 | 22 | PAL20L8A |
| SEQ_IN7 | U608 | 19 | 2910A |
| SEQ_IN7 | U406 | 20 | PAL20L8A |
| SEQ_IN8 | U406 | 19 | PAL20L8A |
| SEQ_IN8 | U608 | 21 | 2910A |

| | | | |
|---|---|---|---|
| SEQ_IN9 | U406 | 18 | PAL20L8A |
| SEQ_IN9 | U608 | 23 | 2910A |
| SHIFT_SEL0 | U228 | 12 | LS377 |
| SHIFT_SEL0 | U523 | 21 | PAL20R4 |
| SHIFT_SEL1 | U228 | 15 | LS377 |
| SHIFT_SEL1 | U523 | 22 | PAL20R4 |
| SHIFT_SEL2 | U523 | 11 | PAL20R4 |
| SHIFT_SEL2 | U228 | 16 | LS377 |
| SHIFT_SEL2 | U323 | 18 | PAL14L4 |
| SHIFT_SEL3 | U523 | 14 | PAL20R4 |
| SHIFT_SEL3 | U228 | 19 | LS377 |
| SI_OUT0~ | U226 | 8 | S244 |
| SI_OUT0~ | U825 | 9 | F244 |
| SI_OUT1~ | U226 | 11 | S244 |
| SI_OUT1~ | U825 | 7 | F244 |
| SI_OUT2~ | U226 | 13 | S244 |
| SI_OUT2~ | U825 | 5 | F244 |
| SND_PXL_TO_LUT | U413 | 12 | S138 |
| SND_PXL_TO_LUT | U418 | 13 | LS04 |
| SO_10 | U229 | 17 | PAL14L4 |
| SO_10 | U526 | 23 | PAL20R4 |
| SO_10 | U524 | 5 | PAL20R4 |
| SO_10 | U523 | 9 | PAL20R4 |
| SO_11 | U523 | 10 | PAL20R4 |
| SO_11 | U229 | 16 | PAL14L4 |
| SO_11 | U526 | 2 | PAL20R4 |
| SO_11 | U524 | 6 | PAL20R4 |
| SO_12 | U229 | 15 | PAL14L4 |
| SO_12 | U526 | 3 | PAL20R4 |
| SO_12 | U524 | 7 | PAL20R4 |
| SO_13 | U229 | 14 | PAL14L4 |
| SO_13 | U526 | 4 | PAL20R4 |
| SO_13 | U524 | 8 | PAL20R4 |
| SO_2 | U321 | 17 | PAL14L4 |
| SO_2 | U523 | 23 | PAL20R4 |
| SO_3 | U321 | 16 | PAL14L4 |
| SO_3 | U523 | 2 | PAL20R4 |
| SO_4 | U321 | 15 | PAL14L4 |
| SO_4 | U523 | 3 | PAL20R4 |
| SO_5 | U321 | 14 | PAL14L4 |
| SO_5 | U523 | 4 | PAL20R4 |
| SO_6 | U323 | 17 | PAL14L4 |
| SO_6 | U524 | 23 | PAL20R4 |
| SO_6 | U523 | 5 | PAL20R4 |
| SO_7 | U323 | 16 | PAL14L4 |
| SO_7 | U524 | 2 | PAL20R4 |
| SO_7 | U523 | 6 | PAL20R4 |
| SO_8 | U323 | 15 | PAL14L4 |
| SO_8 | U524 | 3 | PAL20R4 |
| SO_8 | U523 | 7 | PAL20R4 |
| SO_9 | U323 | 14 | PAL14L4 |
| SO_9 | U524 | 4 | PAL20R4 |
| SO_9 | U523 | 8 | PAL20R4 |
| SPTL_DLYD1 | U418 | 11 | LS04 |
| SPTL_DLYD1 | U426 | 2 | S273 |
| SPTL_DLYD1 | U426 | 4 | S273 |

| | | | |
|---|---|---|---|
| SPTL_DLYD1~ | U324 | 10 | LS173 |
| SPTL_DLYD1~ | U523 | 15 | PAL20R4 |
| SPTL_DLYD1~ | U324 | 9 | LS173 |
| SPTL_DLYD2 | U426 | 5 | S273 |
| SPTL_DLYD2 | U426 | 7 | S273 |
| SRC_B_ACR~ | U412 | 1 | LS173 |
| SRC_B_ACR~ | U404 | 10 | F00 |
| SRC_B_ACR~ | U708 | 12 | S138 |
| SRC_B_ACR~ | U415 | 13 | PAL20R8A |
| SRC_B_ACR~ | U412 | 2 | LS173 |
| SRC_B_ACR~ | U404 | 9 | F00 |
| SRC_B_IMDT_REG | U518 | 1 | LS173 |
| SRC_B_IMDT_REG | U619 | 13 | PAL20R8A |
| SRC_B_IMDT_REG | U708 | 15 | S138 |
| SRC_B_IMDT_REG | U518 | 2 | LS173 |
| SRC_B_IN_FIFO~ | U420 | 1 | S374 |
| SRC_B_IN_FIFO~ | U308 | 10 | F32 |
| SRC_B_IN_FIFO~ | U503 | 5 | S32 |
| SRC_B_IN_FIFO~ | U708 | 7 | S138 |
| SRC_B_MAX_REG~ | U617 | 1 | S244 |
| SRC_B_MAX_REG~ | U708 | 13 | S138 |
| SRC_B_MAX_REG~ | U617 | 19 | S244 |
| SRC_B_SAT_CNTR | U708 | 14 | S138 |
| SRC_B_SAT_CNTR | U521 | 17 | ALS569 |
| SR_0 | U321 | 1 | PAL14L4 |
| SR_0 | U322 | 12 | S374 |
| SR_10 | U227 | 16 | F374 |
| SR_10 | U229 | 3 | PAL14L4 |
| SR_11 | U227 | 19 | F374 |
| SR_11 | U229 | 4 | PAL14L4 |
| SR_1 | U322 | 15 | S374 |
| SR_1 | U321 | 2 | PAL14L4 |
| SR_12 | U126 | 2 | F374 |
| SR_12 | U229 | 5 | PAL14L4 |
| SR_13 | U126 | 5 | F374 |
| SR_13 | U229 | 6 | PAL14L4 |
| SR_14 | U526 | 5 | PAL20R4 |
| SR_14 | U126 | 6 | F374 |
| SR_14 | U524 | 9 | PAL20R4 |
| SR_15 | U524 | 10 | PAL20R4 |
| SR_15 | U526 | 6 | PAL20R4 |
| SR_15 | U126 | 9 | F374 |
| SR_16 | U126 | 12 | F374 |
| SR_16 | U526 | 7 | PAL20R4 |
| SR_17 | U126 | 15 | F374 |
| SR_17 | U526 | 8 | PAL20R4 |
| SR_18 | U126 | 16 | F374 |
| SR_18 | U526 | 9 | PAL20R4 |
| SR_19 | U526 | 10 | PAL20R4 |
| SR_19 | U126 | 19 | F374 |
| SR_2 | U322 | 16 | S374 |
| SR_2 | U321 | 3 | PAL14L4 |
| SR_3 | U322 | 19 | S374 |
| W_A11 | U405 | 3 | LS244 |
| W_A1 | U618 | 16 | LS244 |
| W_A1 | U717 | 17 | IMS1421 |
| W_A11 | U717 | 8 | IMS1421 |
| W_A1 | U608 | 35 | 2910A |
| W_A2 | U618 | 14 | LS244 |

| | | | |
|---|---|---|---|
| W_A2 | U717 | 18 | IMS1421 |
| W_A2 | U608 | 37 | 2910A |
| W_A3 | U618 | 12 | LS244 |
| W_A3 | U717 | 19 | IMS1421 |
| W_A3 | U608 | 39 | 2910A |
| W_A4 | U717 | 1 | IMS1421 |
| W_A4 | U618 | 9 | LS244 |
| W_A5 | U717 | 2 | IMS1421 |
| W_A5 | U608 | 3 | 2910A |
| W_A5 | U618 | 7 | LS244 |
| W_A6 | U608 | 18 | 2910A |
| W_A6 | U717 | 3 | IMS1421 |
| W_A6 | U618 | 5 | LS244 |
| W_A7 | U608 | 20 | 2910A |
| W_A7 | U618 | 3 | LS244 |
| W_A7 | U717 | 4 | IMS1421 |
| W_A8 | U608 | 22 | 2910A |
| W_A8 | U717 | 5 | IMS1421 |
| W_A8 | U405 | 9 | LS244 |
| W_A9 | U608 | 24 | 2910A |
| W_A9 | U717 | 6 | IMS1421 |
| W_A9 | U405 | 7 | LS244 |
| W_D0 | U717 | 15 | IMS1421 |
| W_D0 | U817 | 2 | LS245 |
| W_D0 | U615 | 3 | F374 |
| W_D10 | U715 | 13 | IMS1421 |
| W_D10 | U816 | 4 | LS245 |
| W_D10 | U614 | 7 | F374 |
| W_D11 | U715 | 12 | IMS1421 |
| W_D1 | U717 | 14 | IMS1421 |
| W_D11 | U816 | 5 | LS245 |
| W_D11 | U614 | 8 | F374 |
| W_D12 | U614 | 13 | F374 |
| W_D12 | U714 | 15 | IMS1421 |
| W_D12 | U816 | 6 | LS245 |
| W_D1 | U817 | 3 | LS245 |
| W_D13 | U611 | 1 | F11 |
| W_D13 | U714 | 14 | IMS1421 |
| W_D13 | U816 | 7 | LS245 |
| W_D1 | U615 | 4 | F374 |
| W_D14 | U714 | 13 | IMS1421 |
| W_D14 | U614 | 17 | F374 |
| W_D14 | U611 | 2 | F11 |
| W_D14 | U816 | 8 | LS245 |
| W_D15 | U714 | 12 | IMS1421 |
| W_D15 | U611 | 13 | F11 |
| W_D15 | U614 | 18 | F374 |
| W_D15 | U816 | 9 | LS245 |
| W_D16 | U713 | 15 | IMS1421 |
| W_D16 | U814 | 2 | LS245 |
| W_D16 | U612 | 3 | F374 |
| W_D17 | U713 | 14 | IMS1421 |
| W_D17 | U814 | 3 | LS245 |
| W_D17 | U612 | 4 | F374 |
| W_D18 | U713 | 13 | IMS1421 |
| W_D18 | U814 | 4 | LS245 |
| W_D18 | U612 | 7 | F374 |
| W_D19 | U713 | 12 | IMS1421 |
| W_D19 | U814 | 5 | LS245 |
| W_D19 | U612 | 8 | F374 |

| | | | |
|---|---|---|---|
| W_D20 | U612 | 13 | F374 |
| W_D20 | U712 | 15 | IMS1421 |
| W_D20 | U814 | 6 | LS245 |
| W_D21 | U712 | 14 | IMS1421 |
| W_D2 | U717 | 13 | IMS1421 |
| W_D21 | U814 | 7 | LS245 |
| W_D22 | U712 | 13 | IMS1421 |
| W_D22 | U612 | 17 | F374 |
| W_D22 | U814 | 8 | LS245 |
| W_D23 | U712 | 12 | IMS1421 |
| W_D23 | U612 | 18 | F374 |
| W_D23 | U814 | 9 | LS245 |
| W_D2 | U817 | 4 | LS245 |
| W_D24 | U710 | 15 | IMS1421 |
| W_D24 | U810 | 2 | LS245 |
| W_D24 | U609 | 3 | F374 |
| W_D25 | U407 | 13 | F374 |
| W_D25 | U710 | 14 | IMS1421 |
| W_D25 | U810 | 3 | LS245 |
| W_D25 | U609 | 4 | F374 |
| W_D26 | U710 | 13 | IMS1421 |
| W_D26 | U508 | 3 | F04 |
| W_D26 | U810 | 4 | LS245 |
| W_D26 | U609 | 7 | F374 |
| W_D2 | U615 | 7 | F374 |
| W_D27 | U710 | 12 | IMS1421 |
| W_D27 | U810 | 5 | LS245 |
| W_D27 | U407 | 7 | F374 |
| W_D27 | U609 | 8 | F374 |
| W_D28 | U609 | 13 | F374 |
| W_D28 | U709 | 15 | IMS1421 |
| W_D28 | U810 | 6 | LS245 |
| W_D29 | U709 | 14 | IMS1421 |
| W_D29 | U810 | 7 | LS245 |
| W_D30 | U709 | 13 | IMS1421 |
| W_D30 | U609 | 17 | F374 |
| W_D30 | U810 | 8 | LS245 |
| W_D31 | U709 | 12 | IMS1421 |
| W_D31 | U609 | 18 | F374 |
| W_D3 | U717 | 12 | IMS1421 |
| W_D31 | U810 | 9 | LS245 |
| W_D3 | U817 | 5 | LS245 |
| W_D3 | U615 | 8 | F374 |
| W_D4 | U615 | 13 | F374 |
| W_D4 | U716 | 15 | IMS1421 |
| W_D4 | U817 | 6 | LS245 |
| W_D5 | U716 | 14 | IMS1421 |
| W_D5 | U817 | 7 | LS245 |
| W_D6 | U716 | 13 | IMS1421 |
| W_D6 | U615 | 17 | F374 |
| W_D6 | U817 | 8 | LS245 |
| W_D7 | U716 | 12 | IMS1421 |
| W_D7 | U615 | 18 | F374 |
| W_D7 | U817 | 9 | LS245 |
| W_D8 | U715 | 15 | IMS1421 |
| W_D8 | U816 | 2 | LS245 |
| W_D8 | U614 | 3 | F374 |
| W_D9 | U715 | 14 | IMS1421 |
| W_D9 | U816 | 3 | LS245 |

| | | | |
|---|---|---|---|
| W~D9 | U614 | 4 | F374 |
| XACK~ | R801 | 1 | RES 10K |
| XACK~ | U802 | 3 | LS240 |
| 0:XSIG269 | U722 | 11 | LS240 |
| 0:XSIG269 | U722 | 2 | LS240 |
| 0:XSIG269 | U317 | 6 | S11 |
| 0:XSIG270 | U722 | 13 | LS240 |
| 0:XSIG270 | U722 | 4 | LS240 |
| 0:XSIG270 | U317 | 8 | S11 |
| 0:XSIG271 | U722 | 15 | LS240 |
| 0:XSIG271 | U123 | 3 | S08 |
| 0:XSIG271 | U722 | 6 | LS240 |
| 0:XSIG712 | U724 | 12 | LS240 |
| 0:XSIG712 | U621 | 2 | LS240 |
| 0:XSIG712 | U725 | 3 | S240 |
| 10:XSIG131 | U515 | 15 | S240 |
| 10:XSIG131 | U615 | 8 | S08 |
| 10:XSIG135 | U114 | 13 | S138 |
| 10:XSIG135 | U115 | 3 | F374 |
| 10:XSIG136 | U114 | 10 | S138 |
| 10:XSIG136 | U115 | 7 | F374 |
| 10:XSIG138 | U115 | 8 | F374 |
| 10:XSIG138 | U114 | 9 | S138 |
| 10:XSIG171 | U114 | 11 | S138 |
| 10:XSIG171 | U115 | 4 | F374 |
| 10:XSIG172 | U617 | 12 | S74 |
| 10:XSIG172 | U617 | 8 | S74 |
| 10:XSIG209 | U115 | 14 | F374 |
| 10:XSIG209 | U113 | 8 | S32 |
| 10:XSIG217 | U519 | 12 | S04 |
| 10:XSIG217 | U513 | 9 | LS175 |
| 10:XSIG228 | U702 | 5 | S74 |
| 10:XSIG228 | U615 | 9 | S08 |
| 10:XSIG230 | U702 | 2 | S74 |
| 10:XSIG230 | U702 | 6 | S74 |
| 10:XSIG57 | U615 | 10 | S08 |
| 10:XSIG57 | U617 | 9 | S74 |
| 11:XSIG188 | U322 | 14 | S139 |
| 11:XSIG188 | U419 | 2 | LS273 |
| 11:XSIG189 | U322 | 13 | S139 |
| 11:XSIG189 | U419 | 5 | LS273 |
| 11:XSIG211 | U217 | 2 | LS273 |
| 11:XSIG211 | U719 | 4 | LS240 |
| 11:XSIG212 | U217 | 5 | LS273 |
| 11:XSIG212 | U719 | 6 | LS240 |
| 11:XSIG231 | U621 | 6 | LS240 |
| 11:XSIG231 | U715 | 9 | LS138 |
| 11:XSIG266 | U703 | 11 | LS244 |
| 11:XSIG266 | U703 | 13 | LS244 |
| 11:XSIG266 | U703 | 15 | LS244 |
| 11:XSIG266 | U704 | 7 | LS138 |
| 11:XSIG321 | U714 | 13 | LS164 |
| 11:XSIG329 | U614 | 13 | LS125 |
| 11:XSIG329 | U621 | 7 | LS240 |
| 11:XSIG330 | U621 | 15 | LS240 |
| 11:XSIG330 | U714 | 6 | LS164 |

| | | | |
|---|---|---|---|
| 11:XSIG332 | U615 | 4 | S08 |
| 11:XSIG332 | U621 | 5 | LS240 |
| 11:XSIG333 | U714 | 4 | LS164 |
| 11:XSIG333 | U615 | 5 | S08 |
| 11:XSIG590 | U719 | 15 | LS240 |
| 11:XSIG590 | U718 | 17 | PAL14L8 |
| 11:XSIG592 | U621 | 11 | LS240 |
| 11:XSIG592 | U718 | 16 | PAL14L8 |
| 1:XSIG511 | U617 | 1 | S74 |
| 1:XSIG511 | U617 | 5 | S74 |
| 2:XSIG506 | U515 | 13 | S240 |
| 2:XSIG506 | U319 | 22 | 29823 |
| 2:XSIG584 | U519 | 11 | S04 |
| 2:XSIG584 | U618 | 15 | S163 |
| 2:XSIG596 | U324 | 12 | S00 |
| 2:XSIG596 | U325 | 4 | S02 |
| 2:XSIG611 | U119 | 15 | 29823 |
| 2:XSIG611 | U306 | 8 | LS244 |
| 3:XSIG120 | U517 | 13 | S00 |
| 3:XSIG120 | U515 | 18 | S240 |
| 3:XSIG120 | U616 | 2 | S195 |
| 3:XSIG120 | U616 | 3 | S195 |
| 3:XSIG120 | U614 | 8 | LS125 |
| 3:XSIG25 | U226 | 13 | 8254 |
| 3:XSIG49 | U517 | 4 | S00 |
| 3:XSIG49 | U516 | 8 | OSC 20MHZ |
| 3:XSIG52 | U517 | 10 | S00 |
| 3:XSIG52 | U517 | 6 | S00 |
| 3:XSIG58 | U616 | 14 | S195 |
| 3:XSIG58 | U515 | 2 | S240 |
| 3:XSIG78 | U123 | 11 | S08 |
| 3:XSIG78 | U124 | 12 | S151 |
| 4:XSIG100 | U602 | 10 | F163 |
| 4:XSIG100 | U603 | 15 | F163 |
| 4:XSIG100 | U602 | 7 | F163 |
| 4:XSIG128 | U506 | 10 | F169 |
| 4:XSIG128 | U606 | 15 | F169 |
| 4:XSIG128 | U506 | 7 | F169 |
| 4:XSIG48 | U605 | 10 | F169 |
| 4:XSIG48 | U505 | 15 | F169 |
| 4:XSIG48 | U605 | 7 | F169 |
| 4:XSIG49 | U606 | 10 | F169 |
| 4:XSIG49 | U605 | 15 | F169 |
| 4:XSIG49 | U606 | 7 | F169 |
| 4:XSIG52 | U702 | 12 | S74 |
| 4:XSIG52 | U602 | 15 | F163 |
| 4:XSIG86 | U603 | 10 | F163 |
| 4:XSIG86 | U604 | 15 | F163 |
| 4:XSIG86 | U603 | 7 | F163 |
| 5:XSIG367 | U628 | 13 | LS74 |
| 5:XSIG367 | U628 | 9 | LS74 |
| 5:XSIG376 | U628 | 1 | LS74 |
| 5:XSIG376 | U628 | 5 | LS74 |
| 6:XSIG227 | U719 | 13 | LS240 |
| 6:XSIG227 | U613 | 4 | 316A102 1K |
| 6:XSIG260 | U612 | 10 | S169 |
| 6:XSIG260 | U611 | 15 | S169 |
| 6:XSIG260 | U612 | 7 | S169 |
| 6:XSIG273 | U213 | 10 | S169 |

| | | | |
|---|---|---|---|
| 6:XSIG273 | U112 | 15 | S169 |
| 6:XSIG273 | U213 | 7 | S169 |
| 7:XSIG266 | U609 | 10 | S169 |
| 7:XSIG266 | U610 | 15 | S169 |
| 7:XSIG266 | U609 | 7 | S169 |
| 7:XSIG284 | U110 | 10 | S169 |
| 7:XSIG284 | U211 | 15 | S169 |
| 7:XSIG284 | U110 | 7 | S169 |
| 8:XSIG292 | U607 | 10 | S169 |
| 8:XSIG292 | U608 | 15 | S169 |
| 8:XSIG292 | U607 | 7 | S169 |
| 8:XSIG316 | U108 | 10 | S169 |
| 8:XSIG316 | U208 | 15 | S169 |
| 8:XSIG316 | U108 | 7 | S169 |
| A0 | U101 | 10 | EDH8832C |
| A0 | U503 | 18 | S240 |
| A0 | U105 | 2 | EDH8832C |
| A10 | U502 | 14 | S240 |
| A10 | U101 | 21 | EDH8832C |
| A10 | U105 | 8 | EDH8832C |
| A11 | U502 | 12 | S240 |
| A11 | U101 | 23 | EDH8832C |
| A1 | U503 | 16 | S240 |
| A11 | U105 | 9 | EDH8832C |
| A12 | U105 | 10 | EDH8832C |
| A12 | U706 | 18 | LS240 |
| A12 | U101 | 2 | EDH8832C |
| A1 | U105 | 23 | EDH8832C |
| A12 | U502 | 9 | S240 |
| A1 | U101 | 9 | EDH8832C |
| A2 | U503 | 14 | S240 |
| A2 | U105 | 21 | EDH8832C |
| A2 | U101 | 8 | EDH8832C |
| A3 | U503 | 12 | S240 |
| A3 | U105 | 24 | EDH8832C |
| A3 | U101 | 7 | EDH8832C |
| A4 | U105 | 25 | EDH8832C |
| A4 | U101 | 6 | EDH8832C |
| A4 | U503 | 9 | S240 |
| A5 | U105 | 3 | EDH8832C |
| A5 | U101 | 5 | EDH8832C |
| A5 | U503 | 7 | S240 |
| A6 | U101 | 4 | EDH8832C |
| A6 | U503 | 5 | S240 |
| A7 | U503 | 3 | S240 |
| A7 | U105 | 5 | EDH8832C |
| A8 | U502 | 18 | S240 |
| A8 | U101 | 25 | EDH8832C |
| A8 | U105 | 6 | EDH8832C |
| A9 | U502 | 16 | S240 |
| A9 | U101 | 24 | EDH8832C |
| A9 | U105 | 7 | EDH8832C |
| ADR10~ | U707 | 4 | LS240 |
| ADR11~ | U707 | 6 | LS240 |
| ADR12~ | U707 | 8 | LS240 |
| ADR13~ | U707 | 11 | LS240 |
| ADR14~ | U707 | 13 | LS240 |
| ADR15~ | U707 | 15 | LS240 |
| ADR16~ | U707 | 17 | LS240 |
| ADR17~ | U713 | 2 | LS240 |

| | | | |
|---|---|---|---|
| ADR18~ | U713 | 4 | LS240 |
| ADR19~ | U713 | 6 | LS240 |
| ADR1~ | U708 | 2 | LS240 |
| ADR20~ | U713 | 8 | LS240 |
| ADR21~ | U713 | 11 | LS240 |
| ADR22~ | U713 | 13 | LS240 |
| ADR23~ | U713 | 15 | LS240 |
| ADR2~ | U708 | 4 | LS240 |
| ADR3~ | U708 | 6 | LS240 |
| ADR4~ | U708 | 8 | LS240 |
| ADR5~ | U708 | 11 | LS240 |
| ADR6~ | U708 | 13 | LS240 |
| ADR7~ | U708 | 15 | LS240 |
| ADR8~ | U708 | 17 | LS240 |
| ADR9~ | U707 | 2 | LS240 |
| ADV_RD_ADDR~ | U505 | 10 | F169 |
| ADV_RD_ADDR~ | U118 | 19 | 29823 |
| ADV_RD_ADDR~ | U505 | 7 | F169 |
| ADV_WR_ADDR | U604 | 10 | F163 |
| ADV_WR_ADDR | U118 | 20 | 29823 |
| ADV_WR_ADDR | U604 | 7 | F163 |
| B0_CLR~ | U207 | 4 | S157 |
| B0_CLR~ | U611 | 9 | S169 |
| B1_CLR~ | U207 | 7 | S157 |
| B1_CLR~ | U112 | 9 | S169 |
| BANK_SEL | U311 | 1 | F374 |
| BANK_SEL | U620 | 10 | S10 |
| BANK_SEL | U306 | 17 | LS244 |
| BANK_SEL | U620 | 2 | S10 |
| BANK_SEL | U212 | 20 | 2018 |
| BANK_SEL | U620 | 4 | S10 |
| BANK_SEL | U412 | 5 | LS74 |
| BANK_SEL~ | U410 | 1 | F374 |
| BANK_SEL~ | U619 | 10 | S10 |
| BANK_SEL~ | U619 | 2 | S10 |
| BANK_SEL~ | U511 | 20 | 2018 |
| BANK_SEL~ | U619 | 4 | S10 |
| BANK_SEL~ | U412 | 6 | LS74 |
| BCCLK~ | U703 | 14 | LS244 |
| BCCLK~ | U714 | 8 | LS164 |
| BINIT~ | U703 | 12 | LS244 |
| BINIT~ | U615 | 2 | S08 |
| BMRDC~ | U717 | 13 | PAL14L8 |
| BMRDC~ | U716 | 14 | PAL14L8 |
| BMRDC~ | U703 | 18 | LS244 |
| BMWTC~ | U717 | 14 | PAL14L8 |
| BMWTC~ | U703 | 16 | LS244 |
| BMWTC~ | U716 | 23 | PAL14L8 |
| C1B0_A0 | U611 | 14 | S169 |
| C1B0_A0 | U511 | 8 | 2018 |
| C1B0_A1 | U611 | 13 | S169 |
| C1B0_A1 | U511 | 7 | 2018 |
| C1B0_A2 | U611 | 12 | S169 |
| C1B0_A2 | U511 | 6 | 2018 |
| C1B0_A3 | U611 | 11 | S169 |
| C1B0_A3 | U511 | 5 | 2018 |
| C1B0_A4 | U612 | 14 | S169 |
| C1B0_A4 | U511 | 4 | 2018 |
| C1B0_A5 | U612 | 13 | S169 |
| C1B0_A5 | U511 | 3 | 2018 |

| | | | |
|---|---|---|---|
| C1B0¯A6 | U612 | 12 | S169 |
| C1B0¯A6 | U511 | 2 | 2018 |
| C1B0¯A7 | U511 | 1 | 2018 |
| C1B0¯A7 | U612 | 11 | S169 |
| C1B0¯CLK | U410 | 11 | F374 |
| C1B0¯CLK | U512 | 12 | S157 |
| C1B0¯CLK | U611 | 2 | S169 |
| C1B0¯D0 | U411 | 2 | LS374 |
| C1B0¯D0 | U410 | 3 | F374 |
| C1B0¯D0 | U511 | 9 | 2018 |
| C1B0¯D1 | U511 | 10 | 2018 |
| C1B0¯D1 | U410 | 4 | F374 |
| C1B0¯D1 | U411 | 5 | LS374 |
| C1B0¯D2 | U511 | 11 | 2018 |
| C1B0¯D2 | U411 | 6 | LS374 |
| C1B0¯D2 | U410 | 7 | F374 |
| C1B0¯D3 | U511 | 13 | 2018 |
| C1B0¯D3 | U410 | 8 | F374 |
| C1B0¯D3 | U411 | 9 | LS374 |
| C1B0¯D4 | U411 | 12 | LS374 |
| C1B0¯D4 | U410 | 13 | F374 |
| C1B0¯D4 | U511 | 14 | 2018 |
| C1B0¯D5 | U410 | 14 | F374 |
| C1B0¯D5 | U411 | 15 | LS374 |
| C1B0¯D6 | U411 | 16 | LS374 |
| C1B0¯D6 | U410 | 17 | F374 |
| C1B0¯D7 | U511 | 17 | 2018 |
| C1B0¯D7 | U410 | 18 | F374 |
| C1B0¯D7 | U411 | 19 | LS374 |
| C1B0¯WE˜ | U619 | 12 | S10 |
| C1B0¯WE˜ | U512 | 14 | S157 |
| C1B0¯WE˜ | U511 | 21 | 2018 |
| C1B1¯A0 | U112 | 14 | S169 |
| C1B1¯A0 | U212 | 8 | 2018 |
| C1B1¯A1 | U112 | 13 | S169 |
| C1B1¯A1 | U212 | 7 | 2018 |
| C1B1¯A2 | U112 | 12 | S169 |
| C1B1¯A2 | U212 | 6 | 2018 |
| C1B1¯A3 | U112 | 11 | S169 |
| C1B1¯A3 | U212 | 5 | 2018 |
| C1B1¯A4 | U213 | 14 | S169 |
| C1B1¯A4 | U212 | 4 | 2018 |
| C1B1¯A5 | U213 | 13 | S169 |
| C1B1¯A5 | U212 | 3 | 2018 |
| C1B1¯A6 | U213 | 12 | S169 |
| C1B1¯A6 | U212 | 2 | 2018 |
| C1B1¯A7 | U212 | 1 | 2018 |
| C1B1¯A7 | U213 | 11 | S169 |
| C1B1¯CLK | U311 | 11 | F374 |
| C1B1¯CLK | U112 | 2 | S169 |
| C1B1¯CLK | U512 | 9 | S157 |
| C1B1¯D0 | U312 | 2 | LS374 |
| C1B1¯D0 | U311 | 3 | F374 |
| C1B1¯D0 | U212 | 9 | 2018 |
| C1B1¯D1 | U212 | 10 | 2018 |
| C1B1¯D1 | U311 | 4 | F374 |
| C1B1¯D1 | U312 | 5 | LS374 |
| C1B1¯D2 | U212 | 11 | 2018 |
| C1B1¯D2 | U312 | 6 | LS374 |

| | | | |
|---|---|---|---|
| C1B1_D2 | U311 | 7 | F374 |
| C1B1_D3 | U212 | 13 | 2018 |
| C1B1_D3 | U311 | 8 | F374 |
| C1B1_D3 | U312 | 9 | LS374 |
| C1B1_D4 | U312 | 12 | LS374 |
| C1B1_D4 | U311 | 13 | F374 |
| C1B1_D4 | U212 | 14 | 2018 |
| C1B1_D5 | U311 | 14 | F374 |
| C1B1_D5 | U312 | 15 | LS374 |
| C1B1_D6 | U312 | 16 | LS374 |
| C1B1_D6 | U311 | 17 | F374 |
| C1B1_D7 | U212 | 17 | 2018 |
| C1B1_D7 | U311 | 18 | F374 |
| C1B1_D7 | U312 | 19 | LS374 |
| C1B1_WE~ | U512 | 10 | S157 |
| C1B1_WE~ | U620 | 12 | S10 |
| C1B1_WE~ | U212 | 21 | 2018 |
| C1~ | U322 | 4 | S139 |
| C1~ | U319 | 9 | 29823 |
| C2B0_A0 | U610 | 14 | S169 |
| C2B0_A0 | U510 | 8 | 2018 |
| C2B0_A1 | U610 | 13 | S169 |
| C2B0_A1 | U510 | 7 | 2018 |
| C2B0_A2 | U610 | 12 | S169 |
| C2B0_A2 | U510 | 6 | 2018 |
| C2B0_A3 | U610 | 11 | S169 |
| C2B0_A3 | U510 | 5 | 2018 |
| C2B0_A4 | U609 | 14 | S169 |
| C2B0_A4 | U510 | 4 | 2018 |
| C2B0_A5 | U609 | 13 | S169 |
| C2B0_A5 | U510 | 3 | 2018 |
| C2B0_A6 | U609 | 12 | S169 |
| C2B0_A6 | U510 | 2 | 2018 |
| C2B0_A7 | U510 | 1 | 2018 |
| C2B0_A7 | U609 | 11 | S169 |
| C2B0_CLK | U408 | 11 | F374 |
| C2B0_CLK | U609 | 2 | S169 |
| C2B0_CLK | U512 | 4 | S157 |
| C2B0_D0 | U409 | 2 | LS374 |
| C2B0_D0 | U408 | 3 | F374 |
| C2B0_D0 | U510 | 9 | 2018 |
| C2B0_D1 | U510 | 10 | 2018 |
| C2B0_D1 | U408 | 4 | F374 |
| C2B0_D1 | U409 | 5 | LS374 |
| C2B0_D2 | U510 | 11 | 2018 |
| C2B0_D2 | U409 | 6 | LS374 |
| C2B0_D2 | U408 | 7 | F374 |
| C2B0_D3 | U510 | 13 | 2018 |
| C2B0_D3 | U408 | 8 | F374 |
| C2B0_D3 | U409 | 9 | LS374 |
| C2B0_D4 | U409 | 12 | LS374 |
| C2B0_D4 | U408 | 13 | F374 |
| C2B0_D4 | U510 | 14 | 2018 |
| C2B0_D5 | U408 | 14 | F374 |
| C2B0_D5 | U409 | 15 | LS374 |
| C2B0_D6 | U409 | 16 | LS374 |
| C2B0_D6 | U408 | 17 | F374 |
| C2B0_D7 | U510 | 17 | 2018 |
| C2B0_D7 | U408 | 18 | F374 |

| | | | |
|---|---|---|---|
| C2B0¯D7 | U409 | 19 | LS374 |
| C2B0¯WE˜ | U512 | 2 | S157 |
| C2B0¯WE˜ | U510 | 21 | 2018 |
| C2B0¯WE˜ | U619 | 6 | S10 |
| C2B1¯A0 | U211 | 14 | S169 |
| C2B1¯A0 | U210 | 8 | 2018 |
| C2B1¯A1 | U211 | 13 | S169 |
| C2B1¯A1 | U210 | 7 | 2018 |
| C2B1¯A2 | U211 | 12 | S169 |
| C2B1¯A2 | U210 | 6 | 2018 |
| C2B1¯A3 | U211 | 11 | S169 |
| C2B1¯A3 | U210 | 5 | 2018 |
| C2B1¯A4 | U110 | 14 | S169 |
| C2B1¯A4 | U210 | 4 | 2018 |
| C2B1¯A5 | U110 | 13 | S169 |
| C2B1¯A5 | U210 | 3 | 2018 |
| C2B1¯A6 | U110 | 12 | S169 |
| C2B1¯A6 | U210 | 2 | 2018 |
| C2B1¯A7 | U210 | 1 | 2018 |
| C2B1¯A7 | U110 | 11 | S169 |
| C2B1¯CLK | U309 | 11 | F374 |
| C2B1¯CLK | U211 | 2 | S169 |
| C2B1¯CLK | U512 | 7 | S157 |
| C2B1¯D0 | U310 | 2 | LS374 |
| C2B1¯D0 | U309 | 3 | F374 |
| C2B1¯D0 | U210 | 9 | 2018 |
| C2B1¯D1 | U210 | 10 | 2018 |
| C2B1¯D1 | U309 | 4 | F374 |
| C2B1¯D1 | U310 | 5 | LS374 |
| C2B1¯D2 | U210 | 11 | 2018 |
| C2B1¯D2 | U310 | 6 | LS374 |
| C2B1¯D2 | U309 | 7 | F374 |
| C2B1¯D3 | U210 | 13 | 2018 |
| C2B1¯D3 | U309 | 8 | F374 |
| C2B1¯D3 | U310 | 9 | LS374 |
| C2B1¯D4 | U310 | 12 | LS374 |
| C2B1¯D4 | U309 | 13 | F374 |
| C2B1¯D4 | U210 | 14 | 2018 |
| C2B1¯D5 | U309 | 14 | F374 |
| C2B1¯D5 | U310 | 15 | LS374 |
| C2B1¯D6 | U310 | 16 | LS374 |
| C2B1¯D6 | U309 | 17 | F374 |
| C2B1¯D7 | U210 | 17 | 2018 |
| C2B1¯D7 | U309 | 18 | F374 |
| C2B1¯D7 | U310 | 19 | LS374 |
| C2B1¯WE˜ | U210 | 21 | 2018 |
| C2B1¯WE˜ | U512 | 6 | S157 |
| C2˜ | U322 | 5 | S139 |
| C2˜ | U319 | 8 | 29823 |
| C3B0_A0 | U608 | 14 | S169 |
| C3B0¯A0 | U507 | 8 | 2018 |
| C3B0¯A1 | U608 | 13 | S169 |
| C3B0¯A1 | U507 | 7 | 2018 |
| C3B0¯A2 | U608 | 12 | S169 |
| C3B0¯A2 | U507 | 6 | 2018 |
| C3B0¯A3 | U608 | 11 | S169 |
| C3B0¯A3 | U507 | 5 | 2018 |
| C3B0¯A4 | U607 | 14 | S169 |

| | | | |
|---|---|---|---|
| C3B0_A4 | U507 | 4 | 2018 |
| C3B0_A5 | U607 | 13 | S169 |
| C3B0_A5 | U507 | 3 | 2018 |
| C3B0_A6 | U607 | 12 | S169 |
| C3B0_A6 | U507 | 2 | 2018 |
| C3B0_A7 | U507 | 1 | 2018 |
| C3B0_A7 | U607 | 11 | S169 |
| C3B0_CLK | U406 | 11 | F374 |
| C3B0_CLK | U207 | 12 | S157 |
| C3B0_CLK | U608 | 2 | S169 |
| C3B0_D0 | U407 | 2 | LS374 |
| C3B0_D0 | U406 | 3 | F374 |
| C3B0_D0 | U507 | 9 | 2018 |
| C3B0_D1 | U507 | 10 | 2018 |
| C3B0_D1 | U406 | 4 | F374 |
| C3B0_D1 | U407 | 5 | LS374 |
| C3B0_D2 | U507 | 11 | 2018 |
| C3B0_D2 | U407 | 6 | LS374 |
| C3B0_D2 | U406 | 7 | F374 |
| C3B0_D3 | U507 | 13 | 2018 |
| C3B0_D3 | U406 | 8 | F374 |
| C3B0_D3 | U407 | 9 | LS374 |
| C3B0_D4 | U407 | 12 | LS374 |
| C3B0_D4 | U406 | 13 | F374 |
| C3B0_D4 | U507 | 14 | 2018 |
| C3B0_D5 | U406 | 14 | F374 |
| C3B0_D5 | U407 | 15 | LS374 |
| C3B0_D6 | U407 | 16 | LS374 |
| C3B0_D6 | U406 | 17 | F374 |
| C3B0_D7 | U507 | 17 | 2018 |
| C3B0_D7 | U406 | 18 | F374 |
| C3B0_D7 | U407 | 19 | LS374 |
| C3B0_WE~ | U207 | 14 | S157 |
| C3B0_WE~ | U507 | 21 | 2018 |
| C3B0_WE~ | U619 | 8 | S10 |
| C3B1_A0 | U208 | 14 | S169 |
| C3B1_A0 | U209 | 8 | 2018 |
| C3B1_A1 | U208 | 13 | S169 |
| C3B1_A1 | U209 | 7 | 2018 |
| C3B1_A2 | U208 | 12 | S169 |
| C3B1_A2 | U209 | 6 | 2018 |
| C3B1_A3 | U208 | 11 | S169 |
| C3B1_A3 | U209 | 5 | 2018 |
| C3B1_A4 | U108 | 14 | S169 |
| C3B1_A4 | U209 | 4 | 2018 |
| C3B1_A5 | U108 | 13 | S169 |
| C3B1_A5 | U209 | 3 | 2018 |
| C3B1_A6 | U108 | 12 | S169 |
| C3B1_A6 | U209 | 2 | 2018 |
| C3B1_A7 | U209 | 1 | 2018 |
| C3B1_A7 | U108 | 11 | S169 |
| C3B1_CLK | U307 | 11 | F374 |
| C3B1_CLK | U108 | 2 | S169 |
| C3B1_CLK | U207 | 9 | S157 |
| C3B1_D0 | U308 | 2 | LS374 |
| C3B1_D0 | U307 | 3 | F374 |
| C3B1_D0 | U209 | 9 | 2018 |
| C3B1_D1 | U209 | 10 | 2018 |
| C3B1_D1 | U307 | 4 | F374 |
| C3B1_D1 | U308 | 5 | LS374 |

| | | | |
|---|---|---|---|
| C3B1_D2 | U209 | 11 | 2018 |
| C3B1_D2 | U308 | 6 | LS374 |
| C3B1_D2 | U307 | 7 | F374 |
| C3B1_D3 | U209 | 13 | 2018 |
| C3B1_D3 | U307 | 8 | F374 |
| C3B1_D3 | U308 | 9 | LS374 |
| C3B1_D4 | U308 | 12 | LS374 |
| C3B1_D4 | U307 | 13 | F374 |
| C3B1_D4 | U209 | 14 | 2018 |
| C3B1_D5 | U307 | 14 | F374 |
| C3B1_D5 | U308 | 15 | LS374 |
| C3B1_D6 | U308 | 16 | LS374 |
| C3B1_D6 | U307 | 17 | F374 |
| C3B1_D7 | U209 | 17 | 2018 |
| C3B1_D7 | U307 | 18 | F374 |
| C3B1_D7 | U308 | 19 | LS374 |
| C3B1_WE~ | U207 | 10 | S157 |
| C3B1_WE~ | U209 | 21 | 2018 |
| C3B1_WE~ | U620 | 8 | S10 |
| C3~ | U319 | 10 | 29823 |
| C3~ | U322 | 6 | S139 |
| CCLK~ | U703 | 6 | LS244 |
| CENTER_ENB~ | U626 | 1 | F374 |
| CENTER_ENB~ | U115 | 2 | F374 |
| CENT_D0 | U630 | 13 | 67401 |
| CENT_D0 | U626 | 3 | F374 |
| CENT_D1 | U630 | 12 | 67401 |
| CENT_D1 | U626 | 4 | F374 |
| CENT_D2 | U630 | 11 | 67401 |
| CENT_D2 | U626 | 7 | F374 |
| CENT_D3 | U630 | 10 | 67401 |
| CENT_D3 | U626 | 8 | F374 |
| CENT_D4 | U629 | 13 | 67401 |
| CENT_D5 | U629 | 12 | 67401 |
| CENT_D5 | U626 | 14 | F374 |
| CENT_D6 | U629 | 11 | 67401 |
| CENT_D6 | U626 | 17 | F374 |
| CENT_D7 | U629 | 10 | 67401 |
| CENT_D7 | U626 | 18 | F374 |
| CENT_FAIL | U417 | 17 | LS244 |
| CENT_FAIL | U628 | 8 | LS74 |
| CENT_OR1 | U628 | 12 | LS74 |
| CENT_OR1 | U629 | 14 | 67401 |
| CH12_RDBK~ | U111 | 1 | LS244 |
| CH12_RDBK~ | U705 | 13 | LS138 |
| CH12_RDBK~ | U111 | 19 | LS244 |
| CH1_D0 | U410 | 2 | F374 |
| CH1_D1 | U111 | 4 | LS244 |
| CH1_D1 | U410 | 5 | F374 |
| CH1_D2 | U410 | 6 | F374 |
| CH1_D3 | U111 | 8 | LS244 |
| CH1_D3 | U410 | 9 | F374 |
| CH1_D4 | U111 | 11 | LS244 |
| CH1_D4 | U410 | 12 | F374 |
| CH1_D5 | U111 | 13 | LS244 |
| CH1_D5 | U410 | 15 | F374 |
| CH1_D6 | U111 | 15 | LS244 |
| CH1_D6 | U410 | 16 | F374 |
| CH1_D7 | U111 | 17 | LS244 |

LINES MEMORY

| Signal_name | Physical_location | Pin_number | Part_name |
|---|---|---|---|
| CH1¯D7 | U410 | 19 | F374 |
| CH1¯SEL˜ | U624 | 1 | F244 |
| CH1¯SEL˜ | U115 | 12 | F374 |
| CH1¯SEL˜ | U624 | 19 | F244 |
| CH2¯D0 | U408 | 2 | F374 |
| CH2¯D1 | U109 | 4 | LS244 |
| CH2¯D1 | U408 | 5 | F374 |
| CH2¯D2 | U408 | 6 | F374 |
| CH2¯D3 | U109 | 8 | LS244 |
| CH2¯D3 | U408 | 9 | F374 |
| CH2¯D4 | U109 | 11 | LS244 |
| CH2¯D4 | U408 | 12 | F374 |
| CH2¯D5 | U109 | 13 | LS244 |
| CH2¯D5 | U408 | 15 | F374 |
| CH2¯D6 | U109 | 15 | LS244 |
| CH2¯D6 | U408 | 16 | F374 |
| CH2¯D7 | U109 | 17 | LS244 |
| CH2¯D7 | U408 | 19 | F374 |
| CH3¯D0 | U406 | 2 | F374 |
| CH3¯D1 | U107 | 4 | LS244 |
| CH3¯D1 | U406 | 5 | F374 |
| CH3¯D2 | U406 | 6 | F374 |
| CH3¯D3 | U107 | 8 | LS244 |
| CH3¯D3 | U406 | 9 | F374 |
| CH3¯D4 | U107 | 11 | LS244 |
| CH3¯D4 | U406 | 12 | F374 |
| CH3¯D5 | U107 | 13 | LS244 |
| CH3¯D5 | U406 | 15 | F374 |
| CH3¯D6 | U107 | 15 | LS244 |
| CH3¯D6 | U406 | 16 | F374 |
| CH3¯D7 | U107 | 17 | LS244 |
| CH3¯D7 | U406 | 19 | F374 |
| CH3¯RDBK˜ | U107 | 1 | LS244 |
| CH3¯RDBK˜ | U705 | 12 | LS138 |
| CH3¯RDBK˜ | U107 | 19 | LS244 |
| CHK¯BIT | U418 | 12 | S151 |
| CHK¯BIT | U124 | 4 | S151 |
| CHK¯BIT | U419 | 6 | LS273 |
| CLK¯PRST˜ | U616 | 1 | S195 |
| CLK¯PRST˜ | U704 | 14 | LS138 |
| CLR¯ADDR˜ | U206 | 13 | S241 |
| CLR¯EOL˜ | U614 | 2 | LS125 |
| CLR¯EOL˜ | U319 | 23 | 29823 |
| CLR¯EOL˜ | U125 | 4 | LS74 |
| CLR¯IF˜ | U229 | 9 | 67401 |
| CLR¯NEW˜ | U617 | 4 | S74 |
| CLR¯NEW˜ | U703 | 7 | LS244 |
| CLR¯NEW˜ | U330 | 9 | 67401 |
| CLR¯OLDFF˜ | U520 | 4 | S08 |
| CLR¯OLDFF˜ | U703 | 5 | LS244 |
| CLR¯OLDF˜ | U628 | 10 | LS74 |
| CLR¯OLDF˜ | U628 | 4 | LS74 |
| CLR¯OLDF˜ | U520 | 6 | S08 |
| CLR¯OLDF˜ | U729 | 9 | 67401 |
| CLR¯OLD˜ | U522 | 21 | 29823 |
| CLR¯OLD˜ | U520 | 5 | S08 |

| | | | |
|---|---|---|---|
| CLR_RD_ADDR~ | U118 | 18 | 29823 |
| CLR_RD_ADDR~ | U505 | 9 | F169 |
| CLR_WR_ADDR~ | U604 | 1 | F163 |
| CLR_WR_ADDR~ | U702 | 13 | S74 |
| CLR_WR_ADDR~ | U119 | 16 | 29823 |
| CMD1~ | U319 | 2 | 29823 |
| CMD1~ | U517 | 3 | S00 |
| CMD2 | U319 | 3 | 29823 |
| CMD2 | U123 | 6 | S08 |
| CMD3~ | U324 | 11 | S00 |
| CMD3~ | U118 | 9 | 29823 |
| CNTR_CLK | U702 | 11 | S74 |
| CNTR_CLK | U604 | 2 | F163 |
| CNTR_CLK | U515 | 3 | S240 |
| CS1~ | U319 | 16 | 29823 |
| CS1~ | U101 | 20 | EDH8832C |
| CS2~ | U319 | 17 | 29823 |
| CS2~ | U403 | 20 | EDH8832C |
| CS3~ | U319 | 15 | 29823 |
| CS3~ | U105 | 20 | EDH8832C |
| DAT0~ | U711 | 2 | LS640 |
| DAT1~ | U711 | 3 | LS640 |
| DAT2~ | U711 | 4 | LS640 |
| DAT3~ | U711 | 5 | LS640 |
| DAT4~ | U711 | 6 | LS640 |
| DAT5~ | U711 | 7 | LS640 |
| DAT6~ | U711 | 8 | LS640 |
| DAT7~ | U711 | 9 | LS640 |
| DAT8~ | U710 | 2 | LS640 |
| DAT9~ | U710 | 3 | LS640 |
| DATA_RDY~ | U306 | 14 | LS244 |
| DATA_RDY~ | U306 | 15 | LS244 |
| DATA_TAKEN1~ | U518 | 2 | LS279 |
| DATA_TAKEN1~ | U521 | 9 | LS374 |
| DATA_TAKEN2~ | U518 | 11 | LS279 |
| DATA_TAKEN2~ | U206 | 14 | S241 |
| DATA_TAKEN2~ | U206 | 5 | S241 |
| DATA_TAKEN~ | U206 | 15 | S241 |
| DATA~ | U710 | 4 | LS640 |
| DATB~ | U710 | 5 | LS640 |
| DATC~ | U710 | 6 | LS640 |
| DATD~ | U710 | 7 | LS640 |
| DATE~ | U710 | 8 | LS640 |
| DATF~ | U710 | 9 | LS640 |
| DIAG_ACCESS | U718 | 23 | PAL14L8 |
| DIAG_ACCESS | U712 | 5 | LS273 |
| DN_B0~ | U611 | 1 | S169 |
| DN_B0~ | U113 | 3 | S32 |
| DN_B1~ | U112 | 1 | S169 |
| DN_B1~ | U113 | 6 | S32 |
| DOUBLE~ | U706 | 1 | LS240 |
| DOUBLE~ | U601 | 2 | S139 |
| DOUBLE~ | U217 | 9 | LS273 |
| DRDY1~ | U618 | 1 | S163 |
| DRDY1~ | U515 | 7 | S240 |
| DRDY2~ | U518 | 10 | LS279 |
| DRDY2~ | U521 | 12 | LS374 |
| DRDY2~ | U519 | 13 | S04 |
| ENB_LINRQ~ | U614 | 1 | LS125 |

| | | | |
|---|---|---|---|
| ENB_LINRQ~ | U719 | 14 | LS240 |
| ENB_OSC | U617 | 10 | S74 |
| ENB_OSC | U517 | 5 | S00 |
| ENB_OSC | U719 | 9 | LS240 |
| ENB_OSC~ | U719 | 11 | LS240 |
| ENB_OSC~ | U419 | 16 | LS273 |
| ENB_OSC~ | U702 | 4 | S74 |
| EN_QR12~ | U501 | 19 | S240 |
| EN_QR12~ | U601 | 5 | S139 |
| EN_QW12~ | U502 | 19 | S240 |
| EN_QW12~ | U601 | 7 | S139 |
| EOL_FF~ | U124 | 13 | S151 |
| EOL_FF~ | U317 | 3 | S11 |
| EOL_FF~ | U125 | 5 | LS74 |
| EOL_IN~ | U621 | 18 | LS240 |
| EOL_IN~ | U125 | 3 | LS74 |
| ESI_CENT | U520 | 12 | S08 |
| ESI_CENT | U522 | 18 | 29823 |
| ESI_OLD | U520 | 1 | S08 |
| ESI_OLD | U522 | 22 | 29823 |
| ESO_CENT | U522 | 17 | 29823 |
| ESO_CENT | U324 | 9 | S00 |
| ESO_NEW | U522 | 19 | 29823 |
| ESO_NEW | U324 | 4 | S00 |
| ESO_OLD | U324 | 1 | S00 |
| ESO_OLD | U522 | 20 | 29823 |
| EWR_CH1 | U619 | 1 | S10 |
| EWR_CH1 | U622 | 15 | S374 |
| EWR_CH2 | U622 | 16 | S374 |
| EWR_CH2 | U619 | 3 | S10 |
| EWR_CH3 | U622 | 19 | S374 |
| EWR_CH3 | U619 | 9 | S10 |
| FDBK0 | U220 | 10 | MP6264 |
| FDBK0 | U320 | 18 | LS244 |
| FDBK0 | U318 | 23 | 29823 |
| FDBK10 | U224 | 14 | LS244 |
| FDBK10 | U220 | 21 | MP6264 |
| FDBK10 | U118 | 22 | 29823 |
| FDBK11 | U224 | 12 | LS244 |
| FDBK11 | U118 | 21 | 29823 |
| FDBK11 | U220 | 23 | MP6264 |
| FDBK1 | U320 | 16 | LS244 |
| FDBK1 | U318 | 22 | 29823 |
| FDBK1 | U220 | 9 | MP6264 |
| FDBK2 | U320 | 14 | LS244 |
| FDBK2 | U318 | 21 | 29823 |
| FDBK2 | U220 | 8 | MP6264 |
| FDBK3 | U320 | 12 | LS244 |
| FDBK3 | U318 | 20 | 29823 |
| FDBK3 | U220 | 7 | MP6264 |
| FDBK4 | U318 | 19 | 29823 |
| FDBK4 | U220 | 6 | MP6264 |
| FDBK4 | U320 | 9 | LS244 |
| FDBK5 | U318 | 18 | 29823 |
| FDBK5 | U220 | 5 | MP6264 |
| FDBK5 | U320 | 7 | LS244 |
| FDBK6 | U318 | 17 | 29823 |
| FDBK6 | U220 | 4 | MP6264 |
| FDBK6 | U320 | 5 | LS244 |

| | | | |
|---|---|---|---|
| FDBK7 | U318 | 16 | 29823 |
| FDBK7 | U320 | 3 | LS244 |
| FDBK8 | U318 | 15 | 29823 |
| FDBK8 | U224 | 18 | LS244 |
| FDBK8 | U220 | 25 | MP6264 |
| FDBK9 | U224 | 16 | LS244 |
| FDBK9 | U118 | 23 | 29823 |
| FDBK9 | U220 | 24 | MP6264 |
| GND | U621 | 1 | LS240 |
| GND | U611 | 10 | S169 |
| GND | U614 | 12 | LS125 |
| GND | U318 | 14 | 29823 |
| GND | U512 | 15 | S157 |
| GND | U511 | 18 | 2018 |
| GND | U719 | 19 | LS240 |
| GND | U125 | 2 | LS74 |
| GND | U220 | 20 | MP6264 |
| GND | U511 | 22 | 2018 |
| GND | U511 | 23 | 2018 |
| GND | U505 | 3 | F169 |
| GND | U505 | 4 | F169 |
| GND | U505 | 5 | F169 |
| GND | U505 | 6 | F169 |
| GND | U124 | 7 | S151 |
| GND | | J1-12 | CONNECTOR |
| GND | | J1-16 | CONNECTOR |
| GND | | J1-20 | CONNECTOR |
| GND | | J1-24 | CONNECTOR |
| GND | | J1-28 | CONNECTOR |
| GND | | J1-32 | CONNECTOR |
| GND | | J1-33 | CONNECTOR |
| GND | | J1-35 | CONNECTOR |
| GND | | J1-37 | CONNECTOR |
| GND | | J1-39 | CONNECTOR |
| GND | | J1-4 | CONNECTOR |
| GND | | J1-40 | CONNECTOR |
| GND | | J1-42 | CONNECTOR |
| GND | | J1-43 | CONNECTOR |
| GND | | J1-45 | CONNECTOR |
| GND | | J1-46 | CONNECTOR |
| GND | | J1-48 | CONNECTOR |
| GND | | J1-49 | CONNECTOR |
| GND | | J1-8 | CONNECTOR |
| HOST_CLK~ | U715 | 12 | LS138 |
| HOST_CLK~ | U702 | 3 | S74 |
| HOST_CLK~ | U614 | 5 | LS125 |
| HOST_CLK~ | U517 | 9 | S00 |
| HOST_CLRAD~ | U217 | 12 | LS273 |
| HOST_CLRAD~ | U206 | 4 | S241 |
| HOST_DTKN2~ | U704 | 12 | LS138 |
| HOST_DTKN2~ | U206 | 6 | S241 |
| HOST_EOL~ | U704 | 11 | LS138 |
| HOST_EOL~ | U724 | 8 | LS240 |
| HOST_MEM_WE | U621 | 14 | LS240 |
| HOST_MEM_WE | U614 | 9 | LS125 |
| HOST_PULSE | U716 | 13 | PAL14L8 |
| HOST_PULSE | U615 | 6 | S08 |
| HOST_RD~ | U716 | 15 | PAL14L8 |
| HOST_RD~ | U705 | 5 | LS138 |

| | | | |
|---|---|---|---|
| HOST_SI1~ | U715 | 15 | LS138 |
| HOST_SI1~ | U724 | 2 | LS240 |
| HOST_SI2~ | U715 | 14 | LS138 |
| HOST_SI2~ | U724 | 4 | LS240 |
| HOST_SI3~ | U715 | 13 | LS138 |
| HOST_SI3~ | U724 | 6 | LS240 |
| HOST_SO~ | U704 | 15 | LS138 |
| HOST_SO~ | U206 | 2 | S241 |
| HOST_UD | U217 | 6 | LS273 |
| HOST_UD | U206 | 8 | S241 |
| HOST_WR~ | U716 | 16 | PAL14L8 |
| HOST_WR~ | U715 | 4 | LS138 |
| IB_D~0 | U720 | 2 | S240 |
| IB_D~1 | U720 | 4 | S240 |
| IB_D~2 | U720 | 6 | S240 |
| IB_D~3 | U720 | 8 | S240 |
| IB_D~4 | U720 | 11 | S240 |
| IB_D~5 | U720 | 13 | S240 |
| IB_D~6 | U720 | 15 | S240 |
| IB_D~7 | U720 | 17 | S240 |
| IB_EOL~ | U725 | 8 | S240 |
| IB_RDY1~ | U723 | 4 | LS244 |
| IB_RDY1~ | U722 | 9 | LS240 |
| IB_RDY2~ | U723 | 6 | LS244 |
| IB_RDY2~ | U722 | 7 | LS240 |
| IB_RDY3~ | U722 | 5 | LS240 |
| IB_RDY3~ | U723 | 8 | LS244 |
| IB_SEL~ | U725 | 1 | S240 |
| IB_SEL~ | U322 | 11 | S139 |
| IB_SEL~ | U720 | 19 | S240 |
| IB_SHIFT1~ | U725 | 2 | S240 |
| IB_SHIFT2~ | U725 | 4 | S240 |
| IB_SHIFT3~ | U725 | 6 | S240 |
| IDATA_TYPE0 | U418 | 2 | S151 |
| IDATA_TYPE0 | U119 | 21 | 29823 |
| IDATA_TYPE1 | U418 | 1 | S151 |
| IDATA_TYPE1 | U119 | 20 | 29823 |
| IF1_O0 | U129 | 13 | 67401 |
| IF1_O0 | U215 | 3 | LS374 |
| IF1_O1 | U129 | 12 | 67401 |
| IF1_O1 | U215 | 4 | LS374 |
| IF1_O2 | U129 | 11 | 67401 |
| IF1_O2 | U215 | 7 | LS374 |
| IF1_O3 | U129 | 10 | 67401 |
| IF1_O3 | U215 | 8 | LS374 |
| IF1_O4 | U229 | 13 | 67401 |
| IF1_O5 | U229 | 12 | 67401 |
| IF1_O5 | U215 | 14 | LS374 |
| IF1_O6 | U229 | 11 | 67401 |
| IF1_O6 | U215 | 17 | LS374 |
| IF1_O7 | U229 | 10 | 67401 |
| IF1_O7 | U215 | 18 | LS374 |
| IF2_O0 | U130 | 13 | 67401 |
| IF2_O0 | U316 | 3 | LS374 |
| IF2_O1 | U130 | 12 | 67401 |
| IF2_O1 | U316 | 4 | LS374 |
| IF2_O2 | U130 | 11 | 67401 |
| IF2_O2 | U316 | 7 | LS374 |
| IF2_O3 | U130 | 10 | 67401 |

| | | | |
|---|---|---|---|
| IF2_O3 | U316 | 8 | LS374 |
| IF2_O4 | U230 | 13 | 67401 |
| IF2_O5 | U230 | 12 | 67401 |
| IF2_O5 | U316 | 14 | LS374 |
| IF2_O6 | U230 | 11 | 67401 |
| IF2_O6 | U316 | 17 | LS374 |
| IF2_O7 | U230 | 10 | 67401 |
| IF2_O7 | U316 | 18 | LS374 |
| IF3_O0 | U128 | 13 | 67401 |
| IF3_O0 | U416 | 3 | LS374 |
| IF3_O1 | U128 | 12 | 67401 |
| IF3_O1 | U416 | 4 | LS374 |
| IF3_O2 | U128 | 11 | 67401 |
| IF3_O2 | U416 | 7 | LS374 |
| IF3_O3 | U128 | 10 | 67401 |
| IF3_O3 | U416 | 8 | LS374 |
| IF3_O4 | U416 | 13 | LS374 |
| IF3_O5 | U228 | 12 | 67401 |
| IF3_O5 | U416 | 14 | LS374 |
| IF3_O6 | U228 | 11 | 67401 |
| IF3_O6 | U416 | 17 | LS374 |
| IF3_O7 | U228 | 10 | 67401 |
| IF3_O7 | U416 | 18 | LS374 |
| IFD0 | U227 | 18 | LS244 |
| IFD0 | U130 | 4 | 67401 |
| IFD1 | U227 | 16 | LS244 |
| IFD1 | U130 | 5 | 67401 |
| IFD2 | U227 | 14 | LS244 |
| IFD2 | U130 | 6 | 67401 |
| IFD3 | U227 | 12 | LS244 |
| IFD3 | U130 | 7 | 67401 |
| IFD4 | U229 | 4 | 67401 |
| IFD4 | U227 | 9 | LS244 |
| IFD5 | U229 | 5 | 67401 |
| IFD5 | U227 | 7 | LS244 |
| IFD6 | U227 | 5 | LS244 |
| IFD6 | U229 | 6 | 67401 |
| IFD7 | U227 | 3 | LS244 |
| IFD7 | U229 | 7 | 67401 |
| IF_ORDY~ | U124 | 14 | S151 |
| IF_ORDY~ | U723 | 2 | LS244 |
| IF_ORDY~ | U126 | 8 | LS30 |
| INBUS_ACTIVE~ | U719 | 16 | LS240 |
| INBUS_ACTIVE~ | U722 | 19 | LS240 |
| INIT1~ | U615 | 1 | S08 |
| INIT1~ | U715 | 7 | LS138 |
| INIT2~ | U412 | 1 | LS74 |
| INIT2~ | U615 | 3 | S08 |
| INIT~ | U703 | 8 | LS244 |
| INSEQ_A_ACCESS | U318 | 1 | 29823 |
| INSEQ_A_ACCESS | U621 | 3 | LS240 |
| INSEQ_A_ACCESS | U320 | 1 | LS244 |
| INSEQ_A_ACCESS | U621 | 17 | LS240 |
| INSEQ_A_ACCESS | U320 | 19 | LS244 |
| INSEQ_A_ACCESS | U718 | 22 | PAL14L8 |
| INSEQ_CLK | U214 | 11 | S374 |
| INSEQ_CLK | U318 | 13 | 29823 |
| INSEQ_CLK | U515 | 16 | S240 |
| INSEQ_CLK | U515 | 17 | S240 |
| INSEQ_CLK | U618 | 2 | S163 |

| | | | |
|---|---|---|---|
| INSEQ_CLK | U614 | 6 | LS125 |
| INSEQ_CLK~ | U616 | 15 | S195 |
| INSEQ_CLK~ | U515 | 4 | S240 |
| INSEQ_CLK~ | U123 | 9 | S08 |
| INSEQ_H_ACC~ | U323 | 19 | LS245 |
| INSEQ_H_ACC~ | U717 | 20 | PAL14L8 |
| INSEQ_L_ACC~ | U321 | 19 | LS245 |
| INSEQ_L_ACC~ | U717 | 21 | PAL14L8 |
| INSEQ_WRL~ | U716 | 22 | PAL14L8 |
| INSEQ_WRL~ | U220 | 27 | MP6264 |
| INSEQ_WRU~ | U716 | 21 | PAL14L8 |
| INSEQ_WRU~ | U223 | 27 | MP6264 |
| IN_PRST~ | U318 | 11 | 29823 |
| IN_PRST~ | U306 | 12 | LS244 |
| IN_PRST~ | U518 | 3 | LS279 |
| IR1L | U129 | 2 | 67401 |
| IR1L | U317 | 4 | S11 |
| IR1U | U229 | 2 | 67401 |
| IR1U | U317 | 5 | S11 |
| IR2L | U317 | 10 | S11 |
| IR2L | U130 | 2 | 67401 |
| IR2L | U317 | 9 | S11 |
| IR2U | U317 | 11 | S11 |
| IR2U | U230 | 2 | 67401 |
| IR3L | U123 | 1 | S08 |
| IR3L | U128 | 2 | 67401 |
| IR3U | U228 | 2 | 67401 |
| IREADY_OUT1~ | U723 | 13 | LS244 |
| IREADY_OUT1~ | U722 | 18 | LS240 |
| IREADY_OUT2~ | U723 | 15 | LS244 |
| IREADY_OUT2~ | U722 | 16 | LS240 |
| IREADY_OUT3~ | U722 | 14 | LS240 |
| IREADY_OUT3~ | U723 | 17 | LS244 |
| ITEST~ | U615 | 12 | S08 |
| ITEST~ | U322 | 9 | S139 |
| CH1_D0 | | J1-1 | CONNECTOR |
| CH1_D7 | | J1-10 | CONNECTOR |
| CH2_D0 | | J1-11 | CONNECTOR |
| CH2_D1 | | J1-13 | CONNECTOR |
| CH2_D2 | | J1-14 | CONNECTOR |
| CH2_D3 | | J1-15 | CONNECTOR |
| CH2_D4 | | J1-17 | CONNECTOR |
| CH2_D5 | | J1-18 | CONNECTOR |
| CH2_D6 | | J1-19 | CONNECTOR |
| CH1_D1 | | J1-2 | CONNECTOR |
| CH2_D7 | | J1-21 | CONNECTOR |
| CH3_D0 | | J1-22 | CONNECTOR |
| CH3_D1 | | J1-23 | CONNECTOR |
| CH3_D2 | | J1-25 | CONNECTOR |
| CH3_D3 | | J1-26 | CONNECTOR |
| CH3_D4 | | J1-27 | CONNECTOR |
| CH3_D5 | | J1-29 | CONNECTOR |
| CH1_D2 | | J1-3 | CONNECTOR |
| CH3_D6 | | J1-30 | CONNECTOR |
| CH3_D7 | | J1-31 | CONNECTOR |
| TYPE0~ | | J1-34 | CONNECTOR |
| TYPE1~ | | J1-36 | CONNECTOR |
| U/D~ | | J1-38 | CONNECTOR |
| DATA RDY~ | | J1-41 | CONNECTOR |

| | | | |
|---|---|---|---|
| CLR_ADDR~ | | J1-44 | CONNECTOR |
| DATA_TAKEN~ | | J1-47 | CONNECTOR |
| CH1_D3 | | J1-5 | CONNECTOR |
| SO~ | | J1-50 | CONNECTOR |
| CH1_D4 | | J1-6 | CONNECTOR |
| CH1_D5 | | J1-7 | CONNECTOR |
| CH1_D6 | | J1-9 | CONNECTOR |
| JC1 | U118 | 15 | 29823 |
| JC1 | U220 | 2 | MP6264 |
| JC1 | U224 | 9 | LS244 |
| JC2 | U420 | 14 | LS244 |
| JC2 | U522 | 15 | 29823 |
| JC2 | U623 | 19 | 2018 |
| LD_INSEQ | U323 | 1 | LS245 |
| LD_INSEQ | U220 | 22 | MP6264 |
| LD_INSEQ | U621 | 9 | LS240 |
| LD_MEM | U514 | 1 | S00 |
| LD_MEM | U517 | 12 | S00 |
| LD_MEM | U119 | 18 | 29823 |
| LD_MEM | U101 | 22 | EDH8832C |
| LD_MEM~ | U215 | 1 | LS374 |
| LD_MEM~ | U514 | 3 | S00 |
| LD_OTSEQ | U421 | 1 | LS245 |
| LD_OTSEQ | U623 | 20 | 2018 |
| LD_OTSEQ | U719 | 5 | LS240 |
| LINE_REQ~ | R1 | 1 | RES 10K |
| LINE_REQ~ | U614 | 3 | LS125 |
| LINE_REQ~ | U417 | 4 | LS244 |
| LOAD_PAR1~ | U715 | 11 | LS138 |
| LOAD_PAR2~ | U715 | 10 | LS138 |
| LOAD_PAR2~ | U217 | 11 | LS273 |
| LS0 | U319 | 21 | 29823 |
| LS0 | U101 | 26 | EDH8832C |
| LS1 | U101 | 1 | EDH8832C |
| LS1 | U319 | 20 | 29823 |
| M1_D0 | U101 | 11 | EDH8832C |
| M1_D0 | U216 | 18 | LS245 |
| M1_D0 | U105 | 19 | EDH8832C |
| M1_D0 | U215 | 2 | LS374 |
| M1_D0 | U214 | 3 | S374 |
| M1_D1 | U101 | 12 | EDH8832C |
| M1_D1 | U216 | 17 | LS245 |
| M1_D1 | U105 | 18 | EDH8832C |
| M1_D1 | U214 | 4 | S374 |
| M1_D1 | U215 | 5 | LS374 |
| M1_D2 | U101 | 13 | EDH8832C |
| M1_D2 | U216 | 16 | LS245 |
| M1_D2 | U105 | 17 | EDH8832C |
| M1_D2 | U215 | 6 | LS374 |
| M1_D2 | U214 | 7 | S374 |
| M1_D3 | U216 | 15 | LS245 |
| M1_D3 | U105 | 16 | EDH8832C |
| M1_D3 | U214 | 8 | S374 |
| M1_D3 | U215 | 9 | LS374 |
| M1_D4 | U215 | 12 | LS374 |
| M1_D4 | U214 | 13 | S374 |
| M1_D4 | U216 | 14 | LS245 |
| M1_D4 | U105 | 15 | EDH8832C |
| M1_D4 | U101 | 16 | EDH8832C |

| | | | |
|---|---|---|---|
| M1¯D5 | U216 | 13 | LS245 |
| M1¯D5 | U214 | 14 | S374 |
| M1¯D5 | U215 | 15 | LS374 |
| M1¯D5 | U101 | 17 | EDH8832C |
| M1¯D6 | U216 | 12 | LS245 |
| M1¯D6 | U215 | 16 | LS374 |
| M1¯D6 | U214 | 17 | S374 |
| M1¯D6 | U101 | 18 | EDH8832C |
| M1¯D7 | U216 | 11 | LS245 |
| M1¯D7 | U214 | 18 | S374 |
| M1¯D7 | U215 | 19 | LS374 |
| M2¯D0 | U203 | 11 | EDH8832C |
| M2¯D0 | U315 | 18 | LS245 |
| M2¯D0 | U205 | 19 | EDH8832C |
| M2¯D0 | U316 | 2 | LS374 |
| M2¯D0 | U314 | 3 | S374 |
| M2¯D1 | U203 | 12 | EDH8832C |
| M2¯D1 | U315 | 17 | LS245 |
| M2¯D1 | U205 | 18 | EDH8832C |
| M2¯D1 | U314 | 4 | S374 |
| M2¯D1 | U316 | 5 | LS374 |
| M2¯D2 | U203 | 13 | EDH8832C |
| M2¯D2 | U315 | 16 | LS245 |
| M2¯D2 | U205 | 17 | EDH8832C |
| M2¯D2 | U316 | 6 | LS374 |
| M2¯D2 | U314 | 7 | S374 |
| M2¯D3 | U315 | 15 | LS245 |
| M2¯D3 | U205 | 16 | EDH8832C |
| M2¯D3 | U314 | 8 | S374 |
| M2¯D3 | U316 | 9 | LS374 |
| M2¯D4 | U316 | 12 | LS374 |
| M2¯D4 | U314 | 13 | S374 |
| M2¯D4 | U315 | 14 | LS245 |
| M2¯D4 | U205 | 15 | EDH8832C |
| M2¯D4 | U203 | 16 | EDH8832C |
| M2¯D5 | U315 | 13 | LS245 |
| M2¯D5 | U314 | 14 | S374 |
| M2¯D5 | U316 | 15 | LS374 |
| M2¯D5 | U203 | 17 | EDH8832C |
| M2¯D6 | U315 | 12 | LS245 |
| M2¯D6 | U316 | 16 | LS374 |
| M2¯D6 | U314 | 17 | S374 |
| M2¯D6 | U203 | 18 | EDH8832C |
| M2¯D7 | U315 | 11 | LS245 |
| M2¯D7 | U314 | 18 | S374 |
| M2¯D7 | U316 | 19 | LS374 |
| M3¯D0 | U401 | 11 | EDH8832C |
| M3¯D0 | U415 | 18 | LS245 |
| M3¯D0 | U405 | 19 | EDH8832C |
| M3¯D0 | U416 | 2 | LS374 |
| M3¯D0 | U414 | 3 | S374 |
| M3¯D1 | U401 | 12 | EDH8832C |
| M3¯D1 | U415 | 17 | LS245 |
| M3¯D1 | U405 | 18 | EDH8832C |
| M3¯D1 | U414 | 4 | S374 |
| M3¯D1 | U416 | 5 | LS374 |
| M3¯D2 | U401 | 13 | EDH8832C |
| M3¯D2 | U415 | 16 | LS245 |
| M3¯D2 | U405 | 17 | EDH8832C |
| M3¯D2 | U416 | 6 | LS374 |

| | | | |
|---|---|---|---|
| M3¯D2 | U414 | 7 | S374 |
| M3¯D3 | U415 | 15 | LS245 |
| M3¯D3 | U405 | 16 | EDH8832C |
| M3¯D3 | U414 | 8 | S374 |
| M3¯D3 | U416 | 9 | LS374 |
| M3¯D4 | U416 | 12 | LS374 |
| M3¯D4 | U414 | 13 | S374 |
| M3¯D4 | U415 | 14 | LS245 |
| M3¯D4 | U405 | 15 | EDH8832C |
| M3¯D4 | U401 | 16 | EDH8832C |
| M3¯D5 | U415 | 13 | LS245 |
| M3¯D5 | U414 | 14 | S374 |
| M3¯D5 | U416 | 15 | LS374 |
| M3¯D5 | U401 | 17 | EDH8832C |
| M3¯D6 | U415 | 12 | LS245 |
| M3¯D6 | U416 | 16 | LS374 |
| M3¯D6 | U414 | 17 | S374 |
| M3¯D6 | U401 | 18 | EDH8832C |
| M3¯D7 | U415 | 11 | LS245 |
| M3¯D7 | U414 | 18 | S374 |
| M3¯D7 | U416 | 19 | LS374 |
| MB¯A0 | U708 | 18 | LS240 |
| MB¯A0 | U226 | 19 | 8254 |
| MB¯A0 | U320 | 2 | LS244 |
| MB¯A10 | U514 | 10 | S00 |
| MB¯A10 | U707 | 14 | LS240 |
| MB¯A10 | U705 | 4 | LS138 |
| MB¯A10 | U514 | 5 | S00 |
| MB¯A10 | U224 | 6 | LS244 |
| MB¯A11 | U707 | 12 | LS240 |
| MB¯A11 | U715 | 5 | LS138 |
| MB¯A11 | U704 | 6 | LS138 |
| MB¯A11 | U224 | 8 | LS244 |
| MB¯A1 | U226 | 20 | 8254 |
| MB¯A12 | U717 | 1 | PAL14L8 |
| MB¯A12 | U224 | 11 | LS244 |
| MB¯A12 | U707 | 9 | LS240 |
| MB¯A13 | U717 | 2 | PAL14L8 |
| MB¯A13 | U707 | 7 | LS240 |
| MB¯A1 | U320 | 4 | LS244 |
| MB¯A14 | U717 | 3 | PAL14L8 |
| MB¯A14 | U707 | 5 | LS240 |
| MB¯A15 | U707 | 3 | LS240 |
| MB¯A15 | U717 | 4 | PAL14L8 |
| MB¯A16 | U713 | 18 | LS240 |
| MB¯A16 | U717 | 5 | PAL14L8 |
| MB¯A17 | U713 | 16 | LS240 |
| MB¯A17 | U717 | 6 | PAL14L8 |
| MB¯A18 | U713 | 14 | LS240 |
| MB¯A18 | U717 | 7 | PAL14L8 |
| MB¯A19 | U713 | 12 | LS240 |
| MB¯A19 | U717 | 8 | PAL14L8 |
| MB¯A20 | U717 | 9 | PAL14L8 |
| MB¯A21 | U717 | 10 | PAL14L8 |
| MB¯A2 | U708 | 14 | LS240 |
| MB¯A21 | U713 | 7 | LS240 |

| | | | |
|---|---|---|---|
| MB_A22 | U717 | 11 | PAL14L8 |
| MB_A22 | U713 | 5 | LS240 |
| MB_A2 | U320 | 6 | LS244 |
| MB_A3 | U708 | 12 | LS240 |
| MB_A3 | U320 | 8 | LS244 |
| MB_A4 | U320 | 11 | LS244 |
| MB_A4 | U708 | 9 | LS240 |
| MB_A5 | U320 | 13 | LS244 |
| MB_A5 | U708 | 7 | LS240 |
| MB_A6 | U320 | 15 | LS244 |
| MB_A6 | U708 | 5 | LS240 |
| MB_A7 | U715 | 1 | LS138 |
| MB_A7 | U320 | 17 | LS244 |
| MB_A7 | U708 | 3 | LS240 |
| MB_A8 | U707 | 18 | LS240 |
| MB_A8 | U224 | 2 | LS244 |
| MB_A9 | U707 | 16 | LS240 |
| MB_A9 | U715 | 3 | LS138 |
| MB_A9 | U224 | 4 | LS244 |
| MB_D0 | U723 | 18 | LS244 |
| MB_D0 | U227 | 2 | LS244 |
| MB_D0 | U712 | 3 | LS273 |
| MB_D0 | U226 | 8 | 8254 |
| MB_D0 | U306 | 9 | LS244 |
| MB_D10 | U109 | 14 | LS244 |
| MB_D10 | U710 | 16 | LS640 |
| MB_D10 | U315 | 4 | LS245 |
| MB_D10 | U419 | 7 | LS273 |
| MB_D11 | U109 | 12 | LS244 |
| MB_D11 | U710 | 15 | LS640 |
| MB_D11 | U315 | 5 | LS245 |
| MB_D1 | U723 | 16 | LS244 |
| MB_D1 | U711 | 17 | LS640 |
| MB_D11 | U419 | 8 | LS273 |
| MB_D12 | U419 | 13 | LS273 |
| MB_D12 | U710 | 14 | LS640 |
| MB_D12 | U315 | 6 | LS245 |
| MB_D12 | U109 | 9 | LS244 |
| MB_D1 | U415 | 3 | LS245 |
| MB_D13 | U710 | 13 | LS640 |
| MB_D13 | U419 | 14 | LS273 |
| MB_D13 | U315 | 7 | LS245 |
| MB_D1 | U227 | 4 | LS244 |
| MB_D14 | U710 | 12 | LS640 |
| MB_D14 | U419 | 17 | LS273 |
| MB_D14 | U109 | 5 | LS244 |
| MB_D14 | U315 | 8 | LS245 |
| MB_D15 | U710 | 11 | LS640 |
| MB_D15 | U419 | 18 | LS273 |
| MB_D15 | U109 | 3 | LS244 |
| MB_D15 | U315 | 9 | LS245 |
| MB_D1 | U226 | 7 | 8254 |
| MB_D2 | U723 | 14 | LS244 |
| MB_D2 | U711 | 16 | LS640 |
| MB_D2 | U415 | 4 | LS245 |
| MB_D2 | U306 | 5 | LS244 |
| MB_D2 | U227 | 6 | LS244 |
| MB_D2 | U712 | 7 | LS273 |
| MB_D3 | U723 | 12 | LS244 |

| | | | |
|---|---|---|---|
| MB_D3 | U711 | 15 | LS640 |
| MB_D3 | U306 | 3 | LS244 |
| MB_D3 | U415 | 5 | LS245 |
| MB_D3 | U227 | 8 | LS244 |
| MB_D4 | U227 | 11 | LS244 |
| MB_D4 | U712 | 13 | LS273 |
| MB_D4 | U711 | 14 | LS640 |
| MB_D4 | U226 | 4 | 8254 |
| MB_D4 | U415 | 6 | LS245 |
| MB_D4 | U723 | 9 | LS244 |
| MB_D5 | U227 | 13 | LS244 |
| MB_D5 | U712 | 14 | LS273 |
| MB_D5 | U226 | 3 | 8254 |
| MB_D5 | U723 | 7 | LS244 |
| MB_D6 | U711 | 12 | LS640 |
| MB_D6 | U227 | 15 | LS244 |
| MB_D6 | U712 | 17 | LS273 |
| MB_D6 | U226 | 2 | 8254 |
| MB_D6 | U723 | 5 | LS244 |
| MB_D6 | U415 | 8 | LS245 |
| MB_D7 | U226 | 1 | 8254 |
| MB_D7 | U711 | 11 | LS640 |
| MB_D7 | U227 | 17 | LS244 |
| MB_D7 | U712 | 18 | LS273 |
| MB_D7 | U723 | 3 | LS244 |
| MB_D7 | U415 | 9 | LS245 |
| MB_D8 | U109 | 18 | LS244 |
| MB_D8 | U315 | 2 | LS245 |
| MB_D8 | U419 | 3 | LS273 |
| MB_D9 | U109 | 16 | LS244 |
| MB_D9 | U710 | 17 | LS640 |
| MB_D9 | U315 | 3 | LS245 |
| MB_D9 | U419 | 4 | LS273 |
| MEM12_ACC | U712 | 6 | LS273 |
| MEM12_ACC | U514 | 9 | S00 |
| MEM12_ACCESS~ | U315 | 19 | LS245 |
| MEM12_ACCESS~ | U514 | 8 | S00 |
| MEM3_ACC | U514 | 4 | S00 |
| MEM3_ACC | U712 | 9 | LS273 |
| MEM3_ACCESS~ | U415 | 19 | LS245 |
| MEM3_ACCESS~ | U514 | 6 | S00 |
| MEM_A_ACCESS | U515 | 1 | S240 |
| MEM_A_ACCESS | U712 | 12 | LS273 |
| MEM_A_ACCESS | U621 | 8 | LS240 |
| MEM_A_ACCESS~ | U614 | 10 | LS125 |
| MEM_A_ACCESS~ | U621 | 12 | LS240 |
| MEM_A_ACCESS~ | U614 | 4 | LS125 |
| MR1_D0 | U214 | 2 | S374 |
| MR1_D0 | U429 | 4 | 67401 |
| MR1_D1 | U429 | 5 | 67401 |
| MR1_D2 | U429 | 6 | 67401 |
| MR1_D3 | U429 | 7 | 67401 |
| MR1_D3 | U214 | 9 | S374 |
| MR1_D4 | U214 | 12 | S374 |
| MR1_D4 | U428 | 4 | 67401 |
| MR1_D5 | U214 | 15 | S374 |
| MR1_D5 | U428 | 5 | 67401 |
| MR1_D6 | U214 | 16 | S374 |
| MR1_D6 | U428 | 6 | 67401 |

| | | | |
|---|---|---|---|
| MR1_D7 | U214 | 19 | S374 |
| MR1_D7 | U428 | 7 | 67401 |
| MR2_D0 | U314 | 2 | S374 |
| MR2_D0 | U330 | 4 | 67401 |
| MR2_D1 | U330 | 5 | 67401 |
| MR2_D2 | U330 | 6 | 67401 |
| MR2_D3 | U330 | 7 | 67401 |
| MR2_D3 | U314 | 9 | S374 |
| MR2_D4 | U314 | 12 | S374 |
| MR2_D4 | U328 | 4 | 67401 |
| MR2_D5 | U314 | 15 | S374 |
| MR2_D5 | U328 | 5 | 67401 |
| MR2_D6 | U314 | 16 | S374 |
| MR2_D6 | U328 | 6 | 67401 |
| MR2_D7 | U314 | 19 | S374 |
| MR2_D7 | U328 | 7 | 67401 |
| MR3_D0 | U414 | 2 | S374 |
| MR3_D0 | U430 | 4 | 67401 |
| MR3_D1 | U430 | 5 | 67401 |
| MR3_D2 | U430 | 6 | 67401 |
| MR3_D3 | U430 | 7 | 67401 |
| MR3_D3 | U414 | 9 | S374 |
| MR3_D4 | U414 | 12 | S374 |
| MR3_D4 | U329 | 4 | 67401 |
| MR3_D5 | U414 | 15 | S374 |
| MR3_D5 | U329 | 5 | 67401 |
| MR3_D6 | U414 | 16 | S374 |
| MR3_D6 | U329 | 6 | 67401 |
| MR3_D7 | U414 | 19 | S374 |
| MR3_D7 | U329 | 7 | 67401 |
| MRDC~ | U703 | 2 | LS244 |
| MRD~ | U415 | 1 | LS245 |
| MRD~ | U716 | 18 | PAL14L8 |
| MRD~ | U226 | 22 | 8254 |
| MUX12_RDBK~ | U313 | 1 | LS244 |
| MUX12_RDBK~ | U705 | 15 | LS138 |
| MUX12_RDBK~ | U313 | 19 | LS244 |
| MUX1_D0 | U726 | 2 | F374 |
| MUX1_D0 | U411 | 3 | LS374 |
| MUX1_D0 | U729 | 4 | 67401 |
| MUX1_D1 | U624 | 4 | F244 |
| MUX1_D1 | U729 | 5 | 67401 |
| MUX1_D2 | U729 | 6 | 67401 |
| MUX1_D2 | U411 | 7 | LS374 |
| MUX1_D3 | U729 | 7 | 67401 |
| MUX1_D3 | U624 | 8 | F244 |
| MUX1_D3 | U726 | 9 | F374 |
| MUX1_D4 | U624 | 11 | F244 |
| MUX1_D4 | U726 | 12 | F374 |
| MUX1_D4 | U411 | 13 | LS374 |
| MUX1_D4 | U728 | 4 | 67401 |
| MUX1_D5 | U624 | 13 | F244 |
| MUX1_D5 | U411 | 14 | LS374 |
| MUX1_D5 | U726 | 15 | F374 |
| MUX1_D5 | U728 | 5 | 67401 |
| MUX1_D6 | U624 | 15 | F244 |
| MUX1_D6 | U726 | 16 | F374 |
| MUX1_D6 | U411 | 17 | LS374 |

| | | | |
|---|---|---|---|
| MUX1_D6 | U728 | 6 | 67401 |
| MUX1_D7 | U624 | 17 | F244 |
| MUX1_D7 | U411 | 18 | LS374 |
| MUX1_D7 | U726 | 19 | F374 |
| MUX1_D7 | U728 | 7 | 67401 |
| MUX2_D0 | U727 | 18 | F244 |
| MUX2_D0 | U627 | 2 | F374 |
| MUX2_D0 | U409 | 3 | LS374 |
| MUX2_D0 | U730 | 4 | 67401 |
| MUX2_D1 | U727 | 16 | F244 |
| MUX2_D1 | U409 | 4 | LS374 |
| MUX2_D1 | U730 | 5 | 67401 |
| MUX2_D2 | U727 | 14 | F244 |
| MUX2_D2 | U730 | 6 | 67401 |
| MUX2_D2 | U409 | 7 | LS374 |
| MUX2_D3 | U727 | 12 | F244 |
| MUX2_D3 | U730 | 7 | 67401 |
| MUX2_D3 | U409 | 8 | LS374 |
| MUX2_D3 | U627 | 9 | F374 |
| MUX2_D4 | U120 | 11 | LS244 |
| MUX2_D4 | U627 | 12 | F374 |
| MUX2_D4 | U409 | 13 | LS374 |
| MUX2_D4 | U530 | 4 | 67401 |
| MUX2_D4 | U727 | 9 | F244 |
| MUX2_D5 | U120 | 13 | LS244 |
| MUX2_D5 | U409 | 14 | LS374 |
| MUX2_D5 | U627 | 15 | F374 |
| MUX2_D5 | U530 | 5 | 67401 |
| MUX2_D5 | U727 | 7 | F244 |
| MUX2_D6 | U120 | 15 | LS244 |
| MUX2_D6 | U627 | 16 | F374 |
| MUX2_D6 | U409 | 17 | LS374 |
| MUX2_D6 | U727 | 5 | F244 |
| MUX2_D6 | U530 | 6 | 67401 |
| MUX2_D7 | U120 | 17 | LS244 |
| MUX2_D7 | U409 | 18 | LS374 |
| MUX2_D7 | U627 | 19 | F374 |
| MUX2_D7 | U727 | 3 | F244 |
| MUX2_D7 | U530 | 7 | 67401 |
| MUX3_D0 | U624 | 18 | F244 |
| MUX3_D0 | U427 | 2 | F374 |
| MUX3_D0 | U407 | 3 | LS374 |
| MUX3_D0 | U529 | 4 | 67401 |
| MUX3_D1 | U624 | 16 | F244 |
| MUX3_D1 | U407 | 4 | LS374 |
| MUX3_D1 | U529 | 5 | 67401 |
| MUX3_D2 | U624 | 14 | F244 |
| MUX3_D2 | U529 | 6 | 67401 |
| MUX3_D2 | U407 | 7 | LS374 |
| MUX3_D3 | U624 | 12 | F244 |
| MUX3_D3 | U529 | 7 | 67401 |
| MUX3_D3 | U407 | 8 | LS374 |
| MUX3_D3 | U427 | 9 | F374 |
| MUX3_D4 | U508 | 11 | LS244 |
| MUX3_D4 | U427 | 12 | F374 |
| MUX3_D4 | U407 | 13 | LS374 |
| MUX3_D4 | U629 | 4 | 67401 |
| MUX3_D4 | U624 | 9 | F244 |
| MUX3_D5 | U508 | 13 | LS244 |

| | | | |
|---|---|---|---|
| MUX3_D5 | U407 | 14 | LS374 |
| MUX3_D5 | U427 | 15 | F374 |
| MUX3_D5 | U629 | 5 | 67401 |
| MUX3_D5 | U624 | 7 | F244 |
| MUX3_D6 | U508 | 15 | LS244 |
| MUX3_D6 | U427 | 16 | F374 |
| MUX3_D6 | U407 | 17 | LS374 |
| MUX3_D6 | U624 | 5 | F244 |
| MUX3_D6 | U629 | 6 | 67401 |
| MUX3_D7 | U508 | 17 | LS244 |
| MUX3_D7 | U407 | 18 | LS374 |
| MUX3_D7 | U427 | 19 | F374 |
| MUX3_D7 | U624 | 3 | F244 |
| MUX3_D7 | U629 | 7 | 67401 |
| MUX3_RDBK~ | U508 | 1 | LS244 |
| MUX3_RDBK~ | U705 | 14 | LS138 |
| MUX3_RDBK~ | U508 | 19 | LS244 |
| MWR_TEST~ | U514 | 2 | S00 |
| MWR~ | U716 | 17 | PAL14L8 |
| MWR~ | U226 | 23 | 8254 |
| MWTC~ | U703 | 4 | LS244 |
| NEW1_D0 | U429 | 13 | 67401 |
| NEW1_D0 | U625 | 3 | F374 |
| NEW1_D1 | U429 | 12 | 67401 |
| NEW1_D1 | U625 | 4 | F374 |
| NEW1_D2 | U429 | 11 | 67401 |
| NEW1_D2 | U625 | 7 | F374 |
| NEW1_D3 | U429 | 10 | 67401 |
| NEW1_D3 | U625 | 8 | F374 |
| NEW1_D4 | U428 | 13 | 67401 |
| NEW1_D5 | U428 | 12 | 67401 |
| NEW1_D5 | U625 | 14 | F374 |
| NEW1_D6 | U428 | 11 | 67401 |
| NEW1_D6 | U625 | 17 | F374 |
| NEW1_D7 | U428 | 10 | 67401 |
| NEW1_D7 | U625 | 18 | F374 |
| NEW1_ENB~ | U625 | 1 | F374 |
| NEW1_ENB~ | U115 | 15 | F374 |
| NEW2_D0 | U330 | 13 | 67401 |
| NEW2_D0 | U326 | 3 | F374 |
| NEW2_D1 | U330 | 12 | 67401 |
| NEW2_D1 | U326 | 4 | F374 |
| NEW2_D2 | U330 | 11 | 67401 |
| NEW2_D2 | U326 | 7 | F374 |
| NEW2_D3 | U330 | 10 | 67401 |
| NEW2_D3 | U326 | 8 | F374 |
| NEW2_D4 | U328 | 13 | 67401 |
| NEW2_D5 | U328 | 12 | 67401 |
| NEW2_D5 | U326 | 14 | F374 |
| NEW2_D6 | U328 | 11 | 67401 |
| NEW2_D6 | U326 | 17 | F374 |
| NEW2_D7 | U328 | 10 | 67401 |
| NEW2_D7 | U326 | 18 | F374 |
| NEW3_D0 | U430 | 13 | 67401 |
| NEW3_D0 | U426 | 3 | F374 |
| NEW3_D1 | U430 | 12 | 67401 |
| NEW3_D1 | U426 | 4 | F374 |
| NEW3_D2 | U430 | 11 | 67401 |
| NEW3_D2 | U426 | 7 | F374 |

| | | | |
|---|---|---|---|
| NEW3_D3 | U430 | 10 | 67401 |
| NEW3_D3 | U426 | 8 | F374 |
| NEW3_D4 | U329 | 13 | 67401 |
| NEW3_D5 | U329 | 12 | 67401 |
| NEW3_D5 | U426 | 14 | F374 |
| NEW3_D6 | U329 | 11 | 67401 |
| NEW3_D6 | U426 | 17 | F374 |
| NEW3_D7 | U329 | 10 | 67401 |
| NEW3_D7 | U426 | 18 | F374 |
| NEWF_FAIL | U417 | 13 | LS244 |
| NEWF_FAIL | U617 | 6 | S74 |
| NEW_ENB~ | U426 | 1 | F374 |
| NEW_ENB~ | U115 | 5 | F374 |
| OBF1_C0 | U612 | 15 | S169 |
| OBF1_C0 | U509 | 2 | LS244 |
| OBF1_C1 | U213 | 15 | S169 |
| OBF1_C1 | U509 | 4 | LS244 |
| OBF2_C0 | U609 | 15 | S169 |
| OBF2_C0 | U509 | 6 | LS244 |
| OBF2_C1 | U110 | 15 | S169 |
| OBF2_C1 | U509 | 8 | LS244 |
| OBF3_C0 | U509 | 11 | LS244 |
| OBF3_C0 | U607 | 15 | S169 |
| OBF3_C1 | U509 | 13 | LS244 |
| OBF3_C1 | U108 | 15 | S169 |
| OBF_RDCLK | U512 | 11 | S157 |
| OBF_RDCLK | U512 | 13 | S157 |
| OBF_RDCLK | U206 | 18 | S241 |
| OBF_RDCLK | U512 | 3 | S157 |
| OBF_RDCLK | U512 | 5 | S157 |
| OBF_RDCLK | U206 | 9 | S241 |
| OBWR_CLR~ | U412 | 12 | LS74 |
| OBWR_CLR~ | U521 | 15 | LS374 |
| ODTYPE0_L | U622 | 2 | S374 |
| ODTYPE0_L | U513 | 4 | LS175 |
| ODTYPE0~ | U513 | 2 | LS175 |
| ODTYPE1_L | U622 | 5 | S374 |
| ODTYPE1~ | U306 | 4 | LS244 |
| ODTYPE1~ | U513 | 7 | LS175 |
| OFDBK0 | U423 | 18 | LS244 |
| OFDBK0 | U526 | 23 | 29823 |
| OFDBK0 | U623 | 8 | 2018 |
| OFDBK1 | U423 | 16 | LS244 |
| OFDBK1 | U526 | 22 | 29823 |
| OFDBK1 | U623 | 7 | 2018 |
| OFDBK2 | U423 | 14 | LS244 |
| OFDBK2 | U526 | 21 | 29823 |
| OFDBK2 | U623 | 6 | 2018 |
| OFDBK3 | U423 | 12 | LS244 |
| OFDBK3 | U526 | 20 | 29823 |
| OFDBK3 | U623 | 5 | 2018 |
| OFDBK4 | U526 | 19 | 29823 |
| OFDBK4 | U623 | 4 | 2018 |
| OFDBK4 | U423 | 9 | LS244 |
| OFDBK5 | U526 | 18 | 29823 |
| OFDBK5 | U623 | 3 | 2018 |
| OFDBK5 | U423 | 7 | LS244 |
| OFDBK6 | U526 | 17 | 29823 |
| OFDBK6 | U623 | 2 | 2018 |

| | | | |
|---|---|---|---|
| OFDBK6 | U423 | 5 | LS244 |
| OFDBK7 | U623 | 1 | 2018 |
| OFDBK7 | U526 | 16 | 29823 |
| OFDBK7 | U423 | 3 | LS244 |
| OFDBK8 | U526 | 15 | 29823 |
| OFDBK8 | U420 | 18 | LS244 |
| OFDBK8 | U623 | 23 | 2018 |
| OFDBK9 | U420 | 16 | LS244 |
| OFDBK9 | U623 | 22 | 2018 |
| OFDBK9 | U522 | 23 | 29823 |
| OLD1_0 | U729 | 13 | 67401 |
| OLD1_0 | U726 | 3 | F374 |
| OLD1_1 | U729 | 12 | 67401 |
| OLD1_1 | U726 | 4 | F374 |
| OLD1_2 | U729 | 11 | 67401 |
| OLD1_2 | U726 | 7 | F374 |
| OLD1_3 | U729 | 10 | 67401 |
| OLD1_3 | U726 | 8 | F374 |
| OLD1_4 | U728 | 13 | 67401 |
| OLD1_5 | U728 | 12 | 67401 |
| OLD1_5 | U726 | 14 | F374 |
| OLD1_6 | U728 | 11 | 67401 |
| OLD1_6 | U726 | 17 | F374 |
| OLD1_7 | U728 | 10 | 67401 |
| OLD1_7 | U726 | 18 | F374 |
| OLD2_0 | U730 | 13 | 67401 |
| OLD2_0 | U627 | 3 | F374 |
| OLD2_1 | U730 | 12 | 67401 |
| OLD2_1 | U627 | 4 | F374 |
| OLD2_2 | U730 | 11 | 67401 |
| OLD2_2 | U627 | 7 | F374 |
| OLD2_3 | U730 | 10 | 67401 |
| OLD2_3 | U627 | 8 | F374 |
| OLD2_4 | U530 | 13 | 67401 |
| OLD2_5 | U530 | 12 | 67401 |
| OLD2_5 | U627 | 14 | F374 |
| OLD2_6 | U530 | 11 | 67401 |
| OLD2_6 | U627 | 17 | F374 |
| OLD2_7 | U530 | 10 | 67401 |
| OLD2_7 | U627 | 18 | F374 |
| OLD3_0 | U529 | 13 | 67401 |
| OLD3_0 | U427 | 3 | F374 |
| OLD3_1 | U529 | 12 | 67401 |
| OLD3_1 | U427 | 4 | F374 |
| OLD3_2 | U529 | 11 | 67401 |
| OLD3_2 | U427 | 7 | F374 |
| OLD3_3 | U529 | 10 | 67401 |
| OLD3_3 | U427 | 8 | F374 |
| OLD3_4 | U528 | 13 | 67401 |
| OLD3_5 | U528 | 12 | 67401 |
| OLD3_5 | U427 | 14 | F374 |
| OLD3_6 | U528 | 11 | 67401 |
| OLD3_6 | U427 | 17 | F374 |
| OLD3_7 | U528 | 10 | 67401 |
| OLD3_7 | U427 | 18 | F374 |
| OLDF_FAIL | U417 | 15 | LS244 |
| OLDF_FAIL | U628 | 6 | LS74 |
| OLD_ENB~ | U726 | 1 | F374 |
| OLD_ENB~ | U115 | 6 | F374 |

| | | | |
|---|---|---|---|
| OLD_OR1 | U728 | 14 | 67401 |
| OLD_OR1 | U628 | 2 | LS74 |
| OR1 | U429 | 14 | 67401 |
| OR1 | U617 | 2 | S74 |
| OR1L | U126 | 1 | LS30 |
| OR1L | U129 | 14 | 67401 |
| OR1U | U229 | 14 | 67401 |
| OR1U | U126 | 2 | LS30 |
| OR2L | U130 | 14 | 67401 |
| OR2L | U126 | 3 | LS30 |
| OR2U | U230 | 14 | 67401 |
| OR2U | U126 | 4 | LS30 |
| OR3L | U128 | 14 | 67401 |
| OR3L | U126 | 5 | LS30 |
| OR3U | U126 | 11 | LS30 |
| OR3U | U126 | 12 | LS30 |
| OR3U | U228 | 14 | 67401 |
| OR3U | U126 | 6 | LS30 |
| OSC | U616 | 10 | S195 |
| OSC | U617 | 11 | S74 |
| OSC | U517 | 8 | S00 |
| OTEST~ | U206 | 1 | S241 |
| OTEST~ | U322 | 10 | S139 |
| OTEST~ | U615 | 13 | S08 |
| OTEST~ | U206 | 19 | S241 |
| OTSEQ_A_ACCESS | U526 | 1 | 29823 |
| OTSEQ_A_ACCESS | U719 | 18 | LS240 |
| OTSEQ_A_ACCESS | U423 | 1 | LS244 |
| OTSEQ_A_ACCESS | U423 | 19 | LS244 |
| OTSEQ_A_ACCESS | U719 | 2 | LS240 |
| OTSEQ_A_ACCESS | U718 | 20 | PAL14L8 |
| OTSEQ_CLK | U521 | 11 | LS374 |
| OTSEQ_CLK | U526 | 13 | 29823 |
| OTSEQ_CLK | U515 | 9 | S240 |
| OTSEQ_CLK~ | U324 | 10 | S00 |
| OTSEQ_CLK~ | U411 | 11 | LS374 |
| OTSEQ_CLK~ | U619 | 13 | S10 |
| OTSEQ_CLK~ | U324 | 2 | S00 |
| OTSEQ_CLK~ | U619 | 5 | S10 |
| OTSEQ_H_ACC~ | U717 | 18 | PAL14L8 |
| OTSEQ_H_ACC~ | U421 | 19 | LS245 |
| OTSEQ_L_ACC~ | U425 | 19 | LS245 |
| OTSEQ_WRL~ | U716 | 20 | PAL14L8 |
| OTSEQ_WRL~ | U523 | 21 | 2018 |
| OTSEQ_WRU~ | U716 | 19 | PAL14L8 |
| OTSEQ_WRU~ | U623 | 21 | 2018 |
| OT_CKEN~ | U526 | 14 | 29823 |
| OT_CKEN~ | U419 | 19 | LS273 |
| OT_PRST~ | U526 | 11 | 29823 |
| OT_PRST~ | U518 | 12 | LS279 |
| OT_PRST~ | U521 | 16 | LS374 |
| INIT~ | | P1-16 | CONNECTOR |
| IB_D~2 | | P1-21 | CONNECTOR |
| MRDC~ | | P1-23 | CONNECTOR |
| MWTC~ | | P1-24 | CONNECTOR |
| XACK~ | | P1-27 | CONNECTOR |
| IB_D~6 | | P1-31 | CONNECTOR |
| ADR16~ | | P1-34 | CONNECTOR |
| ADR17~ | | P1-36 | CONNECTOR |

| | | |
|---|---|---|
| CCLK~ | P1-37 | CONNECTOR |
| ADR18~ | P1-38 | CONNECTOR |
| ADR19~ | P1-40 | CONNECTOR |
| IB_D~7 | P1-41 | CONNECTOR |
| ADR14~ | P1-53 | CONNECTOR |
| ADR15~ | P1-54 | CONNECTOR |
| ADR12~ | P1-55 | CONNECTOR |
| ADR13~ | P1-56 | CONNECTOR |
| ADR10~ | P1-57 | CONNECTOR |
| ADR11~ | P1-58 | CONNECTOR |
| ADR8~ | P1-59 | CONNECTOR |
| ADR9~ | P1-60 | CONNECTOR |
| IB_EOL~ | P1-61 | CONNECTOR |
| ADR6~ | P1-63 | CONNECTOR |
| ADR7~ | P1-64 | CONNECTOR |
| ADR4~ | P1-65 | CONNECTOR |
| ADR5~ | P1-66 | CONNECTOR |
| ADR2~ | P1-67 | CONNECTOR |
| ADR3~ | P1-68 | CONNECTOR |
| ADR1~ | P1-70 | CONNECTOR |
| DATE~ | P1-73 | CONNECTOR |
| DATF~ | P1-74 | CONNECTOR |
| DATC~ | P1-75 | CONNECTOR |
| DATD~ | P1-76 | CONNECTOR |
| DATA~ | P1-77 | CONNECTOR |
| DATB~ | P1-78 | CONNECTOR |
| DAT8~ | P1-79 | CONNECTOR |
| DAT9~ | P1-80 | CONNECTOR |
| LINE_REQ~ | P1-81 | CONNECTOR |
| DAT6~ | P1-83 | CONNECTOR |
| DAT7~ | P1-84 | CONNECTOR |
| DAT4~ | P1-85 | CONNECTOR |
| DAT5~ | P1-86 | CONNECTOR |
| DAT2~ | P1-87 | CONNECTOR |
| DAT3~ | P1-88 | CONNECTOR |
| DAT0~ | P1-89 | CONNECTOR |
| DAT1~ | P1-90 | CONNECTOR |
| IB_D~0 | P2-1 | CONNECTOR |
| IB_D~5 | P2-100 | CONNECTOR |
| IB_SHIFT1~ | P2-15 | CONNECTOR |
| IB_SHIFT2~ | P2-17 | CONNECTOR |
| IB_SHIFT3~ | P2-19 | CONNECTOR |
| IB_D~1 | P2-21 | CONNECTOR |
| IB_RDY1~ | P2-23 | CONNECTOR |
| IB_RDY2~ | P2-25 | CONNECTOR |
| IB_RDY3~ | P2-27 | CONNECTOR |
| PC_D~0 | P2-31 | CONNECTOR |
| PC_D~1 | P2-33 | CONNECTOR |
| PC_D~2 | P2-35 | CONNECTOR |
| PC_D~3 | P2-37 | CONNECTOR |
| PC_D~4 | P2-39 | CONNECTOR |
| PC_D~5 | P2-41 | CONNECTOR |
| PC_D~6 | P2-43 | CONNECTOR |
| PC_D~7 | P2-45 | CONNECTOR |
| IREADY_OUT1~ | P2-53 | CONNECTOR |
| IREADY_OUT2~ | P2-55 | CONNECTOR |
| IREADY_OUT3~ | P2-57 | CONNECTOR |
| PC_SHIFT1~ | P2-63 | CONNECTOR |
| PC_SHIFT2~ | P2-65 | CONNECTOR |

| | | | |
|---|---|---|---|
| PC_SHIFT3~ | | P2-67 | CONNECTOR |
| PC_EOL~ | | P2-73 | CONNECTOR |
| ADR23~ | | P2-76 | CONNECTOR |
| ADR21~ | | P2-78 | CONNECTOR |
| ADR22~ | | P2-81 | CONNECTOR |
| ADR20~ | | P2-83 | CONNECTOR |
| IB_D~4 | | P2-98 | CONNECTOR |
| IB_D~3 | | P2-99 | CONNECTOR |
| PAR1_RDBK~ | U723 | 1 | LS244 |
| PAR1_RDBK~ | U705 | 10 | LS138 |
| PAR1_RDBK~ | U723 | 19 | LS244 |
| PAR2_RDBK~ | U306 | 19 | LS244 |
| PAR2_RDBK~ | U705 | 9 | LS138 |
| PC_D~0 | U721 | 2 | S240 |
| PC_D~1 | U721 | 4 | S240 |
| PC_D~2 | U721 | 6 | S240 |
| PC_D~3 | U721 | 8 | S240 |
| PC_D~4 | U721 | 11 | S240 |
| PC_D~5 | U721 | 13 | S240 |
| PC_D~6 | U721 | 15 | S240 |
| PC_D~7 | U721 | 17 | S240 |
| PC_EOL~ | U725 | 17 | S240 |
| PC_SHIFT1~ | U725 | 11 | S240 |
| PC_SHIFT2~ | U725 | 13 | S240 |
| PC_SHIFT3~ | U725 | 15 | S240 |
| PD1~ | U214 | 1 | S374 |
| PD1~ | U515 | 19 | S240 |
| PD1~ | U719 | 7 | LS240 |
| PREV_CARD_SEL~ | U721 | 1 | S240 |
| PREV_CARD_SEL~ | U322 | 12 | S139 |
| PREV_CARD_SEL~ | U725 | 19 | S240 |
| PU11 | U513 | 1 | LS175 |
| PU11 | U412 | 10 | LS74 |
| PU11 | U613 | 11 | 316A102 1K |
| PU11 | U412 | 13 | LS74 |
| PU11 | U412 | 4 | LS74 |
| PU11 | U114 | 6 | S138 |
| PU12 | U714 | 1 | LS164 |
| PU12 | U613 | 12 | 316A102 1K |
| PU12 | U714 | 2 | LS164 |
| PU12 | U705 | 6 | LS138 |
| PU3 | U613 | 1 | 316A102 1K |
| PU3 | U618 | 10 | S163 |
| PU3 | U119 | 11 | 29823 |
| PU3 | U220 | 26 | MP6264 |
| PU3 | U618 | 3 | S163 |
| PU3 | U618 | 4 | S163 |
| PU3 | U618 | 5 | S163 |
| PU3 | U618 | 6 | S163 |
| PU3 | U618 | 7 | S163 |
| PU4 | U125 | 1 | LS74 |
| PU4 | U226 | 14 | 8254 |
| PU4 | U613 | 2 | 316A102 1K |
| PU4 | U616 | 9 | S195 |
| PU5 | U613 | 3 | 316A102 1K |
| PU5 | U604 | 9 | F163 |
| QR_0 | U505 | 14 | F169 |
| QR_0 | U504 | 2 | S240 |
| QR_10 | U606 | 12 | F169 |

| | | | |
|---|---|---|---|
| QR_10 | U501 | 6 | S240 |
| QR_11 | U606 | 11 | F169 |
| QR_1 | U505 | 13 | F169 |
| QR_11 | U501 | 8 | S240 |
| QR_1 | U504 | 4 | S240 |
| QR_2 | U505 | 12 | F169 |
| QR_2 | U504 | 6 | S240 |
| QR_3 | U505 | 11 | F169 |
| QR_3 | U504 | 8 | S240 |
| QR_4 | U504 | 11 | S240 |
| QR_4 | U605 | 14 | F169 |
| QR_5 | U605 | 13 | F169 |
| QR_6 | U605 | 12 | F169 |
| QR_6 | U504 | 15 | S240 |
| QR_7 | U605 | 11 | F169 |
| QR_7 | U504 | 17 | S240 |
| QR_8 | U606 | 14 | F169 |
| QR_8 | U501 | 2 | S240 |
| QR_9 | U606 | 13 | F169 |
| QR_9 | U501 | 4 | S240 |
| QW_0 | U604 | 14 | F163 |
| QW_0 | U503 | 2 | S240 |
| QW_10 | U602 | 12 | F163 |
| QW_10 | U502 | 6 | S240 |
| QW_11 | U602 | 11 | F163 |
| QW_1 | U604 | 13 | F163 |
| QW_11 | U502 | 8 | S240 |
| QW_12 | U502 | 11 | S240 |
| QW_12 | U702 | 9 | S74 |
| QW_1 | U503 | 4 | S240 |
| QW_2 | U604 | 12 | F163 |
| QW_2 | U503 | 6 | S240 |
| QW_3 | U604 | 11 | F163 |
| QW_3 | U503 | 8 | S240 |
| QW_4 | U503 | 11 | S240 |
| QW_4 | U603 | 14 | F163 |
| QW_5 | U603 | 13 | F163 |
| QW_6 | U603 | 12 | F163 |
| QW_6 | U503 | 15 | S240 |
| QW_7 | U603 | 11 | F163 |
| QW_7 | U503 | 17 | S240 |
| QW_8 | U602 | 14 | F163 |
| QW_8 | U502 | 2 | S240 |
| QW_9 | U602 | 13 | F163 |
| QW_9 | U502 | 4 | S240 |
| RDY_FF1~ | U123 | 12 | S08 |
| RDY_FF1~ | U124 | 15 | S151 |
| RDY_FF1~ | U418 | 3 | S151 |
| RDY_FF1~ | U518 | 4 | LS279 |
| RDY_FF2~ | U418 | 15 | S151 |
| RDY_FF2~ | U412 | 3 | LS74 |
| RDY_FF2~ | U306 | 6 | LS244 |
| RDY_FF2~ | U518 | 9 | LS279 |
| RD_ADR_DN~ | U505 | 1 | F169 |
| RD_ADR_DN~ | U118 | 16 | 29823 |
| RD_ADR_MSB | U501 | 11 | S240 |
| RD_ADR_MSB | U506 | 14 | F169 |
| RD_ADR_MSB | U417 | 6 | LS244 |
| RUN | U119 | 10 | 29823 |

| | | | |
|---|---|---|---|
| RUN | U419 | 15 | LS273 |
| RUN | U521 | 17 | LS374 |
| SA12~ | U119 | 17 | 29823 |
| SA12~ | U706 | 2 | LS240 |
| SD0 | U220 | 11 | MP6264 |
| SD0 | U321 | 18 | LS245 |
| SD0 | U318 | 2 | 29823 |
| SD10 | U218 | 13 | MP6264 |
| SD10 | U122 | 16 | LS245 |
| SD10 | U118 | 3 | 29823 |
| SD11 | U218 | 15 | MP6264 |
| SD1 | U220 | 12 | MP6264 |
| SD11 | U118 | 4 | 29823 |
| SD1 | U321 | 17 | LS245 |
| SD12 | U122 | 14 | LS245 |
| SD12 | U218 | 16 | MP6264 |
| SD12 | U118 | 5 | 29823 |
| SD1 | U318 | 3 | 29823 |
| SD13 | U122 | 13 | LS245 |
| SD13 | U218 | 17 | MP6264 |
| SD13 | U118 | 6 | 29823 |
| SD14 | U122 | 12 | LS245 |
| SD14 | U218 | 18 | MP6264 |
| SD14 | U118 | 7 | 29823 |
| SD15 | U122 | 11 | LS245 |
| SD15 | U218 | 19 | MP6264 |
| SD15 | U118 | 8 | 29823 |
| SD16 | U517 | 1 | S00 |
| SD16 | U223 | 11 | MP6264 |
| SD16 | U324 | 13 | S00 |
| SD16 | U323 | 18 | LS245 |
| SD16 | U123 | 4 | S08 |
| SD17 | U124 | 11 | S151 |
| SD17 | U223 | 12 | MP6264 |
| SD17 | U323 | 17 | LS245 |
| SD17 | U517 | 2 | S00 |
| SD17 | U325 | 5 | S02 |
| SD18 | U124 | 10 | S151 |
| SD18 | U223 | 13 | MP6264 |
| SD18 | U323 | 16 | LS245 |
| SD18 | U123 | 5 | S08 |
| SD18 | U325 | 6 | S02 |
| SD19 | U323 | 15 | LS245 |
| SD19 | U124 | 9 | S151 |
| SD20 | U323 | 14 | LS245 |
| SD20 | U223 | 16 | MP6264 |
| SD20 | U319 | 4 | 29823 |
| SD21 | U323 | 13 | LS245 |
| SD21 | U223 | 17 | MP6264 |
| SD2 | U220 | 13 | MP6264 |
| SD21 | U319 | 5 | 29823 |
| SD2 | U321 | 16 | LS245 |
| SD22 | U323 | 12 | LS245 |
| SD22 | U223 | 18 | MP6264 |
| SD22 | U322 | 2 | S139 |
| SD23 | U323 | 11 | LS245 |
| SD23 | U223 | 19 | MP6264 |
| SD23 | U322 | 3 | S139 |
| SD2 | U318 | 4 | 29823 |

| | | | |
|---|---|---|---|
| SD24 | U222 | 11 | MP6264 |
| SD24 | U121 | 18 | LS245 |
| SD24 | U119 | 2 | 29823 |
| SD25 | U222 | 12 | MP6264 |
| SD25 | U121 | 17 | LS245 |
| SD25 | U119 | 3 | 29823 |
| SD26 | U222 | 13 | MP6264 |
| SD26 | U121 | 16 | LS245 |
| SD26 | U119 | 4 | 29823 |
| SD27 | U121 | 15 | LS245 |
| SD27 | U119 | 5 | 29823 |
| SD28 | U121 | 14 | LS245 |
| SD28 | U222 | 16 | MP6264 |
| SD28 | U119 | 6 | 29823 |
| SD29 | U121 | 13 | LS245 |
| SD29 | U222 | 17 | MP6264 |
| SD29 | U119 | 7 | 29823 |
| SD30 | U121 | 12 | LS245 |
| SD30 | U222 | 18 | MP6264 |
| SD30 | U119 | 8 | 29823 |
| SD31 | U121 | 11 | LS245 |
| SD31 | U222 | 19 | MP6264 |
| SD3 | U220 | 15 | MP6264 |
| SD31 | U119 | 9 | 29823 |
| SD3 | U318 | 5 | 29823 |
| SD4 | U321 | 14 | LS245 |
| SD4 | U220 | 16 | MP6264 |
| SD4 | U318 | 6 | 29823 |
| SD5 | U321 | 13 | LS245 |
| SD5 | U220 | 17 | MP6264 |
| SD5 | U318 | 7 | 29823 |
| SD6 | U321 | 12 | LS245 |
| SD6 | U220 | 18 | MP6264 |
| SD6 | U318 | 8 | 29823 |
| SD7 | U321 | 11 | LS245 |
| SD7 | U220 | 19 | MP6264 |
| SD7 | U318 | 9 | 29823 |
| SD8 | U318 | 10 | 29823 |
| SD8 | U218 | 11 | MP6264 |
| SD8 | U122 | 18 | LS245 |
| SD9 | U218 | 12 | MP6264 |
| SD9 | U122 | 17 | LS245 |
| SD9 | U118 | 2 | 29823 |
| SEL_JC1 | U118 | 10 | 29823 |
| SEL_JC1 | U417 | 2 | LS244 |
| SEL_JC1 | U124 | 6 | S151 |
| SEL_JC2 | U522 | 10 | 29823 |
| SEL_JC2 | U417 | 11 | LS244 |
| SEL_JC2 | U418 | 6 | S151 |
| SEP2T3~ | U326 | 1 | F374 |
| SEP2T3~ | U115 | 9 | F374 |
| SHARP_SEL_0 | U527 | 4 | PAL14L4 |
| SHARP_SEL_0 | U419 | 9 | LS273 |
| SHARP_SEL_1 | U419 | 12 | LS273 |
| SHARP_SEL_1 | U527 | 5 | PAL14L4 |
| SI1 | U527 | 1 | PAL14L4 |
| SI1 | U724 | 18 | LS240 |
| SI1 | U725 | 9 | S240 |
| SI1X | U527 | 17 | PAL14L4 |

| | | | |
|---|---|---|---|
| SI1X | U229 | 3 | 67401 |
| SI2 | U724 | 16 | LS240 |
| SI2 | U527 | 2 | PAL14L4 |
| SI2 | U725 | 7 | S240 |
| SI2X | U527 | 16 | PAL14L4 |
| SI2X | U130 | 3 | 67401 |
| SI3 | U724 | 14 | LS240 |
| SI3 | U527 | 3 | PAL14L4 |
| SI3 | U725 | 5 | S240 |
| SI3X | U527 | 15 | PAL14L4 |
| SI3X | U128 | 3 | 67401 |
| SI_CENTERS | U520 | 11 | S08 |
| SI_CENTERS | U629 | 3 | 67401 |
| SI_NEW | U330 | 3 | 67401 |
| SI_NEW | U123 | 8 | S08 |
| SI_NEW_ENB | U123 | 10 | S08 |
| SI_NEW_ENB | U119 | 23 | 29823 |
| SI_OLD | U729 | 3 | 67401 |
| SO_CENTERS | U325 | 10 | S02 |
| SO_CENTERS | U628 | 11 | LS74 |
| SO_CENTERS | U629 | 15 | 67401 |
| SO_CENTERS~ | U626 | 11 | F374 |
| SO_CENTERS~ | U324 | 8 | S00 |
| SO_CENTERS~ | U325 | 9 | S02 |
| SO_CH456~ | U206 | 16 | S241 |
| SO_CH456~ | U207 | 3 | S157 |
| SO_CH456~ | U207 | 5 | S157 |
| SO_CH456~ | U206 | 7 | S241 |
| SO_IF | U215 | 11 | LS374 |
| SO_IF | U317 | 12 | S11 |
| SO_IF | U229 | 15 | 67401 |
| SO_IF_ENB | U317 | 1 | S11 |
| SO_IF_ENB | U119 | 22 | 29823 |
| SO_NEW | U330 | 15 | 67401 |
| SO_NEW | U617 | 3 | S74 |
| SO_NEW | U519 | 6 | S04 |
| SO_NEW~ | U326 | 11 | F374 |
| SO_NEW~ | U519 | 5 | S04 |
| SO_NEW~ | U324 | 6 | S00 |
| SO_OLD | U729 | 15 | 67401 |
| SO_OLD | U628 | 3 | LS74 |
| SO_OLD | U519 | 4 | S04 |
| SO_OLD~ | U726 | 11 | F374 |
| SO_OLD~ | U519 | 3 | S04 |
| SO~ | U206 | 11 | S241 |
| SQD0 | U425 | 18 | LS245 |
| SQD0 | U526 | 2 | 29823 |
| SQD0 | U525 | 9 | 2018 |
| SQD10 | U523 | 11 | 2018 |
| SQD10 | U422 | 16 | LS245 |
| SQD10 | U522 | 3 | 29823 |
| SQD1 | U525 | 10 | 2018 |
| SQD11 | U523 | 13 | 2018 |
| SQD11 | U422 | 15 | LS245 |
| SQD11 | U522 | 4 | 29823 |
| SQD1 | U425 | 17 | LS245 |
| SQD12 | U523 | 14 | 2018 |
| SQD12 | U522 | 5 | 29823 |
| SQD1 | U526 | 3 | 29823 |

| | | | |
|---|---|---|---|
| SQD13 | U422 | 13 | LS245 |
| SQD13 | U523 | 15 | 2018 |
| SQD13 | U522 | 6 | 29823 |
| SQD14 | U422 | 12 | LS245 |
| SQD14 | U523 | 16 | 2018 |
| SQD14 | U522 | 7 | 29823 |
| SQD15 | U422 | 11 | LS245 |
| SQD15 | U523 | 17 | 2018 |
| SQD15 | U522 | 8 | 29823 |
| SQD16 | U622 | 14 | S374 |
| SQD16 | U424 | 18 | LS245 |
| SQD16 | U524 | 9 | 2018 |
| SQD17 | U524 | 10 | 2018 |
| SQD17 | U424 | 17 | LS245 |
| SQD18 | U524 | 11 | 2018 |
| SQD18 | U424 | 16 | LS245 |
| SQD18 | U622 | 18 | S374 |
| SQD19 | U524 | 13 | 2018 |
| SQD19 | U424 | 15 | LS245 |
| SQD19 | U521 | 8 | LS374 |
| SQD20 | U521 | 13 | LS374 |
| SQD20 | U424 | 14 | LS245 |
| SQD2 | U525 | 11 | 2018 |
| SQD21 | U424 | 13 | LS245 |
| SQD21 | U521 | 14 | LS374 |
| SQD21 | U524 | 15 | 2018 |
| SQD2 | U425 | 16 | LS245 |
| SQD22 | U424 | 12 | LS245 |
| SQD22 | U524 | 16 | 2018 |
| SQD22 | U622 | 8 | S374 |
| SQD23 | U424 | 11 | LS245 |
| SQD23 | U524 | 17 | 2018 |
| SQD23 | U521 | 18 | LS374 |
| SQD2 | U526 | 4 | 29823 |
| SQD24 | U421 | 18 | LS245 |
| SQD24 | U622 | 3 | S374 |
| SQD24 | U623 | 9 | 2018 |
| SQD25 | U623 | 10 | 2018 |
| SQD25 | U421 | 17 | LS245 |
| SQD25 | U622 | 4 | S374 |
| SQD26 | U623 | 11 | 2018 |
| SQD26 | U421 | 16 | LS245 |
| SQD26 | U418 | 9 | S151 |
| SQD27 | U418 | 10 | S151 |
| SQD27 | U623 | 13 | 2018 |
| SQD27 | U421 | 15 | LS245 |
| SQD28 | U418 | 11 | S151 |
| SQD28 | U421 | 14 | LS245 |
| SQD29 | U114 | 1 | S138 |
| SQD29 | U421 | 13 | LS245 |
| SQD29 | U623 | 15 | 2018 |
| SQD29 | U113 | 9 | S32 |
| SQD30 | U113 | 10 | S32 |
| SQD30 | U421 | 12 | LS245 |
| SQD30 | U623 | 16 | 2018 |
| SQD30 | U114 | 2 | S138 |
| SQD31 | U421 | 11 | LS245 |
| SQD31 | U115 | 13 | F374 |
| SQD31 | U623 | 17 | 2018 |

| | | | |
|---|---|---|---|
| SQD3 | U525 | 13 | 2018 |
| SQD3 | U425 | 15 | LS245 |
| SQD3 | U526 | 5 | 29823 |
| SQD4 | U525 | 14 | 2018 |
| SQD4 | U526 | 6 | 29823 |
| SQD5 | U425 | 13 | LS245 |
| SQD5 | U525 | 15 | 2018 |
| SQD5 | U526 | 7 | 29823 |
| SQD6 | U425 | 12 | LS245 |
| SQD6 | U525 | 16 | 2018 |
| SQD6 | U526 | 8 | 29823 |
| SQD7 | U425 | 11 | LS245 |
| SQD7 | U525 | 17 | 2018 |
| SQD7 | U526 | 9 | 29823 |
| SQD8 | U526 | 10 | 29823 |
| SQD8 | U422 | 18 | LS245 |
| SQD8 | U523 | 9 | 2018 |
| SQD9 | U523 | 10 | 2018 |
| SQD9 | U422 | 17 | LS245 |
| SQD9 | U522 | 2 | 29823 |
| TC~ | U519 | 10 | S04 |
| TC~ | U124 | 2 | S151 |
| TC~ | U618 | 9 | S163 |
| TEST~ | U724 | 1 | LS240 |
| TEST~ | U615 | 11 | S08 |
| TEST~ | U227 | 19 | LS244 |
| THIS_CARD | U719 | 12 | LS240 |
| THIS_CARD | U714 | 9 | LS164 |
| THIS_CARD~ | U718 | 15 | PAL14L8 |
| THIS_CARD~ | U711 | 19 | LS640 |
| THIS_CARD~ | U719 | 8 | LS240 |
| THREE_COL_CLK~ | U226 | 15 | 8254 |
| THREE_COL_CLK~ | U119 | 19 | 29823 |
| TIMER_ACCESS~ | U226 | 21 | 8254 |
| TIMER_ACCESS~ | U717 | 22 | PAL14L8 |
| TYPE0~ | U306 | 11 | LS244 |
| TYPE0~ | U306 | 18 | LS244 |
| TYPE1~ | U306 | 13 | LS244 |
| TYPE1~ | U306 | 16 | LS244 |
| U/D~ | U206 | 17 | S241 |
| UP_DN~ | U113 | 1 | S32 |
| UP_DN~ | U206 | 12 | S241 |
| UP_DN~ | U206 | 3 | S241 |
| UP_DN~ | U113 | 4 | S32 |
| VCC | U613 | 16 | 316A102 1K |
| VCC | R1 | 2 | RES 10K |
| WE1~ | U106 | 18 | S241 |
| WE1~ | U101 | 27 | EDH8832C |
| WE2~ | U106 | 16 | S241 |
| WE2~ | U203 | 27 | EDH8832C |
| WE3~ | U106 | 14 | S241 |
| WE3~ | U401 | 27 | EDH8832C |
| WE~ | U517 | 11 | S00 |
| WE~ | U106 | 2 | S241 |
| WE~ | U106 | 4 | S241 |
| WE~ | U106 | 6 | S241 |
| WR_ADR_MSB~ | U702 | 10 | S74 |
| WR_ADR_MSB~ | U702 | 8 | S74 |
| WR_ADR_SEL | U519 | 1 | S04 |

| | | | |
|---|---|---|---|
| WR_ADR_SEL | U118 | 17 | 29823 |
| WR_ADR_SEL | U504 | 19 | S240 |
| WR_ADR_SEL | U601 | 3 | S139 |
| WR_ADR_SEL~ | U503 | 1 | S240 |
| WR_ADR_SEL~ | U503 | 19 | S240 |
| WR_ADR_SEL~ | U519 | 2 | S04 |
| WR_CLR~ | U207 | 2 | S157 |
| WR_CLR~ | U207 | 6 | S157 |
| WR_CLR~ | U412 | 9 | LS74 |
| XACK~ | U614 | 11 | LS125 |

SHARP

| Signal_name | Physical_location | Pin_number | Part_name |
|---|---|---|---|
| 0:XSIG627 | U701 | 13 | PGA2010 |
| 0:XSIG627 | U701 | 14 | PGA2010 |
| 0:XSIG627 | U701 | 15 | PGA2010 |
| 0:XSIG627 | U701 | 16 | PGA2010 |
| 0:XSIG627 | U409 | 3 | S08 |
| 0:XSIG629 | U602 | 15 | S381 |
| 0:XSIG629 | U305 | 2 | S04 |
| 11:XSIG242 | U727 | 15 | S138 |
| 11:XSIG242 | U726 | 2 | 29823 |
| 11:XSIG243 | U727 | 14 | S138 |
| 11:XSIG243 | U726 | 3 | 29823 |
| 11:XSIG244 | U727 | 13 | S138 |
| 11:XSIG244 | U726 | 4 | 29823 |
| 11:XSIG245 | U727 | 12 | S138 |
| 11:XSIG245 | U726 | 5 | 29823 |
| 11:XSIG246 | U727 | 11 | S138 |
| 11:XSIG246 | U726 | 6 | 29823 |
| 11:XSIG247 | U727 | 10 | S138 |
| 11:XSIG247 | U726 | 7 | 29823 |
| 11:XSIG258 | U428 | 12 | S139 |
| 11:XSIG258 | U429 | 2 | 29823 |
| 11:XSIG259 | U428 | 11 | S139 |
| 11:XSIG259 | U429 | 3 | 29823 |
| 11:XSIG260 | U428 | 10 | S139 |
| 11:XSIG260 | U515 | 11 | S04 |
| 11:XSIG260 | U429 | 4 | 29823 |
| 11:XSIG261 | U515 | 10 | S04 |
| 11:XSIG261 | U429 | 5 | 29823 |
| 11:XSIG262 | U428 | 4 | S139 |
| 11:XSIG262 | U429 | 6 | 29823 |
| 11:XSIG263 | U428 | 5 | S139 |
| 11:XSIG263 | U429 | 7 | 29823 |
| 11:XSIG264 | U428 | 6 | S139 |
| 11:XSIG264 | U429 | 8 | 29823 |
| 11:XSIG265 | U428 | 7 | S139 |
| 11:XSIG265 | U429 | 9 | 29823 |
| 11:XSIG393 | U513 | 14 | S240 |
| 11:XSIG393 | U726 | 8 | 29823 |
| 11:XSIG413 | U418 | 13 | S10 |
| 11:XSIG413 | U517 | 15 | LS374 |
| 11:XSIG420 | U726 | 10 | 29823 |
| 11:XSIG420 | U513 | 6 | S240 |
| 11:XSIG420 | U628 | 8 | S08 |
| 11:XSIG431 | U823 | 12 | LS241 |

| | | | |
|---|---|---|---|
| 11:XSIG431 | U722 | 2 | S251 |
| 11:XSIG431 | U823 | 3 | LS241 |
| 11:XSIG431 | U722 | 4 | S251 |
| 11:XSIG460 | U418 | 12 | S10 |
| 11:XSIG460 | U418 | 3 | S10 |
| 11:XSIG462 | U411 | 6 | S04 |
| 11:XSIG462 | U608 | 9 | LS175 |
| 11:XSIG465 | U411 | 4 | S04 |
| 11:XSIG465 | U726 | 9 | 29823 |
| 11:XSIG88 | U519 | 14 | S138 |
| 11:XSIG88 | U517 | 3 | LS374 |
| 11:XSIG89 | U519 | 13 | S138 |
| 11:XSIG89 | U517 | 4 | LS374 |
| 11:XSIG90 | U519 | 12 | S138 |
| 11:XSIG90 | U517 | 7 | LS374 |
| 11:XSIG91 | U519 | 11 | S138 |
| 11:XSIG91 | U517 | 8 | LS374 |
| 11:XSIG92 | U519 | 10 | S138 |
| 11:XSIG92 | U517 | 13 | LS374 |
| 11:XSIG93 | U517 | 14 | LS374 |
| 11:XSIG93 | U519 | 9 | S138 |
| 11:XSIG94 | U517 | 17 | LS374 |
| 11:XSIG94 | U519 | 7 | S138 |
| 12:XSIG53 | U721 | 12 | S139 |
| 12:XSIG53 | U825 | 2 | S244 |
| 12:XSIG54 | U721 | 11 | S139 |
| 12:XSIG54 | U825 | 4 | S244 |
| 12:XSIG55 | U721 | 10 | S139 |
| 12:XSIG55 | U825 | 6 | S244 |
| 13:XSIG144 | U408 | 13 | S08 |
| 13:XSIG144 | U802 | 3 | LS244 |
| 13:XSIG262 | U315 | 13 | LS164 |
| 13:XSIG262 | U414 | 17 | S240 |
| 13:XSIG264 | U427 | 10 | LS125 |
| 13:XSIG264 | U414 | 3 | S240 |
| 13:XSIG266 | U510 | 2 | LS273 |
| 13:XSIG266 | U512 | 7 | PAL20L10A |
| 13:XSIG267 | U315 | 11 | LS164 |
| 13:XSIG267 | U513 | 4 | S240 |
| 13:XSIG268 | U513 | 16 | S240 |
| 13:XSIG268 | U410 | 3 | S11 |
| 13:XSIG332 | U510 | 12 | LS273 |
| 13:XSIG332 | U414 | 2 | S240 |
| 13:XSIG333 | U414 | 4 | S240 |
| 13:XSIG333 | U510 | 9 | LS273 |
| 13:XSIG377 | U408 | 12 | S08 |
| 13:XSIG377 | U724 | 9 | LS138 |
| 13:XSIG388 | U410 | 4 | S11 |
| 13:XSIG388 | U410 | 5 | S11 |
| 13:XSIG388 | U315 | 6 | LS164 |
| 14:XSIG118 | U406 | 11 | LS461 |
| 14:XSIG118 | U422 | 12 | S244 |
| 14:XSIG118 | U406 | 2 | LS461 |
| 14:XSIG122 | U406 | 1 | LS461 |
| 14:XSIG122 | U206 | 3 | S244 |
| 15:XSIG338 | U409 | 11 | S08 |
| 15:XSIG338 | U210 | 13 | PGA2010 |
| 15:XSIG338 | U210 | 14 | PGA2010 |
| 15:XSIG338 | U210 | 15 | PGA2010 |
| 15:XSIG338 | U210 | 16 | PGA2010 |

| | | | |
|---|---|---|---|
| 15:XSIG344 | U115 | 15 | S381 |
| 15:XSIG344 | U305 | 8 | S04 |
| 16:XSIG255 | U207 | 13 | PGA2010 |
| 16:XSIG255 | U207 | 14 | PGA2010 |
| 16:XSIG255 | U207 | 15 | PGA2010 |
| 16:XSIG255 | U207 | 16 | PGA2010 |
| 16:XSIG255 | U408 | 6 | S08 |
| 16:XSIG258 | U305 | 10 | S04 |
| 16:XSIG258 | U111 | 15 | S381 |
| 17:XSIG299 | U213 | 13 | PGA2010 |
| 17:XSIG299 | U213 | 14 | PGA2010 |
| 17:XSIG299 | U213 | 15 | PGA2010 |
| 17:XSIG299 | U213 | 16 | PGA2010 |
| 17:XSIG299 | U408 | 3 | S08 |
| 17:XSIG303 | U305 | 12 | S04 |
| 17:XSIG303 | U119 | 15 | S381 |
| 18:XSIG542 | U628 | 11 | S08 |
| 18:XSIG542 | U521 | 3 | S374 |
| 18:XSIG544 | U628 | 12 | S08 |
| 18:XSIG544 | U411 | 8 | S04 |
| 18:XSIG575 | U723 | 1 | LS125 |
| 18:XSIG575 | U412 | 11 | S32 |
| 1:XSIG639 | U501 | 13 | PGA2010 |
| 1:XSIG639 | U501 | 14 | PGA2010 |
| 1:XSIG639 | U501 | 15 | PGA2010 |
| 1:XSIG639 | U501 | 16 | PGA2010 |
| 1:XSIG639 | U409 | 6 | S08 |
| 1:XSIG642 | U402 | 15 | S381 |
| 1:XSIG642 | U305 | 4 | S04 |
| 2:XSIG645 | U201 | 13 | PGA2010 |
| 2:XSIG645 | U201 | 14 | PGA2010 |
| 2:XSIG645 | U201 | 15 | PGA2010 |
| 2:XSIG645 | U201 | 16 | PGA2010 |
| 2:XSIG645 | U409 | 8 | S08 |
| 2:XSIG649 | U102 | 15 | S381 |
| 2:XSIG649 | U305 | 6 | S04 |
| 6:XSIG252 | U412 | 10 | S32 |
| 6:XSIG252 | U415 | 9 | LS374 |
| 6:XSIG291 | U712 | 10 | 29823 |
| 6:XSIG291 | U413 | 6 | S151 |
| 6:XSIG356 | U206 | 15 | S244 |
| 6:XSIG356 | U415 | 16 | LS374 |
| 6:XSIG426 | U206 | 11 | S244 |
| 6:XSIG426 | U412 | 8 | S32 |
| 6:XSIG492 | U712 | 2 | 29823 |
| 6:XSIG492 | U410 | 8 | S11 |
| 6:XSIG499 | U712 | 3 | 29823 |
| 6:XSIG499 | U418 | 8 | S10 |
| 6:XSIG502 | U412 | 2 | S32 |
| 6:XSIG502 | U712 | 22 | 29823 |
| 6:XSIG503 | U412 | 1 | S32 |
| 6:XSIG503 | U712 | 23 | 29823 |
| 6:XSIG503 | U515 | 5 | S04 |
| 7:XSIG18 | U506 | 10 | S10 |
| 7:XSIG18 | U506 | 2 | S10 |
| 7:XSIG18 | U516 | 6 | DELAY |
| 7:XSIG2 | U506 | 4 | S10 |
| 7:XSIG2 | U606 | 5 | S112 |
| 7:XSIG28 | U505 | 11 | S244 |
| 7:XSIG28 | U505 | 13 | S244 |

| | | | |
|---|---|---|---|
| 7:XSIG28 | U505 | 15 | S244 |
| 7:XSIG28 | U505 | 2 | S244 |
| 7:XSIG28 | U505 | 4 | S244 |
| 7:XSIG28 | U505 | 6 | S244 |
| 7:XSIG28 | U505 | 8 | S244 |
| 7:XSIG6 | U513 | 2 | S240 |
| 7:XSIG6 | U609 | 8 | S30 |
| 7:XSIG70 | U606 | 1 | S112 |
| 7:XSIG70 | U605 | 8 | OSC |
| 8:XSIG133 | U314 | 12 | ALS569 |
| 8:XSIG133 | U509 | 19 | ALS569 |
| ABS_OE | U601 | 1 | LS244 |
| ABS_OE | U601 | 19 | LS244 |
| ABS_OE | U712 | 20 | 29823 |
| ABS_OE4 | U313 | 1 | LS244 |
| ABS_OE4 | U313 | 19 | LS244 |
| ABS_OE4 | U507 | 9 | LS374 |
| ABS_OE4~ | U211 | 13 | PAL20R8A |
| ABS_OE4~ | U507 | 6 | LS374 |
| ABS_OE | U507 | 8 | LS374 |
| ABS_OE~ | U702 | 13 | PAL20R8A |
| ABS_OE~ | U515 | 2 | S04 |
| ABS_OE~ | U507 | 7 | LS374 |
| ACC1 | U507 | 4 | LS374 |
| ACC1 | U701 | 46 | PGA2010 |
| ACC1 | U415 | 5 | LS374 |
| ACC4 | U210 | 46 | PGA2010 |
| ACC4 | U507 | 5 | LS374 |
| ADR10~ | U807 | 4 | LS240 |
| ADR11~ | U807 | 6 | LS240 |
| ADR12~ | U807 | 8 | LS240 |
| ADR13~ | U807 | 11 | LS240 |
| ADR14~ | U807 | 13 | LS240 |
| ADR15~ | U807 | 15 | LS240 |
| ADR16~ | U807 | 17 | LS240 |
| ADR17~ | U814 | 2 | LS240 |
| ADR18~ | U814 | 4 | LS240 |
| ADR19~ | U814 | 6 | LS240 |
| ADR1~ | U808 | 2 | LS240 |
| ADR20~ | U814 | 8 | LS240 |
| ADR21~ | U814 | 11 | LS240 |
| ADR22~ | U814 | 13 | LS240 |
| ADR23~ | U814 | 15 | LS240 |
| ADR2~ | U808 | 4 | LS240 |
| ADR3~ | U808 | 6 | LS240 |
| ADR4~ | U808 | 8 | LS240 |
| ADR5~ | U808 | 11 | LS240 |
| ADR6~ | U808 | 13 | LS240 |
| ADR7~ | U808 | 15 | LS240 |
| ADR8~ | U808 | 17 | LS240 |
| ADR9~ | U807 | 2 | LS240 |
| ALU_0 | U216 | 2 | 29823 |
| ALU_0 | U424 | 3 | S374 |
| ALU_0 | U220 | 8 | S381 |
| ALU_1 | U216 | 3 | 29823 |
| ALU_1 | U424 | 4 | S374 |
| ALU_1 | U220 | 9 | S381 |
| ALU_2 | U220 | 11 | S381 |
| ALU_2 | U216 | 4 | 29823 |
| ALU_2 | U424 | 7 | S374 |

| | | | |
|---|---|---|---|
| ALU_3 | U220 | 12 | S381 |
| ALU_3 | U216 | 5 | 29823 |
| ALU_3 | U424 | 8 | S374 |
| ALU_4 | U424 | 13 | S374 |
| ALU_4 | U216 | 6 | 29823 |
| ALU_4 | U320 | 8 | S381 |
| ALU_5 | U424 | 14 | S374 |
| ALU_5 | U216 | 7 | 29823 |
| ALU_5 | U320 | 9 | S381 |
| ALU_6 | U320 | 11 | S381 |
| ALU_6 | U424 | 17 | S374 |
| ALU_6 | U216 | 8 | 29823 |
| ALU_7 | U320 | 12 | S381 |
| ALU_7 | U424 | 18 | S374 |
| ALU_7 | U216 | 9 | 29823 |
| ALU_8 | U216 | 10 | 29823 |
| ALU_8 | U121 | 17 | S374 |
| ALU_8 | U120 | 8 | S381 |
| ALU_9 | U121 | 18 | S374 |
| ALU_9 | U120 | 9 | S381 |
| A_OE~ | U425 | 1 | S374 |
| A_OE~ | U429 | 18 | 29823 |
| A_OE~ | U427 | 4 | LS125 |
| B0M1_D0 | U818 | 3 | S374 |
| B0M1_D0 | U717 | 5 | S189 |
| B0M1_D1 | U818 | 4 | S374 |
| B0M1_D1 | U717 | 7 | S189 |
| B0M1_D2 | U818 | 7 | S374 |
| B0M1_D2 | U717 | 9 | S189 |
| B0M1_D3 | U717 | 11 | S189 |
| B0M1_D3 | U818 | 8 | S374 |
| B0M1_D4 | U818 | 13 | S374 |
| B0M1_D4 | U618 | 5 | S189 |
| B0M1_D5 | U818 | 14 | S374 |
| B0M1_D5 | U618 | 7 | S189 |
| B0M1_D6 | U818 | 17 | S374 |
| B0M1_D6 | U618 | 9 | S189 |
| B0M1_D7 | U618 | 11 | S189 |
| B0M1_D7 | U818 | 18 | S374 |
| B0M2_D0 | U822 | 3 | S374 |
| B0M2_D0 | U720 | 5 | S189 |
| B0M2_D1 | U822 | 4 | S374 |
| B0M2_D1 | U720 | 7 | S189 |
| B0M2_D2 | U822 | 7 | S374 |
| B0M2_D2 | U720 | 9 | S189 |
| B0M2_D3 | U720 | 11 | S189 |
| B0M2_D3 | U822 | 8 | S374 |
| B0M2_D4 | U822 | 13 | S374 |
| B0M2_D4 | U621 | 5 | S189 |
| B0M2_D5 | U822 | 14 | S374 |
| B0M2_D5 | U621 | 7 | S189 |
| B0M2_D6 | U822 | 17 | S374 |
| B0M2_D6 | U621 | 9 | S189 |
| B0M2_D7 | U621 | 11 | S189 |
| B0M2_D7 | U822 | 18 | S374 |
| B0M3_D0 | U817 | 3 | S374 |
| B0M3_D0 | U716 | 5 | S189 |
| B0M3_D1 | U817 | 4 | S374 |
| B0M3_D1 | U716 | 7 | S189 |
| B0M3_D2 | U817 | 7 | S374 |
| B0M3_D2 | U716 | 9 | S189 |

| | | | |
|---|---|---|---|
| B0M3_D3 | U716 | 11 | S189 |
| B0M3_D3 | U817 | 8 | S374 |
| B0M3_D4 | U817 | 13 | S374 |
| B0M3_D4 | U617 | 5 | S189 |
| B0M3_D5 | U817 | 14 | S374 |
| B0M3_D5 | U617 | 7 | S189 |
| B0M3_D6 | U817 | 17 | S374 |
| B0M3_D6 | U617 | 9 | S189 |
| B0M3_D7 | U617 | 11 | S189 |
| B0M3_D7 | U817 | 18 | S374 |
| B0_A0 | U717 | 1 | S189 |
| B0_A0 | U626 | 16 | ALS569 |
| B0_A0 | U526 | 3 | S244 |
| B0_A1 | U717 | 15 | S189 |
| B0_A1 | U526 | 5 | S244 |
| B0_A2 | U717 | 14 | S189 |
| B0_A2 | U526 | 7 | S244 |
| B0_A3 | U717 | 13 | S189 |
| B0_A3 | U526 | 9 | S244 |
| B1M1_D0 | U819 | 3 | S374 |
| B1M1_D0 | U718 | 5 | S189 |
| B1M1_D1 | U819 | 4 | S374 |
| B1M1_D1 | U718 | 7 | S189 |
| B1M1_D2 | U819 | 7 | S374 |
| B1M1_D2 | U718 | 9 | S189 |
| B1M1_D3 | U718 | 11 | S189 |
| B1M1_D3 | U819 | 8 | S374 |
| B1M1_D4 | U819 | 13 | S374 |
| B1M1_D4 | U619 | 5 | S189 |
| B1M1_D5 | U819 | 14 | S374 |
| B1M1_D5 | U619 | 7 | S189 |
| B1M1_D6 | U819 | 17 | S374 |
| B1M1_D6 | U619 | 9 | S189 |
| B1M1_D7 | U619 | 11 | S189 |
| B1M1_D7 | U819 | 18 | S374 |
| B1M2_D0 | U821 | 3 | S374 |
| B1M2_D0 | U719 | 5 | S189 |
| B1M2_D1 | U821 | 4 | S374 |
| B1M2_D1 | U719 | 7 | S189 |
| B1M2_D2 | U821 | 7 | S374 |
| B1M2_D2 | U719 | 9 | S189 |
| B1M2_D3 | U719 | 11 | S189 |
| B1M2_D3 | U821 | 8 | S374 |
| B1M2_D4 | U821 | 13 | S374 |
| B1M2_D4 | U620 | 5 | S189 |
| B1M2_D5 | U821 | 14 | S374 |
| B1M2_D5 | U620 | 7 | S189 |
| B1M2_D6 | U821 | 17 | S374 |
| B1M2_D6 | U620 | 9 | S189 |
| B1M2_D7 | U620 | 11 | S189 |
| B1M2_D7 | U821 | 18 | S374 |
| B1M3_D0 | U815 | 3 | S374 |
| B1M3_D0 | U715 | 5 | S189 |
| B1M3_D1 | U815 | 4 | S374 |
| B1M3_D1 | U715 | 7 | S189 |
| B1M3_D2 | U815 | 7 | S374 |
| B1M3_D2 | U715 | 9 | S189 |
| B1M3_D3 | U715 | 11 | S189 |
| B1M3_D3 | U815 | 8 | S374 |

| | | | |
|---|---|---|---|
| B1M3_D4 | U815 | 13 | S374 |
| B1M3_D4 | U714 | 5 | S189 |
| B1M3_D5 | U815 | 14 | S374 |
| B1M3_D5 | U714 | 7 | S189 |
| B1M3_D6 | U815 | 17 | S374 |
| B1M3_D6 | U714 | 9 | S189 |
| B1M3_D7 | U714 | 11 | S189 |
| B1M3_D7 | U815 | 18 | S374 |
| B1_A0 | U619 | 1 | S189 |
| B1_A0 | U525 | 16 | ALS569 |
| B1_A0 | U526 | 18 | S244 |
| B1_A1 | U619 | 15 | S189 |
| B1_A1 | U526 | 16 | S244 |
| B1_A2 | U619 | 14 | S189 |
| B1_A3 | U526 | 12 | S244 |
| B1_A3 | U619 | 13 | S189 |
| BANK_REQ~ | U413 | 14 | S151 |
| BANK_REQ~ | U416 | 15 | S251 |
| BANK_REQ~ | U418 | 2 | S10 |
| BANK_REQ~ | U412 | 5 | S32 |
| BANK_REQ~ | U418 | 6 | S10 |
| BANK_SEL | U526 | 1 | S244 |
| BANK_SEL | U626 | 17 | ALS569 |
| BANK_SEL | U606 | 9 | S112 |
| BANK_SEL~ | U727 | 1 | S138 |
| BANK_SEL~ | U506 | 11 | S10 |
| BANK_SEL~ | U525 | 17 | ALS569 |
| BANK_SEL~ | U526 | 19 | S244 |
| BANK_SEL~ | U606 | 7 | S112 |
| BCCLK~ | U802 | 5 | LS244 |
| BCCLK~ | U315 | 8 | LS164 |
| BEN~ | U524 | 10 | S139 |
| BEN~ | U421 | 11 | PAL20R8A |
| BEN~ | U421 | 13 | PAL20R8A |
| BMRDC~ | U804 | 23 | PAL14L8 |
| BMRDC~ | U802 | 9 | LS244 |
| BMWTC~ | | | PAL20L10A |
| BMWTC~ | U804 | 14 | PAL14L8 |
| BMWTC~ | U512 | 6 | PAL20L10A |
| BMWTC~ | U802 | 7 | LS244 |
| BTYPE0~ | U608 | 12 | LS175 |
| BTYPE0~ | U107 | 18 | LS241 |
| BTYPE0~ | U107 | 9 | LS241 |
| BTYPE1~ | U608 | 13 | LS175 |
| BTYPE1~ | U107 | 16 | LS241 |
| BTYPE1~ | U107 | 7 | LS241 |
| C0 | U508 | 2 | LS273 |
| C0 | U509 | 3 | ALS569 |
| C1 | U509 | 4 | ALS569 |
| C1 | U508 | 5 | LS273 |
| C1_A0 | U509 | 16 | ALS569 |
| C1_A0 | U707 | 18 | LS244 |
| C1_A0 | U312 | 8 | 2018 |
| C1_A1 | U509 | 15 | ALS569 |
| C1_A1 | U707 | 16 | LS244 |
| C1_A1 | U312 | 7 | 2018 |
| C1_A2 | U509 | 14 | ALS569 |
| C1_A2 | U312 | 6 | 2018 |
| C1_A3 | U707 | 12 | LS244 |

| | | | |
|---|---|---|---|
| C1_A3 | U509 | 13 | ALS569 |
| C1_A3 | U312 | 5 | 2018 |
| C1_A4 | U314 | 16 | ALS569 |
| C1_A4 | U312 | 4 | 2018 |
| C1_A4 | U707 | 9 | LS244 |
| C1_A5 | U314 | 15 | ALS569 |
| C1_A5 | U312 | 3 | 2018 |
| C1_A5 | U707 | 7 | LS244 |
| C1_A6 | U314 | 14 | ALS569 |
| C1_A6 | U312 | 2 | 2018 |
| C1_A6 | U707 | 5 | LS244 |
| C1_A7 | U312 | 1 | 2018 |
| C1_A7 | U314 | 13 | ALS569 |
| C1_A7 | U707 | 3 | LS244 |
| C1_A8 | U809 | 18 | S241 |
| C1_A8 | U312 | 23 | 2018 |
| C1_A8 | U809 | 9 | S241 |
| C1_A9 | U809 | 16 | S241 |
| C1_A9 | U312 | 22 | 2018 |
| C1_A9 | U809 | 7 | S241 |
| C1_D0 | U308 | 18 | LS245 |
| C1_D0 | U407 | 3 | S374 |
| C1_D0 | U312 | 9 | 2018 |
| C1_D10 | U311 | 11 | 2018 |
| C1_D10 | U309 | 16 | LS245 |
| C1_D10 | U301 | 7 | S374 |
| C1_D1 | U312 | 10 | 2018 |
| C1_D11 | U311 | 13 | 2018 |
| C1_D11 | U309 | 15 | LS245 |
| C1_D1 | U308 | 17 | LS245 |
| C1_D11 | U301 | 8 | S374 |
| C1_D12 | U301 | 13 | S374 |
| C1_D12 | U309 | 14 | LS245 |
| C1_D13 | U309 | 13 | LS245 |
| C1_D13 | U301 | 14 | S374 |
| C1_D13 | U311 | 15 | 2018 |
| C1_D1 | U407 | 4 | S374 |
| C1_D14 | U309 | 12 | LS245 |
| C1_D14 | U311 | 16 | 2018 |
| C1_D14 | U301 | 17 | S374 |
| C1_D15 | U309 | 11 | LS245 |
| C1_D15 | U311 | 17 | 2018 |
| C1_D15 | U301 | 18 | S374 |
| C1_D2 | U312 | 11 | 2018 |
| C1_D2 | U308 | 16 | LS245 |
| C1_D2 | U407 | 7 | S374 |
| C1_D3 | U312 | 13 | 2018 |
| C1_D3 | U308 | 15 | LS245 |
| C1_D3 | U407 | 8 | S374 |
| C1_D4 | U407 | 13 | S374 |
| C1_D4 | U312 | 14 | 2018 |
| C1_D5 | U308 | 13 | LS245 |
| C1_D5 | U407 | 14 | S374 |
| C1_D5 | U312 | 15 | 2018 |
| C1_D6 | U308 | 12 | LS245 |
| C1_D6 | U312 | 16 | 2018 |
| C1_D6 | U407 | 17 | S374 |
| C1_D7 | U308 | 11 | LS245 |
| C1_D7 | U312 | 17 | 2018 |

| | | | |
|---|---|---|---|
| C1_D7 | U407 | 18 | S374 |
| C1_D8 | U309 | 18 | LS245 |
| C1_D8 | U301 | 3 | S374 |
| C1_D8 | U311 | 9 | 2018 |
| C1_D9 | U311 | 10 | 2018 |
| C1_D9 | U309 | 17 | LS245 |
| C1_D9 | U301 | 4 | S374 |
| C1_WE~ | | | PAL20L10A |
| C1_WE~ | U312 | 21 | 2018 |
| C2 | U509 | 5 | ALS569 |
| C2 | U508 | 6 | LS273 |
| C3 | U509 | 6 | ALS569 |
| C3 | U508 | 9 | LS273 |
| C4 | U508 | 12 | LS273 |
| C4 | U314 | 3 | ALS569 |
| C5 | U508 | 15 | LS273 |
| C5 | U314 | 4 | ALS569 |
| C6 | U508 | 16 | LS273 |
| C6 | U314 | 5 | ALS569 |
| C7 | U508 | 19 | LS273 |
| C7 | U314 | 6 | ALS569 |
| CCLK~ | U802 | 15 | LS244 |
| CEN_SEL0 | U326 | 17 | 29823 |
| CEN_SEL0 | U524 | 2 | S139 |
| CEN_SEL1 | U326 | 16 | 29823 |
| CEN_SEL1 | U524 | 3 | S139 |
| CEN_SEL2 | U524 | 1 | S139 |
| CEN_SEL2 | U326 | 15 | 29823 |
| CF0 | U405 | 2 | F374 |
| CF0 | U210 | 66 | PGA2010 |
| CF10 | U210 | 56 | PGA2010 |
| CF10 | U302 | 6 | F374 |
| CF11 | U210 | 55 | PGA2010 |
| CF11 | U302 | 9 | F374 |
| CF12 | U302 | 12 | F374 |
| CF12 | U210 | 54 | PGA2010 |
| CF13 | U302 | 15 | F374 |
| CF13 | U210 | 53 | PGA2010 |
| CF14 | U302 | 16 | F374 |
| CF14 | U210 | 52 | PGA2010 |
| CF1 | U405 | 5 | F374 |
| CF15 | U302 | 19 | F374 |
| CF15 | U210 | 50 | PGA2010 |
| CF1 | U210 | 65 | PGA2010 |
| CF2 | U405 | 6 | F374 |
| CF2 | U210 | 64 | PGA2010 |
| CF3 | U210 | 63 | PGA2010 |
| CF3 | U405 | 9 | F374 |
| CF4 | U405 | 12 | F374 |
| CF4 | U210 | 62 | PGA2010 |
| CF5 | U405 | 15 | F374 |
| CF5 | U210 | 61 | PGA2010 |
| CF6 | U405 | 16 | F374 |
| CF6 | U210 | 60 | PGA2010 |
| CF7 | U405 | 19 | F374 |
| CF7 | U210 | 59 | PGA2010 |
| CF8 | U302 | 2 | F374 |
| CF8 | U210 | 58 | PGA2010 |
| CF9 | U302 | 5 | F374 |

| | | | |
|---|---|---|---|
| CF9 | U210 | 57 | PGA2010 |
| CH1_CLK | U704 | 1 | PAL20R8A |
| CH1_CLK | U603 | 11 | S374 |
| CH1_CLK | U505 | 18 | S244 |
| CH1_CLK | U701 | 38 | PGA2010 |
| CH1_CLK | U701 | 44 | PGA2010 |
| CH1_CLK | U701 | 45 | PGA2010 |
| CH1_D0 | U112 | 2 | LS244 |
| CH1_D1 | U112 | 4 | LS244 |
| CH1_D2 | U112 | 6 | LS244 |
| CH1_D3 | U112 | 8 | LS244 |
| CH1_D4 | U112 | 11 | LS244 |
| CH1_D5 | U112 | 13 | LS244 |
| CH1_D6 | U112 | 15 | LS244 |
| CH1_D7 | U112 | 17 | LS244 |
| CH2_CLK | U504 | 1 | PAL20R8A |
| CH2_CLK | U403 | 11 | S374 |
| CH2_CLK | U505 | 16 | S244 |
| CH2_CLK | U609 | 2 | S30 |
| CH2_CLK | U501 | 38 | PGA2010 |
| CH2_CLK | U501 | 44 | PGA2010 |
| CH2_CLK | U501 | 45 | PGA2010 |
| CH2_D0 | U108 | 2 | LS244 |
| CH2_D1 | U108 | 4 | LS244 |
| CH2_D2 | U108 | 6 | LS244 |
| CH2_D3 | U108 | 8 | LS244 |
| CH2_D4 | U108 | 11 | LS244 |
| CH2_D5 | U108 | 13 | LS244 |
| CH2_D6 | U108 | 15 | LS244 |
| CH2_D7 | U108 | 17 | LS244 |
| CH3_CLK | U204 | 1 | PAL20R8A |
| CH3_CLK | U104 | 11 | LS374 |
| CH3_CLK | U505 | 14 | S244 |
| CH3_CLK | U609 | 3 | S30 |
| CH3_CLK | U201 | 38 | PGA2010 |
| CH3_CLK | U201 | 44 | PGA2010 |
| CH3_CLK | U201 | 45 | PGA2010 |
| CH3_D0 | U103 | 2 | LS244 |
| CH3_D1 | U103 | 4 | LS244 |
| CH3_D2 | U103 | 6 | LS244 |
| CH3_D3 | U103 | 8 | LS244 |
| CH3_D4 | U103 | 11 | LS244 |
| CH3_D5 | U103 | 13 | LS244 |
| CH3_D6 | U103 | 15 | LS244 |
| CH3_D7 | U103 | 17 | LS244 |
| CH4_CLK | U212 | 1 | PAL20R8A |
| CH4_CLK | U113 | 11 | S374 |
| CH4_CLK | U505 | 12 | S244 |
| CH4_CLK | U210 | 38 | PGA2010 |
| CH4_CLK | U609 | 4 | S30 |
| CH4_CLK | U210 | 44 | PGA2010 |
| CH4_CLK | U210 | 45 | PGA2010 |
| CH5_CLK | U209 | 1 | PAL20R8A |
| CH5_CLK | U109 | 11 | S374 |
| CH5_CLK | U207 | 38 | PGA2010 |
| CH5_CLK | U207 | 44 | PGA2010 |
| CH5_CLK | U207 | 45 | PGA2010 |
| CH5_CLK | U609 | 5 | S30 |
| CH5_CLK | U505 | 9 | S244 |

| | | | |
|---|---|---|---|
| CH6_CLK | U215 | 1 | PAL20R8A |
| CH6_CLK | U117 | 11 | S374 |
| CH6_CLK | U213 | 38 | PGA2010 |
| CH6_CLK | U213 | 44 | PGA2010 |
| CH6_CLK | U213 | 45 | PGA2010 |
| CH6_CLK | U609 | 6 | S30 |
| CH6_CLK | U505 | 7 | S244 |
| CHK_CRC | U826 | 17 | PAL20R4 |
| CHK_CRC | U824 | 2 | CRC |
| CLR_ADDR~ | U725 | 6 | LS244 |
| CLR_ADDR~ | U206 | 7 | S244 |
| CLR_ADDR~ | U422 | 8 | S244 |
| CLR_BANK~ | U418 | 1 | S10 |
| CLR_BANK~ | U724 | 11 | LS138 |
| CLR_BANK~ | U606 | 14 | S112 |
| CLR_U~ | U217 | 11 | 29823 |
| CLR_U~ | U517 | 9 | LS374 |
| CNTR | U306 | 1 | LS244 |
| CNTR | U826 | 10 | PAL20R4 |
| CNTR | U510 | 16 | LS273 |
| CNTR | U306 | 19 | LS244 |
| CNTR~ | U406 | 13 | LS461 |
| CNTR~ | U826 | 15 | PAL20R4 |
| CNX | U324 | 12 | S182 |
| CNX | U320 | 15 | S381 |
| CNY | U324 | 11 | S182 |
| CNY | U120 | 15 | S381 |
| COEF0 | U407 | 2 | S374 |
| COEF0 | U405 | 3 | F374 |
| COEF0 | U701 | 66 | PGA2010 |
| COEF10 | U701 | 56 | PGA2010 |
| COEF10 | U301 | 6 | S374 |
| COEF10 | U302 | 7 | F374 |
| COEF11 | U701 | 55 | PGA2010 |
| COEF11 | U302 | 8 | F374 |
| COEF11 | U301 | 9 | S374 |
| COEF12 | U301 | 12 | S374 |
| COEF12 | U302 | 13 | F374 |
| COEF12 | U701 | 54 | PGA2010 |
| COEF13 | U302 | 14 | F374 |
| COEF13 | U301 | 15 | S374 |
| COEF13 | U701 | 53 | PGA2010 |
| COEF1 | U405 | 4 | F374 |
| COEF14 | U301 | 16 | S374 |
| COEF14 | U302 | 17 | F374 |
| COEF14 | U701 | 52 | PGA2010 |
| COEF1 | U407 | 5 | S374 |
| COEF15 | U302 | 18 | F374 |
| COEF15 | U301 | 19 | S374 |
| COEF15 | U701 | 50 | PGA2010 |
| COEF1 | U701 | 65 | PGA2010 |
| COEF1_ACCESS~ | | | PAL20L10A |
| COEF1_ACCESS~ | U309 | 19 | LS245 |
| COEF1_ACCESS~ | U805 | 20 | PAL14L8 |
| COEF1_ACCESS~ | U512 | 3 | PAL20L10A |
| COEF1_A_ACCESS | U509 | 17 | ALS569 |
| COEF1_A_ACCESS | U414 | 7 | S240 |
| COEF1_A_ACCESS | U809 | 1 | S241 |
| COEF1_A_ACCESS | U414 | 13 | S240 |

| | | | |
|---|---|---|---|
| COEF1_A_ACCESS | U512 | 15 | PAL20L10A |
| COEF1_A_ACCESS | U809 | 19 | S241 |
| COEF2 | U407 | 6 | S374 |
| COEF2 | U701 | 64 | PGA2010 |
| COEF2 | U405 | 7 | F374 |
| COEF3 | U701 | 63 | PGA2010 |
| COEF3 | U405 | 8 | F374 |
| COEF3 | U407 | 9 | S374 |
| COEF4 | U407 | 12 | S374 |
| COEF4 | U405 | 13 | F374 |
| COEF4 | U701 | 62 | PGA2010 |
| COEF5 | U405 | 14 | F374 |
| COEF5 | U407 | 15 | S374 |
| COEF5 | U701 | 61 | PGA2010 |
| COEF6 | U407 | 16 | S374 |
| COEF6 | U405 | 17 | F374 |
| COEF6 | U701 | 60 | PGA2010 |
| COEF7 | U405 | 18 | F374 |
| COEF7 | U407 | 19 | S374 |
| COEF7 | U701 | 59 | PGA2010 |
| COEF8 | U301 | 2 | S374 |
| COEF8 | U302 | 3 | F374 |
| COEF8 | U701 | 58 | PGA2010 |
| COEF9 | U302 | 4 | F374 |
| COEF9 | U301 | 5 | S374 |
| COEF9 | U701 | 57 | PGA2010 |
| COEF_SEL0 | U809 | 11 | S241 |
| COEF_SEL0 | U712 | 18 | 29823 |
| COEF_SEL1 | U809 | 13 | S241 |
| COEF_SEL1 | U712 | 17 | 29823 |
| CRC_CLK~ | U826 | 16 | PAL20R4 |
| CRC_CLK~ | U824 | 9 | CRC |
| CRC_CS~ | U804 | 18 | PAL14L8 |
| CRC_CS~ | U826 | 23 | PAL20R4 |
| CRC_CS~ | U824 | 6 | CRC |
| CRC_RD~ | U826 | 21 | PAL20R4 |
| CRC_RD~ | U824 | 5 | CRC |
| CRC_WT~ | U826 | 22 | PAL20R4 |
| CRC_WT~ | U824 | 7 | CRC |
| CREG_0 | U123 | 18 | LS244 |
| CREG_0 | U121 | 2 | S374 |
| CREG_0 | U122 | 3 | IMS1421 |
| CREG_1 | U123 | 16 | LS244 |
| CREG_1 | U122 | 4 | IMS1421 |
| CREG_1 | U121 | 5 | S374 |
| CREG_2 | U123 | 14 | LS244 |
| CREG_2 | U122 | 5 | IMS1421 |
| CREG_2 | U121 | 6 | S374 |
| CREG_3 | U123 | 12 | LS244 |
| CREG_3 | U122 | 6 | IMS1421 |
| CREG_3 | U121 | 9 | S374 |
| CREG_4 | U121 | 12 | S374 |
| CREG_4 | U122 | 7 | IMS1421 |
| CREG_4 | U123 | 9 | LS244 |
| CREG_5 | U121 | 15 | S374 |
| CREG_5 | U123 | 7 | LS244 |
| CREG_5 | U122 | 8 | IMS1421 |
| CY1~ | U626 | 19 | ALS569 |
| CY1~ | U523 | 2 | LS244 |

| | | | |
|---|---|---|---|
| CY2~ | U525 | 19 | ALS569 |
| CY2~ | U523 | 4 | LS244 |
| D0 | U813 | 1 | HM6167HLP |
| D0 | U221 | 16 | IMS1421 |
| D0 | U613 | 18 | LS244 |
| D0 | U818 | 2 | S374 |
| D0 | U216 | 23 | 29823 |
| D0 | U121 | 3 | S374 |
| D1 | U220 | 1 | S381 |
| D1 | U613 | 16 | LS244 |
| D1 | U221 | 17 | IMS1421 |
| D1 | U813 | 2 | HM6167HLP |
| D1 | U216 | 22 | 29823 |
| D1 | U217 | 3 | 29823 |
| D1 | U812 | 4 | LS244 |
| D1 | U818 | 5 | S374 |
| D2 | U613 | 14 | LS244 |
| D2 | U221 | 18 | IMS1421 |
| D2 | U220 | 19 | S381 |
| D2 | U216 | 21 | 29823 |
| D2 | U813 | 3 | HM6167HLP |
| D2 | U217 | 4 | 29823 |
| D2 | U818 | 6 | S374 |
| D2 | U121 | 7 | S374 |
| D3 | U613 | 12 | LS244 |
| D3 | U220 | 17 | S381 |
| D3 | U221 | 19 | IMS1421 |
| D3 | U216 | 20 | 29823 |
| D3 | U813 | 4 | HM6167HLP |
| D3 | U217 | 5 | 29823 |
| D3 | U812 | 8 | LS244 |
| D3 | U818 | 9 | S374 |
| D4 | U221 | 1 | IMS1421 |
| D4 | U812 | 11 | LS244 |
| D4 | U818 | 12 | S374 |
| D4 | U121 | 13 | S374 |
| D4 | U216 | 19 | 29823 |
| D4 | U320 | 3 | S381 |
| D4 | U813 | 5 | HM6167HLP |
| D4 | U217 | 6 | 29823 |
| D4 | U613 | 9 | LS244 |
| D5 | U320 | 1 | S381 |
| D5 | U812 | 13 | LS244 |
| D5 | U121 | 14 | S374 |
| D5 | U818 | 15 | S374 |
| D5 | U216 | 18 | 29823 |
| D5 | U221 | 2 | IMS1421 |
| D5 | U813 | 6 | HM6167HLP |
| D5 | U217 | 7 | 29823 |
| D6 | U812 | 15 | LS244 |
| D6 | U818 | 16 | S374 |
| D6 | U216 | 17 | 29823 |
| D6 | U320 | 19 | S381 |
| D6 | U221 | 3 | IMS1421 |
| D6 | U613 | 5 | LS244 |
| D6 | U813 | 7 | HM6167HLP |
| D6 | U217 | 8 | 29823 |
| D7 | U813 | 13 | HM6167HLP |
| D7 | U216 | 16 | 29823 |

| | | | |
|---|---|---|---|
| D7 | U812 | 17 | LS244 |
| D7 | U818 | 19 | S374 |
| D7 | U613 | 3 | LS244 |
| D7 | U221 | 4 | IMS1421 |
| D7 | U217 | 9 | 29823 |
| D8 | U120 | 1 | S381 |
| D8 | U427 | 11 | LS125 |
| D8 | U813 | 14 | HM6167HLP |
| D8 | U216 | 15 | 29823 |
| D8 | U222 | 18 | S241 |
| D8 | U120 | 3 | S381 |
| D8 | U221 | 5 | IMS1421 |
| DAT0~ | U811 | 2 | LS640 |
| DAT1~ | U811 | 3 | LS640 |
| DAT2~ | U811 | 4 | LS640 |
| DAT3~ | U811 | 5 | LS640 |
| DAT4~ | U811 | 6 | LS640 |
| DAT5~ | U811 | 7 | LS640 |
| DAT6~ | U811 | 8 | LS640 |
| DAT7~ | U811 | 9 | LS640 |
| DAT8~ | U810 | 2 | LS640 |
| DAT9~ | U810 | 3 | LS640 |
| DATA_RDY~ | U107 | 6 | LS241 |
| DATA_TAKEN~ | U725 | 15 | LS244 |
| DATA_TAKEN~ | U505 | 3 | S244 |
| DATA~ | U810 | 4 | LS640 |
| DATB~ | U810 | 5 | LS640 |
| DATC~ | U810 | 6 | LS640 |
| DATD~ | U810 | 7 | LS640 |
| DATE~ | U810 | 8 | LS640 |
| DATF~ | U810 | 9 | LS640 |
| DOUT_0~ | U820 | 18 | S244 |
| DOUT_0~ | U522 | 2 | LS240 |
| DOUT_1~ | U820 | 16 | S244 |
| DOUT_1~ | U522 | 4 | LS240 |
| DOUT_2~ | U820 | 14 | S244 |
| DOUT_2~ | U522 | 6 | LS240 |
| DOUT_3~ | U820 | 12 | S244 |
| DOUT_3~ | U522 | 8 | LS240 |
| DOUT_4~ | U522 | 11 | LS240 |
| DOUT_4~ | U820 | 9 | S244 |
| DOUT_5~ | U522 | 13 | LS240 |
| DOUT_5~ | U820 | 7 | S244 |
| DOUT_6~ | U522 | 15 | LS240 |
| DOUT_6~ | U820 | 5 | S244 |
| DOUT_7~ | U522 | 17 | LS240 |
| DOUT_7~ | U820 | 3 | S244 |
| DRDY~ | U107 | 14 | LS241 |
| DRDY~ | U412 | 4 | S32 |
| DRDY~ | U107 | 5 | LS241 |
| DTYPE0~ | U608 | 10 | LS175 |
| DTYPE0~ | U413 | 3 | S151 |
| DTYPE0~ | U608 | 4 | LS175 |
| DTYPE1~ | U608 | 15 | LS175 |
| DTYPE1~ | U413 | 2 | S151 |
| DTYPE1~ | U608 | 5 | LS175 |
| DWN~ | U415 | 17 | LS374 |
| DWN~ | U721 | 7 | S139 |
| D_TAKEN~ | U505 | 17 | S244 |

| | | | |
|---|---|---|---|
| D_TAKEN~ | U515 | 6 | S04 |
| ENB_OSC | U414 | 16 | S240 |
| ENB_OSC | U606 | 4 | S112 |
| EOL_OUT~ | U825 | 12 | S244 |
| EOL_OUT~ | U523 | 6 | LS244 |
| EOL~ | U825 | 11 | S244 |
| EOL~ | U517 | 2 | LS374 |
| EOL~ | U825 | 8 | S244 |
| E_CEN~ | U216 | 14 | 29823 |
| E_CEN~ | U524 | 7 | S139 |
| E_OE | U427 | 13 | LS125 |
| E_OE | U726 | 15 | 29823 |
| E_OE~ | U216 | 1 | 29823 |
| E_OE~ | U627 | 14 | 316A102 1K |
| E_OE~ | U726 | 17 | 29823 |
| FDBK0 | U708 | 18 | LS244 |
| FDBK0 | U709 | 23 | 29823 |
| FDBK0 | U710 | 8 | 2018 |
| FDBK1 | U708 | 16 | LS244 |
| FDBK1 | U709 | 22 | 29823 |
| FDBK1 | U710 | 7 | 2018 |
| FDBK2 | U708 | 14 | LS244 |
| FDBK2 | U709 | 21 | 29823 |
| FDBK2 | U710 | 6 | 2018 |
| FDBK3 | U708 | 12 | LS244 |
| FDBK3 | U709 | 20 | 29823 |
| FDBK3 | U710 | 5 | 2018 |
| FDBK4 | U709 | 19 | 29823 |
| FDBK4 | U710 | 4 | 2018 |
| FDBK4 | U708 | 9 | LS244 |
| FDBK5 | U709 | 18 | 29823 |
| FDBK5 | U710 | 3 | 2018 |
| FDBK5 | U708 | 7 | LS244 |
| FDBK6 | U709 | 17 | 29823 |
| FDBK6 | U710 | 2 | 2018 |
| FDBK6 | U708 | 5 | LS244 |
| FDBK7 | U710 | 1 | 2018 |
| FDBK7 | U709 | 16 | 29823 |
| FDBK7 | U708 | 3 | LS244 |
| FDBK8 | U709 | 15 | 29823 |
| FDBK8 | U206 | 18 | S244 |
| FDBK8 | U710 | 23 | 2018 |
| G0 | U220 | 13 | S381 |
| G0 | U324 | 3 | S182 |
| G1 | U324 | 1 | S182 |
| G1 | U320 | 13 | S381 |
| GEN~ | U420 | 11 | PAL20R8A |
| GEN~ | U420 | 13 | PAL20R8A |
| GND | U701 | 1 | PGA2010 |
| GND | U217 | 10 | 29823 |
| GND | U319 | 11 | S244 |
| GND | U626 | 12 | ALS569 |
| GND | U319 | 13 | S244 |
| GND | U709 | 14 | 29823 |
| GND | U703 | 15 | S381 |
| GND | U813 | 16 | HM6167HLP |
| GND | U319 | 17 | S244 |
| GND | U710 | 18 | 2018 |
| GND | U710 | 19 | 2018 |

| | | | |
|---|---|---|---|
| GND | U701 | 2 | PGA2010 |
| GND | U610 | 20 | EDH8832C |
| GND | U406 | 23 | LS461 |
| GND | U701 | 3 | PGA2010 |
| GND | U701 | 39 | PGA2010 |
| GND | U519 | 4 | S138 |
| GND | U701 | 40 | PGA2010 |
| GND | U318 | 46 | PGA2010 |
| GND | U701 | 47 | PGA2010 |
| GND | U519 | 5 | S138 |
| GND | U318 | 62 | PGA2010 |
| GND | U318 | 63 | PGA2010 |
| GND | U318 | 64 | PGA2010 |
| GND | U318 | 65 | PGA2010 |
| GND | U318 | 66 | PGA2010 |
| GND | U701 | 67 | PGA2010 |
| GND | U703 | 7 | S381 |
| GND | U824 | 8 | CRC |
| GND | U427 | 9 | LS125 |
| GND | | J1-12 | CONNECTOR |
| GND | | J1-16 | CONNECTOR |
| GND | | J1-20 | CONNECTOR |
| GND | | J1-24 | CONNECTOR |
| GND | | J1-28 | CONNECTOR |
| GND | | J1-32 | CONNECTOR |
| GND | | J1-33 | CONNECTOR |
| GND | | J1-35 | CONNECTOR |
| GND | | J1-37 | CONNECTOR |
| GND | | J1-39 | CONNECTOR |
| GND | | J1-4 | CONNECTOR |
| GND | | J1-40 | CONNECTOR |
| GND | | J1-42 | CONNECTOR |
| GND | | J1-43 | CONNECTOR |
| GND | | J1-45 | CONNECTOR |
| GND | | J1-46 | CONNECTOR |
| GND | | J1-48 | CONNECTOR |
| GND | | J1-49 | CONNECTOR |
| GND | | J1-8 | CONNECTOR |
| GND | | P1-12 | CONNECTOR |
| GND | | P1-22 | CONNECTOR |
| GND | | P1-32 | CONNECTOR |
| GND | | P1-42 | CONNECTOR |
| GND | | P1-52 | CONNECTOR |
| GND | | P1-62 | CONNECTOR |
| GND | | P1-72 | CONNECTOR |
| GND | | P1-82 | CONNECTOR |
| GND | | P1-92 | CONNECTOR |
| GND | | P2-12 | CONNECTOR |
| GND | | P2-2 | CONNECTOR |
| GND | | P2-22 | CONNECTOR |
| GND | | P2-32 | CONNECTOR |
| GND | | P2-42 | CONNECTOR |
| GND | | P2-52 | CONNECTOR |
| GND | | P2-62 | CONNECTOR |
| GND | | P2-72 | CONNECTOR |
| GND | | P2-82 | CONNECTOR |
| GND | | P2-92 | CONNECTOR |
| HOST_ACCESS~ | U804 | 21 | PAL14L8 |
| HOST_ACCESS~ | U625 | 5 | LS138 |

| | | | |
|---|---|---|---|
| HOST_ACLK | U315 | 5 | LS164 |
| HOST_ACLK | U512 | 8 | PAL20L10A |
| HOST_CLK~ | U724 | 10 | LS138 |
| HOST_CLK~ | U506 | 3 | S10 |
| HOST_DRDY~ | U829 | 12 | LS273 |
| HOST_DRDY~ | U107 | 15 | LS241 |
| HOST_IR1~ | U823 | 11 | LS241 |
| HOST_IR1~ | U829 | 15 | LS273 |
| HOST_IR2~ | U823 | 13 | LS241 |
| HOST_IR2~ | U829 | 16 | LS273 |
| HOST_IR3~ | U823 | 15 | LS241 |
| HOST_IR3~ | U829 | 19 | LS273 |
| HOST_OBRDY~ | U823 | 17 | LS241 |
| HOST_OBRDY~ | U829 | 9 | LS273 |
| HOST_PULSE | | | PAL20L10A |
| HOST_PULSE | U410 | 6 | S11 |
| HOST_TYPE0~ | U107 | 11 | LS241 |
| HOST_TYPE0~ | U829 | 2 | LS273 |
| HOST_TYPE1~ | U107 | 13 | LS241 |
| HOST_TYPE1~ | U829 | 5 | LS273 |
| INIT2~ | U510 | 1 | LS273 |
| INIT2~ | U408 | 11 | S08 |
| INIT_CF~ | U415 | 13 | LS374 |
| INIT_CF~ | U721 | 6 | S139 |
| INIT_COEF~ | U509 | 11 | ALS569 |
| INIT_COEF~ | U415 | 12 | LS374 |
| INIT_COEF~ | U206 | 13 | S244 |
| INIT~ | U802 | 17 | LS244 |
| IR1~ | U722 | 15 | S251 |
| IR1~ | U823 | 18 | LS241 |
| IR1~ | U823 | 9 | LS241 |
| IR2~ | U722 | 14 | S251 |
| IR2~ | U823 | 16 | LS241 |
| IR2~ | U823 | 7 | LS241 |
| IR3~ | U722 | 13 | S251 |
| IR3~ | U823 | 14 | LS241 |
| IR3~ | U823 | 5 | LS241 |
| CH1_D0 | | J1-1 | CONNECTOR |
| CH1_D7 | | J1-10 | CONNECTOR |
| CH2_D0 | | J1-11 | CONNECTOR |
| CH2_D1 | | J1-13 | CONNECTOR |
| CH2_D2 | | J1-14 | CONNECTOR |
| CH2_D3 | | J1-15 | CONNECTOR |
| CH2_D4 | | J1-17 | CONNECTOR |
| CH2_D5 | | J1-18 | CONNECTOR |
| CH2_D6 | | J1-19 | CONNECTOR |
| CH1_D1 | | J1-2 | CONNECTOR |
| CH2_D7 | | J1-21 | CONNECTOR |
| CH3_D0 | | J1-22 | CONNECTOR |
| CH3_D1 | | J1-23 | CONNECTOR |
| CH3_D2 | | J1-25 | CONNECTOR |
| CH3_D3 | | J1-26 | CONNECTOR |
| CH3_D4 | | J1-27 | CONNECTOR |
| CH3_D5 | | J1-29 | CONNECTOR |
| CH1_D2 | | J1-3 | CONNECTOR |
| CH3_D6 | | J1-30 | CONNECTOR |
| CH3_D7 | | J1-31 | CONNECTOR |
| TYPE0~ | | J1-34 | CONNECTOR |
| TYPE1~ | | J1-36 | CONNECTOR |

| | | | |
|---|---|---|---|
| U/D~ | | J1-38 | CONNECTOR |
| DATA_RDY~ | | J1-41 | CONNECTOR |
| CLR_ADDR~ | | J1-44 | CONNECTOR |
| DATA_TAKEN~ | | J1-47 | CONNECTOR |
| CH1_D3 | | J1-5 | CONNECTOR |
| SO~ | | J1-50 | CONNECTOR |
| CH1_D4 | | J1-6 | CONNECTOR |
| CH1_D5 | | J1-7 | CONNECTOR |
| CH1_D6 | | J1-9 | CONNECTOR |
| JC1 | U712 | 15 | 29823 |
| JC1 | U206 | 16 | S244 |
| JC1 | U710 | 22 | 2018 |
| JC2 | U423 | 15 | 29823 |
| JC2 | U802 | 16 | LS244 |
| JC2 | U327 | 22 | 2018 |
| JC_EXCH~ | U413 | 13 | S151 |
| JC_EXCH~ | U412 | 6 | S32 |
| JC_GRP2~ | U416 | 7 | S251 |
| JC_GRP2~ | U515 | 8 | S04 |
| L0 | U316 | 2 | 29823 |
| L0 | U219 | 22 | PAL20L8A |
| L1 | U219 | 21 | PAL20L8A |
| L1 | U316 | 3 | 29823 |
| L2 | U219 | 20 | PAL20L8A |
| L2 | U316 | 4 | 29823 |
| L3 | U219 | 19 | PAL20L8A |
| L3 | U316 | 5 | 29823 |
| L4 | U219 | 18 | PAL20L8A |
| L4 | U316 | 6 | 29823 |
| L5 | U219 | 17 | PAL20L8A |
| L5 | U316 | 7 | 29823 |
| L6 | U219 | 16 | PAL20L8A |
| L6 | U316 | 8 | 29823 |
| L7 | U219 | 15 | PAL20L8A |
| L7 | U316 | 9 | 29823 |
| LAST_COEF~ | U413 | 15 | S151 |
| LAST_COEF~ | U314 | 19 | ALS569 |
| LD_COEF1 | U309 | 1 | LS245 |
| LD_COEF1 | U312 | 20 | 2018 |
| LD_OTSEQ | U527 | 1 | LS245 |
| LD_OTSEQ | U512 | 19 | PAL20L10A |
| LD_OTSEQ | U327 | 20 | 2018 |
| LD_PAR1~ | U510 | 11 | LS273 |
| LD_PAR1~ | U724 | 15 | LS138 |
| LD_PAR2~ | U826 | 1 | PAL20R4 |
| LD_PAR2~ | U508 | 11 | LS273 |
| LD_PAR2~ | U724 | 14 | LS138 |
| LD_SEQ1 | U607 | 1 | LS245 |
| LD_SEQ1 | U512 | 18 | PAL20L10A |
| LD_SEQ1 | U710 | 20 | 2018 |
| LINES_CLK~ | U512 | 10 | PAL20L10A |
| LINES_CLK~ | U705 | 13 | 8254 |
| LOAD_LUT | | | PAL20L10A |
| LOAD_LUT | U126 | 1 | LS245 |
| LOAD_LUT | U412 | 13 | S32 |
| LOAD_LUT | U512 | 21 | PAL20L10A |
| LOAD_LUT | U610 | 22 | EDH8832C |
| LUT12_BDEN~ | | | PAL20L10A |
| LUT12_BDEN~ | U412 | 12 | S32 |

| | | | |
|---|---|---|---|
| LUT12_BDEN~ | U126 | 19 | LS245 |
| LUT1_A10 | U222 | 14 | S241 |
| LUT1_A10 | U813 | 18 | HM6167HLP |
| LUT1_A10 | U222 | 5 | S241 |
| LUT1_A10 | U221 | 7 | IMS1421 |
| LUT1_A11 | U222 | 12 | S241 |
| LUT1_A11 | U813 | 19 | HM6167HLP |
| LUT1_A11 | U222 | 3 | S241 |
| LUT1_A11 | U221 | 8 | IMS1421 |
| LUT1_A9 | U222 | 16 | S241 |
| LUT1_A9 | U813 | 17 | HM6167HLP |
| LUT1_A9 | U221 | 6 | IMS1421 |
| LUT1_A9 | U222 | 7 | S241 |
| LUT1_ACCESS~ | U628 | 1 | S08 |
| LUT1_ACCESS~ | U805 | 19 | PAL14L8 |
| LUT1_CS~ | U813 | 11 | HM6167HLP |
| LUT1_CS~ | U628 | 3 | S08 |
| LUT1_CS~ | U221 | 9 | IMS1421 |
| LUT1_OE~ | R1 | 1 | RES 1K |
| LUT1_OE~ | U628 | 2 | S08 |
| LUT1_OE~ | U429 | 23 | 29823 |
| LUT2_ACCESS~ | U805 | 18 | PAL14L8 |
| LUT2_ACCESS~ | U628 | 4 | S08 |
| LUT2_CS~ | U628 | 6 | S08 |
| LUT2_CS~ | U122 | 9 | IMS1421 |
| LUT2_OE~ | R2 | 1 | RES 1K |
| LUT2_OE~ | U429 | 22 | 29823 |
| LUT2_OE~ | U628 | 5 | S08 |
| LUT3_ACCESS~ | | | PAL20L10A |
| LUT3_ACCESS~ | U512 | 11 | PAL20L10A |
| LUT3_ACCESS~ | U805 | 17 | PAL14L8 |
| LUT3_ACCESS~ | U706 | 19 | LS245 |
| LUT3_ACCESS~ | U612 | 2 | LS461 |
| LUT3_CLK | U511 | 11 | S374 |
| LUT3_CLK | U517 | 16 | LS374 |
| LUT3_D0 | U610 | 11 | EDH8832C |
| LUT3_D0 | U706 | 18 | LS245 |
| LUT3_D0 | U417 | 3 | S374 |
| LUT3_D1 | U610 | 12 | EDH8832C |
| LUT3_D1 | U706 | 17 | LS245 |
| LUT3_D1 | U417 | 4 | S374 |
| LUT3_D2 | U610 | 13 | EDH8832C |
| LUT3_D2 | U706 | 16 | LS245 |
| LUT3_D2 | U417 | 7 | S374 |
| LUT3_D3 | U706 | 15 | LS245 |
| LUT3_D3 | U511 | 8 | S374 |
| LUT3_D4 | U511 | 13 | S374 |
| LUT3_D4 | U706 | 14 | LS245 |
| LUT3_D4 | U610 | 16 | EDH8832C |
| LUT3_D5 | U706 | 13 | LS245 |
| LUT3_D5 | U511 | 14 | S374 |
| LUT3_D5 | U610 | 17 | EDH8832C |
| LUT3_D6 | U706 | 12 | LS245 |
| LUT3_D6 | U511 | 17 | S374 |
| LUT3_D6 | U610 | 18 | EDH8832C |
| LUT3_D7 | U706 | 11 | LS245 |
| LUT3_D7 | U511 | 18 | S374 |
| LUT3_D7 | U610 | 19 | EDH8832C |
| LUT3_OE | U426 | 1 | S374 |

| | | | |
|---|---|---|---|
| LUT3_OE | U429 | 20 | 29823 |
| LUT3_OE~ | U511 | 1 | S374 |
| LUT3_OE~ | U319 | 19 | S244 |
| LUT3_OE~ | U429 | 21 | 29823 |
| LUT3_WE~ | | | PAL20L10A |
| LUT3_WE~ | U610 | 27 | EDH8832C |
| LUT_ACCESS~ | | | PAL20L10A |
| LUT_ACCESS~ | U804 | 22 | PAL14L8 |
| LUT_ACCESS~ | U512 | 5 | PAL20L10A |
| LUT_A_ACCESS | U121 | 1 | S374 |
| LUT_A_ACCESS | U513 | 12 | S240 |
| LUT_A_ACCESS | U428 | 15 | S139 |
| LUT_A_ACCESS~ | U613 | 1 | LS244 |
| LUT_A_ACCESS~ | U512 | 17 | PAL20L10A |
| LUT_A_ACCESS~ | U613 | 19 | LS244 |
| LUT_A_ACCESS~ | U513 | 8 | S240 |
| LUT_D0 | U426 | 2 | S374 |
| LUT_D0 | U318 | 3 | PGA2010 |
| LUT_D10 | U318 | 14 | PGA2010 |
| LUT_D10 | U511 | 16 | S374 |
| LUT_D11 | U319 | 12 | S244 |
| LUT_D11 | U318 | 15 | PGA2010 |
| LUT_D11 | U511 | 19 | S374 |
| LUT_D12 | U318 | 16 | PGA2010 |
| LUT_D12 | U319 | 2 | S244 |
| LUT_D12 | U319 | 4 | S244 |
| LUT_D12 | U319 | 6 | S244 |
| LUT_D12 | U319 | 8 | S244 |
| LUT_D13 | U417 | 2 | S374 |
| LUT_D13 | U416 | 4 | S251 |
| LUT_D1 | U318 | 4 | PGA2010 |
| LUT_D14 | U416 | 3 | S251 |
| LUT_D14 | U417 | 5 | S374 |
| LUT_D1 | U426 | 5 | S374 |
| LUT_D15 | U416 | 2 | S251 |
| LUT_D15 | U417 | 6 | S374 |
| LUT_D2 | U318 | 5 | PGA2010 |
| LUT_D2 | U426 | 6 | S374 |
| LUT_D2 | U425 | 7 | S374 |
| LUT_D3 | U318 | 6 | PGA2010 |
| LUT_D3 | U425 | 8 | S374 |
| LUT_D3 | U426 | 9 | S374 |
| LUT_D4 | U426 | 12 | S374 |
| LUT_D4 | U425 | 13 | S374 |
| LUT_D4 | U511 | 2 | S374 |
| LUT_D4 | U318 | 7 | PGA2010 |
| LUT_D5 | U425 | 14 | S374 |
| LUT_D5 | U426 | 15 | S374 |
| LUT_D5 | U511 | 5 | S374 |
| LUT_D5 | U318 | 9 | PGA2010 |
| LUT_D6 | U318 | 10 | PGA2010 |
| LUT_D6 | U426 | 16 | S374 |
| LUT_D6 | U425 | 17 | S374 |
| LUT_D6 | U511 | 6 | S374 |
| LUT_D7 | U416 | 1 | S251 |
| LUT_D7 | U318 | 11 | PGA2010 |
| LUT_D7 | U425 | 18 | S374 |
| LUT_D7 | U426 | 19 | S374 |
| LUT_D7 | U511 | 9 | S374 |

| | | | |
|---|---|---|---|
| LUT_D8 | U429 | 10 | 29823 |
| LUT_D8 | U318 | 12 | PGA2010 |
| LUT_D8 | U319 | 18 | S244 |
| LUT_D9 | U318 | 13 | PGA2010 |
| LUT_D9 | U511 | 15 | S374 |
| LUT_D9 | U319 | 16 | S244 |
| LUT_MD0 | U125 | 15 | IMS1421 |
| LUT_MD0 | U126 | 18 | LS245 |
| LUT_MD0 | U426 | 3 | S374 |
| LUT_MD1 | U125 | 14 | IMS1421 |
| LUT_MD1 | U126 | 17 | LS245 |
| LUT_MD1 | U426 | 4 | S374 |
| LUT_MD2 | U125 | 13 | IMS1421 |
| LUT_MD2 | U126 | 16 | LS245 |
| LUT_MD2 | U426 | 7 | S374 |
| LUT_MD3 | U125 | 12 | IMS1421 |
| LUT_MD3 | U126 | 15 | LS245 |
| LUT_MD3 | U426 | 8 | S374 |
| LUT_MD4 | U426 | 13 | S374 |
| LUT_MD4 | U126 | 14 | LS245 |
| LUT_MD4 | U221 | 15 | IMS1421 |
| LUT_MD5 | U126 | 13 | LS245 |
| LUT_MD5 | U426 | 14 | S374 |
| LUT_MD6 | U126 | 12 | LS245 |
| LUT_MD6 | U221 | 13 | IMS1421 |
| LUT_MD6 | U426 | 17 | S374 |
| LUT_MD7 | U126 | 11 | LS245 |
| LUT_MD7 | U221 | 12 | IMS1421 |
| LUT_MD7 | U426 | 18 | S374 |
| LUT_MD8 | U628 | 13 | S08 |
| LUT_MD8 | U723 | 2 | LS125 |
| LUT_MD8 | U813 | 8 | HM6167HLP |
| LUT_SEL0 | U222 | 13 | S241 |
| LUT_SEL0 | U423 | 23 | 29823 |
| LUT_SEL1 | U222 | 15 | S241 |
| LUT_SEL1 | U423 | 22 | 29823 |
| LUT_SEL2 | U222 | 17 | S241 |
| LUT_SEL2 | U423 | 21 | 29823 |
| LUT_WE~ | | | PAL20L10A |
| LUT_WE~ | U221 | 11 | IMS1421 |
| LUT_WE~ | U813 | 9 | HM6167HLP |
| M1B0_OE~ | U818 | 1 | S374 |
| M1B0_OE~ | U726 | 23 | 29823 |
| M1B0_OE~ | U627 | 8 | 316A102 1K |
| M1B1_OE~ | U819 | 1 | S374 |
| M1B1_OE~ | U726 | 22 | 29823 |
| M1B1_OE~ | U627 | 9 | 316A102 1K |
| M1_DI0 | U616 | 18 | S244 |
| M1_DI0 | U615 | 2 | LS240 |
| M1_DI0 | U717 | 4 | S189 |
| M1_DI1 | U616 | 16 | S244 |
| M1_DI1 | U615 | 4 | LS240 |
| M1_DI1 | U717 | 6 | S189 |
| M1_DI2 | U717 | 10 | S189 |
| M1_DI2 | U616 | 14 | S244 |
| M1_DI2 | U615 | 6 | LS240 |
| M1_DI3 | U717 | 12 | S189 |
| M1_DI3 | U615 | 8 | LS240 |
| M1_DI4 | U615 | 11 | LS240 |

| | | | |
|---|---|---|---|
| M1_DI4 | U618 | 4 | S189 |
| M1_DI4 | U616 | 9 | S244 |
| M1_DI5 | U615 | 13 | LS240 |
| M1_DI5 | U618 | 6 | S189 |
| M1_DI5 | U616 | 7 | S244 |
| M1_DI6 | U618 | 10 | S189 |
| M1_DI6 | U615 | 15 | LS240 |
| M1_DI6 | U616 | 5 | S244 |
| M1_DI7 | U618 | 12 | S189 |
| M1_DI7 | U615 | 17 | LS240 |
| M1_DI7 | U616 | 3 | S244 |
| M2B0_OE~ | U822 | 1 | S374 |
| M2B0_OE~ | U627 | 10 | 316A102 1K |
| M2B0_OE~ | U726 | 21 | 29823 |
| M2B1_OE~ | U821 | 1 | S374 |
| M2B1_OE~ | U627 | 11 | 316A102 1K |
| M2B1_OE~ | U726 | 20 | 29823 |
| M2_DI0 | U622 | 18 | S244 |
| M2_DI0 | U623 | 2 | LS240 |
| M2_DI0 | U720 | 4 | S189 |
| M2_DI1 | U622 | 16 | S244 |
| M2_DI1 | U623 | 4 | LS240 |
| M2_DI1 | U720 | 6 | S189 |
| M2_DI2 | U720 | 10 | S189 |
| M2_DI2 | U622 | 14 | S244 |
| M2_DI2 | U623 | 6 | LS240 |
| M2_DI3 | U720 | 12 | S189 |
| M2_DI3 | U623 | 8 | LS240 |
| M2_DI4 | U623 | 11 | LS240 |
| M2_DI4 | U621 | 4 | S189 |
| M2_DI4 | U622 | 9 | S244 |
| M2_DI5 | U623 | 13 | LS240 |
| M2_DI5 | U621 | 6 | S189 |
| M2_DI5 | U622 | 7 | S244 |
| M2_DI6 | U621 | 10 | S189 |
| M2_DI6 | U623 | 15 | LS240 |
| M2_DI6 | U622 | 5 | S244 |
| M2_DI7 | U621 | 12 | S189 |
| M2_DI7 | U623 | 17 | LS240 |
| M2_DI7 | U622 | 3 | S244 |
| M3B0_OE~ | U817 | 1 | S374 |
| M3B0_OE~ | U627 | 12 | 316A102 1K |
| M3B0_OE~ | U726 | 19 | 29823 |
| M3B1_OE~ | U815 | 1 | S374 |
| M3B1_OE~ | U627 | 13 | 316A102 1K |
| M3B1_OE~ | U726 | 18 | 29823 |
| M3_DI0 | U303 | 18 | S244 |
| M3_DI0 | U816 | 2 | LS240 |
| M3_DI0 | U716 | 4 | S189 |
| M3_DI1 | U303 | 16 | S244 |
| M3_DI1 | U816 | 4 | LS240 |
| M3_DI1 | U716 | 6 | S189 |
| M3_DI2 | U716 | 10 | S189 |
| M3_DI2 | U303 | 14 | S244 |
| M3_DI2 | U816 | 6 | LS240 |
| M3_DI3 | U716 | 12 | S189 |
| M3_DI3 | U816 | 8 | LS240 |
| M3_DI4 | U816 | 11 | LS240 |
| M3_DI4 | U617 | 4 | S189 |

| | | | |
|---|---|---|---|
| M3_DI4 | U303 | 9 | S244 |
| M3_DI5 | U816 | 13 | LS240 |
| M3_DI5 | U617 | 6 | S189 |
| M3_DI5 | U303 | 7 | S244 |
| M3_DI6 | U617 | 10 | S189 |
| M3_DI6 | U816 | 15 | LS240 |
| M3_DI6 | U303 | 5 | S244 |
| M3_DI7 | U617 | 12 | S189 |
| M3_DI7 | U816 | 17 | LS240 |
| M3_DI7 | U303 | 3 | S244 |
| MB_A0 | U625 | 1 | LS138 |
| MB_A0 | U808 | 18 | LS240 |
| MB_A0 | U705 | 19 | 8254 |
| MB_A0 | U708 | 2 | LS244 |
| MB_A0 | U612 | 4 | LS461 |
| MB_A10 | U123 | 11 | LS244 |
| MB_A10 | U807 | 14 | LS240 |
| MB_A10 | U222 | 6 | S241 |
| MB_A11 | U804 | 1 | PAL14L8 |
| MB_A11 | U807 | 12 | LS240 |
| MB_A11 | U123 | 13 | LS244 |
| MB_A1 | U808 | 16 | LS240 |
| MB_A11 | U611 | 7 | LS461 |
| MB_A11 | U222 | 8 | S241 |
| MB_A1 | U625 | 2 | LS138 |
| MB_A1 | U705 | 20 | 8254 |
| MB_A12 | U804 | 2 | PAL14L8 |
| MB_A12 | U611 | 8 | LS461 |
| MB_A12 | U807 | 9 | LS240 |
| MB_A13 | U804 | 3 | PAL14L8 |
| MB_A13 | U807 | 7 | LS240 |
| MB_A13 | U611 | 9 | LS461 |
| MB_A1 | U708 | 4 | LS244 |
| MB_A14 | U804 | 4 | PAL14L8 |
| MB_A14 | U807 | 5 | LS240 |
| MB_A1 | U612 | 5 | LS461 |
| MB_A15 | U807 | 3 | LS240 |
| MB_A15 | U804 | 5 | PAL14L8 |
| MB_A16 | U814 | 18 | LS240 |
| MB_A16 | U804 | 6 | PAL14L8 |
| MB_A17 | U814 | 16 | LS240 |
| MB_A17 | U804 | 7 | PAL14L8 |
| MB_A18 | U814 | 14 | LS240 |
| MB_A18 | U804 | 8 | PAL14L8 |
| MB_A19 | U814 | 12 | LS240 |
| MB_A19 | U804 | 9 | PAL14L8 |
| MB_A20 | U804 | 10 | PAL14L8 |
| MB_A20 | U814 | 9 | LS240 |
| MB_A21 | U804 | 11 | PAL14L8 |
| MB_A2 | U808 | 14 | LS240 |
| MB_A21 | U814 | 7 | LS240 |
| MB_A22 | U804 | 13 | PAL14L8 |
| MB_A22 | U814 | 5 | LS240 |
| MB_A2 | U625 | 3 | LS138 |
| MB_A2 | U708 | 6 | LS244 |
| MB_A3 | U808 | 12 | LS240 |
| MB_A3 | U824 | 3 | CRC |
| MB_A3 | U612 | 7 | LS461 |
| MB_A3 | U708 | 8 | LS244 |

| | | | |
|---|---|---|---|
| MB_A4 | U708 | 11 | LS244 |
| MB_A4 | U824 | 4 | CRC |
| MB_A4 | U612 | 8 | LS461 |
| MB_A4 | U808 | 9 | LS240 |
| MB_A5 | U708 | 13 | LS244 |
| MB_A5 | U808 | 7 | LS240 |
| MB_A5 | U612 | 9 | LS461 |
| MB_A6 | U612 | 10 | LS461 |
| MB_A6 | U708 | 15 | LS244 |
| MB_A6 | U123 | 2 | LS244 |
| MB_A6 | U808 | 5 | LS240 |
| MB_A7 | U708 | 17 | LS244 |
| MB_A7 | U808 | 3 | LS240 |
| MB_A7 | U123 | 4 | LS244 |
| MB_A8 | U807 | 18 | LS240 |
| MB_A8 | U206 | 2 | S244 |
| MB_A8 | U611 | 4 | LS461 |
| MB_A8 | U123 | 6 | LS244 |
| MB_A9 | U807 | 16 | LS240 |
| MB_A9 | U206 | 4 | S244 |
| MB_A9 | U611 | 5 | LS461 |
| MB_A9 | U123 | 8 | LS244 |
| MB_D0 | U824 | 1 | CRC |
| MB_D0 | U824 | 11 | CRC |
| MB_D0 | U615 | 18 | LS240 |
| MB_D0 | U607 | 2 | LS245 |
| MB_D0 | U508 | 3 | LS273 |
| MB_D0 | U705 | 8 | 8254 |
| MB_D10 | U812 | 14 | LS244 |
| MB_D10 | U810 | 16 | LS640 |
| MB_D10 | U310 | 4 | LS245 |
| MB_D10 | U422 | 5 | S244 |
| MB_D10 | U829 | 7 | LS273 |
| MB_D11 | U812 | 12 | LS244 |
| MB_D11 | U810 | 15 | LS640 |
| MB_D11 | U310 | 5 | LS245 |
| MB_D1 | U615 | 16 | LS240 |
| MB_D11 | U422 | 7 | S244 |
| MB_D11 | U829 | 8 | LS273 |
| MB_D12 | U829 | 13 | LS273 |
| MB_D12 | U810 | 14 | LS640 |
| MB_D12 | U310 | 6 | LS245 |
| MB_D12 | U812 | 9 | LS244 |
| MB_D1 | U607 | 3 | LS245 |
| MB_D13 | U810 | 13 | LS640 |
| MB_D13 | U829 | 14 | LS273 |
| MB_D13 | U812 | 7 | LS244 |
| MB_D1 | U508 | 4 | LS273 |
| MB_D14 | U810 | 12 | LS640 |
| MB_D14 | U829 | 17 | LS273 |
| MB_D14 | U812 | 5 | LS244 |
| MB_D14 | U310 | 8 | LS245 |
| MB_D15 | U810 | 11 | LS640 |
| MB_D15 | U829 | 18 | LS273 |
| MB_D15 | U812 | 3 | LS244 |
| MB_D15 | U310 | 9 | LS245 |
| MB_D1 | U705 | 7 | 8254 |
| MB_D2 | U615 | 14 | LS240 |
| MB_D2 | U811 | 16 | LS640 |

| | | | |
|---|---|---|---|
| MB_D2 | U607 | 4 | LS245 |
| MB_D2 | U705 | 6 | 8254 |
| MB_D2 | U508 | 7 | LS273 |
| MB_D3 | U615 | 12 | LS240 |
| MB_D3 | U811 | 15 | LS640 |
| MB_D3 | U607 | 5 | LS245 |
| MB_D3 | U508 | 8 | LS273 |
| MB_D4 | U306 | 11 | LS244 |
| MB_D4 | U508 | 13 | LS273 |
| MB_D4 | U811 | 14 | LS640 |
| MB_D4 | U705 | 4 | 8254 |
| MB_D4 | U607 | 6 | LS245 |
| MB_D4 | U615 | 9 | LS240 |
| MB_D5 | U811 | 13 | LS640 |
| MB_D5 | U508 | 14 | LS273 |
| MB_D5 | U705 | 3 | 8254 |
| MB_D5 | U615 | 7 | LS240 |
| MB_D6 | U811 | 12 | LS640 |
| MB_D6 | U306 | 15 | LS244 |
| MB_D6 | U508 | 17 | LS273 |
| MB_D6 | U705 | 2 | 8254 |
| MB_D6 | U615 | 5 | LS240 |
| MB_D6 | U607 | 8 | LS245 |
| MB_D7 | U705 | 1 | 8254 |
| MB_D7 | U811 | 11 | LS640 |
| MB_D7 | U306 | 17 | LS244 |
| MB_D7 | U508 | 18 | LS273 |
| MB_D7 | U615 | 3 | LS240 |
| MB_D7 | U607 | 9 | LS245 |
| MB_D8 | U813 | 12 | HM6167HLP |
| MB_D8 | U812 | 18 | LS244 |
| MB_D8 | U310 | 2 | LS245 |
| MB_D8 | U427 | 3 | LS125 |
| MB_D9 | U812 | 16 | LS244 |
| MB_D9 | U810 | 17 | LS640 |
| MB_D9 | U310 | 3 | LS245 |
| MB_D9 | U829 | 4 | LS273 |
| MLT8 | U429 | 15 | 29823 |
| MLT8~ | U427 | 5 | LS125 |
| MRDC~ | U802 | 11 | LS244 |
| MRD~ | U810 | 1 | LS640 |
| MRD~ | U826 | 11 | PAL20R4 |
| MRD~ | U804 | 17 | PAL14L8 |
| MRD~ | U705 | 22 | 8254 |
| MRD~ | U625 | 4 | LS138 |
| MULT1_0 | U701 | 18 | PGA2010 |
| MULT1_0 | U704 | 23 | PAL20R8A |
| MULT1_10 | U704 | 11 | PAL20R8A |
| MULT1_10 | U701 | 28 | PGA2010 |
| MULT1_1 | U701 | 19 | PGA2010 |
| MULT1_1 | U704 | 2 | PAL20R8A |
| MULT1_2 | U701 | 20 | PGA2010 |
| MULT1_2 | U704 | 3 | PAL20R8A |
| MULT1_3 | U701 | 21 | PGA2010 |
| MULT1_3 | U704 | 4 | PAL20R8A |
| MULT1_4 | U701 | 22 | PGA2010 |
| MULT1_4 | U704 | 5 | PAL20R8A |
| MULT1_5 | U701 | 23 | PGA2010 |
| MULT1_5 | U704 | 6 | PAL20R8A |

| | | | |
|---|---|---|---|
| MULT1_6 | U701 | 24 | PGA2010 |
| MULT1_6 | U704 | 7 | PAL20R8A |
| MULT1_7 | U701 | 25 | PGA2010 |
| MULT1_7 | U704 | 8 | PAL20R8A |
| MULT1_8 | U701 | 26 | PGA2010 |
| MULT1_8 | U704 | 9 | PAL20R8A |
| MULT1_9 | U704 | 10 | PAL20R8A |
| MULT1_9 | U701 | 27 | PGA2010 |
| MULT2_0 | U501 | 18 | PGA2010 |
| MULT2_0 | U504 | 23 | PAL20R8A |
| MULT2_10 | U504 | 11 | PAL20R8A |
| MULT2_10 | U501 | 28 | PGA2010 |
| MULT2_1 | U501 | 19 | PGA2010 |
| MULT2_1 | U504 | 2 | PAL20R8A |
| MULT2_2 | U501 | 20 | PGA2010 |
| MULT2_2 | U504 | 3 | PAL20R8A |
| MULT2_3 | U501 | 21 | PGA2010 |
| MULT2_3 | U504 | 4 | PAL20R8A |
| MULT2_4 | U501 | 22 | PGA2010 |
| MULT2_4 | U504 | 5 | PAL20R8A |
| MULT2_5 | U501 | 23 | PGA2010 |
| MULT2_5 | U504 | 6 | PAL20R8A |
| MULT2_6 | U501 | 24 | PGA2010 |
| MULT2_6 | U504 | 7 | PAL20R8A |
| MULT2_7 | U501 | 25 | PGA2010 |
| MULT2_7 | U504 | 8 | PAL20R8A |
| MULT2_8 | U501 | 26 | PGA2010 |
| MULT2_8 | U504 | 9 | PAL20R8A |
| MULT2_9 | U504 | 10 | PAL20R8A |
| MULT2_9 | U501 | 27 | PGA2010 |
| MULT3_0 | U201 | 18 | PGA2010 |
| MULT3_0 | U204 | 23 | PAL20R8A |
| MULT3_10 | U204 | 11 | PAL20R8A |
| MULT3_10 | U201 | 28 | PGA2010 |
| MULT3_1 | U201 | 19 | PGA2010 |
| MULT3_1 | U204 | 2 | PAL20R8A |
| MULT3_2 | U201 | 20 | PGA2010 |
| MULT3_2 | U204 | 3 | PAL20R8A |
| MULT3_3 | U201 | 21 | PGA2010 |
| MULT3_3 | U204 | 4 | PAL20R8A |
| MULT3_4 | U201 | 22 | PGA2010 |
| MULT3_4 | U204 | 5 | PAL20R8A |
| MULT3_5 | U201 | 23 | PGA2010 |
| MULT3_5 | U204 | 6 | PAL20R8A |
| MULT3_6 | U201 | 24 | PGA2010 |
| MULT3_6 | U204 | 7 | PAL20R8A |
| MULT3_7 | U201 | 25 | PGA2010 |
| MULT3_7 | U204 | 8 | PAL20R8A |
| MULT3_8 | U201 | 26 | PGA2010 |
| MULT3_8 | U204 | 9 | PAL20R8A |
| MULT3_9 | U204 | 10 | PAL20R8A |
| MULT3_9 | U201 | 27 | PGA2010 |
| MULT4_0 | U210 | 18 | PGA2010 |
| MULT4_0 | U212 | 23 | PAL20R8A |
| MULT4_10 | U212 | 11 | PAL20R8A |
| MULT4_10 | U210 | 28 | PGA2010 |
| MULT4_1 | U210 | 19 | PGA2010 |
| MULT4_1 | U212 | 2 | PAL20R8A |
| MULT4_2 | U210 | 20 | PGA2010 |

| | | | |
|---|---|---|---|
| MULT4_2 | U212 | 3 | PAL20R8A |
| MULT4_3 | U210 | 21 | PGA2010 |
| MULT4_3 | U212 | 4 | PAL20R8A |
| MULT4_4 | U210 | 22 | PGA2010 |
| MULT4_4 | U212 | 5 | PAL20R8A |
| MULT4_5 | U210 | 23 | PGA2010 |
| MULT4_5 | U212 | 6 | PAL20R8A |
| MULT4_6 | U210 | 24 | PGA2010 |
| MULT4_6 | U212 | 7 | PAL20R8A |
| MULT4_7 | U210 | 25 | PGA2010 |
| MULT4_7 | U212 | 8 | PAL20R8A |
| MULT4_8 | U210 | 26 | PGA2010 |
| MULT4_8 | U212 | 9 | PAL20R8A |
| MULT4_9 | U212 | 10 | PAL20R8A |
| MULT4_9 | U210 | 27 | PGA2010 |
| MULT5_0 | U207 | 18 | PGA2010 |
| MULT5_0 | U209 | 23 | PAL20R8A |
| MULT5_10 | U209 | 11 | PAL20R8A |
| MULT5_10 | U207 | 28 | PGA2010 |
| MULT5_1 | U207 | 19 | PGA2010 |
| MULT5_1 | U209 | 2 | PAL20R8A |
| MULT5_2 | U207 | 20 | PGA2010 |
| MULT5_2 | U209 | 3 | PAL20R8A |
| MULT5_3 | U207 | 21 | PGA2010 |
| MULT5_3 | U209 | 4 | PAL20R8A |
| MULT5_4 | U207 | 22 | PGA2010 |
| MULT5_4 | U209 | 5 | PAL20R8A |
| MULT5_5 | U207 | 23 | PGA2010 |
| MULT5_5 | U209 | 6 | PAL20R8A |
| MULT5_6 | U207 | 24 | PGA2010 |
| MULT5_6 | U209 | 7 | PAL20R8A |
| MULT5_7 | U207 | 25 | PGA2010 |
| MULT5_7 | U209 | 8 | PAL20R8A |
| MULT5_8 | U207 | 26 | PGA2010 |
| MULT5_8 | U209 | 9 | PAL20R8A |
| MULT5_9 | U209 | 10 | PAL20R8A |
| MULT5_9 | U207 | 27 | PGA2010 |
| MULT6_0 | U213 | 18 | PGA2010 |
| MULT6_0 | U215 | 23 | PAL20R8A |
| MULT6_10 | U215 | 11 | PAL20R8A |
| MULT6_10 | U213 | 28 | PGA2010 |
| MULT6_1 | U213 | 19 | PGA2010 |
| MULT6_1 | U215 | 2 | PAL20R8A |
| MULT6_2 | U213 | 20 | PGA2010 |
| MULT6_2 | U215 | 3 | PAL20R8A |
| MULT6_3 | U213 | 21 | PGA2010 |
| MULT6_3 | U215 | 4 | PAL20R8A |
| MULT6_4 | U213 | 22 | PGA2010 |
| MULT6_4 | U215 | 5 | PAL20R8A |
| MULT6_5 | U213 | 23 | PGA2010 |
| MULT6_5 | U215 | 6 | PAL20R8A |
| MULT6_6 | U213 | 24 | PGA2010 |
| MULT6_6 | U215 | 7 | PAL20R8A |
| MULT6_7 | U213 | 25 | PGA2010 |
| MULT6_7 | U215 | 8 | PAL20R8A |
| MULT6_8 | U213 | 26 | PGA2010 |
| MULT6_8 | U215 | 9 | PAL20R8A |
| MULT6_9 | U215 | 10 | PAL20R8A |
| MULT6_9 | U213 | 27 | PGA2010 |

| | | | |
|---|---|---|---|
| MULT_0 | U219 | 1 | PAL20L8A |
| MULT_0 | U318 | 18 | PGA2010 |
| MULT_0 | U425 | 2 | S374 |
| MULT_0 | U316 | 23 | 29823 |
| MULT_0 | U220 | 4 | S381 |
| MULT_0 | U318 | 61 | PGA2010 |
| MULT_10 | U219 | 11 | PAL20L8A |
| MULT_10 | U422 | 15 | S244 |
| MULT_10 | U318 | 28 | PGA2010 |
| MULT_11 | U422 | 13 | S244 |
| MULT_11 | U318 | 29 | PGA2010 |
| MULT_1 | U318 | 19 | PGA2010 |
| MULT_1 | U220 | 2 | S381 |
| MULT_12 | U316 | 10 | 29823 |
| MULT_12 | U422 | 11 | S244 |
| MULT_12 | U219 | 14 | PAL20L8A |
| MULT_1 | U316 | 22 | 29823 |
| MULT_12 | U318 | 30 | PGA2010 |
| MULT_1 | U317 | 4 | LS244 |
| MULT_1 | U425 | 5 | S374 |
| MULT_1 | U318 | 60 | PGA2010 |
| MULT_2 | U220 | 18 | S381 |
| MULT_2 | U318 | 20 | PGA2010 |
| MULT_2 | U316 | 21 | 29823 |
| MULT_2 | U219 | 3 | PAL20L8A |
| MULT_2 | U318 | 59 | PGA2010 |
| MULT_2 | U425 | 6 | S374 |
| MULT_3 | U220 | 16 | S381 |
| MULT_3 | U316 | 20 | 29823 |
| MULT_3 | U318 | 21 | PGA2010 |
| MULT_3 | U219 | 4 | PAL20L8A |
| MULT_3 | U318 | 58 | PGA2010 |
| MULT_3 | U317 | 8 | LS244 |
| MULT_3 | U425 | 9 | S374 |
| MULT_4 | U317 | 11 | LS244 |
| MULT_4 | U425 | 12 | S374 |
| MULT_4 | U316 | 19 | 29823 |
| MULT_4 | U318 | 22 | PGA2010 |
| MULT_4 | U320 | 4 | S381 |
| MULT_4 | U219 | 5 | PAL20L8A |
| MULT_4 | U318 | 57 | PGA2010 |
| MULT_5 | U317 | 13 | LS244 |
| MULT_5 | U425 | 15 | S374 |
| MULT_5 | U316 | 18 | 29823 |
| MULT_5 | U320 | 2 | S381 |
| MULT_5 | U318 | 23 | PGA2010 |
| MULT_5 | U318 | 56 | PGA2010 |
| MULT_5 | U219 | 6 | PAL20L8A |
| MULT_6 | U317 | 15 | LS244 |
| MULT_6 | U425 | 16 | S374 |
| MULT_6 | U316 | 17 | 29823 |
| MULT_6 | U320 | 18 | S381 |
| MULT_6 | U318 | 24 | PGA2010 |
| MULT_6 | U318 | 55 | PGA2010 |
| MULT_6 | U219 | 7 | PAL20L8A |
| MULT_7 | U316 | 16 | 29823 |
| MULT_7 | U317 | 17 | LS244 |
| MULT_7 | U425 | 19 | S374 |
| MULT_7 | U318 | 25 | PGA2010 |
| MULT_7 | U318 | 54 | PGA2010 |

| | | | |
|---|---|---|---|
| MULT_7 | U219 | 8 | PAL20L8A |
| MULT_8 | U316 | 15 | 29823 |
| MULT_8 | U427 | 2 | LS125 |
| MULT_8 | U318 | 26 | PGA2010 |
| MULT_8 | U120 | 4 | S381 |
| MULT_8 | U318 | 50 | PGA2010 |
| MULT_8 | U318 | 52 | PGA2010 |
| MULT_8 | U318 | 53 | PGA2010 |
| MULT_8 | U427 | 6 | LS125 |
| MULT_8 | U219 | 9 | PAL20L8A |
| MULT_9 | U219 | 10 | PAL20L8A |
| MULT_9 | U422 | 17 | S244 |
| MULT_9 | U318 | 27 | PGA2010 |
| MULT_OE~ | U429 | 17 | 29823 |
| MULT_OE~ | U318 | 39 | PGA2010 |
| MWR~ | U826 | 14 | PAL20R4 |
| MWR~ | U804 | 16 | PAL14L8 |
| MWR~ | U705 | 23 | 8254 |
| MWR~ | U724 | 4 | LS138 |
| MWTC~ | U802 | 13 | LS244 |
| M_CEN~ | U218 | 14 | 29823 |
| M_CEN~ | U524 | 5 | S139 |
| M_OE~ | U218 | 1 | 29823 |
| M_OE~ | U429 | 16 | 29823 |
| NBOTTOM | U416 | 14 | S251 |
| NBOTTOM | U829 | 6 | LS273 |
| NEXT_BANK~ | U606 | 13 | S112 |
| NEXT_BANK~ | U415 | 15 | LS374 |
| NEXT_BANK~ | U418 | 4 | S10 |
| NEXT_BANK~ | U418 | 5 | S10 |
| NEXT_BANK~ | U626 | 8 | ALS569 |
| NEXT_COEF~ | U415 | 6 | LS374 |
| NEXT_COEF~ | U509 | 7 | ALS569 |
| NXT_BNK~ | U415 | 14 | LS374 |
| NXT_BNK~ | U721 | 5 | S139 |
| NXT_SHIFT1~ | U825 | 18 | S244 |
| NXT_SHIFT1~ | U826 | 6 | PAL20R4 |
| NXT_SHIFT1~ | U523 | 8 | LS244 |
| NXT_SHIFT2~ | U523 | 11 | LS244 |
| NXT_SHIFT2~ | U825 | 16 | S244 |
| NXT_SHIFT2~ | U826 | 7 | PAL20R4 |
| NXT_SHIFT3~ | U523 | 13 | LS244 |
| NXT_SHIFT3~ | U825 | 14 | S244 |
| NXT_SHIFT3~ | U826 | 8 | PAL20R4 |
| OB0~ | U828 | 18 | S244 |
| OB0~ | U827 | 2 | LS240 |
| OB1~ | U828 | 16 | S244 |
| OB1~ | U827 | 4 | LS240 |
| OB2~ | U828 | 14 | S244 |
| OB2~ | U827 | 6 | LS240 |
| OB3~ | U828 | 12 | S244 |
| OB3~ | U827 | 8 | LS240 |
| OB4~ | U827 | 11 | LS240 |
| OB4~ | U828 | 9 | S244 |
| OB5~ | U827 | 13 | LS240 |
| OB5~ | U828 | 7 | S244 |
| OB6~ | U827 | 15 | LS240 |
| OB6~ | U828 | 5 | S244 |
| OB7~ | U827 | 17 | LS240 |

| | | | |
|---|---|---|---|
| OB7~ | U828 | 3 | S244 |
| OB_ENB~ | U828 | 1 | S244 |
| OB_ENB~ | U414 | 18 | S240 |
| OB_ENB~ | U825 | 19 | S244 |
| OB_ENB~ | U722 | 9 | S251 |
| OB_EOL~ | U523 | 15 | LS244 |
| OB_EOL~ | U825 | 9 | S244 |
| OB_RDY~ | U823 | 8 | LS241 |
| OB_SHIFT~ | U523 | 17 | LS244 |
| OB_SHIFT~ | U825 | 7 | S244 |
| OFDBK0 | U321 | 18 | LS244 |
| OFDBK0 | U322 | 23 | 29823 |
| OFDBK0 | U327 | 8 | 2018 |
| OFDBK1 | U321 | 16 | LS244 |
| OFDBK1 | U322 | 22 | 29823 |
| OFDBK1 | U327 | 7 | 2018 |
| OFDBK2 | U321 | 14 | LS244 |
| OFDBK2 | U322 | 21 | 29823 |
| OFDBK2 | U327 | 6 | 2018 |
| OFDBK3 | U321 | 12 | LS244 |
| OFDBK3 | U322 | 20 | 29823 |
| OFDBK3 | U327 | 5 | 2018 |
| OFDBK4 | U322 | 19 | 29823 |
| OFDBK4 | U327 | 4 | 2018 |
| OFDBK4 | U321 | 9 | LS244 |
| OFDBK5 | U322 | 18 | 29823 |
| OFDBK5 | U327 | 3 | 2018 |
| OFDBK5 | U321 | 7 | LS244 |
| OFDBK6 | U322 | 17 | 29823 |
| OFDBK6 | U327 | 2 | 2018 |
| OFDBK6 | U321 | 5 | LS244 |
| OFDBK7 | U327 | 1 | 2018 |
| OFDBK7 | U322 | 16 | 29823 |
| OFDBK7 | U321 | 3 | LS244 |
| OFDBK8 | U322 | 15 | 29823 |
| OFDBK8 | U802 | 18 | LS244 |
| OFDBK8 | U327 | 23 | 2018 |
| OFST1~ | U702 | 14 | PAL20R8A |
| OFST1~ | U412 | 3 | S32 |
| OFST4~ | U211 | 14 | PAL20R8A |
| OFST4~ | U507 | 15 | LS374 |
| OTSEQ_A_ACCESS | U322 | 1 | 29823 |
| OTSEQ_A_ACCESS | U414 | 14 | S240 |
| OTSEQ_A_ACCESS | U802 | 1 | LS244 |
| OTSEQ_A_ACCESS | U512 | 16 | PAL20L10A |
| OTSEQ_A_ACCESS | U321 | 19 | LS244 |
| OTSEQ_A_ACCESS | U414 | 6 | S240 |
| OTSEQ_H_ACC~ | | | PAL20L10A |
| OTSEQ_H_ACC~ | U805 | 15 | PAL14L8 |
| OTSEQ_H_ACC~ | U527 | 19 | LS245 |
| OTSEQ_L_ACC~ | | | PAL20L10A |
| OTSEQ_L_ACC~ | U127 | 19 | LS245 |
| OTSEQ_L_ACC~ | U804 | 20 | PAL14L8 |
| OTSEQ_U_ACC~ | | | PAL20L10A |
| OTSEQ_U_ACC~ | U805 | 16 | PAL14L8 |
| OTSEQ_U_ACC~ | U223 | 19 | LS245 |
| OTSEQ_WRH~ | | | PAL20L10A |
| OTSEQ_WRH~ | U328 | 21 | 2018 |
| OTSEQ_WRL~ | | | PAL20L10A |

| | | | |
|---|---|---|---|
| OTSEQ_WRL~ | U327 | 21 | 2018 |
| OTSEQ_WRU~ | | | PAL20L10A |
| OTSEQ_WRU~ | U224 | 21 | 2018 |
| OT_PRST~ | U322 | 11 | 29823 |
| OT_PRST~ | U517 | 19 | LS374 |
| P0 | U220 | 14 | S381 |
| P0 | U324 | 4 | S182 |
| INIT~ | | P1-16 | CONNECTOR |
| MRDC~ | | P1-23 | CONNECTOR |
| MWTC~ | | P1-24 | CONNECTOR |
| XACK~ | | P1-27 | CONNECTOR |
| ADR16~ | | P1-34 | CONNECTOR |
| ADR17~ | | P1-36 | CONNECTOR |
| CCLK~ | | P1-37 | CONNECTOR |
| ADR18~ | | P1-38 | CONNECTOR |
| ADR19~ | | P1-40 | CONNECTOR |
| ADR14~ | | P1-53 | CONNECTOR |
| ADR15~ | | P1-54 | CONNECTOR |
| ADR12~ | | P1-55 | CONNECTOR |
| ADR13~ | | P1-56 | CONNECTOR |
| ADR10~ | | P1-57 | CONNECTOR |
| ADR11~ | | P1-58 | CONNECTOR |
| ADR8~ | | P1-59 | CONNECTOR |
| ADR9~ | | P1-60 | CONNECTOR |
| ADR6~ | | P1-63 | CONNECTOR |
| ADR7~ | | P1-64 | CONNECTOR |
| ADR4~ | | P1-65 | CONNECTOR |
| ADR5~ | | P1-66 | CONNECTOR |
| ADR2~ | | P1-67 | CONNECTOR |
| ADR3~ | | P1-68 | CONNECTOR |
| ADR1~ | | P1-70 | CONNECTOR |
| OB_EOL~ | | P1-71 | CONNECTOR |
| DATE~ | | P1-73 | CONNECTOR |
| DATF~ | | P1-74 | CONNECTOR |
| DATC~ | | P1-75 | CONNECTOR |
| DATD~ | | P1-76 | CONNECTOR |
| DATA~ | | P1-77 | CONNECTOR |
| DATB~ | | P1-78 | CONNECTOR |
| DAT8~ | | P1-79 | CONNECTOR |
| DAT9~ | | P1-80 | CONNECTOR |
| DAT6~ | | P1-83 | CONNECTOR |
| DAT7~ | | P1-84 | CONNECTOR |
| DAT4~ | | P1-85 | CONNECTOR |
| DAT5~ | | P1-86 | CONNECTOR |
| DAT2~ | | P1-87 | CONNECTOR |
| DAT3~ | | P1-88 | CONNECTOR |
| DAT0~ | | P1-89 | CONNECTOR |
| DAT1~ | | P1-90 | CONNECTOR |
| OB_RDY~ | | P1-91 | CONNECTOR |
| P1 | U320 | 14 | S381 |
| P1 | U324 | 2 | S182 |
| DOUT_0~ | | P2-30 | CONNECTOR |
| DOUT_1~ | | P2-34 | CONNECTOR |
| DOUT_2~ | | P2-36 | CONNECTOR |
| DOUT_3~ | | P2-38 | CONNECTOR |
| DOUT_4~ | | P2-40 | CONNECTOR |
| DOUT_5~ | | P2-44 | CONNECTOR |
| DOUT_6~ | | P2-46 | CONNECTOR |
| DOUT_7~ | | P2-48 | CONNECTOR |

| | | | |
|---|---|---|---|
| READY_IN1~ | | P2-54 | CONNECTOR |
| READY_IN2~ | | P2-56 | CONNECTOR |
| READY_IN3~ | | P2-58 | CONNECTOR |
| NXT_SHIFT1~ | | P2-64 | CONNECTOR |
| NXT_SHIFT2~ | | P2-66 | CONNECTOR |
| NXT_SHIFT3~ | | P2-68 | CONNECTOR |
| EOL_OUT~ | | P2-74 | CONNECTOR |
| ADR23~ | | P2-76 | CONNECTOR |
| ADR21~ | | P2-78 | CONNECTOR |
| ADR22~ | | P2-81 | CONNECTOR |
| ADR20~ | | P2-83 | CONNECTOR |
| OB1~ | | P2-84 | CONNECTOR |
| OB0~ | | P2-85 | CONNECTOR |
| OB3~ | | P2-86 | CONNECTOR |
| OB2~ | | P2-87 | CONNECTOR |
| OB5~ | | P2-88 | CONNECTOR |
| OB4~ | | P2-89 | CONNECTOR |
| OB7~ | | P2-90 | CONNECTOR |
| OB6~ | | P2-91 | CONNECTOR |
| OB_SHIFT~ | | P2-97 | CONNECTOR |
| PD1~ | U603 | 1 | S374 |
| PD1~ | U509 | 12 | ALS569 |
| PD1~ | U826 | 13 | PAL20R4 |
| PD1~ | U206 | 19 | S244 |
| PD1~ | U513 | 9 | S240 |
| PD2~ | U820 | 1 | S244 |
| PD2~ | U820 | 19 | S244 |
| PD2~ | U513 | 7 | S240 |
| PD3~ | U415 | 1 | LS374 |
| PD3~ | U704 | 13 | PAL20R8A |
| PD3~ | U414 | 19 | S240 |
| PD3~ | U717 | 2 | S189 |
| PD3~ | U513 | 5 | S240 |
| PL_CLK | U516 | 1 | DELAY |
| PL_CLK | U415 | 11 | LS374 |
| PL_CLK | U709 | 13 | 29823 |
| PL_CLK | U513 | 18 | S240 |
| PL_CLK | U509 | 2 | ALS569 |
| PL_CLK2 | U420 | 1 | PAL20R8A |
| PL_CLK2 | U422 | 2 | S244 |
| PL_CLK2 | U505 | 5 | S244 |
| PL_CLK2A | U425 | 11 | S374 |
| PL_CLK2A | U316 | 13 | 29823 |
| PL_CLK2A | U422 | 18 | S244 |
| PL_CLK2A | U318 | 38 | PGA2010 |
| PL_CLK2A | U422 | 4 | S244 |
| PL_CLK2A | U318 | 44 | PGA2010 |
| PL_CLK2A | U318 | 45 | PGA2010 |
| PL_CLK2B | U818 | 11 | S374 |
| PL_CLK2B | U726 | 13 | 29823 |
| PL_CLK2B | U422 | 16 | S244 |
| PL_CLK2B | U422 | 6 | S244 |
| PL_CLK2C | U517 | 11 | LS374 |
| PL_CLK2C | U322 | 13 | 29823 |
| PL_CLK2C | U422 | 14 | S244 |
| PL_CLK | U412 | 9 | S32 |
| PU1112 | U509 | 1 | ALS569 |
| PU1112 | U611 | 10 | LS461 |
| PU1112 | U316 | 11 | 29823 |

| | | | |
|---|---|---|---|
| PU1112 | U627 | 4 | 316A102 1K |
| PU1112 | U318 | 41 | PGA2010 |
| PU1112 | U318 | 42 | PGA2010 |
| PU1112 | U318 | 48 | PGA2010 |
| PU1112 | U318 | 49 | PGA2010 |
| PU1112 | U509 | 8 | ALS569 |
| PU1112 | U509 | 9 | ALS569 |
| PU1516 | U608 | 1 | LS175 |
| PU1516 | U326 | 11 | 29823 |
| PU1516 | U705 | 14 | 8254 |
| PU1516 | U627 | 5 | 316A102 1K |
| PU1516 | U519 | 6 | S138 |
| PU1820 | U315 | 1 | LS164 |
| PU1820 | U513 | 11 | S240 |
| PU1820 | U513 | 13 | S240 |
| PU1820 | U513 | 15 | S240 |
| PU1820 | U315 | 2 | LS164 |
| PU1820 | U210 | 41 | PGA2010 |
| PU1820 | U210 | 42 | PGA2010 |
| PU1820 | U210 | 49 | PGA2010 |
| PU1820 | U114 | 5 | S381 |
| PU1820 | U625 | 6 | LS138 |
| PU2122 | U207 | 41 | PGA2010 |
| PU2122 | U207 | 42 | PGA2010 |
| PU2122 | U207 | 49 | PGA2010 |
| PU2122 | U110 | 5 | S381 |
| PU2122 | U110 | 6 | S381 |
| PU2122 | U627 | 7 | 316A102 1K |
| PU34 | U627 | 1 | 316A102 1K |
| PU34 | U701 | 41 | PGA2010 |
| PU34 | U701 | 42 | PGA2010 |
| PU34 | U701 | 49 | PGA2010 |
| PU34 | U703 | 5 | S381 |
| PU34 | U703 | 6 | S381 |
| PU56 | U626 | 1 | ALS569 |
| PU56 | U626 | 11 | ALS569 |
| PU56 | U627 | 2 | 316A102 1K |
| PU56 | U201 | 41 | PGA2010 |
| PU56 | U201 | 42 | PGA2010 |
| PU56 | U201 | 49 | PGA2010 |
| PU56 | U203 | 5 | S381 |
| PU56 | U203 | 6 | S381 |
| PU56 | U626 | 9 | ALS569 |
| PU910 | U413 | 1 | S151 |
| PU910 | U606 | 10 | S112 |
| PU910 | U606 | 11 | S112 |
| PU910 | U413 | 12 | S151 |
| PU910 | U606 | 15 | S112 |
| PU910 | U606 | 2 | S112 |
| PU910 | U627 | 3 | 316A102 1K |
| PU910 | U413 | 4 | S151 |
| PXL_CLK~ | U705 | 10 | 8254 |
| PXL_CLK~ | U512 | 9 | PAL20L10A |
| RDBK1~ | U615 | 1 | LS240 |
| RDBK1~ | U625 | 15 | LS138 |
| RDBK1~ | U615 | 19 | LS240 |
| RDBK2~ | U812 | 1 | LS244 |
| RDBK2~ | U625 | 14 | LS138 |
| RDBK2~ | U812 | 19 | LS244 |

| | | | |
|---|---|---|---|
| RDBK3~ | U427 | 1 | LS125 |
| RDBK3~ | U625 | 13 | LS138 |
| RDBK3~ | U422 | 19 | S244 |
| RDBK4~ | U725 | 1 | LS244 |
| RDBK4~ | U625 | 12 | LS138 |
| RDBK4~ | U725 | 19 | LS244 |
| RDBK5~ | U827 | 1 | LS240 |
| RDBK5~ | U625 | 11 | LS138 |
| RDBK5~ | U827 | 19 | LS240 |
| RD_A0 | U526 | 17 | S244 |
| RD_A0 | U526 | 2 | S244 |
| RD_A0 | U326 | 21 | 29823 |
| RD_A1 | U526 | 15 | S244 |
| RD_A1 | U326 | 20 | 29823 |
| RD_A1 | U526 | 4 | S244 |
| RD_A2 | U526 | 13 | S244 |
| RD_A2 | U326 | 19 | 29823 |
| RD_A2 | U526 | 6 | S244 |
| RD_A3 | U526 | 11 | S244 |
| RD_A3 | U326 | 18 | 29823 |
| RD_A3 | U526 | 8 | S244 |
| READY_IN1~ | U823 | 2 | LS241 |
| READY_IN2~ | U823 | 4 | LS241 |
| READY_IN3~ | U823 | 6 | LS241 |
| REN~ | U419 | 11 | PAL20R8A |
| REN~ | U524 | 12 | S139 |
| REN~ | U419 | 13 | PAL20R8A |
| RGB_0 | U424 | 2 | S374 |
| RGB_0 | U420 | 23 | PAL20R8A |
| RGB_1 | U420 | 2 | PAL20R8A |
| RGB_1 | U424 | 5 | S374 |
| RGB_2 | U420 | 3 | PAL20R8A |
| RGB_2 | U424 | 6 | S374 |
| RGB_3 | U420 | 4 | PAL20R8A |
| RGB_3 | U424 | 9 | S374 |
| RGB_4 | U424 | 12 | S374 |
| RGB_4 | U420 | 5 | PAL20R8A |
| RGB_5 | U424 | 15 | S374 |
| RGB_5 | U420 | 6 | PAL20R8A |
| RGB_6 | U424 | 16 | S374 |
| RGB_6 | U420 | 7 | PAL20R8A |
| RGB_7 | U424 | 19 | S374 |
| RGB_7 | U420 | 8 | PAL20R8A |
| RGB_8 | U121 | 16 | S374 |
| RGB_8 | U420 | 9 | PAL20R8A |
| RGB_9 | U420 | 10 | PAL20R8A |
| RGB_9 | U121 | 19 | S374 |
| RGB_CEN | U420 | 14 | PAL20R8A |
| RGB_CEN | U423 | 17 | 29823 |
| RND1 | U415 | 2 | LS374 |
| RND1 | U507 | 3 | LS374 |
| RND1 | U701 | 48 | PGA2010 |
| RND4 | U507 | 2 | LS374 |
| RND4 | U210 | 48 | PGA2010 |
| RSLT123_OE~ | U616 | 1 | S244 |
| RSLT123_OE~ | U616 | 19 | S244 |
| RSLT123_OE~ | U515 | 4 | S04 |
| RSLT1_0~ | U616 | 2 | S244 |
| RSLT1_0~ | U704 | 22 | PAL20R8A |

| | | | |
|---|---|---|---|
| RSLT1_0~ | U703 | 4 | S381 |
| RSLT1_1~ | U703 | 2 | S381 |
| RSLT1_1~ | U704 | 21 | PAL20R8A |
| RSLT1_1~ | U616 | 4 | S244 |
| RSLT1_2~ | U703 | 18 | S381 |
| RSLT1_2~ | U704 | 20 | PAL20R8A |
| RSLT1_2~ | U616 | 6 | S244 |
| RSLT1_3~ | U703 | 16 | S381 |
| RSLT1_3~ | U704 | 19 | PAL20R8A |
| RSLT1_3~ | U616 | 8 | S244 |
| RSLT1_4~ | U616 | 11 | S244 |
| RSLT1_4~ | U704 | 18 | PAL20R8A |
| RSLT1_4~ | U602 | 4 | S381 |
| RSLT1_5~ | U616 | 13 | S244 |
| RSLT1_5~ | U704 | 17 | PAL20R8A |
| RSLT1_5~ | U602 | 2 | S381 |
| RSLT1_6~ | U616 | 15 | S244 |
| RSLT1_6~ | U704 | 16 | PAL20R8A |
| RSLT1_6~ | U602 | 18 | S381 |
| RSLT1_7~ | U704 | 15 | PAL20R8A |
| RSLT1_7~ | U602 | 16 | S381 |
| RSLT1_7~ | U616 | 17 | S244 |
| RSLT2_0~ | U622 | 2 | S244 |
| RSLT2_0~ | U504 | 22 | PAL20R8A |
| RSLT2_0~ | U503 | 4 | S381 |
| RSLT2_1~ | U503 | 2 | S381 |
| RSLT2_1~ | U504 | 21 | PAL20R8A |
| RSLT2_1~ | U622 | 4 | S244 |
| RSLT2_2~ | U503 | 18 | S381 |
| RSLT2_2~ | U504 | 20 | PAL20R8A |
| RSLT2_2~ | U622 | 6 | S244 |
| RSLT2_3~ | U503 | 16 | S381 |
| RSLT2_3~ | U504 | 19 | PAL20R8A |
| RSLT2_3~ | U622 | 8 | S244 |
| RSLT2_4~ | U622 | 11 | S244 |
| RSLT2_4~ | U504 | 18 | PAL20R8A |
| RSLT2_4~ | U402 | 4 | S381 |
| RSLT2_5~ | U622 | 13 | S244 |
| RSLT2_5~ | U504 | 17 | PAL20R8A |
| RSLT2_5~ | U402 | 2 | S381 |
| RSLT2_6~ | U622 | 15 | S244 |
| RSLT2_6~ | U504 | 16 | PAL20R8A |
| RSLT2_6~ | U402 | 18 | S381 |
| RSLT2_7~ | U504 | 15 | PAL20R8A |
| RSLT2_7~ | U402 | 16 | S381 |
| RSLT2_7~ | U622 | 17 | S244 |
| RSLT3_0~ | U303 | 2 | S244 |
| RSLT3_0~ | U204 | 22 | PAL20R8A |
| RSLT3_0~ | U203 | 4 | S381 |
| RSLT3_1~ | U203 | 2 | S381 |
| RSLT3_1~ | U204 | 21 | PAL20R8A |
| RSLT3_1~ | U303 | 4 | S244 |
| RSLT3_2~ | U203 | 18 | S381 |
| RSLT3_2~ | U204 | 20 | PAL20R8A |
| RSLT3_2~ | U303 | 6 | S244 |
| RSLT3_3~ | U203 | 16 | S381 |
| RSLT3_3~ | U204 | 19 | PAL20R8A |
| RSLT3_3~ | U303 | 8 | S244 |
| RSLT3_4~ | U303 | 11 | S244 |

| | | | |
|---|---|---|---|
| RSLT3_4~ | U204 | 18 | PAL20R8A |
| RSLT3_4~ | U102 | 4 | S381 |
| RSLT3_5~ | U303 | 13 | S244 |
| RSLT3_5~ | U204 | 17 | PAL20R8A |
| RSLT3_5~ | U102 | 2 | S381 |
| RSLT3_6~ | U303 | 15 | S244 |
| RSLT3_6~ | U204 | 16 | PAL20R8A |
| RSLT3_6~ | U102 | 18 | S381 |
| RSLT3_7~ | U204 | 15 | PAL20R8A |
| RSLT3_7~ | U102 | 16 | S381 |
| RSLT3_7~ | U303 | 17 | S244 |
| RSLT456_OE~ | U614 | 1 | S244 |
| RSLT456_OE~ | U614 | 19 | S244 |
| RSLT456_OE~ | U515 | 3 | S04 |
| RSLT4_0~ | U614 | 2 | S244 |
| RSLT4_0~ | U212 | 22 | PAL20R8A |
| RSLT4_0~ | U114 | 4 | S381 |
| RSLT4_1~ | U114 | 2 | S381 |
| RSLT4_1~ | U212 | 21 | PAL20R8A |
| RSLT4_1~ | U614 | 4 | S244 |
| RSLT4_2~ | U114 | 18 | S381 |
| RSLT4_2~ | U212 | 20 | PAL20R8A |
| RSLT4_2~ | U614 | 6 | S244 |
| RSLT4_3~ | U114 | 16 | S381 |
| RSLT4_3~ | U212 | 19 | PAL20R8A |
| RSLT4_3~ | U614 | 8 | S244 |
| RSLT4_4~ | U614 | 11 | S244 |
| RSLT4_4~ | U212 | 18 | PAL20R8A |
| RSLT4_4~ | U115 | 4 | S381 |
| RSLT4_5~ | U614 | 13 | S244 |
| RSLT4_5~ | U212 | 17 | PAL20R8A |
| RSLT4_5~ | U115 | 2 | S381 |
| RSLT4_6~ | U614 | 15 | S244 |
| RSLT4_6~ | U212 | 16 | PAL20R8A |
| RSLT4_6~ | U115 | 18 | S381 |
| RSLT4_7~ | U212 | 15 | PAL20R8A |
| RSLT4_7~ | U115 | 16 | S381 |
| RSLT4_7~ | U614 | 17 | S244 |
| RSLT5_0~ | U624 | 2 | S244 |
| RSLT5_0~ | U209 | 22 | PAL20R8A |
| RSLT5_0~ | U110 | 4 | S381 |
| RSLT5_1~ | U110 | 2 | S381 |
| RSLT5_1~ | U209 | 21 | PAL20R8A |
| RSLT5_1~ | U624 | 4 | S244 |
| RSLT5_2~ | U110 | 18 | S381 |
| RSLT5_2~ | U209 | 20 | PAL20R8A |
| RSLT5_2~ | U624 | 6 | S244 |
| RSLT5_3~ | U110 | 16 | S381 |
| RSLT5_3~ | U209 | 19 | PAL20R8A |
| RSLT5_3~ | U624 | 8 | S244 |
| RSLT5_4~ | U624 | 11 | S244 |
| RSLT5_4~ | U209 | 18 | PAL20R8A |
| RSLT5_4~ | U111 | 4 | S381 |
| RSLT5_5~ | U624 | 13 | S244 |
| RSLT5_5~ | U209 | 17 | PAL20R8A |
| RSLT5_5~ | U111 | 2 | S381 |
| RSLT5_6~ | U624 | 15 | S244 |
| RSLT5_6~ | U209 | 16 | PAL20R8A |
| RSLT5_6~ | U111 | 18 | S381 |

| | | | |
|---|---|---|---|
| RSLT5_7~ | U209 | 15 | PAL20R8A |
| RSLT5_7~ | U111 | 16 | S381 |
| RSLT5_7~ | U624 | 17 | S244 |
| RSLT6_0~ | U304 | 2 | S244 |
| RSLT6_0~ | U215 | 22 | PAL20R8A |
| RSLT6_0~ | U118 | 4 | S381 |
| RSLT6_1~ | U118 | 2 | S381 |
| RSLT6_1~ | U215 | 21 | PAL20R8A |
| RSLT6_1~ | U304 | 4 | S244 |
| RSLT6_2~ | U118 | 18 | S381 |
| RSLT6_2~ | U215 | 20 | PAL20R8A |
| RSLT6_2~ | U304 | 6 | S244 |
| RSLT6_3~ | U118 | 16 | S381 |
| RSLT6_3~ | U215 | 19 | PAL20R8A |
| RSLT6_3~ | U304 | 8 | S244 |
| RSLT6_4~ | U304 | 11 | S244 |
| RSLT6_4~ | U215 | 18 | PAL20R8A |
| RSLT6_4~ | U119 | 4 | S381 |
| RSLT6_5~ | U304 | 13 | S244 |
| RSLT6_5~ | U215 | 17 | PAL20R8A |
| RSLT6_5~ | U119 | 2 | S381 |
| RSLT6_6~ | U304 | 15 | S244 |
| RSLT6_6~ | U215 | 16 | PAL20R8A |
| RSLT6_6~ | U119 | 18 | S381 |
| RSLT6_7~ | U215 | 15 | PAL20R8A |
| RSLT6_7~ | U119 | 16 | S381 |
| RSLT6_7~ | U304 | 17 | S244 |
| RSLT_EN4 | U507 | 12 | LS374 |
| RSLT_EN4 | U212 | 14 | PAL20R8A |
| RSLT_ENB | U507 | 13 | LS374 |
| RSLT_ENB | U704 | 14 | PAL20R8A |
| RSLT_ENB | U712 | 16 | 29823 |
| RUN | U510 | 15 | LS273 |
| RUN | U415 | 18 | LS374 |
| S0 | U423 | 16 | 29823 |
| S0 | U220 | 5 | S381 |
| S1 | U326 | 23 | 29823 |
| S1 | U220 | 6 | S381 |
| S2 | U324 | 13 | S182 |
| S2 | U220 | 15 | S381 |
| S2 | U326 | 22 | 29823 |
| SEL_JC1~ | U725 | 2 | LS244 |
| SEL_JC1~ | U413 | 5 | S151 |
| SEL_JC2 | U423 | 10 | 29823 |
| SEL_JC2 | U722 | 6 | S251 |
| SEP_0~ | U824 | 12 | CRC |
| SEP_0~ | U420 | 15 | PAL20R8A |
| SEP_0~ | U820 | 2 | S244 |
| SEP_1~ | U824 | 13 | CRC |
| SEP_1~ | U420 | 16 | PAL20R8A |
| SEP_1~ | U820 | 4 | S244 |
| SEP_2~ | U824 | 14 | CRC |
| SEP_2~ | U420 | 17 | PAL20R8A |
| SEP_2~ | U820 | 6 | S244 |
| SEP_3~ | U824 | 15 | CRC |
| SEP_3~ | U420 | 18 | PAL20R8A |
| SEP_3~ | U820 | 8 | S244 |
| SEP_4~ | U820 | 11 | S244 |

| | | | |
|---|---|---|---|
| SEP_4~ | U824 | 16 | CRC |
| SEP_4~ | U420 | 19 | PAL20R8A |
| SEP_5~ | U820 | 13 | S244 |
| SEP_5~ | U824 | 17 | CRC |
| SEP_5~ | U420 | 20 | PAL20R8A |
| SEP_6~ | U820 | 15 | S244 |
| SEP_6~ | U824 | 18 | CRC |
| SEP_6~ | U420 | 21 | PAL20R8A |
| SEP_7~ | U820 | 17 | S244 |
| SEP_7~ | U824 | 19 | CRC |
| SEP_7~ | U420 | 22 | PAL20R8A |
| SEQ1L_ACCESS~ | | | PAL20L10A |
| SEQ1L_ACCESS~ | U512 | 1 | PAL20L10A |
| SEQ1L_ACCESS~ | U607 | 19 | LS245 |
| SEQ1L_ACCESS~ | U805 | 22 | PAL14L8 |
| SEQ1U_ACCESS~ | | | PAL20L10A |
| SEQ1U_ACCESS~ | U514 | 19 | LS245 |
| SEQ1U_ACCESS~ | U512 | 2 | PAL20L10A |
| SEQ1U_ACCESS~ | U805 | 21 | PAL14L8 |
| SEQ1_A_ACCESS | U709 | 1 | 29823 |
| SEQ1_A_ACCESS | U414 | 11 | S240 |
| SEQ1_A_ACCESS | U512 | 14 | PAL20L10A |
| SEQ1_A_ACCESS~ | U708 | 1 | LS244 |
| SEQ1_A_ACCESS~ | U708 | 19 | LS244 |
| SEQ1_A_ACCESS~ | U414 | 9 | S240 |
| SEQ1_WRL~ | | | PAL20L10A |
| SEQ1_WRL~ | U710 | 21 | 2018 |
| SEQ1_WRU~ | | | PAL20L10A |
| SEQ1_WRU~ | U713 | 21 | 2018 |
| SEQ2_ACCESS~ | | | PAL20L10A |
| SEQ2_ACCESS~ | U512 | 4 | PAL20L10A |
| SEQ_XCLK~ | U517 | 5 | LS374 |
| SEQ_XCLK~ | U705 | 9 | 8254 |
| SEQ_YCLK~ | U705 | 15 | 8254 |
| SEQ_YCLK~ | U517 | 6 | LS374 |
| SI | U515 | 13 | S04 |
| SI | U423 | 20 | 29823 |
| SI~ | U515 | 12 | S04 |
| SI~ | U825 | 13 | S244 |
| SI~ | U721 | 15 | S139 |
| SI~ | U826 | 9 | PAL20R4 |
| SO_SEL0 | U524 | 14 | S139 |
| SO_SEL0 | U423 | 19 | 29823 |
| SO_SEL1 | U524 | 13 | S139 |
| SO_SEL1 | U423 | 18 | 29823 |
| SO~ | U206 | 17 | S244 |
| SO~ | U725 | 4 | LS244 |
| SO~ | U206 | 9 | S244 |
| SQ1_PRST~ | U709 | 11 | 29823 |
| SQ1_PRST~ | U415 | 19 | LS374 |
| SQD0 | U607 | 18 | LS245 |
| SQD0 | U709 | 2 | 29823 |
| SQD0 | U710 | 9 | 2018 |
| SQD10 | U711 | 11 | 2018 |
| SQD10 | U310 | 16 | LS245 |
| SQD10 | U721 | 3 | S139 |
| SQD1 | U710 | 10 | 2018 |
| SQD11 | U711 | 13 | 2018 |
| SQD11 | U310 | 15 | LS245 |

| | | | |
|---|---|---|---|
| SQD11 | U712 | 4 | 29823 |
| SQD1 | U607 | 17 | LS245 |
| SQD12 | U711 | 14 | 2018 |
| SQD12 | U712 | 5 | 29823 |
| SQD1 | U709 | 3 | 29823 |
| SQD13 | U310 | 13 | LS245 |
| SQD13 | U711 | 15 | 2018 |
| SQD13 | U712 | 6 | 29823 |
| SQD14 | U310 | 12 | LS245 |
| SQD14 | U711 | 16 | 2018 |
| SQD14 | U712 | 7 | 29823 |
| SQD15 | U310 | 11 | LS245 |
| SQD15 | U711 | 17 | 2018 |
| SQD15 | U712 | 8 | 29823 |
| SQD16 | U514 | 18 | LS245 |
| SQD16 | U415 | 3 | LS374 |
| SQD16 | U713 | 9 | 2018 |
| SQD17 | U713 | 10 | 2018 |
| SQD17 | U514 | 17 | LS245 |
| SQD17 | U415 | 4 | LS374 |
| SQD18 | U713 | 11 | 2018 |
| SQD18 | U514 | 16 | LS245 |
| SQD18 | U415 | 7 | LS374 |
| SQD19 | U713 | 13 | 2018 |
| SQD19 | U514 | 15 | LS245 |
| SQD19 | U415 | 8 | LS374 |
| SQD20 | U713 | 14 | 2018 |
| SQD20 | U712 | 9 | 29823 |
| SQD2 | U710 | 11 | 2018 |
| SQD21 | U410 | 11 | S11 |
| SQD21 | U514 | 13 | LS245 |
| SQD21 | U713 | 15 | 2018 |
| SQD2 | U607 | 16 | LS245 |
| SQD22 | U410 | 10 | S11 |
| SQD22 | U514 | 12 | LS245 |
| SQD22 | U713 | 16 | 2018 |
| SQD22 | U418 | 9 | S10 |
| SQD23 | U514 | 11 | LS245 |
| SQD23 | U713 | 17 | 2018 |
| SQD23 | U410 | 9 | S11 |
| SQD2 | U709 | 4 | 29823 |
| SQD3 | U710 | 13 | 2018 |
| SQD3 | U607 | 15 | LS245 |
| SQD3 | U709 | 5 | 29823 |
| SQD4 | U710 | 14 | 2018 |
| SQD4 | U709 | 6 | 29823 |
| SQD5 | U607 | 13 | LS245 |
| SQD5 | U710 | 15 | 2018 |
| SQD5 | U709 | 7 | 29823 |
| SQD6 | U607 | 12 | LS245 |
| SQD6 | U710 | 16 | 2018 |
| SQD6 | U709 | 8 | 29823 |
| SQD7 | U607 | 11 | LS245 |
| SQD7 | U710 | 17 | 2018 |
| SQD7 | U709 | 9 | 29823 |
| SQD8 | U709 | 10 | 29823 |
| SQD8 | U310 | 18 | LS245 |
| SQD8 | U711 | 9 | 2018 |
| SQD9 | U711 | 10 | 2018 |

| | | | |
|---|---|---|---|
| SQD9 | U310 | 17 | LS245 |
| SQD9 | U721 | 2 | S139 |
| SRC1_0 | U604 | 18 | LS244 |
| SRC1_0 | U603 | 3 | S374 |
| SRC1_1 | U604 | 16 | LS244 |
| SRC1_1 | U603 | 4 | S374 |
| SRC1_2 | U604 | 14 | LS244 |
| SRC1_2 | U603 | 7 | S374 |
| SRC1_3 | U604 | 12 | LS244 |
| SRC1_3 | U603 | 8 | S374 |
| SRC1_4 | U603 | 13 | S374 |
| SRC1_4 | U604 | 9 | LS244 |
| SRC1_5 | U603 | 14 | S374 |
| SRC1_5 | U604 | 7 | LS244 |
| SRC1_6 | U603 | 17 | S374 |
| SRC1_6 | U604 | 5 | LS244 |
| SRC1_7 | U603 | 18 | S374 |
| SRC1_7 | U604 | 3 | LS244 |
| SRC2_0 | U404 | 18 | LS244 |
| SRC2_0 | U403 | 3 | S374 |
| SRC2_1 | U404 | 16 | LS244 |
| SRC2_1 | U403 | 4 | S374 |
| SRC2_2 | U404 | 14 | LS244 |
| SRC2_2 | U403 | 7 | S374 |
| SRC2_3 | U404 | 12 | LS244 |
| SRC2_3 | U403 | 8 | S374 |
| SRC2_4 | U403 | 13 | S374 |
| SRC2_4 | U404 | 9 | LS244 |
| SRC2_5 | U403 | 14 | S374 |
| SRC2_5 | U404 | 7 | LS244 |
| SRC2_6 | U403 | 17 | S374 |
| SRC2_6 | U404 | 5 | LS244 |
| SRC2_7 | U403 | 18 | S374 |
| SRC2_7 | U404 | 3 | LS244 |
| SRC3_0 | U105 | 18 | LS244 |
| SRC3_0 | U104 | 3 | LS374 |
| SRC3_1 | U105 | 16 | LS244 |
| SRC3_1 | U104 | 4 | LS374 |
| SRC3_2 | U105 | 14 | LS244 |
| SRC3_2 | U104 | 7 | LS374 |
| SRC3_3 | U105 | 12 | LS244 |
| SRC3_3 | U104 | 8 | LS374 |
| SRC3_4 | U104 | 13 | LS374 |
| SRC3_4 | U105 | 9 | LS244 |
| SRC3_5 | U104 | 14 | LS374 |
| SRC3_5 | U105 | 7 | LS244 |
| SRC3_6 | U104 | 17 | LS374 |
| SRC3_6 | U105 | 5 | LS244 |
| SRC3_7 | U104 | 18 | LS374 |
| SRC3_7 | U105 | 3 | LS244 |
| S_D0 | U127 | 18 | LS245 |
| S_D0 | U322 | 2 | 29823 |
| S_D0 | U327 | 9 | 2018 |
| S_D10 | U323 | 11 | 2018 |
| S_D10 | U528 | 16 | LS245 |
| S_D10 | U423 | 3 | 29823 |
| S_D1 | U327 | 10 | 2018 |
| S_D11 | U323 | 13 | 2018 |

| | | | |
|---|---|---|---|
| S_D11 | U528 | 15 | LS245 |
| S_D11 | U423 | 4 | 29823 |
| S_D1 | U127 | 17 | LS245 |
| S_D12 | U528 | 14 | LS245 |
| S_D12 | U423 | 5 | 29823 |
| S_D1 | U322 | 3 | 29823 |
| S_D13 | U528 | 13 | LS245 |
| S_D13 | U323 | 15 | 2018 |
| S_D13 | U423 | 6 | 29823 |
| S_D14 | U528 | 12 | LS245 |
| S_D14 | U323 | 16 | 2018 |
| S_D14 | U423 | 7 | 29823 |
| S_D15 | U528 | 11 | LS245 |
| S_D15 | U323 | 17 | 2018 |
| S_D15 | U423 | 8 | 29823 |
| S_D16 | U428 | 1 | S139 |
| S_D16 | U128 | 18 | LS245 |
| S_D16 | U411 | 3 | S04 |
| S_D16 | U328 | 9 | 2018 |
| S_D17 | U328 | 10 | 2018 |
| S_D17 | U128 | 17 | LS245 |
| S_D17 | U727 | 2 | S138 |
| S_D18 | U328 | 11 | 2018 |
| S_D18 | U128 | 16 | LS245 |
| S_D18 | U727 | 3 | S138 |
| S_D18 | U628 | 9 | S08 |
| S_D19 | U328 | 13 | 2018 |
| S_D19 | U128 | 15 | LS245 |
| S_D19 | U428 | 2 | S139 |
| S_D20 | U128 | 14 | LS245 |
| S_D20 | U428 | 3 | S139 |
| S_D2 | U327 | 11 | 2018 |
| S_D21 | U128 | 13 | LS245 |
| S_D21 | U428 | 14 | S139 |
| S_D21 | U328 | 15 | 2018 |
| S_D2 | U127 | 16 | LS245 |
| S_D39 | U223 | 11 | LS245 |
| S_D39 | U224 | 17 | 2018 |
| S_D39 | U326 | 9 | 29823 |
| S_D4 | U127 | 14 | LS245 |
| S_D4 | U322 | 6 | 29823 |
| S_D5 | U127 | 13 | LS245 |
| S_D5 | U327 | 15 | 2018 |
| S_D5 | U322 | 7 | 29823 |
| S_D6 | U127 | 12 | LS245 |
| S_D6 | U327 | 16 | 2018 |
| S_D6 | U322 | 8 | 29823 |
| S_D7 | U127 | 11 | LS245 |
| S_D7 | U327 | 17 | 2018 |
| S_D7 | U322 | 9 | 29823 |
| S_D8 | U322 | 10 | 29823 |
| S_D8 | U528 | 18 | LS245 |
| S_D8 | U323 | 9 | 2018 |
| S_D9 | U323 | 10 | 2018 |
| S_D9 | U528 | 17 | LS245 |
| S_D9 | U423 | 2 | 29823 |
| TB_D0 | U306 | 18 | LS244 |
| TB_D0 | U604 | 2 | LS244 |
| TB_D0 | U406 | 22 | LS461 |

| | | | |
|---|---|---|---|
| TB_D1 | U306 | 16 | LS244 |
| TB_D1 | U406 | 21 | LS461 |
| TB_D1 | U604 | 4 | LS244 |
| TB_D2 | U306 | 14 | LS244 |
| TB_D2 | U406 | 20 | LS461 |
| TB_D2 | U604 | 6 | LS244 |
| TB_D3 | U306 | 12 | LS244 |
| TB_D3 | U406 | 19 | LS461 |
| TB_D3 | U604 | 8 | LS244 |
| TB_D4 | U604 | 11 | LS244 |
| TB_D4 | U406 | 18 | LS461 |
| TB_D4 | U306 | 9 | LS244 |
| TB_D5 | U604 | 13 | LS244 |
| TB_D5 | U406 | 17 | LS461 |
| TB_D5 | U306 | 7 | LS244 |
| TB_D6 | U604 | 15 | LS244 |
| TB_D6 | U406 | 16 | LS461 |
| TB_D6 | U306 | 5 | LS244 |
| TB_D7 | U406 | 15 | LS461 |
| TB_D7 | U604 | 17 | LS244 |
| TB_D7 | U306 | 3 | LS244 |
| TEST | U112 | 1 | LS244 |
| TEST | U112 | 19 | LS244 |
| TEST | U510 | 5 | LS273 |
| TEST | U414 | 8 | S240 |
| TEST_IR | U823 | 1 | LS241 |
| TEST_IR | U823 | 19 | LS241 |
| TEST_IR | U510 | 6 | LS273 |
| TEST~ | U604 | 1 | LS244 |
| TEST~ | U414 | 12 | S240 |
| S_D22 | U128 | 12 | LS245 |
| S_D22 | U428 | 13 | S139 |
| S_D22 | U328 | 16 | 2018 |
| S_D23 | U519 | 1 | S138 |
| S_D23 | U128 | 11 | LS245 |
| S_D23 | U328 | 17 | 2018 |
| S_D2 | U322 | 4 | 29823 |
| S_D24 | U527 | 18 | LS245 |
| S_D24 | U519 | 2 | S138 |
| S_D24 | U325 | 9 | 2018 |
| S_D25 | U325 | 10 | 2018 |
| S_D25 | U527 | 17 | LS245 |
| S_D25 | U519 | 3 | S138 |
| S_D26 | U325 | 11 | 2018 |
| S_D26 | U527 | 16 | LS245 |
| S_D27 | U722 | 10 | S251 |
| S_D27 | U325 | 13 | 2018 |
| S_D27 | U527 | 15 | LS245 |
| S_D28 | U527 | 14 | LS245 |
| S_D28 | U416 | 9 | S251 |
| S_D29 | U527 | 13 | LS245 |
| S_D29 | U325 | 15 | 2018 |
| S_D29 | U722 | 7 | S251 |
| S_D29 | U515 | 9 | S04 |
| S_D30 | U326 | 10 | 29823 |
| S_D30 | U527 | 12 | LS245 |
| S_D30 | U325 | 16 | 2018 |
| S_D31 | U527 | 11 | LS245 |
| S_D31 | U325 | 17 | 2018 |

| | | | |
|---|---|---|---|
| S_D3 | U327 | 13 | 2018 |
| S_D3 | U127 | 15 | LS245 |
| S_D31 | U423 | 9 | 29823 |
| S_D32 | U223 | 18 | LS245 |
| S_D32 | U326 | 2 | 29823 |
| S_D32 | U224 | 9 | 2018 |
| S_D33 | U224 | 10 | 2018 |
| S_D33 | U223 | 17 | LS245 |
| S_D33 | U326 | 3 | 29823 |
| S_D34 | U224 | 11 | 2018 |
| S_D34 | U223 | 16 | LS245 |
| S_D34 | U326 | 4 | 29823 |
| S_D3 | U322 | 5 | 29823 |
| S_D35 | U224 | 13 | 2018 |
| S_D35 | U223 | 15 | LS245 |
| S_D35 | U326 | 5 | 29823 |
| S_D36 | U223 | 14 | LS245 |
| S_D36 | U326 | 6 | 29823 |
| S_D37 | U223 | 13 | LS245 |
| S_D37 | U224 | 15 | 2018 |
| S_D37 | U326 | 7 | 29823 |
| S_D38 | U223 | 12 | LS245 |
| S_D38 | U224 | 16 | 2018 |
| S_D38 | U326 | 8 | 29823 |
| TEST~ | U604 | 19 | LS244 |
| THIS_CARD | U414 | 5 | S240 |
| THIS_CARD | U315 | 9 | LS164 |
| THIS_CARD~ | U414 | 15 | S240 |
| THIS_CARD~ | U810 | 19 | LS640 |
| TIMER_ACCESS~ | U804 | 19 | PAL14L8 |
| TIMER_ACCESS~ | U705 | 21 | 8254 |
| TWO_C | U409 | 10 | S08 |
| TWO_C | U409 | 13 | S08 |
| TWO_C | U510 | 19 | LS273 |
| TWO_C | U409 | 2 | S08 |
| TWO_C | U409 | 5 | S08 |
| TYP0~ | U416 | 13 | S251 |
| TYP0~ | U608 | 2 | LS175 |
| TYP1~ | U416 | 12 | S251 |
| TYP1~ | U608 | 7 | LS175 |
| TYPE0~ | U107 | 2 | LS241 |
| TYPE1~ | U107 | 4 | LS241 |
| T_CEN~ | U316 | 14 | 29823 |
| T_CEN~ | U411 | 2 | S04 |
| T_OE~ | U316 | 1 | 29823 |
| T_OE~ | U726 | 16 | 29823 |
| U/D~ | U206 | 5 | S244 |
| U/D~ | U725 | 8 | LS244 |
| U_CEN~ | U217 | 14 | 29823 |
| U_CEN~ | U524 | 6 | S139 |
| U_OE~ | U217 | 1 | 29823 |
| U_OE~ | U429 | 19 | 29823 |
| VCC | . | 1 | TP |
| VCC | U627 | 16 | 316A102 1K |
| VCC | R2 | 2 | RES 1K |
| VCC | | P1-1 | CONNECTOR |
| VCC | | P1-2 | CONNECTOR |
| VCC | | P1-3 | CONNECTOR |
| VCC | | P1-4 | CONNECTOR |

| | | | |
|---|---|---|---|
| VCC~ | | P1-5 | CONNECTOR |
| VCC | | P1-6 | CONNECTOR |
| VCC | | P1-7 | CONNECTOR |
| VCC | | P1-8 | CONNECTOR |
| WE_B0~ | U626 | 2 | ALS569 |
| WE_B0~ | U717 | 3 | S189 |
| WE_B0~ | U506 | 8 | S10 |
| WE_B1~ | U506 | 12 | S10 |
| WE_B1~ | U525 | 2 | ALS569 |
| WE_B1~ | U619 | 3 | S189 |
| WR_ENB | U506 | 13 | S10 |
| WR_ENB | U712 | 21 | 29823 |
| WR_ENB | U506 | 9 | S10 |
| X0 | U610 | 10 | EDH8832C |
| X0 | U612 | 21 | LS461 |
| X1 | U612 | 20 | LS461 |
| X1 | U610 | 9 | EDH8832C |
| X1_0 | U601 | 18 | LS244 |
| X1_0 | U702 | 22 | PAL20R8A |
| X1_0 | U701 | 4 | PGA2010 |
| X1_1 | U601 | 16 | LS244 |
| X1_1 | U702 | 21 | PAL20R8A |
| X1_1 | U701 | 5 | PGA2010 |
| X1_2 | U601 | 14 | LS244 |
| X1_2 | U702 | 20 | PAL20R8A |
| X1_2 | U701 | 6 | PGA2010 |
| X1_3 | U601 | 12 | LS244 |
| X1_3 | U702 | 19 | PAL20R8A |
| X1_3 | U701 | 7 | PGA2010 |
| X1_4 | U702 | 18 | PAL20R8A |
| X1_4 | U701 | 9 | PGA2010 |
| X1_5 | U701 | 10 | PGA2010 |
| X1_5 | U702 | 17 | PAL20R8A |
| X1_5 | U601 | 7 | LS244 |
| X1_6 | U701 | 11 | PGA2010 |
| X1_6 | U702 | 16 | PAL20R8A |
| X1_6 | U601 | 5 | LS244 |
| X1_7 | U409 | 1 | S08 |
| X1_7 | U701 | 12 | PGA2010 |
| X1_7 | U702 | 15 | PAL20R8A |
| X1_7 | U601 | 3 | LS244 |
| X2 | U612 | 19 | LS461 |
| X2 | U610 | 8 | EDH8832C |
| X2_0 | U401 | 18 | LS244 |
| X2_0 | U502 | 22 | PAL20R8A |
| X2_0 | U501 | 4 | PGA2010 |
| X2_1 | U401 | 16 | LS244 |
| X2_1 | U502 | 21 | PAL20R8A |
| X2_1 | U501 | 5 | PGA2010 |
| X2_2 | U401 | 14 | LS244 |
| X2_2 | U502 | 20 | PAL20R8A |
| X2_2 | U501 | 6 | PGA2010 |
| X2_3 | U401 | 12 | LS244 |
| X2_3 | U502 | 19 | PAL20R8A |
| X2_3 | U501 | 7 | PGA2010 |
| X2_4 | U502 | 18 | PAL20R8A |
| X2_4 | U501 | 9 | PGA2010 |
| X2_5 | U501 | 10 | PGA2010 |
| X2_5 | U502 | 17 | PAL20R8A |

| | | | |
|---|---|---|---|
| X2_5 | U401 | 7 | LS244 |
| X2_6 | U501 | 11 | PGA2010 |
| X2_6 | U502 | 16 | PAL20R8A |
| X2_6 | U401 | 5 | LS244 |
| X2_7 | U501 | 12 | PGA2010 |
| X2_7 | U502 | 15 | PAL20R8A |
| X2_7 | U401 | 3 | LS244 |
| X2_7 | U409 | 4 | S08 |
| X3 | U612 | 18 | LS461 |
| X3 | U610 | 7 | EDH8832C |
| X3_0 | U101 | 18 | LS244 |
| X3_0 | U202 | 22 | PAL20R8A |
| X3_0 | U201 | 4 | PGA2010 |
| X3_1 | U101 | 16 | LS244 |
| X3_1 | U202 | 21 | PAL20R8A |
| X3_1 | U201 | 5 | PGA2010 |
| X3_2 | U101 | 14 | LS244 |
| X3_2 | U202 | 20 | PAL20R8A |
| X3_2 | U201 | 6 | PGA2010 |
| X3_3 | U101 | 12 | LS244 |
| X3_3 | U202 | 19 | PAL20R8A |
| X3_3 | U201 | 7 | PGA2010 |
| X3_4 | U202 | 18 | PAL20R8A |
| X3_4 | U201 | 9 | PGA2010 |
| X3_5 | U201 | 10 | PGA2010 |
| X3_5 | U202 | 17 | PAL20R8A |
| X3_5 | U101 | 7 | LS244 |
| X3_6 | U201 | 11 | PGA2010 |
| X3_6 | U202 | 16 | PAL20R8A |
| X3_6 | U101 | 5 | LS244 |
| X3_7 | U201 | 12 | PGA2010 |
| X3_7 | U202 | 15 | PAL20R8A |
| X3_7 | U101 | 3 | LS244 |
| X3_7 | U409 | 9 | S08 |
| X4 | U612 | 17 | LS461 |
| X4 | U610 | 6 | EDH8832C |
| X4_0 | U313 | 18 | LS244 |
| X4_0 | U211 | 22 | PAL20R8A |
| X4_0 | U210 | 4 | PGA2010 |
| X4_1 | U313 | 16 | LS244 |
| X4_1 | U211 | 21 | PAL20R8A |
| X4_1 | U210 | 5 | PGA2010 |
| X4_2 | U313 | 14 | LS244 |
| X4_2 | U211 | 20 | PAL20R8A |
| X4_2 | U210 | 6 | PGA2010 |
| X4_3 | U313 | 12 | LS244 |
| X4_3 | U211 | 19 | PAL20R8A |
| X4_3 | U210 | 7 | PGA2010 |
| X4_4 | U211 | 18 | PAL20R8A |
| X4_4 | U210 | 9 | PGA2010 |
| X4_5 | U210 | 10 | PGA2010 |
| X4_5 | U211 | 17 | PAL20R8A |
| X4_5 | U313 | 7 | LS244 |
| X4_6 | U210 | 11 | PGA2010 |
| X4_6 | U211 | 16 | PAL20R8A |
| X4_6 | U313 | 5 | LS244 |
| X4_7 | U210 | 12 | PGA2010 |
| X4_7 | U211 | 15 | PAL20R8A |
| X4_7 | U313 | 3 | LS244 |

| | | | |
|---|---|---|---|
| X5 | U612 | 16 | LS461 |
| X5 | U610 | 5 | EDH8832C |
| X5_0 | U307 | 18 | LS244 |
| X5_0 | U208 | 22 | PAL20R8A |
| X5_0 | U207 | 4 | PGA2010 |
| X5_1 | U307 | 16 | LS244 |
| X5_1 | U208 | 21 | PAL20R8A |
| X5_1 | U207 | 5 | PGA2010 |
| X5_2 | U307 | 14 | LS244 |
| X5_2 | U208 | 20 | PAL20R8A |
| X5_2 | U207 | 6 | PGA2010 |
| X5_3 | U307 | 12 | LS244 |
| X5_3 | U208 | 19 | PAL20R8A |
| X5_3 | U207 | 7 | PGA2010 |
| X5_4 | U208 | 18 | PAL20R8A |
| X5_4 | U207 | 9 | PGA2010 |
| X5_5 | U207 | 10 | PGA2010 |
| X5_5 | U208 | 17 | PAL20R8A |
| X5_5 | U307 | 7 | LS244 |
| X5_6 | U207 | 11 | PGA2010 |
| X5_6 | U208 | 16 | PAL20R8A |
| X5_6 | U307 | 5 | LS244 |
| X5_7 | U207 | 12 | PGA2010 |
| X5_7 | U208 | 15 | PAL20R8A |
| X5_7 | U307 | 3 | LS244 |
| X5_7 | U408 | 4 | S08 |
| X6 | U612 | 15 | LS461 |
| X6 | U610 | 4 | EDH8832C |
| X6_0 | U116 | 18 | LS244 |
| X6_0 | U214 | 22 | PAL20R8A |
| X6_0 | U213 | 4 | PGA2010 |
| X6_1 | U116 | 16 | LS244 |
| X6_1 | U214 | 21 | PAL20R8A |
| X6_1 | U213 | 5 | PGA2010 |
| X6_2 | U116 | 14 | LS244 |
| X6_2 | U214 | 20 | PAL20R8A |
| X6_2 | U213 | 6 | PGA2010 |
| X6_3 | U116 | 12 | LS244 |
| X6_3 | U214 | 19 | PAL20R8A |
| X6_3 | U213 | 7 | PGA2010 |
| X6_4 | U214 | 18 | PAL20R8A |
| X6_4 | U213 | 9 | PGA2010 |
| X6_5 | U213 | 10 | PGA2010 |
| X6_5 | U214 | 17 | PAL20R8A |
| X6_5 | U116 | 7 | LS244 |
| X6_6 | U213 | 11 | PGA2010 |
| X6_6 | U214 | 16 | PAL20R8A |
| X6_6 | U116 | 5 | LS244 |
| X6_7 | U408 | 1 | S08 |
| X6_7 | U213 | 12 | PGA2010 |
| X6_7 | U214 | 15 | PAL20R8A |
| X6_7 | U116 | 3 | LS244 |
| XACK~ | U427 | 8 | LS125 |
| XCLK | U612 | 1 | LS461 |
| XCLK | U512 | 22 | PAL20L10A |
| XI1_0 | U603 | 2 | S374 |
| XI1_0 | U703 | 3 | S381 |
| XI1_1 | U703 | 1 | S381 |
| XI1_1 | U601 | 4 | LS244 |

| | | | |
|---|---|---|---|
| XI1_1 | U603 | 5 | S374 |
| XI1_2 | U703 | 19 | S381 |
| XI1_2 | U603 | 6 | S374 |
| XI1_3 | U703 | 17 | S381 |
| XI1_3 | U601 | 8 | LS244 |
| XI1_3 | U603 | 9 | S374 |
| XI1_4 | U601 | 11 | LS244 |
| XI1_4 | U603 | 12 | S374 |
| XI1_4 | U602 | 3 | S381 |
| XI1_5 | U602 | 1 | S381 |
| XI1_5 | U601 | 13 | LS244 |
| XI1_5 | U603 | 15 | S374 |
| XI1_6 | U601 | 15 | LS244 |
| XI1_6 | U603 | 16 | S374 |
| XI1_6 | U602 | 19 | S381 |
| XI1_7 | U602 | 17 | S381 |
| XI1_7 | U603 | 19 | S374 |
| XI2_0 | U403 | 2 | S374 |
| XI2_0 | U503 | 3 | S381 |
| XI2_1 | U503 | 1 | S381 |
| XI2_1 | U401 | 4 | LS244 |
| XI2_1 | U403 | 5 | S374 |
| XI2_2 | U503 | 19 | S381 |
| XI2_2 | U403 | 6 | S374 |
| XI2_3 | U503 | 17 | S381 |
| XI2_3 | U401 | 8 | LS244 |
| XI2_3 | U403 | 9 | S374 |
| XI2_4 | U401 | 11 | LS244 |
| XI2_4 | U403 | 12 | S374 |
| XI2_4 | U402 | 3 | S381 |
| XI2_5 | U402 | 1 | S381 |
| XI2_5 | U401 | 13 | LS244 |
| XI2_5 | U403 | 15 | S374 |
| XI2_6 | U401 | 15 | LS244 |
| XI2_6 | U403 | 16 | S374 |
| XI2_6 | U402 | 19 | S381 |
| XI2_7 | U402 | 17 | S381 |
| XI2_7 | U403 | 19 | S374 |
| XI3_0 | U104 | 2 | LS374 |
| XI3_0 | U203 | 3 | S381 |
| XI3_1 | U203 | 1 | S381 |
| XI3_1 | U101 | 4 | LS244 |
| XI3_1 | U104 | 5 | LS374 |
| XI3_2 | U203 | 19 | S381 |
| XI3_2 | U104 | 6 | LS374 |
| XI3_3 | U203 | 17 | S381 |
| XI3_3 | U101 | 8 | LS244 |
| XI3_3 | U104 | 9 | LS374 |
| XI3_4 | U101 | 11 | LS244 |
| XI3_4 | U104 | 12 | LS374 |
| XI3_4 | U102 | 3 | S381 |
| XI3_5 | U102 | 1 | S381 |
| XI3_5 | U101 | 13 | LS244 |
| XI3_5 | U104 | 15 | LS374 |
| XI3_6 | U101 | 15 | LS244 |
| XI3_6 | U104 | 16 | LS374 |
| XI3_6 | U102 | 19 | S381 |
| XI3_7 | U102 | 17 | S381 |
| XI3_7 | U104 | 19 | LS374 |

| | | | |
|---|---|---|---|
| XS1_0 | U702 | 23 | PAL20R8A |
| XS1_0 | U703 | 8 | S381 |
| XS1_10 | U702 | 11 | PAL20R8A |
| XS1_10 | U602 | 14 | S381 |
| XS1_1 | U702 | 2 | PAL20R8A |
| XS1_1 | U703 | 9 | S381 |
| XS1_2 | U703 | 11 | S381 |
| XS1_2 | U702 | 3 | PAL20R8A |
| XS1_3 | U703 | 12 | S381 |
| XS1_3 | U702 | 4 | PAL20R8A |
| XS1_4 | U702 | 5 | PAL20R8A |
| XS1_4 | U602 | 8 | S381 |
| XS1_5 | U702 | 6 | PAL20R8A |
| XS1_5 | U602 | 9 | S381 |
| XS1_6 | U602 | 11 | S381 |
| XS1_6 | U702 | 7 | PAL20R8A |
| XS1_7 | U602 | 12 | S381 |
| XS1_7 | U702 | 8 | PAL20R8A |
| XS1_8 | U305 | 1 | S04 |
| XS1_8 | U703 | 13 | S381 |
| XS1_8 | U702 | 9 | PAL20R8A |
| XS1_9 | U702 | 10 | PAL20R8A |
| XS1_9 | U602 | 13 | S381 |
| XS2_0 | U502 | 23 | PAL20R8A |
| XS2_0 | U503 | 8 | S381 |
| XS2_10 | U502 | 11 | PAL20R8A |
| XS2_10 | U402 | 14 | S381 |
| XS2_1 | U502 | 2 | PAL20R8A |
| XS2_1 | U503 | 9 | S381 |
| XS2_2 | U503 | 11 | S381 |
| XS2_2 | U502 | 3 | PAL20R8A |
| XS2_3 | U503 | 12 | S381 |
| XS2_3 | U502 | 4 | PAL20R8A |
| XS2_4 | U502 | 5 | PAL20R8A |
| XS2_4 | U402 | 8 | S381 |
| XS2_5 | U502 | 6 | PAL20R8A |
| XS2_5 | U402 | 9 | S381 |
| XS2_6 | U402 | 11 | S381 |
| XS2_6 | U502 | 7 | PAL20R8A |
| XS2_7 | U402 | 12 | S381 |
| XS2_7 | U502 | 8 | PAL20R8A |
| XS2_8 | U503 | 13 | S381 |
| XS2_8 | U305 | 3 | S04 |
| XS2_8 | U502 | 9 | PAL20R8A |
| XS2_9 | U502 | 10 | PAL20R8A |
| XS2_9 | U402 | 13 | S381 |
| XS3_0 | U202 | 23 | PAL20R8A |
| XS3_0 | U203 | 8 | S381 |
| XS3_10 | U202 | 11 | PAL20R8A |
| XS3_10 | U102 | 14 | S381 |
| XS3_1 | U202 | 2 | PAL20R8A |
| XS3_1 | U203 | 9 | S381 |
| XS3_2 | U203 | 11 | S381 |
| XS3_2 | U202 | 3 | PAL20R8A |
| XS3_3 | U203 | 12 | S381 |
| XS3_3 | U202 | 4 | PAL20R8A |
| XS3_4 | U202 | 5 | PAL20R8A |
| XS3_4 | U102 | 8 | S381 |
| XS3_5 | U202 | 6 | PAL20R8A |

BEST AVAILABLE COPY

| | 401 | | 402 |
|---|---|---|---|
| XS3_5 | U102 | 9 | S381 |
| XS3_6 | U102 | 11 | S381 |
| XS3_6 | U202 | 7 | PAL20R8A |
| XS3_7 | U102 | 12 | S381 |
| XS3_7 | U202 | 8 | PAL20R8A |
| XS3_8 | U203 | 13 | S381 |
| XS3_8 | U305 | 5 | S04 |
| XS3_8 | U202 | 9 | PAL20R8A |
| XS3_9 | U202 | 10 | PAL20R8A |
| XS3_9 | U102 | 13 | S381 |
| XS4_0 | U211 | 23 | PAL20R8A |
| XS4_0 | U114 | 8 | S381 |
| XS4_10 | U211 | 11 | PAL20R8A |
| XS4_10 | U115 | 14 | S381 |
| XS4_1 | U211 | 2 | PAL20R8A |
| XS4_1 | U114 | 9 | S381 |
| XS4_2 | U114 | 11 | S381 |
| XS4_2 | U211 | 3 | PAL20R8A |
| XS4_3 | U114 | 12 | S381 |
| XS4_3 | U211 | 4 | PAL20R8A |
| XS4_4 | U211 | 5 | PAL20R8A |
| XS4_4 | U115 | 8 | S381 |
| XS4_5 | U211 | 6 | PAL20R8A |
| XS4_5 | U115 | 9 | S381 |
| XS4_6 | U115 | 11 | S381 |
| XS4_6 | U211 | 7 | PAL20R8A |
| XS4_7 | U115 | 12 | S381 |
| XS4_7 | U211 | 8 | PAL20R8A |
| XS4_8 | U114 | 13 | S381 |
| XS4_8 | U305 | o | S04 |
| XS4_9 | U211 | | PAL20R8A |
| XS4_9 | U115 | 1. | S381 |
| XS5_0 | U208 | 23 | PAL20R8A |
| XS5_0 | U110 | 8 | 381 |
| XS5_10 | U208 | 11 | .20R8A |
| XS5_10 | U111 | 14 | |
| XS5_1 | U208 | 2 | R8A |
| XS5_1 | U110 | 9 | |
| XS5_2 | U110 | 11 | |
| XS5_2 | U208 | 3 | |
| XS5_3 | U110 | 12 | S. |
| XS5_3 | U208 | 4 | PAL20R8A |
| XS5_4 | U208 | 5 | PAL20R8A |
| XS5_4 | U111 | 8 | S381 |
| XS5_5 | U208 | 6 | PAL20R8A |
| XS5_5 | U111 | 9 | S381 |
| XS5_6 | U111 | 11 | S381 |
| XS5_6 | U208 | 7 | PAL20R8A |
| XS5_7 | U111 | 12 | S381 |
| XS5_7 | U208 | 8 | PAL20R8A |
| XS5_8 | U305 | 11 | S04 |
| XS5_8 | U110 | 13 | S381 |
| XS5_8 | U208 | 9 | PAL20R8A |
| XS5_9 | U208 | 10 | PAL20R8A |
| XS5_9 | U111 | 13 | S381 |
| XS6_0 | U214 | 23 | PAL20R8A |
| XS6_0 | U118 | 8 | S381 |
| XS6_10 | U214 | 11 | PAL20R8A |
| XS6_10 | U119 | 14 | S381 |

| | | | |
|---|---|---|---|
| XS6_1 | U214 | 2 | PAL20R8A |
| XS6_1 | U118 | 9 | S381 |
| XS6_2 | U118 | 11 | S381 |
| XS6_2 | U214 | 3 | PAL20R8A |
| XS6_3 | U118 | 12 | S381 |
| XS6_3 | U214 | 4 | PAL20R8A |
| XS6_4 | U214 | 5 | PAL20R8A |
| XS6_4 | U119 | 8 | S381 |
| XS6_5 | U214 | 6 | PAL20R8A |
| XS6_5 | U119 | 9 | S381 |
| XS6_6 | U119 | 11 | S381 |
| XS6_6 | U214 | 7 | PAL20R8A |
| XS6_7 | U119 | 12 | S381 |
| XS6_7 | U214 | 8 | PAL20R8A |
| XS6_8 | U118 | 13 | S381 |
| XS6_8 | U214 | 9 | PAL20R8A |
| XS6_9 | U214 | 10 | PAL20R8A |
| XS6_9 | U119 | 13 | S381 |
| X_CY~ | U722 | 1 | S251 |
| X_CY~ | U725 | 11 | LS244 |
| X_CY~ | U722 | 12 | S251 |
| X_CY~ | U612 | 14 | LS461 |
| Y0 | U611 | 22 | LS461 |
| Y0 | U610 | 3 | EDH8832C |
| Y1 | U611 | 21 | LS461 |
| Y1 | U610 | 25 | EDH8832C |
| Y2 | U611 | 20 | LS461 |
| Y2 | U610 | 24 | EDH8832C |
| Y3 | U611 | 19 | LS461 |
| Y3 | U610 | 21 | EDH8832C |
| Y4 | U611 | 18 | LS461 |
| Y4 | U610 | 23 | EDH8832C |
| Y5 | U611 | 17 | LS461 |
| Y5 | U610 | 2 | EDH8832C |
| Y6 | U611 | 16 | LS461 |
| Y6 | U610 | 26 | EDH8832C |
| Y7 | U610 | 1 | EDH8832C |
| Y7 | U611 | 15 | LS461 |
| YCLK | U611 | 1 | LS461 |
| YCLK | U512 | 23 | PAL20L10A |
| Y_CY~ | U725 | 13 | LS244 |
| Y_CY~ | U611 | 14 | LS461 |

Annex A7

3D LUT

| Signal_name | Physical_location | Pin_number | Part_name |
|---|---|---|---|
| 0:XSIG269 | U712 | 11 | LS240 |
| 0:XSIG269 | U711 | 12 | LS11 |
| 0:XSIG269 | U712 | 2 | LS240 |
| 0:XSIG270 | U712 | 13 | LS240 |
| 0:XSIG270 | U712 | 4 | LS240 |
| 0:XSIG270 | U711 | 6 | LS11 |
| 0:XSIG271 | U712 | 15 | LS240 |
| 0:XSIG271 | U410 | 3 | S08 |
| 0:XSIG271 | U712 | 6 | LS240 |
| 0:XSIG712 | U515 | 12 | LS240 |
| 0:XSIG712 | U208 | 2 | LS240 |
| 0:XSIG712 | U515 | 3 | LS240 |
| 1:XSIG247 | U204 | 2 | LS377 |
| 1:XSIG247 | U203 | 3 | LS374 |
| 1:XSIG248 | U203 | 4 | LS374 |
| 1:XSIG248 | U204 | 5 | LS377 |
| 1:XSIG249 | U204 | 6 | LS377 |
| 1:XSIG249 | U203 | 7 | LS374 |
| 1:XSIG250 | U203 | 8 | LS374 |
| 1:XSIG250 | U204 | 9 | LS377 |
| 1:XSIG251 | U204 | 12 | LS377 |
| 1:XSIG251 | U203 | 13 | LS374 |
| 1:XSIG252 | U203 | 14 | LS374 |
| 1:XSIG252 | U204 | 15 | LS377 |
| 1:XSIG253 | U204 | 16 | LS377 |
| 1:XSIG253 | U203 | 17 | LS374 |
| 1:XSIG254 | U203 | 18 | LS374 |
| 1:XSIG254 | U204 | 19 | LS377 |
| 1:XSIG255 | U202 | 2 | LS377 |
| 1:XSIG255 | U201 | 3 | LS374 |
| 1:XSIG256 | U201 | 4 | LS374 |
| 1:XSIG256 | U202 | 5 | LS377 |
| 1:XSIG257 | U202 | 6 | LS377 |
| 1:XSIG257 | U201 | 7 | LS374 |
| 1:XSIG258 | U201 | 8 | LS374 |
| 1:XSIG258 | U202 | 9 | LS377 |
| 1:XSIG259 | U202 | 12 | LS377 |
| 1:XSIG259 | U201 | 13 | LS374 |
| 1:XSIG260 | U201 | 14 | LS374 |
| 1:XSIG260 | U202 | 15 | LS377 |
| 1:XSIG261 | U202 | 16 | LS377 |
| 1:XSIG261 | U201 | 17 | LS374 |
| 1:XSIG262 | U201 | 18 | LS374 |
| 1:XSIG262 | U202 | 19 | LS377 |
| 1:XSIG327 | U208 | 16 | LS240 |
| 1:XSIG327 | U207 | 8 | LS244 |
| 2:XSIG10 | U610 | 3 | LS273 |
| 2:XSIG10 | U510 | 6 | 2729 |
| 2:XSIG11 | U610 | 4 | LS273 |
| 2:XSIG11 | U510 | 7 | 2729 |
| 2:XSIG124 | U612 | 2 | LS138 |
| 2:XSIG124 | U614 | 3 | PAL16R8 |
| 2:XSIG124 | U613 | 7 | S374 |

| | | | |
|---|---|---|---|
| 2:XSIG125 | U612 | 1 | LS138 |
| 2:XSIG125 | U614 | 2 | PAL16R8 |
| 2:XSIG125 | U613 | 4 | S374 |
| 2:XSIG125 | U509 | 6 | 2729 |
| 2:XSIG12 | U610 | 7 | LS273 |
| 2:XSIG12 | U510 | 8 | 2729 |
| 2:XSIG131 | U511 | 11 | S112 |
| 2:XSIG131 | U407 | 6 | S151 |
| 2:XSIG134 | U511 | 12 | S112 |
| 2:XSIG134 | U407 | 5 | S151 |
| 2:XSIG13 | U610 | 8 | LS273 |
| 2:XSIG13 | U510 | 9 | 2729 |
| 2:XSIG14 | U510 | 11 | 2729 |
| 2:XSIG14 | U610 | 13 | LS273 |
| 2:XSIG15 | U510 | 12 | 2729 |
| 2:XSIG15 | U610 | 14 | LS273 |
| 2:XSIG16 | U510 | 13 | 2729 |
| 2:XSIG16 | U610 | 17 | LS273 |
| 2:XSIG17 | U510 | 14 | 2729 |
| 2:XSIG17 | U610 | 18 | LS273 |
| 2:XSIG177 | U406 | 19 | F374 |
| 2:XSIG177 | U407 | 7 | S151 |
| 2:XSIG213 | U716 | 16 | S244 |
| 2:XSIG213 | U407 | 3 | S151 |
| 2:XSIG228 | U408 | 3 | LS32 |
| 2:XSIG228 | U407 | 9 | S151 |
| 2:XSIG365 | U208 | 12 | LS240 |
| 2:XSIG365 | U209 | 6 | LS279 |
| 2:XSIG37 | U612 | 15 | LS138 |
| 2:XSIG37 | U611 | 3 | S374 |
| 2:XSIG378 | U510 | 19 | 2729 |
| 2:XSIG378 | U609 | 5 | S374 |
| 2:XSIG379 | U510 | 18 | 2729 |
| 2:XSIG379 | U609 | 2 | S374 |
| 2:XSIG38 | U612 | 14 | LS138 |
| 2:XSIG383 | U615 | 13 | S240 |
| 2:XSIG383 | U612 | 3 | LS138 |
| 2:XSIG383 | U614 | 4 | PAL16R8 |
| 2:XSIG383 | U613 | 8 | S374 |
| 2:XSIG38 | U611 | 4 | S374 |
| 2:XSIG39 | U612 | 13 | LS138 |
| 2:XSIG39 | U611 | 7 | S374 |
| 2:XSIG40 | U612 | 12 | LS138 |
| 2:XSIG40 | U611 | 8 | S374 |
| 2:XSIG41 | U612 | 11 | LS138 |
| 2:XSIG41 | U611 | 13 | S374 |
| 2:XSIG416 | U512 | 2 | S00 |
| 2:XSIG416 | U409 | 8 | OSC 16MHZ |
| 2:XSIG417 | U512 | 1 | S00 |
| 2:XSIG417 | U705 | 3 | 316A102 1K |
| 2:XSIG42 | U612 | 10 | LS138 |
| 2:XSIG42 | U611 | 14 | S374 |
| 2:XSIG424 | U614 | 19 | PAL16R8 |
| 2:XSIG424 | U717 | 3 | S374 |
| 2:XSIG425 | U614 | 18 | PAL16R8 |
| 2:XSIG425 | U717 | 4 | S374 |
| 2:XSIG426 | U614 | 17 | PAL16R8 |
| 2:XSIG426 | U717 | 7 | S374 |
| 2:XSIG427 | U614 | 16 | PAL16R8 |

| | | | |
|---|---|---|---|
| 2:XSIG427 | U717 | 8 | S374 |
| 2:XSIG43 | U611 | 17 | S374 |
| 2:XSIG43 | U612 | 9 | LS138 |
| 2:XSIG44 | U611 | 18 | S374 |
| 2:XSIG44 | U612 | 7 | LS138 |
| 2:XSIG494 | U511 | 13 | S112 |
| 2:XSIG494 | U410 | 4 | S08 |
| 2:XSIG494 | U511 | 5 | S112 |
| 2:XSIG508 | U313 | 2 | S240 |
| 2:XSIG508 | U514 | 6 | S20 |
| 2:XSIG559 | U613 | 13 | S374 |
| 2:XSIG559 | U615 | 7 | S240 |
| 2:XSIG599 | U705 | 7 | 316A102 1K |
| 2:XSIG599 | U313 | 8 | S240 |
| 2:XSIG86 | U511 | 1 | S112 |
| 2:XSIG86 | U512 | 3 | S00 |
| 2:XSIG89 | U410 | 5 | S08 |
| 2:XSIG89 | U511 | 9 | S112 |
| 3:XSIG117 | U508 | 2 | LS374 |
| 3:XSIG117 | U605 | 3 | LS374 |
| 3:XSIG118 | U605 | 4 | LS374 |
| 3:XSIG118 | U508 | 5 | LS374 |
| 3:XSIG119 | U508 | 6 | LS374 |
| 3:XSIG119 | U605 | 7 | LS374 |
| 3:XSIG120 | U605 | 8 | LS374 |
| 3:XSIG120 | U508 | 9 | LS374 |
| 3:XSIG121 | U508 | 12 | LS374 |
| 3:XSIG121 | U605 | 13 | LS374 |
| 3:XSIG122 | U605 | 14 | LS374 |
| 3:XSIG122 | U508 | 15 | LS374 |
| 3:XSIG123 | U508 | 16 | LS374 |
| 3:XSIG123 | U605 | 17 | LS374 |
| 3:XSIG124 | U605 | 18 | LS374 |
| 3:XSIG124 | U508 | 19 | LS374 |
| 3:XSIG149 | U505 | 2 | LS374 |
| 3:XSIG149 | U603 | 3 | LS374 |
| 3:XSIG150 | U603 | 4 | LS374 |
| 3:XSIG150 | U505 | 5 | LS374 |
| 3:XSIG151 | U505 | 6 | LS374 |
| 3:XSIG151 | U603 | 7 | LS374 |
| 3:XSIG152 | U603 | 8 | LS374 |
| 3:XSIG152 | U505 | 9 | LS374 |
| 3:XSIG153 | U505 | 12 | LS374 |
| 3:XSIG153 | U603 | 13 | LS374 |
| 3:XSIG154 | U603 | 14 | LS374 |
| 3:XSIG154 | U505 | 15 | LS374 |
| 3:XSIG155 | U505 | 16 | LS374 |
| 3:XSIG155 | U603 | 17 | LS374 |
| 3:XSIG156 | U603 | 18 | LS374 |
| 3:XSIG156 | U505 | 19 | LS374 |
| 3:XSIG181 | U504 | 2 | LS374 |
| 3:XSIG181 | U604 | 3 | LS374 |
| 3:XSIG182 | U604 | 4 | LS374 |
| 3:XSIG182 | U504 | 5 | LS374 |
| 3:XSIG183 | U504 | 6 | LS374 |
| 3:XSIG183 | U604 | 7 | LS374 |
| 3:XSIG184 | U604 | 8 | LS374 |
| 3:XSIG184 | U504 | 9 | LS374 |
| 3:XSIG185 | U504 | 12 | LS374 |

| | | | |
|---|---|---|---|
| 3:XSIG185 | U604 | 13 | LS374 |
| 3:XSIG186 | U604 | 14 | LS374 |
| 3:XSIG186 | U504 | 15 | LS374 |
| 3:XSIG187 | U504 | 16 | LS374 |
| 3:XSIG187 | U604 | 17 | LS374 |
| 3:XSIG188 | U604 | 18 | LS374 |
| 3:XSIG188 | U504 | 19 | LS374 |
| 3:XSIG325 | U307 | 2 | LS374 |
| 3:XSIG325 | U308 | 3 | LS374 |
| 3:XSIG326 | U308 | 4 | LS374 |
| 3:XSIG326 | U307 | 5 | LS374 |
| 3:XSIG327 | U307 | 6 | LS374 |
| 3:XSIG327 | U308 | 7 | LS374 |
| 3:XSIG328 | U308 | 8 | LS374 |
| 3:XSIG328 | U307 | 9 | LS374 |
| 3:XSIG329 | U307 | 12 | LS374 |
| 3:XSIG329 | U308 | 13 | LS374 |
| 3:XSIG330 | U308 | 14 | LS374 |
| 3:XSIG330 | U307 | 15 | LS374 |
| 3:XSIG331 | U307 | 16 | LS374 |
| 3:XSIG331 | U308 | 17 | LS374 |
| 3:XSIG332 | U308 | 18 | LS374 |
| 3:XSIG332 | U307 | 19 | LS374 |
| 3:XSIG85 | U501 | 2 | LS374 |
| 3:XSIG85 | U601 | 3 | LS374 |
| 3:XSIG86 | U601 | 4 | LS374 |
| 3:XSIG86 | U501 | 5 | LS374 |
| 3:XSIG87 | U501 | 6 | LS374 |
| 3:XSIG87 | U601 | 7 | LS374 |
| 3:XSIG88 | U601 | 8 | LS374 |
| 3:XSIG88 | U501 | 9 | LS374 |
| 3:XSIG89 | U501 | 12 | LS374 |
| 3:XSIG89 | U601 | 13 | LS374 |
| 3:XSIG90 | U601 | 14 | LS374 |
| 3:XSIG90 | U501 | 15 | LS374 |
| 3:XSIG91 | U501 | 16 | LS374 |
| 3:XSIG91 | U601 | 17 | LS374 |
| 3:XSIG92 | U601 | 18 | LS374 |
| 3:XSIG92 | U501 | 19 | LS374 |
| 4:XSIG322 | U414 | 18 | PGA8034 |
| 4:XSIG322 | U306 | 23 | PAL20R8A |
| 4:XSIG323 | U414 | 19 | PGA8034 |
| 4:XSIG323 | U306 | 2 | PAL20R8A |
| 4:XSIG324 | U414 | 20 | PGA8034 |
| 4:XSIG324 | U306 | 3 | PAL20R8A |
| 4:XSIG325 | U414 | 21 | PGA8034 |
| 4:XSIG325 | U306 | 4 | PAL20R8A |
| 4:XSIG326 | U414 | 22 | PGA8034 |
| 4:XSIG326 | U306 | 5 | PAL20R8A |
| 4:XSIG327 | U414 | 23 | PGA8034 |
| 4:XSIG327 | U306 | 6 | PAL20R8A |
| 4:XSIG328 | U414 | 24 | PGA8034 |
| 4:XSIG328 | U306 | 7 | PAL20R8A |
| 4:XSIG329 | U414 | 25 | PGA8034 |
| 4:XSIG329 | U306 | 8 | PAL20R8A |
| 4:XSIG330 | U414 | 26 | PGA8034 |
| 4:XSIG330 | U306 | 9 | PAL20R8A |
| 4:XSIG331 | U306 | 10 | PAL20R8A |
| 4:XSIG331 | U414 | 27 | PGA8034 |
| 5:XSIG322 | U317 | 18 | PGA8034 |

| | | | |
|---|---|---|---|
| 5:XSIG322 | U304 | 23 | PAL20R8A |
| 5:XSIG323 | U317 | 19 | PGA8034 |
| 5:XSIG323 | U304 | 2 | PAL20R8A |
| 5:XSIG324 | U317 | 20 | PGA8034 |
| 5:XSIG324 | U304 | 3 | PAL20R8A |
| 5:XSIG325 | U317 | 21 | PGA8034 |
| 5:XSIG325 | U304 | 4 | PAL20R8A |
| 5:XSIG326 | U317 | 22 | PGA8034 |
| 5:XSIG326 | U304 | 5 | PAL20R8A |
| 5:XSIG327 | U317 | 23 | PGA8034 |
| 5:XSIG327 | U304 | 6 | PAL20R8A |
| 5:XSIG328 | U317 | 24 | PGA8034 |
| 5:XSIG328 | U304 | 7 | PAL20R8A |
| 5:XSIG329 | U317 | 25 | PGA8034 |
| 5:XSIG329 | U304 | 8 | PAL20R8A |
| 5:XSIG330 | U317 | 26 | PGA8034 |
| 5:XSIG330 | U304 | 9 | PAL20R8A |
| 5:XSIG331 | U304 | 10 | PAL20R8A |
| 5:XSIG331 | U317 | 27 | PGA8034 |
| 6:XSIG322 | U617 | 18 | PGA8034 |
| 6:XSIG322 | U305 | 23 | PAL20R8A |
| 6:XSIG323 | U617 | 19 | PGA8034 |
| 6:XSIG323 | U305 | 2 | PAL20R8A |
| 6:XSIG324 | U617 | 20 | PGA8034 |
| 6:XSIG324 | U305 | 3 | PAL20R8A |
| 6:XSIG325 | U617 | 21 | PGA8034 |
| 6:XSIG325 | U305 | 4 | PAL20R8A |
| 6:XSIG326 | U617 | 22 | PGA8034 |
| 6:XSIG326 | U305 | 5 | PAL20R8A |
| 6:XSIG327 | U617 | 23 | PGA8034 |
| 6:XSIG327 | U305 | 6 | PAL20R8A |
| 6:XSIG328 | U617 | 24 | PGA8034 |
| 6:XSIG328 | U305 | 7 | PAL20R8A |
| 6:XSIG329 | U617 | 25 | PGA8034 |
| 6:XSIG329 | U305 | 8 | PAL20R8A |
| 6:XSIG330 | U617 | 26 | PGA8034 |
| 6:XSIG330 | U305 | 9 | PAL20R8A |
| 6:XSIG331 | U305 | 10 | PAL20R8A |
| 6:XSIG331 | U617 | 27 | PGA8034 |
| 7:XSIG322 | U517 | 18 | PGA8034 |
| 7:XSIG322 | U303 | 23 | PAL20R8A |
| 7:XSIG323 | U517 | 19 | PGA8034 |
| 7:XSIG323 | U303 | 2 | PAL20R8A |
| 7:XSIG324 | U517 | 20 | PGA8034 |
| 7:XSIG324 | U303 | 3 | PAL20R8A |
| 7:XSIG325 | U517 | 21 | PGA8034 |
| 7:XSIG325 | U303 | 4 | PAL20R8A |
| 7:XSIG326 | U517 | 22 | PGA8034 |
| 7:XSIG326 | U303 | 5 | PAL20R8A |
| 7:XSIG327 | U517 | 23 | PGA8034 |
| 7:XSIG327 | U303 | 6 | PAL20R8A |
| 7:XSIG328 | U517 | 24 | PGA8034 |
| 7:XSIG328 | U303 | 7 | PAL20R8A |
| 7:XSIG329 | U517 | 25 | PGA8034 |
| 7:XSIG329 | U303 | 8 | PAL20R8A |
| 7:XSIG330 | U517 | 26 | PGA8034 |
| 7:XSIG330 | U303 | 9 | PAL20R8A |
| 7:XSIG331 | U303 | 10 | PAL20R8A |
| 7:XSIG331 | U517 | 27 | PGA8034 |

| | | | |
|---|---|---|---|
| 8:XSIG174 | U704 | 13 | PAL14L8 |
| 8:XSIG174 | U218 | 2 | LS273 |
| 8:XSIG175 | U411 | 2 | LS139 |
| 8:XSIG175 | U218 | 5 | LS273 |
| 8:XSIG176 | U411 | 3 | LS139 |
| 8:XSIG176 | U218 | 6 | LS273 |
| 8:XSIG182 | U208 | 13 | LS240 |
| 8:XSIG182 | U218 | 9 | LS273 |
| 8:XSIG498 | U410 | 13 | S08 |
| 8:XSIG498 | U707 | 3 | LS244 |
| 8:XSIG505 | U615 | 17 | S240 |
| 8:XSIG505 | U108 | 6 | LS164 |
| 8:XSIG506 | U615 | 3 | S240 |
| 8:XSIG506 | U410 | 9 | S08 |
| 8:XSIG507 | U410 | 10 | S08 |
| 8:XSIG507 | U108 | 4 | LS164 |
| 8:XSIG543 | U512 | 11 | S00 |
| 8:XSIG543 | U701 | 4 | LS125 |
| 8:XSIG544 | U512 | 12 | S00 |
| 8:XSIG544 | U108 | 13 | LS164 |
| 8:XSIG593 | U218 | 12 | LS273 |
| 8:XSIG593 | U313 | 4 | S240 |
| 8:XSIG595 | U218 | 19 | LS273 |
| 8:XSIG595 | U313 | 6 | S240 |
| ADR10~ | U706 | 4 | LS240 |
| ADR11~ | U706 | 6 | LS240 |
| ADR12~ | U706 | 8 | LS240 |
| ADR13~ | U706 | 11 | LS240 |
| ADR14~ | U706 | 13 | LS240 |
| ADR15~ | U706 | 15 | LS240 |
| ADR16~ | U706 | 17 | LS240 |
| ADR17~ | U702 | 2 | LS240 |
| ADR18~ | U702 | 4 | LS240 |
| ADR19~ | U702 | 6 | LS240 |
| ADR1~ | U110 | 2 | LS240 |
| ADR20~ | U702 | 8 | LS240 |
| ADR21~ | U702 | 11 | LS240 |
| ADR22~ | U702 | 13 | LS240 |
| ADR23~ | U702 | 15 | LS240 |
| ADR2~ | U110 | 4 | LS240 |
| ADR3~ | U110 | 6 | LS240 |
| ADR4~ | U110 | 8 | LS240 |
| ADR5~ | U110 | 11 | LS240 |
| ADR6~ | U110 | 13 | LS240 |
| ADR7~ | U110 | 15 | LS240 |
| ADR8~ | U110 | 17 | LS240 |
| ADR9~ | U706 | 2 | LS240 |
| ALU1_D0 | U315 | 23 | PAL20R4 |
| ALU1_D0 | U215 | 3 | LS374 |
| ALU1_D0 | U214 | 8 | S381 |
| ALU1_D1 | U315 | 2 | PAL20R4 |
| ALU1_D1 | U215 | 4 | LS374 |
| ALU1_D1 | U214 | 9 | S381 |
| ALU1_D2 | U214 | 11 | S381 |
| ALU1_D2 | U315 | 3 | PAL20R4 |
| ALU1_D2 | U215 | 7 | LS374 |
| ALU1_D3 | U214 | 12 | S381 |
| ALU1_D3 | U315 | 4 | PAL20R4 |
| ALU1_D3 | U215 | 8 | LS374 |

| | | | |
|---|---|---|---|
| ALU2_D0 | U215 | 13 | LS374 |
| ALU2_D0 | U314 | 23 | PAL20R8A |
| ALU2_D0 | U315 | 5 | PAL20R4 |
| ALU2_D0 | U302 | 8 | S381 |
| ALU2_D1 | U215 | 14 | LS374 |
| ALU2_D1 | U314 | 2 | PAL20R8A |
| ALU2_D1 | U315 | 6 | PAL20R4 |
| ALU2_D1 | U302 | 9 | S381 |
| ALU2_D2 | U302 | 11 | S381 |
| ALU2_D2 | U215 | 17 | LS374 |
| ALU2_D2 | U314 | 3 | PAL20R8A |
| ALU2_D2 | U315 | 7 | PAL20R4 |
| ALU2_D3 | U302 | 12 | S381 |
| ALU2_D3 | U215 | 18 | LS374 |
| ALU2_D3 | U314 | 4 | PAL20R8A |
| ALU2_D3 | U315 | 8 | PAL20R4 |
| ALU3_D0 | U211 | 3 | LS374 |
| ALU3_D0 | U314 | 5 | PAL20R8A |
| ALU3_D0 | U311 | 8 | S381 |
| ALU3_D0 | U315 | 9 | PAL20R4 |
| ALU3_D1 | U315 | 10 | PAL20R4 |
| ALU3_D1 | U211 | 4 | LS374 |
| ALU3_D1 | U314 | 6 | PAL20R8A |
| ALU3_D1 | U311 | 9 | S381 |
| ALU3_D2 | U311 | 11 | S381 |
| ALU3_D2 | U211 | 7 | LS374 |
| ALU3_D3 | U311 | 12 | S381 |
| ALU3_D3 | U315 | 14 | PAL20R4 |
| ALU3_D3 | U211 | 8 | LS374 |
| BCCLK~ | U707 | 5 | LS244 |
| BCCLK~ | U108 | 8 | LS164 |
| BMRDC~ | U703 | 13 | PAL14L8 |
| BMRDC~ | U704 | 14 | PAL14L8 |
| BMRDC~ | U707 | 9 | LS244 |
| BMWTC~ | U703 | 14 | PAL14L8 |
| BMWTC~ | U704 | 23 | PAL14L8 |
| BMWTC~ | U707 | 7 | LS244 |
| C15_8 | U308 | 5 | LS374 |
| C15_9 | U310 | 11 | LS153 |
| C15_9 | U308 | 15 | LS374 |
| C26_8 | U310 | 4 | LS153 |
| C26_8 | U308 | 6 | LS374 |
| C26_9 | U310 | 12 | LS153 |
| C26_9 | U308 | 16 | LS374 |
| C37_8 | U310 | 3 | LS153 |
| C37_8 | U308 | 9 | LS374 |
| C37_9 | U310 | 13 | LS153 |
| C37_9 | U308 | 19 | LS374 |
| C84_8 | U308 | 2 | LS374 |
| C84_8 | U310 | 6 | LS153 |
| C84_9 | U310 | 10 | LS153 |
| C84_9 | U308 | 12 | LS374 |
| CCLK~ | U707 | 15 | LS244 |
| CHK_CRC | U719 | 17 | PAL20R4 |
| CHK_CRC | U720 | 2 | CRC |
| CHK_CRC | U608 | 8 | PAL12L10 |
| CLR_EOL_FF~ | U609 | 13 | S374 |
| CLR_FIFO~ | U412 | 7 | LS138 |
| CLR_FIFO~ | U122 | 9 | 67401 |

| | | | |
|---|---|---|---|
| COEF12_0 | U401 | 11 | 2764 |
| COEF12_0 | U502 | 3 | LS374 |
| COEF12_1 | U401 | 12 | 2764 |
| COEF12_1 | U502 | 4 | LS374 |
| COEF12_2 | U401 | 13 | 2764 |
| COEF12_2 | U502 | 7 | LS374 |
| COEF12_3 | U401 | 15 | 2764 |
| COEF12_3 | U502 | 8 | LS374 |
| COEF12_4 | U502 | 13 | LS374 |
| COEF12_4 | U401 | 16 | 2764 |
| COEF12_5 | U502 | 14 | LS374 |
| COEF12_5 | U401 | 17 | 2764 |
| COEF12_6 | U502 | 17 | LS374 |
| COEF12_6 | U401 | 18 | 2764 |
| COEF12_7 | U502 | 18 | LS374 |
| COEF12_7 | U401 | 19 | 2764 |
| COEF15_8 | U402 | 12 | 2764 |
| COEF15_8 | U307 | 4 | LS374 |
| COEF15_9 | U307 | 14 | LS374 |
| COEF15_9 | U402 | 17 | 2764 |
| COEF26_8 | U402 | 13 | 2764 |
| COEF26_8 | U307 | 7 | LS374 |
| COEF26_9 | U307 | 17 | LS374 |
| COEF26_9 | U402 | 18 | 2764 |
| COEF34_0 | U404 | 11 | 2764 |
| COEF34_0 | U506 | 3 | LS374 |
| COEF34_1 | U404 | 12 | 2764 |
| COEF34_1 | U506 | 4 | LS374 |
| COEF34_2 | U404 | 13 | 2764 |
| COEF34_2 | U506 | 7 | LS374 |
| COEF34_3 | U404 | 15 | 2764 |
| COEF34_3 | U506 | 8 | LS374 |
| COEF34_4 | U506 | 13 | LS374 |
| COEF34_4 | U404 | 16 | 2764 |
| COEF34_5 | U506 | 14 | LS374 |
| COEF34_5 | U404 | 17 | 2764 |
| COEF34_6 | U506 | 17 | LS374 |
| COEF34_6 | U404 | 18 | 2764 |
| COEF34_7 | U506 | 18 | LS374 |
| COEF34_7 | U404 | 19 | 2764 |
| COEF37_8 | U402 | 15 | 2764 |
| COEF37_8 | U307 | 8 | LS374 |
| COEF37_9 | U307 | 18 | LS374 |
| COEF37_9 | U402 | 19 | 2764 |
| COEF56_0 | U403 | 11 | 2764 |
| COEF56_0 | U503 | 3 | LS374 |
| COEF56_1 | U403 | 12 | 2764 |
| COEF56_1 | U503 | 4 | LS374 |
| COEF56_2 | U403 | 13 | 2764 |
| COEF56_2 | U503 | 7 | LS374 |
| COEF56_3 | U403 | 15 | 2764 |
| COEF56_3 | U503 | 8 | LS374 |
| COEF56_4 | U503 | 13 | LS374 |
| COEF56_4 | U403 | 16 | 2764 |
| COEF56_5 | U503 | 14 | LS374 |
| COEF56_5 | U403 | 17 | 2764 |
| COEF56_6 | U503 | 17 | LS374 |
| COEF56_6 | U403 | 18 | 2764 |
| COEF56_7 | U503 | 18 | LS374 |

| | | | |
|---|---|---|---|
| COEF56¯7 | U403 | 19 | 2764 |
| COEF78¯0 | U405 | 11 | 2764 |
| COEF78¯0 | U507 | 3 | LS374 |
| COEF78¯1 | U405 | 12 | 2764 |
| COEF78¯1 | U507 | 4 | LS374 |
| COEF78¯2 | U405 | 13 | 2764 |
| COEF78¯2 | U507 | 7 | LS374 |
| COEF78¯3 | U405 | 15 | 2764 |
| COEF78¯3 | U507 | 8 | LS374 |
| COEF78¯4 | U507 | 13 | LS374 |
| COEF78¯4 | U405 | 16 | 2764 |
| COEF78¯5 | U507 | 14 | LS374 |
| COEF78¯5 | U405 | 17 | 2764 |
| COEF78¯6 | U507 | 17 | LS374 |
| COEF78¯6 | U405 | 18 | 2764 |
| COEF78¯7 | U507 | 18 | LS374 |
| COEF78¯7 | U405 | 19 | 2764 |
| COEF84¯8 | U402 | 11 | 2764 |
| COEF84¯8 | U307 | 3 | LS374 |
| COEF84¯9 | U307 | 13 | LS374 |
| COEF84¯9 | U402 | 16 | 2764 |
| COEF¯0 | U507 | 2 | LS374 |
| COEF¯0 | U414 | 63 | PGA8034 |
| COEF¯1 | U217 | 4 | LS244 |
| COEF¯1 | U507 | 5 | LS374 |
| COEF¯1 | U414 | 62 | PGA8034 |
| COEF¯2 | U507 | 6 | LS374 |
| COEF¯2 | U414 | 61 | PGA8034 |
| COEF¯3 | U414 | 60 | PGA8034 |
| COEF¯3 | U217 | 8 | LS244 |
| COEF¯3 | U507 | 9 | LS374 |
| COEF¯4 | U217 | 11 | LS244 |
| COEF¯4 | U507 | 12 | LS374 |
| COEF¯4 | U414 | 59 | PGA8034 |
| COEF¯5 | U217 | 13 | LS244 |
| COEF¯5 | U507 | 15 | LS374 |
| COEF¯5 | U414 | 58 | PGA8034 |
| COEF¯6 | U217 | 15 | LS244 |
| COEF¯6 | U507 | 16 | LS374 |
| COEF¯6 | U414 | 57 | PGA8034 |
| COEF¯7 | U217 | 17 | LS244 |
| COEF¯7 | U507 | 19 | LS374 |
| COEF¯7 | U414 | 56 | PGA8034 |
| COEF¯8 | U707 | 2 | LS244 |
| COEF¯8 | U414 | 55 | PGA8034 |
| COEF¯8 | U310 | 7 | LS153 |
| COEF¯9 | U707 | 4 | LS244 |
| COEF¯9 | U414 | 54 | PGA8034 |
| COEF¯9 | U310 | 9 | LS153 |
| CRC¯CLK˜ | U719 | 16 | PAL20R4 |
| CRC¯CLK˜ | U720 | 9 | CRC |
| CRC¯CS˜ | U608 | 23 | PAL12L10 |
| CRC¯CS˜ | U720 | 6 | CRC |
| CRC¯RD˜ | U719 | 21 | PAL20R4 |
| CRC¯RD˜ | U720 | 5 | CRC |
| CRC¯WT˜ | U719 | 22 | PAL20R4 |
| CRC¯WT˜ | U720 | 7 | CRC |
| DAT0˜ | U709 | 2 | LS640 |
| DAT1˜ | U709 | 3 | LS640 |

| | | | |
|---|---|---|---|
| DAT2~ | U709 | 4 | LS640 |
| DAT3~ | U709 | 5 | LS640 |
| DAT4~ | U709 | 6 | LS640 |
| DAT5~ | U709 | 7 | LS640 |
| DAT6~ | U709 | 8 | LS640 |
| DAT7~ | U709 | 9 | LS640 |
| DAT8~ | U708 | 2 | LS640 |
| DAT9~ | U708 | 3 | LS640 |
| DATA~ | U708 | 4 | LS640 |
| DATB~ | U708 | 5 | LS640 |
| DATC~ | U708 | 6 | LS640 |
| DATD~ | U708 | 7 | LS640 |
| DATE~ | U708 | 8 | LS640 |
| DATF~ | U708 | 9 | LS640 |
| DEL1_D4 | U301 | 2 | LS374 |
| DEL1_D4 | U214 | 3 | S381 |
| DEL1_D5 | U214 | 1 | S381 |
| DEL1_D5 | U301 | 5 | LS374 |
| DEL1_D6 | U214 | 19 | S381 |
| DEL1_D6 | U301 | 6 | LS374 |
| DEL1_D7 | U214 | 17 | S381 |
| DEL1_D7 | U301 | 9 | LS374 |
| DEL2_D4 | U301 | 12 | LS374 |
| DEL2_D4 | U302 | 3 | S381 |
| DEL2_D5 | U302 | 1 | S381 |
| DEL2_D5 | U301 | 15 | LS374 |
| DEL2_D6 | U301 | 16 | LS374 |
| DEL2_D6 | U302 | 19 | S381 |
| DEL2_D7 | U302 | 17 | S381 |
| DEL2_D7 | U301 | 19 | LS374 |
| DEL3_D4 | U312 | 2 | LS374 |
| DEL3_D4 | U311 | 3 | S381 |
| DEL3_D5 | U311 | 1 | S381 |
| DEL3_D5 | U312 | 5 | LS374 |
| DEL3_D6 | U311 | 19 | S381 |
| DEL3_D6 | U312 | 6 | LS374 |
| DEL3_D7 | U311 | 17 | S381 |
| DEL3_D7 | U312 | 9 | LS374 |
| DIS_SEP~ | U209 | 11 | LS279 |
| DIS_SEP~ | U209 | 2 | LS279 |
| DIS_SEP~ | U606 | 6 | LS11 |
| DORDY~ | U609 | 4 | S374 |
| DORDY~ | U710 | 5 | LS74 |
| DOUT_0~ | U715 | 2 | LS244 |
| DOUT_1~ | U715 | 4 | LS244 |
| DOUT_1~ | U714 | 5 | S374 |
| DOUT_2~ | U715 | 6 | LS244 |
| DOUT_3~ | U715 | 8 | LS244 |
| DOUT_3~ | U714 | 9 | S374 |
| DOUT_4~ | U715 | 11 | LS244 |
| DOUT_4~ | U714 | 12 | S374 |
| DOUT_5~ | U715 | 13 | LS244 |
| DOUT_5~ | U714 | 15 | S374 |
| DOUT_6~ | U715 | 15 | LS244 |
| DOUT_6~ | U714 | 16 | S374 |
| DOUT_7~ | U715 | 17 | LS244 |
| DOUT_7~ | U714 | 19 | S374 |

| | | | |
|---|---|---|---|
| EOL_FF~ | U711 | 1 | LS11 |
| EOL_FF~ | U209 | 13 | LS279 |
| EOL_FF~ | U609 | 3 | S374 |
| EOL_IN~ | U209 | 14 | LS279 |
| EOL_IN~ | U208 | 18 | LS240 |
| EOL_OUT~ | U716 | 14 | S244 |
| EOL_OUT~ | U713 | 15 | LS244 |
| EVEN_C | U401 | 2 | 2764 |
| EVEN_C | U209 | 7 | LS279 |
| G1~ | U214 | 13 | S381 |
| G1~ | U315 | 22 | PAL20R4 |
| G1~ | U314 | 9 | PAL20R8A |
| G2~ | U314 | 10 | PAL20R8A |
| G2~ | U302 | 13 | S381 |
| G2~ | U315 | 15 | PAL20R4 |
| G3~ | U314 | 11 | PAL20R8A |
| G3~ | U311 | 13 | S381 |
| GND | U208 | 1 | LS240 |
| GND | U614 | 11 | PAL16R8 |
| GND | U311 | 15 | S381 |
| GND | U311 | 16 | S381 |
| GND | U115 | 18 | 2018 |
| GND | U115 | 19 | 2018 |
| GND | U311 | 2 | S381 |
| GND | U414 | 39 | PGA8034 |
| GND | U407 | 4 | S151 |
| GND | U414 | 40 | PGA8034 |
| GND | U414 | 41 | PGA8034 |
| GND | U414 | 47 | PGA8034 |
| GND | U612 | 5 | LS138 |
| GND | U414 | 50 | PGA8034 |
| GND | U414 | 52 | PGA8034 |
| GND | U414 | 53 | PGA8034 |
| GND | U414 | 64 | PGA8034 |
| GND | U414 | 65 | PGA8034 |
| GND | U414 | 66 | PGA8034 |
| GND | U414 | 67 | PGA8034 |
| GND | U311 | 7 | S381 |
| GND | U720 | 8 | CRC |
| GRAD_A0 | U111 | 18 | LS244 |
| GRAD_A0 | U115 | 8 | 2018 |
| GRAD_A1 | U111 | 16 | LS244 |
| GRAD_A1 | U115 | 7 | 2018 |
| GRAD_A2 | U111 | 14 | LS244 |
| GRAD_A2 | U115 | 6 | 2018 |
| GRAD_A3 | U111 | 12 | LS244 |
| GRAD_A3 | U115 | 5 | 2018 |
| GRAD_A4 | U115 | 4 | 2018 |
| GRAD_A4 | U111 | 9 | LS244 |
| GRAD_A5 | U115 | 3 | 2018 |
| GRAD_A5 | U111 | 7 | LS244 |
| GRAD_A6 | U115 | 2 | 2018 |
| GRAD_A6 | U111 | 5 | LS244 |
| GRAD_A7 | U115 | 1 | 2018 |
| GRAD_A7 | U111 | 3 | LS244 |
| GRAD_A8 | U206 | 18 | LS241 |
| GRAD_A8 | U115 | 23 | 2018 |
| GRAD_A8 | U206 | 9 | LS241 |
| GRAD_A9 | U206 | 16 | LS241 |

| | | | |
|---|---|---|---|
| GRAD_A9 | U115 | 22 | 2018 |
| GRAD_A9 | U206 | 7 | LS241 |
| GRAD_ACCESS~ | U606 | 1 | LS11 |
| GRAD_ACCESS~ | U608 | 10 | PAL12L10 |
| GRAD_ACCESS~ | U116 | 19 | LS245 |
| GRAD_ACCESS~ | U704 | 20 | PAL14L8 |
| GRAD_A_ACCESS~ | U111 | 1 | LS244 |
| GRAD_A_ACCESS~ | U111 | 19 | LS244 |
| GRAD_A_ACCESS~ | U704 | 21 | PAL14L8 |
| GRAD_A_ACCESS~ | U606 | 4 | LS11 |
| GRAD_D0 | U116 | 18 | LS245 |
| GRAD_D0 | U114 | 23 | PAL20R8A |
| GRAD_D0 | U204 | 3 | LS377 |
| GRAD_D0 | U115 | 9 | 2018 |
| GRAD_D1 | U115 | 10 | 2018 |
| GRAD_D1 | U116 | 17 | LS245 |
| GRAD_D1 | U114 | 2 | PAL20R8A |
| GRAD_D1 | U204 | 4 | LS377 |
| GRAD_D2 | U115 | 11 | 2018 |
| GRAD_D2 | U116 | 16 | LS245 |
| GRAD_D2 | U114 | 3 | PAL20R8A |
| GRAD_D2 | U204 | 7 | LS377 |
| GRAD_D3 | U115 | 13 | 2018 |
| GRAD_D3 | U116 | 15 | LS245 |
| GRAD_D3 | U114 | 4 | PAL20R8A |
| GRAD_D3 | U204 | 8 | LS377 |
| GRAD_D4 | U204 | 13 | LS377 |
| GRAD_D4 | U115 | 14 | 2018 |
| GRAD_D4 | U114 | 5 | PAL20R8A |
| GRAD_D5 | U116 | 13 | LS245 |
| GRAD_D5 | U204 | 14 | LS377 |
| GRAD_D5 | U115 | 15 | 2018 |
| GRAD_D5 | U114 | 6 | PAL20R8A |
| GRAD_D6 | U116 | 12 | LS245 |
| GRAD_D6 | U115 | 16 | 2018 |
| GRAD_D6 | U204 | 17 | LS377 |
| GRAD_D6 | U114 | 7 | PAL20R8A |
| GRAD_D7 | U116 | 11 | LS245 |
| GRAD_D7 | U115 | 17 | 2018 |
| GRAD_D7 | U204 | 18 | LS377 |
| GRAD_D7 | U114 | 8 | PAL20R8A |
| GRAD_OE~ | U608 | 15 | PAL12L10 |
| GRAD_OE~ | U115 | 20 | 2018 |
| HOST_ACCESS~ | U608 | 13 | PAL12L10 |
| HOST_ACCESS~ | U703 | 21 | PAL14L8 |
| HOST_ACCESS~ | U412 | 5 | LS138 |
| HOST_CLK~ | U412 | 11 | LS138 |
| HOST_CLK~ | U511 | 4 | S112 |
| HOST_CLR~ | U412 | 10 | LS138 |
| HOST_CLR~ | U410 | 12 | S08 |
| HOST_IR1~ | U718 | 11 | LS241 |
| HOST_IR1~ | U608 | 19 | PAL12L10 |
| HOST_IR2~ | U718 | 13 | LS241 |
| HOST_IR2~ | U608 | 18 | PAL12L10 |
| HOST_IR3~ | U718 | 15 | LS241 |
| HOST_IR3~ | U608 | 17 | PAL12L10 |
| HOST_IR4~ | U608 | 16 | PAL12L10 |
| HOST_IR4~ | U718 | 17 | LS241 |

| | | | |
|---|---|---|---|
| HOST_PULSE | U703 | 11 | PAL14L8 |
| HOST_PULSE | U412 | 6 | LS138 |
| HOST_PULSE | U410 | 8 | S08 |
| IB_D~0 | U121 | 2 | LS240 |
| IB_D~1 | U121 | 4 | LS240 |
| IB_D~2 | U121 | 6 | LS240 |
| IB_D~3 | U121 | 8 | LS240 |
| IB_D~4 | U121 | 11 | LS240 |
| IB_D~5 | U121 | 13 | LS240 |
| IB_D~6 | U121 | 15 | LS240 |
| IB_D~7 | U121 | 17 | LS240 |
| IB_EOL~ | U615 | 8 | S240 |
| IB_RDY1~ | U713 | 2 | LS244 |
| IB_RDY1~ | U712 | 9 | LS240 |
| IB_RDY2~ | U713 | 4 | LS244 |
| IB_RDY2~ | U712 | 7 | LS240 |
| IB_RDY3~ | U712 | 5 | LS240 |
| IB_RDY3~ | U713 | 6 | LS244 |
| IB_SEL~ | U615 | 1 | S240 |
| IB_SEL~ | U121 | 19 | LS240 |
| IB_SEL~ | U411 | 5 | LS139 |
| IB_SHIFT1~ | U615 | 2 | S240 |
| IB_SHIFT2~ | U615 | 4 | S240 |
| IB_SHIFT3~ | U615 | 6 | S240 |
| IF1_O0 | U224 | 13 | 67401 |
| IF1_O0 | U113 | 2 | LS244 |
| IF1_O1 | U224 | 12 | 67401 |
| IF1_O1 | U113 | 4 | LS244 |
| IF1_O2 | U224 | 11 | 67401 |
| IF1_O2 | U113 | 6 | LS244 |
| IF1_O3 | U224 | 10 | 67401 |
| IF1_O3 | U113 | 8 | LS244 |
| IF1_O4 | U113 | 11 | LS244 |
| IF1_O4 | U122 | 13 | 67401 |
| IF1_O5 | U122 | 12 | 67401 |
| IF1_O5 | U113 | 13 | LS244 |
| IF1_O6 | U122 | 11 | 67401 |
| IF1_O6 | U113 | 15 | LS244 |
| IF1_O7 | U122 | 10 | 67401 |
| IF1_O7 | U113 | 17 | LS244 |
| IF2_O0 | U223 | 13 | 67401 |
| IF2_O0 | U213 | 2 | LS244 |
| IF2_O1 | U223 | 12 | 67401 |
| IF2_O1 | U213 | 4 | LS244 |
| IF2_O2 | U223 | 11 | 67401 |
| IF2_O2 | U213 | 6 | LS244 |
| IF2_O3 | U223 | 10 | 67401 |
| IF2_O3 | U213 | 8 | LS244 |
| IF2_O4 | U213 | 11 | LS244 |
| IF2_O4 | U124 | 13 | 67401 |
| IF2_O5 | U124 | 12 | 67401 |
| IF2_O5 | U213 | 13 | LS244 |
| IF2_O6 | U124 | 11 | 67401 |
| IF2_O6 | U213 | 15 | LS244 |
| IF2_O7 | U124 | 10 | 67401 |
| IF2_O7 | U213 | 17 | LS244 |
| IF3_O0 | U222 | 13 | 67401 |
| IF3_O0 | U112 | 2 | LS244 |
| IF3_O1 | U222 | 12 | 67401 |

| | | | |
|---|---|---|---|
| IF3_O1 | U112 | 4 | LS244 |
| IF3_O2 | U222 | 11 | 67401 |
| IF3_O2 | U112 | 6 | LS244 |
| IF3_O3 | U222 | 10 | 67401 |
| IF3_O3 | U112 | 8 | LS244 |
| IF3_O4 | U112 | 11 | LS244 |
| IF3_O4 | U123 | 13 | 67401 |
| IF3_O5 | U123 | 12 | 67401 |
| IF3_O5 | U112 | 13 | LS244 |
| IF3_O6 | U123 | 11 | 67401 |
| IF3_O6 | U112 | 15 | LS244 |
| IF3_O7 | U123 | 10 | 67401 |
| IF3_O7 | U112 | 17 | LS244 |
| IFD0 | U118 | 18 | LS244 |
| IFD0 | U223 | 4 | 67401 |
| IFD1 | U118 | 16 | LS244 |
| IFD1 | U223 | 5 | 67401 |
| IFD2 | U118 | 14 | LS244 |
| IFD2 | U223 | 6 | 67401 |
| IFD3 | U118 | 12 | LS244 |
| IFD3 | U223 | 7 | 67401 |
| IFD4 | U122 | 4 | 67401 |
| IFD4 | U118 | 9 | LS244 |
| IFD5 | U122 | 5 | 67401 |
| IFD5 | U118 | 7 | LS244 |
| IFD6 | U118 | 5 | LS244 |
| IFD6 | U122 | 6 | 67401 |
| IFD7 | U118 | 3 | LS244 |
| IFD7 | U122 | 7 | 67401 |
| INBUS_ACTIVE~ | U712 | 19 | LS240 |
| INBUS_ACTIVE~ | U208 | 7 | LS240 |
| INIT2~ | U218 | 1 | LS273 |
| INIT2~ | U410 | 11 | S08 |
| INIT2~ | U606 | 3 | LS11 |
| INIT~ | U707 | 17 | LS244 |
| INNER_POINT~ | U207 | 14 | LS244 |
| INNER_POINT~ | U314 | 16 | PAL20R8A |
| INNER_POINT~ | U417 | 9 | IMS1421 |
| IP_A0 | U417 | 16 | IMS1421 |
| IP_A0 | U216 | 18 | LS244 |
| IP_A0 | U215 | 2 | LS374 |
| IP_A10 | U207 | 5 | LS244 |
| IP_A10 | U211 | 6 | LS374 |
| IP_A10 | U417 | 7 | IMS1421 |
| IP_A11 | U207 | 3 | LS244 |
| IP_A1 | U216 | 16 | LS244 |
| IP_A1 | U417 | 17 | IMS1421 |
| IP_A11 | U417 | 8 | IMS1421 |
| IP_A11 | U211 | 9 | LS374 |
| IP_A1 | U215 | 5 | LS374 |
| IP_A2 | U216 | 14 | LS244 |
| IP_A2 | U417 | 18 | IMS1421 |
| IP_A2 | U215 | 6 | LS374 |
| IP_A3 | U216 | 12 | LS244 |
| IP_A3 | U417 | 19 | IMS1421 |
| IP_A3 | U215 | 9 | LS374 |
| IP_A4 | U417 | 1 | IMS1421 |
| IP_A4 | U215 | 12 | LS374 |
| IP_A4 | U216 | 9 | LS244 |

| | | | |
|---|---|---|---|
| IP_A5 | U215 | 15 | LS374 |
| IP_A5 | U417 | 2 | IMS1421 |
| IP_A5 | U216 | 7 | LS244 |
| IP_A6 | U215 | 16 | LS374 |
| IP_A6 | U417 | 3 | IMS1421 |
| IP_A6 | U216 | 5 | LS244 |
| IP_A7 | U215 | 19 | LS374 |
| IP_A7 | U216 | 3 | LS244 |
| IP_A7 | U417 | 4 | IMS1421 |
| IP_A8 | U211 | 2 | LS374 |
| IP_A8 | U417 | 5 | IMS1421 |
| IP_A8 | U207 | 9 | LS244 |
| IP_A9 | U211 | 5 | LS374 |
| IP_A9 | U417 | 6 | IMS1421 |
| IP_A9 | U207 | 7 | LS244 |
| IR1L | U711 | 2 | LS11 |
| IR1U | U711 | 13 | LS11 |
| IR1U | U122 | 2 | 67401 |
| IR1~ | U407 | 14 | S151 |
| IR1~ | U718 | 18 | LS241 |
| IR1~ | U718 | 9 | LS241 |
| IR2L | U223 | 2 | 67401 |
| IR2L | U711 | 3 | LS11 |
| IR2L | U711 | 4 | LS11 |
| IR2U | U124 | 2 | 67401 |
| IR2U | U711 | 5 | LS11 |
| IR2~ | U407 | 13 | S151 |
| IR2~ | U718 | 16 | LS241 |
| IR2~ | U718 | 7 | LS241 |
| IR3L | U410 | 1 | S08 |
| IR3L | U222 | 2 | 67401 |
| IR3U | U123 | 2 | 67401 |
| IR3~ | U407 | 12 | S151 |
| IR3~ | U718 | 14 | LS241 |
| IR3~ | U718 | 5 | LS241 |
| IR4~ | U718 | 12 | LS241 |
| IR4~ | U407 | 15 | S151 |
| IR4~ | U718 | 3 | LS241 |
| IREADY_OUT1~ | U712 | 18 | LS240 |
| IREADY_OUT1~ | U713 | 8 | LS244 |
| IREADY_OUT2~ | U713 | 11 | LS244 |
| IREADY_OUT2~ | U712 | 16 | LS240 |
| IREADY_OUT3~ | U713 | 13 | LS244 |
| IREADY_OUT3~ | U712 | 14 | LS240 |
| LD_PAR1~ | U719 | 1 | PAL20R4 |
| LD_PAR1~ | U218 | 11 | LS273 |
| LD_PAR1~ | U412 | 15 | LS138 |
| MB_A0 | U412 | 1 | LS138 |
| MB_A0 | U110 | 18 | LS240 |
| MB_A0 | U111 | 2 | LS244 |
| MB_A10 | U706 | 14 | LS240 |
| MB_A10 | U207 | 15 | LS244 |
| MB_A10 | U608 | 4 | PAL12L10 |
| MB_A11 | U608 | 1 | PAL12L10 |
| MB_A11 | U706 | 12 | LS240 |
| MB_A11 | U207 | 17 | LS244 |
| MB_A1 | U110 | 16 | LS240 |
| MB_A1 | U412 | 2 | LS138 |
| MB_A12 | U608 | 2 | PAL12L10 |

| | | | |
|---|---|---|---|
| MB¯A12 | U208 | 4 | LS240 |
| MB¯A12 | U207 | 6 | LS244 |
| MB¯A12 | U706 | 9 | LS240 |
| MB¯A13 | U703 | 1 | PAL14L8 |
| MB¯A13 | U706 | 7 | LS240 |
| MB¯A1 | U111 | 4 | LS244 |
| MB¯A14 | U703 | 2 | PAL14L8 |
| MB¯A14 | U706 | 5 | LS240 |
| MB¯A15 | U706 | 3 | LS240 |
| MB¯A16 | U702 | 18 | LS240 |
| MB¯A16 | U703 | 4 | PAL14L8 |
| MB¯A17 | U702 | 16 | LS240 |
| MB¯A17 | U703 | 5 | PAL14L8 |
| MB¯A18 | U702 | 14 | LS240 |
| MB¯A18 | U703 | 6 | PAL14L8 |
| MB¯A19 | U702 | 12 | LS240 |
| MB¯A19 | U703 | 7 | PAL14L8 |
| MB¯A20 | U703 | 8 | PAL14L8 |
| MB¯A20 | U702 | 9 | LS240 |
| MB¯A2 | U110 | 14 | LS240 |
| MB¯A21 | U702 | 7 | LS240 |
| MB¯A21 | U703 | 9 | PAL14L8 |
| MB¯A22 | U703 | 10 | PAL14L8 |
| MB¯A22 | U702 | 5 | LS240 |
| MB_A2 | U412 | 3 | LS138 |
| MB¯A2 | U111 | 6 | LS244 |
| MB¯A3 | U110 | 12 | LS240 |
| MB¯A3 | U720 | 3 | CRC |
| MB¯A3 | U111 | 8 | LS244 |
| MB¯A4 | U111 | 11 | LS244 |
| MB¯A4 | U720 | 4 | CRC |
| MB¯A4 | U110 | 9 | LS240 |
| MB¯A5 | U111 | 13 | LS244 |
| MB¯A5 | U110 | 7 | LS240 |
| MB¯A6 | U111 | 15 | LS244 |
| MB¯A6 | U110 | 5 | LS240 |
| MB¯A7 | U111 | 17 | LS244 |
| MB¯A7 | U110 | 3 | LS240 |
| MB¯A8 | U207 | 11 | LS244 |
| MB¯A8 | U706 | 18 | LS240 |
| MB¯A8 | U206 | 2 | LS241 |
| MB¯A8 | U608 | 7 | PAL12L10 |
| MB¯A9 | U207 | 13 | LS244 |
| MB¯A9 | U706 | 16 | LS240 |
| MB¯A9 | U608 | 3 | PAL12L10 |
| MB¯A9 | U206 | 4 | LS241 |
| MB¯D0 | U720 | 1 | CRC |
| MB¯D0 | U720 | 11 | CRC |
| MB¯D0 | U413 | 18 | LS245 |
| MB¯D0 | U116 | 2 | LS245 |
| MB¯D0 | U218 | 3 | LS273 |
| MB¯D10 | U721 | 14 | LS244 |
| MB¯D10 | U708 | 16 | LS640 |
| MB¯D10 | U719 | 4 | PAL20R4 |
| MB¯D11 | U721 | 12 | LS244 |
| MB¯D11 | U708 | 15 | LS640 |
| MB¯D11 | U719 | 5 | PAL20R4 |
| MB¯D1 | U217 | 16 | LS244 |
| MB¯D1 | U413 | 17 | LS245 |

| | | | |
|---|---|---|---|
| MB_D12 | U708 | 14 | LS640 |
| MB_D12 | U721 | 9 | LS244 |
| MB_D1 | U116 | 3 | LS245 |
| MB_D13 | U708 | 13 | LS640 |
| MB_D13 | U721 | 7 | LS244 |
| MB_D1 | U118 | 4 | LS244 |
| MB_D14 | U708 | 12 | LS640 |
| MB_D14 | U707 | 14 | LS244 |
| MB_D14 | U721 | 5 | LS244 |
| MB_D15 | U708 | 11 | LS640 |
| MB_D15 | U707 | 12 | LS244 |
| MB_D15 | U721 | 3 | LS244 |
| MB_D2 | U217 | 14 | LS244 |
| MB_D2 | U413 | 16 | LS245 |
| MB_D2 | U116 | 4 | LS245 |
| MB_D2 | U118 | 6 | LS244 |
| MB_D2 | U218 | 7 | LS273 |
| MB_D3 | U217 | 12 | LS244 |
| MB_D3 | U413 | 15 | LS245 |
| MB_D3 | U116 | 5 | LS245 |
| MB_D3 | U118 | 8 | LS244 |
| MB_D4 | U118 | 11 | LS244 |
| MB_D4 | U218 | 13 | LS273 |
| MB_D4 | U413 | 14 | LS245 |
| MB_D4 | U116 | 6 | LS245 |
| MB_D4 | U217 | 9 | LS244 |
| MB_D5 | U118 | 13 | LS244 |
| MB_D5 | U218 | 14 | LS273 |
| MB_D5 | U116 | 7 | LS245 |
| MB_D6 | U413 | 12 | LS245 |
| MB_D6 | U118 | 15 | LS244 |
| MB_D6 | U218 | 17 | LS273 |
| MB_D6 | U217 | 5 | LS244 |
| MB_D6 | U116 | 8 | LS245 |
| MB_D7 | U413 | 11 | LS245 |
| MB_D7 | U118 | 17 | LS244 |
| MB_D7 | U218 | 18 | LS273 |
| MB_D7 | U217 | 3 | LS244 |
| MB_D7 | U116 | 9 | LS245 |
| MB_D8 | U518 | 18 | LS245 |
| MB_D8 | U719 | 2 | PAL20R4 |
| MB_D9 | U707 | 16 | LS244 |
| MB_D9 | U518 | 17 | LS245 |
| MB_D9 | U719 | 3 | PAL20R4 |
| MB_EOL~ | U515 | 8 | LS240 |
| MB_EOL~ | U412 | 9 | LS138 |
| MB_SI1~ | U412 | 14 | LS138 |
| MB_SI1~ | U515 | 2 | LS240 |
| MB_SI2~ | U412 | 13 | LS138 |
| MB_SI2~ | U515 | 4 | LS240 |
| MB_SI3~ | U412 | 12 | LS138 |
| MB_SI3~ | U515 | 6 | LS240 |
| MRDC~ | U707 | 11 | LS244 |
| MRD~ | U116 | 1 | LS245 |
| MRD~ | U719 | 11 | PAL20R4 |
| MRD~ | U703 | 15 | PAL14L8 |
| MRD~ | U608 | 5 | PAL12L10 |
| MWR~ | U719 | 14 | PAL20R4 |
| MWR~ | U703 | 22 | PAL14L8 |

| | | | |
|---|---|---|---|
| MWR~ | U412 | 4 | LS138 |
| MWR~ | U608 | 6 | PAL12L10 |
| MWTC~ | U707 | 13 | LS244 |
| NXT_SHIFT1~ | U723 | 11 | LS244 |
| NXT_SHIFT1~ | U717 | 5 | S374 |
| NXT_SHIFT1~ | U719 | 6 | PAL20R4 |
| NXT_SHIFT2~ | U723 | 13 | LS244 |
| NXT_SHIFT2~ | U717 | 6 | S374 |
| NXT_SHIFT2~ | U719 | 7 | PAL20R4 |
| NXT_SHIFT3~ | U723 | 15 | LS244 |
| NXT_SHIFT3~ | U719 | 8 | PAL20R4 |
| NXT_SHIFT3~ | U717 | 9 | S374 |
| NXT_SHIFT4~ | U723 | 17 | LS244 |
| NXT_SHIFT4~ | U717 | 2 | S374 |
| NXT_SHIFT4~ | U719 | 9 | PAL20R4 |
| NXT_SI~ | U719 | 10 | PAL20R4 |
| NXT_SI~ | U716 | 11 | S244 |
| NXT_SI~ | U717 | 19 | S374 |
| OB0~ | U721 | 2 | LS244 |
| OB1~ | U721 | 4 | LS244 |
| OB1~ | U722 | 5 | S374 |
| OB2~ | U721 | 6 | LS244 |
| OB3~ | U721 | 8 | LS244 |
| OB3~ | U722 | 9 | S374 |
| OB4~ | U721 | 11 | LS244 |
| OB4~ | U722 | 12 | S374 |
| OB5~ | U721 | 13 | LS244 |
| OB5~ | U722 | 15 | S374 |
| OB6~ | U721 | 15 | LS244 |
| OB6~ | U722 | 16 | S374 |
| OB7~ | U721 | 17 | LS244 |
| OB7~ | U722 | 19 | S374 |
| OB_ENB~ | U722 | 1 | S374 |
| OB_ENB~ | U313 | 16 | S240 |
| OB_ENB~ | U716 | 19 | S244 |
| OB_ENB~ | U408 | 2 | LS32 |
| OB_EOL~ | U713 | 17 | LS244 |
| OB_EOL~ | U716 | 3 | S244 |
| OB_RDY~ | U716 | 4 | S244 |
| OB_SHIFT~ | U723 | 2 | LS244 |
| OB_SHIFT~ | U716 | 9 | S244 |
| OP_A0 | U212 | 18 | LS244 |
| OP_A0 | U315 | 20 | PAL20R4 |
| OP_A0 | U210 | 8 | 2018 |
| OP_A1 | U212 | 16 | LS244 |
| OP_A1 | U315 | 19 | PAL20R4 |
| OP_A1 | U210 | 7 | 2018 |
| OP_A2 | U212 | 14 | LS244 |
| OP_A2 | U315 | 18 | PAL20R4 |
| OP_A2 | U210 | 6 | 2018 |
| OP_A3 | U212 | 12 | LS244 |
| OP_A3 | U315 | 17 | PAL20R4 |
| OP_A3 | U210 | 5 | 2018 |
| OP_A4 | U314 | 22 | PAL20R8A |
| OP_A4 | U210 | 4 | 2018 |
| OP_A4 | U212 | 9 | LS244 |
| OP_A5 | U314 | 21 | PAL20R8A |
| OP_A5 | U210 | 3 | 2018 |
| OP_A5 | U212 | 7 | LS244 |

| | | | |
|---|---|---|---|
| OP_A6 | U210 | 2 | 2018 |
| OP_A6 | U314 | 20 | PAL20R8A |
| OP_A6 | U212 | 5 | LS244 |
| OP_A7 | U210 | 1 | 2018 |
| OP_A7 | U314 | 19 | PAL20R8A |
| OP_A7 | U212 | 3 | LS244 |
| OP_A8 | U207 | 18 | LS244 |
| OP_A8 | U210 | 23 | 2018 |
| OP_A9 | U207 | 16 | LS244 |
| OP_A9 | U314 | 17 | PAL20R8A |
| OP_A9 | U210 | 22 | 2018 |
| OR1L | U322 | 1 | LS30 |
| OR1L | U224 | 14 | 67401 |
| OR1U | U122 | 14 | 67401 |
| OR1U | U322 | 2 | LS30 |
| OR2L | U223 | 14 | 67401 |
| OR2L | U322 | 3 | LS30 |
| OR2U | U124 | 14 | 67401 |
| OR2U | U322 | 4 | LS30 |
| OR3L | U222 | 14 | 67401 |
| OR3L | U322 | 5 | LS30 |
| OR3U | U322 | 11 | LS30 |
| OR3U | U322 | 12 | LS30 |
| OR3U | U123 | 14 | 67401 |
| OR3U | U322 | 6 | LS30 |
| ORDY~ | U710 | 2 | LS74 |
| ORDY~ | U322 | 8 | LS30 |
| OUTER_POINT~ | U207 | 12 | LS244 |
| OUTER_POINT~ | U314 | 15 | PAL20R8A |
| OUTER_POINT~ | U210 | 18 | 2018 |
| OUT_0~ | U720 | 12 | CRC |
| OUT_0~ | U306 | 22 | PAL20R8A |
| OUT_0~ | U714 | 3 | S374 |
| OUT_1~ | U720 | 13 | CRC |
| OUT_1~ | U306 | 21 | PAL20R8A |
| OUT_1~ | U714 | 4 | S374 |
| OUT_2~ | U720 | 14 | CRC |
| OUT_2~ | U306 | 20 | PAL20R8A |
| OUT_2~ | U714 | 7 | S374 |
| OUT_3~ | U720 | 15 | CRC |
| OUT_3~ | U306 | 19 | PAL20R8A |
| OUT_3~ | U714 | 8 | S374 |
| OUT_4~ | U714 | 13 | S374 |
| OUT_4~ | U720 | 16 | CRC |
| OUT_4~ | U306 | 18 | PAL20R8A |
| OUT_5~ | U714 | 14 | S374 |
| OUT_5~ | U306 | 17 | PAL20R8A |
| OUT_6~ | U306 | 16 | PAL20R8A |
| OUT_6~ | U714 | 17 | S374 |
| OUT_6~ | U720 | 18 | CRC |
| OUT_7~ | U306 | 15 | PAL20R8A |
| OUT_7~ | U714 | 18 | S374 |
| OUT_7~ | U720 | 19 | CRC |
| INIT~ | | P1-16 | CONNECTOR |
| IB_D~2 | | P1-21 | CONNECTOR |
| MRDC~ | | P1-23 | CONNECTOR |
| MWTC~ | | P1-24 | CONNECTOR |
| XACK~ | | P1-27 | CONNECTOR |
| IB_D~6 | | P1-31 | CONNECTOR |

3D LUT

| Signal_name | Physical_location | Pin_number | Part_name |
|---|---|---|---|
| ADR16~ | | P1-34 | CONNECTOR |
| ADR17~ | | P1-36 | CONNECTOR |
| CCLK~ | | P1-37 | CONNECTOR |
| ADR18~ | | P1-38 | CONNECTOR |
| ADR19~ | | P1-40 | CONNECTOR |
| IB_D~7 | | P1-41 | CONNECTOR |
| ADR14~ | | P1-53 | CONNECTOR |
| ADR15~ | | P1-54 | CONNECTOR |
| ADR12~ | | P1-55 | CONNECTOR |
| ADR13~ | | P1-56 | CONNECTOR |
| ADR10~ | | P1-57 | CONNECTOR |
| ADR11~ | | P1-58 | CONNECTOR |
| ADR8~ | | P1-59 | CONNECTOR |
| ADR9~ | | P1-60 | CONNECTOR |
| IB_EOL~ | | P1-61 | CONNECTOR |
| ADR6~ | | P1-63 | CONNECTOR |
| ADR7~ | | P1-64 | CONNECTOR |
| ADR4~ | | P1-65 | CONNECTOR |
| ADR5~ | | P1-66 | CONNECTOR |
| ADR2~ | | P1-67 | CONNECTOR |
| ADR3~ | | P1-68 | CONNECTOR |
| ADR1~ | | P1-70 | CONNECTOR |
| OB_EOL~ | | P1-71 | CONNECTOR |
| DATE~ | | P1-73 | CONNECTOR |
| DATF~ | | P1-74 | CONNECTOR |
| DATC~ | | P1-75 | CONNECTOR |
| DATD~ | | P1-76 | CONNECTOR |
| DATA~ | | P1-77 | CONNECTOR |
| DATB~ | | P1-78 | CONNECTOR |
| DAT8~ | | P1-79 | CONNECTOR |
| DAT9~ | | P1-80 | CONNECTOR |
| DAT6~ | | P1-83 | CONNECTOR |
| DAT7~ | | P1-84 | CONNECTOR |
| DAT4~ | | P1-85 | CONNECTOR |
| DAT5~ | | P1-86 | CONNECTOR |
| DAT2~ | | P1-87 | CONNECTOR |
| DAT3~ | | P1-88 | CONNECTOR |
| DAT0~ | | P1-89 | CONNECTOR |
| DAT1~ | | P1-90 | CONNECTOR |
| OB_RDY~ | | P1-91 | CONNECTOR |
| IB_D~0 | | P2-1 | CONNECTOR |
| IB_D~5 | | P2-100 | CONNECTOR |
| IB_SHIFT1~ | | P2-15 | CONNECTOR |
| IB_SHIFT2~ | | P2-17 | CONNECTOR |
| IB_SHIFT3~ | | P2-19 | CONNECTOR |
| IB_D~1 | | P2-21 | CONNECTOR |
| IB_RDY1~ | | P2-23 | CONNECTOR |
| IB_RDY2~ | | P2-25 | CONNECTOR |
| IB_RDY3~ | | P2-27 | CONNECTOR |
| DOUT_0~ | | P2-30 | CONNECTOR |
| PC_D~0 | | P2-31 | CONNECTOR |
| PC_D~1 | | P2-33 | CONNECTOR |
| DOUT_1~ | | P2-34 | CONNECTOR |

| | | | |
|---|---|---|---|
| PC_D~2 | | P2-35 | CONNECTOR |
| DOUT_2~ | | P2-36 | CONNECTOR |
| PC_D~3 | | P2-37 | CONNECTOR |
| DOUT_3~ | | P2-38 | CONNECTOR |
| PC_D~4 | | P2-39 | CONNECTOR |
| DOUT_4~ | | P2-40 | CONNECTOR |
| PC_D~5 | | P2-41 | CONNECTOR |
| PC_D~6 | | P2-43 | CONNECTOR |
| DOUT_5~ | | P2-44 | CONNECTOR |
| PC_D~7 | | P2-45 | CONNECTOR |
| DOUT_6~ | | P2-46 | CONNECTOR |
| DOUT_7~ | | P2-48 | CONNECTOR |
| IREADY_OUT1~ | | P2-53 | CONNECTOR |
| READY_IN1~ | | P2-54 | CONNECTOR |
| IREADY_OUT2~ | | P2-55 | CONNECTOR |
| READY_IN2~ | | P2-56 | CONNECTOR |
| IREADY_OUT3~ | | P2-57 | CONNECTOR |
| READY_IN3~ | | P2-58 | CONNECTOR |
| READY_IN4~ | | P2-60 | CONNECTOR |
| PC_SHIFT1~ | | P2-63 | CONNECTOR |
| NXT_SHIFT1~ | | P2-64 | CONNECTOR |
| PC_SHIFT2~ | | P2-65 | CONNECTOR |
| NXT_SHIFT2~ | | P2-66 | CONNECTOR |
| PC_SHIFT3~ | | P2-67 | CONNECTOR |
| NXT_SHIFT3~ | | P2-68 | CONNECTOR |
| NXT_SHIFT4~ | | P2-70 | CONNECTOR |
| PC_EOL~ | | P2-73 | CONNECTOR |
| EOL_OUT~ | | P2-74 | CONNECTOR |
| ADR23~ | | P2-76 | CONNECTOR |
| ADR21~ | | P2-78 | CONNECTOR |
| ADR22~ | | P2-81 | CONNECTOR |
| ADR20~ | | P2-83 | CONNECTOR |
| OB1~ | | P2-84 | CONNECTOR |
| OB0~ | | P2-85 | CONNECTOR |
| OB3~ | | P2-86 | CONNECTOR |
| OB2~ | | P2-87 | CONNECTOR |
| OB5~ | | P2-88 | CONNECTOR |
| OB4~ | | P2-89 | CONNECTOR |
| OB7~ | | P2-90 | CONNECTOR |
| OB6~ | | P2-91 | CONNECTOR |
| OB_SHIFT~ | | P2-97 | CONNECTOR |
| IB_D~4 | | P2-98 | CONNECTOR |
| IB_D~3 | | P2-99 | CONNECTOR |
| PC_D~0 | U618 | 2 | LS240 |
| PC_D~1 | U618 | 4 | LS240 |
| PC_D~2 | U618 | 6 | LS240 |
| PC_D~3 | U618 | 8 | LS240 |
| PC_D~4 | U618 | 11 | LS240 |
| PC_D~5 | U618 | 13 | LS240 |
| PC_D~6 | U618 | 15 | LS240 |
| PC_D~7 | U618 | 17 | LS240 |
| PC_EOL~ | U515 | 17 | LS240 |
| PC_SHIFT1~ | U515 | 11 | LS240 |
| PC_SHIFT2~ | U515 | 13 | LS240 |
| PC_SHIFT3~ | U515 | 15 | LS240 |
| PD1~ | U717 | 1 | S374 |
| PD1~ | U719 | 13 | PAL20R4 |
| PD1~ | U716 | 18 | S244 |

| | | | |
|---|---|---|---|
| PD1~ | U615 | 19 | S240 |
| PD2~ | U203 | 1 | LS374 |
| PD2~ | U313 | 12 | S240 |
| PD2~ | U114 | 13 | PAL20R8A |
| PD2~ | U110 | 19 | LS240 |
| PD2~ | U401 | 20 | 2764 |
| PD2~ | U401 | 22 | 2764 |
| PL1_CLK1 | U514 | 1 | S20 |
| PL1_CLK1 | U513 | 18 | S244 |
| PL1_CLK1 | U414 | 38 | PGA8034 |
| PL1_CLK1 | U414 | 44 | PGA8034 |
| PL1_CLK1 | U414 | 45 | PGA8034 |
| PL1_CLK2 | U304 | 1 | PAL20R8A |
| PL1_CLK2 | U513 | 16 | S244 |
| PL1_CLK2 | U514 | 2 | S20 |
| PL1_CLK2 | U317 | 38 | PGA8034 |
| PL1_CLK2 | U317 | 44 | PGA8034 |
| PL1_CLK2 | U317 | 45 | PGA8034 |
| PL1_CLK3 | U305 | 1 | PAL20R8A |
| PL1_CLK3 | U513 | 14 | S244 |
| PL1_CLK3 | U617 | 38 | PGA8034 |
| PL1_CLK3 | U514 | 4 | S20 |
| PL1_CLK3 | U617 | 44 | PGA8034 |
| PL1_CLK3 | U617 | 45 | PGA8034 |
| PL1_CLK4 | U303 | 1 | PAL20R8A |
| PL1_CLK4 | U513 | 12 | S244 |
| PL1_CLK4 | U517 | 38 | PGA8034 |
| PL1_CLK4 | U517 | 44 | PGA8034 |
| PL1_CLK4 | U517 | 45 | PGA8034 |
| PL1_CLK4 | U514 | 5 | S20 |
| PL2_CLK | U114 | 1 | PAL20R8A |
| PL2_CLK | U215 | 11 | LS374 |
| PL2_CLK | U313 | 18 | S240 |
| PL_CLK | U615 | 11 | S240 |
| PL_CLK | U513 | 2 | S244 |
| PL_CLK | U513 | 4 | S244 |
| PL_CLK | U513 | 6 | S244 |
| PL_CLK | U513 | 8 | S244 |
| PL_CLK~ | U717 | 11 | S374 |
| PL_CLK~ | U615 | 9 | S240 |
| PM1_ACCESS~ | U413 | 19 | LS245 |
| PM1_WR~ | U413 | 1 | LS245 |
| PM1_WR~ | U417 | 11 | IMS1421 |
| PM1_WR~ | U703 | 18 | PAL14L8 |
| PM1_WR~ | U210 | 21 | 2018 |
| PM2_ACCESS~ | U704 | 18 | PAL14L8 |
| PM2_ACCESS~ | U316 | 19 | LS245 |
| PM2_WR~ | U316 | 1 | LS245 |
| PM2_WR~ | U418 | 11 | IMS1421 |
| PM2_WR~ | U703 | 17 | PAL14L8 |
| PM2_WR~ | U219 | 21 | 2018 |
| PM3_ACCESS~ | U704 | 17 | PAL14L8 |
| PM3_ACCESS~ | U616 | 19 | LS245 |
| PM3_WR~ | U616 | 1 | LS245 |
| PM3_WR~ | U619 | 11 | IMS1421 |
| PM3_WR~ | U703 | 16 | PAL14L8 |
| PM3_WR~ | U221 | 21 | 2018 |
| PM4_ACCESS~ | U704 | 16 | PAL14L8 |
| PM4_ACCESS~ | U516 | 19 | LS245 |

| | | | |
|---|---|---|---|
| PM4_WR~ | U516 | 1 | LS245 |
| PM4_WR~ | U521 | 11 | IMS1421 |
| PM4_WR~ | U703 | 20 | PAL14L8 |
| PM4_WR~ | U220 | 21 | 2018 |
| PM_ACCESS~ | U608 | 11 | PAL12L10 |
| PM_ACCESS~ | U704 | 15 | PAL14L8 |
| PM_ACCESS~ | U606 | 2 | LS11 |
| PM_A_ACCESS | U215 | 1 | LS374 |
| PM_A_ACCESS | U315 | 13 | PAL20R4 |
| PM_A_ACCESS | U208 | 5 | LS240 |
| PM_A_ACCESS~ | U212 | 1 | LS244 |
| PM_A_ACCESS~ | U208 | 15 | LS240 |
| PM_A_ACCESS~ | U212 | 19 | LS244 |
| PM_A_ACCESS~ | U704 | 22 | PAL14L8 |
| PM_OE~ | U608 | 14 | PAL12L10 |
| PM_OE~ | U210 | 20 | 2018 |
| PREV_CARD_SEL~ | U618 | 1 | LS240 |
| PREV_CARD_SEL~ | U515 | 19 | LS240 |
| PREV_CARD_SEL~ | U411 | 4 | LS139 |
| PU1 | U710 | 1 | LS74 |
| PU1 | U710 | 4 | LS74 |
| PU1 | U705 | 6 | 316A102 1K |
| PU2 | U705 | 1 | 316A102 1K |
| PU2 | U108 | 2 | LS164 |
| PU2 | U311 | 5 | S381 |
| PU2 | U311 | 6 | S381 |
| PU3 | U511 | 14 | S112 |
| PU3 | U511 | 2 | S112 |
| PU3 | U511 | 3 | S112 |
| PU3 | U612 | 6 | LS138 |
| PU4 | U401 | 27 | 2764 |
| PU4 | U705 | 4 | 316A102 1K |
| PU5 | U414 | 42 | PGA8034 |
| PU5 | U414 | 49 | PGA8034 |
| PU5 | U705 | 5 | 316A102 1K |
| PVAL1_0 | U417 | 15 | IMS1421 |
| PVAL1_0 | U413 | 2 | LS245 |
| PVAL1_0 | U414 | 3 | PGA8034 |
| PVAL1_0 | U319 | 9 | 2018 |
| PVAL1_1 | U319 | 10 | 2018 |
| PVAL1_1 | U417 | 14 | IMS1421 |
| PVAL1_1 | U413 | 3 | LS245 |
| PVAL1_1 | U414 | 4 | PGA8034 |
| PVAL1_2 | U319 | 11 | 2018 |
| PVAL1_2 | U417 | 13 | IMS1421 |
| PVAL1_2 | U413 | 4 | LS245 |
| PVAL1_2 | U414 | 5 | PGA8034 |
| PVAL1_3 | U417 | 12 | IMS1421 |
| PVAL1_3 | U319 | 13 | 2018 |
| PVAL1_3 | U413 | 5 | LS245 |
| PVAL1_3 | U414 | 6 | PGA8034 |
| PVAL1_4 | U319 | 14 | 2018 |
| PVAL1_4 | U519 | 15 | IMS1421 |
| PVAL1_4 | U413 | 6 | LS245 |
| PVAL1_4 | U414 | 7 | PGA8034 |
| PVAL1_5 | U519 | 14 | IMS1421 |
| PVAL1_5 | U319 | 15 | 2018 |
| PVAL1_5 | U413 | 7 | LS245 |
| PVAL1_5 | U414 | 9 | PGA8034 |

| | | | |
|---|---|---|---|
| PVAL1_6 | U414 | 10 | PGA8034 |
| PVAL1_6 | U519 | 13 | IMS1421 |
| PVAL1_6 | U319 | 16 | 2018 |
| PVAL1_6 | U413 | 8 | LS245 |
| PVAL1_7 | U414 | 11 | PGA8034 |
| PVAL1_7 | U519 | 12 | IMS1421 |
| PVAL1_7 | U319 | 17 | 2018 |
| PVAL1_7 | U413 | 9 | LS245 |
| PVAL1_8 | U414 | 12 | PGA8034 |
| PVAL1_8 | U522 | 15 | IMS1421 |
| PVAL1_8 | U518 | 2 | LS245 |
| PVAL1_8 | U210 | 9 | 2018 |
| PVAL1_9 | U210 | 10 | 2018 |
| PVAL1_9 | U414 | 13 | PGA8034 |
| PVAL1_9 | U522 | 14 | IMS1421 |
| PVAL1_9 | U414 | 15 | PGA8034 |
| PVAL1_9 | U414 | 16 | PGA8034 |
| PVAL1_9 | U518 | 3 | LS245 |
| PVAL2_0 | U418 | 15 | IMS1421 |
| PVAL2_0 | U316 | 2 | LS245 |
| PVAL2_0 | U317 | 3 | PGA8034 |
| PVAL2_0 | U321 | 9 | 2018 |
| PVAL2_1 | U321 | 10 | 2018 |
| PVAL2_1 | U418 | 14 | IMS1421 |
| PVAL2_1 | U316 | 3 | LS245 |
| PVAL2_1 | U317 | 4 | PGA8034 |
| PVAL2_2 | U321 | 11 | 2018 |
| PVAL2_2 | U418 | 13 | IMS1421 |
| PVAL2_2 | U316 | 4 | LS245 |
| PVAL2_2 | U317 | 5 | PGA8034 |
| PVAL2_3 | U418 | 12 | IMS1421 |
| PVAL2_3 | U321 | 13 | 2018 |
| PVAL2_3 | U316 | 5 | LS245 |
| PVAL2_3 | U317 | 6 | PGA8034 |
| PVAL2_4 | U321 | 14 | 2018 |
| PVAL2_4 | U419 | 15 | IMS1421 |
| PVAL2_4 | U316 | 6 | LS245 |
| PVAL2_4 | U317 | 7 | PGA8034 |
| PVAL2_5 | U419 | 14 | IMS1421 |
| PVAL2_5 | U321 | 15 | 2018 |
| PVAL2_5 | U316 | 7 | LS245 |
| PVAL2_5 | U317 | 9 | PGA8034 |
| PVAL2_6 | U317 | 10 | PGA8034 |
| PVAL2_6 | U419 | 13 | IMS1421 |
| PVAL2_6 | U321 | 16 | 2018 |
| PVAL2_6 | U316 | 8 | LS245 |
| PVAL2_7 | U317 | 11 | PGA8034 |
| PVAL2_7 | U419 | 12 | IMS1421 |
| PVAL2_7 | U321 | 17 | 2018 |
| PVAL2_7 | U316 | 9 | LS245 |
| PVAL2_8 | U317 | 12 | PGA8034 |
| PVAL2_8 | U620 | 15 | IMS1421 |
| PVAL2_8 | U117 | 2 | LS245 |
| PVAL2_8 | U219 | 9 | 2018 |
| PVAL2_9 | U219 | 10 | 2018 |
| PVAL2_9 | U317 | 13 | PGA8034 |
| PVAL2_9 | U620 | 14 | IMS1421 |
| PVAL2_9 | U317 | 15 | PGA8034 |
| PVAL2_9 | U317 | 16 | PGA8034 |

| | | | |
|---|---|---|---|
| PVAL2‾9 | U117 | 3 | LS245 |
| PVAL3‾0 | U619 | 15 | IMS1421 |
| PVAL3‾0 | U616 | 2 | LS245 |
| PVAL3‾0 | U617 | 3 | PGA8034 |
| PVAL3‾0 | U607 | 9 | 2018 |
| PVAL3‾1 | U607 | 10 | 2018 |
| PVAL3‾1 | U619 | 14 | IMS1421 |
| PVAL3‾1 | U616 | 3 | LS245 |
| PVAL3‾1 | U617 | 4 | PGA8034 |
| PVAL3‾2 | U607 | 11 | 2018 |
| PVAL3‾2 | U619 | 13 | IMS1421 |
| PVAL3‾2 | U616 | 4 | LS245 |
| PVAL3‾2 | U617 | 5 | PGA8034 |
| PVAL3‾3 | U619 | 12 | IMS1421 |
| PVAL3‾3 | U607 | 13 | 2018 |
| PVAL3‾3 | U616 | 5 | LS245 |
| PVAL3‾3 | U617 | 6 | PGA8034 |
| PVAL3‾4 | U607 | 14 | 2018 |
| PVAL3‾4 | U416 | 15 | IMS1421 |
| PVAL3‾4 | U616 | 6 | LS245 |
| PVAL3‾4 | U617 | 7 | PGA8034 |
| PVAL3‾5 | U416 | 14 | IMS1421 |
| PVAL3‾5 | U607 | 15 | 2018 |
| PVAL3‾5 | U616 | 7 | LS245 |
| PVAL3‾5 | U617 | 9 | PGA8034 |
| PVAL3‾6 | U617 | 10 | PGA8034 |
| PVAL3‾6 | U416 | 13 | IMS1421 |
| PVAL3‾6 | U607 | 16 | 2018 |
| PVAL3‾6 | U616 | 8 | LS245 |
| PVAL3‾7 | U617 | 11 | PGA8034 |
| PVAL3‾7 | U416 | 12 | IMS1421 |
| PVAL3‾7 | U607 | 17 | 2018 |
| PVAL3‾7 | U616 | 9 | LS245 |
| PVAL3‾8 | U617 | 12 | PGA8034 |
| PVAL3‾8 | U621 | 15 | IMS1421 |
| PVAL3‾8 | U318 | 2 | LS245 |
| PVAL3‾8 | U221 | 9 | 2018 |
| PVAL3‾9 | U221 | 10 | 2018 |
| PVAL3‾9 | U617 | 13 | PGA8034 |
| PVAL3‾9 | U621 | 14 | IMS1421 |
| PVAL3‾9 | U617 | 15 | PGA8034 |
| PVAL3‾9 | U617 | 16 | PGA8034 |
| PVAL3‾9 | U318 | 3 | LS245 |
| PVAL4‾0 | U521 | 15 | IMS1421 |
| PVAL4‾0 | U516 | 2 | LS245 |
| PVAL4‾0 | U517 | 3 | PGA8034 |
| PVAL4‾0 | U320 | 9 | 2018 |
| PVAL4‾1 | U320 | 10 | 2018 |
| PVAL4‾1 | U521 | 14 | IMS1421 |
| PVAL4‾1 | U516 | 3 | LS245 |
| PVAL4‾1 | U517 | 4 | PGA8034 |
| PVAL4‾2 | U320 | 11 | 2018 |
| PVAL4‾2 | U521 | 13 | IMS1421 |
| PVAL4‾2 | U516 | 4 | LS245 |
| PVAL4‾2 | U517 | 5 | PGA8034 |
| PVAL4‾3 | U521 | 12 | IMS1421 |
| PVAL4‾3 | U320 | 13 | 2018 |
| PVAL4‾3 | U516 | 5 | LS245 |
| PVAL4‾3 | U517 | 6 | PGA8034 |

| | | | |
|---|---|---|---|
| PVAL4_4 | U320 | 14 | 2018 |
| PVAL4_4 | U520 | 15 | IMS1421 |
| PVAL4_4 | U516 | 6 | LS245 |
| PVAL4_4 | U517 | 7 | PGA8034 |
| PVAL4_5 | U520 | 14 | IMS1421 |
| PVAL4_5 | U320 | 15 | 2018 |
| PVAL4_5 | U516 | 7 | LS245 |
| PVAL4_5 | U517 | 9 | PGA8034 |
| PVAL4_6 | U517 | 10 | PGA8034 |
| PVAL4_6 | U520 | 13 | IMS1421 |
| PVAL4_6 | U320 | 16 | 2018 |
| PVAL4_6 | U516 | 8 | LS245 |
| PVAL4_7 | U517 | 11 | PGA8034 |
| PVAL4_7 | U520 | 12 | IMS1421 |
| PVAL4_7 | U320 | 17 | 2018 |
| PVAL4_7 | U516 | 9 | LS245 |
| PVAL4_8 | U517 | 12 | PGA8034 |
| PVAL4_8 | U622 | 15 | IMS1421 |
| PVAL4_8 | U415 | 2 | LS245 |
| PVAL4_8 | U220 | 9 | 2018 |
| PVAL4_9 | U220 | 10 | 2018 |
| PVAL4_9 | U517 | 13 | PGA8034 |
| PVAL4_9 | U622 | 14 | IMS1421 |
| PVAL4_9 | U517 | 15 | PGA8034 |
| PVAL4_9 | U517 | 16 | PGA8034 |
| PVAL4_9 | U415 | 3 | LS245 |
| RDBK1~ | U713 | 1 | LS244 |
| RDBK1~ | U713 | 19 | LS244 |
| RDBK1~ | U608 | 22 | PAL12L10 |
| RDBK2~ | U715 | 1 | LS244 |
| RDBK2~ | U715 | 19 | LS244 |
| RDBK2~ | U608 | 21 | PAL12L10 |
| RDBK3~ | U217 | 1 | LS244 |
| RDBK3~ | U217 | 19 | LS244 |
| RDBK3~ | U608 | 20 | PAL12L10 |
| RD_SEP1~ | U113 | 1 | LS244 |
| RD_SEP1~ | U206 | 13 | LS241 |
| RD_SEP1~ | U113 | 19 | LS244 |
| RD_SEP1~ | U109 | 9 | LS279 |
| RD_SEP2~ | U213 | 1 | LS244 |
| RD_SEP2~ | U206 | 11 | LS241 |
| RD_SEP2~ | U213 | 19 | LS244 |
| RD_SEP2~ | U209 | 4 | LS279 |
| RD_SEP3~ | U112 | 1 | LS244 |
| RD_SEP3~ | U112 | 19 | LS244 |
| RD_SEP3~ | U209 | 9 | LS279 |
| READY_IN1~ | U718 | 2 | LS241 |
| READY_IN2~ | U718 | 4 | LS241 |
| READY_IN3~ | U718 | 6 | LS241 |
| READY_IN4~ | U718 | 8 | LS241 |
| RUN | U609 | 14 | S374 |
| RUN | U218 | 15 | LS273 |
| SA0 | U510 | 1 | 2729 |
| SA0 | U610 | 2 | LS273 |
| SA1 | U510 | 2 | 2729 |
| SA1 | U610 | 5 | LS273 |
| SA2 | U510 | 3 | 2729 |
| SA2 | U610 | 6 | LS273 |
| SA3 | U510 | 4 | 2729 |

| | | | |
|---|---|---|---|
| SA3 | U610 | 9 | LS273 |
| SA4 | U610 | 12 | LS273 |
| SA4 | U510 | 5 | 2729 |
| SA5 | U610 | 15 | LS273 |
| SA5 | U510 | 16 | 2729 |
| SA6 | U610 | 16 | LS273 |
| SA6 | U510 | 17 | 2729 |
| SEND_EOL~ | U509 | 11 | 2729 |
| SEND_EOL~ | U609 | 8 | S374 |
| SEND_SI~ | U614 | 6 | PAL16R8 |
| SEND_SI~ | U609 | 7 | S374 |
| SEND_SI~ | U509 | 9 | 2729 |
| SEOL_OUT~ | U716 | 17 | S244 |
| SEOL_OUT~ | U716 | 6 | S244 |
| SEOL_OUT~ | U609 | 9 | S374 |
| SEP1_D0 | U401 | 10 | 2764 |
| SEP1_D0 | U203 | 2 | LS374 |
| SEP1_D1 | U203 | 5 | LS374 |
| SEP1_D1 | U401 | 9 | 2764 |
| SEP1_D2 | U203 | 6 | LS374 |
| SEP1_D2 | U401 | 8 | 2764 |
| SEP1_D3 | U401 | 7 | 2764 |
| SEP1_D3 | U203 | 9 | LS374 |
| SEP1_D4 | U203 | 12 | LS374 |
| SEP1_D4 | U301 | 3 | LS374 |
| SEP1_D5 | U203 | 15 | LS374 |
| SEP1_D5 | U301 | 4 | LS374 |
| SEP1_D6 | U203 | 16 | LS374 |
| SEP1_D6 | U301 | 7 | LS374 |
| SEP1_D7 | U203 | 19 | LS374 |
| SEP1_D7 | U301 | 8 | LS374 |
| SEP1_SEL~ | U306 | 13 | PAL20R8A |
| SEP1_SEL~ | U614 | 14 | PAL16R8 |
| SEP2_D0 | U201 | 2 | LS374 |
| SEP2_D0 | U401 | 6 | 2764 |
| SEP2_D1 | U201 | 5 | LS374 |
| SEP2_D2 | U401 | 4 | 2764 |
| SEP2_D2 | U201 | 6 | LS374 |
| SEP2_D3 | U401 | 3 | 2764 |
| SEP2_D3 | U201 | 9 | LS374 |
| SEP2_D4 | U201 | 12 | LS374 |
| SEP2_D4 | U301 | 13 | LS374 |
| SEP2_D5 | U301 | 14 | LS374 |
| SEP2_D5 | U201 | 15 | LS374 |
| SEP2_D6 | U201 | 16 | LS374 |
| SEP2_D6 | U301 | 17 | LS374 |
| SEP2_D7 | U301 | 18 | LS374 |
| SEP2_D7 | U201 | 19 | LS374 |
| SEP2_SEL~ | U614 | 13 | PAL16R8 |
| SEP3_D0 | U114 | 22 | PAL20R8A |
| SEP3_D0 | U401 | 25 | 2764 |
| SEP3_D1 | U114 | 21 | PAL20R8A |
| SEP3_D1 | U401 | 24 | 2764 |
| SEP3_D2 | U114 | 20 | PAL20R8A |
| SEP3_D2 | U401 | 21 | 2764 |
| SEP3_D3 | U114 | 19 | PAL20R8A |
| SEP3_D3 | U401 | 23 | 2764 |
| SEP3_D4 | U114 | 18 | PAL20R8A |

| | | | |
|---|---|---|---|
| SEP3_D4 | U312 | 3 | LS374 |
| SEP3_D5 | U114 | 17 | PAL20R8A |
| SEP3_D5 | U312 | 4 | LS374 |
| SEP3_D6 | U114 | 16 | PAL20R8A |
| SEP3_D6 | U312 | 7 | LS374 |
| SEP3_D7 | U114 | 15 | PAL20R8A |
| SEP3_D7 | U312 | 8 | LS374 |
| SEP3_SEL~ | U614 | 12 | PAL16R8 |
| SEP3_SEL~ | U305 | 13 | PAL20R8A |
| SEP4_SEL~ | U303 | 13 | PAL20R8A |
| SEP4_SEL~ | U614 | 15 | PAL16R8 |
| SEQ0 | U310 | 14 | LS153 |
| SEQ0 | U214 | 4 | S381 |
| SEQ0 | U613 | 5 | S374 |
| SEQ1 | U310 | 2 | LS153 |
| SEQ1 | U302 | 4 | S381 |
| SEQ1 | U613 | 6 | S374 |
| SEQ1_F | U407 | 11 | S151 |
| SEQ1_F | U406 | 2 | F374 |
| SEQ2 | U309 | 1 | LS374 |
| SEQ2 | U311 | 4 | S381 |
| SEQ2 | U723 | 8 | LS244 |
| SEQ2 | U613 | 9 | S374 |
| SEQ2_F | U407 | 10 | S151 |
| SEQ2_F | U406 | 5 | F374 |
| SEQ2~ | U308 | 1 | LS374 |
| SEQ2~ | U613 | 12 | S374 |
| SI1 | U515 | 18 | LS240 |
| SI1 | U122 | 3 | 67401 |
| SI1 | U515 | 9 | LS240 |
| SI2 | U515 | 16 | LS240 |
| SI2 | U223 | 3 | 67401 |
| SI2 | U515 | 7 | LS240 |
| SI3 | U515 | 14 | LS240 |
| SI3 | U222 | 3 | 67401 |
| SI3 | U515 | 5 | LS240 |
| SO | U122 | 15 | 67401 |
| SO | U610 | 19 | LS273 |
| SO | U707 | 6 | LS244 |
| STEP_MODE~ | U511 | 10 | S112 |
| STEP_MODE~ | U313 | 14 | S240 |
| STEP_MODE~ | U511 | 15 | S112 |
| STRT_ENB~ | U609 | 12 | S374 |
| STRT_ENB~ | U209 | 15 | LS279 |
| SYNC_RUN | U610 | 1 | LS273 |
| SYNC_RUN | U609 | 15 | S374 |
| SYNC_RUN | U606 | 5 | LS11 |
| SYNC_SI~ | U717 | 18 | S374 |
| SYNC_SI~ | U609 | 6 | S374 |
| T0 | U507 | 11 | LS374 |
| T0 | U208 | 14 | LS240 |
| T0 | U208 | 8 | LS240 |
| T0~ | U605 | 1 | LS374 |
| T0~ | U109 | 10 | LS279 |
| T0~ | U209 | 12 | LS279 |
| T0~ | U611 | 2 | S374 |
| T0~ | U710 | 3 | LS74 |
| T0~ | U414 | 46 | PGA8034 |
| T0~ | U208 | 6 | LS240 |

| | | | |
|---|---|---|---|
| T1~ | U502 | 1 | LS374 |
| T1~ | U306 | 11 | PAL20R8A |
| T1~ | U611 | 5 | S374 |
| T2~ | U204 | 1 | LS377 |
| T2~ | U508 | 11 | LS374 |
| T2~ | U611 | 6 | S374 |
| T3~ | U209 | 1 | LS279 |
| T3~ | U109 | 12 | LS279 |
| T3~ | U611 | 9 | S374 |
| T4~ | U603 | 1 | LS374 |
| T4~ | U611 | 12 | S374 |
| T4~ | U209 | 5 | LS279 |
| T5~ | U202 | 1 | LS377 |
| T5~ | U611 | 15 | S374 |
| T6~ | U604 | 1 | LS374 |
| T6~ | U209 | 10 | LS279 |
| T6~ | U301 | 11 | LS374 |
| T6~ | U611 | 16 | S374 |
| T6~ | U209 | 3 | LS279 |
| T7 | U414 | 48 | PGA8034 |
| T7 | U615 | 5 | S240 |
| T7~ | U507 | 1 | LS374 |
| T7~ | U203 | 11 | LS374 |
| T7~ | U615 | 15 | S240 |
| T7~ | U611 | 19 | S374 |
| T7~ | U114 | 9 | PAL20R8A |
| TEST | U718 | 1 | LS241 |
| TEST | U718 | 19 | LS241 |
| TEST | U208 | 3 | LS240 |
| TEST~ | U515 | 1 | LS240 |
| TEST~ | U208 | 17 | LS240 |
| TEST~ | U118 | 19 | LS244 |
| TEST~ | U411 | 6 | LS139 |
| THIS_CARD | U108 | 9 | LS164 |
| THIS_CARD~ | U208 | 11 | LS240 |
| THIS_CARD~ | U606 | 12 | LS11 |
| THIS_CARD~ | U709 | 19 | LS640 |
| VCC | U401 | 1 | 2764 |
| VCC | U705 | 16 | 316A102 1K |
| WAIT_ENB~ | U509 | 12 | 2729 |
| WAIT_ENB~ | U406 | 18 | F374 |
| WR_GRAD~ | U703 | 19 | PAL14L8 |
| WR_GRAD~ | U115 | 21 | 2018 |
| XACK~ | U701 | 6 | LS125 |
| (ACLK) | U501 | 13 | 2732 |
| (ACLK) | U502 | 8 | LS273 |
| (CS0L) | U502 | 13 | LS273 |
| (CS0L) | U501 | 14 | 2732 |
| (CS0U) | U501 | 16 | 2732 |
| (CS0U) | U502 | 17 | LS273 |
| (CS1L) | U502 | 14 | LS273 |
| (CS1L) | U501 | 15 | 2732 |
| (CS1U) | U501 | 17 | 2732 |
| (CS1U) | U502 | 18 | LS273 |
| (EXCH) | U501 | 11 | 2732 |
| (EXCH) | U502 | 7 | LS273 |
| (SEQ0) | U502 | 3 | LS273 |
| (SEQ0) | U501 | 9 | 2732 |
| (SEQ1) | U501 | 10 | 2732 |

| | | | |
|---|---|---|---|
| (SEQ1) | U502 | 4 | LS273 |
| 0:XSIG521 | U108 | 15 | LS161 |
| 0:XSIG521 | U101 | 4 | LS240 |
| 0:XSIG522 | U101 | 16 | LS240 |
| 0:XSIG522 | U107 | 23 | LS461 |
| 0:XSIG830 | W204 | 2 | JUMP |
| 0:XSIG830 | U204 | 27 | HM66202 |
| 0:XSIG836 | W203 | 2 | JUMP |
| 0:XSIG836 | U203 | 27 | HM66202 |
| 10:XSIG125 | U311 | 10 | S08 |
| 10:XSIG125 | U308 | 9 | 316A102 . |
| 10:XSIG179 | U311 | 2 | S08 |
| 10:XSIG179 | U311 | 5 | S08 |
| 10:XSIG180 | U309 | 2 | S74 |
| 10:XSIG180 | U309 | 6 | S74 |
| 10:XSIG197 | U316 | 23 | PAL20L8A |
| 10:XSIG197 | U308 | 8 | 316A102 . |
| 10:XSIG201 | U316 | 18 | PAL20L8A |
| 10:XSIG201 | U315 | 8 | F374 |
| 10:XSIG208 | U316 | 17 | PAL20L8A |
| 10:XSIG208 | U315 | 18 | F374 |
| 10:XSIG247 | U307 | 10 | S00 |
| 10:XSIG247 | U714 | 14 | LS240 |
| 10:XSIG247 | U714 | 5 | LS240 |
| 10:XSIG255 | U311 | 3 | S08 |
| 10:XSIG255 | U311 | 4 | S08 |
| 10:XSIG265 | U316 | 15 | PAL20L8A |
| 10:XSIG265 | U315 | 7 | F374 |
| 10:XSIG293 | U207 | 12 | LS244 |
| 10:XSIG299 | U315 | 6 | F374 |
| 10:XSIG299 | U207 | 8 | LS244 |
| 10:XSIG325 | U209 | 15 | LS279 |
| 10:XSIG325 | U328 | 6 | LS08 |
| 10:XSIG43 | U704 | 19 | 8288 |
| 10:XSIG43 | U307 | 6 | S00 |
| 10:XSIG61 | U704 | 3 | 8288 |
| 10:XSIG61 | U307 | 8 | S00 |
| 10:XSIG89 | U312 | 8 | OSC 16.8MHZ |
| 10:XSIG89 | U311 | 9 | S08 |
| 10:XSIG90 | U309 | 11 | S74 |
| 10:XSIG90 | U309 | 3 | S74 |
| 10:XSIG90 | U311 | 8 | S08 |
| 11:XSIG110 | U118 | 16 | PAL20L8A |
| 11:XSIG110 | U111 | 17 | F374 |
| 11:XSIG138 | U215 | 12 | F374 |
| 11:XSIG138 | U118 | 6 | PAL20L8A |
| 11:XSIG159 | U313 | 14 | LS240 |
| 11:XSIG159 | U119 | 4 | LS125 |
| 11:XSIG191 | U118 | 18 | PAL20L8A |
| 11:XSIG191 | U215 | 7 | F374 |
| 11:XSIG64 | U119 | 10 | LS125 |
| 11:XSIG64 | U422 | 18 | LS240 |
| 11:XSIG80 | U308 | 10 | 316A102 . |
| 11:XSIG80 | U313 | 11 | LS240 |
| 11:XSIG80 | U313 | 17 | LS240 |
| 11:XSIG92 | U121 | 1 | S32 |
| 11:XSIG92 | U215 | 6 | F374 |
| 11:XSIG92 | U111 | 7 | F374 |
| 12:XSIG306 | U715 | 16 | LS241 |

| | | | |
|---|---|---|---|
| 12:XSIG307 | U715 | 18 | LS241 |
| 12:XSIG316 | U422 | 16 | LS240 |
| 12:XSIG316 | U306 | 9 | LS164 |
| 12:XSIG346 | U715 | 12 | LS241 |
| 12:XSIG346 | U306 | 8 | LS164 |
| 12:XSIG349 | U512 | 1 | LS244 |
| 12:XSIG349 | U512 | 19 | LS244 |
| 12:XSIG349 | U320 | 7 | LS139 |
| 12:XSIG544 | U119 | 13 | LS125 |
| 12:XSIG544 | U713 | 3 | LS240 |
| 12:XSIG583 | U307 | 12 | S00 |
| 12:XSIG583 | U306 | 4 | LS164 |
| 12:XSIG585 | U306 | 6 | LS164 |
| 12:XSIG585 | U422 | 8 | LS240 |
| 12:XSIG586 | U307 | 11 | S00 |
| 12:XSIG586 | U304 | 13 | LS32 |
| 12:XSIG586 | U304 | 2 | LS32 |
| 12:XSIG586 | U305 | 5 | LS138 |
| 12:XSIG593 | U422 | 12 | LS240 |
| 12:XSIG593 | U307 | 13 | S00 |
| 12:XSIG601 | U304 | 1 | LS32 |
| 12:XSIG613 | U221 | 11 | S244 |
| 12:XSIG613 | U701 | 12 | LS139 |
| 12:XSIG614 | U701 | 11 | LS139 |
| 12:XSIG614 | U221 | 13 | S244 |
| 12:XSIG615 | U701 | 10 | LS139 |
| 12:XSIG615 | U221 | 15 | S244 |
| 13:XSIG1038 | R103 | 1 | RES 20K |
| 13:XSIG1038 | C102 | 2 | CAPE 10UF |
| 13:XSIG1038 | U113 | 5 | LS132 |
| 13:XSIG1144 | U322 | 3 | LS240 |
| 13:XSIG1144 | U113 | 9 | LS132 |
| 13:XSIG1145 | U113 | 10 | LS132 |
| 13:XSIG1145 | U214 | 15 | F374 |
| 13:XSIG1147 | U215 | 17 | F374 |
| 13:XSIG1147 | U215 | 19 | F374 |
| 13:XSIG1159 | U322 | 8 | LS240 |
| 13:XSIG1312 | U321 | 12 | LS138 |
| 13:XSIG1312 | U409 | 19 | LS244 |
| 13:XSIG1313 | U320 | 15 | LS139 |
| 13:XSIG1313 | U319 | 7 | LS138 |
| 13:XSIG1337 | U115 | 12 | 80C31 |
| 13:XSIG1337 | U308 | 13 | 316A102 |
| 13:XSIG1338 | U213 | 19 | LS245 |
| 13:XSIG1338 | U328 | 3 | LS08 |
| 13:XSIG1379 | U115 | 13 | 80C31 |
| 13:XSIG1379 | U308 | 15 | 316A102 |
| 13:XSIG1379 | U317 | 6 | LS38 |
| 13:XSIG1407 | U214 | 17 | F374 |
| 13:XSIG1407 | U214 | 19 | F374 |
| 13:XSIG1410 | U214 | 14 | F374 |
| 13:XSIG1410 | U214 | 16 | F374 |
| 13:XSIG1410 | U322 | 17 | LS240 |
| 13:XSIG1419 | U211 | 1 | LS273 |
| 13:XSIG1419 | U508 | 3 | LS08 |
| 13:XSIG860 | U117 | 20 | 2764 |
| 13:XSIG860 | U117 | 22 | 2764 |
| 13:XSIG860 | U115 | 29 | 80C31 |
| 13:XSIG861 | U116 | 11 | LS373 |

| | | | |
|---|---|---|---|
| 13:XSIG861 | U115 | 30 | 80C31 |
| 13:XSIG895 | R1 | 1 | RES 3.3K |
| 13:XSIG895 | U113 | 6 | LS132 |
| 13:XSIG895 | U115 | 9 | 80C31 |
| 13:XSIG910 | U115 | 19 | 80C31 |
| 13:XSIG910 | Y101 | 2 | XTAL 11.0592MHZ |
| 13:XSIG911 | Y101 | 1 | XTAL 11.0592MHZ |
| 13:XSIG911 | U115 | 18 | 80C31 |
| 1:XSIG500 | U103 | 15 | LS161 |
| 1:XSIG500 | U101 | 2 | LS240 |
| 1:XSIG501 | U101 | 18 | LS240 |
| 1:XSIG501 | U102 | 23 | LS461 |
| 1:XSIG658 | W201 | 2 | JUMP |
| 1:XSIG658 | U201 | 27 | HM66202 |
| 1:XSIG661 | W202 | 2 | JUMP |
| 1:XSIG661 | U202 | 27 | HM66202 |
| 2:XSIG292 | U610 | 1 | LS244 |
| 2:XSIG292 | U328 | 11 | LS08 |
| 2:XSIG292 | U610 | 19 | LS244 |
| 2:XSIG336 | U601 | 12 | S00 |
| 2:XSIG336 | U401 | 17 | PAL14L4 |
| 2:XSIG37 | U502 | 2 | LS273 |
| 2:XSIG37 | U501 | 8 | 2732 |
| 2:XSIG38 | U502 | 5 | LS273 |
| 2:XSIG38 | U501 | 7 | 2732 |
| 2:XSIG39 | U701 | 2 | LS139 |
| 2:XSIG39 | U502 | 6 | LS273 |
| 2:XSIG406 | U328 | 13 | LS08 |
| 2:XSIG406 | U401 | 15 | PAL14L4 |
| 3:XSIG695 | U414 | 13 | S32 |
| 3:XSIG695 | U602 | 19 | LS684 |
| 3:XSIG721 | U411 | 14 | LS461 |
| 3:XSIG721 | U410 | 23 | LS461 |
| 3:XSIG787 | U114 | 1 | LS00 |
| 3:XSIG787 | U113 | 3 | LS132 |
| 3:XSIG791 | U101 | 14 | LS240 |
| 3:XSIG791 | U112 | 2 | LS112 |
| 3:XSIG796 | U112 | 3 | LS112 |
| 3:XSIG796 | U101 | 6 | LS240 |
| 3:XSIG796 | U209 | 9 | LS279 |
| 3:XSIG823 | U411 | 2 | LS461 |
| 3:XSIG823 | U210 | 8 | LS74 |
| 3:XSIG848 | U414 | 11 | S32 |
| 3:XSIG848 | U413 | 2 | S74 |
| 3:XSIG876 | U208 | 1 | LS74 |
| 3:XSIG876 | U208 | 5 | LS74 |
| 3:XSIG877 | U208 | 2 | LS74 |
| 3:XSIG877 | U304 | 8 | LS32 |
| 3:XSIG879 | U304 | 10 | LS32 |
| 3:XSIG879 | U210 | 9 | LS74 |
| 4:XSIG448 | U106 | 5 | PAL20L8A |
| 4:XSIG453 | U106 | 1 | PAL20L8A |
| 4:XSIG453 | U105 | 10 | PE21197 |
| 4:XSIG541 | U601 | 6 | S00 |
| 4:XSIG541 | U104 | 8 | S244 |
| 4:XSIG542 | U104 | 2 | S244 |
| 4:XSIG542 | U601 | 3 | S00 |
| 4:XSIG549 | U601 | 1 | S00 |
| 4:XSIG549 | U601 | 4 | S00 |

| | | | |
|---|---|---|---|
| 4:XSIG549 | U526 | 7 | S240 |
| 4:XSIG549 | U101 | 9 | LS240 |
| 5:XSIG251 | U425 | 14 | LS461 |
| 5:XSIG251 | U426 | 23 | LS461 |
| 6:XSIG251 | U325 | 14 | LS461 |
| 6:XSIG251 | U326 | 23 | LS461 |
| 7:XSIG111 | U719 | 11 | S241 |
| 7:XSIG111 | U223 | 12 | S139 |
| 7:XSIG112 | U223 | 11 | S139 |
| 7:XSIG112 | U719 | 13 | S241 |
| 7:XSIG113 | U223 | 10 | S139 |
| 7:XSIG113 | U719 | 15 | S241 |
| 7:XSIG251 | U101 | 12 | LS240 |
| 7:XSIG251 | U412 | 9 | S195 |
| 7:XSIG262 | U219 | 14 | 2732 |
| 7:XSIG262 | U222 | 4 | LS273 |
| 7:XSIG263 | U219 | 15 | 2732 |
| 7:XSIG263 | U222 | 7 | LS273 |
| 7:XSIG264 | U219 | 16 | 2732 |
| 7:XSIG264 | U222 | 8 | LS273 |
| 7:XSIG265 | U222 | 13 | LS273 |
| 7:XSIG265 | U219 | 17 | 2732 |
| 7:XSIG266 | U222 | 14 | LS273 |
| 7:XSIG266 | U220 | 9 | 2732 |
| 7:XSIG267 | U220 | 10 | 2732 |
| 7:XSIG267 | U222 | 18 | LS273 |
| 7:XSIG268 | U220 | 11 | 2732 |
| 7:XSIG268 | U218 | 14 | PAL20L8A |
| 7:XSIG271 | U222 | 12 | LS273 |
| 7:XSIG271 | U223 | 14 | S139 |
| 7:XSIG272 | U223 | 13 | S139 |
| 7:XSIG272 | U222 | 15 | LS273 |
| 7:XSIG291 | U216 | 14 | LS461 |
| 7:XSIG291 | U217 | 23 | LS461 |
| 7:XSIG30 | U223 | 2 | S139 |
| 7:XSIG30 | U222 | 5 | LS273 |
| 7:XSIG460 | U220 | 14 | 2732 |
| 7:XSIG460 | U218 | 9 | PAL20L8A |
| 7:XSIG461 | U220 | 13 | 2732 |
| 7:XSIG461 | U218 | 8 | PAL20L8A |
| 7:XSIG504 | U208 | 11 | LS74 |
| 7:XSIG504 | U412 | 13 | S195 |
| 7:XSIG508 | U414 | 4 | S32 |
| 7:XSIG508 | U208 | 8 | LS74 |
| 7:XSIG509 | U216 | 11 | LS461 |
| 7:XSIG509 | U414 | 6 | S32 |
| 7:XSIG515 | U218 | 16 | PAL20L8A |
| 7:XSIG515 | U114 | 4 | LS00 |
| 7:XSIG515 | U414 | 5 | S32 |
| 8:XSIG209 | U114 | 10 | LS00 |
| 8:XSIG209 | U314 | 2 | F374 |
| 8:XSIG209 | U314 | 4 | F374 |
| 8:XSIG210 | U322 | 13 | LS240 |
| 8:XSIG210 | U314 | 5 | F374 |
| 8:XSIG214 | U427 | 2 | LS161 |
| 8:XSIG214 | U328 | 8 | LS08 |
| 8:XSIG218 | U427 | 15 | LS161 |
| 8:XSIG218 | U313 | 2 | LS240 |
| 8:XSIG219 | U313 | 18 | LS240 |

OUTPUT

| Signal_name | Physical_location | Pin_number | Part_name |
|---|---|---|---|
| 8:XSIG219 | U508 | 5 | LS08 |
| 8:XSIG219 | U427 | 9 | LS161 |
| 8:XSIG232 | U122 | 10 | S00 |
| 8:XSIG232 | U122 | 11 | S00 |
| 8:XSIG232 | U122 | 5 | S00 |
| 8:XSIG300 | U122 | 13 | S00 |
| 8:XSIG300 | U111 | 2 | F374 |
| 8:XSIG300 | U304 | 4 | LS32 |
| 8:XSIG300 | U314 | 8 | F374 |
| 8:XSIG352 | U122 | 12 | S00 |
| 8:XSIG352 | U111 | 3 | F374 |
| 8:XSIG352 | U114 | 8 | LS00 |
| 8:XSIG353 | U322 | 7 | LS240 |
| 8:XSIG353 | U114 | 9 | LS00 |
| 8:XSIG354 | U328 | 10 | LS08 |
| 8:XSIG354 | U314 | 9 | F374 |
| 8:XSIG369 | U215 | 3 | F374 |
| 8:XSIG369 | U304 | 6 | LS32 |
| 8:XSIG399 | U215 | 2 | F374 |
| 8:XSIG399 | U314 | 7 | F374 |
| 8:XSIG401 | U327 | 1 | PAL16L8A |
| 8:XSIG401 | U314 | 6 | F374 |
| 8:XSIG408 | U221 | 2 | S244 |
| 8:XSIG408 | U221 | 4 | S244 |
| 8:XSIG408 | U122 | 6 | S00 |
| 8:XSIG409 | U221 | 6 | S244 |
| 8:XSIG409 | U122 | 8 | S00 |
| 8:XSIG442 | U620 | 1 | LS244 |
| 8:XSIG442 | U620 | 19 | LS244 |
| 8:XSIG442 | U313 | 5 | LS240 |
| 9:XSIG1042 | U413 | 12 | S74 |
| 9:XSIG1042 | R701 | 2 | RES 330 |
| 9:XSIG1042 | U723 | 7 | 2940 |
| 9:XSIG589 | U523 | 11 | 2940 |
| 9:XSIG589 | U522 | 6 | 2940 |
| 9:XSIG590 | U522 | 10 | 2940 |
| 9:XSIG590 | U523 | 9 | 2940 |
| 9:XSIG591 | U524 | 11 | 2940 |
| 9:XSIG591 | U523 | 6 | 2940 |
| 9:XSIG592 | U523 | 10 | 2940 |
| 9:XSIG592 | U524 | 9 | 2940 |
| 9:XSIG595 | U724 | 11 | 2940 |
| 9:XSIG595 | U723 | 6 | 2940 |
| 9:XSIG596 | U723 | 10 | 2940 |
| 9:XSIG596 | U724 | 9 | 2940 |
| 9:XSIG597 | U725 | 11 | 2940 |
| 9:XSIG597 | U724 | 6 | 2940 |
| 9:XSIG598 | U724 | 10 | 2940 |
| 9:XSIG598 | U725 | 9 | 2940 |
| 9:XSIG943 | U522 | 12 | 2940 |
| 9:XSIG943 | U708 | 3 | 534 |
| 9:XSIG944 | U522 | 15 | 2940 |
| 9:XSIG944 | U708 | 4 | 534 |
| 9:XSIG945 | U522 | 16 | 2940 |
| 9:XSIG945 | U708 | 7 | 534 |
| 9:XSIG946 | U522 | 19 | 2940 |

| | | | |
|---|---|---|---|
| 9:XSIG946 | U708 | 8 | 534 |
| 9:XSIG947 | U708 | 13 | 534 |
| 9:XSIG947 | U522 | 26 | 2940 |
| 9:XSIG948 | U522 | 1 | 2940 |
| 9:XSIG948 | U708 | 14 | 534 |
| 9:XSIG949 | U708 | 17 | 534 |
| 9:XSIG949 | U522 | 2 | 2940 |
| 9:XSIG950 | U708 | 18 | 534 |
| 9:XSIG950 | U522 | 5 | 2940 |
| 9:XSIG951 | U523 | 12 | 2940 |
| 9:XSIG951 | U707 | 3 | 534 |
| 9:XSIG952 | U523 | 15 | 2940 |
| 9:XSIG952 | U707 | 4 | 534 |
| 9:XSIG953 | U523 | 16 | 2940 |
| 9:XSIG953 | U707 | 7 | 534 |
| 9:XSIG954 | U523 | 19 | 2940 |
| 9:XSIG954 | U707 | 8 | 534 |
| 9:XSIG955 | U707 | 13 | 534 |
| 9:XSIG955 | U523 | 26 | 2940 |
| 9:XSIG956 | U523 | 1 | 2940 |
| 9:XSIG956 | U707 | 14 | 534 |
| 9:XSIG958 | U707 | 17 | 534 |
| 9:XSIG958 | U523 | 2 | 2940 |
| 9:XSIG959 | U707 | 18 | 534 |
| 9:XSIG959 | U523 | 5 | 2940 |
| 9:XSIG960 | U524 | 12 | 2940 |
| 9:XSIG960 | U706 | 3 | 534 |
| 9:XSIG961 | U524 | 15 | 2940 |
| 9:XSIG961 | U706 | 4 | 534 |
| 9:XSIG962 | U524 | 16 | 2940 |
| 9:XSIG962 | U706 | 7 | 534 |
| 9:XSIG963 | U524 | 19 | 2940 |
| 9:XSIG963 | U706 | 8 | 534 |
| 9:XSIG964 | U706 | 13 | 534 |
| 9:XSIG964 | U524 | 26 | 2940 |
| 9:XSIG965 | U524 | 1 | 2940 |
| 9:XSIG965 | U706 | 14 | 534 |
| 9:XSIG966 | U706 | 17 | 534 |
| 9:XSIG966 | U524 | 2 | 2940 |
| A0 | U428 | 1 | PAL16L8A |
| A0 | U117 | 10 | 2764 |
| A0 | U116 | 2 | LS373 |
| A10 | U117 | 21 | 2764 |
| A10 | U115 | 23 | 80C31 |
| A11 | U117 | 23 | 2764 |
| A11 | U115 | 24 | 80C31 |
| A1 | U428 | 2 | PAL16L8A |
| A12 | U117 | 2 | 2764 |
| A12 | U115 | 25 | 80C31 |
| A1 | U116 | 5 | LS373 |
| A1 | U117 | 9 | 2764 |
| A2 | U428 | 3 | PAL16L8A |
| A2 | U116 | 6 | LS373 |
| A2 | U117 | 8 | 2764 |
| A3 | U428 | 4 | PAL16L8A |
| A3 | U117 | 7 | 2764 |
| A3 | U116 | 9 | LS373 |
| A4 | U116 | 12 | LS373 |
| A4 | U322 | 15 | LS240 |

| | | | |
|---|---|---|---|
| A4 | U428 | 5 | PAL16L8A |
| A4 | U117 | 6 | 2764 |
| A4~ | U322 | 5 | LS240 |
| A4~ | U318 | 6 | LS138 |
| A5 | U320 | 14 | LS139 |
| A5 | U116 | 15 | LS373 |
| A5 | U318 | 4 | LS138 |
| A5 | U117 | 5 | 2764 |
| A5 | U428 | 6 | PAL16L8A |
| A6 | U320 | 13 | LS139 |
| A6 | U116 | 16 | LS373 |
| A6 | U117 | 4 | 2764 |
| A7 | U116 | 19 | LS373 |
| A7 | U117 | 3 | 2764 |
| A8 | U115 | 21 | 80C31 |
| A8 | U117 | 25 | 2764 |
| A9 | U115 | 22 | 80C31 |
| A9 | U117 | 24 | 2764 |
| ACK~ | R601 | 1 | RES 680 |
| ACK~ | U714 | 4 | LS240 |
| AD0 | U117 | 11 | 2764 |
| AD0 | U213 | 2 | LS245 |
| AD0 | U116 | 3 | LS373 |
| AD0 | U115 | 39 | 80C31 |
| AD1 | U117 | 12 | 2764 |
| AD1 | U213 | 3 | LS245 |
| AD1 | U115 | 38 | 80C31 |
| AD1 | U116 | 4 | LS373 |
| AD2 | U117 | 13 | 2764 |
| AD2 | U115 | 37 | 80C31 |
| AD2 | U213 | 4 | LS245 |
| AD2 | U116 | 7 | LS373 |
| AD3 | U117 | 15 | 2764 |
| AD3 | U115 | 36 | 80C31 |
| AD3 | U213 | 5 | LS245 |
| AD3 | U116 | 8 | LS373 |
| AD4 | U116 | 13 | LS373 |
| AD4 | U117 | 16 | 2764 |
| AD4 | U115 | 35 | 80C31 |
| AD4 | U213 | 6 | LS245 |
| AD5 | U116 | 14 | LS373 |
| AD5 | U117 | 17 | 2764 |
| AD5 | U115 | 34 | 80C31 |
| AD5 | U213 | 7 | LS245 |
| AD6 | U116 | 17 | LS373 |
| AD6 | U117 | 18 | 2764 |
| AD6 | U115 | 33 | 80C31 |
| AD6 | U213 | 8 | LS245 |
| AD7 | U116 | 18 | LS373 |
| AD7 | U117 | 19 | 2764 |
| AD7 | U115 | 32 | 80C31 |
| AD7 | U213 | 9 | LS245 |
| ADR0~ | U525 | 6 | LS125 |
| ADR10~ | U705 | 17 | LS240 |
| ADR10~ | U707 | 19 | 534 |
| ADR11~ | U706 | 2 | 534 |
| ADR12~ | U713 | 4 | LS240 |
| ADR12~ | U706 | 5 | 534 |

| | | | |
|---|---|---|---|
| ADR13~ | U706 | 6 | 534 |
| ADR1~ | U708 | 2 | 534 |
| ADR20~ | U713 | 8 | LS240 |
| ADR20~ | U706 | 9 | 534 |
| ADR21~ | U713 | 11 | LS240 |
| ADR21~ | U706 | 12 | 534 |
| ADR22~ | U713 | 13 | LS240 |
| ADR22~ | U706 | 15 | 534 |
| ADR23~ | U713 | 15 | LS240 |
| ADR23~ | U706 | 16 | 534 |
| ADR2~ | U705 | 4 | LS240 |
| ADR2~ | U708 | 5 | 534 |
| ADR3~ | U708 | 6 | 534 |
| ADR4~ | U708 | 9 | 534 |
| ADR5~ | U708 | 12 | 534 |
| ADR6~ | U708 | 15 | 534 |
| ADR7~ | U708 | 16 | 534 |
| ADR8~ | U708 | 19 | 534 |
| ADR9~ | U707 | 2 | 534 |
| ADRA~ | U707 | 5 | 534 |
| ADRB~ | U707 | 6 | 534 |
| ADRC~ | U705 | 8 | LS240 |
| ADRC~ | U707 | 9 | 534 |
| ADRD~ | U705 | 11 | LS240 |
| ADRD~ | U707 | 12 | 534 |
| ADRE~ | U705 | 13 | LS240 |
| ADRE~ | U707 | 15 | 534 |
| ADRF~ | U705 | 15 | LS240 |
| ADRF~ | U707 | 16 | 534 |
| ADV_DFHW_SEP | U416 | 16 | LS273 |
| ADV_DFHW_SEP | U328 | 9 | LS08 |
| AEN~ | U525 | 1 | LS125 |
| AEN~ | U316 | 10 | PAL20L8A |
| AEN~ | U327 | 11 | PAL16L8A |
| AEN~ | U401 | 12 | PAL14L4 |
| AEN~ | U525 | 4 | LS125 |
| AEN~ | U704 | 6 | 8288 |
| AGCK1 | U428 | 19 | PAL16L8A |
| AGCK1 | U522 | 21 | 2940 |
| AGCK2 | U428 | 18 | PAL16L8A |
| AGCK2 | U523 | 21 | 2940 |
| AGCK3 | U428 | 17 | PAL16L8A |
| AGCK3 | U524 | 21 | 2940 |
| AGCK4 | U428 | 16 | PAL16L8A |
| AGCK4 | U723 | 21 | 2940 |
| AGCK5 | U428 | 15 | PAL16L8A |
| AGCK5 | U724 | 21 | 2940 |
| AGCK6 | U428 | 14 | PAL16L8A |
| AGCK6 | U725 | 21 | 2940 |
| AGI0 | U514 | 2 | LS273 |
| AGI0 | U522 | 23 | 2940 |
| AGI10 | U723 | 24 | 2940 |
| AGI10 | U415 | 5 | LS273 |
| AGI11 | U723 | 25 | 2940 |
| AGI11 | U415 | 6 | LS273 |
| AGI12 | U724 | 23 | 2940 |
| AGI1 | U522 | 24 | 2940 |
| AGI12 | U415 | 9 | LS273 |
| AGI13 | U415 | 12 | LS273 |

| | | | |
|---|---|---|---|
| AGI13 | U724 | 24 | 2940 |
| AGI14 | U415 | 15 | LS273 |
| AGI14 | U724 | 25 | 2940 |
| AGI1 | U514 | 5 | LS273 |
| AGI15 | U211 | 2 | LS273 |
| AGI15 | U725 | 23 | 2940 |
| AGI16 | U725 | 24 | 2940 |
| AGI16 | U211 | 5 | LS273 |
| AGI17 | U725 | 25 | 2940 |
| AGI17 | U211 | 6 | LS273 |
| AGI2 | U522 | 25 | 2940 |
| AGI2 | U514 | 6 | LS273 |
| AGI3 | U523 | 23 | 2940 |
| AGI3 | U514 | 9 | LS273 |
| AGI4 | U514 | 12 | LS273 |
| AGI4 | U523 | 24 | 2940 |
| AGI5 | U514 | 15 | LS273 |
| AGI5 | U523 | 25 | 2940 |
| AGI6 | U211 | 15 | LS273 |
| AGI6 | U524 | 23 | 2940 |
| AGI7 | U211 | 16 | LS273 |
| AGI7 | U524 | 24 | 2940 |
| AGI8 | U211 | 19 | LS273 |
| AGI8 | U524 | 25 | 2940 |
| AGI9 | U415 | 2 | LS273 |
| AGI9 | U723 | 23 | 2940 |
| ANYRQ | U421 | 19 | LS273 |
| ASTB~ | U715 | 5 | LS241 |
| ATOB | U710 | 1 | LS640 |
| ATOB | U327 | 12 | PAL16L8A |
| BHEN~ | U525 | 3 | LS125 |
| CCLK~ | U715 | 8 | LS241 |
| CMD_8051~ | U305 | 11 | LS138 |
| CMD_8051~ | U508 | 12 | LS08 |
| CMD_8051~ | U209 | 2 | LS279 |
| CMD_8051~ | U209 | 6 | LS279 |
| CO_L | U218 | 11 | PAL20L8A |
| CO_L | U217 | 14 | LS461 |
| D0 | U723 | 13 | 2940 |
| D0 | U213 | 18 | LS245 |
| D0 | U711 | 2 | LS374 |
| D0 | U411 | 22 | LS461 |
| D0 | U612 | 3 | LS374 |
| D0 | U409 | 9 | LS244 |
| D1 | U723 | 14 | 2940 |
| D1 | U213 | 17 | LS245 |
| D1 | U411 | 21 | LS461 |
| D1 | U612 | 4 | LS374 |
| D1 | U711 | 5 | LS374 |
| D1 | U409 | 7 | LS244 |
| D2 | U213 | 16 | LS245 |
| D2 | U723 | 17 | 2940 |
| D2 | U411 | 20 | LS461 |
| D2 | U409 | 5 | LS244 |
| D2 | U711 | 6 | LS374 |
| D2 | U612 | 7 | LS374 |
| D3 | U213 | 15 | LS245 |
| D3 | U723 | 18 | 2940 |
| D3 | U411 | 19 | LS461 |

| | | | |
|---|---|---|---|
| D3 | U409 | 3 | LS244 |
| D3 | U612 | 8 | LS374 |
| D3 | U711 | 9 | LS374 |
| D4 | U711 | 12 | LS374 |
| D4 | U612 | 13 | LS374 |
| D4 | U213 | 14 | LS245 |
| D4 | U411 | 18 | LS461 |
| D4 | U723 | 27 | 2940 |
| D5 | U213 | 13 | LS245 |
| D5 | U612 | 14 | LS374 |
| D5 | U711 | 15 | LS374 |
| D5 | U411 | 17 | LS461 |
| D5 | U723 | 28 | 2940 |
| D5 | U207 | 5 | LS244 |
| D6 | U213 | 12 | LS245 |
| D6 | U411 | 16 | LS461 |
| D6 | U612 | 17 | LS374 |
| D6 | U723 | 3 | 2940 |
| D6 | U207 | 7 | LS244 |
| D7 | U213 | 11 | LS245 |
| D7 | U411 | 15 | LS461 |
| D7 | U612 | 18 | LS374 |
| D7 | U711 | 19 | LS374 |
| D7 | U723 | 4 | 2940 |
| D7 | U207 | 9 | LS244 |
| DAT0~ | U710 | 2 | LS640 |
| DAT10~ | U709 | 4 | LS640 |
| DAT11~ | U709 | 5 | LS640 |
| DAT12~ | U709 | 6 | LS640 |
| DAT13~ | U709 | 7 | LS640 |
| DAT14~ | U709 | 8 | LS640 |
| DAT15~ | U709 | 9 | LS640 |
| DAT1~ | U710 | 3 | LS640 |
| DAT2~ | U710 | 4 | LS640 |
| DAT3~ | U710 | 5 | LS640 |
| DAT4~ | U710 | 6 | LS640 |
| DAT5~ | U710 | 7 | LS640 |
| DAT6~ | U710 | 8 | LS640 |
| DAT7~ | U710 | 9 | LS640 |
| DAT8~ | U709 | 2 | LS640 |
| DAT9~ | U709 | 3 | LS640 |
| DATA_8051~ | U508 | 13 | LS08 |
| DATA_8051~ | U209 | 3 | LS279 |
| DATA_8051~ | U209 | 5 | LS279 |
| DELAYED_ACK | U315 | 12 | F374 |
| DELAYED_ACK | U316 | 8 | PAL20L8A |
| DELAYED_IDLE~ | U316 | 14 | PAL20L8A |
| DELAYED_IDLE~ | U315 | 16 | F374 |
| DEL_ACLK | U401 | 7 | PAL14L4 |
| DEL_ACLK | U502 | 9 | LS273 |
| DEN~ | U704 | 16 | 8288 |
| DEN | U327 | 6 | PAL16L8A |
| DFH0_ACLK | U426 | 1[illegible] | LS461 |
| DFH0_ACLK | U327 | 19 | PAL16L8A |
| DFH0_CS1~ | U120 | 17 | PAL16L8A |
| DFH0_CS1~ | U423 | 21 | HM66202 |
| DFH0_CS2~ | U120 | 16 | PAL16L8A |
| DFH0_CS2~ | U423 | 2[illegible] | HM66202 |
| DFH0_CS3~ | U423 | 1 | HM66202 |

| | | | |
|---|---|---|---|
| DFH0_CS3~ | U120 | 15 | PAL16L8A |
| DFH0_OEL~ | U718 | 1 | S374 |
| DFH0_OEL~ | U223 | 6 | S139 |
| DFH0_OEUL~ | U716 | 1 | S374 |
| DFH0_OEUL~ | U223 | 7 | S139 |
| DFH0_PRST~ | U426 | 11 | LS461 |
| DFH0_PRST~ | U416 | 12 | LS273 |
| DFH0_PRST~ | U426 | 2 | LS461 |
| DFH0_WEL~ | U221 | 16 | S244 |
| DFH0_WEL~ | U423 | 28 | HM66202 |
| DFH0_WEU~ | U221 | 18 | S244 |
| DFH0_WEU~ | U424 | 28 | HM66202 |
| DFH1_ACLK | U326 | 1 | LS461 |
| DFH1_ACLK | U327 | 18 | PAL16L8A |
| DFH1_CS1~ | U120 | 14 | PAL16L8A |
| DFH1_CS1~ | U323 | 21 | HM66202 |
| DFH1_CS2~ | U120 | 13 | PAL16L8A |
| DFH1_CS2~ | U323 | 2 | HM66202 |
| DFH1_CS3~ | U323 | 1 | HM66202 |
| DFH1_CS3~ | U120 | 12 | PAL16L8A |
| DFH1_OEL~ | U619 | 1 | S374 |
| DFH1_OEL~ | U223 | 4 | S139 |
| DFH1_OEUL~ | U518 | 1 | S374 |
| DFH1_OEUL~ | U223 | 5 | S139 |
| DFH1_PRST~ | U326 | 11 | LS461 |
| DFH1_PRST~ | U416 | 15 | LS273 |
| DFH1_PRST~ | U326 | 2 | LS461 |
| DFH1_WEL~ | U221 | 12 | S244 |
| DFH1_WEL~ | U323 | 28 | HM66202 |
| DFH1_WEU~ | U221 | 14 | S244 |
| DFH1_WEU~ | U324 | 28 | HM66202 |
| DFHW_PRST_CLK~ | U318 | 12 | LS138 |
| DFHW_PRST_CLK~ | U327 | 2 | PAL16L8A |
| DFH_ACK | U621 | 11 | S534 |
| DFH_ACK | U106 | 19 | PAL20L8A |
| DFH_ACK | U314 | 3 | F374 |
| DFH_BANK | U621 | 1 | S534 |
| DFH_BANK | U322 | 2 | LS240 |
| DFH_BANK | U323 | 23 | HM66202 |
| DFH_BANK | U223 | 3 | S139 |
| DFH_BANK | U122 | 9 | S00 |
| DFH_BANK~ | U717 | 1 | S374 |
| DFH_BANK~ | U322 | 18 | LS240 |
| DFH_BANK~ | U423 | 23 | HM66202 |
| DFH_BANK~ | U122 | 4 | S00 |
| DFH_D0 | U620 | 18 | LS244 |
| DFH_D0 | U621 | 3 | S534 |
| DFH_D10 | U722 | 14 | LS244 |
| DFH_D10 | U622 | 7 | S534 |
| DFH_D11 | U722 | 12 | LS244 |
| DFH_D1 | U620 | 16 | LS244 |
| DFH_D11 | U622 | 8 | S534 |
| DFH_D12 | U622 | 13 | S534 |
| DFH_D12 | U722 | 9 | LS244 |
| DFH_D13 | U622 | 14 | S534 |
| DFH_D13 | U722 | 7 | LS244 |
| DFH_D1 | U621 | 4 | S534 |
| DFH_D14 | U622 | 17 | S534 |

| | | | |
|---|---|---|---|
| DFH_D14 | U722 | 5 | LS244 |
| DFH_D15 | U622 | 18 | S534 |
| DFH_D15 | U722 | 3 | LS244 |
| DFH_D2 | U620 | 14 | LS244 |
| DFH_D2 | U621 | 7 | S534 |
| DFH_D3 | U620 | 12 | LS244 |
| DFH_D3 | U621 | 8 | S534 |
| DFH_D4 | U621 | 13 | S534 |
| DFH_D4 | U620 | 9 | LS244 |
| DFH_D5 | U621 | 14 | S534 |
| DFH_D5 | U620 | 7 | LS244 |
| DFH_D6 | U621 | 17 | S534 |
| DFH_D6 | U620 | 5 | LS244 |
| DFH_D7 | U621 | 18 | S534 |
| DFH_D7 | U620 | 3 | LS244 |
| DFH_D8 | U722 | 18 | LS244 |
| DFH_D8 | U622 | 3 | S534 |
| DFH_D9 | U722 | 16 | LS244 |
| DFH_D9 | U622 | 4 | S534 |
| DFH_DCLK | U218 | 1 | PAL20L8A |
| DFH_DCLK | U718 | 11 | S374 |
| DFH_DCLK | U412 | 15 | S195 |
| DFH_FRMT0 | U220 | 4 | 2732 |
| DFH_FRMT0 | U513 | 5 | LS273 |
| DFH_FRMT1 | U220 | 3 | 2732 |
| DFH_FRMT1 | U513 | 6 | LS273 |
| DFH_FRMT2 | U220 | 2 | 2732 |
| DFH_FRMT2 | U513 | 9 | LS273 |
| DFH_LINES_FRMT | U513 | 12 | LS273 |
| DFH_LINES_FRMT | U508 | 4 | LS08 |
| DFH_MB_LBX~ | U721 | 1 | LS244 |
| DFH_MB_LBX~ | U313 | 15 | LS240 |
| DFH_MB_LBX~ | U721 | 19 | LS244 |
| DFH_MB_LBX~ | U106 | 23 | PAL20L8A |
| DFH_RCS1 | U120 | 4 | PAL16L8A |
| DFH_RCS1 | U222 | 6 | LS273 |
| DFH_RCS2 | U120 | 5 | PAL16L8A |
| DFH_RCS2 | U222 | 9 | LS273 |
| DFH_RD_ACLK | U222 | 19 | LS273 |
| DFH_RD_ACLK | U327 | 4 | PAL16L8A |
| DFH_RD_PRST~ | U208 | 12 | LS74 |
| DFH_RD_PRST~ | U416 | 19 | LS273 |
| DFH_WCS1 | U427 | 14 | LS161 |
| DFH_WCS1 | U120 | 2 | PAL16L8A |
| DFH_WCS2 | U427 | 13 | LS161 |
| DFH_WCS2 | U120 | 3 | PAL16L8A |
| DFH_WR_PRST~ | U427 | 1 | LS161 |
| DFH_WR_PRST~ | U417 | 5 | LS273 |
| DMA_TEST | U714 | 1 | LS240 |
| DMA_TEST | U316 | 16 | PAL20L8A |
| DMA_TEST | U422 | 6 | LS240 |
| DMA_TEST | U615 | 9 | LS273 |
| DMA_TEST~ | U422 | 14 | LS240 |
| DMA_TEST~ | U714 | 19 | LS240 |
| DMC_BUSY | U512 | 17 | LS244 |
| DMC_BUSY | U115 | 3 | 80C31 |
| DMC_BUSY | U317 | 4 | LS38 |
| DMC_BUSY | U317 | 5 | LS38 |
| DMC_RDY~ | U209 | 1 | LS279 |

| | | | |
|---|---|---|---|
| DMC_RDY~ | U318 | 9 | LS138 |
| DS0~ | U218 | 23 | PAL20L8A |
| DS0 | U219 | 9 | 2732 |
| DS1 | U219 | 10 | 2732 |
| DS1 | U218 | 2 | PAL20L8A |
| DS2 | U219 | 11 | 2732 |
| DS2 | U218 | 3 | PAL20L8A |
| DS3 | U219 | 13 | 2732 |
| DS3 | U218 | 4 | PAL20L8A |
| DSTB~ | U715 | 3 | LS241 |
| DT/R~ | U704 | 4 | 8288 |
| DT/R~ | U327 | 8 | PAL16L8A |
| DTH0_ACLK | U107 | 1 | LS461 |
| DTH0_ACLK | U108 | 2 | LS161 |
| DTH0_ACLK | U106 | 22 | PAL20L8A |
| DTH0_CS1L~ | U403 | 19 | PAL16L8A |
| DTH0_CS1L~ | U204 | 21 | HM66202 |
| DTH0_CS1U~ | U404 | 19 | PAL16L8A |
| DTH0_CS1U~ | U203 | 21 | HM66202 |
| DTH0_CS2L~ | U403 | 18 | PAL16L8A |
| DTH0_CS2L~ | U204 | 30 | HM66202 |
| DTH0_CS2U~ | U404 | 18 | PAL16L8A |
| DTH0_CS2U~ | U203 | 30 | HM66202 |
| DTH0_CS3L~ | U204 | 1 | HM66202 |
| DTH0_CS3L~ | U403 | 17 | PAL16L8A |
| DTH0_CS3L~ | W204 | 3 | JUMP |
| DTH0_CS3U~ | U203 | 1 | HM66202 |
| DTH0_CS3U~ | U404 | 17 | PAL16L8A |
| DTH0_CS3U~ | W203 | 3 | JUMP |
| DTH0_CS4L~ | U403 | 16 | PAL16L8A |
| DTH0_CS4L~ | U204 | 2 | HM66202 |
| DTH0_CS4U~ | U404 | 16 | PAL16L8A |
| DTH0_CS4U~ | U203 | 2 | HM66202 |
| DTH0_OEEXCH~ | U607 | 1 | LS374 |
| DTH0_OEEXCH~ | U701 | 5 | LS139 |
| DTH0_OENRML~ | U506 | 1 | LS374 |
| DTH0_OENRML~ | U701 | 4 | LS139 |
| DTH0_PRST~ | U108 | 1 | LS161 |
| DTH0_PRST~ | U107 | 11 | LS461 |
| DTH0_PRST~ | U107 | 2 | LS461 |
| DTH0_PRST~ | U416 | 5 | LS273 |
| DTH0_W12~ | U406 | 1 | LS244 |
| DTH0_W12~ | U106 | 17 | PAL20L8A |
| DTH0_W12~ | U406 | 19 | LS244 |
| DTH0_W8~ | U407 | 1 | LS244 |
| DTH0_W8~ | U106 | 18 | PAL20L8A |
| DTH0_W8~ | U407 | 19 | LS244 |
| DTH0_WE~ | U311 | 13 | S08 |
| DTH0_WE~ | U104 | 18 | S244 |
| DTH0_WE~ | U204 | 28 | HM66202 |
| DTH1_ACLK | U102 | 1 | LS461 |
| DTH1_ACLK | U103 | 2 | LS161 |
| DTH1_ACLK | U106 | 20 | PAL20L8A |
| DTH1_CS1L~ | U403 | 15 | PAL16L8A |
| DTH1_CS1L~ | U201 | 21 | HM66202 |
| DTH1_CS1U~ | U404 | 15 | PAL16L8A |
| DTH1_CS1U~ | U202 | 21 | HM66202 |
| DTH1_CS2L~ | U403 | 14 | PAL16L8A |
| DTH1_CS2L~ | U201 | 30 | HM66202 |
| DTH1_CS2U~ | U404 | 14 | PAL16L8A |

| | | | |
|---|---|---|---|
| DTH1¯CS2U~ | U202 | 30 | HM66202 |
| DTH1¯CS3L~ | U201 | 1 | HM66202 |
| DTH1¯CS3L~ | U403 | 13 | PAL16L8A |
| DTH1¯CS3L~ | W201 | 3 | JUMP |
| DTH1¯CS3U~ | U202 | 1 | HM66202 |
| DTH1¯CS3U~ | U404 | 13 | PAL16L8A |
| DTH1¯CS3U~ | W202 | 3 | JUMP |
| DTH1¯CS4L~ | U403 | 12 | PAL16L8A |
| DTH1¯CS4L~ | U201 | 2 | HM66202 |
| DTH1¯CS4U~ | U404 | 12 | PAL16L8A |
| DTH1¯CS4U~ | U202 | 2 | HM66202 |
| DTH1¯OEEXCH~ | U605 | 1 | LS374 |
| DTH1¯OEEXCH~ | U701 | 7 | LS139 |
| DTH1¯OENRML~ | U504 | 1 | LS374 |
| DTH1¯OENRML~ | U701 | 6 | LS139 |
| DTH1¯PRST~ | U103 | 1 | LS161 |
| DTH1¯PRST~ | U102 | 11 | LS461 |
| DTH1¯PRST~ | U102 | 2 | LS461 |
| DTH1¯PRST~ | U416 | 6 | LS273 |
| DTH1¯W12~ | U405 | 1 | LS244 |
| DTH1¯W12~ | U106 | 15 | PAL20L8A |
| DTH1¯W12~ | U405 | 19 | LS244 |
| DTH1¯W8~ | U503 | 1 | LS244 |
| DTH1¯W8~ | U106 | 16 | PAL20L8A |
| DTH1¯W8~ | U503 | 19 | LS244 |
| DTH1¯WE~ | U104 | 12 | S244 |
| DTH1¯WE~ | U201 | 28 | HM66202 |
| DTHR¯ADV1~ | U601 | 13 | S00 |
| DTHR¯ADV1~ | U318 | 14 | LS138 |
| DTHR¯CS0L | U502 | 12 | LS273 |
| DTHR¯CS0L | U403 | 7 | PAL16L8A |
| DTHR¯CS0U | U502 | 16 | LS273 |
| DTHR¯CS0U | U404 | 7 | PAL16L8A |
| DTHR¯CS1L | U502 | 15 | LS273 |
| DTHR¯CS1L | U403 | 8 | PAL16L8A |
| DTHR¯CS1U | U502 | 19 | LS273 |
| DTHR¯CS1U | U404 | 8 | PAL16L8A |
| DTHR¯NSEP0 | U615 | 2 | LS273 |
| DTHR¯NSEP0 | U501 | 4 | 2732 |
| DTHR¯NSEP1 | U501 | 3 | 2732 |
| DTHR¯NSEP1 | U615 | 5 | LS273 |
| DTHR¯PRST_CLK~ | U318 | 13 | LS138 |
| DTHR¯PRST¯CLK~ | U401 | 8 | PAL14L4 |
| DTHW¯NSEP0 | U517 | 2 | LS273 |
| DTHW¯NSEP0 | U402 | 7 | PAL20L8A |
| DTHW¯NSEP1 | U517 | 5 | LS273 |
| DTHW¯NSEP1 | U402 | 8 | PAL20L8A |
| DTHW¯PRST¯CLK~ | U318 | 11 | LS138 |
| DTHW¯PRST¯CLK~ | U106 | 8 | PAL20L8A |
| DTH¯BANK | U408 | 1 | LS244 |
| DTH¯BANK | U106 | 11 | PAL20L8A |
| DTH¯BANK | U408 | 19 | LS244 |
| DTH¯BANK | U201 | 23 | HM66202 |
| DTH¯BANK | U301 | 4 | PAL16R4A |
| DTH¯BANK | U601 | 5 | S00 |
| DTH¯BANK | U404 | 6 | PAL16L8A |
| DTH¯BANK~ | U604 | 1 | LS244 |
| DTH¯BANK~ | U322 | 16 | LS240 |
| DTH¯BANK~ | U604 | 19 | LS244 |
| DTH¯BANK~ | U601 | 2 | S00 |

| | | | |
|---|---|---|---|
| DTH¯BANK~ | U204 | 23 | HM66202 |
| DTH¯BANK~ | U701 | 3 | LS139 |
| DTH¯CARRY0~ | U107 | 14 | LS461 |
| DTH¯CARRY0~ | U301 | 2 | PAL16R4A |
| DTH¯CARRY0~ | U402 | 5 | PAL20L8A |
| DTH¯CARRY1~ | U102 | 14 | LS461 |
| DTH¯CARRY1~ | U301 | 3 | PAL16R4A |
| DTH¯CARRY1~ | U613 | 4 | LS244 |
| DTH¯CARRY1~ | U402 | 6 | PAL20L8A |
| DTH¯FRMT0 | U614 | 12 | LS273 |
| DTH¯FRMT0 | U501 | 6 | 2732 |
| DTH¯FRMT1 | U614 | 15 | LS273 |
| DTH¯FRMT1 | U501 | 5 | 2732 |
| DTH¯FRMT2 | U501 | 22 | 2732 |
| DTH¯FRMT2 | U614 | 9 | LS273 |
| DTH¯M0 | U607 | 2 | LS374 |
| DTH¯M0 | U602 | 3 | LS684 |
| DTH¯M10 | U506 | 6 | LS374 |
| DTH¯M11 | U609 | 8 | LS244 |
| DTH¯M11 | U506 | 9 | LS374 |
| DTH¯M12 | U609 | 11 | LS244 |
| DTH¯M12 | U506 | 12 | LS374 |
| DTH¯M13 | U609 | 13 | LS244 |
| DTH¯M13 | U506 | 15 | LS374 |
| DTH¯M1 | U610 | 4 | LS244 |
| DTH¯M14 | U609 | 15 | LS244 |
| DTH¯M14 | U506 | 16 | LS374 |
| DTH¯M1 | U607 | 5 | LS374 |
| DTH¯M15 | U609 | 17 | LS244 |
| DTH¯M15 | U506 | 19 | LS374 |
| DTH¯M2 | U607 | 6 | LS374 |
| DTH¯M2 | U602 | 7 | LS684 |
| DTH¯M3 | U610 | 8 | LS244 |
| DTH¯M3 | U607 | 9 | LS374 |
| DTH¯M4 | U610 | 11 | LS244 |
| DTH¯M4 | U607 | 12 | LS374 |
| DTH¯M4 | U603 | 13 | LS273 |
| DTH¯M5 | U610 | 13 | LS244 |
| DTH¯M5 | U602 | 14 | LS684 |
| DTH¯M5 | U607 | 15 | LS374 |
| DTH¯M6 | U610 | 15 | LS244 |
| DTH¯M6 | U607 | 16 | LS374 |
| DTH¯M6 | U603 | 17 | LS273 |
| DTH¯M7 | U610 | 17 | LS244 |
| DTH¯M7 | U602 | 18 | LS684 |
| DTH¯M7 | U607 | 19 | LS374 |
| DTH¯M8 | U506 | 2 | LS374 |
| DTH¯M9 | U609 | 4 | LS244 |
| DTH¯M9 | U506 | 5 | LS374 |
| DTH¯MB¯LBX~ | U401 | 13 | PAL14L4 |
| DTH¯MB¯LBX~ | U517 | 16 | LS273 |
| DTH¯RDCLK | U607 | 11 | LS374 |
| DTH¯RDCLK | U401 | 18 | PAL14L4 |
| DTH¯RD¯1SEP | U614 | 16 | LS273 |
| DTH¯RD¯1SEP | U401 | 9 | PAL14L4 |
| DTH¯RD¯ACLK | U301 | 1 | PAL16R4A |
| DTH¯RD¯ACLK | U401 | 16 | PAL14L4 |
| DTH¯RD¯ACLK | U106 | 9 | PAL20L8A |
| DTH¯RD¯PRST~ | U502 | 1 | LS273 |

| | | | |
|---|---|---|---|
| DTH_RD_PRST~ | U209 | 12 | LS279 |
| DTH_RD_PRST~ | U301 | 5 | PAL16R4A |
| DTH_RD_PRST~ | U416 | 9 | LS273 |
| DTH_REG_OE | U612 | 1 | LS374 |
| DTH_REG_OE | U212 | 19 | LS273 |
| DTH_REG_OE | U322 | 6 | LS240 |
| DTH_REG_OE~ | U701 | 1 | LS139 |
| DTH_REG_OE~ | U322 | 14 | LS240 |
| DTH_SEP_SEL0 | U417 | 12 | LS273 |
| DTH_SEP_SEL0 | U501 | 2 | 2732 |
| DTH_SEP_SEL1 | U501 | 1 | 2732 |
| DTH_SEP_SEL1 | U417 | 15 | LS273 |
| DTH_SLAVE_OE~ | U328 | 12 | LS08 |
| DTH_SLAVE_OE~ | U320 | 4 | LS139 |
| DTH_WCSL | U403 | 1 | PAL16L8A |
| DTH_WCSL | U402 | 21 | PAL20L8A |
| DTH_WCSU | U404 | 1 | PAL16L8A |
| DTH_WCSU | U402 | 22 | PAL20L8A |
| DTH_WCSU | U106 | 7 | PAL20L8A |
| DTH_WE~ | U105 | 1 | PE21197 |
| DTH_WE~ | U311 | 11 | S08 |
| DTH_WR_A12 | U402 | 15 | PAL20L8A |
| DTH_WR_A12 | U301 | 8 | PAL16R4A |
| DTH_WR_PRST~ | U112 | 14 | LS112 |
| DTH_WR_PRST~ | U402 | 2 | PAL20L8A |
| DTH_WR_TIMING~ | U304 | 12 | LS32 |
| DTH_WSEP0 | U402 | 20 | PAL20L8A |
| DTH_WSEP0 | U404 | 3 | PAL16L8A |
| DTH_WSEP1 | U402 | 19 | PAL20L8A |
| DTH_WSEP1 | U404 | 4 | PAL16L8A |
| ENACLK~ | U106 | 4 | PAL20L8A |
| ENACLK~ | U414 | 8 | S32 |
| ENB0 | U120 | 19 | PAL16L8A |
| ENB0 | U423 | 27 | HM66202 |
| ENB0 | U423 | 30 | HM66202 |
| ENB1 | U120 | 18 | PAL16L8A |
| ENB1 | U323 | 27 | HM66202 |
| ENB1 | U323 | 30 | HM66202 |
| ENB_LINERQ | U615 | 15 | LS273 |
| ENB_LINERQ | U317 | 2 | LS38 |
| END1 | U111 | 16 | F374 |
| END1 | U111 | 18 | F374 |
| END1 | U118 | 23 | PAL20L8A |
| END2 | U111 | 19 | F374 |
| END2 | U118 | 7 | PAL20L8A |
| END_CYCLE | U413 | 11 | S74 |
| END_CYCLE | U111 | 13 | F374 |
| END_CYCLE | U118 | 15 | PAL20L8A |
| END_CYCLE | U315 | 4 | F374 |
| EOL | U720 | 12 | LS240 |
| EOL | U112 | 13 | LS112 |
| EOL | U422 | 3 | LS240 |
| EOL_FF | U115 | 7 | 80C31 |
| EOL_FF | U112 | 9 | LS112 |
| EOL_FF~ | U508 | 10 | LS08 |
| EOL_FF~ | U112 | 7 | LS112 |
| EXCH_DTHWUL | U404 | 5 | PAL16L8A |

| | | | |
|---|---|---|---|
| EXCH_DTHWUL | U614 | 6 | LS273 |
| FB0_A0 | U423 | 11 | HM66202 |
| FB0_A0 | U425 | 22 | LS461 |
| FB0_A10 | U426 | 20 | LS461 |
| FB0_A10 | U423 | 22 | HM66202 |
| FB0_A1 | U423 | 10 | HM66202 |
| FB0_A11 | U426 | 19 | LS461 |
| FB0_A11 | U423 | 24 | HM66202 |
| FB0_A1 | U425 | 21 | LS461 |
| FB0_A12 | U613 | 13 | LS244 |
| FB0_A12 | U426 | 18 | LS461 |
| FB0_A12 | U423 | 3 | HM66202 |
| FB0_A2 | U425 | 20 | LS461 |
| FB0_A2 | U423 | 9 | HM66202 |
| FB0_A3 | U425 | 19 | LS461 |
| FB0_A3 | U423 | 8 | HM66202 |
| FB0_A4 | U425 | 18 | LS461 |
| FB0_A4 | U423 | 7 | HM66202 |
| FB0_A5 | U425 | 17 | LS461 |
| FB0_A5 | U423 | 6 | HM66202 |
| FB0_A6 | U425 | 16 | LS461 |
| FB0_A6 | U423 | 5 | HM66202 |
| FB0_A7 | U425 | 15 | LS461 |
| FB0_A7 | U423 | 4 | HM66202 |
| FB0_A8 | U426 | 22 | LS461 |
| FB0_A8 | U423 | 26 | HM66202 |
| FB0_A9 | U426 | 21 | LS461 |
| FB0_A9 | U423 | 25 | HM66202 |
| FB0_D0 | U423 | 12 | HM66202 |
| FB0_D0 | U621 | 2 | S534 |
| FB0_D0 | U718 | 3 | S374 |
| FB0_D10 | U424 | 14 | HM66202 |
| FB0_D10 | U622 | 6 | S534 |
| FB0_D10 | U716 | 7 | S374 |
| FB0_D11 | U424 | 16 | HM66202 |
| FB0_D1 | U423 | 13 | HM66202 |
| FB0_D11 | U716 | 8 | S374 |
| FB0_D11 | U622 | 9 | S534 |
| FB0_D12 | U622 | 12 | S534 |
| FB0_D12 | U716 | 13 | S374 |
| FB0_D12 | U424 | 17 | HM66202 |
| FB0_D13 | U716 | 14 | S374 |
| FB0_D13 | U622 | 15 | S534 |
| FB0_D13 | U424 | 18 | HM66202 |
| FB0_D1 | U718 | 4 | S374 |
| FB0_D14 | U622 | 16 | S534 |
| FB0_D14 | U716 | 17 | S374 |
| FB0_D14 | U424 | 19 | HM66202 |
| FB0_D1 | U621 | 5 | S534 |
| FB0_D15 | U716 | 18 | S374 |
| FB0_D15 | U622 | 19 | S534 |
| FB0_D15 | U424 | 20 | HM66202 |
| FB0_D2 | U423 | 14 | HM66202 |
| FB0_D2 | U621 | 6 | S534 |
| FB0_D2 | U718 | 7 | S374 |
| FB0_D3 | U423 | 16 | HM66202 |
| FB0_D3 | U718 | 8 | S374 |
| FB0_D3 | U621 | 9 | S534 |
| FB0_D4 | U621 | 12 | S534 |

| | | | |
|---|---|---|---|
| FB0_D4 | U718 | 13 | S374 |
| FB0_D4 | U423 | 17 | HM66202 |
| FB0_D5 | U718 | 14 | S374 |
| FB0_D5 | U621 | 15 | S534 |
| FB0_D5 | U423 | 18 | HM66202 |
| FB0_D6 | U621 | 16 | S534 |
| FB0_D6 | U718 | 17 | S374 |
| FB0_D6 | U423 | 19 | HM66202 |
| FB0_D7 | U718 | 18 | S374 |
| FB0_D7 | U621 | 19 | S534 |
| FB0_D7 | U423 | 20 | HM66202 |
| FB0_D8 | U424 | 12 | HM66202 |
| FB0_D8 | U622 | 2 | S534 |
| FB0_D8 | U716 | 3 | S374 |
| FB0_D9 | U424 | 13 | HM66202 |
| FB0_D9 | U716 | 4 | S374 |
| FB0_D9 | U622 | 5 | S534 |
| FB1_A0 | U323 | 11 | HM66202 |
| FB1_A0 | U325 | 22 | LS461 |
| FB1_A10 | U326 | 20 | LS461 |
| FB1_A10 | U323 | 22 | HM66202 |
| FB1_A1 | U323 | 10 | HM66202 |
| FB1_A11 | U326 | 19 | LS461 |
| FB1_A11 | U323 | 24 | HM66202 |
| FB1_A1 | U325 | 21 | LS461 |
| FB1_A12 | U613 | 15 | LS244 |
| FB1_A12 | U326 | 18 | LS461 |
| FB1_A12 | U323 | 3 | HM66202 |
| FB1_A2 | U325 | 20 | LS461 |
| FB1_A2 | U323 | 9 | HM66202 |
| FB1_A3 | U325 | 19 | LS461 |
| FB1_A3 | U323 | 8 | HM66202 |
| FB1_A4 | U325 | 18 | LS461 |
| FB1_A4 | U323 | 7 | HM66202 |
| FB1_A5 | U325 | 17 | LS461 |
| FB1_A5 | U323 | 6 | HM66202 |
| FB1_A6 | U325 | 16 | LS461 |
| FB1_A6 | U323 | 5 | HM66202 |
| FB1_A7 | U325 | 15 | LS461 |
| FB1_A7 | U323 | 4 | HM66202 |
| FB1_A8 | U326 | 22 | LS461 |
| FB1_A8 | U323 | 26 | HM66202 |
| FB1_A9 | U326 | 21 | LS461 |
| FB1_A9 | U323 | 25 | HM66202 |
| FB1_D0 | U323 | 12 | HM66202 |
| FB1_D0 | U520 | 2 | S534 |
| FB1_D0 | U619 | 3 | S374 |
| FB1_D10 | U324 | 14 | HM66202 |
| FB1_D10 | U521 | 6 | S534 |
| FB1_D10 | U518 | 7 | S374 |
| FB1_D11 | U324 | 16 | HM66202 |
| FB1_D1 | U323 | 13 | HM66202 |
| FB1_D11 | U518 | 8 | S374 |
| FB1_D11 | U521 | 9 | S534 |
| FB1_D12 | U521 | 12 | S534 |
| FB1_D12 | U518 | 13 | S374 |
| FB1_D12 | U324 | 17 | HM66202 |
| FB1_D13 | U518 | 14 | S374 |
| FB1_D13 | U521 | 15 | S534 |

| | | | |
|---|---|---|---|
| FB1_D13 | U324 | 18 | HM66202 |
| FB1_D1 | U619 | 4 | S374 |
| FB1_D14 | U521 | 16 | S534 |
| FB1_D14 | U518 | 17 | S374 |
| FB1_D14 | U324 | 19 | HM66202 |
| FB1_D1 | U520 | 5 | S534 |
| FB1_D15 | U518 | 18 | S374 |
| FB1_D15 | U521 | 19 | S534 |
| FB1_D15 | U324 | 20 | HM66202 |
| FB1_D2 | U323 | 14 | HM66202 |
| FB1_D2 | U520 | 6 | S534 |
| FB1_D2 | U619 | 7 | S374 |
| FB1_D3 | U323 | 16 | HM66202 |
| FB1_D3 | U619 | 8 | S374 |
| FB1_D3 | U520 | 9 | S534 |
| FB1_D4 | U520 | 12 | S534 |
| FB1_D4 | U619 | 13 | S374 |
| FB1_D4 | U323 | 17 | HM66202 |
| FB1_D5 | U619 | 14 | S374 |
| FB1_D5 | U520 | 15 | S534 |
| FB1_D5 | U323 | 18 | HM66202 |
| FB1_D6 | U520 | 16 | S534 |
| FB1_D6 | U619 | 17 | S374 |
| FB1_D6 | U323 | 19 | HM66202 |
| FB1_D7 | U619 | 18 | S374 |
| FB1_D7 | U520 | 19 | S534 |
| FB1_D7 | U323 | 20 | HM66202 |
| FB1_D8 | U324 | 12 | HM66202 |
| FB1_D8 | U521 | 2 | S534 |
| FB1_D8 | U518 | 3 | S374 |
| FB1_D9 | U324 | 13 | HM66202 |
| FB1_D9 | U518 | 4 | S374 |
| FB1_D9 | U521 | 5 | S534 |
| GND | U223 | 1 | S139 |
| GND | U411 | 10 | LS461 |
| GND | U723 | 11 | 2940 |
| GND | U210 | 12 | LS74 |
| GND | U701 | 15 | LS139 |
| GND | U501 | 19 | 2732 |
| GND | C501 | 2 | CAPE 6.8UF |
| GND | U115 | 20 | 80C31 |
| GND | U501 | 21 | 2732 |
| GND | U411 | 23 | LS461 |
| GND | U410 | 3 | LS461 |
| GND | U115 | 31 | 80C31 |
| GND | U411 | 4 | LS461 |
| GND | U411 | 5 | LS461 |
| GND | U411 | 6 | LS461 |
| GND | U411 | 7 | LS461 |
| GND | U411 | 8 | LS461 |
| GND | U411 | 9 | LS461 |
| GND | | P1-12 | CONNECTOR |
| GND | | P1-22 | CONNECTOR |
| GND | | P1-32 | CONNECTOR |
| GND | | P1-42 | CONNECTOR |
| GND | | P1-52 | CONNECTOR |
| GND | | P1-62 | CONNECTOR |
| GND | | P1-72 | CONNECTOR |
| GND | | P1-82 | CONNECTOR |
| GND | | P1-92 | CONNECTOR |

| | | | |
|---|---|---|---|
| GND | | P2-12 | CONNECTOR |
| GND | | P2-2 | CONNECTOR |
| GND | | P2-22 | CONNECTOR |
| GND | | P2-32 | CONNECTOR |
| GND | | P2-42 | CONNECTOR |
| GND | | P2-52 | CONNECTOR |
| GND | | P2-62 | CONNECTOR |
| GND | | P2-72 | CONNECTOR |
| GND | | P2-82 | CONNECTOR |
| GND | | P2-92 | CONNECTOR |
| HOST_CLK~ | U311 | 1 | S08 |
| HOST_CLK~ | U401 | 4 | PAL14L4 |
| HOST_CLR_IRQ~ | U328 | 4 | LS08 |
| HOST_CLR_IRQ~ | U305 | 9 | LS138 |
| HOST_CMD | U115 | 4 | 80C31 |
| HOST_CMD | U209 | 7 | LS279 |
| HOST_DFH_WR | U106 | 6 | PAL20L8A |
| HOST_EOL~ | U305 | 10 | LS138 |
| HOST_EOL~ | U720 | 17 | LS240 |
| HOST_IR1~ | U720 | 11 | LS240 |
| HOST_IR1~ | U517 | 9 | LS273 |
| HOST_IR2~ | U517 | 12 | LS273 |
| HOST_IR2~ | U720 | 13 | LS240 |
| HOST_IR3~ | U720 | 15 | LS240 |
| HOST_WR1~ | U101 | 11 | LS240 |
| HOST_WR1~ | U714 | 13 | LS240 |
| HOST_WR2~ | U304 | 3 | LS32 |
| HOST_WR2~ | U215 | 4 | F374 |
| IB_D~0 | U206 | 2 | S240 |
| IB_D~10 | U526 | 6 | S240 |
| IB_D~11 | U526 | 8 | S240 |
| IB_D~11 | U717 | 9 | S374 |
| IB_D~12 | U418 | 11 | LS240 |
| IB_D~12 | U717 | 12 | S374 |
| IB_D~13 | U418 | 13 | LS240 |
| IB_D~13 | U717 | 15 | S374 |
| IB_D~1 | U206 | 4 | S240 |
| IB_D~14 | U418 | 15 | LS240 |
| IB_D~14 | U717 | 16 | S374 |
| IB_D~1 | U718 | 5 | S374 |
| IB_D~15 | U418 | 17 | LS240 |
| IB_D~15 | U717 | 19 | S374 |
| IB_D~2 | U206 | 6 | S240 |
| IB_D~3 | U206 | 8 | S240 |
| IB_D~3 | U718 | 9 | S374 |
| IB_D~4 | U206 | 11 | S240 |
| IB_D~4 | U718 | 12 | S374 |
| IB_D~5 | U206 | 13 | S240 |
| IB_D~5 | U718 | 15 | S374 |
| IB_D~6 | U206 | 15 | S240 |
| IB_D~6 | U718 | 16 | S374 |
| IB_D~7 | U206 | 17 | S240 |
| IB_D~7 | U718 | 19 | S374 |
| IB_D~8 | U526 | 2 | S240 |
| IB_D~9 | U526 | 4 | S240 |
| IB_D~9 | U717 | 5 | S374 |
| IB_EOL | U322 | 11 | LS240 |
| IB_EOL | U514 | 19 | LS273 |
| IB_EOL~ | U512 | 15 | LS244 |

| | | | | |
|---|---|---|---|---|
| IB_EOL~ | U422 | 17 | LS240 | |
| IB_EOL~ | U322 | 9 | LS240 | |
| IB_IRDY1~ | U624 | 1 | 316E 330 | 220 |
| IB_IRDY1~ | U720 | 2 | LS240 | |
| IB_IRDY2~ | U624 | 2 | 316E 330 | 220 |
| IB_IRDY2~ | U720 | 4 | LS240 | |
| IB_IRDY3~ | U624 | 3 | 316E 330 | 220 |
| IB_IRDY3~ | U720 | 6 | LS240 | |
| IB_SHIFT1~ | U512 | 2 | LS244 | |
| IB_SHIFT1~ | U719 | 9 | S241 | |
| IB_SHIFT2~ | U512 | 4 | LS244 | |
| IB_SHIFT2~ | U719 | 7 | S241 | |
| IB_SHIFT3~ | U719 | 5 | S241 | |
| IB_SHIFT3~ | U512 | 6 | LS244 | |
| IB_SHIFT~ | U726 | 13 | S240 | |
| IB_SHIFT~ | U223 | 15 | S139 | |
| IB_SHIFT~ | U114 | 6 | LS00 | |
| IDLE~ | U315 | 14 | F374 | |
| IDLE~ | U307 | 3 | S00 | |
| IDLE~ | U307 | 4 | S00 | |
| IDLE~ | U307 | 9 | S00 | |
| INIT1~ | U615 | 19 | LS273 | |
| INIT1~ | U316 | 2 | PAL20L8A | |
| INIT2~ | U412 | 1 | S195 | |
| INIT2~ | U316 | 22 | PAL20L8A | |
| INIT2~ | U113 | 4 | LS132 | |
| INIT2~ | U328 | 5 | LS08 | |
| INITB~ | U316 | 1 | PAL20L8A | |
| INITB~ | U715 | 14 | LS241 | |
| INITB~ | U508 | 2 | LS08 | |
| INIT_2940~ | U514 | 1 | LS273 | |
| INIT_2940~ | U320 | 9 | LS139 | |
| INIT~ | U715 | 6 | LS241 | |
| INTERRUPT~ | U119 | 3 | LS125 | |
| INTERRUPT~ | U308 | 6 | 316A102 | |
| IRDY1 | U720 | 18 | LS240 | |
| IRDY1 | U218 | 5 | PAL20L8A | |
| IRDY1 | U422 | 9 | LS240 | |
| IRDY2 | U720 | 16 | LS240 | |
| IRDY2 | U218 | 6 | PAL20L8A | |
| IRDY2 | U422 | 7 | LS240 | |
| IRDY3 | U720 | 14 | LS240 | |
| IRDY3 | U422 | 5 | LS240 | |
| IRDY3 | U218 | 7 | PAL20L8A | |
| IRDY~ | U218 | 18 | PAL20L8A | |
| IRDY~ | U220 | 22 | 2732 | |
| IRQ~ | U119 | 1 | LS125 | |
| IRQ~ | U209 | 13 | LS279 | |
| IRQ~ | U119 | 2 | LS125 | |
| IRQ~ | U613 | 8 | LS244 | |
| LAST_SEP~ | U304 | 5 | LS32 | |
| LAST_SEP~ | U508 | 6 | LS08 | |
| LBX_2NDARY | U615 | 16 | LS273 | |
| LBX_2NDARY | U313 | 6 | LS240 | |
| LBX_ACK | U118 | 10 | PAL20L8A | |
| LBX_ACK | U714 | 16 | LS240 | |
| LBX_ACK | U714 | 7 | LS240 | |
| LBX_ADR0 | U525 | 8 | LS125 | |
| LBX_ADR10 | U724 | 15 | 2940 | |

| | | | |
|---|---|---|---|
| LBX_ADR11 | U724 | 16 | 2940 |
| LBX_ADR1 | U723 | 12 | 2940 |
| LBX_ADR12 | U724 | 19 | 2940 |
| LBX_ADR13 | U724 | 26 | 2940 |
| LBX_ADR14 | U724 | 1 | 2940 |
| LBX_ADR15 | U724 | 2 | 2940 |
| LBX_ADR16 | U724 | 5 | 2940 |
| LBX_ADR17 | U725 | 12 | 2940 |
| LBX_ADR18 | U725 | 15 | 2940 |
| LBX_ADR19 | U725 | 16 | 2940 |
| LBX_ADR20 | U725 | 19 | 2940 |
| LBX_ADR21 | U725 | 26 | 2940 |
| LBX_ADR2 | U723 | 15 | 2940 |
| LBX_ADR22 | U725 | 1 | 2940 |
| LBX_ADR23 | U725 | 2 | 2940 |
| LBX_ADR3 | U723 | 16 | 2940 |
| LBX_ADR4 | U723 | 19 | 2940 |
| LBX_ADR5 | U723 | 26 | 2940 |
| LBX_ADR6 | U723 | 1 | 2940 |
| LBX_ADR7 | U723 | 2 | 2940 |
| LBX_ADR8 | U723 | 5 | 2940 |
| LBX_ADR9 | U724 | 12 | 2940 |
| LBX_ADRCLK | U315 | 5 | F374 |
| LBX_ADRCLK | U428 | 8 | PAL16L8A |
| LBX_ASTB~ | U715 | 15 | LS241 |
| LBX_ASTB~ | U118 | 17 | PAL20L8A |
| LBX_BHEN | U525 | 11 | LS125 |
| LBX_CYCLE_END | U111 | 15 | F374 |
| LBX_CYCLE_END | U401 | 2 | PAL14L4 |
| LBX_DB0 | U611 | 18 | LS244 |
| LBX_DB0 | U721 | 2 | LS244 |
| LBX_DB10 | U510 | 14 | LS244 |
| LBX_DB10 | U722 | 6 | LS244 |
| LBX_DB11 | U510 | 12 | LS244 |
| LBX_DB1 | U611 | 16 | LS244 |
| LBX_DB11 | U722 | 8 | LS244 |
| LBX_DB12 | U722 | 11 | LS244 |
| LBX_DB12 | U510 | 9 | LS244 |
| LBX_DB13 | U722 | 13 | LS244 |
| LBX_DB13 | U510 | 7 | LS244 |
| LBX_DB1 | U721 | 4 | LS244 |
| LBX_DB14 | U722 | 15 | LS244 |
| LBX_DB14 | U510 | 5 | LS244 |
| LBX_DB15 | U722 | 17 | LS244 |
| LBX_DB15 | U510 | 3 | LS244 |
| LBX_DB2 | U611 | 14 | LS244 |
| LBX_DB2 | U721 | 6 | LS244 |
| LBX_DB3 | U611 | 12 | LS244 |
| LBX_DB3 | U721 | 8 | LS244 |
| LBX_DB4 | U721 | 11 | LS244 |
| LBX_DB4 | U611 | 9 | LS244 |
| LBX_DB5 | U721 | 13 | LS244 |
| LBX_DB5 | U611 | 7 | LS244 |
| LBX_DB6 | U721 | 15 | LS244 |
| LBX_DB6 | U611 | 5 | LS244 |
| LBX_DB7 | U721 | 17 | LS244 |
| LBX_DB7 | U611 | 3 | LS244 |
| LBX_DB8 | U510 | 18 | LS244 |

| | | | |
|---|---|---|---|
| LBX_DB8 | U722 | 2 | LS244 |
| LBX_DB9 | U510 | 16 | LS244 |
| LBX_DB9 | U722 | 4 | LS244 |
| LBX_DSTB~ | U118 | 14 | PAL20L8A |
| LBX_DSTB~ | U715 | 17 | LS241 |
| LBX_DSTB~ | U315 | 2 | F374 |
| LBX_END | U118 | 8 | PAL20L8A |
| LBX_END | U413 | 9 | S74 |
| LBX_EOT | U409 | 11 | LS244 |
| LBX_EOT | U118 | 19 | PAL20L8A |
| LBX_OE | U601 | 10 | S00 |
| LBX_OE | U212 | 16 | LS273 |
| LBX_OE | U715 | 19 | LS241 |
| LBX_OE~ | R10 | 1 | RES 2K |
| LBX_OE~ | U525 | 10 | LS125 |
| LBX_OE~ | U525 | 13 | LS125 |
| LBX_OE~ | U723 | 20 | 2940 |
| LBX_OE~ | U715 | 9 | LS241 |
| LBX_PRIMARY | U615 | 12 | LS273 |
| LBX_PRIMARY | U422 | 2 | LS240 |
| LBX_PRST~ | U413 | 10 | S74 |
| LBX_PRST~ | U211 | 12 | LS273 |
| LBX_PRST~ | U118 | 4 | PAL20L8A |
| LBX_RDSTB | U106 | 14 | PAL20L8A |
| LBX_RDSTB | U121 | 3 | S32 |
| LBX_RL | U118 | 3 | PAL20L8A |
| LBX_RL | U212 | 5 | LS273 |
| LBX_WR_ACCESS~ | U611 | 1 | LS244 |
| LBX_WR_ACCESS~ | U715 | 13 | LS241 |
| LBX_WR_ACCESS~ | U611 | 19 | LS244 |
| LBX_WR_ACCESS~ | U601 | 8 | S00 |
| LBX_WR_RD~ | U401 | 19 | PAL14L4 |
| LBX_WR_RD~ | U106 | 3 | PAL20L8A |
| LBX_WR_RD~ | U601 | 9 | S00 |
| LINE_REQ | U317 | 1 | LS38 |
| LINE_REQ | U514 | 16 | LS273 |
| LINE_RQ~ | R401 | 1 | RES 10K |
| LINE_RQ~ | U512 | 11 | LS244 |
| LINE_RQ~ | U317 | 3 | LS38 |
| LOAD_PARAM~ | U305 | 4 | LS138 |
| LOCAL_CLK | U412 | 10 | S195 |
| LOCAL_CLK | U215 | 11 | F374 |
| LOCAL_CLK | U704 | 2 | 8288 |
| LOCAL_CLK | U313 | 4 | LS240 |
| LOCAL_CLK | U311 | 6 | S08 |
| LOCAL_CLK~ | U314 | 11 | F374 |
| LOCAL_CLK~ | U313 | 16 | LS240 |
| LOOP | U701 | 14 | LS139 |
| LOOP | U513 | 15 | LS273 |
| LP~ | U526 | 1 | S240 |
| LP~ | U206 | 19 | S240 |
| LP~ | U221 | 7 | S244 |
| MBAB0 | U305 | 1 | LS138 |
| MBAB0 | U705 | 18 | LS240 |
| MBAB0 | U320 | 2 | LS139 |
| MBAB11 | U705 | 12 | LS240 |
| MBAB1 | U705 | 16 | LS240 |
| MBAB1 | U305 | 2 | LS138 |
| MBAB12 | U705 | 9 | LS240 |

| | | | |
|---|---|---|---|
| MBAB1 | U320 | 3 | LS139 |
| MBAB13 | U705 | 7 | LS240 |
| MBAB14 | U705 | 5 | LS240 |
| MBAB15 | U705 | 3 | LS240 |
| MBAB16 | U713 | 18 | LS240 |
| MBAB17 | U713 | 16 | LS240 |
| MBAB18 | U713 | 14 | LS240 |
| MBAB19 | U713 | 12 | LS240 |
| MBAB20 | U713 | 9 | LS240 |
| MBAB2 | U705 | 14 | LS240 |
| MBAB21 | U713 | 7 | LS240 |
| MBAB22 | U713 | 5 | LS240 |
| MBAB2 | U305 | 3 | LS138 |
| MB_1ST_ADRCLK | U417 | 16 | LS273 |
| MB_1ST_ADRCLK | U414 | 2 | S32 |
| MB_ACK | U316 | 11 | PAL20L8A |
| MB_ACK | U714 | 18 | LS240 |
| MB_ACK | U714 | 9 | LS240 |
| MB_ADRCLK | U708 | 11 | 534 |
| MB_ADRCLK | U414 | 3 | S32 |
| MB_ADRCLK | U428 | 9 | PAL16L8A |
| MB_ADR_CLK | U401 | 1 | PAL14L4 |
| MB_ADR_CLK | U315 | 19 | F374 |
| MB_D0 | U610 | 18 | LS244 |
| MB_D0 | U509 | 2 | LS244 |
| MB_D0 | U420 | 3 | LS273 |
| MB_D10 | U609 | 14 | LS244 |
| MB_D10 | U709 | 16 | LS640 |
| MB_D10 | U719 | 6 | S241 |
| MB_D10 | U421 | 7 | LS273 |
| MB_D11 | U609 | 12 | LS244 |
| MB_D11 | U709 | 15 | LS640 |
| MB_D1 | U610 | 16 | LS244 |
| MB_D1 | U710 | 17 | LS640 |
| MB_D11 | U719 | 8 | S241 |
| MB_D12 | U519 | 11 | LS244 |
| MB_D12 | U421 | 13 | LS273 |
| MB_D12 | U709 | 14 | LS640 |
| MB_D12 | U409 | 2 | LS244 |
| MB_D12 | U609 | 9 | LS244 |
| MB_D13 | U709 | 13 | LS640 |
| MB_D13 | U421 | 14 | LS273 |
| MB_D13 | U409 | 4 | LS244 |
| MB_D13 | U609 | 7 | LS244 |
| MB_D1 | U509 | 4 | LS244 |
| MB_D14 | U709 | 12 | LS640 |
| MB_D14 | U519 | 15 | LS244 |
| MB_D14 | U421 | 17 | LS273 |
| MB_D14 | U609 | 5 | LS244 |
| MB_D14 | U409 | 6 | LS244 |
| MB_D15 | U709 | 11 | LS640 |
| MB_D15 | U519 | 17 | LS244 |
| MB_D15 | U421 | 18 | LS273 |
| MB_D15 | U609 | 3 | LS244 |
| MB_D15 | U409 | 8 | LS244 |
| MB_D2 | U610 | 14 | LS244 |
| MB_D2 | U710 | 16 | LS640 |
| MB_D2 | U509 | 6 | LS244 |
| MB_D2 | U420 | 7 | LS273 |
| MB_D3 | U610 | 12 | LS244 |

| | | | |
|---|---|---|---|
| MB_D3 | U710 | 15 | LS640 |
| MB_D3 | U509 | 8 | LS244 |
| MB_D4 | U509 | 11 | LS244 |
| MB_D4 | U420 | 13 | LS273 |
| MB_D4 | U710 | 14 | LS640 |
| MB_D4 | U610 | 9 | LS244 |
| MB_D5 | U509 | 13 | LS244 |
| MB_D5 | U420 | 14 | LS273 |
| MB_D5 | U610 | 7 | LS244 |
| MB_D6 | U710 | 12 | LS640 |
| MB_D6 | U509 | 15 | LS244 |
| MB_D6 | U420 | 17 | LS273 |
| MB_D6 | U610 | 5 | LS244 |
| MB_D7 | U710 | 11 | LS640 |
| MB_D7 | U509 | 17 | LS244 |
| MB_D7 | U420 | 18 | LS273 |
| MB_D7 | U610 | 3 | LS244 |
| MB_D8 | U609 | 18 | LS244 |
| MB_D8 | U719 | 2 | S241 |
| MB_D8 | U421 | 3 | LS273 |
| MB_D9 | U609 | 16 | LS244 |
| MB_D9 | U709 | 17 | LS640 |
| MB_D9 | U719 | 4 | S241 |
| MB_DEN~ | U327 | 13 | PAL16L8A |
| MB_DEN~ | U710 | 19 | LS640 |
| MB_DONE | R501 | 1 | RES 330 |
| MB_DONE | U522 | 7 | 2940 |
| MB_DONE | U316 | 9 | PAL20L8A |
| MB_EOT~ | U409 | 13 | LS244 |
| MB_EOT~ | U316 | 21 | PAL20L8A |
| MB_PRST~ | U316 | 5 | PAL20L8A |
| MB_PRST~ | U211 | 9 | LS273 |
| MB_RDSTB | U106 | 13 | PAL20L8A |
| MB_RDSTB | U307 | 2 | S00 |
| MB_RDSTB | U111 | 5 | F374 |
| MB_RL | U316 | 4 | PAL20L8A |
| MB_RL | U212 | 6 | LS273 |
| MB_WR_RD~ | U415 | 16 | LS273 |
| MB_WR_RD~ | U106 | 2 | PAL20L8A |
| MB_WR_RD~ | U401 | 5 | PAL14L4 |
| MB_WR_RD~ | U714 | 6 | LS240 |
| MIRROR | U501 | 23 | 2732 |
| MIRROR | U517 | 6 | LS273 |
| MRDC~ | U715 | 2 | LS241 |
| MRDC~ | U704 | 7 | 8288 |
| MRD~ | U320 | 1 | LS139 |
| MRD~ | U327 | 9 | PAL16L8A |
| MWTC~ | U715 | 4 | LS241 |
| MWTC~ | U704 | 9 | 8288 |
| NPX0 | U420 | 2 | LS273 |
| NPX0 | U216 | 3 | LS461 |
| NPX10 | U217 | 5 | LS461 |
| NPX10 | U421 | 6 | LS273 |
| NPX11 | U217 | 6 | LS461 |
| NPX11 | U421 | 9 | LS273 |
| NPX12 | U421 | 12 | LS273 |
| NPX12 | U217 | 7 | LS461 |

| | | | |
|---|---|---|---|
| NPX13 | U421 | 15 | LS273 |
| NPX13 | U217 | 8 | LS461 |
| NPX1 | U216 | 4 | LS461 |
| NPX14 | U421 | 16 | LS273 |
| NPX14 | U217 | 9 | LS461 |
| NPX1 | U420 | 5 | LS273 |
| NPX2 | U216 | 5 | LS461 |
| NPX2 | U420 | 6 | LS273 |
| NPX3 | U216 | 6 | LS461 |
| NPX3 | U420 | 9 | LS273 |
| NPX4 | U420 | 12 | LS273 |
| NPX4 | U216 | 7 | LS461 |
| NPX5 | U420 | 15 | LS273 |
| NPX5 | U216 | 8 | LS461 |
| NPX6 | U420 | 16 | LS273 |
| NPX6 | U216 | 9 | LS461 |
| NPX7 | U216 | 10 | LS461 |
| NPX7 | U420 | 19 | LS273 |
| NPX8 | U421 | 2 | LS273 |
| NPX8 | U217 | 3 | LS461 |
| NPX9 | U217 | 4 | LS461 |
| NPX9 | U421 | 5 | LS273 |
| NRML~ | U726 | 1 | S240 |
| NRML~ | U526 | 19 | S240 |
| NRML~ | U221 | 9 | S244 |
| OB_D0 | U509 | 18 | LS244 |
| OB_D0 | U407 | 2 | LS244 |
| OB_D10 | U726 | 14 | S240 |
| OB_D10 | U406 | 6 | LS244 |
| OB_D11 | U726 | 12 | S240 |
| OB_D1 | U509 | 16 | LS244 |
| OB_D11 | U406 | 8 | LS244 |
| OB_D12 | U406 | 11 | LS244 |
| OB_D12 | U409 | 18 | LS244 |
| OB_D13 | U406 | 13 | LS244 |
| OB_D13 | U409 | 16 | LS244 |
| OB_D1 | U407 | 4 | LS244 |
| OB_D14 | U409 | 14 | LS244 |
| OB_D14 | U406 | 15 | LS244 |
| OB_D15 | U409 | 12 | LS244 |
| OB_D15 | U406 | 17 | LS244 |
| OB_D2 | U509 | 14 | LS244 |
| OB_D2 | U407 | 6 | LS244 |
| OB_D3 | U509 | 12 | LS244 |
| OB_D3 | U407 | 8 | LS244 |
| OB_D4 | U407 | 11 | LS244 |
| OB_D4 | U509 | 9 | LS244 |
| OB_D5 | U407 | 13 | LS244 |
| OB_D5 | U509 | 7 | LS244 |
| OB_D6 | U407 | 15 | LS244 |
| OB_D6 | U509 | 5 | LS244 |
| OB_D7 | U407 | 17 | LS244 |
| OB_D7 | U509 | 3 | LS244 |
| OB_D8 | U726 | 18 | S240 |
| OB_D8 | U406 | 2 | LS244 |
| OB_D9 | U726 | 16 | S240 |
| OB_D9 | U406 | 4 | LS244 |
| OB_EOL~ | U623 | 11 | 316E 330 220 |
| OB_EOL~ | U720 | 8 | LS240 |

| | | | | |
|---|---|---|---|---|
| OB_RDY | U417 | 9 | LS273 | |
| OB_RDY~ | U422 | 11 | LS240 | |
| OB_RDY~ | U322 | 12 | LS240 | |
| OB_RDY~ | U422 | 13 | LS240 | |
| OB_RDY~ | U422 | 15 | LS240 | |
| OB_SF1~ | U623 | 10 | 316E 330 | 220 |
| OB_SF1~ | U526 | 13 | S240 | |
| OB~0 | U623 | 1 | 316E 330 | 220 |
| OB~0 | U727 | 2 | S240 | |
| OB~10 | U623 | 12 | 316E 330 | 220 |
| OB~10 | U726 | 6 | S240 | |
| OB~11 | U726 | 8 | S240 | |
| OB~11 | U623 | 9 | 316E 330 | 220 |
| OB~1 | U623 | 2 | 316E 330 | 220 |
| OB~1 | U727 | 4 | S240 | |
| OB~2 | U623 | 3 | 316E 330 | 220 |
| OB~2 | U727 | 6 | S240 | |
| OB~3 | U623 | 4 | 316E 330 | 220 |
| OB~3 | U727 | 8 | S240 | |
| OB~4 | U727 | 11 | S240 | |
| OB~4 | U623 | 5 | 316E 330 | 220 |
| OB~5 | U727 | 13 | S240 | |
| OB~5 | U623 | 6 | 316E 330 | 220 |
| OB~6 | U727 | 15 | S240 | |
| OB~6 | U623 | 7 | 316E 330 | 220 |
| OB~7 | U623 | 15 | 316E 330 | 220 |
| OB~7 | U727 | 17 | S240 | |
| OB~8 | U623 | 14 | 316E 330 | 220 |
| OB~8 | U726 | 2 | S240 | |
| OB~9 | U623 | 13 | 316E 330 | 220 |
| OB~9 | U726 | 4 | S240 | |
| OLD0 | U602 | 2 | LS684 | |
| OLD0 | U711 | 3 | LS374 | |
| OLD1 | U602 | 4 | LS684 | |
| OLD1 | U603 | 5 | LS273 | |
| OLD2 | U602 | 6 | LS684 | |
| OLD2 | U711 | 7 | LS374 | |
| OLD3 | U602 | 8 | LS684 | |
| OLD3 | U603 | 9 | LS273 | |
| OLD4 | U602 | 11 | LS684 | |
| OLD4 | U603 | 12 | LS273 | |
| OLD4 | U711 | 13 | LS374 | |
| OLD5 | U602 | 13 | LS684 | |
| OLD5 | U711 | 14 | LS374 | |
| OLD5 | U603 | 15 | LS273 | |
| OLD6 | U602 | 15 | LS684 | |
| OLD6 | U603 | 16 | LS273 | |
| OLD6 | U711 | 17 | LS374 | |
| OLD7 | U602 | 17 | LS684 | |
| OLD7 | U711 | 18 | LS374 | |
| OLD7 | U603 | 19 | LS273 | |
| OSC300NS | U112 | 1 | LS112 | |
| OSC300NS | U412 | 14 | S195 | |
| OSC300NS | U114 | 5 | LS00 | |
| OSC300NS | U101 | 8 | LS240 | |
| OUT_CARD_SEL~ | U422 | 4 | LS240 | |
| OUT_CARD_SEL~ | U327 | 7 | PAL16L8A | |
| OVFLO | U207 | 11 | LS244 | |
| OVFLO | U414 | 12 | S32 | |

| | | | |
|---|---|---|---|
| OVFLO | U207 | 13 | LS244 |
| OVFLO | U207 | 15 | LS244 |
| OVFLO | U208 | 6 | LS74 |
| BCLK~ | | P1-15 | CONNECTOR |
| INIT~ | | P1-16 | CONNECTOR |
| BPRN~ | | P1-17 | CONNECTOR |
| BPRO~ | | P1-18 | CONNECTOR |
| BUSY~ | | P1-19 | CONNECTOR |
| BREQ~ | | P1-20 | CONNECTOR |
| IB_D~2 | | P1-21 | CONNECTOR |
| MRDC~ | | P1-23 | CONNECTOR |
| MWTC~ | | P1-24 | CONNECTOR |
| XACK~ | | P1-27 | CONNECTOR |
| IB_D~6 | | P1-31 | CONNECTOR |
| BHEN~ | | P1-33 | CONNECTOR |
| ADR10~ | | P1-34 | CONNECTOR |
| CBRQ~ | | P1-35 | CONNECTOR |
| ADR11~ | | P1-36 | CONNECTOR |
| CCLK~ | | P1-37 | CONNECTOR |
| ADR12~ | | P1-38 | CONNECTOR |
| ADR13~ | | P1-40 | CONNECTOR |
| IB_D~7 | | P1-41 | CONNECTOR |
| IB_D~8 | | P1-51 | CONNECTOR |
| ADRE~ | | P1-53 | CONNECTOR |
| ADRF~ | | P1-54 | CONNECTOR |
| ADRC~ | | P1-55 | CONNECTOR |
| ADRD~ | | P1-56 | CONNECTOR |
| ADRA~ | | P1-57 | CONNECTOR |
| ADRB~ | | P1-58 | CONNECTOR |
| ADR8~ | | P1-59 | CONNECTOR |
| ADR9~ | | P1-60 | CONNECTOR |
| IB_EOL~ | | P1-61 | CONNECTOR |
| ADR6~ | | P1-63 | CONNECTOR |
| ADR7~ | | P1-64 | CONNECTOR |
| ADR4~ | | P1-65 | CONNECTOR |
| ADR5~ | | P1-66 | CONNECTOR |
| ADR2~ | | P1-67 | CONNECTOR |
| ADR3~ | | P1-68 | CONNECTOR |
| ADR0~ | | P1-69 | CONNECTOR |
| ADR1~ | | P1-70 | CONNECTOR |
| OB_EOL~ | | P1-71 | CONNECTOR |
| DAT14~ | | P1-73 | CONNECTOR |
| DAT15~ | | P1-74 | CONNECTOR |
| DAT12~ | | P1-75 | CONNECTOR |
| DAT13~ | | P1-76 | CONNECTOR |
| DAT10~ | | P1-77 | CONNECTOR |
| DAT11~ | | P1-78 | CONNECTOR |
| DAT8~ | | P1-79 | CONNECTOR |
| DAT9~ | | P1-80 | CONNECTOR |
| LINE_RQ~ | | P1-81 | CONNECTOR |
| DAT6~ | | P1-83 | CONNECTOR |
| DAT7~ | | P1-84 | CONNECTOR |
| DAT4~ | | P1-85 | CONNECTOR |
| DAT5~ | | P1-86 | CONNECTOR |
| DAT2~ | | P1-87 | CONNECTOR |
| DAT3~ | | P1-88 | CONNECTOR |
| DAT0~ | | P1-89 | CONNECTOR |
| DAT1~ | | P1-90 | CONNECTOR |
| OB_RDY~ | | P1-91 | CONNECTOR |

| | | |
|---|---|---|
| IB¯D~0 | P2-1 | CONNECTOR |
| IB¯D~5 | P2-100 | CONNECTOR |
| IB¯D~10 | P2-11 | CONNECTOR |
| IB¯D~11 | P2-13 | CONNECTOR |
| IB¯D~9 | P2-14 | CONNECTOR |
| IB¯SHIFT1~ | P2-15 | CONNECTOR |
| LBX¯DB1 | P2-16 | CONNECTOR |
| IB¯SHIFT2~ | P2-17 | CONNECTOR |
| LBX¯DB3 | P2-18 | CONNECTOR |
| IB¯SHIFT3~ | P2-19 | CONNECTOR |
| LBX¯DB5 | P2-20 | CONNECTOR |
| IB¯D~1 | P2-21 | CONNECTOR |
| IB¯IRDY1~ | P2-23 | CONNECTOR |
| LBX¯DB7 | P2-24 | CONNECTOR |
| IB¯IRDY2~ | P2-25 | CONNECTOR |
| LBX¯DB8 | P2-26 | CONNECTOR |
| IB¯IRDY3~ | P2-27 | CONNECTOR |
| LBX¯DB10 | P2-28 | CONNECTOR |
| INTERRUPT~ | P2-29 | CONNECTOR |
| LBX¯DB12 | P2-30 | CONNECTOR |
| LBX¯DB0 | P2-31 | CONNECTOR |
| LBX¯DB2 | P2-33 | CONNECTOR |
| LBX¯DB14 | P2-34 | CONNECTOR |
| LBX¯DB4 | P2-35 | CONNECTOR |
| LBX¯ADR1 | P2-36 | CONNECTOR |
| LBX¯DB6 | P2-37 | CONNECTOR |
| LBX¯ADR3 | P2-38 | CONNECTOR |
| LBX¯DB9 | P2-39 | CONNECTOR |
| LBX¯ADR5 | P2-40 | CONNECTOR |
| LBX¯DB11 | P2-41 | CONNECTOR |
| LBX¯DB13 | P2-43 | CONNECTOR |
| LBX¯ADR7 | P2-44 | CONNECTOR |
| LBX¯DB15 | P2-45 | CONNECTOR |
| LBX¯ADR8 | P2-46 | CONNECTOR |
| LBX¯ADR0 | P2-47 | CONNECTOR |
| LBX¯ADR10 | P2-48 | CONNECTOR |
| LBX¯ADR2 | P2-49 | CONNECTOR |
| LBX¯ADR12 | P2-50 | CONNECTOR |
| LBX¯ADR4 | P2-51 | CONNECTOR |
| LBX¯ADR6 | P2-53 | CONNECTOR |
| LBX¯ADR14 | P2-54 | CONNECTOR |
| LBX¯ADR9 | P2-55 | CONNECTOR |
| LBX¯ADR17 | P2-56 | CONNECTOR |
| LBX¯ADR11 | P2-57 | CONNECTOR |
| LBX¯ADR19 | P2-58 | CONNECTOR |
| LBX¯ADR13 | P2-59 | CONNECTOR |
| LBX¯ADR21 | P2-60 | CONNECTOR |
| LBX¯ADR15 | P2-61 | CONNECTOR |
| LBX¯ADR16 | P2-63 | CONNECTOR |
| LBX¯ADR23 | P2-64 | CONNECTOR |
| LBX¯ADR18 | P2-65 | CONNECTOR |
| ACK~ | P2-66 | CONNECTOR |
| LBX¯ADR20 | P2-67 | CONNECTOR |
| R/W~ | P2-68 | CONNECTOR |
| LBX¯ADR22 | P2-69 | CONNECTOR |
| DSTB~ | P2-70 | CONNECTOR |
| LBX¯BHEN | P2-73 | CONNECTOR |
| SMACK~ | P2-74 | CONNECTOR |
| ASTB~ | P2-75 | CONNECTOR |
| ADR23~ | P2-76 | CONNECTOR |

| | | | |
|---|---|---|---|
| SMRQ~ | | P2-77 | CONNECTOR |
| ADR21~ | | P2-78 | CONNECTOR |
| ADR22~ | | P2-81 | CONNECTOR |
| ADR20~ | | P2-83 | CONNECTOR |
| OB~1 | | P2-84 | CONNECTOR |
| OB~0 | | P2-85 | CONNECTOR |
| OB~3 | | P2-86 | CONNECTOR |
| OB~2 | | P2-87 | CONNECTOR |
| OB~5 | | P2-88 | CONNECTOR |
| OB~4 | | P2-89 | CONNECTOR |
| OB~7 | | P2-90 | CONNECTOR |
| OB~6 | | P2-91 | CONNECTOR |
| OB~8 | | P2-93 | CONNECTOR |
| OB~9 | | P2-94 | CONNECTOR |
| OB~10 | | P2-95 | CONNECTOR |
| OB~11 | | P2-96 | CONNECTOR |
| OB_SF1~ | | P2-97 | CONNECTOR |
| IB_D~4 | | P2-98 | CONNECTOR |
| IB_D~3 | | P2-99 | CONNECTOR |
| PAR1_STRB~ | U614 | 11 | LS273 |
| PAR1_STRB~ | U305 | 15 | LS138 |
| PAR2_STRB~ | U615 | 11 | LS273 |
| PAR2_STRB~ | U305 | 14 | LS138 |
| PAR4_STRB~ | U420 | 11 | LS273 |
| PAR4_STRB~ | U305 | 12 | LS138 |
| PD1~ | U215 | 1 | F374 |
| PD1~ | U402 | 13 | PAL20L8A |
| PD1~ | U705 | 19 | LS240 |
| PD1~ | U313 | 3 | LS240 |
| PD2~ | U101 | 1 | LS240 |
| PD2~ | U301 | 11 | PAL16R4A |
| PD2~ | U107 | 13 | LS461 |
| PD2~ | U501 | 18 | 2732 |
| PD2~ | U713 | 19 | LS240 |
| PD2~ | U501 | 20 | 2732 |
| PD2~ | U313 | 9 | LS240 |
| PD9~ | U104 | 1 | S244 |
| PD9~ | U218 | 13 | PAL20L8A |
| PD9~ | U221 | 19 | S244 |
| PD9~ | U313 | 7 | LS240 |
| PU1 | U308 | 1 | 316A102 |
| PU1 | U108 | 10 | LS161 |
| PU12 | U525 | 12 | LS125 |
| PU12 | U525 | 5 | LS125 |
| PU13 | U306 | 1 | LS164 |
| PU13 | U308 | 11 | 316A102 |
| PU13 | U109 | 2 | LS240 |
| PU13 | U109 | 4 | LS240 |
| PU13 | U109 | 6 | LS240 |
| PU13 | U109 | 8 | LS240 |
| PU1 | U108 | 7 | LS161 |
| PU1 | U108 | 9 | LS161 |
| PU2 | U112 | 10 | LS112 |
| PU2 | U112 | 11 | LS112 |
| PU2 | U308 | 12 | 316A102 |
| PU4 | U420 | 1 | LS273 |
| PU4 | U217 | 10 | LS461 |
| PU4 | U313 | 13 | LS240 |
| PU4 | U719 | 19 | S241 |

| | | | |
|---|---|---|---|
| PU4 | U412 | 2 | S195 |
| PU4 | U412 | 3 | S195 |
| PU4 | U412 | 6 | S195 |
| PU5 | U603 | 1 | LS273 |
| PU5 | U410 | 10 | LS461 |
| PU5 | U411 | 11 | LS461 |
| PU5 | U210 | 13 | LS74 |
| PU5 | U112 | 15 | LS112 |
| PU5 | U308 | 2 | 316A102 |
| PU5 | U411 | 3 | LS461 |
| PU5 | U112 | 4 | LS112 |
| PU5 | U410 | 8 | LS461 |
| PU5 | U410 | 9 | LS461 |
| PU8 | U309 | 1 | S74 |
| PU8 | U309 | 10 | S74 |
| PU8 | U309 | 13 | S74 |
| PU8 | U704 | 15 | 8288 |
| PU8 | U704 | 18 | 8288 |
| PU8 | U308 | 7 | 316A102 |
| PU9 | U427 | 10 | LS161 |
| PU9 | U427 | 3 | LS161 |
| PU9 | U308 | 4 | 316A102 |
| PU9 | U427 | 5 | LS161 |
| PU9 | U427 | 6 | LS161 |
| PU9 | U427 | 7 | LS161 |
| Q0 | U414 | 10 | S32 |
| Q0 | U402 | 18 | PAL20L8A |
| Q1 | U402 | 17 | PAL20L8A |
| Q1 | U414 | 9 | S32 |
| QF | U306 | 11 | LS164 |
| QF | U713 | 17 | LS240 |
| R/W~ | U715 | 7 | LS241 |
| RD_RL_COLOR~ | U711 | 1 | LS374 |
| RD_RL_COLOR~ | U321 | 9 | LS138 |
| RD_RL_L~ | U321 | 11 | LS138 |
| RD_RL_L~ | U411 | 13 | LS461 |
| RD_RL_U~ | U321 | 10 | LS138 |
| RD_RL_U~ | U410 | 13 | LS461 |
| RD_RL_U~ | U207 | 19 | LS244 |
| RD~ | U328 | 1 | LS08 |
| RD~ | U115 | 17 | 80C31 |
| RD~ | U321 | 5 | LS138 |
| READ_8051~ | U320 | 5 | LS139 |
| READ_IB~ | U419 | 1 | LS240 |
| READ_IB~ | U419 | 19 | LS240 |
| READ_IB~ | U320 | 6 | LS139 |
| READ_MBL~ | U321 | 15 | LS138 |
| READ_MBU~ | U321 | 14 | LS138 |
| RL_ADV1~ | U114 | 2 | LS00 |
| RL_ADV1~ | U318 | 7 | LS138 |
| RL_CARRY_MSB~ | U410 | 14 | LS461 |
| RL_CARRY_MSB~ | U613 | 17 | LS244 |
| RL_CARRY_MSB~ | U304 | 9 | LS32 |
| RL_CLK | U411 | 1 | LS461 |
| RL_CLK | U210 | 11 | LS74 |
| RL_CLK | U401 | 3 | PAL14L4 |
| RL_CLK | U613 | 6 | LS244 |
| RL_MODE | U212 | 2 | LS273 |
| RL_MODE | U401 | 6 | PAL14L4 |

| | | | |
|---|---|---|---|
| RL_RDY | U613 | 11 | LS244 |
| RL_RDY | U409 | 15 | LS244 |
| RL_RDY | U112 | 5 | LS112 |
| RST_TIMING | U111 | 12 | F374 |
| RST_TIMING | U111 | 14 | F374 |
| RST_TIMING | U118 | 9 | PAL20L8A |
| S | U404 | 11 | PAL16L8A |
| S | U308 | 14 | 316A102 . |
| S | W501 | 2 | JUMP |
| S | U120 | 6 | PAL16L8A |
| SAMPLED_ACK | U307 | 1 | S00 |
| SAMPLED_ACK | U315 | 13 | F374 |
| SAMPLED_ACK | U111 | 4 | F374 |
| SAMPLED_ACK | U316 | 7 | PAL20L8A |
| SAMPLED_ACK | U315 | 9 | F374 |
| SAMPLED_IDLE~ | U316 | 13 | PAL20L8A |
| SAMPLED_IDLE~ | U315 | 15 | F374 |
| SAMPLED_IDLE~ | U315 | 17 | F374 |
| SECOND_LINE | U417 | 19 | LS273 |
| SECOND_LINE | U301 | 7 | PAL16R4A |
| SELECTED_WR~ | U402 | 1 | PAL20L8A |
| SELECTED_WR~ | U106 | 21 | PAL20L8A |
| SEND_8051~ | U508 | 11 | LS08 |
| SEP_N0 | U220 | 1 | 2732 |
| SEP_N0 | U614 | 2 | LS273 |
| SEP_N1 | U220 | 23 | 2732 |
| SEP_N1 | U614 | 5 | LS273 |
| SEQ0 | U218 | 22 | PAL20L8A |
| SEQ0 | U220 | 8 | 2732 |
| SEQ1 | U218 | 21 | PAL20L8A |
| SEQ1 | U220 | 7 | 2732 |
| SEQ2 | U218 | 20 | PAL20L8A |
| SEQ2 | U220 | 6 | 2732 |
| SEQ3 | U218 | 19 | PAL20L8A |
| SEQ3 | U220 | 5 | 2732 |
| SET_INT~ | U318 | 10 | LS138 |
| SET_INT~ | U209 | 14 | LS279 |
| SHIFTS_END~ | U218 | 17 | PAL20L8A |
| SHIFTS_END~ | U220 | 19 | 2732 |
| SHIFTS_END~ | U512 | 8 | LS244 |
| SMACK_IN~ | U207 | 14 | LS244 |
| SMACK_IN~ | U115 | 6 | 80C31 |
| SMACK_OUT~ | U212 | 12 | LS273 |
| SMACK_OUT~ | U119 | 9 | LS125 |
| SMACK~ | R102 | 1 | RES 1K |
| SMACK~ | U207 | 6 | LS244 |
| SMACK~ | U119 | 8 | LS125 |
| SMRQ_IN~ | U207 | 16 | LS244 |
| SMRQ_IN~ | U115 | 5 | 80C31 |
| SMRQ_OUT~ | U212 | 15 | LS273 |
| SMRQ_OUT~ | U119 | 5 | LS125 |
| SMRQ~ | R101 | 1 | RES 1K |
| SMRQ~ | U207 | 4 | LS244 |
| SMRQ~ | U119 | 6 | LS125 |
| SQF_PRST~ | U222 | 1 | LS273 |
| SQF_PRST~ | U218 | 10 | PAL20L8A |
| SQF_PRST~ | U216 | 2 | LS461 |
| SQF_PRST~ | U208 | 9 | LS74 |
| START_ASTB~ | U118 | 11 | PAL20L8A |

| | | | |
|---|---|---|---|
| START_ASTB~ | U121 | 2 | S32 |
| START_ASTB~ | U111 | 6 | F374 |
| START_ASTB~ | U111 | 8 | F374 |
| STEP_MODE~ | U401 | 11 | PAL14L4 |
| STEP_MODE~ | U513 | 16 | LS273 |
| STEP_MODE~ | U309 | 4 | S74 |
| STEP_MODE~ | U118 | 5 | PAL20L8A |
| STEP_WT~ | U118 | 21 | PAL20L8A |
| STEP_WT~ | U113 | 8 | LS132 |
| STOP_ASTB~ | U118 | 13 | PAL20L8A |
| STOP_ASTB~ | U111 | 9 | F374 |
| STOP_RLCLK~ | U413 | 1 | S74 |
| STOP_RLCLK~ | U210 | 10 | LS74 |
| STOP_RLCLK~ | U113 | 2 | LS132 |
| STOP_RLCLK~ | U112 | 6 | LS112 |
| STRT_LBX~ | U428 | 12 | PAL16L8A |
| STRT_LBX~ | U413 | 13 | S74 |
| STRT_MLTBS~ | U428 | 13 | PAL16L8A |
| STRT_MLTBS~ | U316 | 3 | PAL20L8A |
| STRT_RL~ | U209 | 10 | LS279 |
| STRT_RL~ | U318 | 15 | LS138 |
| STRT_RL~ | U208 | 4 | LS74 |
| SYNC_CHANGE~ | U209 | 11 | LS279 |
| SYNC_CHANGE~ | U413 | 6 | S74 |
| TB0_A0 | U204 | 11 | HM66202 |
| TB0_A0 | U108 | 14 | LS161 |
| TB0_A10 | U107 | 16 | LS461 |
| TB0_A10 | U204 | 22 | HM66202 |
| TB0_A1 | U204 | 10 | HM66202 |
| TB0_A11 | U107 | 15 | LS461 |
| TB0_A11 | U204 | 24 | HM66202 |
| TB0_A1 | U108 | 13 | LS161 |
| TB0_A12 | U301 | 13 | PAL16R4A |
| TB0_A12 | U204 | 3 | HM66202 |
| TB0_A2 | U108 | 12 | LS161 |
| TB0_A2 | U204 | 9 | HM66202 |
| TB0_A3 | U108 | 11 | LS161 |
| TB0_A3 | U204 | 8 | HM66202 |
| TB0_A4 | U107 | 22 | LS461 |
| TB0_A4 | U204 | 7 | HM66202 |
| TB0_A5 | U107 | 21 | LS461 |
| TB0_A5 | U204 | 6 | HM66202 |
| TB0_A6 | U107 | 20 | LS461 |
| TB0_A6 | U204 | 5 | HM66202 |
| TB0_A7 | U107 | 19 | LS461 |
| TB0_A7 | U204 | 4 | HM66202 |
| TB0_A8 | U107 | 18 | LS461 |
| TB0_A8 | U204 | 26 | HM66202 |
| TB0_A9 | U107 | 17 | LS461 |
| TB0_A9 | U204 | 25 | HM66202 |
| TB0_D0 | U204 | 12 | HM66202 |
| TB0_D0 | U408 | 18 | LS244 |
| TB0_D0 | U608 | 3 | LS374 |
| TB0_D10 | U407 | 14 | LS244 |
| TB0_D10 | U607 | 7 | LS374 |
| TB0_D11 | U407 | 12 | LS244 |
| TB0_D11 | U203 | 16 | HM66202 |
| TB0_D1 | U204 | 13 | HM66202 |
| TB0_D1 | U408 | 16 | LS244 |

| | | | |
|---|---|---|---|
| TB0_D11 | U607 | 8 | LS374 |
| TB0_D12 | U607 | 13 | LS374 |
| TB0_D12 | U203 | 17 | HM66202 |
| TB0_D12 | U407 | 9 | LS244 |
| TB0_D13 | U607 | 14 | LS374 |
| TB0_D13 | U203 | 18 | HM66202 |
| TB0_D13 | U407 | 7 | LS244 |
| TB0_D1 | U608 | 4 | LS374 |
| TB0_D14 | U607 | 17 | LS374 |
| TB0_D14 | U203 | 19 | HM66202 |
| TB0_D14 | U407 | 5 | LS244 |
| TB0_D15 | U607 | 18 | LS374 |
| TB0_D15 | U203 | 20 | HM66202 |
| TB0_D15 | U407 | 3 | LS244 |
| TB0_D2 | U408 | 14 | LS244 |
| TB0_D2 | U608 | 7 | LS374 |
| TB0_D3 | U408 | 12 | LS244 |
| TB0_D3 | U204 | 16 | HM66202 |
| TB0_D3 | U608 | 8 | LS374 |
| TB0_D4 | U608 | 13 | LS374 |
| TB0_D4 | U204 | 17 | HM66202 |
| TB0_D4 | U408 | 9 | LS244 |
| TB0_D5 | U608 | 14 | LS374 |
| TB0_D5 | U204 | 18 | HM66202 |
| TB0_D5 | U408 | 7 | LS244 |
| TB0_D6 | U608 | 17 | LS374 |
| TB0_D6 | U204 | 19 | HM66202 |
| TB0_D6 | U408 | 5 | LS244 |
| TB0_D7 | U608 | 18 | LS374 |
| TB0_D7 | U204 | 20 | HM66202 |
| TB0_D7 | U408 | 3 | LS244 |
| TB0_D8 | U203 | 12 | HM66202 |
| TB0_D8 | U407 | 18 | LS244 |
| TB0_D8 | U607 | 3 | LS374 |
| TB0_D9 | U203 | 13 | HM66202 |
| TB0_D9 | U407 | 16 | LS244 |
| TB0_D9 | U607 | 4 | LS374 |
| TB1_A0 | U201 | 11 | HM66202 |
| TB1_A0 | U103 | 14 | LS161 |
| TB1_A10 | U102 | 16 | LS461 |
| TB1_A10 | U201 | 22 | HM66202 |
| TB1_A1 | U201 | 10 | HM66202 |
| TB1_A11 | U102 | 15 | LS461 |
| TB1_A11 | U201 | 24 | HM66202 |
| TB1_A1 | U103 | 13 | LS161 |
| TB1_A12 | U301 | 12 | PAL16R4A |
| TB1_A12 | U201 | 3 | HM66202 |
| TB1_A2 | U103 | 12 | LS161 |
| TB1_A2 | U201 | 9 | HM66202 |
| TB1_A3 | U103 | 11 | LS161 |
| TB1_A3 | U201 | 8 | HM66202 |
| TB1_A4 | U102 | 22 | LS461 |
| TB1_A4 | U201 | 7 | HM66202 |
| TB1_A5 | U102 | 21 | LS461 |
| TB1_A5 | U201 | 6 | HM66202 |
| TB1_A6 | U102 | 20 | LS461 |
| TB1_A6 | U201 | 5 | HM66202 |

| | | | |
|---|---|---|---|
| TB1_A7 | U102 | 19 | LS461 |
| TB1¯A7 | U201 | 4 | HM66202 |
| TB1¯A8 | U102 | 18 | LS461 |
| TB1¯A8 | U201 | 26 | HM66202 |
| TB1¯A9 | U102 | 17 | LS461 |
| TB1¯A9 | U201 | 25 | HM66202 |
| TB1¯D0 | U201 | 12 | HM66202 |
| TB1¯D0 | U604 | 18 | LS244 |
| TB1¯D0 | U606 | 3 | LS374 |
| TB1¯D10 | U503 | 14 | LS244 |
| TB1¯D10 | U605 | 7 | LS374 |
| TB1¯D11 | U503 | 12 | LS244 |
| TB1¯D11 | U202 | 16 | HM66202 |
| TB1¯D1 | U201 | 13 | HM66202 |
| TB1¯D1 | U604 | 16 | LS244 |
| TB1¯D11 | U605 | 8 | LS374 |
| TB1¯D12 | U605 | 13 | LS374 |
| TB1¯D12 | U202 | 17 | HM66202 |
| TB1¯D12 | U503 | 9 | LS244 |
| TB1¯D13 | U605 | 14 | LS374 |
| TB1¯D13 | U202 | 18 | HM66202 |
| TB1¯D13 | U503 | 7 | LS244 |
| TB1¯D1 | U606 | 4 | LS374 |
| TB1¯D14 | U605 | 17 | LS374 |
| TB1¯D14 | U202 | 19 | HM66202 |
| TB1¯D14 | U503 | 5 | LS244 |
| TB1¯D15 | U605 | 18 | LS374 |
| TB1¯D15 | U202 | 20 | HM66202 |
| TB1¯D15 | U503 | 3 | LS244 |
| TB1¯D2 | U201 | 14 | HM66202 |
| TB1¯D2 | U606 | 7 | LS374 |
| TB1¯D3 | U604 | 12 | LS244 |
| TB1¯D3 | U201 | 16 | HM66202 |
| TB1¯D3 | U606 | 8 | LS374 |
| TB1¯D4 | U606 | 13 | LS374 |
| TB1¯D4 | U201 | 17 | HM66202 |
| TB1¯D4 | U604 | 9 | LS244 |
| TB1¯D5 | U606 | 14 | LS374 |
| TB1¯D5 | U201 | 18 | HM66202 |
| TB1¯D5 | U604 | 7 | LS244 |
| TB1¯D6 | U606 | 17 | LS374 |
| TB1¯D6 | U201 | 19 | HM66202 |
| TB1¯D6 | U604 | 5 | LS244 |
| TB1¯D7 | U606 | 18 | LS374 |
| TB1¯D7 | U201 | 20 | HM66202 |
| TB1¯D7 | U604 | 3 | LS244 |
| TB1¯D8 | U202 | 12 | HM66202 |
| TB1¯D8 | U503 | 18 | LS244 |
| TB1¯D8 | U605 | 3 | LS374 |
| TB1¯D9 | U202 | 13 | HM66202 |
| TB1¯D9 | U503 | 16 | LS244 |
| TB1¯D9 | U605 | 4 | LS374 |
| TEST~ | U509 | 1 | LS244 |
| TEST~ | U509 | 19 | LS244 |
| TEST~ | U221 | 5 | S244 |
| TIME_OUT | U409 | 17 | LS244 |
| TIME¯OUT | U316 | 6 | PAL20L8A |
| TST | U701 | 13 | LS139 |
| TST | U513 | 19 | LS273 |

| | | | |
|---|---|---|---|
| TWELVE_BITS | U106 | 10 | PAL20L8A |
| TWELVE_BITS | U513 | 2 | LS273 |
| TWELVE_BITS | U402 | 3 | PAL20L8A |
| TWO_LINES | U614 | 19 | LS273 |
| TWO_LINES | U402 | 23 | PAL20L8A |
| TWO_LINES | U301 | 6 | PAL16R4A |
| VCC | C501 | 1 | CAPE 6.8UF |
| VCC | U308 | 16 | 316A102 |
| VCC | R501 | 2 | RES 330 |
| VCC | U117 | 27 | 2764 |
| VCC | | P1-1 | CONNECTOR |
| VCC | | P1-2 | CONNECTOR |
| VCC | | P1-3 | CONNECTOR |
| VCC | | P1-4 | CONNECTOR |
| VCC | | P1-5 | CONNECTOR |
| VCC | | P1-6 | CONNECTOR |
| VCC | | P1-7 | CONNECTOR |
| VCC | | P1-8 | CONNECTOR |
| WR0~ | U417 | 11 | LS273 |
| WR0~ | U319 | 15 | LS138 |
| WR1~ | U211 | 11 | LS273 |
| WR1~ | U319 | 14 | LS138 |
| WR2~ | U212 | 11 | LS273 |
| WR2~ | U319 | 13 | LS138 |
| WR3~ | U514 | 11 | LS273 |
| WR3~ | U319 | 12 | LS138 |
| WR4~ | U415 | 11 | LS273 |
| WR5~ | U319 | 10 | LS138 |
| WR6~ | U319 | 9 | LS138 |
| WR7~ | U612 | 11 | LS374 |
| WR7~ | U320 | 12 | LS139 |
| WR8~ | U511 | 11 | LS374 |
| WR9~ | U320 | 10 | LS139 |
| WR9~ | U416 | 11 | LS273 |
| WR~ | U115 | 16 | 80C31 |
| WR~ | U215 | 18 | F374 |
| WR~ | U328 | 2 | LS08 |
| WT1 | U118 | 1 | PAL20L8A |
| WT1 | U215 | 14 | F374 |
| WT1 | U215 | 16 | F374 |
| WT2 | U215 | 15 | F374 |
| WT2 | U118 | 2 | PAL20L8A |
| WT_CLK~ | U214 | 11 | F374 |
| WT_CLK~ | U309 | 12 | S74 |
| WT_CLK~ | U309 | 8 | S74 |
| WT~ | U118 | 22 | PAL20L8A |
| WT~ | U318 | 5 | LS138 |

Annex A9

MOTHERBOARD SAVION

| Signal_name | Physical_location | Pin_number | Part_name |
|---|---|---|---|
| +12V | U01JA | 10 | DT50PIN |
| +12V | U01JA | 9 | DT50PIN |
| +12V | | J1 6 | CONNECTOR |
| +15V | A1 | 1 | CAPE 47u |
| +15V | D01JB | 17 | DT50PIN |
| +15V | D01JB | 18 | DT50PIN |
| +15V | D01JB | 19 | DT50PIN |
| +15V | D01JB | 20 | DT50PIN |
| +15V | | J1 1 | CONNECTOR |
| -12V | D01JA | 43 | DT50PIN |
| -12V | D01JA | 44 | DT50PIN |
| -12V | | J1 7 | CONNECTOR |
| -15V | A2 | 2 | CAPE 47u |
| -15V | D01JB | 47 | DT50PIN |
| -15V | D01JB | 48 | DT50PIN |
| -15V | D01JB | 49 | DT50PIN |
| -15V | D01JB | 50 | DT50PIN |
| -15V | | J1 3 | CONNECTOR |
| AGND | A2 | 1 | CAPE 47u |
| AGND | D01JB | 13 | DT50PIN |
| AGND | D01JB | 14 | DT50PIN |
| AGND | D01JB | 15 | DT50PIN |
| AGND | D01JB | 16 | DT50PIN |
| AGND | A3 | 2 | CAPE 47u |
| AGND | D01JB | 43 | DT50PIN |
| AGND | D01JB | 44 | DT50PIN |
| AGND | D01JB | 45 | DT50PIN |
| AGND | D01JB | 46 | DT50PIN |
| AGND | | J1 2 | CONNECTOR |
| AGND | | J1 5 | CONNECTOR |
| ANALOG_5V | A3 | 1 | CAPE 47u |
| ANALOG_5V | D01JB | 37 | DT50PIN |
| ANALOG_5V | D01JB | 38 | DT50PIN |
| ANALOG_5V | D01JB | 39 | DT50PIN |
| ANALOG_5V | D01JB | 40 | DT50PIN |
| ANALOG_5V | | J1 4 | CONNECTOR |
| BCLK~ | U01JA | 15 | DT50PIN |
| BCLK~ | U1 | 7 | 4308R103 220/330 |
| BCLK~ | U10JA | 9 | DT50PIN |
| BHEN~ | U5 | 2 | MSP08NC 2.2k |
| BHEN~ | U10JA | 23 | DT50PIN |
| BHEN~ | U01JA | 33 | DT50PIN |
| BUSY~ | U10JA | 13 | DT50PIN |
| BUSY~ | U01JA | 19 | DT50PIN |
| BUSY~ | U2 | 5 | MSP08NC 1k |
| BUSY~ | U2 | 6 | MSP08NC 1k |
| BUSY~ | U2 | 7 | MSP08NC 1k |
| CBRQ~ | U4 | 2 | MSP08NC 1k |
| CBRQ~ | U10JA | 25 | DT50PIN |
| CBRQ~ | U01JA | 35 | DT50PIN |
| CBRQ~ | U6 | 6 | MSP08NC 1k |
| CBRQ~ | U6 | 7 | MSP08NC 1k |
| CCLK~ | U1 | 2 | 4308R103 220/330 |

| | | | |
|---|---|---|---|
| CCLK~ | U01JA | 37 | DT50PIN |
| COLOR_1 | U01JB | 13 | DT50PIN |
| COLOR_2 | U01JB | 11 | DT50PIN |
| DAT0~ | D10JA | 15 | DT50PIN |
| DAT0~ | D01JA | 39 | DT50PIN |
| DAT0~ | U10 | 8 | MSP08NC 2.2k |
| DAT10~ | D01JA | 27 | DT50PIN |
| DAT10~ | D10JA | 5 | DT50PIN |
| DAT10~ | U9 | 8 | MSP08NC 2.2k |
| DAT11~ | U10 | 2 | MSP08NC 2.2k |
| DAT11~ | D01JA | 28 | DT50PIN |
| DAT11~ | D10JA | 8 | DT50PIN |
| DAT12~ | D01JA | 25 | DT50PIN |
| DAT12~ | D10JA | 3 | DT50PIN |
| DAT12~ | U9 | 6 | MSP08NC 2.2k |
| DAT13~ | D01JA | 26 | DT50PIN |
| DAT13~ | D10JA | 6 | DT50PIN |
| DAT13~ | U9 | 7 | MSP08NC 2.2k |
| DAT14~ | D10JA | 1 | DT50PIN |
| DAT14~ | D01JA | 23 | DT50PIN |
| DAT14~ | U9 | 4 | MSP08NC 2.2k |
| DAT15~ | D01JA | 24 | DT50PIN |
| DAT15~ | D10JA | 4 | DT50PIN |
| DAT15~ | U9 | 5 | MSP08NC 2.2k |
| DAT1~ | D10JA | 17 | DT50PIN |
| DAT1~ | D01JA | 40 | DT50PIN |
| DAT1~ | U11 | 5 | MSP08NC 2.2k |
| DAT2~ | D10JA | 13 | DT50PIN |
| DAT2~ | D10JA | 20 | DT50PIN |
| DAT2~ | D01JA | 37 | DT50PIN |
| DAT2~ | U10 | 7 | MSP08NC 2.2k |
| DAT3~ | D10JA | 18 | DT50PIN |
| DAT3~ | D01JA | 38 | DT50PIN |
| DAT3~ | U11 | 4 | MSP08NC 2.2k |
| DAT4~ | D10JA | 11 | DT50PIN |
| DAT4~ | D01JA | 35 | DT50PIN |
| DAT4~ | U10 | 6 | MSP08NC 2.2k |
| DAT5~ | D10JA | 16 | DT50PIN |
| DAT5~ | U11 | 3 | MSP08NC 2.2k |
| DAT5~ | D01JA | 36 | DT50PIN |
| DAT6~ | D01JA | 33 | DT50PIN |
| DAT6~ | U10 | 5 | MSP08NC 2.2k |
| DAT6~ | D10JA | 9 | DT50PIN |
| DAT7~ | D10JA | 14 | DT50PIN |
| DAT7~ | U11 | 2 | MSP08NC 2.2k |
| DAT7~ | D01JA | 34 | DT50PIN |
| DAT8~ | D01JA | 29 | DT50PIN |
| DAT8~ | U10 | 3 | MSP08NC 2.2k |
| DAT8~ | D10JA | 7 | DT50PIN |
| DAT9~ | D10JA | 10 | DT50PIN |
| DAT9~ | D01JA | 30 | DT50PIN |
| DAT9~ | U10 | 4 | MSP08NC 2.2k |
| DATA12_0~ | U04JB | 30 | DT50PIN |
| DATA12_0~ | U05JB | 31 | DT50PIN |
| DATA12_1~ | U05JB | 33 | DT50PIN |
| DATA12_1~ | U04JB | 34 | DT50PIN |
| DATA12_2~ | U05JB | 35 | DT50PIN |
| DATA12_2~ | U04JB | 36 | DT50PIN |
| DATA12_3~ | U05JB | 37 | DT50PIN |

| | | | |
|---|---|---|---|
| DATA12_3~ | U04JB | 38 | DT50PIN |
| DATA12_4~ | U05JB | 39 | DT50PIN |
| DATA12_4~ | U04JB | 40 | DT50PIN |
| DATA12_5~ | U05JB | 41 | DT50PIN |
| DATA12_5~ | U04JB | 44 | DT50PIN |
| DATA12_6~ | U05JB | 43 | DT50PIN |
| DATA12_6~ | U04JB | 46 | DT50PIN |
| DATA12_7~ | U05JB | 45 | DT50PIN |
| DATA12_7~ | U04JB | 48 | DT50PIN |
| DATA23_0~ | U05JB | 30 | DT50PIN |
| DATA23_0~ | U06JB | 31 | DT50PIN |
| DATA23_1~ | U06JB | 33 | DT50PIN |
| DATA23_1~ | U05JB | 34 | DT50PIN |
| DATA23_2~ | U06JB | 35 | DT50PIN |
| DATA23_2~ | U05JB | 36 | DT50PIN |
| DATA23_3~ | U06JB | 37 | DT50PIN |
| DATA23_3~ | U05JB | 38 | DT50PIN |
| DATA23_4~ | U06JB | 39 | DT50PIN |
| DATA23_4~ | U05JB | 40 | DT50PIN |
| DATA23_5~ | U06JB | 41 | DT50PIN |
| DATA23_5~ | U05JB | 44 | DT50PIN |
| DATA23_6~ | U06JB | 43 | DT50PIN |
| DATA23_6~ | U05JB | 46 | DT50PIN |
| DATA23_7~ | U06JB | 45 | DT50PIN |
| DATA23_7~ | U05JB | 48 | DT50PIN |
| DATA35_0~ | U06JB | 30 | DT50PIN |
| DATA35_0~ | U07JB | 31 | DT50PIN |
| DATA35_1~ | U07JB | 33 | DT50PIN |
| DATA35_1~ | U06JB | 34 | DT50PIN |
| DATA35_2~ | U07JB | 35 | DT50PIN |
| DATA35_2~ | U06JB | 36 | DT50PIN |
| DATA35_3~ | U07JB | 37 | DT50PIN |
| DATA35_3~ | U06JB | 38 | DT50PIN |
| DATA35_4~ | U07JB | 39 | DT50PIN |
| DATA35_4~ | U06JB | 40 | DT50PIN |
| DATA35_5~ | U07JB | 41 | DT50PIN |
| DATA35_5~ | U06JB | 44 | DT50PIN |
| DATA35_6~ | U07JB | 43 | DT50PIN |
| DATA35_6~ | U06JB | 46 | DT50PIN |
| DATA35_7~ | U07JB | 45 | DT50PIN |
| DATA35_7~ | U06JB | 48 | DT50PIN |
| DATA57_0~ | U07JB | 30 | DT50PIN |
| DATA57_0~ | U08JB | 31 | DT50PIN |
| DATA57_1~ | U08JB | 33 | DT50PIN |
| DATA57_1~ | U07JB | 34 | DT50PIN |
| DATA57_2~ | U08JB | 35 | DT50PIN |
| DATA57_2~ | U07JB | 36 | DT50PIN |
| DATA57_3~ | U08JB | 37 | DT50PIN |
| DATA57_3~ | U07JB | 38 | DT50PIN |
| DATA57_4~ | U08JB | 39 | DT50PIN |
| DATA57_4~ | U07JB | 40 | DT50PIN |
| DATA57_5~ | U08JB | 41 | DT50PIN |
| DATA57_5~ | U07JB | 44 | DT50PIN |
| DATA57_6~ | U08JB | 43 | DT50PIN |
| DATA57_6~ | U07JB | 46 | DT50PIN |
| DATA57_7~ | U08JB | 45 | DT50PIN |
| DATA57_7~ | U07JB | 48 | DT50PIN |
| EOL_OUT12~ | D05JB | 23 | DT50PIN |
| EOL_OUT12~ | D04JB | 24 | DT50PIN |
| EOL_OUT23~ | D06JB | 23 | DT50PIN |

| | | | |
|---|---|---|---|
| EOL_OUT23~ | D05JB | 24 | DT50PIN |
| EOL_OUT35~ | D07JB | 23 | DT50PIN |
| EOL_OUT35~ | D06JB | 24 | DT50PIN |
| EOL_OUT57~ | D08JB | 23 | DT50PIN |
| EOL_OUT57~ | D07JB | 24 | DT50PIN |
| GND | U1 | 1 | 4308R103 220/330 |
| GND | U01JA | 12 | DT50PIN |
| GND | D01JA | 2 | DT50PIN |
| GND | U01JA | 22 | DT50PIN |
| GND | U01JA | 32 | DT50PIN |
| GND | U01JA | 42 | DT50PIN |
| GND | | J1 8 | CONNECTOR |
| GND | | J1 9 | CONNECTOR |
| IB0~ | U04JB | 1 | DT50PIN |
| IB10~ | U04JB | 11 | DT50PIN |
| IB11~ | U04JB | 13 | DT50PIN |
| IB1~ | U04JB | 21 | DT50PIN |
| IB2~ | U04JA | 21 | DT50PIN |
| IB3~ | D04JB | 49 | DT50PIN |
| IB4~ | D04JB | 48 | DT50PIN |
| IB5~ | D04JB | 50 | DT50PIN |
| IB6~ | U04JA | 31 | DT50PIN |
| IB7~ | U04JA | 41 | DT50PIN |
| IB8~ | D04JA | 1 | DT50PIN |
| IB9~ | U04JB | 14 | DT50PIN |
| IB_EOL~ | D04JA | 11 | DT50PIN |
| IB_IRDY1~ | U04JB | 23 | DT50PIN |
| IB_IRDY2~ | U04JB | 25 | DT50PIN |
| IB_IRDY3~ | U04JB | 27 | DT50PIN |
| IB_SHIFT1~ | U04JB | 15 | DT50PIN |
| IB_SHIFT2~ | U04JB | 17 | DT50PIN |
| IB_SHIFT3~ | U04JB | 19 | DT50PIN |
| INH1~ | U01JA | 28 | DT50PIN |
| INH1~ | U3 | 4 | MSP08NC 1k |
| INH2~ | U01JA | 30 | DT50PIN |
| INH2~ | U3 | 5 | MSP08NC 1k |
| INIT~ | U10JA | 10 | DT50PIN |
| INIT~ | U01JA | 16 | DT50PIN |
| INIT~ | U2 | 4 | MSP08NC 1k |
| INT0~ | U10JA | 31 | DT50PIN |
| INT0~ | U6 | 4 | MSP08NC 1k |
| INT0~ | U01JA | 49 | DT50PIN |
| INT1~ | U10JA | 33 | DT50PIN |
| INT1~ | U6 | 5 | MSP08NC 1k |
| INT1~ | U01JA | 50 | DT50PIN |
| INT2~ | U6 | 2 | MSP08NC 1k |
| INT2~ | U01JA | 47 | DT50PIN |
| INT3~ | U01JB | 29 | DT50PIN |
| INT3~ | U6 | 3 | MSP08NC 1k |
| INT3~ | U01JA | 48 | DT50PIN |
| INT4~ | U01JA | 45 | DT50PIN |
| INT4~ | U4 | 7 | MSP08NC 1k |
| INT5~ | U01JA | 46 | DT50PIN |
| INT5~ | U4 | 8 | MSP08NC 1k |
| INT6~ | U01JA | 43 | DT50PIN |
| INT6~ | U4 | 5 | MSP08NC 1k |
| INT7~ | U01JA | 44 | DT50PIN |
| INT7~ | U4 | 6 | MSP08NC 1k |
| INTA~ | U10JA | 29 | DT50PIN |
| INTA~ | U4 | 3 | MSP08NC 1k |

| | | | |
|---|---|---|---|
| INTA~ | U01JA | 39 | DT50PIN |
| IN_CARD_READY~ | U01JB | 19 | DT50PIN |
| IORC~ | U10JA | 17 | DT50PIN |
| IORC~ | U01JA | 25 | DT50PIN |
| IORC~ | U3 | 6 | MSP08NC 1k |
| IOWC~ | U10JA | 20 | DT50PIN |
| IOWC~ | U01JA | 26 | DT50PIN |
| IOWC~ | U3 | 3 | MSP08NC 1k |
| LF10~ | U01JB | 43 | DT50PIN |
| LF11~ | U01JB | 44 | DT50PIN |
| LF12~ | U01JB | 45 | DT50PIN |
| LF13~ | U01JB | 46 | DT50PIN |
| LF14~ | U01JB | 47 | DT50PIN |
| LF15~ | U01JB | 48 | DT50PIN |
| LF16~ | U01JB | 49 | DT50PIN |
| LF17~ | U01JB | 50 | DT50PIN |
| LF1~ | U01JB | 33 | DT50PIN |
| LF2~ | U01JB | 34 | DT50PIN |
| LF3~ | U01JB | 35 | DT50PIN |
| LF4~ | U01JB | 36 | DT50PIN |
| LF5~ | U01JB | 37 | DT50PIN |
| LF6~ | U01JB | 38 | DT50PIN |
| LF7~ | U01JB | 39 | DT50PIN |
| LF8~ | U01JB | 40 | DT50PIN |
| LF9~ | U01JB | 41 | DT50PIN |
| LINE_RQ~ | D04JA | 31 | DT50PIN |
| LOCK~ | U10JA | 21 | DT50PIN |
| LOCK~ | U01JA | 29 | DT50PIN |
| LOCK~ | U3 | 7 | MSP08NC 1k |
| MB_ADR0~ | D01JA | 19 | DT50PIN |
| MB_ADR0~ | U9 | 2 | MSP08NC 2.2k |
| MB_ADR0~ | U10JA | 49 | DT50PIN |
| MB_ADR10~ | U10JA | 39 | DT50PIN |
| MB_ADR10~ | U7 | 6 | MSP08NC 2.2k |
| MB_ADR10~ | D01JA | 7 | DT50PIN |
| MB_ADR11~ | U10JA | 38 | DT50PIN |
| MB_ADR11~ | U7 | 7 | MSP08NC 2.2k |
| MB_ADR11~ | D01JA | 8 | DT50PIN |
| MB_ADR12~ | U10JA | 37 | DT50PIN |
| MB_ADR12~ | U7 | 4 | MSP08NC 2.2k |
| MB_ADR12~ | D01JA | 5 | DT50PIN |
| MB_ADR13~ | U10JA | 36 | DT50PIN |
| MB_ADR13~ | U7 | 5 | MSP08NC 2.2k |
| MB_ADR13~ | D01JA | 6 | DT50PIN |
| MB_ADR14~ | U7 | 2 | MSP08NC 2.2k |
| MB_ADR14~ | D01JA | 3 | DT50PIN |
| MB_ADR14~ | U10JA | 35 | DT50PIN |
| MB_ADR15~ | U7 | 3 | MSP08NC 2.2k |
| MB_ADR15~ | U10JA | 34 | DT50PIN |
| MB_ADR15~ | D01JA | 4 | DT50PIN |
| MB_ADR16~ | U10JA | 24 | DT50PIN |
| MB_ADR16~ | U5 | 3 | MSP08NC 2.2k |
| MB_ADR16~ | U01JA | 34 | DT50PIN |
| MB_ADR17~ | U10JA | 26 | DT50PIN |
| MB_ADR17~ | U01JA | 36 | DT50PIN |
| MB_ADR17~ | U5 | 4 | MSP08NC 2.2k |
| MB_ADR18~ | U10JA | 28 | DT50PIN |
| MB_ADR18~ | U01JA | 38 | DT50PIN |
| MB_ADR18~ | U5 | 5 | MSP08NC 2.2k |
| MB_ADR19~ | U10JA | 30 | DT50PIN |

| | | | | |
|---|---|---|---|---|
| MB_ADR19~ | U01JA | 40 | DT50PIN | |
| MB_ADR19~ | U5 | 6 | MSP08NC | 2.2k |
| MB_ADR1~ | D01JA | 20 | DT50PIN | |
| MB_ADR1~ | U9 | 3 | MSP08NC | 2.2k |
| MB_ADR1~ | U10JA | 50 | DT50PIN | |
| MB_ADR20~ | D01JB | 33 | DT50PIN | |
| MB_ADR20~ | D10JA | 37 | DT50PIN | |
| MB_ADR20~ | U12 | 5 | MSP08NC | 2.2k |
| MB_ADR21~ | D10JA | 24 | DT50PIN | |
| MB_ADR21~ | D01JB | 28 | DT50PIN | |
| MB_ADR21~ | U12 | 3 | MSP08NC | 2.2k |
| MB_ADR22~ | D10JA | 19 | DT50PIN | |
| MB_ADR22~ | D01JB | 31 | DT50PIN | |
| MB_ADR22~ | U12 | 4 | MSP08NC | 2.2k |
| MB_ADR23~ | U12 | 2 | MSP08NC | 2.2k |
| MB_ADR23~ | D01JB | 26 | DT50PIN | |
| MB_ADR2~ | D01JA | 17 | DT50PIN | |
| MB_ADR2~ | U10JA | 47 | DT50PIN | |
| MB_ADR2~ | U8 | 7 | MSP08NC | 2.2k |
| MB_ADR3~ | D01JA | 18 | DT50PIN | |
| MB_ADR3~ | U10JA | 48 | DT50PIN | |
| MB_ADR3~ | U8 | 8 | MSP08NC | 2.2k |
| MB_ADR4~ | D01JA | 15 | DT50PIN | |
| MB_ADR4~ | U10JA | 45 | DT50PIN | |
| MB_ADR4~ | U8 | 5 | MSP08NC | 2.2k |
| MB_ADR5~ | D01JA | 16 | DT50PIN | |
| MB_ADR5~ | U10JA | 46 | DT50PIN | |
| MB_ADR5~ | U8 | 6 | MSP08NC | 2.2k |
| MB_ADR6~ | D01JA | 13 | DT50PIN | |
| MB_ADR6~ | U8 | 3 | MSP08NC | 2.2k |
| MB_ADR6~ | U10JA | 43 | DT50PIN | |
| MB_ADR7~ | D01JA | 14 | DT50PIN | |
| MB_ADR7~ | U8 | 4 | MSP08NC | 2.2k |
| MB_ADR7~ | U10JA | 44 | DT50PIN | |
| MB_ADR8~ | U10JA | 41 | DT50PIN | |
| MB_ADR8~ | U7 | 8 | MSP08NC | 2.2k |
| MB_ADR8~ | D01JA | 9 | DT50PIN | |
| MB_ADR9~ | D01JA | 10 | DT50PIN | |
| MB_ADR9~ | U8 | 2 | MSP08NC | 2.2k |
| MB_ADR9~ | U10JA | 40 | DT50PIN | |
| MRDC~ | U10JA | 15 | DT50PIN | |
| MRDC~ | U01JA | 23 | DT50PIN | |
| MRDC~ | U2 | 8 | MSP08NC | 1k |
| MWTC~ | U10JA | 18 | DT50PIN | |
| MWTC~ | U3 | 2 | MSP08NC | 1k |
| MWTC~ | U01JA | 24 | DT50PIN | |
| NEXT_LINE_REQ~ | U01JB | 17 | DT50PIN | |
| OB0~ | D04JB | 35 | DT50PIN | |
| OB10~ | D04JB | 45 | DT50PIN | |
| OB11~ | D04JB | 46 | DT50PIN | |
| OB1~ | D04JB | 34 | DT50PIN | |
| OB2~ | D04JB | 37 | DT50PIN | |
| OB3~ | D04JB | 36 | DT50PIN | |
| OB4~ | D04JB | 39 | DT50PIN | |
| OB5~ | D04JB | 38 | DT50PIN | |
| OB6~ | D04JB | 41 | DT50PIN | |
| OB7~ | D04JB | 40 | DT50PIN | |
| OB8~ | D04JB | 43 | DT50PIN | |
| OB9~ | D04JB | 44 | DT50PIN | |
| OB_EOL~ | D04JA | 21 | DT50PIN | |

| | | | |
|---|---|---|---|
| OB_RDY~ | D04JA | 41 | DT50PIN |
| OB_SHIFT1~ | D04JB | 47 | DT50PIN |
| PIXEL_CLK | U01JB | 14 | DT50PIN |
| PLBX_ACK~ | D09JB | 16 | DT50PIN |
| PLBX_ACK~ | U10JB | 47 | DT50PIN |
| PLBX_ADR0 | D10JB | 25 | DT50PIN |
| PLBX_ADR0 | U09JB | 47 | DT50PIN |
| PLBX_ADR10 | D10JB | 35 | DT50PIN |
| PLBX_ADR10 | U09JB | 48 | DT50PIN |
| PLBX_ADR11 | D10JB | 36 | DT50PIN |
| PLBX_ADR11 | D09JB | 7 | DT50PIN |
| PLBX_ADR12 | D10JB | 37 | DT50PIN |
| PLBX_ADR1 | D10JB | 24 | DT50PIN |
| PLBX_ADR12 | U09JB | 50 | DT50PIN |
| PLBX_ADR13 | D10JB | 38 | DT50PIN |
| PLBX_ADR1 | U09JB | 36 | DT50PIN |
| PLBX_ADR13 | D09JB | 9 | DT50PIN |
| PLBX_ADR14 | D10JB | 39 | DT50PIN |
| PLBX_ADR14 | D09JB | 4 | DT50PIN |
| PLBX_ADR15 | D09JB | 11 | DT50PIN |
| PLBX_ADR15 | D10JB | 40 | DT50PIN |
| PLBX_ADR16 | D09JB | 13 | DT50PIN |
| PLBX_ADR16 | D10JB | 41 | DT50PIN |
| PLBX_ADR17 | D10JB | 44 | DT50PIN |
| PLBX_ADR17 | D09JB | 6 | DT50PIN |
| PLBX_ADR18 | D09JB | 15 | DT50PIN |
| PLBX_ADR18 | D10JB | 43 | DT50PIN |
| PLBX_ADR19 | D10JB | 46 | DT50PIN |
| PLBX_ADR19 | D09JB | 8 | DT50PIN |
| PLBX_ADR20 | D09JB | 17 | DT50PIN |
| PLBX_ADR20 | D10JB | 45 | DT50PIN |
| PLBX_ADR21 | D09JB | 10 | DT50PIN |
| PLBX_ADR21 | D10JB | 48 | DT50PIN |
| PLBX_ADR22 | D09JB | 19 | DT50PIN |
| PLBX_ADR22 | D10JB | 47 | DT50PIN |
| PLBX_ADR2 | D10JB | 27 | DT50PIN |
| PLBX_ADR23 | D09JB | 14 | DT50PIN |
| PLBX_ADR23 | D10JB | 50 | DT50PIN |
| PLBX_ADR2 | U09JB | 49 | DT50PIN |
| PLBX_ADR3 | D10JB | 26 | DT50PIN |
| PLBX_ADR3 | U09JB | 38 | DT50PIN |
| PLBX_ADR4 | D09JB | 1 | DT50PIN |
| PLBX_ADR4 | D10JB | 29 | DT50PIN |
| PLBX_ADR5 | D10JB | 28 | DT50PIN |
| PLBX_ADR5 | U09JB | 40 | DT50PIN |
| PLBX_ADR6 | D09JB | 3 | DT50PIN |
| PLBX_ADR6 | D10JB | 31 | DT50PIN |
| PLBX_ADR7 | D10JB | 30 | DT50PIN |
| PLBX_ADR7 | U09JB | 44 | DT50PIN |
| PLBX_ADR8 | D10JB | 33 | DT50PIN |
| PLBX_ADR8 | U09JB | 46 | DT50PIN |
| PLBX_ADR9 | D10JB | 34 | DT50PIN |
| PLBX_ADR9 | D09JB | 5 | DT50PIN |
| PLBX_ASTB~ | D09JB | 25 | DT50PIN |
| PLBX_ASTB~ | D10JB | 4 | DT50PIN |
| PLBX_BHEN | D10JB | 1 | DT50PIN |
| PLBX_BHEN | D09JB | 23 | DT50PIN |
| PLBX_DAT0 | U09JB | 31 | DT50PIN |
| PLBX_DAT0 | D10JB | 5 | DT50PIN |
| PLBX_DAT10 | D10JB | 15 | DT50PIN |

| | | | |
|---|---|---|---|
| PLBX_DAT10 | U09JB | 28 | DT50PIN |
| PLBX_DAT11 | D10JB | 20 | DT50PIN |
| PLBX_DAT11 | U09JB | 41 | DT50PIN |
| PLBX_DAT1 | U09JB | 16 | DT50PIN |
| PLBX_DAT12 | D10JB | 17 | DT50PIN |
| PLBX_DAT12 | U09JB | 30 | DT50PIN |
| PLBX_DAT13 | D10JB | 21 | DT50PIN |
| PLBX_DAT13 | U09JB | 43 | DT50PIN |
| PLBX_DAT14 | D10JB | 19 | DT50PIN |
| PLBX_DAT14 | U09JB | 34 | DT50PIN |
| PLBX_DAT15 | D10JB | 23 | DT50PIN |
| PLBX_DAT15 | U09JB | 45 | DT50PIN |
| PLBX_DAT1 | D10JB | 8 | DT50PIN |
| PLBX_DAT2 | U09JB | 33 | DT50PIN |
| PLBX_DAT2 | D10JB | 7 | DT50PIN |
| PLBX_DAT3 | D10JB | 10 | DT50PIN |
| PLBX_DAT3 | U09JB | 18 | DT50PIN |
| PLBX_DAT4 | U09JB | 35 | DT50PIN |
| PLBX_DAT4 | D10JB | 9 | DT50PIN |
| PLBX_DAT5 | D10JB | 14 | DT50PIN |
| PLBX_DAT5 | U09JB | 20 | DT50PIN |
| PLBX_DAT6 | D10JB | 11 | DT50PIN |
| PLBX_DAT6 | U09JB | 37 | DT50PIN |
| PLBX_DAT7 | D10JB | 16 | DT50PIN |
| PLBX_DAT7 | U09JB | 24 | DT50PIN |
| PLBX_DAT8 | D10JB | 13 | DT50PIN |
| PLBX_DAT8 | U09JB | 26 | DT50PIN |
| PLBX_DAT9 | D10JB | 18 | DT50PIN |
| PLBX_DAT9 | U09JB | 39 | DT50PIN |
| PLBX_DSTB~ | D09JB | 20 | DT50PIN |
| PLBX_DSTB~ | U10JB | 49 | DT50PIN |
| PLBX_LOCK~ | D09JB | 29 | DT50PIN |
| PLBX_LOCK~ | D10JB | 6 | DT50PIN |
| PLBX_R_W~ | D09JB | 18 | DT50PIN |
| PLBX_R_W~ | U10JB | 48 | DT50PIN |
| READY21_1~ | D05JB | 3 | DT50PIN |
| READY21_1~ | D04JB | 4 | DT50PIN |
| READY21_2~ | D05JB | 5 | DT50PIN |
| READY21_2~ | D04JB | 6 | DT50PIN |
| READY21_3~ | D05JB | 7 | DT50PIN |
| READY21_3~ | D04JB | 8 | DT50PIN |
| READY32_1~ | D06JB | 3 | DT50PIN |
| READY32_1~ | D05JB | 4 | DT50PIN |
| READY32_2~ | D06JB | 5 | DT50PIN |
| READY32_2~ | D05JB | 6 | DT50PIN |
| READY32_3~ | D06JB | 7 | DT50PIN |
| READY32_3~ | D05JB | 8 | DT50PIN |
| READY53_1~ | D07JB | 3 | DT50PIN |
| READY53_1~ | D06JB | 4 | DT50PIN |
| READY53_2~ | D07JB | 5 | DT50PIN |
| READY53_2~ | D06JB | 6 | DT50PIN |
| READY53_3~ | D07JB | 7 | DT50PIN |
| READY53_3~ | D06JB | 8 | DT50PIN |
| READY75_1~ | D08JB | 3 | DT50PIN |
| READY75_1~ | D07JB | 4 | DT50PIN |
| READY75_2~ | D08JB | 5 | DT50PIN |
| READY75_2~ | D07JB | 6 | DT50PIN |
| READY75_3~ | D08JB | 7 | DT50PIN |
| READY75_3 | D07JB | 8 | DT50PIN |
| SHIFT12_1 | D05JB | 13 | DT50PIN |

| | | | |
|---|---|---|---|
| SHIFT12_1~ | D04JB | 14 | DT50PIN |
| SHIFT12_2~ | D05JB | 15 | DT50PIN |
| SHIFT12_2~ | D04JB | 16 | DT50PIN |
| SHIFT12_3~ | D05JB | 17 | DT50PIN |
| SHIFT12_3~ | D04JB | 18 | DT50PIN |
| SHIFT23_1~ | D06JB | 13 | DT50PIN |
| SHIFT23_1~ | D05JB | 14 | DT50PIN |
| SHIFT23_2~ | D06JB | 15 | DT50PIN |
| SHIFT23_2~ | D05JB | 16 | DT50PIN |
| SHIFT23_3~ | D06JB | 17 | DT50PIN |
| SHIFT23_3~ | D05JB | 18 | DT50PIN |
| SHIFT35_1~ | D07JB | 13 | DT50PIN |
| SHIFT35_1~ | D06JB | 14 | DT50PIN |
| SHIFT35_2~ | D07JB | 15 | DT50PIN |
| SHIFT35_2~ | D06JB | 16 | DT50PIN |
| SHIFT35_3~ | D07JB | 17 | DT50PIN |
| SHIFT35_3~ | D06JB | 18 | DT50PIN |
| SHIFT57_1~ | D08JB | 13 | DT50PIN |
| SHIFT57_1~ | D07JB | 14 | DT50PIN |
| SHIFT57_2~ | D08JB | 15 | DT50PIN |
| SHIFT57_2~ | D07JB | 16 | DT50PIN |
| SHIFT57_3~ | D08JB | 17 | DT50PIN |
| SHIFT57_3~ | D07JB | 18 | DT50PIN |
| SPARE1~ | U01JB | 16 | DT50PIN |
| SPARE2~ | U01JB | 18 | DT50PIN |
| SPARE3~ | U01JB | 20 | DT50PIN |
| SPARE~ | D01JB | 30 | DT50PIN |
| START_LINE~ | U01JB | 15 | DT50PIN |
| STOP_DATA~ | U01JB | 21 | DT50PIN |
| VCC | U6 | 1 | MSP08NC 1k |
| VCC | U01JA | 2 | DT50PIN |
| VCC | U01JA | 3 | DT50PIN |
| VCC | U01JA | 4 | DT50PIN |
| VCC | U01JA | 5 | DT50PIN |
| VCC | U01JA | 6 | DT50PIN |
| VCC | U01JA | 7 | DT50PIN |
| VCC | U1 | 8 | 4308R103 220/330 |
| XACK~ | U10JA | 19 | DT50PIN |
| XACK~ | R3 | 2 | RES 270 |
| XACK~ | U01JA | 27 | DT50PIN |

MLT DRIVER PAGE 1

| Signal_name | Physical_location | Pin_number | Part_name |
|---|---|---|---|
| 0:XSIG226 | U309 | 3 | LS374 |
| 0:XSIG244 | U209 | 13 | 2632 |
| 0:XSIG244 | U309 | 8 | LS374 |
| 0:XSIG247 | U210 | 11 | 2632 |
| 0:XSIG247 | U309 | 4 | LS374 |
| 0:XSIG250 | U209 | 3 | 2632 |
| 0:XSIG250 | U309 | 7 | LS374 |
| 0:XSIG253 | U309 | 13 | LS374 |
| 0:XSIG253 | U209 | 5 | 2632 |
| 0:XSIG256 | U209 | 11 | 2632 |
| 0:XSIG256 | U309 | 14 | LS374 |
| 0:XSIG259 | U309 | 17 | LS374 |
| 0:XSIG259 | U208 | 3 | 2632 |
| 0:XSIG262 | U208 | 13 | 2632 |
| 0:XSIG262 | U309 | 18 | LS374 |
| 0:XSIG265 | U308 | 3 | LS374 |

| | | | |
|---|---|---|---|
| 0:XSIG265 | U208 | 5 | 2632 |
| 0:XSIG268 | U208 | 11 | 2632 |
| 0:XSIG268 | U308 | 4 | LS374 |
| 0:XSIG271 | U207 | 3 | 2632 |
| 0:XSIG271 | U308 | 7 | LS374 |
| 0:XSIG274 | U207 | 13 | 2632 |
| 0:XSIG274 | U308 | 8 | LS374 |
| 0:XSIG277 | U308 | 13 | LS374 |
| 0:XSIG277 | U207 | 5 | 2632 |
| 0:XSIG285 | C203 | 1 | CAPE 47uf_25v |
| 0:XSIG285 | U301 | 4 | LS244 |
| 0:XSIG285 | U114 | 6 | LS38 |
| 0:XSIG294 | U114 | 4 | LS38 |
| 0:XSIG294 | U114 | 5 | LS38 |
| 0:XSIG294 | U303 | 7 | LS240 |
| 0:XSIG295 | U303 | 13 | LS240 |
| 0:XSIG295 | U210 | 5 | 2632 |
| 10MHZ | U210 | 13 | 2632 |
| 10MHZ | U301 | 2 | LS244 |
| 10MHZ | U304 | 3 | LS74 |
| 10MHZ | U111 | 8 | LS164 |
| 1:XSIG220 | U207 | 11 | 2632 |
| 1:XSIG220 | U203 | 3 | LS374 |
| 1:XSIG262 | U311 | 2 | LS244 |
| 1:XSIG262 | U314 | 3 | 2632 |
| 2:XSIG206 | U314 | 13 | 2632 |
| 2:XSIG206 | U313 | 2 | LS244 |
| 2:XSIG208 | U313 | 4 | LS244 |
| 2:XSIG208 | U314 | 5 | 2632 |
| 2:XSIG210 | U314 | 11 | 2632 |
| 2:XSIG210 | U313 | 6 | LS244 |
| 2:XSIG212 | U214 | 3 | 2632 |
| 2:XSIG212 | U313 | 8 | LS244 |
| 2:XSIG216 | U214 | 13 | 2632 |
| 2:XSIG216 | U313 | 17 | LS244 |
| 2:XSIG218 | U313 | 11 | LS244 |
| 2:XSIG218 | U214 | 5 | 2632 |
| 2:XSIG220 | U214 | 11 | 2632 |
| 2:XSIG220 | U313 | 13 | LS244 |
| 2:XSIG225 | U313 | 15 | LS244 |
| 2:XSIG225 | U212 | 3 | 2632 |
| 2:XSIG227 | U212 | 13 | 2632 |
| 2:XSIG227 | U311 | 17 | LS244 |
| 2:XSIG229 | U311 | 15 | LS244 |
| 2:XSIG229 | U212 | 5 | 2632 |
| 2:XSIG231 | U212 | 11 | 2632 |
| 2:XSIG231 | U311 | 13 | LS244 |
| 2:XSIG233 | U311 | 11 | LS244 |
| 2:XSIG233 | U211 | 3 | 2632 |
| 2:XSIG235 | U211 | 5 | 2632 |
| 2:XSIG235 | U311 | 6 | LS244 |
| 2:XSIG237 | U211 | 11 | 2632 |
| 2:XSIG237 | U311 | 4 | LS244 |
| 2:XSIG240 | U211 | 13 | 2632 |
| 2:XSIG240 | U311 | 8 | LS244 |
| 3:XSIG16 | U107 | 13 | 2632 |
| 3:XSIG16 | U108 | 4 | LS125 |
| 3:XSIG25 | U108 | 10 | LS125 |
| 3:XSIG25 | U106 | 14 | 316A102 1K |
| 3:XSIG25 | U107 | 5 | 2632 |
| 3:XSIG43 | U107 | 11 | 2632 |

| | | | |
|---|---|---|---|
| 3:XSIG43 | U108 | 13 | LS125 |
| 3:XSIG43 | U106 | 15 | 316A102 1K |
| 3:XSIG52 | U105 | 13 | 2632 |
| 3:XSIG52 | U305 | 4 | LS125 |
| 3:XSIG52 | U106 | 9 | 316A102 1K |
| 3:XSIG6 | U108 | 1 | LS125 |
| 3:XSIG6 | U106 | 12 | 316A102 1K |
| 3:XSIG62 | U305 | 1 | LS125 |
| 3:XSIG62 | U105 | 3 | 2632 |
| 3:XSIG62 | U106 | 8 | 316A102 1K |
| 3:XSIG6 | U107 | 3 | 2632 |
| 3:XSIG70 | U105 | 11 | 2632 |
| 3:XSIG70 | U305 | 13 | LS125 |
| 3:XSIG79 | U305 | 10 | LS125 |
| 3:XSIG79 | U105 | 5 | 2632 |
| 4:XSIG121 | U110 | 1 | LS02 |
| 4:XSIG129 | U103 | 8 | LS32 |
| 4:XSIG129 | U102 | 9 | LS125 |
| 4:XSIG217 | U110 | 2 | LS02 |
| 4:XSIG217 | U110 | 3 | LS02 |
| 4:XSIG217 | U110 | 4 | LS02 |
| 4:XSIG229 | U103 | 11 | LS32 |
| 4:XSIG229 | U102 | 12 | LS125 |
| 4:XSIG230 | U102 | 5 | LS125 |
| 4:XSIG230 | U103 | 6 | LS32 |
| 4:XSIG237 | U110 | 11 | LS02 |
| 4:XSIG237 | U109 | 4 | LS164 |
| 4:XSIG238 | U111 | 10 | LS164 |
| 4:XSIG238 | U303 | 4 | LS240 |
| 4:XSIG241 | U110 | 13 | LS02 |
| 4:XSIG241 | U303 | 6 | LS240 |
| 4:XSIG258 | U303 | 18 | LS240 |
| 4:XSIG258 | U304 | 2 | LS74 |
| 4:XSIG259 | U304 | 4 | LS74 |
| 4:XSIG259 | U304 | 6 | LS74 |
| 4:XSIG260 | U109 | 6 | LS164 |
| 4:XSIG260 | U303 | 8 | LS240 |
| 4:XSIG267 | U109 | 1 | LS164 |
| 4:XSIG267 | U304 | 5 | LS74 |
| 4:XSIG364 | U111 | 11 | LS164 |
| 4:XSIG364 | U109 | 2 | LS164 |
| 4:XSIG397 | U114 | 1 | LS38 |
| 4:XSIG397 | U114 | 2 | LS38 |
| 4:XSIG397 | U303 | 9 | LS240 |
| 4:XSIG398 | U115 | 2 | MCT6 |
| 4:XSIG398 | U114 | 3 | LS38 |
| 4:XSIG400 | R101 | 1 | RES 10K |
| 4:XSIG400 | CR101 | 2 | DD |
| 4:XSIG402 | U115 | 1 | MCT6 |
| 4:XSIG402 | U418 | 13 | 316B 220 |
| 4:XSIG8 | U102 | 2 | LS125 |
| 4:XSIG8 | U103 | 3 | LS32 |
| 4:XSIG87 | U113 | 5 | 2632 |
| 4:XSIG87 | U110 | 6 | LS02 |
| 4:XSIG87 | U106 | 7 | 316A102 1K |
| ACK_OUT~ | U303 | 12 | LS240 |
| ACK_OUT~ | U302 | 9 | 2631 |
| ACLK | U309 | 11 | LS374 |
| ACLK | U111 | 5 | LS164 |
| ADR_13~ | U206 | 3 | 2632 |
| ADR_13~ | U203 | 4 | LS374 |

| | | | |
|---|---|---|---|
| ADR_14~ | U206 | 13 | 2632 |
| ADR_14~ | U201 | 2 | PAL20L8A |
| ADR_14~ | U203 | 7 | LS374 |
| ADR_15~ | U201 | 3 | PAL20L8A |
| ADR_15~ | U206 | 5 | 2632 |
| ADR_15~ | U203 | 8 | LS374 |
| ADR_16~ | U206 | 11 | 2632 |
| ADR_16~ | U203 | 13 | LS374 |
| ADR_16~ | U201 | 4 | PAL20L8A |
| ADR_17~ | U205 | 11 | 2632 |
| ADR_17~ | U202 | 3 | LS374 |
| ADR_17~ | U201 | 5 | PAL20L8A |
| ADR_18~ | U205 | 3 | 2632 |
| ADR_18~ | U202 | 4 | LS374 |
| ADR_18~ | U201 | 6 | PAL20L8A |
| ADR_19~ | U205 | 13 | 2632 |
| ADR_19~ | U202 | 7 | LS374 |
| ADR_20~ | U420 | 3 | 2632 |
| ADR_20~ | U202 | 8 | LS374 |
| ADR_21~ | U420 | 13 | 2632 |
| ADR_21~ | U201 | 9 | PAL20L8A |
| ADR_22~ | U201 | 10 | PAL20L8A |
| ADR_22~ | U202 | 14 | LS374 |
| ADR_22~ | U420 | 5 | 2632 |
| ADR_23~ | U420 | 11 | 2632 |
| ADR_23~ | U202 | 17 | LS374 |
| ADR_SPACE~ | U201 | 19 | PAL20L8A |
| ADR_SPACE~ | U110 | 8 | LS02 |
| BHEN~+ | U310 | 1 | 316B 220 |
| BHEN~+ | U401 | 2 | 2631 |
| BHEN~- | U210 | 1 | 2632 |
| BHEN~- | U310 | 16 | 316B 220 |
| BHEN~- | U401 | 3 | 2631 |
| BHEN~ | U401 | 1 | 2631 |
| BHEN~ | U309 | 2 | LS374 |
| CCLK~+ | U210 | 14 | 2632 |
| CCLK~+ | U310 | 2 | 316B 220 |
| CCLK~+ | U401 | 6 | 2631 |
| CCLK~- | U310 | 15 | 316B 220 |
| CCLK~- | U401 | 5 | 2631 |
| CCLK~ | U301 | 18 | LS244 |
| CCLK~ | U401 | 7 | 2631 |
| CLR~ | U304 | 1 | LS74 |
| CLR~ | U110 | 10 | LS02 |
| CLR~ | U111 | 9 | LS164 |
| DAT0~+ | U314 | 2 | 2632 |
| DAT0~+ | U414 | 4 | 316B 220 |
| DAT0~- | U314 | 1 | 2632 |
| DAT0~- | U414 | 13 | 316B 220 |
| DAT0~- | U413 | 3 | 2631 |
| DAT0~ | U413 | 1 | 2631 |
| DAT0~ | U311 | 18 | LS244 |
| DAT10~+ | U411 | 10 | 2631 |
| DAT10~+ | U213 | 6 | 316B 220 |
| DAT10~- | U213 | 11 | 316B 220 |
| DAT10~- | U212 | 7 | 2632 |
| DAT10~ | U311 | 5 | LS244 |
| DAT10~ | U411 | 9 | 2631 |
| DAT11~+ | U212 | 10 | 2632 |
| DAT11~+ | U411 | 14 | 2631 |
| DAT11~+ | U213 | 7 | 316B 220 |
| DAT11~- | U213 | 10 | 316B 220 |

| | | | |
|---|---|---|---|
| DAT11~- | U411 | 13 | 2631 |
| DAT11~- | U212 | 9 | 2632 |
| DAT11~ | U411 | 15 | 2631 |
| DAT11~ | U311 | 7 | LS244 |
| DAT12~+ | U211 | 2 | 2632 |
| DAT12~+ | U213 | 8 | 316B 220 |
| DAT12~- | U211 | 1 | 2632 |
| DAT12~- | U410 | 3 | 2631 |
| DAT12~- | U213 | 9 | 316B 220 |
| DAT12~ | U410 | 1 | 2631 |
| DAT12~ | U311 | 9 | LS244 |
| DAT13~+ | U204 | 1 | 316B 220 |
| DAT13~+ | U211 | 14 | 2632 |
| DAT13~+ | U410 | 6 | 2631 |
| DAT13~- | U211 | 15 | 2632 |
| DAT13~- | U204 | 16 | 316B 220 |
| DAT13~- | U410 | 5 | 2631 |
| DAT13~ | U311 | 12 | LS244 |
| DAT13~ | U410 | 7 | 2631 |
| DAT14~+ | U410 | 10 | 2631 |
| DAT14~+ | U204 | 2 | 316B 220 |
| DAT14~+ | U211 | 6 | 2632 |
| DAT14~- | U410 | 11 | 2631 |
| DAT14~- | U204 | 15 | 316B 220 |
| DAT14~- | U211 | 7 | 2632 |
| DAT14~ | U311 | 14 | LS244 |
| DAT14~ | U410 | 9 | 2631 |
| DAT15~+ | U211 | 10 | 2632 |
| DAT15~+ | U410 | 14 | 2631 |
| DAT15~+ | U204 | 3 | 316B 220 |
| DAT15~- | U410 | 13 | 2631 |
| DAT15~- | U204 | 14 | 316B 220 |
| DAT15~- | U211 | 9 | 2632 |
| DAT15~ | U410 | 15 | 2631 |
| DAT15~ | U311 | 16 | LS244 |
| DAT1~+ | U314 | 14 | 2632 |
| DAT1~+ | U414 | 5 | 316B 220 |
| DAT1~+ | U413 | 6 | 2631 |
| DAT1~- | U414 | 12 | 316B 220 |
| DAT1~- | U314 | 15 | 2632 |
| DAT1~- | U413 | 5 | 2631 |
| DAT1~ | U313 | 18 | LS244 |
| DAT1~ | U413 | 7 | 2631 |
| DAT2~+ | U413 | 10 | 2631 |
| DAT2~+ | U414 | 6 | 316B 220 |
| DAT2~- | U414 | 11 | 316B 220 |
| DAT2~- | U314 | 7 | 2632 |
| DAT2~ | U313 | 16 | LS244 |
| DAT2~ | U413 | 9 | 2631 |
| DAT3~+ | U314 | 10 | 2632 |
| DAT3~+ | U413 | 14 | 2631 |
| DAT3~+ | U414 | 7 | 316B 220 |
| DAT3~- | U414 | 10 | 316B 220 |
| DAT3~- | U413 | 13 | 2631 |
| DAT3~- | U314 | 9 | 2632 |
| DAT3~ | U313 | 14 | LS244 |
| DAT3~ | U413 | 15 | 2631 |
| DAT4~+ | U214 | 2 | 2632 |
| DAT4~+ | U414 | 8 | 316B 220 |
| DAT4~- | U214 | 1 | 2632 |

| | | | |
|---|---|---|---|
| DAT4~- | U412 | 3 | 2631 |
| DAT4~- | U414 | 9 | 316B 220 |
| DAT4~ | U412 | 1 | 2631 |
| DAT4~ | U313 | 12 | LS244 |
| DAT5~+ | U213 | 1 | 316B 220 |
| DAT5~+ | U214 | 14 | 2632 |
| DAT5~+ | U412 | 6 | 2631 |
| DAT5~- | U214 | 15 | 2632 |
| DAT5~- | U213 | 16 | 316B 220 |
| DAT5~- | U412 | 5 | 2631 |
| DAT5~ | U313 | 3 | LS244 |
| DAT5~ | U412 | 7 | 2631 |
| DAT6~+ | U412 | 10 | 2631 |
| DAT6~+ | U213 | 2 | 316B 220 |
| DAT6~+ | U214 | 6 | 2632 |
| DAT6~- | U412 | 11 | 2631 |
| DAT6~- | U213 | 15 | 316B 220 |
| DAT6~- | U214 | 7 | 2632 |
| DAT6~ | U412 | 9 | 2631 |
| DAT7~+ | U214 | 10 | 2632 |
| DAT7~+ | U412 | 14 | 2631 |
| DAT7~+ | U213 | 3 | 316B 220 |
| DAT7~- | U412 | 13 | 2631 |
| DAT7~- | U213 | 14 | 316B 220 |
| DAT7~- | U214 | 9 | 2632 |
| DAT7~ | U412 | 15 | 2631 |
| DAT7~ | U313 | 7 | LS244 |
| DAT8~+ | U212 | 2 | 2632 |
| DAT8~+ | U213 | 4 | 316B 220 |
| DAT8~- | U212 | 1 | 2632 |
| DAT8~- | U213 | 13 | 316B 220 |
| DAT8~- | U411 | 3 | 2631 |
| DAT8~ | U411 | 1 | 2631 |
| DAT8~ | U313 | 5 | LS244 |
| DAT9~+ | U212 | 14 | 2632 |
| DAT9~+ | U213 | 5 | 316B 220 |
| DAT9~+ | U411 | 6 | 2631 |
| DAT9~- | U213 | 12 | 316B 220 |
| DAT9~- | U212 | 15 | 2632 |
| DAT9~- | U411 | 5 | 2631 |
| DAT9~ | U311 | 3 | LS244 |
| DAT9~ | U411 | 7 | 2631 |
| DELAY_400~ | U103 | 1 | LS32 |
| DELAY_400~ | U110 | 12 | LS02 |
| DELAY_400~ | U303 | 16 | LS240 |
| DELAY_400~ | U110 | 5 | LS02 |
| DELAY_400~ | U103 | 9 | LS32 |
| ENB_DFC~ | U311 | 1 | LS244 |
| ENB_DFC~ | U313 | 19 | LS244 |
| ENB_DFC~ | U201 | 22 | PAL20L8A |
| ENB_DTC~ | U413 | 12 | 2631 |
| ENB_DTC~ | U201 | 15 | PAL20L8A |
| GND | U303 | 1 | LS240 |
| GND | U112 | 10 | LS125 |
| GND | U210 | 12 | 2632 |
| GND | U303 | 19 | LS240 |
| GND | C203 | 2 | CAPE 47uf_25v |
| GND | U401 | 4 | 2631 |

| | | | |
|---|---|---|---|
| GND | U108 | 5 | LS125 |
| GND | U115 | 8 | MCT6 |
| GND | U108 | 9 | LS125 |
| GND | | J1 1 | CONNECTOR |
| GND | | J1 2 | CONNECTOR |
| GND | | J1 59 | CONNECTOR |
| GND | | J1 60 | CONNECTOR |
| GND | | J2 1 | CONNECTOR |
| GND | | J2 59 | CONNECTOR |
| GND | | J2 60 | CONNECTOR |
| INIT˜+ | U401 | 10 | 2631 |
| INIT˜+ | U310 | 14 | 316B 220 |
| INIT˜+ | U210 | 7 | 2632 |
| INIT˜- | U401 | 11 | 2631 |
| INIT˜- | U310 | 3 | 316B 220 |
| INIT˜- | U210 | 6 | 2632 |
| INIT˜ | U301 | 16 | LS244 |
| INIT˜ | U401 | 9 | 2631 |
| INT0˜+ | U107 | 2 | 2632 |
| INT0˜+ | U204 | 4 | 316B 220 |
| INT0˜- | U107 | 1 | 2632 |
| INT0˜- | U204 | 13 | 316B 220 |
| INT0˜- | U405 | 3 | 2631 |
| INT0˜ | U405 | 1 | 2631 |
| INT0˜ | U315 | 16 | SW8 |
| INT1˜+ | U107 | 14 | 2632 |
| INT1˜+ | U204 | 5 | 316B 220 |
| INT1˜+ | U405 | 6 | 2631 |
| INT1˜- | U204 | 12 | 316B 220 |
| INT1˜- | U107 | 15 | 2632 |
| INT1˜- | U405 | 5 | 2631 |
| INT1˜ | U315 | 15 | SW8 |
| INT1˜ | U405 | 7 | 2631 |
| INT2˜+ | U405 | 10 | 2631 |
| INT2˜+ | U107 | 6 | 2632 |
| INT2˜- | U204 | 11 | 316B 220 |
| INT2˜- | U107 | 7 | 2632 |
| INT2˜ | U315 | 14 | SW8 |
| INT2˜ | U405 | 9 | 2631 |
| INT3˜+ | U107 | 10 | 2632 |
| INT3˜+ | U405 | 14 | 2631 |
| INT3˜+ | U204 | 7 | 316B 220 |
| INT3˜- | U204 | 10 | 316B 220 |
| INT3˜- | U405 | 13 | 2631 |
| INT3˜- | U107 | 9 | 2632 |
| INT3˜ | U315 | 13 | SW8 |
| INT3˜ | U405 | 15 | 2631 |
| INT4˜+ | U105 | 2 | 2632 |
| INT4˜+ | U204 | 8 | 316B 220 |
| INT4˜- | U105 | 1 | 2632 |
| INT4˜- | U403 | 3 | 2631 |
| INT4˜- | U204 | 9 | 316B 220 |
| INT4˜ | U403 | 1 | 2631 |
| INT4˜ | U315 | 12 | SW8 |
| INT5˜+ | U104 | 1 | 316B 220 |
| INT5˜+ | U105 | 14 | 2632 |
| INT5˜+ | U403 | 6 | 2631 |
| INT5˜- | U105 | 15 | 2632 |
| INT5˜- | U104 | 16 | 316B 220 |
| INT5˜- | U403 | 5 | 263 |
| INT5˜ | U315 | 11 | SW8 |

| | | | |
|---|---|---|---|
| INT5~ | U403 | 7 | 2631 |
| INT6~+ | U403 | 10 | 2631 |
| INT6~+ | U104 | 2 | 316B 220 |
| INT6~+ | U105 | 6 | 2632 |
| INT6~- | U403 | 11 | 2631 |
| INT6~- | U104 | 15 | 316B 220 |
| INT6~- | U105 | 7 | 2632 |
| INT6~ | U315 | 10 | SW8 |
| INT6~ | U403 | 9 | 2631 |
| INT7~+ | U105 | 10 | 2632 |
| INT7~+ | U403 | 14 | 2631 |
| INT7~+ | U104 | 3 | 316B 220 |
| INT7~- | U403 | 13 | 2631 |
| INT7~- | U104 | 14 | 316B 220 |
| INT7~- | U105 | 9 | 2632 |
| INT7~ | U403 | 15 | 2631 |
| INT7~ | U315 | 9 | SW8 |
| IORC~+ | U402 | 10 | 2631 |
| IORC~+ | U104 | 6 | 316B 220 |
| IORC~- | U104 | 11 | 316B 220 |
| IORC~- | U101 | 7 | 2632 |
| IORC~ | U102 | 8 | LS125 |
| IORC~ | U402 | 9 | 2631 |
| IOR~ | U103 | 10 | LS32 |
| IOR~ | U201 | 21 | PAL20L8A |
| IOR~ | U101 | 5 | 2632 |
| IOWC~+ | U101 | 10 | 2632 |
| IOWC~+ | U402 | 14 | 2631 |
| IOWC~+ | U104 | 7 | 316B 220 |
| IOWC~- | U104 | 10 | 316B 220 |
| IOWC~- | U402 | 13 | 2631 |
| IOWC~- | U101 | 9 | 2632 |
| IOWC~ | U102 | 11 | LS125 |
| IOWC~ | U402 | 15 | 2631 |
| IOW~ | U101 | 11 | 2632 |
| IOW~ | U103 | 12 | LS32 |
| IOW~ | U201 | 20 | PAL20L8A |
| MB_ADR7~- | | J1 10 | CONNECTOR |
| MB_ADR8~+ | | J1 11 | CONNECTOR |
| MB_ADR8~- | | J1 12 | CONNECTOR |
| MB_ADR9~+ | | J1 13 | CONNECTOR |
| MB_ADR9~- | | J1 14 | CONNECTOR |
| MB_ADR10~+ | | J1 15 | CONNECTOR |
| MB_ADR10~- | | J1 16 | CONNECTOR |
| MB_ADR11~+ | | J1 17 | CONNECTOR |
| MB_ADR11~- | | J1 18 | CONNECTOR |
| MB_ADR12~+ | | J1 19 | CONNECTOR |
| MB_ADR12~- | | J1 20 | CONNECTOR |
| MB_ADR13~+ | | J1 21 | CONNECTOR |
| MB_ADR13~- | | J1 22 | CONNECTOR |
| MB_ADR14~+ | | J1 23 | CONNECTOR |
| MB_ADR14~- | | J1 24 | CONNECTOR |
| MB_ADR15~+ | | J1 25 | CONNECTOR |
| MB_ADR15~- | | J1 26 | CONNECTOR |
| MB_ADR16~+ | | J1 27 | CONNECTOR |
| MB_ADR16~- | | J1 28 | CONNECTOR |
| MB_ADR17~+ | | J1 29 | CONNECTOR |
| MB_ADR4~+ | | J1 3 | CONNECTOR |
| MB_ADR17~- | | J1 30 | CONNECTOR |
| MB_ADR18~+ | | J1 31 | CONNECTOR |

| | | |
|---|---|---|
| MB_ADR18~- | J1 32 | CONNECTOR |
| MB_ADR19~+ | J1 33 | CONNECTOR |
| MB_ADR19~- | J1 34 | CONNECTOR |
| INT0~+ | J1 35 | CONNECTOR |
| INT0~- | J1 36 | CONNECTOR |
| INT1~+ | J1 37 | CONNECTOR |
| INT1~- | J1 38 | CONNECTOR |
| INT2~+ | J1 39 | CONNECTOR |
| MB_ADR4~- | J1 4 | CONNECTOR |
| INT2~- | J1 40 | CONNECTOR |
| INT3~+ | J1 41 | CONNECTOR |
| INT3~- | J1 42 | CONNECTOR |
| INT4~+ | J1 43 | CONNECTOR |
| INT4~- | J1 44 | CONNECTOR |
| INT5~+ | J1 45 | CONNECTOR |
| INT5~- | J1 46 | CONNECTOR |
| INT6~+ | J1 47 | CONNECTOR |
| INT6~- | J1 48 | CONNECTOR |
| IOWC~+ | J1 49 | CONNECTOR |
| MB_ADR5~+ | J1 5 | CONNECTOR |
| INT7~- | J1 50 | CONNECTOR |
| IORC~+ | J1 51 | CONNECTOR |
| MRDC~- | J1 52 | CONNECTOR |
| MWTC~+ | J1 53 | CONNECTOR |
| MWTC~- | J1 54 | CONNECTOR |
| MRDC~+ | J1 55 | CONNECTOR |
| IORC~- | J1 56 | CONNECTOR |
| INT7~+ | J1 57 | CONNECTOR |
| IOWC~- | J1 58 | CONNECTOR |
| MB_ADR5~- | J1 6 | CONNECTOR |
| MB_ADR6~+ | J1 7 | CONNECTOR |
| MB_ADR6~- | J1 8 | CONNECTOR |
| MB_ADR7~+ | J1 9 | CONNECTOR |
| MB_ADR20~- | J2 10 | CONNECTOR |
| DAT0~+ | J2 11 | CONNECTOR |
| DAT0~- | J2 12 | CONNECTOR |
| DAT1~+ | J2 13 | CONNECTOR |
| DAT1~- | J2 14 | CONNECTOR |
| DAT2~+ | J2 15 | CONNECTOR |
| DAT2~- | J2 16 | CONNECTOR |
| DAT3~+ | J2 17 | CONNECTOR |
| DAT3~- | J2 18 | CONNECTOR |
| DAT4~+ | J2 19 | CONNECTOR |
| POWER OFF | J2 2 | CONNECTOR |
| DAT4~- | J2 20 | CONNECTOR |
| DAT5~+ | J2 21 | CONNECTOR |
| DAT5~- | J2 22 | CONNECTOR |
| DAT6~+ | J2 23 | CONNECTOR |
| DAT6~- | J2 24 | CONNECTOR |
| DAT12~+ | J2 25 | CONNECTOR |
| DAT7~- | J2 26 | CONNECTOR |
| DAT11~+ | J2 27 | CONNECTOR |
| DAT8~- | J2 28 | CONNECTOR |
| DAT10~+ | J2 29 | CONNECTOR |
| MB_ADR20~+ | J2 3 | CONNECTOR |
| DAT12~- | J2 30 | CONNECTOR |
| DAT9~+ | J2 31 | CONNECTOR |
| DAT11~- | J2 32 | CONNECTOR |
| DAT8~+ | J2 33 | CONNECTOR |
| DAT10~- | J2 34 | CONNECTOR |

| | | | |
|---|---|---|---|
| DAT7~+ | | J2 35 | CONNECTOR |
| DAT9~- | | J2 36 | CONNECTOR |
| XACK~+ | | J2 37 | CONNECTOR |
| XACK~- | | J2 38 | CONNECTOR |
| DAT13~+ | | J2 39 | CONNECTOR |
| MB_ADR23~- | | J2 4 | CONNECTOR |
| DAT13~- | | J2 40 | CONNECTOR |
| DAT14~+ | | J2 41 | CONNECTOR |
| DAT14~- | | J2 42 | CONNECTOR |
| DAT15~+ | | J2 43 | CONNECTOR |
| DAT15~- | | J2 44 | CONNECTOR |
| BHEN~+ | | J2 45 | CONNECTOR |
| BHEN~- | | J2 46 | CONNECTOR |
| CCLK~+ | | J2 47 | CONNECTOR |
| CCLK~- | | J2 48 | CONNECTOR |
| INIT~+ | | J2 49 | CONNECTOR |
| MB_ADR21~+ | | J2 5 | CONNECTOR |
| INIT~- | | J2 50 | CONNECTOR |
| MB_ADR0~+ | | J2 51 | CONNECTOR |
| MB_ADR0~- | | J2 52 | CONNECTOR |
| MB_ADR1~+ | | J2 53 | CONNECTOR |
| MB_ADR1~- | | J2 54 | CONNECTOR |
| MB_ADR2~+ | | J2 55 | CONNECTOR |
| MB_ADR2~- | | J2 56 | CONNECTOR |
| MB_ADR3~+ | | J2 57 | CONNECTOR |
| MB_ADR3~- | | J2 58 | CONNECTOR |
| MB_ADR22~- | | J2 6 | CONNECTOR |
| MB_ADR22~+ | | J2 7 | CONNECTOR |
| MB_ADR21~- | | J2 8 | CONNECTOR |
| MB_ADR23~+ | | J2 9 | CONNECTOR |
| MASTER1~ | U401 | 12 | 2631 |
| MASTER1~ | U201 | 18 | PAL20L8A |
| MASTER1~ | U112 | 9 | LS125 |
| MASTER2~ | U404 | 12 | 2631 |
| MASTER2~ | U112 | 8 | LS125 |
| MB_ADR0~+ | U210 | 10 | 2632 |
| MB_ADR0~+ | U401 | 14 | 2631 |
| MB_ADR0~+ | U310 | 4 | 316B 220 |
| MB_ADR0~- | U310 | 13 | 316B 220 |
| MB_ADR0~- | U210 | 9 | 2632 |
| MB_ADR0~ | U401 | 15 | 2631 |
| MB_ADR0~ | U309 | 5 | LS374 |
| MB_ADR10~+ | U207 | 14 | 2632 |
| MB_ADR10~+ | U307 | 6 | 316B 220 |
| MB_ADR10~- | U307 | 11 | 316B 220 |
| MB_ADR10~- | U207 | 15 | 2632 |
| MB_ADR10~- | U407 | 5 | 2631 |
| MB_ADR10~ | U407 | 7 | 2631 |
| MB_ADR10~ | U308 | 9 | LS374 |
| MB_ADR11~+ | U407 | 10 | 2631 |
| MB_ADR11~+ | U207 | 6 | 2632 |
| MB_ADR11~+ | U307 | 7 | 316B 220 |
| MB_ADR11~- | U307 | 10 | 316B 220 |
| MB_ADR11~- | U407 | 11 | 2631 |
| MB_ADR11~- | U207 | 7 | 2632 |
| MB_ADR11~ | U308 | 12 | LS374 |
| MB_ADR11~ | U407 | 9 | 2631 |
| MB_ADR12~+ | U207 | 10 | 2632 |
| MB_ADR12~+ | U407 | 14 | 2631 |
| MB_ADR12~+ | U307 | 8 | 316B 220 |

| | | | |
|---|---|---|---|
| MB_ADR12~- | U407 | 13 | 2631 |
| MB_ADR12~- | U207 | 9 | 2632 |
| MB_ADR12~ | U407 | 15 | 2631 |
| MB_ADR12~ | U203 | 2 | LS374 |
| MB_ADR13~+ | U306 | 1 | 316B 220 |
| MB_ADR13~+ | U206 | 2 | 2632 |
| MB_ADR13~- | U206 | 1 | 2632 |
| MB_ADR13~- | U306 | 16 | 316B 220 |
| MB_ADR13~- | U406 | 3 | 2631 |
| MB_ADR13~ | U406 | 1 | 2631 |
| MB_ADR13~ | U203 | 5 | LS374 |
| MB_ADR14~+ | U206 | 14 | 2632 |
| MB_ADR14~+ | U306 | 2 | 316B 220 |
| MB_ADR14~+ | U406 | 6 | 2631 |
| MB_ADR14~- | U306 | 15 | 316B 220 |
| MB_ADR14~- | U406 | 5 | 2631 |
| MB_ADR14~ | U203 | 6 | LS374 |
| MB_ADR14~ | U406 | 7 | 2631 |
| MB_ADR15~+ | U406 | 10 | 2631 |
| MB_ADR15~+ | U306 | 3 | 316B 220 |
| MB_ADR15~+ | U206 | 6 | 2632 |
| MB_ADR15~- | U406 | 11 | 2631 |
| MB_ADR15~- | U306 | 14 | 316B 220 |
| MB_ADR15~- | U206 | 7 | 2632 |
| MB_ADR15~ | U406 | 9 | 2631 |
| MB_ADR16~+ | U206 | 10 | 2632 |
| MB_ADR16~+ | U406 | 14 | 2631 |
| MB_ADR16~+ | U306 | 4 | 316B 220 |
| MB_ADR16~- | U306 | 13 | 316B 220 |
| MB_ADR16~- | U206 | 9 | 2632 |
| MB_ADR16~ | U203 | 12 | LS374 |
| MB_ADR16~ | U406 | 15 | 2631 |
| MB_ADR17~+ | U205 | 10 | 2632 |
| MB_ADR17~+ | U404 | 14 | 2631 |
| MB_ADR17~+ | U306 | 5 | 316B 220 |
| MB_ADR17~- | U306 | 12 | 316B 220 |
| MB_ADR17~- | U404 | 13 | 2631 |
| MB_ADR17~- | U205 | 9 | 2632 |
| MB_ADR17~ | U404 | 15 | 2631 |
| MB_ADR17~ | U202 | 2 | LS374 |
| MB_ADR18~+ | U205 | 2 | 2632 |
| MB_ADR18~+ | U306 | 6 | 316B 220 |
| MB_ADR18~- | U205 | 1 | 2632 |
| MB_ADR18~- | U306 | 11 | 316B 220 |
| MB_ADR18~- | U404 | 3 | 2631 |
| MB_ADR18~ | U404 | 1 | 2631 |
| MB_ADR18~ | U202 | 5 | LS374 |
| MB_ADR19~+ | U205 | 14 | 2632 |
| MB_ADR19~+ | U404 | 6 | 2631 |
| MB_ADR19~+ | U306 | 7 | 316B 220 |
| MB_ADR19~- | U306 | 10 | 316B 220 |
| MB_ADR19~- | U205 | 15 | 2632 |
| MB_ADR19~- | U404 | 5 | 2631 |
| MB_ADR19~ | U202 | 6 | LS374 |
| MB_ADR19~ | U404 | 7 | 2631 |
| MB_ADR1~+ | U409 | 2 | 2631 |
| MB_ADR1~+ | U310 | 5 | 316B 220 |
| MB_ADR1~- | U209 | 1 | 2632 |
| MB_ADR1~- | U310 | 12 | 316B 220 |
| MB_ADR1~- | U409 | 3 | 2631 |

| | | | |
|---|---|---|---|
| MB_ADR1~ | U409 | 1 | 2631 |
| MB_ADR1~ | U309 | 6 | LS374 |
| MB_ADR20~+ | U420 | 2 | 2632 |
| MB_ADR20~+ | U418 | 8 | 316B 220 |
| MB_ADR20~- | U420 | 1 | 2632 |
| MB_ADR20~- | U419 | 3 | 2631 |
| MB_ADR20~- | U418 | 9 | 316B 220 |
| MB_ADR20~ | U419 | 1 | 2631 |
| MB_ADR20~ | U202 | 9 | LS374 |
| MB_ADR21~+ | U418 | 1 | 316B 220 |
| MB_ADR21~+ | U420 | 14 | 2632 |
| MB_ADR21~+ | U419 | 6 | 2631 |
| MB_ADR21~- | U420 | 15 | 2632 |
| MB_ADR21~- | U418 | 16 | 316B 220 |
| MB_ADR21~- | U419 | 5 | 2631 |
| MB_ADR21~ | U202 | 12 | LS374 |
| MB_ADR21~ | U419 | 7 | 2631 |
| MB_ADR22~+ | U419 | 10 | 2631 |
| MB_ADR22~+ | U418 | 2 | 316B 220 |
| MB_ADR22~+ | U420 | 6 | 2632 |
| MB_ADR22~- | U419 | 11 | 2631 |
| MB_ADR22~- | U418 | 15 | 316B 220 |
| MB_ADR22~- | U420 | 7 | 2632 |
| MB_ADR22~ | U202 | 15 | LS374 |
| MB_ADR22~ | U419 | 9 | 2631 |
| MB_ADR23~+ | U420 | 10 | 2632 |
| MB_ADR23~+ | U419 | 14 | 2631 |
| MB_ADR23~+ | U418 | 3 | 316B 220 |
| MB_ADR23~- | U419 | 13 | 2631 |
| MB_ADR23~- | U418 | 14 | 316B 220 |
| MB_ADR23~- | U420 | 9 | 2632 |
| MB_ADR23~ | U419 | 15 | 2631 |
| MB_ADR23~ | U202 | 16 | LS374 |
| MB_ADR2~+ | U209 | 14 | 2632 |
| MB_ADR2~+ | U310 | 6 | 316B 220 |
| MB_ADR2~- | U310 | 11 | 316B 220 |
| MB_ADR2~- | U209 | 15 | 2632 |
| MB_ADR2~- | U409 | 5 | 2631 |
| MB_ADR2~ | U409 | 7 | 2631 |
| MB_ADR2~ | U309 | 9 | LS374 |
| MB_ADR3~+ | U409 | 10 | 2631 |
| MB_ADR3~+ | U209 | 6 | 2632 |
| MB_ADR3~+ | U310 | 7 | 316B 220 |
| MB_ADR3~- | U310 | 10 | 316B 220 |
| MB_ADR3~- | U409 | 11 | 2631 |
| MB_ADR3~- | U209 | 7 | 2632 |
| MB_ADR3~ | U309 | 12 | LS374 |
| MB_ADR3~ | U409 | 9 | 2631 |
| MB_ADR4~+ | U209 | 10 | 2632 |
| MB_ADR4~+ | U409 | 14 | 2631 |
| MB_ADR4~+ | U310 | 8 | 316B 220 |
| MB_ADR4~- | U409 | 13 | 2631 |
| MB_ADR4~- | U310 | 9 | 316B 220 |
| MB_ADR4~ | U409 | 15 | 2631 |
| MB_ADR5~+ | U307 | 1 | 316B 220 |
| MB_ADR5~+ | U408 | 2 | 2631 |
| MB_ADR5~- | U208 | 1 | 2632 |
| MB_ADR5~- | U307 | 16 | 316B 220 |
| MB_ADR5~- | U408 | 3 | 2631 |
| MB_ADR5~ | U408 | 1 | 2631 |

| | | | |
|---|---|---|---|
| MB_ADR5~ | U309 | 16 | LS374 |
| MB_ADR6~+ | U208 | 14 | 2632 |
| MB_ADR6~+ | U307 | 2 | 316B 220 |
| MB_ADR6~+ | U408 | 6 | 2631 |
| MB_ADR6~- | U307 | 15 | 316B 220 |
| MB_ADR6~- | U408 | 5 | 2631 |
| MB_ADR6~ | U309 | 19 | LS374 |
| MB_ADR6~ | U408 | 7 | 2631 |
| MB_ADR7~+ | U408 | 10 | 2631 |
| MB_ADR7~+ | U307 | 3 | 316B 220 |
| MB_ADR7~+ | U208 | 6 | 2632 |
| MB_ADR7~- | U408 | 11 | 2631 |
| MB_ADR7~- | U307 | 14 | 316B 220 |
| MB_ADR7~- | U208 | 7 | 2632 |
| MB_ADR7~ | U308 | 2 | LS374 |
| MB_ADR7~ | U408 | 9 | 2631 |
| MB_ADR8~+ | U208 | 10 | 2632 |
| MB_ADR8~+ | U408 | 14 | 2631 |
| MB_ADR8~+ | U307 | 4 | 316B 220 |
| MB_ADR8~- | U307 | 13 | 316B 220 |
| MB_ADR8~- | U208 | 9 | 2632 |
| MB_ADR8~ | U408 | 15 | 2631 |
| MB_ADR8~ | U308 | 5 | LS374 |
| MB_ADR9~+ | U407 | 2 | 2631 |
| MB_ADR9~+ | U307 | 5 | 316B 220 |
| MB_ADR9~- | U207 | 1 | 2632 |
| MB_ADR9~- | U307 | 12 | 316B 220 |
| MB_ADR9~- | U407 | 3 | 2631 |
| MB_ADR9~ | U407 | 1 | 2631 |
| MB_ADR9~ | U308 | 6 | LS374 |
| MRDC~+ | U101 | 2 | 2632 |
| MRDC~+ | U104 | 4 | 316B 220 |
| MRDC~- | U101 | 1 | 2632 |
| MRDC~- | U104 | 13 | 316B 220 |
| MRDC~- | U402 | 3 | 2631 |
| MRDC~ | U402 | 1 | 2631 |
| MRDC~ | U102 | 3 | LS125 |
| MRD~ | U201 | 13 | PAL20L8A |
| MRD~ | U103 | 2 | LS32 |
| MRD~ | U101 | 3 | 2632 |
| MWR~ | U101 | 13 | 2632 |
| MWR~ | U201 | 14 | PAL20L8A |
| MWR~ | U103 | 4 | LS32 |
| MWTC~+ | U101 | 14 | 2632 |
| MWTC~+ | U104 | 5 | 316B 220 |
| MWTC~+ | U402 | 6 | 2631 |
| MWTC~- | U104 | 12 | 316B 220 |
| MWTC~- | U101 | 15 | 2632 |
| MWTC~- | U402 | 5 | 2631 |
| MWTC~ | U102 | 6 | LS125 |
| MWTC~ | U402 | 7 | 2631 |
| OPERATION~ | U201 | 17 | PAL20L8A |
| OPERATION~ | U110 | 9 | LS02 |
| INIT~ | | P1-16 | CONNECTOR |
| MRDC~ | | P1-23 | CONNECTOR |
| MWTC~ | | P1-24 | CONNECTOR |
| IORC~ | | P1-25 | CONNECTOR |
| IOWC~ | | P1-26 | CONNECTOR |
| XACK~ | | P1-27 | CONNECTOR |
| BHEN~ | | P1-33 | CONNECTOR |

| | | | |
|---|---|---|---|
| MB_ADR16~ | | P1-34 | CONNECTOR |
| MB_ADR17~ | | P1-36 | CONNECTOR |
| CCLK~ | | P1-37 | CONNECTOR |
| MB_ADR18~ | | P1-38 | CONNECTOR |
| MB_ADR19~ | | P1-40 | CONNECTOR |
| INT6~ | | P1-43 | CONNECTOR |
| INT7~ | | P1-44 | CONNECTOR |
| INT4~ | | P1-45 | CONNECTOR |
| INT5~ | | P1-46 | CONNECTOR |
| INT2~ | | P1-47 | CONNECTOR |
| INT3~ | | P1-48 | CONNECTOR |
| INT0~ | | P1-49 | CONNECTOR |
| INT1~ | | P1-50 | CONNECTOR |
| MB_ADR14~ | | P1-53 | CONNECTOR |
| MB_ADR15~ | | P1-54 | CONNECTOR |
| MB_ADR12~ | | P1-55 | CONNECTOR |
| MB_ADR13~ | | P1-56 | CONNECTOR |
| MB_ADR10~ | | P1-57 | CONNECTOR |
| MB_ADR11~ | | P1-58 | CONNECTOR |
| MB_ADR8~ | | P1-59 | CONNECTOR |
| MB_ADR9~ | | P1-60 | CONNECTOR |
| MB_ADR6~ | | P1-63 | CONNECTOR |
| MB_ADR7~ | | P1-64 | CONNECTOR |
| MB_ADR4~ | | P1-65 | CONNECTOR |
| MB_ADR5~ | | P1-66 | CONNECTOR |
| MB_ADR2~ | | P1-67 | CONNECTOR |
| MB_ADR3~ | | P1-68 | CONNECTOR |
| MB_ADR0~ | | P1-69 | CONNECTOR |
| MB_ADR1~ | | P1-70 | CONNECTOR |
| DAT14~ | | P1-73 | CONNECTOR |
| DAT15~ | | P1-74 | CONNECTOR |
| DAT12~ | | P1-75 | CONNECTOR |
| DAT13~ | | P1-76 | CONNECTOR |
| DAT10~ | | P1-77 | CONNECTOR |
| DAT11~ | | P1-78 | CONNECTOR |
| DAT8~ | | P1-79 | CONNECTOR |
| DAT9~ | | P1-80 | CONNECTOR |
| DAT6~ | | P1-83 | CONNECTOR |
| DAT7~ | | P1-84 | CONNECTOR |
| DAT4~ | | P1-85 | CONNECTOR |
| DAT5~ | | P1-86 | CONNECTOR |
| DAT2~ | | P1-87 | CONNECTOR |
| DAT3~ | | P1-88 | CONNECTOR |
| DAT0~ | | P1-89 | CONNECTOR |
| DAT1~ | | P1-90 | CONNECTOR |
| MB_ADR23~ | | P2-76 | CONNECTOR |
| MB_ADR21~ | | P2-78 | CONNECTOR |
| MB_ADR22~ | | P2-81 | CONNECTOR |
| MB_ADR20~ | | P2-83 | CONNECTOR |
| POWER OFF | U201 | 16 | PAL20L8A |
| POWER OFF | R101 | 2 | RES 10K |
| POWER OFF | U115 | 7 | MCT6 |
| PU5 | U111 | 1 | LS164 |
| PU5 | U111 | 2 | LS164 |
| SEL | U201 | 1 | PAL20L8A |
| SEL | U316 | 16 | SW8 |
| SLAVE1~ | U309 | 1 | LS374 |
| SLAVE1~ | U303 | 11 | LS240 |
| SLAVE1~ | W1 | 2 | JUMP2 |
| SLAVE1~ | U201 | 23 | PAL20L8A |

| | | | |
|---|---|---|---|
| SLAVE1~ | U112 | 5 | LS125 |
| SLAVE1~ | U106 | 6 | 316A102 1K |
| SLAVE2~ | U202 | 1 | LS374 |
| SLAVE2~ | U102 | 10 | LS125 |
| SLAVE2~ | U405 | 12 | 2631 |
| SLAVE2~ | U102 | 13 | LS125 |
| SLAVE2~ | U102 | 4 | LS125 |
| SLAVE2~ | U112 | 6 | LS125 |
| SWIN_0 | U315 | 1 | SW8 |
| SWIN_0 | U108 | 3 | LS125 |
| SWIN_1 | U315 | 2 | SW8 |
| SWIN_1 | U108 | 6 | LS125 |
| SWIN_2 | U315 | 3 | SW8 |
| SWIN_2 | U108 | 8 | LS125 |
| SWIN_3 | U108 | 11 | LS125 |
| SWIN_3 | U315 | 4 | SW8 |
| SWIN_4 | U305 | 3 | LS125 |
| SWIN_4 | U315 | 5 | SW8 |
| SWIN_5 | U315 | 6 | SW8 |
| SWIN_6 | U315 | 7 | SW8 |
| SWIN_6 | U305 | 8 | LS125 |
| SWIN_7 | U305 | 11 | LS125 |
| SWIN_7 | U315 | 8 | SW8 |
| VCC | CR101 | 1 | DD |
| VCC | U106 | 16 | 316A102 1K |
| VCC | R201 | 2 | RES 10K |
| VCC | U418 | 4 | 316B 220 |
| WR_TIMING~ | U103 | 13 | LS32 |
| WR_TIMING~ | U303 | 14 | LS240 |
| WR_TIMING~ | U103 | 5 | LS32 |
| XACK~+ | U302 | 10 | 2631 |
| XACK~+ | U113 | 6 | 2632 |
| XACK~+ | U104 | 8 | 316B 220 |
| XACK~- | U302 | 11 | 2631 |
| XACK~- | U113 | 7 | 2632 |
| XACK~- | U104 | 9 | 316B 220 |
| XACK~ | U303 | 2 | LS240 |
| XACK~ | U112 | 3 | LS125 |

INTERPOLATION PAGE 1

| Signal_name | Physical_location | Pin_number | Part_name |
|---|---|---|---|
| 0:XSIG1261 | U618 | 11 | HCT08 |
| 0:XSIG1261 | U720 | 2 | LS240 |
| 0:XSIG1297 | U620 | 1 | HCT04 |
| 0:XSIG1297 | U718 | 12 | S244 |
| 0:XSIG1297 | U718 | 3 | S244 |
| 0:XSIG950 | U619 | 1 | HCT10 |
| 0:XSIG950 | U417 | 21 | 4501 |
| 0:XSIG959 | U619 | 2 | HCT10 |
| 0:XSIG959 | U420 | 21 | 4501 |
| 0:XSIG960 | U619 | 13 | HCT10 |
| 0:XSIG960 | U408 | 21 | 4501 |
| 10:XSIG1 | U302 | 18 | PGA2010 |
| 10:XSIG1 | U402 | 23 | PAL20R8A |
| 10:XSIG2 | U302 | 19 | PGA2010 |
| 10:XSIG2 | U402 | 2 | PAL20R8A |
| 10:XSIG3 | U302 | 20 | PGA2010 |
| 10:XSIG3 | U402 | 3 | PAL20R8A |
| 10:XSIG351 | U402 | 14 | PAL20R8A |
| 10:XSIG351 | U401 | 19 | HCT688 |
| 10:XSIG4 | U302 | 21 | PGA2010 |

| | | | |
|---|---|---|---|
| 10:XSIG4 | U402 | 4 | PAL20R8A |
| 10:XSIG5 | U302 | 22 | PGA2010 |
| 10:XSIG5 | U402 | 5 | PAL20R8A |
| 10:XSIG6 | U302 | 23 | PGA2010 |
| 10:XSIG6 | U402 | 6 | PAL20R8A |
| 10:XSIG7 | U302 | 24 | PGA2010 |
| 10:XSIG7 | U402 | 7 | PAL20R8A |
| 10:XSIG8 | U302 | 25 | PGA2010 |
| 10:XSIG8 | U402 | 8 | PAL20R8A |
| 13:XSIG1 | U621 | 1 | PAL16L8A |
| 13:XSIG125 | U717 | 5 | HCT153 |
| 13:XSIG125 | U723 | 6 | LS244 |
| 13:XSIG125 | U716 | 9 | HCT139 |
| 13:XSIG1 | U722 | 3 | LS244 |
| 13:XSIG182 | U201 | 2 | LS461 |
| 13:XSIG182 | U705 | 8 | HCT08 |
| 13:XSIG2 | U621 | 2 | PAL16L8A |
| 13:XSIG2 | U722 | 5 | LS244 |
| 13:XSIG3 | U621 | 3 | PAL16L8A |
| 13:XSIG3 | U722 | 7 | LS244 |
| 13:XSIG4 | U621 | 4 | PAL16L8A |
| 13:XSIG459 | U622 | 11 | S244 |
| 13:XSIG459 | U621 | 12 | PAL16L8A |
| 13:XSIG4 | U722 | 9 | LS244 |
| 13:XSIG508 | U623 | 10 | DELAY 50nS |
| 13:XSIG508 | U622 | 2 | S244 |
| 13:XSIG513 | U716 | 15 | HCT139 |
| 13:XSIG513 | U723 | 17 | LS244 |
| 13:XSIG513 | U717 | 6 | HCT153 |
| 13:XSIG513 | U617 | 8 | HCT74 |
| 13:XSIG514 | U716 | 10 | HCT139 |
| 13:XSIG514 | U717 | 4 | HCT153 |
| 13:XSIG515 | U716 | 11 | HCT139 |
| 13:XSIG515 | U723 | 2 | LS244 |
| 13:XSIG515 | U717 | 3 | HCT153 |
| 13:XSIG580 | U622 | 4 | S244 |
| 13:XSIG580 | U622 | 6 | S244 |
| 13:XSIG580 | U622 | 8 | S244 |
| 14:XSIG1008 | U618 | 1 | HCT08 |
| 14:XSIG1008 | U517 | 6 | HCT74 |
| 14:XSIG1009 | U618 | 2 | HCT08 |
| 14:XSIG1009 | U613 | 6 | HCT04 |
| 15:XSIG203 | U614 | 2 | S161 |
| 15:XSIG203 | U615 | 8 | OSC |
| 15:XSIG484 | U715 | 13 | HCT139 |
| 15:XSIG484 | U712 | 5 | HCT273 |
| 15:XSIG485 | U715 | 14 | HCT139 |
| 15:XSIG485 | U712 | 2 | HCT273 |
| 15:XSIG487 | U714 | 3 | HCT04 |
| 15:XSIG487 | U712 | 9 | HCT273 |
| 15:XSIG494 | U613 | 12 | HCT04 |
| 15:XSIG494 | U511 | 9 | HCT164 |
| 15:XSIG503 | U618 | 10 | HCT08 |
| 15:XSIG503 | U613 | 8 | HCT04 |
| 15:XSIG542 | U712 | 12 | HCT273 |
| 15:XSIG542 | U714 | 5 | HCT04 |
| 15:XSIG587 | U511 | 10 | HCT164 |
| 15:XSIG587 | U613 | 9 | HCT04 |
| 15:XSIG593 | U511 | 5 | HCT164 |
| 15:XSIG593 | U618 | 9 | HCT08 |
| 15:XSIG602 | U613 | 10 | HCT04 |

| | | | |
|---|---|---|---|
| 15:XSIG602 | U609 | 4 | LS125 |
| 15:XSIG618 | U509 | 10 | S11 |
| 15:XSIG618 | U511 | 4 | HCT164 |
| 15:XSIG619 | U501 | 8 | HCT00 |
| 15:XSIG619 | U509 | 9 | S11 |
| 15:XSIG640 | U509 | 11 | S11 |
| 15:XSIG640 | U613 | 4 | HCT04 |
| 15:XSIG644 | U613 | 11 | HCT04 |
| 15:XSIG644 | U511 | 13 | HCT164 |
| 15:XSIG668 | U511 | 12 | HCT164 |
| 15:XSIG668 | U613 | 3 | HCT04 |
| 15:XSIG675 | U614 | 10 | S161 |
| 15:XSIG675 | U516 | 12 | 316A102 1K |
| 15:XSIG675 | U614 | 7 | S161 |
| 15:XSIG742 | U714 | 11 | HCT04 |
| 15:XSIG742 | U712 | 16 | HCT273 |
| 1:XSIG551 | U101 | 12 | LS590 |
| 1:XSIG551 | U102 | 9 | LS590 |
| 1:XSIG556 | U124 | 12 | LS590 |
| 1:XSIG556 | U123 | 9 | LS590 |
| 1:XSIG590 | U102 | 13 | LS590 |
| 1:XSIG590 | U501 | 6 | HCT00 |
| 1:XSIG592 | U102 | 11 | LS590 |
| 1:XSIG592 | U501 | 3 | HCT00 |
| 1:XSIG592 | U501 | 4 | HCT00 |
| 1:XSIG592 | U501 | 5 | HCT00 |
| 1:XSIG598 | U124 | 11 | LS590 |
| 1:XSIG598 | U229 | 12 | HCT00 |
| 1:XSIG598 | U229 | 13 | HCT00 |
| 1:XSIG598 | U229 | 8 | HCT00 |
| 1:XSIG600 | U229 | 11 | HCT00 |
| 1:XSIG600 | U124 | 13 | LS590 |
| 3:XSIG1117 | U425 | 12 | LS590 |
| 3:XSIG1117 | U424 | 9 | LS590 |
| 3:XSIG996 | U423 | 14 | LS461 |
| 3:XSIG996 | U422 | 23 | LS461 |
| 4:XSIG1 | U312 | 18 | PGA2010 |
| 4:XSIG1 | U419 | 23 | PAL20R8A |
| 4:XSIG2 | U312 | 19 | PGA2010 |
| 4:XSIG2 | U419 | 2 | PAL20R8A |
| 4:XSIG3 | U312 | 20 | PGA2010 |
| 4:XSIG326 | U419 | 14 | PAL20R8A |
| 4:XSIG326 | U418 | 19 | HCT688 |
| 4:XSIG3 | U419 | 3 | PAL20R8A |
| 4:XSIG4 | U312 | 21 | PGA2010 |
| 4:XSIG4 | U419 | 4 | PAL20R8A |
| 4:XSIG5 | U312 | 22 | PGA2010 |
| 4:XSIG5 | U419 | 5 | PAL20R8A |
| 4:XSIG6 | U312 | 23 | PGA2010 |
| 4:XSIG6 | U419 | 6 | PAL20R8A |
| 4:XSIG7 | U312 | 24 | PGA2010 |
| 4:XSIG7 | U419 | 7 | PAL20R8A |
| 4:XSIG8 | U312 | 25 | PGA2010 |
| 4:XSIG8 | U419 | 8 | PAL20R8A |
| 5:XSIG581 | U115 | 14 | LS382 |
| 5:XSIG581 | U116 | 15 | LS382 |
| 6:XSIG1117 | U415 | 12 | LS590 |
| 6:XSIG1117 | U414 | 9 | LS590 |
| 6:XSIG996 | U413 | 14 | LS461 |
| 6:XSIG996 | U412 | 23 | LS461 |

| | | | |
|---|---|---|---|
| 7:XSIG1 | U307 | 18 | PGA2010 |
| 7:XSIG1 | U410 | 23 | PAL20R8A |
| 7:XSIG2 | U307 | 19 | PGA2010 |
| 7:XSIG2 | U410 | 2 | PAL20R8A |
| 7:XSIG3 | U307 | 20 | PGA2010 |
| 7:XSIG3 | U410 | 3 | PAL20R8A |
| 7:XSIG409 | U410 | 14 | PAL20R8A |
| 7:XSIG409 | U409 | 19 | HCT688 |
| 7:XSIG4 | U307 | 21 | PGA2010 |
| 7:XSIG4 | U410 | 4 | PAL20R8A |
| 7:XSIG5 | U307 | 22 | PGA2010 |
| 7:XSIG5 | U410 | 5 | PAL20R8A |
| 7:XSIG6 | U307 | 23 | PGA2010 |
| 7:XSIG6 | U410 | 6 | PAL20R8A |
| 7:XSIG7 | U307 | 24 | PGA2010 |
| 7:XSIG7 | U410 | 7 | PAL20R8A |
| 7:XSIG8 | U307 | 25 | PGA2010 |
| 7:XSIG8 | U410 | 8 | PAL20R8A |
| 8:XSIG579 | U108 | 14 | LS382 |
| 8:XSIG579 | U109 | 15 | LS382 |
| 9:XSIG1117 | U406 | 12 | LS590 |
| 9:XSIG1117 | U405 | 9 | LS590 |
| 9:XSIG996 | U403 | 14 | LS461 |
| 9:XSIG996 | U404 | 23 | LS461 |
| ACC | U503 | 16 | PAL16L8A |
| ACC | U312 | 46 | PGA2010 |
| ACC | U301 | 8 | HCT244 |
| ACC | U202 | 9 | 2729 |
| AD10~ | U708 | 17 | LS240 |
| AD11~ | U713 | 2 | LS240 |
| AD12~ | U713 | 4 | LS240 |
| AD13~ | U713 | 6 | LS240 |
| AD14~ | U713 | 8 | LS240 |
| AD15~ | U713 | 11 | LS240 |
| AD16~ | U713 | 13 | LS240 |
| AD17~ | U713 | 15 | LS240 |
| ADR1~ | U709 | 2 | LS240 |
| ADR2~ | U709 | 4 | LS240 |
| ADR3~ | U709 | 6 | LS240 |
| ADR4~ | U709 | 8 | LS240 |
| ADR5~ | U709 | 11 | LS240 |
| ADR6~ | U709 | 13 | LS240 |
| ADR7~ | U709 | 15 | LS240 |
| ADR8~ | U709 | 17 | LS240 |
| ADR9~ | U708 | 2 | LS240 |
| ADRA~ | U708 | 4 | LS240 |
| ADRB~ | U708 | 6 | LS240 |
| ADRC~ | U708 | 8 | LS240 |
| ADRD~ | U708 | 11 | LS240 |
| ADRE~ | U708 | 13 | LS240 |
| ADRF~ | U708 | 15 | LS240 |
| AX0B_P1 | U205 | 1 | 2018 |
| AX0B_P1 | U207 | 2 | HCT374 |
| AX0B_P1 | U208 | 7 | HCT244 |
| AX0B_P2 | U205 | 2 | 2018 |
| AX0B_P2 | U207 | 5 | HCT374 |
| AX0B_P3 | U208 | 3 | HCT244 |
| AX0B_P3 | U207 | 6 | HCT374 |
| AX0G_P1 | U222 | 1 | 2018 |
| AX0G_P1 | U224 | 2 | HCT374 |

| | | | |
|---|---|---|---|
| AX0G_P1 | U225 | 7 | HCT244 |
| AX0G_P2 | U222 | 2 | 2018 |
| AX0G_P2 | U224 | 5 | HCT374 |
| AX0G_P3 | U225 | 3 | HCT244 |
| AX0G_P3 | U224 | 6 | HCT374 |
| AX0R_P1 | U214 | 1 | 2018 |
| AX0R_P1 | U216 | 2 | HCT374 |
| AX0R_P1 | U217 | 7 | HCT244 |
| AX0R_P2 | U214 | 2 | 2018 |
| AX0R_P2 | U216 | 5 | HCT374 |
| AX0R_P3 | U217 | 3 | HCT244 |
| AX0R_P3 | U216 | 6 | HCT374 |
| AY0B_P1 | U208 | 14 | HCT244 |
| AY0B_P1 | U207 | 15 | HCT374 |
| AY0B_P1 | U205 | 19 | 2018 |
| AY0B_P2 | U208 | 12 | HCT244 |
| AY0B_P2 | U207 | 16 | HCT374 |
| AY0B_P2 | U205 | 22 | 2018 |
| AY0B_P3 | U207 | 19 | HCT374 |
| AY0B_P3 | U205 | 23 | 2018 |
| AY0B_P3 | U208 | 9 | HCT244 |
| AY0G_P1 | U225 | 14 | HCT244 |
| AY0G_P1 | U224 | 15 | HCT374 |
| AY0G_P1 | U222 | 19 | 2018 |
| AY0G_P2 | U225 | 12 | HCT244 |
| AY0G_P2 | U224 | 16 | HCT374 |
| AY0G_P2 | U222 | 22 | 2018 |
| AY0G_P3 | U224 | 19 | HCT374 |
| AY0G_P3 | U222 | 23 | 2018 |
| AY0G_P3 | U225 | 9 | HCT244 |
| AY0R_P1 | U217 | 14 | HCT244 |
| AY0R_P1 | U216 | 15 | HCT374 |
| AY0R_P1 | U214 | 19 | 2018 |
| AY0R_P2 | U217 | 12 | HCT244 |
| AY0R_P2 | U216 | 16 | HCT374 |
| AY0R_P2 | U214 | 22 | 2018 |
| AY0R_P3 | U216 | 19 | HCT374 |
| AY0R_P3 | U214 | 23 | 2018 |
| AY0R_P3 | U217 | 9 | HCT244 |
| BCCLK~ | U707 | 14 | LS244 |
| BCCLK~ | U511 | 8 | HCT164 |
| BCS1~ | U210 | 15 | PAL20R4A |
| BCS1~ | U306 | 20 | HM62256 |
| BCS2~ | U210 | 16 | PAL20R4A |
| BCS2~ | U305 | 20 | HM62256 |
| BCS3~ | U303 | 20 | HM62256 |
| BCS3~ | U210 | 21 | PAL20R4A |
| BCS4~ | U304 | 20 | HM62256 |
| BCS4~ | U210 | 22 | PAL20R4A |
| BINIT~ | U707 | 12 | LS244 |
| BINIT~ | U618 | 5 | HCT08 |
| BMRDC~ | U421 | 1 | HCT245 |
| BMRDC~ | U621 | 11 | PAL16L8A |
| BMRDC~ | U612 | 14 | PAL14L8 |
| BMRDC~ | U707 | 18 | LS244 |
| BMRDC~ | U715 | 2 | HCT139 |
| BMRDC~ | U407 | 23 | PAL14L8 |
| BMRDC~ | U608 | 4 | HCT138 |
| BMWTC~ | U606 | 13 | PAL12L10 |
| BMWTC~ | U407 | 14 | PAL14L8 |

| | | | |
|---|---|---|---|
| BMWTC~ | U707 | 16 | LS244 |
| BMWTC~ | U612 | 23 | PAL14L8 |
| BMWTC~ | U715 | 3 | HCT139 |
| BMWTC~ | U616 | 4 | HCT138 |
| BMWTC~ | U621 | 9 | PAL16L8A |
| BNTV | U402 | 11 | PAL20R8A |
| BNTV | U302 | 37 | PGA2010 |
| B_ENB~ | U402 | 13 | PAL20R8A |
| B_ENB~ | U716 | 7 | HCT139 |
| CB_0 | U206 | 18 | HCT245 |
| CB_0 | U302 | 66 | PGA2010 |
| CB_0 | U205 | 9 | 2018 |
| CB_10 | U204 | 11 | 2018 |
| CB_10 | U203 | 16 | HCT245 |
| CB_10 | U302 | 56 | PGA2010 |
| CB_1 | U205 | 10 | 2018 |
| CB_11 | U204 | 13 | 2018 |
| CB_11 | U203 | 15 | HCT245 |
| CB_11 | U302 | 55 | PGA2010 |
| CB_1 | U206 | 17 | HCT245 |
| CB_12 | U204 | 14 | 2018 |
| CB_12 | U302 | 54 | PGA2010 |
| CB_13 | U203 | 13 | HCT245 |
| CB_13 | U204 | 15 | 2018 |
| CB_13 | U302 | 53 | PGA2010 |
| CB_14 | U203 | 12 | HCT245 |
| CB_14 | U204 | 16 | 2018 |
| CB_14 | U302 | 52 | PGA2010 |
| CB_15 | U203 | 11 | HCT245 |
| CB_15 | U204 | 17 | 2018 |
| CB_15 | U302 | 50 | PGA2010 |
| CB_1 | U302 | 65 | PGA2010 |
| CB_2 | U205 | 11 | 2018 |
| CB_2 | U206 | 16 | HCT245 |
| CB_2 | U302 | 64 | PGA2010 |
| CB_3 | U205 | 13 | 2018 |
| CB_3 | U206 | 15 | HCT245 |
| CB_3 | U302 | 63 | PGA2010 |
| CB_4 | U205 | 14 | 2018 |
| CB_4 | U302 | 62 | PGA2010 |
| CB_5 | U206 | 13 | HCT245 |
| CB_5 | U205 | 15 | 2018 |
| CB_5 | U302 | 61 | PGA2010 |
| CB_6 | U206 | 12 | HCT245 |
| CB_6 | U205 | 16 | 2018 |
| CB_6 | U302 | 60 | PGA2010 |
| CB_7 | U206 | 11 | HCT245 |
| CB_7 | U205 | 17 | 2018 |
| CB_7 | U302 | 59 | PGA2010 |
| CB_8 | U203 | 18 | HCT245 |
| CB_8 | U302 | 58 | PGA2010 |
| CB_8 | U204 | 9 | 2018 |
| CB_9 | U204 | 10 | 2018 |
| CB_9 | U203 | 17 | HCT245 |
| CB_9 | U302 | 57 | PGA2010 |
| CB_ACCESS~ | U505 | 13 | HCT11 |
| CB_ACCESS~ | U206 | 19 | HCT245 |
| CB_ACCESS~ | U612 | 20 | PAL14L8 |
| CB_ACCESS~ | U407 | 3 | PAL14L8 |
| CCLK~ | U707 | 6 | LS244 |

| | | | |
|---|---|---|---|
| CFB_WE~ | U407 | 20 | PAL14L8 |
| CFB_WE~ | U205 | 21 | 2018 |
| CFG_WE~ | U222 | 21 | 2018 |
| CFR_WE~ | U214 | 21 | 2018 |
| CFR_WE~ | U407 | 22 | PAL14L8 |
| CG_0 | U223 | 18 | HCT245 |
| CG_0 | U312 | 66 | PGA2010 |
| CG_0 | U222 | 9 | 2018 |
| CG_10 | U221 | 11 | 2018 |
| CG_10 | U220 | 16 | HCT245 |
| CG_10 | U312 | 56 | PGA2010 |
| CG_1 | U222 | 10 | 2018 |
| CG_11 | U221 | 13 | 2018 |
| CG_11 | U220 | 15 | HCT245 |
| CG_11 | U312 | 55 | PGA2010 |
| CG_1 | U223 | 17 | HCT245 |
| CG_12 | U221 | 14 | 2018 |
| CG_12 | U312 | 54 | PGA2010 |
| CG_13 | U220 | 13 | HCT245 |
| CG_13 | U221 | 15 | 2018 |
| CG_13 | U312 | 53 | PGA2010 |
| CG_14 | U220 | 12 | HCT245 |
| CG_14 | U221 | 16 | 2018 |
| CG_14 | U312 | 52 | PGA2010 |
| CG_15 | U220 | 11 | HCT245 |
| CG_15 | U221 | 17 | 2018 |
| CG_15 | U312 | 50 | PGA2010 |
| CG_1 | U312 | 65 | PGA2010 |
| CG_2 | U222 | 11 | 2018 |
| CG_2 | U223 | 16 | HCT245 |
| CG_2 | U312 | 64 | PGA2010 |
| CG_3 | U222 | 13 | 2018 |
| CG_3 | U223 | 15 | HCT245 |
| CG_3 | U312 | 63 | PGA2010 |
| CG_4 | U222 | 14 | 2018 |
| CG_4 | U312 | 62 | PGA2010 |
| CG_5 | U223 | 13 | HCT245 |
| CG_5 | U222 | 15 | 2018 |
| CG_5 | U312 | 61 | PGA2010 |
| CG_6 | U223 | 12 | HCT245 |
| CG_6 | U222 | 16 | 2018 |
| CG_6 | U312 | 60 | PGA2010 |
| CG_7 | U223 | 11 | HCT245 |
| CG_7 | U222 | 17 | 2018 |
| CG_7 | U312 | 59 | PGA2010 |
| CG_8 | U220 | 18 | HCT245 |
| CG_8 | U312 | 58 | PGA2010 |
| CG_8 | U221 | 9 | 2018 |
| CG_9 | U221 | 10 | 2018 |
| CG_9 | U220 | 17 | HCT245 |
| CG_9 | U312 | 57 | PGA2010 |
| CG_ACCESS~ | U223 | 19 | HCT245 |
| CG_ACCESS~ | U505 | 2 | HCT11 |
| CG_ACCESS~ | U612 | 21 | PAL14L8 |
| CH1_CLK | U419 | 1 | PAL20R8A |
| CH1_CLK | U510 | 18 | S241 |
| CH1_CLK | U509 | 3 | S11 |
| CH1_CLK | U312 | 38 | PGA2010 |
| CH1_CLK | U312 | 44 | PGA2010 |
| CH1_CLK | U312 | 45 | PGA2010 |
| CH1_CLK | U510 | 9 | S241 |

| | | | |
|---|---|---|---|
| CH2_CLK | U410 | 1 | PAL20R8A |
| CH2_CLK | U510 | 16 | S241 |
| CH2_CLK | U509 | 2 | S11 |
| CH2_CLK | U307 | 38 | PGA2010 |
| CH2_CLK | U509 | 4 | S11 |
| CH2_CLK | U307 | 44 | PGA2010 |
| CH2_CLK | U307 | 45 | PGA2010 |
| CH2_CLK | U510 | 7 | S241 |
| CH3_CLK | U402 | 1 | PAL20R8A |
| CH3_CLK | U509 | 13 | S11 |
| CH3_CLK | U510 | 14 | S241 |
| CH3_CLK | U302 | 38 | PGA2010 |
| CH3_CLK | U302 | 44 | PGA2010 |
| CH3_CLK | U302 | 45 | PGA2010 |
| CH3_CLK | U510 | 5 | S241 |
| CLR_EOL~ | U617 | 1 | HCT74 |
| CLR_EOL~ | U609 | 2 | LS125 |
| CLR_EOL~ | U508 | 9 | HCT137 |
| CLR_HIR | U517 | 1 | HCT74 |
| CLR_HIR | U701 | 17 | 29823 |
| CLR_IF~ | U417 | 22 | 4501 |
| CLR_IF~ | U616 | 9 | HCT138 |
| CLR_WR_ADDR~ | U624 | 1 | HCT00 |
| CLR_WR_ADDR~ | U425 | 10 | LS590 |
| CLR_WR_ADDR~ | U508 | 11 | HCT137 |
| CLR_X0~ | U501 | 1 | HCT00 |
| CLR_X0~ | U102 | 10 | LS590 |
| CLR_X0~ | U508 | 15 | HCT137 |
| CLR_Y0~ | U124 | 10 | LS590 |
| CLR_Y0~ | U508 | 14 | HCT137 |
| CLR_Y0~ | U229 | 9 | HCT00 |
| COEF_ACCESS~ | U505 | 12 | HCT11 |
| COEF_ACCESS~ | U606 | 4 | PAL12L10 |
| COEF_A_ACCESS | U224 | 1 | HCT374 |
| COEF_A_ACCESS | U620 | 10 | HCT04 |
| COEF_A_ACCESS~ | U225 | 1 | HCT244 |
| COEF_A_ACCESS~ | U620 | 11 | HCT04 |
| COEF_A_ACCESS~ | U225 | 19 | HCT244 |
| COEF_A_ACCESS~ | U606 | 23 | PAL12L10 |
| COEF_A_ACCESS~ | U705 | 9 | HCT08 |
| CONV_ENA | U705 | 10 | HCT08 |
| CONV_ENA | U201 | 11 | LS461 |
| CONV_ENA | U502 | 16 | PAL16R4A |
| CRC_ACTIVE | U416 | 2 | CRC |
| CRC_ACTIVE | U613 | 5 | HCT04 |
| CRC_ACTIVE | U514 | 6 | HCT273 |
| CRC_ACTIVE | U607 | 8 | PAL16C1 |
| CRC_CLK~ | U717 | 7 | HCT153 |
| CRC_CLK~ | U416 | 9 | CRC |
| CRC_CS~ | U715 | 1 | HCT139 |
| CRC_CS~ | U507 | 14 | HCT138 |
| CRC_CS~ | U416 | 6 | CRC |
| CRC_RD~ | U416 | 5 | CRC |
| CRC_RD~ | U715 | 6 | HCT139 |
| CRC_SEL0 | U717 | 14 | HCT153 |
| CRC_SEL0 | U514 | 2 | HCT273 |
| CRC_SEL1 | U717 | 2 | HCT153 |
| CRC_SEL1 | U514 | 5 | HCT273 |
| CRC_WT~ | U715 | 5 | HCT139 |
| CRC_WT~ | U416 | 7 | CRC |

| | | | |
|---|---|---|---|
| CR_0 | U215 | 18 | HCT245 |
| CR_0 | U307 | 66 | PGA2010 |
| CR_0 | U214 | 9 | 2018 |
| CR_10 | U213 | 11 | 2018 |
| CR_10 | U212 | 16 | HCT245 |
| CR_10 | U307 | 56 | PGA2010 |
| CR_1 | U214 | 10 | 2018 |
| CR_11 | U213 | 13 | 2018 |
| CR_11 | U212 | 15 | HCT245 |
| CR_11 | U307 | 55 | PGA2010 |
| CR_1 | U215 | 17 | HCT245 |
| CR_12 | U213 | 14 | 2018 |
| CR_12 | U307 | 54 | PGA2010 |
| CR_13 | U212 | 13 | HCT245 |
| CR_13 | U213 | 15 | 2018 |
| CR_13 | U307 | 53 | PGA2010 |
| CR_14 | U212 | 12 | HCT245 |
| CR_14 | U213 | 16 | 2018 |
| CR_14 | U307 | 52 | PGA2010 |
| CR_15 | U212 | 11 | HCT245 |
| CR_15 | U213 | 17 | 2018 |
| CR_15 | U307 | 50 | PGA2010 |
| CR_1 | U307 | 65 | PGA2010 |
| CR_2 | U214 | 11 | 2018 |
| CR_2 | U215 | 16 | HCT245 |
| CR_2 | U307 | 64 | PGA2010 |
| CR_3 | U214 | 13 | 2018 |
| CR_3 | U215 | 15 | HCT245 |
| CR_3 | U307 | 63 | PGA2010 |
| CR_4 | U214 | 14 | 2018 |
| CR_4 | U307 | 62 | PGA2010 |
| CR_5 | U215 | 13 | HCT245 |
| CR_5 | U214 | 15 | 2018 |
| CR_5 | U307 | 61 | PGA2010 |
| CR_6 | U215 | 12 | HCT245 |
| CR_6 | U214 | 16 | 2018 |
| CR_6 | U307 | 60 | PGA2010 |
| CR_7 | U215 | 11 | HCT245 |
| CR_7 | U214 | 17 | 2018 |
| CR_7 | U307 | 59 | PGA2010 |
| CR_8 | U212 | 18 | HCT245 |
| CR_8 | U307 | 58 | PGA2010 |
| CR_8 | U213 | 9 | 2018 |
| CR_9 | U213 | 10 | 2018 |
| CR_9 | U212 | 17 | HCT245 |
| CR_9 | U307 | 57 | PGA2010 |
| CR_ACCESS~ | U505 | 1 | HCT11 |
| CR_ACCESS~ | U215 | 19 | HCT245 |
| CR_ACCESS~ | U612 | 22 | PAL14L8 |
| DAT0~ | U711 | 2 | LS640 |
| DAT1~ | U711 | 3 | LS640 |
| DAT2~ | U711 | 4 | LS640 |
| DAT3~ | U711 | 5 | LS640 |
| DAT4~ | U711 | 6 | LS640 |
| DAT5~ | U711 | 7 | LS640 |
| DAT6~ | U711 | 8 | LS640 |
| DAT7~ | U711 | 9 | LS640 |
| DAT8~ | U710 | 2 | LS640 |
| DAT9~ | U710 | 3 | LS640 |
| DATA~ | U710 | 4 | LS640 |
| DATB~ | U710 | 5 | LS640 |

| | | | |
|---|---|---|---|
| DATC~ | U710 | 6 | LS640 |
| DATD~ | U710 | 7 | LS640 |
| DATE~ | U710 | 8 | LS640 |
| DATF~ | U710 | 9 | LS640 |
| DB0 | U305 | 11 | HM62256 |
| DB0 | U408 | 13 | 4501 |
| DB0 | U302 | 4 | PGA2010 |
| DB1 | U305 | 12 | HM62256 |
| DB1 | U408 | 19 | 4501 |
| DB1 | U302 | 5 | PGA2010 |
| DB2 | U305 | 13 | HM62256 |
| DB2 | U408 | 18 | 4501 |
| DB2 | U302 | 6 | PGA2010 |
| DB3 | U504 | 14 | HCT245 |
| DB3 | U305 | 15 | HM62256 |
| DB3 | U408 | 17 | 4501 |
| DB3 | U302 | 7 | PGA2010 |
| DB4 | U504 | 15 | HCT245 |
| DB4 | U408 | 16 | 4501 |
| DB4 | U302 | 9 | PGA2010 |
| DB5 | U302 | 10 | PGA2010 |
| DB5 | U408 | 12 | 4501 |
| DB5 | U504 | 16 | HCT245 |
| DB5 | U305 | 17 | HM62256 |
| DB6 | U408 | 11 | 4501 |
| DB6 | U504 | 17 | HCT245 |
| DB6 | U305 | 18 | HM62256 |
| DB7 | U408 | 10 | 4501 |
| DB7 | U302 | 12 | PGA2010 |
| DB7 | U504 | 18 | HCT245 |
| DB7 | U305 | 19 | HM62256 |
| DEOL~ | U610 | 13 | HCT164 |
| DEOL~ | U723 | 15 | LS244 |
| DEOL~ | U723 | 8 | LS244 |
| DG0 | U315 | 11 | HM62256 |
| DG0 | U420 | 13 | 4501 |
| DG0 | U312 | 4 | PGA2010 |
| DG1 | U315 | 12 | HM62256 |
| DG1 | U420 | 19 | 4501 |
| DG1 | U312 | 5 | PGA2010 |
| DG2 | U315 | 13 | HM62256 |
| DG2 | U420 | 18 | 4501 |
| DG2 | U312 | 6 | PGA2010 |
| DG3 | U421 | 14 | HCT245 |
| DG3 | U315 | 15 | HM62256 |
| DG3 | U420 | 17 | 4501 |
| DG3 | U312 | 7 | PGA2010 |
| DG4 | U421 | 15 | HCT245 |
| DG4 | U420 | 16 | 4501 |
| DG4 | U312 | 9 | PGA2010 |
| DG5 | U312 | 10 | PGA2010 |
| DG5 | U420 | 12 | 4501 |
| DG5 | U421 | 16 | HCT245 |
| DG5 | U315 | 17 | HM62256 |
| DG6 | U420 | 11 | 4501 |
| DG6 | U421 | 17 | HCT245 |
| DG6 | U315 | 18 | HM62256 |
| DG7 | U420 | 10 | 4501 |
| DG7 | U312 | 12 | PGA2010 |
| DG7 | U421 | 18 | HCT245 |
| DG7 | U315 | 19 | HM62256 |

| | | | |
|---|---|---|---|
| DIAG_ACCESS | U606 | 10 | PAL12L10 |
| DIAG_ACCESS | U514 | 15 | HCT273 |
| DIAG_ACCESS | U501 | 9 | HCT00 |
| DOUT_0~ | U520 | 18 | S244 |
| DOUT_0~ | U523 | 2 | HCT240 |
| DOUT_1~ | U520 | 16 | S244 |
| DOUT_1~ | U523 | 4 | HCT240 |
| DOUT_2~ | U520 | 14 | S244 |
| DOUT_2~ | U523 | 6 | HCT240 |
| DOUT_3~ | U520 | 12 | S244 |
| DOUT_3~ | U523 | 8 | HCT240 |
| DOUT_4~ | U523 | 11 | HCT240 |
| DOUT_4~ | U520 | 9 | S244 |
| DOUT_5~ | U523 | 13 | HCT240 |
| DOUT_5~ | U520 | 7 | S244 |
| DOUT_6~ | U523 | 15 | HCT240 |
| DOUT_6~ | U520 | 5 | S244 |
| DOUT_7~ | U523 | 17 | HCT240 |
| DOUT_7~ | U520 | 3 | S244 |
| DR0 | U310 | 11 | HM62256 |
| DR0 | U417 | 13 | 4501 |
| DR0 | U307 | 4 | PGA2010 |
| DR1 | U310 | 12 | HM62256 |
| DR1 | U417 | 19 | 4501 |
| DR1 | U307 | 5 | PGA2010 |
| DR2 | U310 | 13 | HM62256 |
| DR2 | U417 | 18 | 4501 |
| DR2 | U307 | 6 | PGA2010 |
| DR3 | U411 | 14 | HCT245 |
| DR3 | U310 | 15 | HM62256 |
| DR3 | U417 | 17 | 4501 |
| DR3 | U307 | 7 | PGA2010 |
| DR4 | U411 | 15 | HCT245 |
| DR4 | U417 | 16 | 4501 |
| DR4 | U307 | 9 | PGA2010 |
| DR5 | U307 | 10 | PGA2010 |
| DR5 | U417 | 12 | 4501 |
| DR5 | U411 | 16 | HCT245 |
| DR5 | U310 | 17 | HM62256 |
| DR6 | U417 | 11 | 4501 |
| DR6 | U411 | 17 | HCT245 |
| DR6 | U310 | 18 | HM62256 |
| DR7 | U417 | 10 | 4501 |
| DR7 | U307 | 12 | PGA2010 |
| DR7 | U411 | 18 | HCT245 |
| DR7 | U310 | 19 | HM62256 |
| DYB_0 | U209 | 14 | HCT245 |
| DYB_0 | U107 | 16 | MP6264 |
| DYB_0 | U109 | 3 | LS382 |
| DYB_1 | U109 | 1 | LS382 |
| DYB_1 | U107 | 15 | MP6264 |
| DYB_2 | U107 | 13 | MP6264 |
| DYB_2 | U209 | 16 | HCT245 |
| DYB_2 | U109 | 19 | LS382 |
| DYB_3 | U107 | 12 | MP6264 |
| DYB_3 | U109 | 17 | LS382 |
| DYB_ACCESS~ | U209 | 19 | HCT245 |
| DYB_ACCESS~ | U606 | 3 | PAL12L10 |
| DYB_ACCESS~ | U502 | 7 | PAL16R4A |
| DYB_ACCESS~ | U407 | 9 | PAL14L8 |
| DYB_P1 | U209 | 13 | HCT245 |

| | | | |
|---|---|---|---|
| DYB_P1 | U107 | 17 | MP6264 |
| DYB_P2 | U209 | 12 | HCT245 |
| DYB_P2 | U107 | 18 | MP6264 |
| DYB_P2 | U108 | 19 | LS382 |
| DYB_P3 | U108 | 1 | LS382 |
| DYB_P3 | U209 | 11 | HCT245 |
| DYB_P3 | U107 | 19 | MP6264 |
| DYB_WE~ | U606 | 16 | PAL12L1( |
| DYB_WE~ | U107 | 27 | MP6264 |
| DYR_0 | U218 | 14 | HCT245 |
| DYR_0 | U114 | 16 | MP6264 |
| DYR_0 | U116 | 3 | LS382 |
| DYR_1 | U116 | 1 | LS382 |
| DYR_1 | U114 | 15 | MP6264 |
| DYR_2 | U114 | 13 | MP6264 |
| DYR_2 | U218 | 16 | HCT245 |
| DYR_2 | U116 | 19 | LS382 |
| DYR_3 | U114 | 12 | MP6264 |
| DYR_3 | U116 | 17 | LS382 |
| DYR_ACCESS~ | U218 | 19 | HCT245 |
| DYR_ACCESS~ | U606 | 2 | PAL12L10 |
| DYR_ACCESS~ | U502 | 8 | PAL16R4A |
| DYR_ACCESS~ | U506 | 9 | HCT138 |
| DYR_P1 | U218 | 13 | HCT245 |
| DYR_P1 | U114 | 17 | MP6264 |
| DYR_P2 | U218 | 12 | HCT245 |
| DYR_P2 | U114 | 18 | MP6264 |
| DYR_P2 | U115 | 19 | LS382 |
| DYR_P3 | U115 | 1 | LS382 |
| DYR_P3 | U218 | 11 | HCT245 |
| DYR_P3 | U114 | 19 | MP6264 |
| DYR_WE~ | U606 | 17 | PAL12L10 |
| DYR_WE~ | U114 | 27 | MP6264 |
| ENB_IO~ | U507 | 12 | HCT138 |
| ENB_IO~ | U608 | 5 | HCT138 |
| ENB_LINRQ~ | U609 | 1 | LS125 |
| ENB_LINRQ~ | U714 | 6 | HCT04 |
| EOL_FF | U607 | 2 | PAL16C1 |
| EOL_FF | U617 | 5 | HCT74 |
| EOL_FF~ | U618 | 12 | HCT08 |
| EOL_FF~ | U721 | 15 | HCT240 |
| EOL_FF~ | U617 | 6 | HCT74 |
| EOL_IN | U620 | 2 | HCT04 |
| EOL_IN | U617 | 3 | HCT74 |
| EOL~ | U610 | 1 | HCT164 |
| EOL~ | U508 | 10 | HCT137 |
| EOL~ | U610 | 2 | HCT164 |
| EO_CONV | U607 | 1 | PAL16C1 |
| EO_CONV | U503 | 12 | PAL16L8A |
| EO_CONV | U202 | 14 | 2729 |
| EO_CONV | U301 | 15 | HCT244 |
| FDBK0 | U605 | 18 | HCT244 |
| FDBK0 | U601 | 23 | 29823 |
| FDBK0 | U602 | 8 | 2018 |
| FDBK1 | U605 | 16 | HCT244 |
| FDBK1 | U601 | 22 | 29823 |
| FDBK1 | U602 | 7 | 2018 |
| FDBK2 | U605 | 14 | HCT244 |
| FDBK2 | U601 | 21 | 29823 |
| FDBK2 | U602 | 6 | 2018 |

| | | | |
|---|---|---|---|
| FDBK3 | U605 | 12 | HCT244 |
| FDBK3 | U601 | 20 | 29823 |
| FDBK3 | U602 | 5 | 2018 |
| FDBK4 | U601 | 19 | 29823 |
| FDBK4 | U602 | 4 | 2018 |
| FDBK4 | U605 | 9 | HCT244 |
| FDBK5 | U601 | 18 | 29823 |
| FDBK5 | U602 | 3 | 2018 |
| FDBK5 | U605 | 7 | HCT244 |
| FDBK6 | U601 | 17 | 29823 |
| FDBK6 | U602 | 2 | 2018 |
| FDBK6 | U605 | 5 | HCT244 |
| FDBK7 | U602 | 1 | 2018 |
| FDBK7 | U601 | 16 | 29823 |
| FDBK7 | U605 | 3 | HCT244 |
| FDBK8 | U601 | 15 | 29823 |
| FDBK8 | U602 | 23 | 2018 |
| FDBK8 | U707 | 9 | LS244 |
| FDBK9 | U602 | 22 | 2018 |
| FDBK9 | U701 | 23 | 29823 |
| FDBK9 | U707 | 7 | LS244 |
| FIFO_RAM_SEL | U621 | 13 | PAL16L8A |
| FIFO_RAM_SEL | U514 | 16 | HCT273 |
| GCS1~ | U227 | 15 | PAL20R4A |
| GCS1~ | U316 | 20 | HM62256 |
| GCS2~ | U227 | 16 | PAL20R4A |
| GCS2~ | U315 | 20 | HM62256 |
| GCS3~ | U313 | 20 | HM62256 |
| GCS3~ | U227 | 21 | PAL20R4A |
| GCS4~ | U314 | 20 | HM62256 |
| GCS4~ | U227 | 22 | PAL20R4A |
| GND | U418 | 1 | HCT688 |
| GND | U201 | 10 | LS461 |
| GND | U502 | 11 | PAL16R4A |
| GND | U102 | 12 | LS590 |
| GND | U227 | 13 | PAL20R4A |
| GND | U418 | 14 | HCT688 |
| GND | U312 | 15 | PGA2010 |
| GND | U418 | 16 | HCT688 |
| GND | U222 | 18 | 2018 |
| GND | U722 | 19 | LS244 |
| GND | U317 | 2 | HCT85 |
| GND | U120 | 20 | MP6264 |
| GND | U423 | 23 | LS461 |
| GND | U418 | 3 | HCT688 |
| GND | U317 | 4 | HCT85 |
| GND | U312 | 40 | PGA2010 |
| GND | U312 | 47 | PGA2010 |
| GND | U418 | 5 | HCT688 |
| GND | U417 | 6 | 4501 |
| GND | U312 | 67 | PGA2010 |
| GND | U417 | 7 | 4501 |
| GND | U416 | 8 | CRC |
| GND | U418 | 9 | HCT688 |
| GND | | P1-12 | CONNECTOR |
| GND | | P1-22 | CONNECTOR |
| GND | | P1-32 | CONNECTOR |
| GND | | P1-42 | CONNECTOR |
| GND | | P1-52 | CONNECTOR |
| GND | | P1-62 | CONNECTOR |
| GND | | P1-72 | CONNECTOR |

| | | | |
|---|---|---|---|
| GND | | P1-82 | CONNECTOR |
| GND | | P1-92 | CONNECTOR |
| GND | | P2-12 | CONNECTOR |
| GND | | P2-2 | CONNECTOR |
| GND | | P2-22 | CONNECTOR |
| GND | | P2-32 | CONNECTOR |
| GND | | P2-42 | CONNECTOR |
| GND | | P2-52 | CONNECTOR |
| GND | | P2-62 | CONNECTOR |
| GND | | P2-72 | CONNECTOR |
| GND | | P2-82 | CONNECTOR |
| GND | | P2-92 | CONNECTOR |
| GNTV | U419 | 11 | PAL20R8A |
| GNTV | U312 | 37 | PGA2010 |
| G_ENB~ | U419 | 13 | PAL20R8A |
| G_ENB~ | U716 | 6 | HCT139 |
| HCLK_ONLY~ | U501 | 10 | HCT00 |
| HCLK_ONLY~ | U507 | 7 | HCT138 |
| HOST_ACCESS~ | U612 | 15 | PAL14L8 |
| HOST_ACCESS~ | U506 | 4 | HCT138 |
| HOST_CLK | U510 | 11 | S241 |
| HOST_CLK | U510 | 13 | S241 |
| HOST_CLK | U510 | 15 | S241 |
| HOST_CLK | U509 | 8 | S11 |
| HOST_CLR~ | U618 | 4 | HCT08 |
| HOST_CLR~ | U616 | 7 | HCT138 |
| HOST_EOL~ | U616 | 12 | HCT138 |
| HOST_EOL~ | U719 | 17 | LS244 |
| HOST_IR~ | U507 | 13 | HCT138 |
| HOST_IR~ | U517 | 3 | HCT74 |
| HOST_PULSE | U606 | 11 | PAL12L10 |
| HOST_PULSE | U407 | 13 | PAL14L8 |
| HOST_PULSE | U616 | 6 | HCT138 |
| HOST_PULSE | U618 | 8 | HCT08 |
| HOST_RDY~ | U618 | 3 | HCT08 |
| HOST_RDY~ | U621 | 6 | PAL16L8A |
| HOST_SI1~ | U719 | 11 | LS244 |
| HOST_SI1~ | U616 | 15 | HCT138 |
| HOST_SI2~ | U719 | 13 | LS244 |
| HOST_SI2~ | U616 | 14 | HCT138 |
| HOST_SI3~ | U616 | 13 | HCT138 |
| HOST_SI3~ | U719 | 15 | LS244 |
| IB_D0~ | U515 | 2 | S240 |
| IB_D1~ | U515 | 4 | S240 |
| IB_D2~ | U515 | 6 | S240 |
| IB_D3~ | U515 | 8 | S240 |
| IB_D4~ | U515 | 11 | S240 |
| IB_D5~ | U515 | 13 | S240 |
| IB_D6~ | U515 | 15 | S240 |
| IB_D7~ | U515 | 17 | S240 |
| IB_EOL~ | U718 | 8 | S244 |
| IB_RDY1~ | U720 | 18 | LS240 |
| IB_RDY1~ | U721 | 2 | HCT240 |
| IB_RDY2~ | U720 | 16 | LS240 |
| IB_RDY2~ | U721 | 4 | HCT240 |
| IB_RDY3~ | U720 | 14 | LS240 |
| IB_RDY3~ | U721 | 6 | HCT240 |
| IB_SEL~ | U515 | 1 | S240 |
| IB_SEL~ | U715 | 11 | HCT139 |
| IB_SEL~ | U515 | 19 | S240 |
| IB_SH1~ | U718 | 2 | S244 |

| | | | |
|---|---|---|---|
| IB_SH2~ | U718 | 4 | S244 |
| IB_SH3~ | U718 | 6 | S244 |
| IFD0 | U515 | 18 | S240 |
| IFD0 | U417 | 2 | 4501 |
| IFD1 | U515 | 16 | S240 |
| IFD1 | U417 | 24 | 4501 |
| IFD2 | U515 | 14 | S240 |
| IFD2 | U417 | 25 | 4501 |
| IFD3 | U515 | 12 | S240 |
| IFD3 | U417 | 26 | 4501 |
| IFD4 | U417 | 27 | 4501 |
| IFD4 | U515 | 9 | S240 |
| IFD5 | U417 | 3 | 4501 |
| IFD5 | U515 | 7 | S240 |
| IFD6 | U417 | 4 | 4501 |
| IFD6 | U515 | 5 | S240 |
| IFD7 | U515 | 3 | S240 |
| IFD7 | U417 | 5 | 4501 |
| IFRD~ | U623 | 1 | DELAY 50nS |
| IFRD~ | U621 | 18 | PAL16L8A |
| IF_EMPTY | U619 | 12 | HCT10 |
| IF_EMPTY | U211 | 2 | HCT244 |
| IF_EMPTY | U607 | 4 | PAL16C1 |
| INBUS_ACTIVE~ | U720 | 1 | LS240 |
| INBUS_ACTIVE~ | U714 | 10 | HCT04 |
| INIT2~ | U514 | 1 | HCT273 |
| INIT2~ | U618 | 6 | HCT08 |
| INIT~ | U707 | 8 | LS244 |
| IR1 | U618 | 13 | HCT08 |
| IR1 | U417 | 8 | 4501 |
| IR2 | U720 | 13 | LS240 |
| IR2 | U720 | 4 | LS240 |
| IR2 | U420 | 8 | 4501 |
| IR3 | U720 | 15 | LS240 |
| IR3 | U720 | 6 | LS240 |
| IR3 | U408 | 8 | 4501 |
| IR_OUT1~ | U722 | 18 | LS244 |
| IR_OUT1~ | U721 | 8 | HCT240 |
| IR_OUT1~ | U720 | 9 | LS240 |
| IR_OUT2~ | U721 | 11 | HCT240 |
| IR_OUT2~ | U722 | 16 | LS244 |
| IR_OUT2~ | U720 | 7 | LS240 |
| IR_OUT3~ | U721 | 13 | HCT240 |
| IR_OUT3~ | U722 | 14 | LS244 |
| IR_OUT3~ | U720 | 5 | LS240 |
| JC2 | U701 | 15 | 29823 |
| JC2 | U602 | 19 | 2018 |
| JC2 | U707 | 5 | LS244 |
| LARGE_BUF | U227 | 10 | PAL20R4A |
| LARGE_BUF | U514 | 12 | HCT273 |
| LARGE_BUF | U228 | 14 | PAL20R8A |
| LARGE_MAT | U202 | 19 | 2729 |
| LARGE_MAT | U514 | 9 | HCT273 |
| LASTLN | U226 | 11 | HCT245 |
| LASTLN | U121 | 19 | MP6264 |
| LASTLN | U607 | 6 | PAL16C1 |
| LASTPX | U114 | 11 | MP6264 |
| LASTPX | U218 | 18 | HCT245 |
| LASTPX | U607 | 5 | PAL16C1 |
| LD_SEQ | U704 | 1 | HCT245 |
| LD_SEQ | U602 | 20 | 2018 |

| | | | |
|---|---|---|---|
| LD_SEQ | U606 | 21 | PAL12L10 |
| LD_X0~ | U503 | 19 | PAL16L8A |
| LD_X0~ | U422 | 2 | LS461 |
| LD_X0~ | U202 | 6 | 2729 |
| LD_Y0~ | U227 | 11 | PAL20R4A |
| LD_Y0~ | U503 | 18 | PAL16L8A |
| LD_Y0~ | U301 | 4 | HCT244 |
| LD_Y0~ | U202 | 7 | 2729 |
| LINE_REQ~ | R1 | 1 | RES 10K |
| LINE_REQ~ | U724 | 15 | HCT244 |
| LINE_REQ~ | U609 | 3 | LS125 |
| LNBF_FULL | U317 | 5 | HCT85 |
| LNBF_FULL | U211 | 8 | HCT244 |
| LOAD_LUT | U117 | 1 | HCT245 |
| LOAD_LUT | U407 | 16 | PAL14L8 |
| LOAD_LUT2 | U223 | 1 | HCT245 |
| LOAD_LUT2 | U407 | 15 | PAL14L8 |
| LOAD_LUT | U120 | 22 | MP6264 |
| LOAD_LUT2 | U222 | 20 | 2018 |
| LOAD_LUT | U115 | 7 | LS382 |
| LOAD_PAR1~ | U616 | 11 | HCT138 |
| MB_A0 | U608 | 1 | HCT138 |
| MB_A0 | U709 | 18 | LS240 |
| MB_A0 | U605 | 2 | HCT244 |
| MB_A0 | U201 | 3 | LS461 |
| MB_A10 | U708 | 14 | LS240 |
| MB_A10 | U707 | 15 | LS244 |
| MB_A10 | U506 | 5 | HCT138 |
| MB_A10 | U225 | 6 | HCT244 |
| MB_A11 | U612 | 1 | PAL14L8 |
| MB_A11 | U708 | 12 | LS240 |
| MB_A11 | U225 | 4 | HCT244 |
| MB_A1 | U709 | 16 | LS240 |
| MB_A1 | U608 | 2 | HCT138 |
| MB_A12 | U225 | 2 | HCT244 |
| MB_A12 | U708 | 9 | LS240 |
| MB_A13 | U612 | 3 | PAL14L8 |
| MB_A13 | U708 | 7 | LS240 |
| MB_A1 | U605 | 4 | HCT244 |
| MB_A14 | U612 | 4 | PAL14L8 |
| MB_A14 | U708 | 5 | LS240 |
| MB_A15 | U708 | 3 | LS240 |
| MB_A15 | U612 | 5 | PAL14L8 |
| MB_A16 | U713 | 18 | LS240 |
| MB_A16 | U612 | 6 | PAL14L8 |
| MB_A17 | U713 | 16 | LS240 |
| MB_A17 | U612 | 7 | PAL14L8 |
| MB_A18 | U713 | 14 | LS240 |
| MB_A18 | U612 | 8 | PAL14L8 |
| MB_A19 | U713 | 12 | LS240 |
| MB_A19 | U612 | 9 | PAL14L8 |
| MB_A20 | U612 | 10 | PAL14L8 |
| MB_A20 | U713 | 9 | LS240 |
| MB_A21 | U612 | 11 | PAL14L8 |
| MB_A2 | U709 | 14 | LS240 |
| MB_A21 | U713 | 7 | LS240 |
| MB_A22 | U612 | 13 | PAL14L8 |
| MB_A22 | U713 | 5 | LS240 |
| MB_A2 | U608 | 3 | HCT138 |
| MB_A2 | U201 | 5 | LS461 |
| MB_A2 | U605 | 6 | HCT244 |

| | | | |
|---|---|---|---|
| MB_A3 | U709 | 12 | LS240 |
| MB_A3 | U416 | 3 | CRC |
| MB_A3 | U201 | 6 | LS461 |
| MB_A3 | U605 | 8 | HCT244 |
| MB_A4 | U605 | 11 | HCT244 |
| MB_A4 | U416 | 4 | CRC |
| MB_A4 | U201 | 7 | LS461 |
| MB_A4 | U709 | 9 | LS240 |
| MB_A5 | U605 | 13 | HCT244 |
| MB_A5 | U225 | 17 | HCT244 |
| MB_A5 | U709 | 7 | LS240 |
| MB_A6 | U225 | 15 | HCT244 |
| MB_A6 | U709 | 5 | LS240 |
| MB_A7 | U506 | 1 | HCT138 |
| MB_A7 | U225 | 13 | HCT244 |
| MB_A7 | U605 | 17 | HCT244 |
| MB_A7 | U709 | 3 | LS240 |
| MB_A8 | U225 | 11 | HCT244 |
| MB_A8 | U708 | 18 | LS240 |
| MB_A8 | U506 | 2 | HCT138 |
| MB_A9 | U707 | 13 | LS244 |
| MB_A9 | U708 | 16 | LS240 |
| MB_A9 | U506 | 3 | HCT138 |
| MB_A9 | U225 | 8 | HCT244 |
| MB_D0 | U416 | 1 | CRC |
| MB_D0 | U416 | 11 | CRC |
| MB_D0 | U523 | 18 | HCT240 |
| MB_D0 | U513 | 2 | HCT244 |
| MB_D0 | U514 | 3 | HCT273 |
| MB_D0 | U228 | 9 | PAL20R8A |
| MB_D10 | U524 | 14 | HCT240 |
| MB_D10 | U710 | 16 | LS640 |
| MB_D10 | U220 | 4 | HCT245 |
| MB_D10 | U117 | 7 | HCT245 |
| MB_D11 | U524 | 12 | HCT240 |
| MB_D11 | U710 | 15 | LS640 |
| MB_D11 | U220 | 5 | HCT245 |
| MB_D11 | U117 | 6 | HCT245 |
| MB_D1 | U711 | 17 | LS640 |
| MB_D11 | U712 | 8 | HCT273 |
| MB_D1 | U503 | 2 | PAL16L8A |
| MB_D12 | U712 | 13 | HCT273 |
| MB_D12 | U710 | 14 | LS640 |
| MB_D12 | U117 | 5 | HCT245 |
| MB_D12 | U220 | 6 | HCT245 |
| MB_D12 | U524 | 9 | HCT240 |
| MB_D1 | U226 | 3 | HCT245 |
| MB_D13 | U710 | 13 | LS640 |
| MB_D13 | U712 | 14 | HCT273 |
| MB_D13 | U117 | 4 | HCT245 |
| MB_D13 | U220 | 7 | HCT245 |
| MB_D1 | U513 | 4 | HCT244 |
| MB_D14 | U710 | 12 | LS640 |
| MB_D14 | U712 | 17 | HCT273 |
| MB_D14 | U117 | 3 | HCT245 |
| MB_D14 | U524 | 5 | HCT240 |
| MB_D14 | U220 | 8 | HCT245 |
| MB_D15 | U710 | 11 | LS640 |
| MB_D15 | U712 | 18 | HCT273 |
| MB_D15 | U117 | 2 | HCT245 |
| MB_D15 | U524 | 3 | HCT240 |

| | | | |
|---|---|---|---|
| MB_D15 | U220 | 9 | HCT245 |
| MB_D1 | U228 | 8 | PAL20R8A |
| MB_D2 | U523 | 14 | HCT240 |
| MB_D2 | U711 | 16 | LS640 |
| MB_D2 | U503 | 3 | PAL16L8A |
| MB_D2 | U226 | 4 | HCT245 |
| MB_D2 | U513 | 6 | HCT244 |
| MB_D2 | U228 | 7 | PAL20R8A |
| MB_D3 | U523 | 12 | HCT240 |
| MB_D3 | U711 | 15 | LS640 |
| MB_D3 | U503 | 4 | PAL16L8A |
| MB_D3 | U226 | 5 | HCT245 |
| MB_D3 | U228 | 6 | PAL20R8A |
| MB_D3 | U513 | 8 | HCT244 |
| MB_D4 | U513 | 11 | HCT244 |
| MB_D4 | U514 | 13 | HCT273 |
| MB_D4 | U711 | 14 | LS640 |
| MB_D4 | U228 | 5 | PAL20R8A |
| MB_D4 | U226 | 6 | HCT245 |
| MB_D4 | U523 | 9 | HCT240 |
| MB_D5 | U513 | 13 | HCT244 |
| MB_D5 | U514 | 14 | HCT273 |
| MB_D5 | U228 | 4 | PAL20R8A |
| MB_D5 | U503 | 6 | PAL16L8A |
| MB_D5 | U226 | 7 | HCT245 |
| MB_D6 | U711 | 12 | LS640 |
| MB_D6 | U513 | 15 | HCT244 |
| MB_D6 | U514 | 17 | HCT273 |
| MB_D6 | U228 | 3 | PAL20R8A |
| MB_D6 | U523 | 5 | HCT240 |
| MB_D6 | U503 | 7 | PAL16L8A |
| MB_D6 | U226 | 8 | HCT245 |
| MB_D7 | U711 | 11 | LS640 |
| MB_D7 | U513 | 17 | HCT244 |
| MB_D7 | U514 | 18 | HCT273 |
| MB_D7 | U228 | 2 | PAL20R8A |
| MB_D7 | U523 | 3 | HCT240 |
| MB_D7 | U503 | 8 | PAL16L8A |
| MB_D7 | U226 | 9 | HCT245 |
| MB_D8 | U524 | 18 | HCT240 |
| MB_D8 | U220 | 2 | HCT245 |
| MB_D8 | U712 | 3 | HCT273 |
| MB_D8 | U117 | 9 | HCT245 |
| MB_D9 | U524 | 16 | HCT240 |
| MB_D9 | U710 | 17 | LS640 |
| MB_D9 | U220 | 3 | HCT245 |
| MB_D9 | U712 | 4 | HCT273 |
| MB_D9 | U117 | 8 | HCT245 |
| MB_SEL~ | U513 | 1 | HCT244 |
| MB_SEL~ | U715 | 10 | HCT139 |
| MB_SEL~ | U719 | 19 | LS244 |
| MEMB_ACCESS~ | U506 | 13 | HCT138 |
| MEMB_ACCESS~ | U504 | 19 | HCT245 |
| MEMB_ACCESS~ | U505 | 5 | HCT11 |
| MEMG_ACCESS~ | U506 | 14 | HCT138 |
| MEMG_ACCESS~ | U421 | 19 | HCT245 |
| MEMG_ACCESS~ | U505 | 4 | HCT11 |
| MEMOE~ | U622 | 13 | S244 |
| MEMOE~ | U621 | 15 | PAL16L8A |
| MEMR_ACCESS~ | U506 | 15 | HCT138 |

| | | | |
|---|---|---|---|
| MEMR_ACCESS~ | U411 | 19 | HCT245 |
| MEMR_ACCESS~ | U505 | 3 | HCT11 |
| MEM_ACCESS~ | U505 | 6 | HCT11 |
| MEM_ACCESS~ | U621 | 8 | PAL16L8A |
| MEM_ADR_SEL | U425 | 14 | LS590 |
| MEM_ADR_SEL | U613 | 2 | HCT04 |
| MEM_ADR_SEL~ | U613 | 1 | HCT04 |
| MEM_ADR_SEL~ | U422 | 13 | LS461 |
| MEM_ADR_SEL~ | U621 | 17 | PAL16L8A |
| MEM_OE~ | U315 | 22 | HM62256 |
| MEM_OE~ | U622 | 7 | S244 |
| MRDC~ | U707 | 2 | LS244 |
| MWE | U621 | 16 | PAL16L8A |
| MWE | U624 | 9 | HCT00 |
| MWTC~ | U707 | 4 | LS244 |
| NXT_CARD_RDY | U621 | 19 | PAL16L8A |
| NXT_CARD_RDY | U607 | 3 | PAL16C1 |
| NXT_EOL~ | U724 | 11 | HCT244 |
| NXT_EOL~ | U723 | 12 | LS244 |
| NXT_EOL~ | U719 | 18 | LS244 |
| NXT_SHIFT1~ | U719 | 12 | LS244 |
| NXT_SHIFT1~ | U723 | 18 | LS244 |
| NXT_SHIFT1~ | U724 | 2 | HCT244 |
| NXT_SHIFT2~ | U719 | 14 | LS244 |
| NXT_SHIFT2~ | U723 | 16 | LS244 |
| NXT_SHIFT2~ | U724 | 4 | HCT244 |
| NXT_SHIFT3~ | U723 | 14 | LS244 |
| NXT_SHIFT3~ | U719 | 16 | LS244 |
| NXT_SHIFT3~ | U724 | 6 | HCT244 |
| OB0~ | U522 | 18 | S244 |
| OB0~ | U524 | 2 | HCT240 |
| OB1~ | U522 | 16 | S244 |
| OB1~ | U524 | 4 | HCT240 |
| OB2~ | U522 | 14 | S244 |
| OB2~ | U524 | 6 | HCT240 |
| OB3~ | U522 | 12 | S244 |
| OB3~ | U524 | 8 | HCT240 |
| OB4~ | U524 | 11 | HCT240 |
| OB4~ | U522 | 9 | S244 |
| OB5~ | U524 | 13 | HCT240 |
| OB5~ | U522 | 7 | S244 |
| OB6~ | U524 | 15 | HCT240 |
| OB6~ | U522 | 5 | S244 |
| OB7~ | U524 | 17 | HCT240 |
| OB7~ | U522 | 3 | S244 |
| OB_ENB~ | U522 | 1 | S244 |
| OB_ENB~ | U522 | 19 | S244 |
| OB_ENB~ | U714 | 4 | HCT04 |
| OB_ENB~ | U621 | 5 | PAL16L8A |
| OB_EOL~ | U724 | 13 | HCT244 |
| OB_EOL~ | U723 | 5 | LS244 |
| OB_RDY~ | U722 | 11 | LS244 |
| OB_SHIFT~ | U723 | 3 | LS244 |
| OB_SHIFT~ | U724 | 8 | HCT244 |
| OSC_CLK | U614 | 13 | S161 |
| OSC_CLK | U510 | 2 | S241 |
| OSC_CLK | U510 | 4 | S241 |
| OSC_CLK | U510 | 6 | S241 |
| OSC_DISB | U510 | 1 | S241 |
| OSC_DISB | U510 | 19 | S241 |

| | | | |
|---|---|---|---|
| OSC_SCLK | U614 | 12 | S161 |
| OSC_SCLK | U610 | 8 | HCT164 |
| OUT_0~ | U416 | 12 | CRC |
| OUT_0~ | U520 | 2 | S244 |
| OUT_0~ | U419 | 22 | PAL20R8A |
| OUT_1~ | U416 | 13 | CRC |
| OUT_1~ | U419 | 21 | PAL20R8A |
| OUT_1~ | U520 | 4 | S244 |
| OUT_2~ | U416 | 14 | CRC |
| OUT_2~ | U419 | 20 | PAL20R8A |
| OUT_2~ | U520 | 6 | S244 |
| OUT_3~ | U416 | 15 | CRC |
| OUT_3~ | U419 | 19 | PAL20R8A |
| OUT_3~ | U520 | 8 | S244 |
| OUT_4~ | U520 | 11 | S244 |
| OUT_4~ | U416 | 16 | CRC |
| OUT_4~ | U419 | 18 | PAL20R8A |
| OUT_5~ | U520 | 13 | S244 |
| OUT_5~ | U419 | 17 | PAL20R8A |
| OUT_6~ | U520 | 15 | S244 |
| OUT_6~ | U419 | 16 | PAL20R8A |
| OUT_6~ | U416 | 18 | CRC |
| OUT_7~ | U419 | 15 | PAL20R8A |
| OUT_7~ | U520 | 17 | S244 |
| OUT_7~ | U416 | 19 | CRC |
| OVFB0 | U401 | 2 | HCT688 |
| OVFB0 | U302 | 26 | PGA2010 |
| OVFB1 | U302 | 27 | PGA2010 |
| OVFB1 | U401 | 4 | HCT688 |
| OVFB2 | U302 | 28 | PGA2010 |
| OVFB2 | U401 | 6 | HCT688 |
| OVFB3 | U302 | 29 | PGA2010 |
| OVFB3 | U401 | 8 | HCT688 |
| OVFB4 | U401 | 11 | HCT688 |
| OVFB4 | U302 | 30 | PGA2010 |
| OVFB5 | U401 | 13 | HCT688 |
| OVFB5 | U302 | 31 | PGA2010 |
| OVFB6 | U401 | 15 | HCT688 |
| OVFB6 | U302 | 32 | PGA2010 |
| OVFB7 | U401 | 17 | HCT688 |
| OVFB7 | U302 | 33 | PGA2010 |
| OVFG0 | U418 | 2 | HCT688 |
| OVFG0 | U312 | 26 | PGA2010 |
| OVFG1 | U312 | 27 | PGA2010 |
| OVFG1 | U418 | 4 | HCT688 |
| OVFG2 | U312 | 28 | PGA2010 |
| OVFG2 | U418 | 6 | HCT688 |
| OVFG3 | U312 | 29 | PGA2010 |
| OVFG3 | U418 | 8 | HCT688 |
| OVFG4 | U418 | 11 | HCT688 |
| OVFG4 | U312 | 30 | PGA2010 |
| OVFG5 | U418 | 13 | HCT688 |
| OVFG5 | U312 | 31 | PGA2010 |
| OVFG6 | U418 | 15 | HCT688 |
| OVFG6 | U312 | 32 | PGA2010 |
| OVFG7 | U418 | 17 | HCT688 |
| OVFG7 | U312 | 33 | PGA2010 |
| OVFR0 | U409 | 2 | HCT688 |
| OVFR0 | U307 | 26 | PGA2010 |
| OVFR1 | U307 | 27 | PGA2010 |
| OVFR1 | U409 | 4 | HCT688 |

| | | | |
|---|---|---|---|
| OVFR2 | U307 | 28 | PGA2010 |
| OVFR2 | U409 | 6 | HCT688 |
| OVFR3 | U307 | 29 | PGA2010 |
| OVFR3 | U409 | 8 | HCT688 |
| OVFR4 | U409 | 11 | HCT688 |
| OVFR4 | U307 | 30 | PGA2010 |
| OVFR5 | U409 | 13 | HCT688 |
| OVFR5 | U307 | 31 | PGA2010 |
| OVFR6 | U409 | 15 | HCT688 |
| OVFR6 | U307 | 32 | PGA2010 |
| OVFR7 | U409 | 17 | HCT688 |
| OVFR7 | U307 | 33 | PGA2010 |
| INIT~ | | P1-16 | CONNECTOR |
| IB_D2~ | | P1-21 | CONNECTOR |
| MRDC~ | | P1-23 | CONNECTOR |
| MWTC~ | | P1-24 | CONNECTOR |
| XACK~ | | P1-27 | CONNECTOR |
| IB_D6~ | | P1-31 | CONNECTOR |
| AD10~ | | P1-34 | CONNECTOR |
| AD11~ | | P1-36 | CONNECTOR |
| CCLK~ | | P1-37 | CONNECTOR |
| AD12~ | | P1-38 | CONNECTOR |
| AD13~ | | P1-40 | CONNECTOR |
| IB_D7~ | | P1-41 | CONNECTOR |
| ADRE~ | | P1-53 | CONNECTOR |
| ADRF~ | | P1-54 | CONNECTOR |
| ADRC~ | | P1-55 | CONNECTOR |
| ADRD~ | | P1-56 | CONNECTOR |
| ADRA~ | | P1-57 | CONNECTOR |
| ADRB~ | | P1-58 | CONNECTOR |
| ADR8~ | | P1-59 | CONNECTOR |
| ADR9~ | | P1-60 | CONNECTOR |
| IB_EOL~ | | P1-61 | CONNECTOR |
| ADR6~ | | P1-63 | CONNECTOR |
| ADR7~ | | P1-64 | CONNECTOR |
| ADR4~ | | P1-65 | CONNECTOR |
| ADR5~ | | P1-66 | CONNECTOR |
| ADR2~ | | P1-67 | CONNECTOR |
| ADR3~ | | P1-68 | CONNECTOR |
| ADR1~ | | P1-70 | CONNECTOR |
| OB_EOL~ | | P1-71 | CONNECTOR |
| DATE~ | | P1-73 | CONNECTOR |
| DATF~ | | P1-74 | CONNECTOR |
| DATC~ | | P1-75 | CONNECTOR |
| DATD~ | | P1-76 | CONNECTOR |
| DATA~ | | P1-77 | CONNECTOR |
| DATB~ | | P1-78 | CONNECTOR |
| DAT8~ | | P1-79 | CONNECTOR |
| DAT9~ | | P1-80 | CONNECTOR |
| LINE_REQ~ | | P1-81 | CONNECTOR |
| DAT6~ | | P1-83 | CONNECTOR |
| DAT7~ | | P1-84 | CONNECTOR |
| DAT4~ | | P1-85 | CONNECTOR |
| DAT5~ | | P1-86 | CONNECTOR |
| DAT2~ | | P1-87 | CONNECTOR |
| DAT3~ | | P1-88 | CONNECTOR |
| DAT0~ | | P1-89 | CONNECTOR |
| DAT1~ | | P1-90 | CONNECTOR |
| OB_RDY~ | | P1-91 | CONNECTOR |
| IB_D0~ | | P2-1 | CONNECTOR |

| | | | |
|---|---|---|---|
| IB_D5~ | | P2-100 | CONNECTOR |
| IB_SH1~ | | P2-15 | CONNECTOR |
| IB_SH2~ | | P2-17 | CONNECTOR |
| IB_SH3~ | | P2-19 | CONNECTOR |
| IB_D1~ | | P2-21 | CONNECTOR |
| IB_RDY1~ | | P2-23 | CONNECTOR |
| IB_RDY2~ | | P2-25 | CONNECTOR |
| IB_RDY3~ | | P2-27 | CONNECTOR |
| DOUT_0~ | | P2-30 | CONNECTOR |
| PC_D0~ | | P2-31 | CONNECTOR |
| PC_D1~ | | P2-33 | CONNECTOR |
| DOUT_1~ | | P2-34 | CONNECTOR |
| PC_D2~ | | P2-35 | CONNECTOR |
| DOUT_2~ | | P2-36 | CONNECTOR |
| PC_D3~ | | P2-37 | CONNECTOR |
| DOUT_3~ | | P2-38 | CONNECTOR |
| PC_D4~ | | P2-39 | CONNECTOR |
| DOUT_4~ | | P2-40 | CONNECTOR |
| PC_D5~ | | P2-41 | CONNECTOR |
| PC_D6~ | | P2-43 | CONNECTOR |
| DOUT_5~ | | P2-44 | CONNECTOR |
| PC_D7~ | | P2-45 | CONNECTOR |
| DOUT_6~ | | P2-46 | CONNECTOR |
| DOUT_7~ | | P2-48 | CONNECTOR |
| IR_OUT1~ | | P2-53 | CONNECTOR |
| RDY_IN1~ | | P2-54 | CONNECTOR |
| IR_OUT2~ | | P2-55 | CONNECTOR |
| RDY_IN2~ | | P2-56 | CONNECTOR |
| IR_OUT3~ | | P2-57 | CONNECTOR |
| RDY_IN3~ | | P2-58 | CONNECTOR |
| PC_SH1~ | | P2-63 | CONNECTOR |
| NXT_SHIFT1~ | | P2-64 | CONNECTOR |
| PC_SH2~ | | P2-65 | CONNECTOR |
| NXT_SHIFT2~ | | P2-66 | CONNECTOR |
| PC_SH3~ | | P2-67 | CONNECTOR |
| NXT_SHIFT3~ | | P2-68 | CONNECTOR |
| PC_EOL~ | | P2-73 | CONNECTOR |
| NXT_EOL~ | | P2-74 | CONNECTOR |
| AD17~ | | P2-76 | CONNECTOR |
| AD15~ | | P2-78 | CONNECTOR |
| AD16~ | | P2-81 | CONNECTOR |
| AD14~ | | P2-83 | CONNECTOR |
| OB1~ | | P2-84 | CONNECTOR |
| OB0~ | | P2-85 | CONNECTOR |
| OB3~ | | P2-86 | CONNECTOR |
| OB2~ | | P2-87 | CONNECTOR |
| OB5~ | | P2-88 | CONNECTOR |
| OB4~ | | P2-89 | CONNECTOR |
| OB7~ | | P2-90 | CONNECTOR |
| OB6~ | | P2-91 | CONNECTOR |
| OB_SHIFT~ | | P2-97 | CONNECTOR |
| IB_D4~ | | P2-98 | CONNECTOR |
| IB_D3~ | | P2-99 | CONNECTOR |
| PC_D0~ | U518 | 2 | S240 |
| PC_D1~ | U518 | 4 | S240 |
| PC_D2~ | U518 | 6 | S240 |
| PC_D3~ | U518 | 8 | S240 |
| PC_D4~ | U518 | 11 | S240 |
| PC_D5~ | U518 | 13 | S240 |
| PC_D6~ | U518 | 15 | S240 |
| PC_D7~ | U518 | 17 | S240 |

| | | | |
|---|---|---|---|
| PC_EOL~ | U718 | 17 | S244 |
| PC_EOL~ | U719 | 2 | LS244 |
| PC_SH1~ | U718 | 11 | S244 |
| PC_SH1~ | U719 | 8 | LS244 |
| PC_SH2~ | U718 | 13 | S244 |
| PC_SH2~ | U719 | 6 | LS244 |
| PC_SH3~ | U718 | 15 | S244 |
| PC_SH3~ | U719 | 4 | LS244 |
| PD1~ | U622 | 1 | S244 |
| PD1~ | U228 | 13 | PAL20R8A |
| PD1~ | U102 | 14 | LS590 |
| PD1~ | U715 | 15 | HCT139 |
| PD1~ | U622 | 19 | S244 |
| PD1~ | U713 | 3 | LS240 |
| PD1~ | U312 | 39 | PGA2010 |
| PD1~ | U312 | 41 | PGA2010 |
| PL_CLK1 | U404 | 1 | LS461 |
| PL_CLK1 | U207 | 11 | HCT374 |
| PL_CLK1 | U509 | 12 | S11 |
| PL_CLK2 | U228 | 1 | PAL20R8A |
| PL_CLK2 | U224 | 11 | HCT374 |
| PL_CLK2 | U611 | 2 | S10 |
| PL_CLK2 | U509 | 6 | S11 |
| PREV_CARD_SEL~ | U518 | 1 | S240 |
| PREV_CARD_SEL~ | U715 | 12 | HCT139 |
| PREV_CARD_SEL~ | U718 | 19 | S244 |
| PU10 | U516 | 10 | 316A102 1K |
| PU10 | U302 | 42 | PGA2010 |
| PU10 | U302 | 49 | PGA2010 |
| PU11 | U614 | 1 | S161 |
| PU11 | U516 | 11 | 316A102 1K |
| PU11 | U713 | 17 | LS240 |
| PU11 | U511 | 2 | HCT164 |
| PU11 | U611 | 5 | S10 |
| PU11 | U610 | 9 | HCT164 |
| PU2 | U516 | 2 | 316A102 1K |
| PU2 | U120 | 26 | MP6264 |
| PU3 | U422 | 11 | LS461 |
| PU3 | U516 | 3 | 316A102 1K |
| PU4 | U516 | 4 | 316A102 1K |
| PU4 | U312 | 42 | PGA2010 |
| PU4 | U312 | 49 | PGA2010 |
| PU5 | U113 | 26 | MP6264 |
| PU5 | U115 | 5 | LS382 |
| PU5 | U115 | 6 | LS382 |
| PU6 | U412 | 11 | LS461 |
| PU6 | U516 | 6 | 316A102 1K |
| PU7 | U307 | 42 | PGA2010 |
| PU7 | U307 | 49 | PGA2010 |
| PU7 | U516 | 7 | 316A102 1K |
| PU8 | U106 | 26 | MP6264 |
| PU8 | U108 | 5 | LS382 |
| PU8 | U108 | 6 | LS382 |
| PU8 | U516 | 8 | 316A102 1K |
| PU9 | U404 | 11 | LS461 |
| PU9 | U516 | 9 | 316A102 1K |
| RCS1~ | U219 | 15 | PAL20R4A |
| RCS1~ | U311 | 20 | HM62256 |
| RCS2~ | U219 | 16 | PAL20R4A |
| RCS2~ | U310 | 20 | HM62256 |
| RCS3~ | U308 | 20 | HM62256 |

| | | | |
|---|---|---|---|
| RCS3~ | U219 | 21 | PAL20R4A |
| RCS4~ | U309 | 20 | HM62256 |
| RCS4~ | U219 | 22 | PAL20R4A |
| RDBK1~ | U721 | 1 | HCT240 |
| RDBK1~ | U608 | 15 | HCT138 |
| RDBK1~ | U721 | 19 | HCT240 |
| RDBK2~ | U512 | 1 | HCT240 |
| RDBK2~ | U608 | 14 | HCT138 |
| RDBK2~ | U512 | 19 | HCT240 |
| RDBK3~ | U523 | 1 | HCT240 |
| RDBK3~ | U608 | 13 | HCT138 |
| RDBK3~ | U523 | 19 | HCT240 |
| RDBK4~ | U724 | 1 | HCT244 |
| RDBK4~ | U608 | 12 | HCT138 |
| RDBK4~ | U724 | 19 | HCT244 |
| RDY_IN1~ | U722 | 17 | LS244 |
| RDY_IN1~ | U722 | 2 | LS244 |
| RDY_IN2~ | U722 | 15 | LS244 |
| RDY_IN2~ | U722 | 4 | LS244 |
| RDY_IN3~ | U722 | 13 | LS244 |
| RDY_IN3~ | U722 | 6 | LS244 |
| RD_IF~ | U417 | 15 | 4501 |
| RD_IF~ | U622 | 18 | S244 |
| RD_WR~ | U612 | 19 | PAL14L8 |
| RD_WR~ | U502 | 2 | PAL16R4A |
| REG_CKEN~ | U701 | 14 | 29823 |
| REG_CKEN~ | U502 | 15 | PAL16R4A |
| RND | U503 | 17 | PAL16L8A |
| RND | U312 | 48 | PGA2010 |
| RND | U301 | 6 | HCT244 |
| RND | U202 | 8 | 2729 |
| RNTV | U410 | 11 | PAL20R8A |
| RNTV | U307 | 37 | PGA2010 |
| RSLT_ENB | U419 | 10 | PAL20R8A |
| RSLT_ENB | U202 | 11 | 2729 |
| RSLT_ENB | U503 | 15 | PAL16L8A |
| RUN | U502 | 12 | PAL16R4A |
| RUN | U514 | 19 | HCT273 |
| RW_LNBF | U317 | 6 | HCT85 |
| RW_LNBF | U607 | 7 | PAL16C1 |
| R_ENB~ | U410 | 13 | PAL20R8A |
| R_ENB~ | U716 | 5 | HCT139 |
| SEL_JC2 | U701 | 10 | 29823 |
| SEL_JC2 | U607 | 16 | PAL16C1 |
| SEL_JC2 | U211 | 4 | HCT244 |
| SEQ0 | U202 | 1 | 2729 |
| SEQ0 | U201 | 22 | LS461 |
| SEQ0 | U213 | 4 | 2018 |
| SEQ0 | U222 | 8 | 2018 |
| SEQ1 | U202 | 2 | 2729 |
| SEQ1 | U201 | 21 | LS461 |
| SEQ1 | U213 | 5 | 2018 |
| SEQ1 | U222 | 7 | 2018 |
| SEQ2 | U201 | 20 | LS461 |
| SEQ2 | U202 | 3 | 2729 |
| SEQ2 | U222 | 6 | 2018 |
| SEQ3 | U201 | 19 | LS461 |
| SEQ3 | U202 | 4 | 2729 |
| SEQ3 | U222 | 5 | 2018 |
| SEQ3 | U213 | 7 | 2018 |
| SEQ4 | U201 | 18 | LS461 |

| | | | |
|---|---|---|---|
| SEQ4 | U222 | 4 | 2018 |
| SEQ4 | U202 | 5 | 2729 |
| SEQ4 | U213 | 8 | 2018 |
| SEQ_A_ACCESS | U701 | 1 | 29823 |
| SEQ_A_ACCESS | U620 | 12 | HCT04 |
| SEQ_A_ACCESS~ | U605 | 1 | HCT244 |
| SEQ_A_ACCESS~ | U620 | 13 | HCT04 |
| SEQ_A_ACCESS~ | U605 | 19 | HCT244 |
| SEQ_A_ACCESS~ | U606 | 22 | PAL12L10 |
| SEQ_CKEN | U611 | 13 | S10 |
| SEQ_CKEN | U712 | 15 | HCT273 |
| SEQ_CLK | U502 | 1 | PAL16R4A |
| SEQ_CLK | U701 | 13 | 29823 |
| SEQ_CLK | U611 | 6 | S10 |
| SEQ_CLK~ | U624 | 10 | HCT00 |
| SEQ_CLK~ | U617 | 11 | HCT74 |
| SEQ_CLK~ | U611 | 12 | S10 |
| SEQ_CLK~ | U611 | 3 | S10 |
| SEQ_CLK~ | U508 | 4 | HCT137 |
| SEQ_CY~ | U201 | 14 | LS461 |
| SEQ_CY~ | U721 | 17 | HCT240 |
| SEQ_H_ACC~ | U612 | 18 | PAL14L8 |
| SEQ_H_ACC~ | U704 | 19 | HCT245 |
| SEQ_H_ACC~ | U606 | 5 | PAL12L10 |
| SEQ_L_ACC~ | U612 | 17 | PAL14L8 |
| SEQ_L_ACC~ | U703 | 19 | HCT245 |
| SEQ_L_ACC~ | U606 | 6 | PAL12L10 |
| SEQ_RUN | U701 | 11 | 29823 |
| SEQ_RUN | U502 | 14 | PAL16R4A |
| SEQ_TST~ | U507 | 11 | HCT138 |
| SEQ_TST~ | U503 | 9 | PAL16L8A |
| SEQ_WR | U621 | 14 | PAL16L8A |
| SEQ_WR | U701 | 18 | 29823 |
| SEQ_WRH~ | U606 | 20 | PAL12L10 |
| SEQ_WRH~ | U604 | 21 | 2018 |
| SEQ_WRL~ | U606 | 19 | PAL12L10 |
| SEQ_WRL~ | U602 | 21 | 2018 |
| SEQ_WRL~ | U611 | 4 | S10 |
| SHO_SEL0 | U716 | 14 | HCT139 |
| SHO_SEL0 | U716 | 2 | HCT139 |
| SHO_SEL0 | U701 | 21 | 29823 |
| SHO_SEL1 | U716 | 13 | HCT139 |
| SHO_SEL1 | U701 | 20 | 29823 |
| SHO_SEL1 | U716 | 3 | HCT139 |
| SI1~ | U417 | 1 | 4501 |
| SI1~ | U718 | 18 | S244 |
| SI1~ | U718 | 9 | S244 |
| SI2~ | U420 | 1 | 4501 |
| SI2~ | U718 | 16 | S244 |
| SI2~ | U718 | 7 | S244 |
| SI3~ | U408 | 1 | 4501 |
| SI3~ | U718 | 14 | S244 |
| SI3~ | U718 | 5 | S244 |
| SO_ENA | U617 | 12 | HCT74 |
| SO_ENA | U701 | 22 | 29823 |
| SQ5 | U202 | 16 | 2729 |
| SQ5 | U201 | 17 | LS461 |
| SQ6 | U201 | 16 | LS461 |
| SQ6 | U202 | 17 | 2729 |
| SQ7 | U201 | 15 | LS461 |

| | | | |
|---|---|---|---|
| SQ7 | U202 | 18 | 2729 |
| SQD0 | U702 | 18 | HCT245 |
| SQD0 | U601 | 2 | 29823 |
| SQD0 | U602 | 9 | 2018 |
| SQD10 | U603 | 11 | 2018 |
| SQD10 | U703 | 16 | HCT245 |
| SQD10 | U701 | 3 | 29823 |
| SQD1 | U602 | 10 | 2018 |
| SQD11 | U603 | 13 | 2018 |
| SQD11 | U703 | 15 | HCT245 |
| SQD11 | U701 | 4 | 29823 |
| SQD1 | U702 | 17 | HCT245 |
| SQD12 | U703 | 14 | HCT245 |
| SQD12 | U701 | 5 | 29823 |
| SQD1 | U601 | 3 | 29823 |
| SQD13 | U703 | 13 | HCT245 |
| SQD13 | U603 | 15 | 2018 |
| SQD13 | U701 | 6 | 29823 |
| SQD14 | U703 | 12 | HCT245 |
| SQD14 | U603 | 16 | 2018 |
| SQD14 | U701 | 7 | 29823 |
| SQD15 | U703 | 11 | HCT245 |
| SQD15 | U603 | 17 | 2018 |
| SQD15 | U701 | 8 | 29823 |
| SQD16 | U704 | 18 | HCT245 |
| SQD16 | U701 | 9 | 29823 |
| SQD17 | U604 | 10 | 2018 |
| SQD17 | U704 | 17 | HCT245 |
| SQD17 | U502 | 4 | PAL16R4A |
| SQD18 | U604 | 11 | 2018 |
| SQD18 | U704 | 16 | HCT245 |
| SQD18 | U502 | 3 | PAL16R4A |
| SQD19 | U508 | 1 | HCT137 |
| SQD19 | U604 | 13 | 2018 |
| SQD19 | U704 | 15 | HCT245 |
| SQD20 | U704 | 14 | HCT245 |
| SQD20 | U508 | 2 | HCT137 |
| SQD2 | U602 | 11 | 2018 |
| SQD21 | U704 | 13 | HCT245 |
| SQD21 | U604 | 15 | 2018 |
| SQD21 | U607 | 17 | PAL16C1 |
| SQD21 | U508 | 3 | HCT137 |
| SQD2 | U702 | 16 | HCT245 |
| SQD22 | U704 | 12 | HCT245 |
| SQD22 | U604 | 16 | 2018 |
| SQD22 | U607 | 18 | PAL16C1 |
| SQD23 | U704 | 11 | HCT245 |
| SQD23 | U604 | 17 | 2018 |
| SQD23 | U607 | 19 | PAL16C1 |
| SQD23 | U508 | 6 | HCT137 |
| SQD2 | U601 | 4 | 29823 |
| SQD3 | U602 | 13 | 2018 |
| SQD3 | U702 | 15 | HCT245 |
| SQD3 | U601 | 5 | 29823 |
| SQD4 | U602 | 14 | 2018 |
| SQD4 | U601 | 6 | 29823 |
| SQD5 | U702 | 13 | HCT245 |
| SQD5 | U602 | 15 | 2018 |
| SQD5 | U601 | 7 | 29823 |
| SQD6 | U702 | 12 | HCT245 |
| SQD6 | U602 | 16 | 2018 |

| | 631 | | 632 |
|---|---|---|---|
| SQD6 | U601 | 8 | 29823 |
| SQD7 | U702 | 11 | HCT245 |
| SQD7 | U602 | 17 | 2018 |
| SQD7 | U601 | 9 | 29823 |
| SQD8 | U601 | 10 | 29823 |
| SQD8 | U703 | 18 | HCT245 |
| SQD8 | U603 | 9 | 2018 |
| SQD9 | U603 | 10 | 2018 |
| SQD9 | U703 | 17 | HCT245 |
| SQD9 | U701 | 2 | 29823 |
| TEST | U714 | 1 | HCT04 |
| TEST | U503 | 11 | PAL16L8A |
| TEST | U202 | 15 | 2729 |
| TEST~ | U712 | 6 | HCT273 |
| TEST~ | U714 | 2 | HCT04 |
| TEST~ | U621 | 7 | PAL16L8A |
| THIS_CARD~ | U613 | 13 | HCT04 |
| THIS_CARD~ | U612 | 16 | PAL14L8 |
| THIS_CARD~ | U711 | 19 | LS640 |
| TRX_SEL | U520 | 1 | S244 |
| TRX_SEL | U720 | 19 | LS240 |
| TRX_SEL | U714 | 8 | HCT04 |
| TRX_SEL~ | U722 | 1 | LS244 |
| TRX_SEL~ | U519 | 19 | S244 |
| TRX_SEL~ | U714 | 9 | HCT04 |
| VCC | | 1 | CAP 0.01U |
| VCC | U617 | 10 | HCT74 |
| VCC | U617 | 13 | HCT74 |
| VCC | U516 | 16 | 316A102 1K |
| VCC | U617 | 2 | HCT74 |
| VCC | U417 | 23 | 4501 |
| VCC | U317 | 3 | HCT85 |
| VCC | U617 | 4 | HCT74 |
| VCC | U506 | 6 | HCT138 |
| VCC | | P1-1 | CONNECTOR |
| VCC | | P1-2 | CONNECTOR |
| VCC | | P1-3 | CONNECTOR |
| VCC | | P1-4 | CONNECTOR |
| VCC | | P1-5 | CONNECTOR |
| VCC | | P1-6 | CONNECTOR |
| VCC | | P1-7 | CONNECTOR |
| VCC | | P1-8 | CONNECTOR |
| WAC_0 | U317 | 10 | HCT85 |
| WAC_0 | U228 | 15 | PAL20R8A |
| WAC_1 | U317 | 12 | HCT85 |
| WAC_1 | U228 | 16 | PAL20R8A |
| WAC_2 | U317 | 13 | HCT85 |
| WAC_2 | U228 | 17 | PAL20R8A |
| WAC_3 | U317 | 15 | HCT85 |
| WAC_3 | U228 | 18 | PAL20R8A |
| WAIT_IR | U301 | 17 | HCT244 |
| WAIT_IR | U701 | 19 | 29823 |
| WA_0 | U211 | 11 | HCT244 |
| WA_0 | U228 | 19 | PAL20R8A |
| WA_0 | U227 | 5 | PAL20R4A |
| WA_1 | U211 | 13 | HCT244 |
| WA_1 | U228 | 20 | PAL20R8A |
| WA_1 | U227 | 6 | PAL20R4A |
| WA_2 | U211 | 15 | HCT244 |
| WA_2 | U228 | 21 | PAL20R8A |
| WA_2 | U227 | 7 | PAL20R4A |

| | | | |
|---|---|---|---|
| WA_3 | U211 | 17 | HCT244 |
| WA_3 | U228 | 22 | PAL20R8A |
| WA_3 | U227 | 8 | PAL20R4A |
| WEB~ | U622 | 12 | S244 |
| WEB~ | U305 | 27 | HM62256 |
| WEG~ | U622 | 14 | S244 |
| WEG~ | U315 | 27 | HM62256 |
| WER~ | U622 | 16 | S244 |
| WER~ | U310 | 27 | HM62256 |
| WRADR_SEL~ | U227 | 14 | PAL20R4A |
| WRADR_SEL~ | U508 | 7 | HCT137 |
| WRA_INC_ENA~ | U228 | 10 | PAL20R8A |
| WRA_INC_ENA~ | U508 | 12 | HCT137 |
| WRA_LD_ENA~ | U228 | 11 | PAL20R8A |
| WRA_LD_ENA~ | U507 | 9 | HCT138 |
| WRCLK~ | U624 | 2 | HCT00 |
| WRCLK~ | U622 | 9 | S244 |
| WR_ACLK | U425 | 11 | LS590 |
| WR_ACLK | U624 | 3 | HCT00 |
| WR_ACLK | U624 | 4 | HCT00 |
| WR_ACLK | U624 | 5 | HCT00 |
| WR_ACLK~ | U425 | 13 | LS590 |
| WR_ACLK~ | U624 | 6 | HCT00 |
| X0B_0 | U104 | 14 | HCT245 |
| X0B_0 | U106 | 16 | MP6264 |
| X0B_0 | U403 | 3 | LS461 |
| X0B_10 | U105 | 13 | MP6264 |
| X0B_10 | U103 | 16 | HCT245 |
| X0B_10 | U404 | 5 | LS461 |
| X0B_11 | U105 | 12 | MP6264 |
| X0B_11 | U103 | 17 | HCT245 |
| X0B_1 | U104 | 15 | HCT245 |
| X0B_11 | U404 | 6 | LS461 |
| X0B_12 | U105 | 11 | MP6264 |
| X0B_12 | U103 | 18 | HCT245 |
| X0B_12 | U404 | 7 | LS461 |
| X0B_1 | U403 | 4 | LS461 |
| X0B_2 | U106 | 13 | MP6264 |
| X0B_2 | U104 | 16 | HCT245 |
| X0B_2 | U403 | 5 | LS461 |
| X0B_3 | U106 | 12 | MP6264 |
| X0B_3 | U104 | 17 | HCT245 |
| X0B_3 | U403 | 6 | LS461 |
| X0B_4 | U106 | 11 | MP6264 |
| X0B_4 | U104 | 18 | HCT245 |
| X0B_4 | U403 | 7 | LS461 |
| X0B_5 | U103 | 11 | HCT245 |
| X0B_5 | U105 | 19 | MP6264 |
| X0B_5 | U403 | 8 | LS461 |
| X0B_6 | U103 | 12 | HCT245 |
| X0B_6 | U105 | 18 | MP6264 |
| X0B_6 | U403 | 9 | LS461 |
| X0B_7 | U403 | 10 | LS461 |
| X0B_7 | U103 | 13 | HCT245 |
| X0B_7 | U105 | 17 | MP6264 |
| X0B_8 | U103 | 14 | HCT245 |
| X0B_8 | U105 | 16 | MP6264 |
| X0B_8 | U404 | 3 | LS461 |
| X0B_9 | U103 | 15 | HCT245 |
| X0B_9 | U404 | 4 | LS461 |
| X0B_ACCESS~ | U506 | 10 | HCT138 |

| | | | |
|---|---|---|---|
| X0B_ACCESS~ | U505 | 11 | HCT11 |
| X0B_ACCESS~ | U103 | 19 | HCT245 |
| X0B_ACCESS~ | U407 | 6 | PAL14L8 |
| X0B_P1 | U104 | 13 | HCT245 |
| X0B_P1 | U106 | 17 | MP6264 |
| X0B_P1 | U207 | 3 | HCT374 |
| X0B_P2 | U104 | 12 | HCT245 |
| X0B_P2 | U106 | 18 | MP6264 |
| X0B_P2 | U207 | 4 | HCT374 |
| X0B_P3 | U104 | 11 | HCT245 |
| X0B_P3 | U106 | 19 | MP6264 |
| X0B_P3 | U207 | 7 | HCT374 |
| X0B_WE~ | U407 | 17 | PAL14L8 |
| X0B_WE~ | U106 | 27 | MP6264 |
| X0G_0 | U118 | 14 | HCT245 |
| X0G_0 | U120 | 16 | MP6264 |
| X0G_0 | U423 | 3 | LS461 |
| X0G_10 | U119 | 13 | MP6264 |
| X0G_10 | U117 | 16 | HCT245 |
| X0G_10 | U422 | 5 | LS461 |
| X0G_11 | U119 | 12 | MP6264 |
| X0G_11 | U117 | 17 | HCT245 |
| X0G_1 | U118 | 15 | HCT245 |
| X0G_11 | U422 | 6 | LS461 |
| X0G_12 | U119 | 11 | MP6264 |
| X0G_12 | U117 | 18 | HCT245 |
| X0G_12 | U422 | 7 | LS461 |
| X0G_1 | U423 | 4 | LS461 |
| X0G_2 | U120 | 13 | MP6264 |
| X0G_2 | U118 | 16 | HCT245 |
| X0G_2 | U423 | 5 | LS461 |
| X0G_3 | U120 | 12 | MP6264 |
| X0G_3 | U118 | 17 | HCT245 |
| X0G_3 | U423 | 6 | LS461 |
| X0G_4 | U120 | 11 | MP6264 |
| X0G_4 | U118 | 18 | HCT245 |
| X0G_4 | U423 | 7 | LS461 |
| X0G_5 | U117 | 11 | HCT245 |
| X0G_5 | U119 | 19 | MP6264 |
| X0G_5 | U423 | 8 | LS461 |
| X0G_6 | U117 | 12 | HCT245 |
| X0G_6 | U119 | 18 | MP6264 |
| X0G_6 | U423 | 9 | LS461 |
| X0G_7 | U423 | 10 | LS461 |
| X0G_7 | U117 | 13 | HCT245 |
| X0G_7 | U119 | 17 | MP6264 |
| X0G_8 | U117 | 14 | HCT245 |
| X0G_8 | U119 | 16 | MP6264 |
| X0G_8 | U422 | 3 | LS461 |
| X0G_9 | U117 | 15 | HCT245 |
| X0G_9 | U422 | 4 | LS461 |
| X0G_ACCESS~ | U505 | 10 | HCT11 |
| X0G_ACCESS~ | U506 | 11 | HCT138 |
| X0G_ACCESS~ | U117 | 19 | HCT245 |
| X0G_ACCESS~ | U407 | 5 | PAL14L8 |
| X0G_P1 | U118 | 13 | HCT245 |
| X0G_P1 | U120 | 17 | MP6264 |
| X0G_P1 | U224 | 3 | HCT374 |
| X0G_P2 | U118 | 12 | HCT245 |
| X0G_P2 | U120 | 18 | MP6264 |
| X0G_P2 | U224 | 4 | HCT374 |

| | | | |
|---|---|---|---|
| X0G_P3 | U118 | 11 | HCT245 |
| X0G_P3 | U120 | 19 | MP6264 |
| X0G_P3 | U224 | 7 | HCT374 |
| X0G_WE~ | U407 | 18 | PAL14L8 |
| X0G_WE~ | U120 | 27 | MP6264 |
| X0R_0 | U111 | 14 | HCT245 |
| X0R_0 | U113 | 16 | MP6264 |
| X0R_0 | U413 | 3 | LS461 |
| X0R_10 | U112 | 13 | MP6264 |
| X0R_10 | U110 | 16 | HCT245 |
| X0R_10 | U412 | 5 | LS461 |
| X0R_11 | U112 | 12 | MP6264 |
| X0R_11 | U110 | 17 | HCT245 |
| X0R_1 | U111 | 15 | HCT245 |
| X0R_11 | U412 | 6 | LS461 |
| X0R_12 | U112 | 11 | MP6264 |
| X0R_12 | U110 | 18 | HCT245 |
| X0R_12 | U412 | 7 | LS461 |
| X0R_1 | U413 | 4 | LS461 |
| X0R_2 | U113 | 13 | MP6264 |
| X0R_2 | U111 | 16 | HCT245 |
| X0R_2 | U413 | 5 | LS461 |
| X0R_3 | U113 | 12 | MP6264 |
| X0R_3 | U111 | 17 | HCT245 |
| X0R_3 | U413 | 6 | LS461 |
| X0R_4 | U113 | 11 | MP6264 |
| X0R_4 | U111 | 18 | HCT245 |
| X0R_4 | U413 | 7 | LS461 |
| X0R_5 | U110 | 11 | HCT245 |
| X0R_5 | U112 | 19 | MP6264 |
| X0R_5 | U413 | 8 | LS461 |
| X0R_6 | U110 | 12 | HCT245 |
| X0R_6 | U112 | 18 | MP6264 |
| X0R_6 | U413 | 9 | LS461 |
| X0R_7 | U413 | 10 | LS461 |
| X0R_7 | U110 | 13 | HCT245 |
| X0R_7 | U112 | 17 | MP6264 |
| X0R_8 | U110 | 14 | HCT245 |
| X0R_8 | U112 | 16 | MP6264 |
| X0R_8 | U412 | 3 | LS461 |
| X0R_9 | U110 | 15 | HCT245 |
| X0R_9 | U412 | 4 | LS461 |
| X0R_ACCESS~ | U506 | 12 | HCT138 |
| X0R_ACCESS~ | U110 | 19 | HCT245 |
| X0R_ACCESS~ | U407 | 4 | PAL14L8 |
| X0R_ACCESS~ | U505 | 9 | HCT11 |
| X0R_P1 | U111 | 13 | HCT245 |
| X0R_P1 | U113 | 17 | MP6264 |
| X0R_P1 | U216 | 3 | HCT374 |
| X0R_P2 | U111 | 12 | HCT245 |
| X0R_P2 | U113 | 18 | MP6264 |
| X0R_P2 | U216 | 4 | HCT374 |
| X0R_P3 | U111 | 11 | HCT245 |
| X0R_P3 | U113 | 19 | MP6264 |
| X0R_P3 | U216 | 7 | HCT374 |
| X0R_WE~ | U407 | 19 | PAL14L8 |
| X0R_WE~ | U113 | 27 | MP6264 |
| X0_A0 | U120 | 10 | MP6264 |
| X0_A0 | U102 | 15 | LS590 |
| X0_A10 | U101 | 2 | LS590 |
| X0_A10 | U120 | 21 | MP6264 |

| | | | |
|---|---|---|---|
| X0_A1 | U102 | 1 | LS590 |
| X0_A11 | U120 | 23 | MP6264 |
| X0_A11 | U101 | 3 | LS590 |
| X0_A12 | U120 | 2 | MP6264 |
| X0_A12 | U101 | 4 | LS590 |
| X0_A1 | U120 | 9 | MP6264 |
| X0_A2 | U102 | 2 | LS590 |
| X0_A2 | U120 | 8 | MP6264 |
| X0_A3 | U102 | 3 | LS590 |
| X0_A3 | U120 | 7 | MP6264 |
| X0_A4 | U102 | 4 | LS590 |
| X0_A4 | U120 | 6 | MP6264 |
| X0_A5 | U102 | 5 | LS590 |
| X0_A6 | U120 | 4 | MP6264 |
| X0_A6 | U102 | 6 | LS590 |
| X0_A7 | U120 | 3 | MP6264 |
| X0_A7 | U102 | 7 | LS590 |
| X0_A8 | U101 | 15 | LS590 |
| X0_A8 | U120 | 25 | MP6264 |
| X0_A9 | U101 | 1 | LS590 |
| X0_A9 | U120 | 24 | MP6264 |
| X0_CLK~ | U502 | 18 | PAL16R4A |
| X0_CLK~ | U501 | 2 | HCT00 |
| XACK~ | U609 | 6 | LS125 |
| XB_0 | U305 | 10 | HM62256 |
| XB_0 | U405 | 15 | LS590 |
| XB_0 | U403 | 22 | LS461 |
| XB_10 | U406 | 2 | LS590 |
| XB_10 | U404 | 20 | LS461 |
| XB_10 | U305 | 21 | HM62256 |
| XB_1 | U405 | 1 | LS590 |
| XB_11 | U404 | 19 | LS461 |
| XB_11 | U305 | 23 | HM62256 |
| XB_11 | U406 | 3 | LS590 |
| XB_1 | U403 | 21 | LS461 |
| XB_12 | U404 | 18 | LS461 |
| XB_12 | U305 | 2 | HM62256 |
| XB_12 | U406 | 4 | LS590 |
| XB_13 | U210 | 17 | PAL20R4A |
| XB_13 | U305 | 26 | HM62256 |
| XB_14 | U305 | 1 | HM62256 |
| XB_14 | U210 | 18 | PAL20R4A |
| XB_1 | U305 | 9 | HM62256 |
| XB_2 | U405 | 2 | LS590 |
| XB_2 | U403 | 20 | LS461 |
| XB_2 | U305 | 8 | HM62256 |
| XB_3 | U403 | 19 | LS461 |
| XB_3 | U405 | 3 | LS590 |
| XB_3 | U305 | 7 | HM62256 |
| XB_4 | U403 | 18 | LS461 |
| XB_4 | U405 | 4 | LS590 |
| XB_4 | U305 | 6 | HM62256 |
| XB_5 | U403 | 17 | LS461 |
| XB_5 | U405 | 5 | LS590 |
| XB_6 | U403 | 16 | LS461 |
| XB_6 | U305 | 4 | HM62256 |
| XB_6 | U405 | 6 | LS590 |
| XB_7 | U403 | 15 | LS461 |
| XB_7 | U305 | 3 | HM62256 |
| XB_7 | U405 | 7 | LS590 |

| | | | |
|---|---|---|---|
| XB_8 | U406 | 15 | LS590 |
| XB_8 | U404 | 22 | LS461 |
| XB_8 | U305 | 25 | HM62256 |
| XB_9 | U406 | 1 | LS590 |
| XB_9 | U404 | 21 | LS461 |
| XB_9 | U305 | 24 | HM62256 |
| XB_RD_CY~ | U404 | 14 | LS461 |
| XB_RD_CY~ | U512 | 15 | HCT240 |
| XB_WR_CY~ | U512 | 17 | HCT240 |
| XB_WR_CY~ | U406 | 9 | LS590 |
| XCLK0~ | U701 | 16 | 29823 |
| XCLK0 | U502 | 5 | PAL16R4A |
| XG_0 | U315 | 10 | HM62256 |
| XG_0 | U424 | 15 | LS590 |
| XG_0 | U423 | 22 | LS461 |
| XG_10 | U425 | 2 | LS590 |
| XG_10 | U422 | 20 | LS461 |
| XG_10 | U315 | 21 | HM62256 |
| XG_1 | U424 | 1 | LS590 |
| XG_11 | U422 | 19 | LS461 |
| XG_11 | U315 | 23 | HM62256 |
| XG_11 | U425 | 3 | LS590 |
| XG_1 | U423 | 21 | LS461 |
| XG_12 | U422 | 18 | LS461 |
| XG_12 | U315 | 2 | HM62256 |
| XG_12 | U425 | 4 | LS590 |
| XG_13 | U227 | 17 | PAL20R4A |
| XG_13 | U315 | 26 | HM62256 |
| XG_14 | U315 | 1 | HM62256 |
| XG_14 | U227 | 18 | PAL20R4A |
| XG_1 | U315 | 9 | HM62256 |
| XG_2 | U424 | 2 | LS590 |
| XG_2 | U423 | 20 | LS461 |
| XG_2 | U315 | 8 | HM62256 |
| XG_3 | U423 | 19 | LS461 |
| XG_3 | U424 | 3 | LS590 |
| XG_3 | U315 | 7 | HM62256 |
| XG_4 | U423 | 18 | LS461 |
| XG_4 | U424 | 4 | LS590 |
| XG_4 | U315 | 6 | HM62256 |
| XG_5 | U423 | 17 | LS461 |
| XG_5 | U424 | 5 | LS590 |
| XG_6 | U423 | 16 | LS461 |
| XG_6 | U315 | 4 | HM62256 |
| XG_6 | U424 | 6 | LS590 |
| XG_7 | U423 | 15 | LS461 |
| XG_7 | U315 | 3 | HM62256 |
| XG_7 | U424 | 7 | LS590 |
| XG_8 | U425 | 15 | LS590 |
| XG_8 | U422 | 22 | LS461 |
| XG_8 | U315 | 25 | HM62256 |
| XG_9 | U425 | 1 | LS590 |
| XG_9 | U422 | 21 | LS461 |
| XG_9 | U315 | 24 | HM62256 |
| XG_RD_CY~ | U422 | 14 | LS461 |
| XG_RD_CY~ | U512 | 6 | HCT240 |
| XG_WR_CY~ | U512 | 8 | HCT240 |
| XG_WR_CY~ | U425 | 9 | LS590 |
| XLUT_ACCESS~ | U502 | 6 | PAL16R4A |
| XLUT_ACCESS~ | U505 | 8 | HCT11 |
| XR_0 | U310 | 10 | HM62256 |

| | | | |
|---|---|---|---|
| XR_0 | U414 | 15 | LS590 |
| XR_0 | U413 | 22 | LS461 |
| XR_10 | U415 | 2 | LS590 |
| XR_10 | U412 | 20 | LS461 |
| XR_10 | U310 | 21 | HM62256 |
| XR_1 | U414 | 1 | LS590 |
| XR_11 | U412 | 19 | LS461 |
| XR_11 | U310 | 23 | HM62256 |
| XR_11 | U415 | 3 | LS590 |
| XR_1 | U413 | 21 | LS461 |
| XR_12 | U412 | 18 | LS461 |
| XR_12 | U310 | 2 | HM62256 |
| XR_12 | U415 | 4 | LS590 |
| XR_13 | U219 | 17 | PAL20R4A |
| XR_13 | U310 | 26 | HM62256 |
| XR_14 | U310 | 1 | HM62256 |
| XR_14 | U219 | 18 | PAL20R4A |
| XR_1 | U310 | 9 | HM62256 |
| XR_2 | U414 | 2 | LS590 |
| XR_2 | U413 | 20 | LS461 |
| XR_2 | U310 | 8 | HM62256 |
| XR_3 | U413 | 19 | LS461 |
| XR_3 | U414 | 3 | LS590 |
| XR_3 | U310 | 7 | HM62256 |
| XR_4 | U413 | 18 | LS461 |
| XR_4 | U414 | 4 | LS590 |
| XR_4 | U310 | 6 | HM62256 |
| XR_5 | U413 | 17 | LS461 |
| XR_5 | U414 | 5 | LS590 |
| XR_6 | U413 | 16 | LS461 |
| XR_6 | U310 | 4 | HM62256 |
| XR_6 | U414 | 6 | LS590 |
| XR_7 | U413 | 15 | LS461 |
| XR_7 | U310 | 3 | HM62256 |
| XR_7 | U414 | 7 | LS590 |
| XR_8 | U415 | 15 | LS590 |
| XR_8 | U412 | 22 | LS461 |
| XR_8 | U310 | 25 | HM62256 |
| XR_9 | U415 | 1 | LS590 |
| XR_9 | U412 | 21 | LS461 |
| XR_9 | U310 | 24 | HM62256 |
| XR_RD_CY~ | U512 | 11 | HCT240 |
| XR_RD_CY~ | U412 | 14 | LS461 |
| XR_WR_CY~ | U512 | 13 | HCT240 |
| XR_WR_CY~ | U415 | 9 | LS590 |
| X_CY~ | U512 | 2 | HCT240 |
| X_CY~ | U101 | 9 | LS590 |
| Y0B_0 | U210 | 23 | PAL20R4A |
| Y0B_0 | U109 | 8 | LS382 |
| Y0B_1 | U210 | 2 | PAL20R4A |
| Y0B_1 | U109 | 9 | LS382 |
| Y0B_2 | U109 | 11 | LS382 |
| Y0B_2 | U210 | 3 | PAL20R4A |
| Y0B_3 | U109 | 12 | LS382 |
| Y0B_3 | U210 | 4 | PAL20R4A |
| Y0B_P1 | U108 | 12 | LS382 |
| Y0B_P1 | U207 | 14 | HCT374 |
| Y0B_P2 | U108 | 11 | LS382 |
| Y0B_P2 | U207 | 17 | HCT374 |
| Y0B_P3 | U207 | 18 | HCT374 |
| Y0B_P3 | U108 | 9 | LS382 |

| | | | |
|---|---|---|---|
| Y0G_0 | U226 | 15 | HCT245 |
| Y0G_0 | U227 | 23 | PAL20R4A |
| Y0G_0 | U116 | 4 | LS382 |
| Y0G_0 | U317 | 9 | HCT85 |
| Y0G_1 | U317 | 11 | HCT85 |
| Y0G_1 | U226 | 14 | HCT245 |
| Y0G_1 | U121 | 16 | MP6264 |
| Y0G_1 | U227 | 2 | PAL20R4A |
| Y0G_2 | U226 | 13 | HCT245 |
| Y0G_2 | U317 | 14 | HCT85 |
| Y0G_2 | U121 | 17 | MP6264 |
| Y0G_2 | U116 | 18 | LS382 |
| Y0G_2 | U227 | 3 | PAL20R4A |
| Y0G_3 | U317 | 1 | HCT85 |
| Y0G_3 | U226 | 12 | HCT245 |
| Y0G_3 | U116 | 16 | LS382 |
| Y0G_3 | U121 | 18 | MP6264 |
| Y0G_3 | U227 | 4 | PAL20R4A |
| Y0G_P1 | U121 | 13 | MP6264 |
| Y0G_P1 | U224 | 14 | HCT374 |
| Y0G_P1 | U226 | 16 | HCT245 |
| Y0G_P2 | U121 | 12 | MP6264 |
| Y0G_P2 | U226 | 17 | HCT245 |
| Y0G_P2 | U115 | 18 | LS382 |
| Y0G_P3 | U121 | 11 | MP6264 |
| Y0G_P3 | U226 | 18 | HCT245 |
| Y0G_P3 | U115 | 2 | LS382 |
| Y0G_WE~ | U606 | 18 | PAL12L10 |
| Y0G_WE~ | U121 | 27 | MP6264 |
| Y0R_0 | U219 | 23 | PAL20R4A |
| Y0R_0 | U116 | 8 | LS382 |
| Y0R_1 | U219 | 2 | PAL20R4A |
| Y0R_1 | U116 | 9 | LS382 |
| Y0R_2 | U116 | 11 | LS382 |
| Y0R_2 | U219 | 3 | PAL20R4A |
| Y0R_3 | U116 | 12 | LS382 |
| Y0R_3 | U219 | 4 | PAL20R4A |
| Y0R_P1 | U115 | 12 | LS382 |
| Y0R_P1 | U216 | 14 | HCT374 |
| Y0R_P2 | U115 | 11 | LS382 |
| Y0R_P2 | U216 | 17 | HCT374 |
| Y0R_P3 | U216 | 18 | HCT374 |
| Y0R_P3 | U115 | 9 | LS382 |
| Y0_A0 | U121 | 10 | MP6264 |
| Y0_A0 | U123 | 15 | LS590 |
| Y0_A10 | U124 | 2 | LS590 |
| Y0_A10 | U121 | 21 | MP6264 |
| Y0_A1 | U123 | 1 | LS590 |
| Y0_A11 | U121 | 23 | MP6264 |
| Y0_A11 | U124 | 3 | LS590 |
| Y0_A12 | U121 | 2 | MP6264 |
| Y0_A12 | U124 | 4 | LS590 |
| Y0_A13 | U121 | 20 | MP6264 |
| Y0_A13 | U122 | 26 | MP6264 |
| Y0_A13 | U124 | 5 | LS590 |
| Y0_A1 | U121 | 9 | MP6264 |
| Y0_A2 | U123 | 2 | LS590 |
| Y0_A2 | U121 | 8 | MP6264 |
| Y0_A3 | U123 | 3 | LS590 |
| Y0_A3 | U121 | 7 | MP6264 |
| Y0_A4 | U123 | 4 | LS590 |

| | | | |
|---|---|---|---|
| Y0_A4 | U121 | 6 | MP6264 |
| Y0_A5 | U123 | 5 | LS590 |
| Y0_A6 | U121 | 4 | MP6264 |
| Y0_A6 | U123 | 6 | LS590 |
| Y0_A7 | U121 | 3 | MP6264 |
| Y0_A7 | U123 | 7 | LS590 |
| Y0_A8 | U124 | 15 | LS590 |
| Y0_A8 | U121 | 25 | MP6264 |
| Y0_A9 | U124 | 1 | LS590 |
| Y0_A9 | U121 | 24 | MP6264 |
| Y0_ACCESS~ | U606 | 1 | PAL12L10 |
| Y0_ACCESS~ | U507 | 15 | HCT138 |
| Y0_ACCESS~ | U226 | 19 | HCT245 |
| Y0_ACCESS~ | U407 | 7 | PAL14L8 |
| Y0_ACCESS~ | U502 | 9 | PAL16R4A |
| Y0_CLK~ | U229 | 10 | HCT00 |
| Y0_CLK~ | U502 | 19 | PAL16R4A |
| YCNT_ENA | U202 | 12 | 2729 |
| YCNT_ENA | U301 | 13 | HCT244 |
| YCNT_ENA | U503 | 14 | PAL16L8A |
| YCNT_ENA | U227 | 9 | PAL20R4A |
| Y_CY~ | U512 | 4 | HCT240 |
| Y_CY~ | U124 | 9 | LS590 |

We claim:

1. A method for fitting a picture into a page layout, so that the picture will fit precisely in a desired location in the layout, said method comprising the steps of:

preliminarily scanning a planar picture and displaying it to an operator on a TV screen;

displaying the page layout;

marking two points on the displayed picture and two corresponding points on the layout where the two picture points are to fit;

physically rotating the picture in a plane thereof and magnifying the picture so that the positional relationship of the two picture points of the thus rotated and magnified picture matches that of the corresponding layout points; and rescanning the picture as thus rotated and magnified.

2. The method of claim 1, wherein the step of displaying the layout includes displaying the layout on the TV screen.

3. The method of claim 1, wherein the step of displaying the layout includes mounting the layout on a tablet.

4. The method of claim 1, wherein the step of physically rotating the picture includes automatic rotation of the picture in response to an operator command.

5. A method for fitting a picture into a page layout, so that the picture will fit precisely in a desired location in the layout, said method comprising the steps of:

preliminarily scanning a planar picture and displaying it to an operator on a video screen;

marking two points on the displayed picture corresponding to two points on the layout where the two picture points are to fit;

physically rotating the picture in a plane thereof and magnifying the picture so that the positional relationship of the two picture points of the thus rotated and magnified picture matches that of the corresponding layout points; and rescanning the picture as rotated and magnified.

6. A method for scanning a picture at a desired orientation comprising the steps of:

preliminarily scanning a planar picture and displaying it to an operator;

indicating the desired orientation of the picture;

performing computer computations of at least one geometrical modification of the picture including at least one of enlargement, reduction, translation and rotation thereof required to achieve the desired orientation; and employing said at least one geometrical modification to effect subsequent rescanning of the picture at the desired orientation.

7. A method according to claim 6 and wherein said step of employing includes physically rotating the picture in a plane thereof in order to achieve the desired orientation, and the picture is rescanned after said rotating.

8. A method for fitting a picture into a page layout, so that the picture will fit precisely in a desired location in the layout, said method comprising the steps of:

preliminarily scanning a planar picture and displaying it to an operator on a monitor;

displaying the page layout;

marking two points on the displayed picture and two corresponding points on the layout where the two picture points are to fit, thereby to define a desired geometrically modified picture;

performing computer computations of at least one geometrical modification of the picture including at least one of enlargement, reduction, translation and rotation thereof required to achieve the desired geometrically modified picture;

employing said at least one geometrical modification of the picture to control at least one of physical rotation of the picture in a plane thereof and size adjustment of the picture so that the positional relationship of the two picture points of the thus rotated and/or size-adjusted picture matches that of the corresponding layout points; and rescanning the picture as thus rotated and/or size-adjusted.

* * * * *